US012511332B2

(12) United States Patent
Quigley et al.

(10) Patent No.: US 12,511,332 B2
(45) Date of Patent: Dec. 30, 2025

(54) SYSTEMS AND METHODS FOR CRAWLING AND ANALYZING DISTRIBUTED LEDGER DATA

(71) Applicant: VERONA HOLDINGS SEZC, George Town (KY)

(72) Inventors: William Edward Quigley, Pacific Palisades, CA (US); Lukasz Jakub Sliwka, Las Vegas, NV (US); Jonathan Yantis, Grants Pass, OR (US); Jason Seldon, Los Angeles, CA (US); Charles Howard Cella, Pembroke, MA (US); Teymour El-Tahry, Detroit, MI (US); Brent Bliven, Austin, TX (US)

(73) Assignee: VERONA HOLDINGS SEZC, George Town (KY)

( * ) Notice: Subject to any disclaimer, the term of this patent is extended or adjusted under 35 U.S.C. 154(b) by 0 days.

(21) Appl. No.: 18/640,204

(22) Filed: Apr. 19, 2024

(65) Prior Publication Data

US 2024/0370850 A1 Nov. 7, 2024

Related U.S. Application Data

(63) Continuation of application No. PCT/US2022/047396, filed on Oct. 21, 2022.
(Continued)

(51) Int. Cl.
*G06F 16/906* (2019.01)
*G06F 16/23* (2019.01)
(Continued)

(52) U.S. Cl.
CPC ........ *G06F 16/906* (2019.01); *G06F 16/2379* (2019.01); *G06F 16/9024* (2019.01);
(Continued)

(58) Field of Classification Search
None
See application file for complete search history.

(56) References Cited

U.S. PATENT DOCUMENTS

| | | | |
|---|---|---|---|
| 4,722,053 | A | 1/1988 | Dubno et al. |
| 5,930,775 | A | 7/1999 | McCauley et al. |

(Continued)

FOREIGN PATENT DOCUMENTS

| | | | |
|---|---|---|---|
| AU | 2007242962 | A1 | 7/2008 |
| AU | 2007242962 | B2 | 7/2008 |

(Continued)

OTHER PUBLICATIONS

S. Casale-Brunet, P. Ribeca, P. Doyle, and M. Mattavelli, "Networks of Ethereum Non-Fungible Tokens: A graph-based analysis of the ERC-721 ecosystem", arXiv [cs. SI], 2021, retrieved from https://arxiv.org/abs/2110.12545 (Year: 2021).*

(Continued)

*Primary Examiner* — Eduardo Castilho
(74) *Attorney, Agent, or Firm* — RMCK Law Group, PLC

(57) ABSTRACT

The present disclosure relates to systems and methods that leverage smart contracts and distributed ledgers, such as blockchains, to provide a trustless or substantially trustless ecosystem that includes distributed ledger crawler functions, advertising functions, risk mitigation for secondary sales of distributed ledger tokens, and various methods of acquiring and using distributed ledger tokens, among other uses.

20 Claims, 85 Drawing Sheets

Related U.S. Application Data

(60) Provisional application No. 63/318,495, filed on Mar. 10, 2022, provisional application No. 63/270,893, filed on Oct. 22, 2021.

(51) Int. Cl.

| | |
|---|---|
| ***G06F 16/901*** | (2019.01) |
| ***G06F 16/904*** | (2019.01) |
| ***G06F 16/951*** | (2019.01) |
| ***G06Q 20/36*** | (2012.01) |
| ***G06Q 20/38*** | (2012.01) |
| ***G06Q 30/0601*** | (2023.01) |
| ***G06Q 50/00*** | (2024.01) |
| ***H04L 9/32*** | (2006.01) |

(52) U.S. Cl.

CPC .......... *G06F 16/904* (2019.01); *G06F 16/951* (2019.01); *G06Q 20/367* (2013.01); *G06Q 20/384* (2020.05); *G06Q 20/389* (2013.01); *G06Q 30/0601* (2013.01); *G06Q 50/01* (2013.01); *H04L 9/3213* (2013.01); *G06Q 2220/00* (2013.01)

(56) References Cited

U.S. PATENT DOCUMENTS

| | | | |
|---|---|---|---|
| 6,970,812 | B2 | 11/2005 | Kamachi et al. |
| 7,389,269 | B1 | 6/2008 | Robinson et al. |
| 7,711,647 | B2 | 5/2010 | Gunaseelan et al. |
| 7,747,519 | B2 | 6/2010 | Kemper et al. |
| 7,904,381 | B1 | 3/2011 | Tatang et al. |
| 8,037,193 | B2 | 10/2011 | Hay et al. |
| 8,156,019 | B2 | 4/2012 | Wilson et al. |
| 8,360,867 | B2 | 1/2013 | Luchene |
| 8,549,416 | B2 | 10/2013 | Ganz et al. |
| 8,589,255 | B2 | 11/2013 | Glazer et al. |
| 8,606,673 | B1 | 12/2013 | Grim et al. |
| 8,712,920 | B2 | 4/2014 | Walker et al. |
| 9,129,339 | B2 | 9/2015 | Liu |
| 9,229,987 | B2 | 1/2016 | Mattsson et al. |
| 9,373,139 | B2 | 6/2016 | Kressler |
| 9,396,486 | B2 | 7/2016 | Stivoric et al. |
| 9,535,902 | B1 | 1/2017 | Michalak et al. |
| 9,536,065 | B2 | 1/2017 | Bouse et al. |
| 9,608,829 | B2 | 3/2017 | Spanos et al. |
| 9,679,125 | B2 | 6/2017 | Bailor et al. |
| 9,737,819 | B2 | 8/2017 | DeSanti et al. |
| 9,794,797 | B2 | 10/2017 | Hoffberg |
| 9,996,983 | B2 | 6/2018 | Mullins |
| 10,043,174 | B1 | 8/2018 | Chikkanna |
| 10,103,953 | B1 * | 10/2018 | Chang ................ G06Q 10/0639 |
| 10,116,830 | B2 | 10/2018 | Eagleton et al. |
| 10,121,143 | B1 | 11/2018 | Madisetti et al. |
| 10,192,073 | B2 | 1/2019 | Marin |
| 10,192,198 | B2 | 1/2019 | Nazzari et al. |
| 10,210,453 | B2 | 2/2019 | Krishnamurthy et al. |
| 10,210,527 | B2 | 2/2019 | Radocchia et al. |
| 10,243,743 | B1 | 3/2019 | Madisetti et al. |
| 10,373,158 | B1 | 8/2019 | James et al. |
| 10,482,533 | B2 | 11/2019 | Leonard et al. |
| 10,489,768 | B2 | 11/2019 | Szeto et al. |
| 10,505,726 | B1 | 12/2019 | Andon et al. |
| 10,506,070 | B2 | 12/2019 | Ford et al. |
| 10,540,654 | B1 | 1/2020 | James et al. |
| 10,600,009 | B1 | 3/2020 | Augustine et al. |
| 10,621,368 | B2 * | 4/2020 | Ravizza ............. G06F 16/9024 |
| 10,657,595 | B2 | 5/2020 | Jong et al. |
| 10,755,263 | B1 | 8/2020 | Ramanathan |
| 10,832,338 | B1 | 11/2020 | Floyd et al. |
| 10,839,379 | B2 | 11/2020 | Pierce et al. |
| 10,896,412 | B2 | 1/2021 | Robertson et al. |
| 10,946,283 | B1 | 3/2021 | Meilich et al. |
| 10,963,958 | B1 | 3/2021 | Best et al. |
| 11,049,082 | B2 | 6/2021 | Rice |
| 11,055,279 | B2 | 7/2021 | Yan |
| 11,068,978 | B1 | 7/2021 | Ferreira |
| 11,075,891 | B1 | 7/2021 | Long et al. |
| 11,139,955 | B1 | 10/2021 | So et al. |
| 11,176,620 | B1 | 11/2021 | Lubczynski et al. |
| 11,200,569 | B1 | 12/2021 | James et al. |
| 11,210,596 | B1 * | 12/2021 | Baker ...................... G06N 5/04 |
| 11,222,298 | B2 | 1/2022 | Abelow |
| 11,250,111 | B2 | 2/2022 | Goldston et al. |
| 11,256,788 | B2 | 2/2022 | Goldston et al. |
| 11,288,736 | B1 | 3/2022 | Jette et al. |
| 11,308,487 | B1 | 4/2022 | Foster et al. |
| 11,321,308 | B2 | 5/2022 | Yan |
| 11,334,875 | B2 | 5/2022 | Yantis et al. |
| 11,334,876 | B2 | 5/2022 | Yantis et al. |
| 11,334,883 | B1 | 5/2022 | Auerbach et al. |
| 11,386,507 | B2 * | 7/2022 | Horesh .................. G06Q 50/01 |
| 11,431,691 | B2 | 8/2022 | Hill et al. |
| 11,488,059 | B2 | 11/2022 | Cella |
| 11,500,972 | B2 | 11/2022 | Goldston et al. |
| 11,522,700 | B1 | 12/2022 | Auerbach et al. |
| 11,538,002 | B2 | 12/2022 | Wang et al. |
| 11,552,799 | B1 | 1/2023 | Parikh |
| 11,556,620 | B2 | 1/2023 | Goldston et al. |
| 11,557,174 | B2 | 1/2023 | Simons |
| 11,562,442 | B2 * | 1/2023 | Smith ................. G06F 16/9024 |
| 11,720,888 | B2 | 8/2023 | Norton et al. |
| 11,720,913 | B2 | 8/2023 | Augustine et al. |
| 11,853,404 | B2 | 12/2023 | Goldston et al. |
| 12,093,942 | B1 | 9/2024 | Auerbach et al. |
| 12,106,360 | B2 * | 10/2024 | Cardenas Gasca .......................... G06Q 20/3674 |
| 12,130,803 | B2 * | 10/2024 | Shin ...................... H04L 9/3236 |
| 12,265,953 | B1 | 4/2025 | Harrison et al. |
| 2001/0049606 | A1 | 12/2001 | Lucarelli |
| 2002/0073015 | A1 | 6/2002 | Chan et al. |
| 2002/0194209 | A1 | 12/2002 | Bolosky et al. |
| 2003/0055754 | A1 | 3/2003 | Sullivan |
| 2003/0065624 | A1 | 4/2003 | James et al. |
| 2003/0220885 | A1 | 11/2003 | Lucarelli et al. |
| 2005/0065871 | A1 | 3/2005 | Gerhart et al. |
| 2005/0246193 | A1 | 11/2005 | Roever et al. |
| 2006/0085314 | A1 | 4/2006 | Grim et al. |
| 2006/0195392 | A1 | 8/2006 | Buerger et al. |
| 2006/0224480 | A1 | 10/2006 | Bent et al. |
| 2007/0061248 | A1 | 3/2007 | Shavit et al. |
| 2007/0094721 | A1 | 4/2007 | Nguyen et al. |
| 2007/0129124 | A1 | 6/2007 | Luchene |
| 2007/0203852 | A1 | 8/2007 | Cameron et al. |
| 2007/0282723 | A1 | 12/2007 | Cohen et al. |
| 2008/0004969 | A1 | 1/2008 | Shniberg et al. |
| 2008/0027786 | A1 | 1/2008 | Davis et al. |
| 2008/0120240 | A1 | 5/2008 | Ginter et al. |
| 2008/0243719 | A1 | 10/2008 | Shavit et al. |
| 2009/0063295 | A1 | 3/2009 | Smith |
| 2009/0063343 | A1 | 3/2009 | Mertz et al. |
| 2009/0164362 | A1 | 6/2009 | Moore |
| 2009/0192891 | A1 | 7/2009 | Titus et al. |
| 2009/0198586 | A1 | 8/2009 | Owen |
| 2009/0234755 | A1 | 9/2009 | Sidoruk |
| 2009/0265270 | A1 | 10/2009 | Gangaraju |
| 2009/0283589 | A1 | 11/2009 | Moore et al. |
| 2010/0005007 | A1 | 1/2010 | Cox et al. |
| 2011/0099099 | A1 | 4/2011 | Rivest et al. |
| 2011/0238530 | A1 | 9/2011 | Shniberg et al. |
| 2012/0005043 | A1 | 1/2012 | Bushinsky |
| 2012/0046779 | A1 | 2/2012 | Pax et al. |
| 2012/0290467 | A1 | 11/2012 | Shenkar et al. |
| 2012/0330798 | A1 | 12/2012 | Fox |
| 2013/0013471 | A1 | 1/2013 | Fishman |
| 2013/0132230 | A1 | 5/2013 | Gibson et al. |
| 2013/0325547 | A1 | 12/2013 | Clark |
| 2014/0244361 | A1 * | 8/2014 | Zhang ................ G06Q 30/0204 705/7.33 |
| 2014/0289386 | A1 | 9/2014 | Vatto et al. |
| 2014/0337189 | A1 | 11/2014 | Barsade et al. |
| 2014/0351105 | A1 | 11/2014 | Hamm |
| 2015/0026072 | A1 | 1/2015 | Zhou et al. |
| 2015/0039444 | A1 | 2/2015 | Hardin et al. |

(56) References Cited

U.S. PATENT DOCUMENTS

2015/0074018 A1 3/2015 Gill et al.
2015/0088753 A1 3/2015 Schueren
2015/0142603 A1 5/2015 Haberman
2015/0170112 A1 6/2015 DeCastro
2015/0310195 A1 10/2015 Bailor et al.
2015/0324764 A1 11/2015 Van Rooyen et al.
2015/0332224 A1 11/2015 Melika et al.
2015/0332256 A1 11/2015 Minor
2015/0363769 A1 12/2015 Ronca et al.
2015/0363777 A1 12/2015 Ronca et al.
2015/0379510 A1 12/2015 Smith
2016/0063429 A1 3/2016 Varley et al.
2016/0071206 A1 3/2016 Danieli
2016/0092988 A1 3/2016 Letourneau
2016/0098723 A1 4/2016 Feeney
2016/0217436 A1 7/2016 Brama
2016/0253651 A1 9/2016 Park et al.
2016/0300234 A1 10/2016 Moss-Pultz et al.
2016/0328705 A1 11/2016 Sebag et al.
2016/0335609 A1 11/2016 Jenkins
2016/0358161 A1 12/2016 Cobban et al.
2016/0358184 A1 12/2016 Radocchia et al.
2017/0005804 A1 1/2017 Zinder
2017/0011460 A1 1/2017 Molinari et al.
2017/0024817 A1 1/2017 Wager et al.
2017/0024818 A1 1/2017 Wager et al.
2017/0057170 A1 3/2017 Gupta et al.
2017/0076366 A1 3/2017 Wadley et al.
2017/0083907 A1 3/2017 McDonough et al.
2017/0085545 A1 3/2017 Lohe et al.
2017/0085555 A1 3/2017 Bisikalo et al.
2017/0091756 A1 3/2017 Stern et al.
2017/0103385 A1 4/2017 Wilson, Jr. et al.
2017/0103468 A1 4/2017 Orsini et al.
2017/0109735 A1 4/2017 Sheng et al.
2017/0109744 A1 4/2017 Wilkins et al.
2017/0116693 A1 4/2017 Rae et al.
2017/0132619 A1 5/2017 Miller et al.
2017/0132633 A1 5/2017 Whitehouse
2017/0169800 A1* 6/2017 Greco ................. G06F 3/04817
2017/0178245 A1 6/2017 Rodkey et al.
2017/0206522 A1 7/2017 Schiatti et al.
2017/0210525 A1 7/2017 Mayer et al.
2017/0213265 A1 7/2017 Masherah et al.
2017/0214522 A1 7/2017 Code et al.
2017/0221029 A1 8/2017 Lund et al.
2017/0221052 A1 8/2017 Sheng et al.
2017/0232300 A1 8/2017 Tran et al.
2017/0236143 A1 8/2017 Code et al.
2017/0249622 A1 8/2017 Ortiz et al.
2017/0345019 A1 11/2017 Radocchia et al.
2017/0351678 A1* 12/2017 Selekman ............. H04L 67/306
2018/0025442 A1 1/2018 Isaacson et al.
2018/0047111 A1 2/2018 Meira et al.
2018/0048735 A1 2/2018 Drouin et al.
2018/0068359 A1 3/2018 Preston et al.
2018/0075421 A1 3/2018 Serrano et al.
2018/0075527 A1 3/2018 Nagla et al.
2018/0078843 A1 3/2018 Tran et al.
2018/0089758 A1 3/2018 Stradling et al.
2018/0091316 A1 3/2018 Stradling et al.
2018/0094953 A1 4/2018 Colson et al.
2018/0096175 A1 4/2018 Schmeling et al.
2018/0114198 A1 4/2018 Ghotbi et al.
2018/0143995 A1 5/2018 Bailey et al.
2018/0144156 A1 5/2018 Marin
2018/0159838 A1 6/2018 Dintenfass
2018/0165612 A1 6/2018 Saxena et al.
2018/0178962 A1 6/2018 Marr et al.
2018/0191503 A1 7/2018 Alwar et al.
2018/0198617 A1 7/2018 Drouin et al.
2018/0204190 A1 7/2018 Moy et al.
2018/0211313 A1 7/2018 Narahari
2018/0218176 A1 8/2018 Voorhees et al.
2018/0218469 A1 8/2018 Lert, Jr. et al.
2018/0322597 A1 11/2018 Sher
2018/0330212 A1 11/2018 Kumar
2018/0343128 A1 11/2018 Uhr et al.
2018/0349485 A1* 12/2018 Carlisle ............... G06F 16/9535
2018/0349893 A1 12/2018 Tsai
2018/0349938 A1 12/2018 Ericson
2018/0365764 A1 12/2018 Nelson
2019/0012660 A1 1/2019 Masters
2019/0019144 A1 1/2019 Gillen
2019/0026711 A1 1/2019 Pinski et al.
2019/0028276 A1 1/2019 Pierce et al.
2019/0043138 A1 2/2019 Blake et al.
2019/0044917 A1 2/2019 Mork et al.
2019/0080392 A1 3/2019 Youb et al.
2019/0080398 A1 3/2019 Jain
2019/0080402 A1 3/2019 Molinari et al.
2019/0081789 A1 3/2019 Madisetti et al.
2019/0087893 A1 3/2019 Pellew
2019/0114609 A1 4/2019 Burton et al.
2019/0114706 A1 4/2019 Bell et al.
2019/0114707 A1 4/2019 McSheehan et al.
2019/0130387 A1 5/2019 Arora et al.
2019/0130399 A1 5/2019 Wright et al.
2019/0130483 A1 5/2019 de Jong
2019/0130484 A1 5/2019 Jong
2019/0130506 A1 5/2019 Walsh
2019/0130701 A1 5/2019 Simons
2019/0156301 A1 5/2019 Bentov et al.
2019/0156938 A1 5/2019 Brunner
2019/0158289 A1 5/2019 Drouin et al.
2019/0164151 A1 5/2019 Doney et al.
2019/0164221 A1 5/2019 Hill et al.
2019/0172026 A1 6/2019 Vessenes et al.
2019/0173854 A1 6/2019 Beck
2019/0188653 A1 6/2019 Khaund
2019/0213564 A1 7/2019 Chan et al.
2019/0220813 A1 7/2019 Madisetti et al.
2019/0220836 A1 7/2019 Caldwell
2019/0222418 A1 7/2019 O'Brien et al.
2019/0228409 A1 7/2019 Madisetti et al.
2019/0228461 A1 7/2019 Domokos et al.
2019/0236594 A1 8/2019 Ehrlich-Quinn
2019/0251078 A1 8/2019 Yan
2019/0266661 A1 8/2019 Moura et al.
2019/0272591 A1 9/2019 Leonard et al.
2019/0278852 A1 9/2019 Jayachandran et al.
2019/0279172 A1* 9/2019 Duffield ................ H04L 9/3239
2019/0279204 A1 9/2019 Norton et al.
2019/0279215 A1 9/2019 Kuchar et al.
2019/0287100 A1 9/2019 Song et al.
2019/0287175 A1 9/2019 Hill et al.
2019/0299105 A1 10/2019 Knight et al.
2019/0303892 A1 10/2019 Yantis et al.
2019/0303926 A1 10/2019 Yantis et al.
2019/0318425 A1 10/2019 Tilley et al.
2019/0333030 A1 10/2019 Ramasamy et al.
2019/0333142 A1 10/2019 Thomas
2019/0340252 A1* 11/2019 Huyghe ................ G06F 16/438
2019/0340609 A1 11/2019 Mayadas et al.
2019/0370792 A1 12/2019 Lam
2019/0385156 A1 12/2019 Liu
2019/0385229 A1 12/2019 Leonard et al.
2019/0392511 A1 12/2019 Mahajan et al.
2019/0392536 A1 12/2019 Rice
2020/0005284 A1 1/2020 Vijayan
2020/0013053 A1 1/2020 Amin
2020/0034457 A1 1/2020 Brody et al.
2020/0038761 A1 2/2020 Packin et al.
2020/0042989 A1 2/2020 Ramadoss et al.
2020/0065802 A1 2/2020 Mathieson et al.
2020/0065847 A1 2/2020 Harrison et al.
2020/0065896 A1 2/2020 Sukumaran et al.
2020/0065899 A1 2/2020 Fritsch et al.
2020/0074429 A1 3/2020 DeRosa-Grund
2020/0097950 A1 3/2020 Thompson
2020/0111078 A1 4/2020 Roennow et al.
2020/0119905 A1 4/2020 Revankar et al.
2020/0133944 A1 4/2020 Yan
2020/0134139 A1 4/2020 Vaish et al.

(56) References Cited

U.S. PATENT DOCUMENTS

| | | | | |
|---|---|---|---|---|
| 2020/0167769 | A1 | 5/2020 | Green | |
| 2020/0184041 | A1 | 6/2020 | Andon et al. | |
| 2020/0184547 | A1 | 6/2020 | Andon et al. | |
| 2020/0219150 | A1 | 7/2020 | Johnston | |
| 2020/0242105 | A1* | 7/2020 | Rich | H04L 9/40 |
| 2020/0250590 | A1 | 8/2020 | Augustine et al. | |
| 2020/0250657 | A1 | 8/2020 | Senter et al. | |
| 2020/0250752 | A1 | 8/2020 | Sugarman | |
| 2020/0252205 | A1* | 8/2020 | Padmanabhan | G06F 16/24564 |
| 2020/0258150 | A1 | 8/2020 | Cononico | |
| 2020/0273048 | A1 | 8/2020 | Andon et al. | |
| 2020/0279249 | A1 | 9/2020 | Ta | |
| 2020/0294011 | A1 | 9/2020 | Robertson et al. | |
| 2020/0320518 | A1 | 10/2020 | Simas et al. | |
| 2020/0327623 | A1 | 10/2020 | Lee | |
| 2020/0334668 | A1 | 10/2020 | Nicli et al. | |
| 2020/0349536 | A1 | 11/2020 | Hertel et al. | |
| 2020/0356991 | A1 | 11/2020 | Saraniecki et al. | |
| 2020/0380090 | A1 | 12/2020 | Marion | |
| 2020/0380476 | A1 | 12/2020 | Trudeau et al. | |
| 2020/0394652 | A1 | 12/2020 | Youb et al. | |
| 2020/0394671 | A1* | 12/2020 | Kurtas | G06Q 20/3821 |
| 2020/0402025 | A1 | 12/2020 | Wang et al. | |
| 2021/0065293 | A1 | 3/2021 | Sigler et al. | |
| 2021/0082044 | A1 | 3/2021 | Sliwka et al. | |
| 2021/0097508 | A1 | 4/2021 | Papanikolas | |
| 2021/0103984 | A1 | 4/2021 | Leonard et al. | |
| 2021/0110469 | A1 | 4/2021 | Ross et al. | |
| 2021/0126794 | A1 | 4/2021 | Forrester et al. | |
| 2021/0133700 | A1 | 5/2021 | Williams et al. | |
| 2021/0133708 | A1 | 5/2021 | Robertson et al. | |
| 2021/0133713 | A1 | 5/2021 | Wang et al. | |
| 2021/0192473 | A1 | 6/2021 | Meehan | |
| 2021/0201336 | A1 | 7/2021 | Mallett et al. | |
| 2021/0201625 | A1 | 7/2021 | Simons | |
| 2021/0248214 | A1 | 8/2021 | Goldston et al. | |
| 2021/0248594 | A1 | 8/2021 | Yantis et al. | |
| 2021/0248653 | A1 | 8/2021 | McKenzie et al. | |
| 2021/0256070 | A1 | 8/2021 | Tran et al. | |
| 2021/0266167 | A1 | 8/2021 | Lohe et al. | |
| 2021/0279305 | A1 | 9/2021 | Goldston et al. | |
| 2021/0279695 | A1 | 9/2021 | Rice | |
| 2021/0281410 | A1 | 9/2021 | Hain | |
| 2021/0312545 | A1 | 10/2021 | Ferreira | |
| 2021/0319430 | A1 | 10/2021 | Yantis et al. | |
| 2021/0326848 | A1 | 10/2021 | Yantis et al. | |
| 2021/0326849 | A1 | 10/2021 | Yantis et al. | |
| 2021/0326850 | A1 | 10/2021 | Yantis et al. | |
| 2021/0326852 | A1 | 10/2021 | Yantis et al. | |
| 2021/0342836 | A1 | 11/2021 | Cella et al. | |
| 2021/0365909 | A1 | 11/2021 | Shiina | |
| 2021/0382966 | A1 | 12/2021 | Shii et al. | |
| 2021/0383379 | A1 | 12/2021 | Choi | |
| 2021/0390196 | A1* | 12/2021 | Lavine | H04L 63/102 |
| 2022/0005023 | A1 | 1/2022 | Angelos et al. | |
| 2022/0027992 | A1 | 1/2022 | Blevins | |
| 2022/0058625 | A1 | 2/2022 | Yantis et al. | |
| 2022/0058632 | A1 | 2/2022 | Yantis et al. | |
| 2022/0067705 | A1 | 3/2022 | Yantis et al. | |
| 2022/0067706 | A1 | 3/2022 | Yantis et al. | |
| 2022/0067707 | A1 | 3/2022 | Yantis et al. | |
| 2022/0067708 | A1 | 3/2022 | Yantis et al. | |
| 2022/0084368 | A1 | 3/2022 | Merati | |
| 2022/0122050 | A1 | 4/2022 | Pacella et al. | |
| 2022/0122062 | A1 | 4/2022 | Mayblum et al. | |
| 2022/0172201 | A1 | 6/2022 | Amin | |
| 2022/0172284 | A1 | 6/2022 | Tarmann et al. | |
| 2022/0173893 | A1 | 6/2022 | Basu et al. | |
| 2022/0180430 | A1 | 6/2022 | Bethune | |
| 2022/0210061 | A1 | 6/2022 | Simu et al. | |
| 2022/0215075 | A1 | 7/2022 | Goldston et al. | |
| 2022/0215076 | A1 | 7/2022 | Goldston et al. | |
| 2022/0215469 | A1 | 7/2022 | Jette et al. | |
| 2022/0222364 | A1* | 7/2022 | Roberts | G06F 21/64 |
| 2022/0230240 | A1 | 7/2022 | Sliwka et al. | |
| 2022/0233959 | A1 | 7/2022 | Tsuda et al. | |
| 2022/0245608 | A1 | 8/2022 | Burchetta | |
| 2022/0253834 | A1 | 8/2022 | Vijayan | |
| 2022/0261882 | A1 | 8/2022 | Youb et al. | |
| 2022/0277275 | A1 | 9/2022 | Housser et al. | |
| 2022/0300926 | A1 | 9/2022 | Marusyk | |
| 2022/0327529 | A1 | 10/2022 | Williams et al. | |
| 2022/0366494 | A1 | 11/2022 | Cella et al. | |
| 2022/0374888 | A1 | 11/2022 | Lackey | |
| 2022/0383303 | A1* | 12/2022 | Mullen | G06Q 20/389 |
| 2023/0036730 | A1 | 2/2023 | Casa | |
| 2023/0043702 | A1 | 2/2023 | Sells et al. | |
| 2023/0054446 | A1 | 2/2023 | LaFever et al. | |
| 2023/0069649 | A1 | 3/2023 | Goldston et al. | |
| 2023/0080927 | A1 | 3/2023 | Padmanabhan | |
| 2023/0111106 | A1* | 4/2023 | Zaarour | G06F 16/252 707/609 |
| 2023/0117430 | A1 | 4/2023 | Quigley et al. | |
| 2023/0117725 | A1 | 4/2023 | Quigley et al. | |
| 2023/0117801 | A1 | 4/2023 | Quigley et al. | |
| 2023/0118213 | A1 | 4/2023 | Quigley et al. | |
| 2023/0118717 | A1 | 4/2023 | Quigley et al. | |
| 2023/0119584 | A1 | 4/2023 | Quigley et al. | |
| 2023/0120636 | A1 | 4/2023 | Toohey et al. | |
| 2023/0120637 | A1 | 4/2023 | Hain | |
| 2023/0123346 | A1 | 4/2023 | Quigley et al. | |
| 2023/0123865 | A1 | 4/2023 | Quigley et al. | |
| 2023/0124608 | A1 | 4/2023 | Quigley et al. | |
| 2023/0129494 | A1 | 4/2023 | Quigley et al. | |
| 2023/0130594 | A1 | 4/2023 | Quigley et al. | |
| 2023/0131603 | A1 | 4/2023 | Quigley et al. | |
| 2023/0153799 | A1 | 5/2023 | Wilson, Jr. et al. | |
| 2023/0169578 | A1 | 6/2023 | Krishna et al. | |
| 2023/0179421 | A1 | 6/2023 | Rojas | |
| 2023/0196341 | A1 | 6/2023 | Quigley et al. | |
| 2023/0206261 | A1 | 6/2023 | Cella et al. | |
| 2023/0206329 | A1 | 6/2023 | Cella et al. | |
| 2023/0214819 | A1* | 7/2023 | Tham | G06Q 50/01 705/64 |
| 2023/0245101 | A1 | 8/2023 | Quigley et al. | |
| 2023/0259982 | A1 | 8/2023 | Landers | |
| 2023/0273980 | A1 | 8/2023 | Goldston et al. | |
| 2023/0274244 | A1 | 8/2023 | Quigley et al. | |
| 2023/0281937 | A1 | 9/2023 | Liu | |
| 2023/0316075 | A1 | 10/2023 | Cella et al. | |
| 2023/0325829 | A1 | 10/2023 | Cella et al. | |
| 2023/0351393 | A1 | 11/2023 | Cella et al. | |
| 2023/0367766 | A1 | 11/2023 | Padmanabhan et al. | |
| 2023/0368189 | A1 | 11/2023 | Ambrose | |
| 2023/0376572 | A1 | 11/2023 | Barba et al. | |
| 2024/0005409 | A1 | 1/2024 | Doney | |
| 2024/0037668 | A1 | 2/2024 | Leise et al. | |
| 2024/0152893 | A1 | 5/2024 | Northrop | |
| 2024/0261692 | A1 | 8/2024 | Sliwka et al. | |
| 2025/0156828 | A1 | 5/2025 | Sliwka et al. | |

FOREIGN PATENT DOCUMENTS

| | | | |
|---|---|---|---|
| CA | 3055829 | A1 | 9/2018 |
| CA | 3113389 | C | 4/2019 |
| CA | 3118593 | A1 | 5/2020 |
| CA | 3038090 | A1 | 9/2020 |
| CN | 106682983 | A | 5/2017 |
| CN | 107292735 | A | 10/2017 |
| CN | 108062671 | A | 5/2018 |
| CN | 108335206 | A | 7/2018 |
| CN | 108711040 | A | 10/2018 |
| CN | 108768666 | A | 11/2018 |
| CN | 110060145 | A | 7/2019 |
| CN | 110860090 | A | 3/2020 |
| CN | 110135819 | A | 6/2021 |
| CN | 114616582 | A | 6/2022 |
| EP | 3540662 | A1 | 9/2019 |
| EP | 3564884 | A1 | 11/2019 |
| GB | 2572339 | A | 10/2019 |
| GB | 2597409 | A | 1/2022 |
| JP | 2018173692 | A | 11/2018 |
| JP | 2019004463 | A | 1/2019 |
| JP | 2019083013 | A | 5/2019 |

(56) References Cited

FOREIGN PATENT DOCUMENTS

| | | | |
|---|---|---|---|
| JP | 2019160312 | A | 9/2019 |
| JP | 2023167674 | A | 11/2023 |
| JP | 3245291 | U | 1/2024 |
| KR | 20180108566 | A | 10/2018 |
| KR | 20190101625 | A | 9/2019 |
| KR | 102100457 | B1 | 4/2020 |
| WO | 2005048159 | A1 | 5/2005 |
| WO | 2007017874 | A2 | 2/2007 |
| WO | 2012150491 | A1 | 11/2012 |
| WO | 2012166790 | A1 | 12/2012 |
| WO | 2015150749 | A1 | 10/2015 |
| WO | 2017011601 | A1 | 1/2017 |
| WO | 2017178956 | A1 | 10/2017 |
| WO | 2018009973 | A1 | 1/2018 |
| WO | 2018019364 | A1 | 2/2018 |
| WO | 2018020389 | A2 | 2/2018 |
| WO | 2018154489 | A1 | 8/2018 |
| WO | 2018165472 | A1 | 9/2018 |
| WO | 2018189658 | A1 | 10/2018 |
| WO | 2018209148 | A1 | 11/2018 |
| WO | 2019104250 | A1 | 5/2019 |
| WO | 2019144234 | A1 | 8/2019 |
| WO | 2019169374 | A1 | 9/2019 |
| WO | 2019191687 | A1 | 10/2019 |
| WO | 2020092900 | A2 | 5/2020 |
| WO | 2020123464 | A1 | 6/2020 |
| WO | 2020198409 | A1 | 10/2020 |
| WO | 2020226800 | A1 | 11/2020 |
| WO | 2020232012 | A1 | 11/2020 |
| WO | 2021046494 | A1 | 3/2021 |
| WO | 2021054989 | A1 | 3/2021 |
| WO | 2022159519 | A1 | 7/2022 |
| WO | 2022204041 | A1 | 9/2022 |
| WO | 2022224585 | A1 | 10/2022 |

OTHER PUBLICATIONS

F. Victor, P. Ruppel and A. Kupper, "A Taxonomy for Distributed Ledger Analytics," in Computer, vol. 54, No. 2, pp. 30-38, Feb. 2021, doi: 10.1109/MC.2020.3017466 (Year: 2020).*

Archontakis, K., "The Six Dragons Reveal Mind-Blowing Crafting on the Blockchain," The Wayback Machine, https://web.archive.org/web/20201026183409/https://egamers.io/the-six-dragons-reveal-mind-blowing-crafting-on-the-blockchain, Nov. 2019, 3 pages.

Extended European Search Report dated May 12, 2025 for EP Application No. 22756906.8, 7 pages.

Atkinson, J., "What are NFT events and how do they work?" Dec. 2023, 6 pages, https://jeffreyatkinson209.medium.com/what-are-nft-events-and-how-do-they-work-fbf67b786db9#:~:text=NFT%20events%20serve%20as%20a,their%20digital%20creations%20through%20NFTs.

Banon, J. et al., "Boson Protocol White Paper Decentralized Autonomous Commerce," WhitePaper Version 1.1, Nov. 2020, 50 pages.

Binance Academy, "What Are NFT Games and How Do They Work," The Wayback Machine, Sep. 2021, https://web.archive.org/web/20211010111916/https://academy.binance.com/en/articles/what-are-nft-games-and-how-do-they-work, 9 pages.

Binance Blog: What Is NFT Ticketing and How Does It Work? Jun. 2022, https://www.binance.com/en/blog/nft/what-is-nft-ticketing-and-how-does-it-work-421499824684904022, 3 pages.

Blocknative, "Lessons from a Pioneer in the NFT Game Ecosystem: A Brave New World for Indie Dapp Devs," blocknative, https://www.blocknative.com/blog/gu-cards, Oct. 2019, 5 pages.

Brenn, "Noobs Guide to Understanding ERC-20 vs ERC-721 Tokens," Mar. 25, 2018, https://brennhill.medium.com/noobs-guide-to-understanding-erc-20-vs-erc-721-tokens-d7f5657a4ee7, 4 pages.

Bruschi, F. et al., "A Decentralized System for Fair Token Distribution and Seamless Users Onboarding," IEEE, 2020, 6 pages.

Builtin.com, "What is Blockchain?", Aug. 7, 2018, Retrieved online Sep. 5, 2021, https://builtin.com/blockchain, 53 pages.

Buleen, C., "Is iOS AirDrop Marketing a Creepy Tactic or a Unique Opportunity?" Jun. 20, 2018, https://resources.clearvoice.com/blog/is-ios-airdrop-marketing-a-creepy-tactic-or-a-unique-opportunity, 14 pages.

Chan, A., "UTXO in Digital Currencies: Account-based or Token-based? or Both?," arXiv, Sep. 2021, pp. 1-21.

Chevet, S., "Blockchain Technology and Non-Fungible Tokens: Reshaping Value Chains in Creative Industries," May 10, 2018, https://ssrn.com/abstract=3212662 or http://dx.doi.org/10.2139/ssrn.3212662, 73 pages.

Christidis, K. et al., "Blockchains and Smart Contracts for the Internet of Things," IEEE Access, vol. 4, May 2016, pp. 2292-2303.

Crowdfunding Writing with NFTs [retrieved from internet on Jul. 8, 2022] published on Apr. 19, 2021 as per Wayback Machine, 10 pages.

Dhar, S. et al., "Smarter banking: Blockchain technology in the Indian Banking System," Asian Management Insights, vol. 3, No. 2, Nov. 2016, pp. 46-53.

Di Stasi, G. et al., "Routing Payments on the Lightning Network," 2018 IEEE Confs on Internet of Things, Green Computing Communications, Cyber, Physical and Social Computing, Smart Data, Blockchain, Computer and Information Technology, Congress on Cybermatics, Jul. 2018, pp. 1161-1170.

Entriken, W. et al., "EIP-721: ERC-721 Non-Fungible Token Standard," Ethereum Improvement Proposals, No. 721, Jan. 2018, https://eips.ethereum.org/EIPS/eip-721, 11 pages.

Entriken, W. et al., "EIP-721: Non-Fungible Token Standard," Jan. 24, 2018, retrieved online Sep. 5, 2021 https://eips.ethereum.org/EIPS/eip-721, 14 pages.

Extended European Search Report dated Dec. 6, 2021 for European Patent Application No. 19775523.4, 10 pages.

Extended European Search Report dated Dec. 8, 2021 for European Patent Application No. 19776576.1, 10 pages.

Extended European Search Report dated Jul. 12, 2022 for EP Application No. 19887239.2, 6 pages.

Extended European Search Report dated Jun. 27, 2023 for EP Application No. 20867151.1, 10 pages.

Extended European Search Report dated Jun. 28, 2022 for EP Application No. 19879849.8, 6 pages.

Flynn, B., "Crafting New Value with Existing Tokens," medium.com, https://medium.com/@brianubiquik/crafting-new-value-with-existing-tokens-de95fe838fea, Jun. 6, 2018, 10 pages.

Frankenfield, J., "Cryptocurrency Airdrop," WayBack Machine, Jun. 24, 2021, https://web.archive.org/web/20210730071512/https://www.investopedia.com/terms/a/airdrop-cryptocurrency.asp, 6 pages.

Fukumitsu, M. et al., "A Method for a Practical Smart Contract by using Blockchain and Centralized Server," IPSJ SIG Technical Report, 2018, 9 pages.

GIGCO Ltd., Web3 Live Music Revolution, https://gigco-global.ams3.cdn.digitaloceanspaces.com/docs/GIGCO_LITEPAPER%20.pdf, 2024, 26 pages.

Hackernoon, "NFT Renting: For When You Want to Give Your NFTs DeFi Powers," The Wayback Machine, Jan. 7, 2022, https://web.archive.org/web/20220107140320/https://hackernoon.com/nft-renting-for-when-you-want-to-give-your-nfts-defi-powers, 6 pages.

Hong, S. et al., "FabAsset: Unique Digital Asset Management System for Hyperledger Fabric," 2020 IEEE 40th International Conference on Distributed Computing Systems (ICDCS), IEEE, 2020, pp. 1269-1274.

Hoogendoorn, R., "The Six Dragons NFT Extends to Crafting Simulator—Play to Earn," Published: Jan. 11, 2021, https://www.playtoearn.online/2021/01/11/the-six-dragons-nft-extends-to-crafting-simulator/, 3 pages.

Jerseyloco Whitepaper NFT's, Aug. 2023, https://jerseyloco.com/wp-content/uploads/2020/02/Whitepaper-NFT-08.pdf, 33 pages.

Khan, M. et al., "A Tamper-Resistant Digital Token-Based Rights Management System," IEEE, 2017 International Carnahan Conference on Security Technology (ICCST), 2017, 6 pages.

Klems, M. et al., "Trustless Intermediation in Blockchain-Based Decentralized Service Marketplaces," ICSOC 2017, LNCS 10601, Oct. 2017, pp. 731-739, https://doi.org/10.1007/978-3-319-69035-3_53.

(56) References Cited

OTHER PUBLICATIONS

Kryvoborodov, Y., "Why NFT Ticketing Is a New Normal for Event Management," Jan. 2023, https://unicsoft.com/blog/why-nft-ticketing-is-a-new-normal-for-event-managment/, 13 pages.
Lauslahti, K. et al., "Smart Contracts—How will Blockchain Technology Affect Contractual Practices?" ETLA Reports, No. 68, Jan. 2017, 32 pages.
Li, H. et al., "How People Select Their Payment Methods in Online Auctions? An Exploration of eBay Transactions," Proceedings of the 37th Hawaii International Conference on System Sciences, 2004, pp. 1-10.
LuxFi Official, "Real-World Asset-Backed NFTs—What Does it Mean?" Sep. 28, 2021, https://luxfiofficial.medium.com/real-world-asset-backed-nfts-what-does-it-mean-5c95e41d88d3, 14 pages.
Mai, J. et al., "Customized production based on distributed 3D printing services in cloud manufacturing," Int J Adv Manuf Technol, 2016, vol. 84, pp. 71-83.
Menezes, A.J. et al., "Handbook of Applied Cryptography," CRC Press, Dec. 1996, 30 pages.
Mihuandayani, et al., "Text Mining Based on Tax Comments as Big Data Analysis Using SVM and Feature Selection," 2018 International Conference on Information and Communications Technology (ICOIACT), 2018, pp. 537-542.
NFTs for Events: Should You Embrace Them? https://www.proglobalevents.com/blog/nft-events/ 2024, 11 pages.
Ogiela, M.R. et al., "Security of Distributed Ledger Solutions Based on Blockchain Technologies," 2018 IEEE 32nd International Conference on Advanced Information Networking and Applications, 2018, pp. 1089-1095.
PCT International Search Report and Written Opinion dated Aug. 21, 2020 for International Application No. PCT/US2019/059389, 20 pages.
PCT International Search Report and Written Opinion dated Feb. 5, 2020 for International Application No. PCT/US2019/062673, 10 pages.
PCT International Search Report and Written Opinion dated Jan. 8, 2021 for International Application No. PCT/US2020/052728, 11 pages.
PCT International Search Report and Written Opinion dated Jul. 1, 2022 for International Application No. PCT/US2022/016749, 17 pages.
PCT International Search Report and Written Opinion dated Jun. 21, 2022 for International Application No. PCT/US2022/021745, 20 pages.
PCT International Search Report and Written Opinion dated Jun. 26, 2019 for PCT International Application No. PCT/US2019/025003, 7 pages.
PCT International Search Report and Written Opinion dated Jun. 28, 2019 for PCT International Application No. PCT/US2019/025002, 6 pages.
PCT International Search Report and Written Opinion dated Jun. 30, 2023 for International Application No. PCT/US2023/014961, 16 pages.
PCT International Search Report and Written Opinion mailed Apr. 18, 2023 for International Application No. PCT/US2022/047396, 25 pages.
pink.gg, "Atomic Assets 1.0—Launching the AtomicHub," https://pinkgg.medium.com/atomicassets-1-0-launching-the-atomichub-493c9242c1ff, Jun. 2020, 9 pages.
Radomski, W. et al., "EIP-1155: ERC-1155 Multi Token Standard," Ethereum Improvement Proposals, No. 1155, Jun. 2018, https://eips.ethereum.org/EIPS/eip-1155, 18 pages.
Rajendran, B. et al., "Secure and Privacy Preserving Digital Payment," IEEE SmartWorld, Ubiquitous Intelligence & Computing, Advanced & Trusted Computed, Scalable Computing & Communications, Cloud & Big Data Computing, Internet of People and Smart City Innovation, 2017, 5 pages.
Ray, J., "A Next-Generation Smart Contract and Decentralized Application Platform," Ethereum Whitepaper, The Wayback Machine—https://web.archive.org/web/20180919085323/https://github.com/ethereum/wiki/wiki/White- Paper#messages-and-transactions, 2018, 40 pages.
Regner, F. et al., "NFTs in Practice—Non-Fungible Tokens as Core Component of a Blockchain-based Event Ticketing Application," Fortieth International Conference on Information Systems, Munich, 2019, 17 pages.
Salt Technology Ltd., "SALT: Blockchain-Backed Loans," CRUSHCRYPTO, Sep. 8, 2017, https://crushcrypto.com/wp-content/uploads/2017/08/SALT-abstract.pdf, 18 pages.
Sankrit, K., "What are NFT Tickets? How NFT ticketing could disrupt entertainment," Jan. 2024, https://www.moonpay.com/learn/nft/nft-ticketing, 13 pages.
Schneier, B., "Applied Cryptography, Second Edition—Protocols, Algorithms, and Source Code in C," 20th Anniversary Edition, John Wiley & Sons, Inc., 1996, 31 pages.
Sedlak, K. et al., "Oxcert Protocol Whitepaper 0.4 (draft)," Jul. 5, 2018, 59 pages.
Shrier, D. et al., "Blockchain & Transactions, Markets and Marketplaces," Massachusetts Institute of Technology, May 2016, https://www.getsmarter.com/blog/wp-content/uploads/2017/07/mit_blockchain_transactions_reports.pdf, 18 pages.
Singapore Search Report and Written Opinion dated Apr. 17, 2023 for SG Application No. 11202104293R, 11 pages.
Singapore Search Report and Written Opinion dated Apr. 20, 2023 for SG Application No. 11202105350Q, 9 pages.
Song, I., "Collateral in Loan Classification and Provisioning," IMF Working Paper, Jul. 2002, 25 pages.
Swannack, R.A., "Using Blockchain for Digital Card Game," EWU Digital Commons, 2020, 77 pages.
The Sandbox Whitepaper [retrieved from the internet on May 24, 2022], , published on Oct. 29, 2020 as per Wayback Machine, 43 pages.
Thirdweb, "Build web3 apps, easily," The Wayback Machine, Nov. 2021, https://web.archive.org/web/20211127040049/https://thirdweb.com/, 6 pages.
Truffle, "Smart Contracts Made Sweeter," The Wayback Machine, Dec. 2020, https://web.archive.org/web/20201201085449/https://www.trufflesuite.com/truffle, 2 pages.
Tsagkarakis, G., "The Six Dragons Reveal Mind-Blowing Crafting on The Blockchain," egamers.io, https://egamers.io/the-six-dragons-reveal-mind-blowing-crafting-on-the-blockchain/, Nov. 2019, 5 pages.
Virk, R., "The One Thing Missing from the ERC 721 Standard for Digital Collectibles on the Blockchain," Sep. 2, 2018, https://medium.com/hackernoon/the-one-thing-missing-from-erc-721-standard-for-digital-collectibles-on-the-blockchain-9ee26e4a918c, 7 pages.
Westerkamp, M. et al., "Blockchain-Based Supply Chain Traceability: Token Recipes Model Manufacturing Processes," Aug. 2018, Retrieved online Sep. 5, 2021 https://www.researchgate.net/publication/326901585_Blockchain-Based_Supply_Chain_Traceability_Token_Recipes_Model_Manufacturing_Processes, 9 pages.
Yang, J. et al., "A calculation model for the serviceable evaluation of user online comment," 2015 IEEE International Conference on Smart City/SocialCom/SustainCom together with DataCom 2015 and SC2 2015, 2015, pp. 1117-1121.
Your Events Guy: The Top 5 Event Technology Trends That Will Transform Events in 2022, Jun. 2022, https://youreventsguy.wordpress.com, 72 pages.
Zimmerman, B., "How The World of NFTs Could Be the Next Big Thing for Advertising," Forbes Business Council, May 7, 2021, https://www.forbes.com/sites/forbesbusinesscouncil/2021/05/07/how-the-world-of-nfts-could-be-the-next-big-thing-for-advertising/?sh=4b264a044912, 5 pages.
Singapore Search Report dated Feb. 24, 2025 for Singapore Patent Application No. 11202203114T, 3 pages.
Singapore Written Opinion dated Mar. 4, 2025 for Singapore Patent Application No. 11202203114T, 7 pages.
Bachmann, S. et al., "Design and Prototypical Implementation of Blockchain Ticketing," University of Zurich, Jan. 25, 2021, 133 pgs, https://www.csq.uzh.ch/publications/details.php?id=1423.
Extended European Search Report dated Jan. 3, 2025 for EP Application No. 22776654.0, 4 pages.

(56) References Cited

OTHER PUBLICATIONS

Extended European Search Report dated Jun. 27, 2025 for EP Application No. 22884516, 7 pages.
Wu, S.X. et al., "Community Detection in Blockchain Social Networks," arXiv:2101.06406v1 [cs.SI], Jan. 2021, 11 pages.

* cited by examiner

| | NFT Name | NFT Owner | NFT ID | Mint Number | NFT Media Assets | Template ID | ... |
|---|---|---|---|---|---|---|---|
| 3142A | NFT A | Account A | Unique ID A | 1 | IPFS link A | Template A | |
| 3142B | NFT A | Crafting Smart Contract | Unique ID B | 2 | IPFS link B | Template A | |
| 3142C | NFT A | Account B | Unique ID C | 3 | IPFS link C | Template A | |
| 3142D | NFT A | Crafting Smart Contract | Unique ID D | 4 | IPFS link D | Template A | |
| | ... | | | | | | |
| 3142E | NFT B | Account C | Unique ID E | 1 | IPFS Link E | Template B | |
| 3142F | NFT B | Minting Smart Contract | Unique ID F | 2 | IPFS Link F | Template B | |
| 3142G | NFT B | Account A | Unique ID G | 3 | IPFS Link G | Template B | |
| | ... | | | | | | |
| 3144A | NFT C (30-pack collection) | Unboxing Smart Contract | Unique ID H | 1 | IPFS Link H | Template C | |
| 3144B | NFT C (30-pack collection) | Account A | Unique ID I | 2 | IPFS Link I | Template C | |
| | ... | | | | | | |

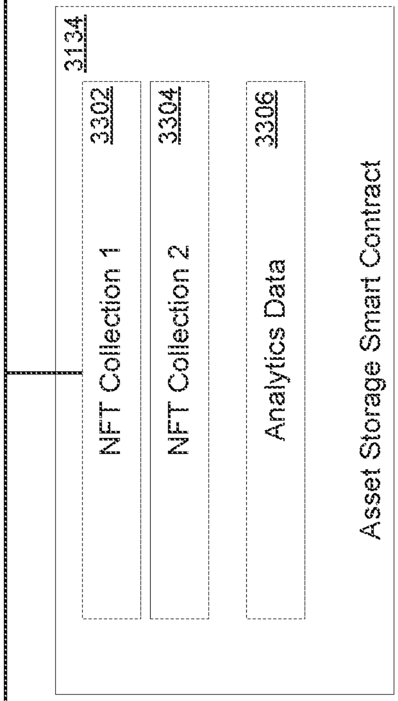

FIG. 33

4200

| TX | Date | Action | Data |
|---|---|---|---|
| 4ff23252 | Jan 27, 2022 12:52:52 PM | preminl.nft - mint | 4202<br>**collection_name**: amcinvestor<br>**memo**: giftcode<br>**quantity**: 1<br>**rng_seed**: 12427044535076329948<br>**schema_name**: series1<br>**template_id**: 408665<br>**to**: bfoma.c.wam |
| 4ff23252 | Jan 27, 2022 12:52:52 PM | **Send Token** | 4204<br>**asset_ids**: 1099603878382<br>**from**: premint.nft<br>**memo**: giftcode<br>**to**: bfoma.c.wam |

FIG. 42

4500

| TX | Date | Action | Data | |
|---|---|---|---|---|
| 6e1e8c10 | Jan 27, 2022 01:10:25 PM | Receive Token | asset_ids: 1099567730416<br>from: tixfu.wam<br>memo: open pack<br>to: unbox.nft | 4502 |
| 6e1e8c10 | Jan 27, 2022 01:10:25 PM | unbox.nft - unbox | box_id: 295134<br>collection_name: maiden.funko<br>from: tixfu.wam | 4504 |
| 6e1e8c10 | Jan 27, 2022 01:10:25 PM | boost.wax - boost | cpu: 10.00000000 WAX<br>from: unbox.nft<br>net: 5.00000000 WAX<br>to: tixfu.wam | 4506 |
| 6e1e8c10 | Jan 27, 2022 01:10:25 PM | atomicassets - burnasset | asset_id: 1099567730416<br>asset_owner: unbox.nft | 4508 |
| 6e1e8c10 | Jan 27, 2022 01:10:25 PM | orng.wax - requestrand | assoc_id: 1099567730416<br>caller: unbox.nft<br>signing_value: 6985604437980049493 | 4510 |
| e41f3fd8 | Jan 27, 2022 01:10:25 PM | unbox.nft - receiver and | assoc_id: 1099567730416<br>random_value: 3de0661463310146 | 4512 |
| e41f3fd8 | Jan 27, 2022 01:10:25 PM | unbox.nft - logunbox | assoc_id: 1099567730416<br>collection_name: maiden.funko<br>unboxer: tixfu.wam | 4514 |
| d323174a | Jan 27, 2022 01:10:29 PM | unbox.nft - claim | assoc_id: 1099567730416<br>collection_name: maiden.funko<br>memo: tixfu.wam | 4516 |
| d323174a | Jan 27, 2022 01:10:29 PM | premint.nft - mint | collection_name: maiden.funko<br>memo: unboxing<br>quantity: 1<br>rng_seed: 5627159501986248498<br>schema_name: series1.drop<br>template_id: 295157<br>to: tixfu.wam | 4518 |

FIG. 45

4800

| TX | Date | Action | Data | |
|---|---|---|---|---|
| 3f7ec35e | Jan 27, 2022 02:13:01 PM | Receive Token | asset_ids:<br>1099619475785<br>1099516648274<br>from: hcmb.wam<br>memo: cardlab craft<br>to: craft.nft | 4802 |
| 3f7ec35e | Jan 27, 2022 02:13:01 PM | craft.nft - craft | collection_name: stf.capcom<br>from: hcmb.wam<br>recipe_id: 100503 | 4804 |
| 3f7ec35e | Jan 27, 2022 02:13:01 PM | boost.wax - boost | cpu: 10.00000000 WAX<br>from: craft.nft<br>net: 5.00000000 WAX<br>to: hcmb.wam | 4806 |
| 3f7ec35e | Jan 27, 2022 02:13:01 PM | atomicassets - burnasset | asset_id:1099516648274<br>asset_owner: craft.nft | 4808 |
| 3f7ec35e | Jan 27, 2022 02:13:01 PM | atomicassets - burnasset | asset_id:1099619475785<br>asset_owner: craft.nft | 4810 |
| 3f7ec35e | Jan 27, 2022 02:13:01 PM | orngwax - requestrand | assoc_id:1099619475785<br>caller: craft.nft<br>signing_value: 1975352228255061274 | 4812 |
| bb98dd70 | Jan 27, 2022 02:13:01 PM | craft.nft - receiverand | assoc_id:1099619475785<br>random_value:2sa64d98a1d6afv98ga4a3dfv13da | 4814 |
| bb98dd70 | Jan 27, 2022 02:13:01 PM | craft.nft - logocraft | assoc_id:1099619475785<br>collection_name: stf.capcom<br>crafter:hcmb.wam | 4816 |
| 41fbbe2a | Jan 27, 2022 02:13:04 PM | craft.nft - claim | assoc_id:1099619475785<br>collection_name: stf.capcom<br>from:hcmb.wam | 4818 |
| 41fbbe2a | Jan 27, 2022 02:13:04 PM | premint.nft - mint | collection_name: stf.capcom<br>memo: crafting<br>quantity: 1<br>rng_seed: 8169163214142926859<br>schema_name: series1<br>template_id: 53964<br>to: hcmb.wam | 4820 |

FIG. 48

SYSTEMS AND METHODS FOR CRAWLING AND ANALYZING DISTRIBUTED LEDGER DATA

PRIORITY CLAIM

This application is a continuation of PCT International Application No. PCT/US2022/047396, filed Oct. 21, 2022, which claims the benefit of U.S. Provisional Application Nos. 63/270,893, filed Oct. 22, 2021 and 63/318,495, filed Mar. 10, 2022. The entire disclosures of the above applications are incorporated by reference.

FIELD

The present disclosure relates in part to systems, methods, and architectures for crawling, processing, analyzing, and enriching distributed ledger data from one or more distributed ledger (e.g., blockchain) networks. The disclosure also relates to techniques for transmitting advertisements via a distributed ledger network. The disclosure further relates to techniques for securing token-based transactions in decentralized digital marketplaces.

BACKGROUND

Conventional distributed ledger technologies, including blockchain technologies, are primitive in many respects. Blockchains may comprise a large volume of transactions extending back for a long period of time, which limits the use of distributed ledger applications that depend on large scale data processing of distributed ledger data. Additionally, the transaction data is often anonymized, making use cases that depend on user personalization, targeting, or customization difficult to implement. This problem only compounds for applications that wish to use data from multiple blockchains or distributed ledgers. Moreover, different blockchains and other distributed ledgers may store transaction data in various formats, making the use of data obtained from multiple distributed ledgers difficult.

Additionally, although conventional distributed ledger technologies may provide for trustless transactions involving on-chain tokens, significant risk still exists when the on-chain tokens are linked to off-chain assets. For example, blockchains do not provide mechanisms for verifying a link between an on-chain token and an off-chain asset, but instead leave this function to third parties, thereby offloading trust and increasing risk when transactions involve such tokens.

SUMMARY

According to some embodiments of the present disclosure, a method for processing distributed ledger data is disclosed. The method includes receiving, by a tokenization platform, transaction data for a plurality of distributed ledger transactions, wherein each distributed ledger transaction indicates a respective distributed ledger account associated with an initiator of the distributed ledger transaction and a respective distributed ledger account associated with a receiver of the distributed ledger transaction, wherein the transaction data is received from a distributed ledger node. The method further includes processing, by the tokenization platform, the transaction data by converting one or more attributes of each distributed ledger transaction into a standardized format. The method further includes storing the standardized format transaction data in a data lake maintained by the tokenization platform. The method further includes supplementing the data lake maintained by the tokenization platform with social media data by identifying one or more social media accounts that correspond to one or more distributed ledger accounts and storing data linking the social media accounts to their corresponding distributed ledger accounts in the data lake maintained by the tokenization platform. The method further includes generating, by the tokenization platform, a social graph including a plurality of entities linked by relationships, wherein each of the plurality of entities corresponds to a record in the data lake, wherein the plurality of entities include: a first entity corresponding to a distributed ledger token; a second entity corresponding to a distributed ledger account; and a third entity corresponding to a social media account. The method further includes providing, to a device, data obtained from the social graph.

In some embodiments, providing the data obtained from the social graph comprises providing the data to a clustering system configured to cluster the data to identify clusters of distributed ledger accounts associated with similar distributed ledger transactions. In some of these embodiments, the clusters include a first cluster identifying a first plurality of wallets operated by a first set of users that frequently interact with a first type of token on the distributed ledger and a second cluster identifying a second plurality of wallets operated by a second set of users that frequently interact with a second type of token. Additionally or alternatively, the method further includes generating, by the tokenization platform, a social feed for a first cluster of distributed ledger accounts; and transmitting the social feed to a plurality of devices associated with the first cluster. In some of these embodiments, transmitting the social feed comprises: using the social graph to identify a social media account corresponding to a first distributed ledger account in the first cluster; and transmitting the social media feed to the social media account. Additionally or alternatively, transmitting the social feed comprises transmitting the social media feed to a cloud wallet service that provides a first distributed account in the first cluster. Additionally or alternatively, the method further includes generating a recommendation for a first cluster of distributed ledger accounts; and transmitting the recommendation to a plurality of devices associated with the first cluster. Additionally or alternatively, the method further includes generating, by the tokenization platform, a recommendation for a first cluster of distributed ledger accounts; and transmitting the recommendation to a plurality of devices associated with the first cluster. Additionally or alternatively, the method further includes generating, by the tokenization platform, a social community for a first cluster of distributed ledger accounts; and transmitting a notification indicating the social community to a plurality of devices associated with the first cluster.

In some embodiments, providing the data obtained from the social graph comprises providing the data to a clustering system configured to cluster the data to identify clusters of tokens associated with similar distributed ledger transactions. In some of these embodiments, the tokens are non-fungible tokens.

In some embodiments, providing the data obtained from the social graph comprises providing the data to a clustering system configured to cluster the data to identify clusters of token collections associated with similar distributed ledger transactions. In some of these embodiments, the clusters include a first cluster identifying a first plurality of token collections associated with a first type of distributed application on the distributed ledger and a second cluster identifying a second plurality of token collections associated with a second type of distributed application on the distributed ledger.

In some embodiments, providing the data obtained from the social graph comprises providing the data to a data browser configured to allow a user to interactively browse the social graph. Additionally or alternatively, the method further includes, prior to generating the social graph, performing a data cleaning process on the data lake maintained by the tokenization platform, wherein the data cleaning process comprises converting raw data into data in a structured format.

In some embodiments, receiving the transaction data comprises receiving a plurality of blockchain blocks responsive to one or more requests from the tokenization platform to the distributed ledger node, wherein the distributed ledger node is a blockchain node. In some of these embodiments, the one or more requests comprise a first request for an origin block of the blockchain, a second request for a second block that includes a cryptographic link to the origin block, and a third request for a third block that includes a cryptographic link to the second block.

In some embodiments, the social graph includes a relationship between the first entity and the second entity, wherein the relationship indicates that the distributed ledger account owns the distributed ledger token. Additionally or alternatively, the social graph includes a relationship between the first entity and the second entity, wherein the relationship indicates that the distributed ledger account formerly owned the distributed ledger token. Additionally or alternatively, the social graph includes a relationship between the second entity and the third entity, wherein the relationship indicates that the social media account is owned by a user that owns that distributed ledger account.

According to some embodiments of the present disclosure, a method for advertising using non-fungible token (NFT) advertisements on a distributed ledger is disclosed. The method includes determining, by a tokenization platform, a plurality of distributed ledger wallets to receive a targeted advertisement, wherein each of the plurality of wallets has a unique address on a distributed ledger and is determined based on an ad campaign configuration. The method further includes configuring, by the tokenization platform, a smart contract on the distributed ledger using a plurality of smart contract parameters, wherein the smart contract parameters configure the smart contract to mint a plurality of NFT advertisements. The method further includes storing, by the tokenization platform, advertising media data on a distributed storage medium, wherein the advertising media data includes the targeted advertisement. The method further includes initiating, by the tokenization platform, one or more distributed ledger transactions that mint the plurality of NFT advertisements using the configured smart contract, wherein each of the NFT advertisements includes an attribute comprising a hash of the advertising media data stored on the distributed storage medium, wherein the plurality of NFT advertisements are at least equal in number to the plurality of distributed ledger wallets. The method further includes initiating, by the tokenization platform, a distributed ledger transaction for each distributed ledger wallet of the plurality of distributed ledger wallets, wherein the distributed ledger transaction transfers an NFT advertisement to the corresponding distributed ledger wallet using the unique address of the corresponding distributed ledger wallet.

In some embodiments, determining the plurality of distributed ledger wallets to receive a targeted advertisement comprises receiving a plurality of clusters of distributed ledger wallets from a clustering system configured to cluster distributed ledger data to identify clusters of distributed ledger wallets based on digital attributes corresponding to respective distributed ledger wallets obtained at least in part from the distributed ledger; and selecting at least one of the plurality of clusters. In some of these embodiments, the clustering system is part of the tokenization platform. In some of these embodiments, the clustering system clusters data obtained from a social graph, wherein the social graph includes a plurality of entities linked by relationships, wherein the plurality of entities includes distributed ledger token entities and distributed ledger wallet entities. In some of these embodiments, the social graph includes relationships between a subset of the distributed ledger token entities and a subset of the distributed ledger wallet entities, wherein each relationship indicates that the respective distributed ledger wallet owns the respective distributed ledger token. In some of these embodiments, the distributed ledger token entities include fungible tokens. Additionally or alternatively, the distributed ledger token entities include non-fungible tokens. Additionally or alternatively, the social graph includes relationships between a subset of the distributed ledger token entities and a subset of the distributed ledger wallet entities, wherein each relationship indicates that the respective distributed ledger account used to own the respective distributed ledger token.

In some embodiments, determining the plurality of distributed ledger wallets to receive a targeted advertisement comprises viewing a plurality of distributed ledger wallets via a data browser configured to browse a social graph including a plurality of entities linked by relationships, wherein the plurality of entities include distributed ledger token entities and distributed ledger wallet entities; and selecting a plurality of distributed ledger wallet entities using the data browser.

In some embodiments, determining the plurality of distributed ledger wallets to receive a targeted advertisement comprises generating targeting parameters specifying one or more criteria for targeting a distributed ledger wallet; configuring a distributed ledger crawler system to monitor the distributed ledger for transactions that meet the one or more criteria; and receiving a plurality of notifications from the distributed ledger crawler system, wherein each notification indicates a respective transaction that meets the one or more criteria and a wallet associated with the respective transaction. In some of these embodiments, the distributed ledger crawler system is part of the tokenization platform. In some of these embodiments, the distributed ledger crawler system is configured to receive new transaction data from a distributed ledger node and to preprocess the new transaction data to detect transactions that meet the one or more criteria. Additionally or alternatively, the one or more criteria comprise an attribute of a distributed ledger token, wherein a respective transaction meets the one or more criteria when the wallet associated with the respective transaction purchases the distributed ledger token. Additionally or alternatively, the one or more criteria comprise an attribute of a distributed ledger token, wherein a respective transaction meets the one or more criteria when the wallet associated with the respective transaction redeems the distributed ledger token. Additionally or alternatively, the one or more criteria comprise an attribute of a distributed ledger token, wherein a respective transaction meets the one or more criteria when the wallet associated with the respective transaction sells the distributed ledger token.

In embodiments, determining the plurality of distributed ledger wallets to receive a targeted advertisement comprises determining a relevance score for each of a first set of distributed ledger wallets; and selecting the plurality of distributed ledger wallets, wherein each of the plurality of distributed ledger wallets is associated with a high relevance score. Additionally or alternatively, determining the plurality of distributed ledger wallets to receive a targeted advertisement comprises selecting the distributed ledger wallets based on a transaction frequency associated with each distributed ledger wallet. Additionally or alternatively, determining the plurality of distributed ledger wallets to receive a targeted advertisement comprises selecting the distributed ledger wallets based on respective sets of NFTs owned by each distributed ledger wallet. Additionally or alternatively, determining the plurality of distributed ledger wallets to receive a targeted advertisement comprises searching a data lake comprising distributed ledger wallet data and social media account data. Additionally or alternatively, the minted plurality of NFT advertisements are each customized for a corresponding distributed ledger wallet of the plurality of distributed ledger wallets.

According to some embodiments of the present disclosure, a method of mitigating a risk associated with a physical good corresponding to a non-fungible token (NFT) on a distributed ledger is disclosed. The method includes receiving, by a set of smart contracts deployed on the distributed ledger, parameters for configuring the set of smart contracts to mint and manage the NFT corresponding to the physical good, wherein the NFT is redeemable by an owner of the NFT to initiate delivery of the physical good to a location provided by the owner of the NFT. The method further includes minting, by the set of smart contracts, the NFT corresponding to the physical good, wherein the minting comprises setting an ownership attribute of the NFT to indicate a distributed ledger wallet of a creator of the NFT. The method further includes receiving, by the set of smart contracts, a transaction corresponding to the NFT, wherein the transaction delivers a first purchase amount of cryptocurrency tokens to the set of smart contracts and indicates an address of a distributed ledger wallet of a first buyer of the NFT, wherein the set of smart contracts is configured to lock the cryptocurrency tokens until a redemption of the NFT. The method further includes modifying, by the set of smart contracts, the ownership attribute of the NFT to indicate the distributed ledger wallet of the first buyer of the NFT. The method further includes receiving, by the set of smart contracts, a redemption request from a distributed ledger wallet of a redeemer of the NFT. The method further includes modifying, by the set of smart contracts, a data attribute to indicate that the NFT is redeemed and the physical good is ready for shipment to the redeemer of the NFT. The method further includes, in response to determining that the physical good is accepted by the redeemer of the NFT, transferring, by the set of smart contracts, the first purchase amount of cryptocurrency tokens to the distributed ledger wallet of the creator of the NFT. The method further includes, in response to determining that the physical good is rejected by the redeemer of the NFT, transferring, by the set of smart contracts, the first purchase amount of cryptocurrency tokens to the distributed ledger wallet of the redeemer of the NFT.

In some embodiments, the set of smart contracts is further configured to, after determining that the physical good is not accepted by the redeemer of the NFT, transfer the first purchase amount of fungible tokens to the distributed ledger wallet of the redeemer of the NFT. Additionally or alternatively, the distributed ledger wallet of the first buyer of the NFT and the distributed ledger wallet of the redeemer of the NFT are the same distributed ledger wallet. Additionally or alternatively, the distributed ledger wallet of the first buyer of the NFT and the distributed ledger wallet of the redeemer of the NFT are different wallets, the method further comprising, prior to receiving the redemption request, receiving, by the set of smart contracts, a second transaction delivering a second purchase amount of cryptocurrency tokens and indicating a second distributed ledger wallet of a second buyer of the NFT; distributing, by the set of smart contracts, a first portion of the second purchase amount of cryptocurrency tokens to the distributed ledger wallet of the first buyer of the NFT; in response to determining that the physical good is accepted by the redeemer of the NFT, transferring, by the set of smart contracts, the second portion of the second purchase amount of cryptocurrency tokens to the distributed ledger wallet of the first buyer of the NFT; and in response to determining that the physical good is rejected by the redeemer of the NFT, transferring, by the set of smart contracts, the second portion of the second purchase amount of cryptocurrency tokens to the distributed ledger wallet of the redeemer of the NFT. In some of these embodiments, the second portion of the second purchase amount of cryptocurrency tokens is equal to a profit amount made by the first buyer. Additionally or alternatively, the second portion of the second purchase amount of cryptocurrency tokens is equal to a profit made by the first buyer minus marketplace fees. Additionally or alternatively, the first portion of the second purchase amount of cryptocurrency tokens is substantially equal to the first purchase amount of cryptocurrency tokens, the method further comprising distributing, by the set of smart contracts, a portion of cryptocurrency tokens reserved for the creator of the NFT to the distributed ledger wallet of the creator of the NFT.

In embodiments, the method further includes storing, by the set of smart contracts, an escrow ledger indicating each seller of the NFT, each buyer of the NFT, and a sales amount for each sale of the NFT, wherein the escrow ledger is used to distribute cryptocurrency tokens received by the set of smart contracts after receiving the redemption request. Additionally or alternatively, the NFT is cryptographically linked to a virtual representation of the physical good, wherein the virtual representation defines a set of item attributes of the physical good.

In embodiments, the NFT includes an NFT expiration attribute that defines at least one of a time and a date on which the NFT must be redeemed. In some of these embodiments, the method further includes after determining that a timestamp stored by the NFT expiration attribute has passed, locking the NFT to prevent further sales of the NFT.

In embodiments, the NFT includes a redemption expiration attribute that defines an amount of time that a redeeming user has to reject or accept the physical good. In some of these embodiments, the method further includes, after receiving the redemption request from the redeemer wallet, modifying the redemption expiration attribute to indicate a date and a time when the user must accept or reject the physical good; and after determining that the date and the time has passed, automatically determining that the physical good is accepted by the user.

In embodiments, determining that the physical good is accepted by the redeemer of the NFT comprises retrieving data from an oracle that is updated by an auditor of the physical good. Additionally or alternatively, determining that the physical good is accepted by the redeemer of the NFT comprises receiving a function call, wherein the function call is invoked by the distributed ledger wallet of the redeemer of the NFT. Additionally or alternatively, the redemption request comprises a hash of shipping information for the redeemer of the NFT.

In embodiments, the set of smart contracts is a single smart contract, wherein the parameters for configuring the smart contract to mint and manage the NFT corresponding to the physical good comprise a hash of a virtual representation of the physical good. In some of these embodiments, minting the NFT corresponding to the physical good comprises storing the hash of the virtual representation of the physical good as an attribute of the NFT.

In embodiments, the parameters for configuring the smart contract to mint and manage the NFT corresponding to the physical good comprise a number of NFTs to mint. In some of these embodiments, minting the NFT comprises minting a plurality of NFTs corresponding to the specified number of NFTs to mint.

According to some embodiments of the present disclosure, a method for providing distributed ledger tokens to user accounts on a distributed ledger is disclosed. The method includes receiving, by a tokenization platform, a request to obtain a distributed ledger token from a user device, wherein the request includes an acquisition code obtained by the user device. The method further includes determining, by the tokenization platform, a distributed ledger wallet associated with the user device. The method further includes locating, by the tokenization platform, a smart contract corresponding to the acquisition code, wherein the smart contract is configured to mint the distributed ledger token. The method further includes verifying, by the tokenization platform, that the distributed ledger token can be minted based on data stored by the smart contract and the acquisition code. The method further includes in response to verifying that the distributed ledger can be minted, initiating, by the tokenization platform, one or more distributed ledger transactions configured to mint the distributed ledger token using the smart contract; assign the distributed ledger token to the distributed ledger wallet associated with the user device; and update the data stored by the smart contract to disable the acquisition code.

In embodiments, receiving the request to obtain a distributed ledger token from the user device comprises receiving a web request for a web URL hosted by the tokenization platform, wherein the web URL comprises the acquisition code. In some of these embodiments, the acquisition code is obtained by the user device by scanning a QR code to obtain the web URL.

In embodiments, the method further includes, prior to receiving the request, transmitting an NFT advertisement to the distributed ledger wallet, wherein the NFT advertisement includes an attribute comprising a hash of an advertisement including the acquisition code. In some of these embodiments, the method further includes storing the advertisement including the acquisition code in distributed storage. In some of these embodiments, the advertisement including the acquisition code comprises a QR code that encodes the acquisition code.

In embodiments, verifying that the distributed ledger token can be minted based on the data stored by the smart contract comprises determining that a first value indicating a number of minted distributed ledger tokens is less than a second value indicating a maximum number of distributed ledger tokens. In some of these embodiments, updating the data stored by the smart contract to disable the acquisition code comprises increasing the stored first value.

In embodiments, updating the data stored by the smart contract to disable the acquisition code comprises storing an indication that the acquisition code has been used. Additionally or alternatively, the distributed ledger token is a non-fungible token.

According to some embodiments of the present disclosure, a method of providing redemption rights using a redemption token linked to a digital token on a distributed ledger is disclosed. The method includes assigning, by a smart contract, a digital token to a user wallet on a distributed ledger, wherein the digital token is linked to a digital asset and corresponds to a physical item. The method further includes assigning, by the smart contract, a redemption token to the user wallet on the distributed ledger, wherein the smart contract is configured to receive a redemption request to redeem the redemption token and execute a redemption workflow that facilitates delivery of the physical item to a redeemer of the redemption token. The method further includes receiving, by the smart contract, a transfer request from a first user device associated with the user wallet, wherein the transfer request requests a transfer of the redemption token from the user wallet to a second user wallet on the distributed ledger. The method further includes, responsive to receiving the transfer request: verifying, by the smart contract, that the digital token corresponding to the physical item is also being transferred to the second user wallet; and responsive to verifying that the digital token is also being transferred to the second user wallet, transferring, by the smart contract, the redemption token to the second user wallet; The method further includes receiving, by the smart contract, a request to redeem the redemption token from a second user device associated with the second user wallet. The method further includes executing, by the smart contract, a redemption workflow for shipping the physical item to a user associated with the second user wallet.

In embodiments, assigning the digital token to the user wallet on the distributed ledger and assigning the redemption token to the user wallet on the distributed are responsive to a function call initiated by an unboxing smart contract. In some of these embodiments, the unboxing smart contract is configured to award a redemption token to a user that receives the digital token based on a probability and a random value.

In embodiments, the redemption token is a presale token that is redeemable for the item at a future time. In some of these embodiments, the method further includes, responsive to receiving the request to redeem the redemption token, verifying, by the smart contract, that a redemption period defined by the redemption token has begun.

In embodiments, the method further includes, after redeeming the redemption token, burning the redemption token. Additionally or alternatively, the smart contract is configured to link the digital token to the redemption token such that both the redemption token and the digital token must be transferred together. Additionally or alternatively, the redemption token is redeemable for a carbon offset credit. Additionally or alternatively, the redemption token is a VIRL. Additionally or alternatively, the redemption token is a non-fungible token.

These methods may be implemented by one or more systems of a distributed ledger ecosystem, including a tokenization platform and/or various smart contracts, as described in detail herein.

A more complete understanding of the disclosure will be appreciated from the description and accompanying drawings and the claims, which follow.

BRIEF DESCRIPTION OF THE DRAWINGS

The accompanying drawings, which are included to provide a better understanding of the disclosure, illustrate embodiment(s) of the disclosure and together with the description serve to explain the principle of the disclosure. In the drawings:

FIG. 33 is a schematic illustrating an example smart contract for storing information about tokens according to some embodiments of the present disclosure.

FIG. 42 is a diagram illustrating example transaction data for minting tokens according to some embodiments of the present disclosure.

FIG. 45 is a diagram illustrating example transaction data for unboxing digital pack tokens according to some embodiments of the present disclosure.

FIG. 48 is a diagram illustrating example transaction data for crafting tokens according to some embodiments of the present disclosure.

DETAILED DESCRIPTION

Figure 1:
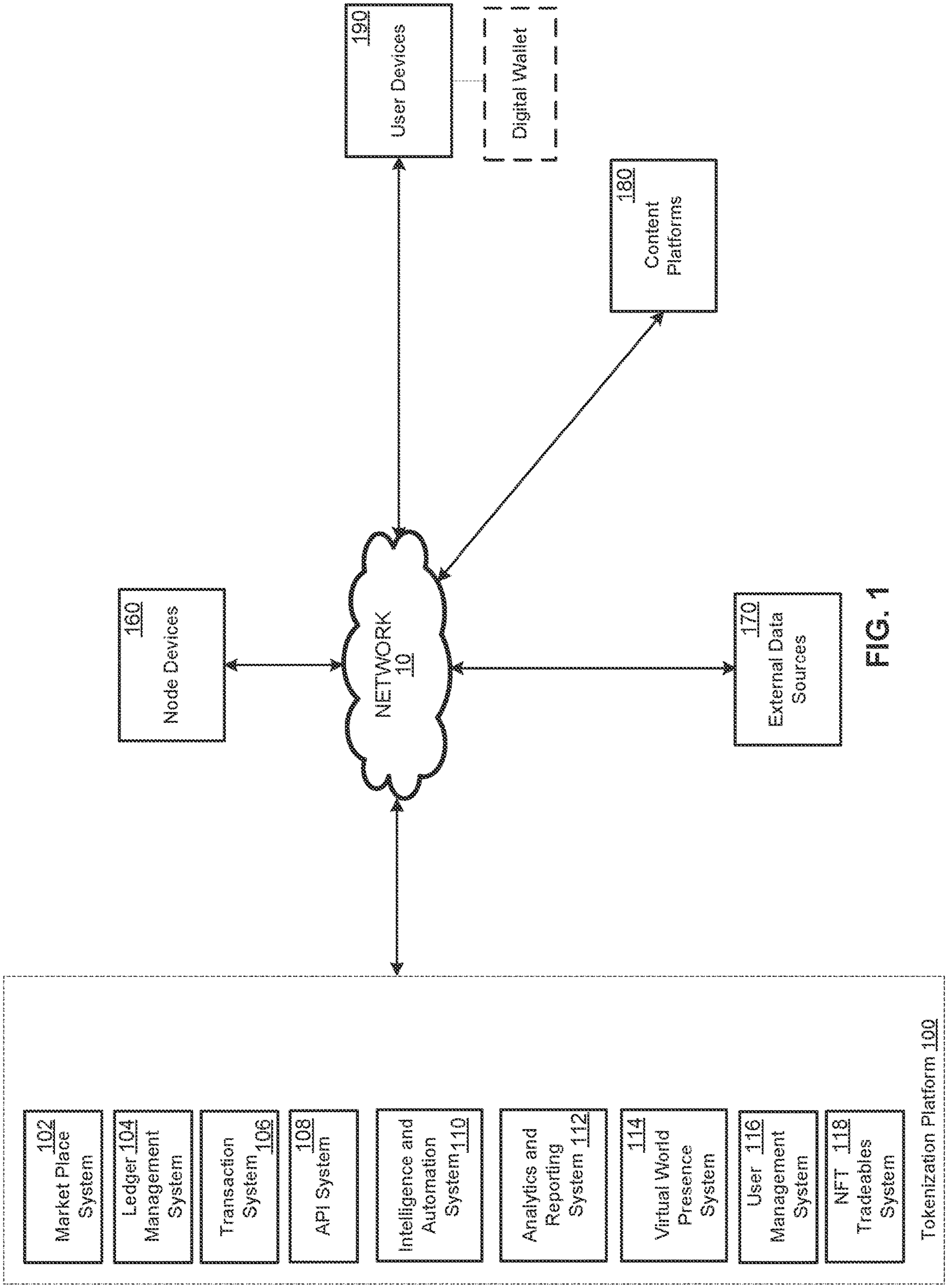
FIG. 1 is a schematic illustrating an example environment of a tokenization platform according to some embodiments of the present disclosure.

The combination of blockchain technology and smart contracts has been proposed for use in systems and methods for implementing a variety of transactions in a way that automates much of the transaction while preserving and respecting the legal constraints on such automation. One of the limitations on automation of such systems is the existence of jurisdiction specific rules and processes for (i) creating legally binding contracts between parties, and (ii) exchanging property in a way that transfers ownership interests, security interests, or other similar interests in a legally binding manner.

Some of the proposed systems depend on the future implementation of blockchain technology for the legal systems of record for such transfers, including real property records, Uniform Commercial Code filing systems, and other similar systems. This transition is dependent on governmental bodies creating and adopting blockchain-based record-keeping systems. For example, real property records in the United States are typically maintained at the county-level by an elected official, and documents are subject to specific rules regarding format and methods of submission to the record. Each such official utilizes their own systems to accept and record documents. Adoption of a blockchain-based record-keeping system would thus require each jurisdiction to select and implement such a system. This process can take years even once the technology for such systems is developed and available for implementation. The willingness of jurisdictions to adopt new technologies also may vary widely, and so it is impossible to determine when all jurisdictions will migrate to a blockchain-based system, if ever.

Since the benefits of blockchain technologies should not wait until governmental record keepers decide to begin to implement systems based on the technology, hybrid systems that provide the benefits of blockchain technology but also interface with existing record-keeping and other legal systems are necessary to bridge the gap. Systems like those disclosed herein provide the benefits of blockchain to users of the system, interface with existing legal systems and methods, and will be easier to migrate to a full block-chain based system if they become available.

The distributed ledger transaction systems and methods described herein utilize distributed ledger technology (e.g., blockchain technology) in combination with smart contracts to allow users to negotiate, document, and/or execute a variety of different transactions. According to some embodiments, the different transactions include securitized decentralized loan transactions. These loan transactions include loan transactions that are secured by traditional types of collateral and/or by digital assets.

In general, distributed ledger technology forms the basis for cryptocurrencies that are rapidly expanding in application and adoption. Such cryptocurrencies augment or replace existing payment methodologies such as cash, but also provide a decentralized system for processing transfers of the cryptocurrency. The basis for the distributed ledger/blockchain technology is a linked list of data blocks. Each block contains a link to the prior block in the chain and encrypted data. In some implementations of a distributed ledger, the encrypted data may include transaction data documenting the exchange of a digital currency, software such as an executable digital contract, and data associated with the use of a digital contract by specific parties, although it may also include other types of data as described in further detail below. The data in each block in the distributed ledger includes a hash of the previous block in the chain as a means of identifying and preventing attempts to modify prior blocks in the distributed ledger.

In many implementations of distributed ledger technology, the management and extension of the distributed ledger is decentralized and distributed over computer systems operated by numerous unaffiliated entities who contribute their computing power to the system. These distributed contributors provide the infrastructure of the distributed ledger system by storing copies of the distributed ledger, and performing the algorithms necessary to process transactions, deploy them into new blocks on the distributed ledger, and distribute those blocks to other parts of the system. In some distributed ledger implementations, the contributors are compensated for this service by receiving a fee denominated in a cryptocurrency in return for the processing of a new block in the distributed ledger. An important aspect of distributed ledger security is that it is difficult to modify blocks after they have been added to a distributed ledger and accepted into the main branch, although distributed ledgers do have temporary competing branches.

The distributed ledger technology has been enhanced by the concept of "smart contracts". Smart contracts are executable computer programs that are compiled into the data in a block in a distributed ledger by the developers of the smart contract. Once a smart contract has been deployed into a distributed ledger, other users of the distributed ledger may execute the smart contract with confidence that it has not been modified by a malicious third party. These executable computer programs are referred to as "smart contracts" because they may be used to represent and implement agreements between various parties regarding the transfer of digital currency and other types of assets, however, they do not have to represent contractual arrangements. A software developer develops the smart contract by writing program code using a scripting language such as JavaScript, Solidity, or other scripting languages, or an object coding language, such as Java, or a machine coding language such as C or C++. When a "smart contract" is deployed into a distributed ledger, the program code is processed into a block by one of the contributors to the system just as any other transaction on the distributed ledger, and typically a fee is paid to the node contributor who compiles the contract/program. The process of deploying the smart contract may include compiling the program code into bytecode, object code, binary code, or some other executable form. When the smart contract is successfully deployed into the blockchain it is assigned an address just as any other distributed ledger transaction. This address is used to access the smart contract and execute the functionality provided in it. Typically, an Application Binary Interface (ABI) information, similar to an application programming interface, is provided to a user of the contract, or the software that interfaces with the contract (such as a wallet application) so that the user can interact with the various functions of the smart contract. The ABI describes the various functions and methods provided as part of the smart contract so that they can be accessed by the user or the user's software.

A contract/program that has been deployed into the distributed ledger may then be used by anyone who has the address of the contract on the distributed ledger. Executing the contract, or a portion of it, does not necessarily incur fees unless updates to the distributed ledger are required as part of that step in the contract. If the contract/program is properly implemented many different users may utilize the contract/program simultaneously to govern their own specific agreements or transactions.

In embodiments, a smart contract/program may have multiple steps that are executed or completed by different parties to the contract. For example, a contract/program may be invoked by a first party to make an offer to a second party or a group of potential contracting parties by instantiating a copy of a certain contract. The second party (or one of the group) may respond by "signing" that instance of the contract. The process of "signing" the contract may comprise invoking a programmatic method defined as part of the contract. Some contracts may provide for multiple parties, such as buyer, seller, lender, borrower, escrow agent, authenticator, appraiser, and/or the like, all of whom may independently interact with a particular instance of a smart contract to sign it, or to take other actions associated with a specific type of smart contract.

Smart contracts are well suited to contracts that involve digital assets or that may be completely executed via programmatic interactions between the contracting parties, the distributed ledger, digital assets, and resources on the internet or otherwise connected digitally to the contract. For example, smart contracts may be able to automatically transfer control and ownership of digital assets or transfer money between PayPal or bank accounts via ACH or other electronic payment systems. Application programming interfaces provided by the external systems provide methods for a digital contract to execute actual transfers of assets or funds between parties without non-programmatic processes.

Smart contracts are not so readily able to fully implement agreements that involve tangible assets, such as real estate, personal property, and other types of assets that are subject to the control of governmental or private registration systems. These registration systems are often paper-based or, if electronic, are not designed for programmatic interaction by third parties. Examples of such systems include real estate ownership records, personal property records for assets that are titled, Uniform Commercial Code records, patent and trademark registration databases, and others. Many of these systems may be partially digital but are lacking in a programmatic interface for a smart contract to interact with the system in a completely automated manner or are highly proprietary in nature. Other systems may be fractured into many jurisdictions with their own separate filing systems, so that a single smart contract would not be functional across all relevant systems. For example, Uniform Commercial Code filings are typically handled by differing systems across different state jurisdictions, and a smart contract would need to implement varying interfaces to be able to handle transactions outside of a single jurisdiction and depending on whether such interfaces were available for a given jurisdiction.

One type of contract that has not been able to be fully executed via the programmatic functions of a smart contract/program is a secured lending transaction. While many parts of such transactions may be completed via interactions between parties and the smart contract, the transfer of title and possession, and the creation of security interests for the benefit of lenders, among other aspects of the transaction, are not readily adapted to completion via the smart contract. According to embodiments of the present disclosure, a decentralized lending system that incorporates a set of distributed ledgers and a set of smart contracts that facilitates is created to support one or more types of smart contracts. In various embodiments of the system, the set of distributed ledgers may host a variety of types of smart contracts, such as guild governance smart contracts, authenticator smart contracts, appraisal smart contracts, loan smart contracts, and/or other smart contracts are implemented to support securitized decentralized loan processes. The programmatic smart contracts are compiled into distributed ledger(s) and reside at certain addresses within a respective block in the distributed ledger(s). Users may utilize these smart contracts by invoking the address and methods or functions associated with the smart contract. For example, an example loan contract may have methods for a loan request, loan approval, collateral assignment, payment authorization, and/or other similar functions necessary to the formation and execution of a loan, the provision of collateral as security, and repayment of the loan according to its terms.

Continuing the loan contract example, when a user utilizes a smart contract and invokes a method or function of that contract, the user may submit parameters and other information to the smart contract that are specified by a particular method or function. The smart contract may them programmatically execute a selected method or function in accordance with those parameters. In the case of a loan request function, a loan smart contract may take the parameters received from a user who desires to take out a loan and incorporate that request information into a new block in the blockchain so that potential lenders can view the request. In some embodiments the loan request might not be incorporated into the distributed ledger but might be stored in a database that is programmatically available to potential lenders such as via a web service.

The present disclosure relates to a tokenization platform that enables the creation of tokenized virtual representations of items (also referred to as "VIRLs"), such as goods, services, and/or experiences. As used herein the term "item" may refer to a digital asset (e.g., gift card, digital music file, digital video file, software, digital photograph, etc.), physical good, digital service (e.g., video streaming subscription), physical service (e.g., chauffer service, maid service, dry cleaning service), and/or purchased experience (e.g., hotel package, concert ticket, airlines ticket, etc.), or any combination thereof. It is noted that an item may refer to goods that already exist or that can be produced at a later time. For example, an item may be an unmade pizza or article of clothing. A purchaser of such an item may purchase the item, and the item may be produced at a time after the purchase. The term virtual item may refer to a virtual representation of a merchandised item. In creating a virtual representation to an item, many of the purchase-time decisions required for traditional ecommerce transactions can be postponed and bifurcated from the transaction itself, thereby creating additional value for the purchaser. For example, a purchaser may wish to order a pair of shoes but is not yet sure when the shoes will be needed or where the delivery location should be. The purchaser may purchase the virtual representation of the shoes. The virtual representation may be redeemed at a later time, such that the redeemer (e.g., the purchaser or a recipient of a gift) may specify the delivery time and delivery location when the redeemer so chooses. By creating virtual items, new value is created for purchasers or any recipients, as a series of choices that can be put on hold until redemption time.

Furthermore, in conventional ecommerce platforms, there are no recordation mechanisms of an item being transferred between unknown parties that can be checked and trusted. Additionally, there is also no way of storing sensitive financial information without a centralized entity. Thus, in embodiments, the tokenization platform may be configured to issue electronic tokens (or "tokens") that are configured to be stored on a cryptographically secure ledger to provide a process by which virtual representations allow the transfer of the item between unknown parties, while also allowing anyone to check the status of the token at any time and trust that it is correct. As used herein, unless otherwise indicated by context, "cryptographically" indicates use of a cryptographic algorithm, such as a hashing algorithm.

The ecommerce platform may be configured to support additional or alternative ecosystems. In embodiments, the tokenization platform is configured to support a token-based lending system, whereby lenders may create virtual items corresponding to collateral (e.g., jewelry, collectible items, artwork, and the like). The ecommerce platform may tokenize the virtual item and may store the token on a distributed ledger. In this way, the loan may be sold and only the token needs to be transferred between lenders. In some embodiments, a smart contract may be used to manage the loan, possession of the token, and other transactions corresponding to the loan.

In some embodiments, the tokenization platform is configured to authenticate real world items. In some of these embodiments, the tokenization platform may enlist subject matter experts to authenticate items using a virtual representation of the items. A subject matter expert may provide an authentication report that includes notes for the expert's underlying opinion. The authentication report may be used to deny or allow an item to be used for collateral or sold on the platform. Additionally, in some embodiments, the authentication reports can be used to train machine learned models, such that the platform may use machine vision, machine learning, sensors (e.g., scales), and/or other suitable techniques to authenticate items.

In embodiments, the tokenization platform is configured to support a "mystery box" game. The mystery box game is a game of change, where users can win tokens from the mystery box, such that the tokens represent items and the tokens can be redeemed, traded, sold, gifted, and the like. In some of these embodiments, the tokenization platform supports casino-style gaming, whereby the mystery box game may be played at casinos and other brick and mortar locations.

In embodiments, the tokenization platform is configured to support in-video game streaming. In some of these embodiments, the tokenization platform may provide indicators of tokens to instances of video games, whereby the video game makers can use the tokens in a number of different ways. For example, tokens may appear in a video game to allow a food delivery service to sell deliverable food in game. In another example, a token may represent a digital item that can be used in the game, but then later can be redeemed to obtain a real-world item corresponding to the digital item.

In embodiments, the tokenization platform may provide a rewards-based user acquisition program, whereby users can enlist for referral codes. When the user successfully refers a user to the tokenization platform, the user is rewarded with a token. The token can represent monetary compensation or an item (e.g., a gift card, a pair of shoes, a music album, a DVD, or the like).

Tokenization Platform

FIG. 1 illustrates an example ecosystem of a tokenization platform 100 (or the "platform") according to some embodiments of the present disclosure. The environment includes the platform 100, node computing devices 160, external data sources 170, content platforms 180, and user devices 190. The platform 100, the node computing devices 160, the external data sources 170, the content platforms 180, and the user devices 190 may communicate via a communication network 10 (e.g., the Internet and/or a cellular network).

In embodiments, the tokenization platform 100 manages one or more cryptographic ledgers (or "distributed ledgers") and provides flexible functionality of virtual representations of items such as goods, services, and/or experiences with the fulfillment and satisfaction of said items. In embodiments, the platform 100 provides a marketplace for the 3rd party sellers to transact for items using tokens, whereby a token is a digital marker that defines an ownership right in a particular item. Additionally, or alternatively, the provider of the platform 100 may sell, lease, give away, or otherwise transact items offered by the provider. As used herein, the term "transaction" may refer to the sale/purchase, the leasing, the gifting, collateralization, or any other action that affects an ownership of a token. As will be discussed, in some embodiments a token may be redeemed by an owner of the token, such that the owner of the token may take possession of the item upon redemption of the token.

In some embodiments, the seller of an item (or any other suitable user) may access the platform 100 to define a virtual representation of the item that the seller is offering for transaction. The virtual representation of the item may include information that identifies the item (e.g., a serial number corresponding to the item, a model number of the item, and the like), information relating to the item (e.g., a classification of the item, textual descriptions, images, audio, video, virtual reality data, augmented reality data, and the like), and/or code that may be used to facilitate or verify transactions involving the item (e.g., smart contracts). In some embodiments, the platform may "tokenize" an item on behalf of a seller of the item by generating a set of tokens based on the virtual representation of the item and storing the tokens and associated metadata in a cryptographically secure distributed ledger, thereby making the tokens (and the virtual representation) verifiable, transferable, and trackable.

In embodiments, the platform 100 may receive data from one or more external data sources 170. An external data source 170 may refer to any system or device that can provide data to the platform. In embodiments, data sources may include merchant, manufacturer, or service provider systems and/or databases that provide the platform 100 with data related to an available item. External data sources may also include user devices 190, such that the user devices 190 may provide relevant data (e.g., contacts, cookies, and the like). Examples of external data sources 170 may include e-Commerce websites, organizational websites, software applications, and contact lists (e.g., phone contacts, email contacts, messenger client contacts, and the like). The platform 100 may access an external data source 170 via a network 10 (e.g., the Internet) in any suitable manner (e.g., crawlers, user permission/API, and the like).

In embodiments, the platform 100 interacts with content publishing platforms 180. A content publishing platform 190 may refer to any system that publishes content on behalf of individuals and/or organizations. Content publishing platforms may include social networking platforms, blogging platforms, news sites, and the like. In embodiments, a consumer may output content corresponding to an item via a content publishing platform 190. For example, the consumer may post content related to a purchased item to a social networking platform or may embed the content into a blog post. The content may include links to the item (e.g., a link to a webpage or application state corresponding to the item).

In embodiments, the platform 100 interfaces with various user devices 190. User devices 190 can refer to any computing device with which a user (e.g., consumer, merchant, manufacturer, provider and the like) can access the platform. Examples of user devices include, but are not limited to, smartphones, tablet computer devices, laptop computing devices, personal computing devices, smart televisions, gaming consoles, and the like. A user device may access the platform 100 via a website, a web application, a native application, or the like. In embodiments, the platform 100 may provide a first graphical user interface to user devices 190 associated with a seller and a second graphical user interface to a user device 190 associated with an end user. The first graphical user interface may allow a user associated with a seller to offer items for sale and to create new virtual representations corresponding to the items for sale. The second user interface may allow users to purchase tokens corresponding to items for sale, to transfer tokens, and/or redeem tokens. In some embodiments, the platform 100 may support a digital wallet that stores the tokens of a user. The digital wallet may be a client application that is provided and/or supported by the platform 100. In embodiments, the digital wallet stores any tokens that are owned by the user associated with the digital wallet and provides an interface that allows the user to redeem, transfer, sell, exchange, or otherwise participate in transactions involving the token.

In embodiments, the tokenization of items provides a framework for securely transacting with respect to an item represented by the token. For example, a token provides a mechanism by which an item may be traded, rented, purchased, sold, exchanged, gifted, swapped, or transferred in transactions involving trusted or untrusted parties. In some embodiments, a token represents a single unit to be transacted (e.g., sold, traded, leased, gifted, or the like). For example, if a merchant is selling ten widgets, the platform 100 may generate ten tokens, where each token corresponds to a different widget. In this scenario, all ten widgets may correspond to the same virtual representation of the widget, and the ten tokens may represent instances of the virtual representation (also referred to as a "virtual asset"). In embodiments, a token may be a digitally signed instance of the virtual representation of an item, whereby the digital signature may be used to verify the validity of the token.

In embodiments, each virtual representation of an item may include or be associated with a smart contract that, for example, provides a set of verifiable conditions that must be satisfied in order to self-execute a transaction (e.g., transfer of ownership or expiration) relating to an item represented by the virtual representation. In embodiments, each token corresponding to a virtual representation may be associated with the smart contract that corresponds to the virtual representation. In embodiments, a smart contract corresponding to a virtual representation may define the conditions that must be verified to generate new tokens, conditions that must be verified in order to transfer ownership of tokens, conditions that must be verified to redeem a token, and/or conditions that must be met to destroy a token. A smart contract may also contain code that defines actions to be taken when certain conditions are met. When implicated, the smart contract may determine whether the conditions defined therein are satisfied, and if so, to self-execute the actions corresponding to the conditions. In embodiments, each smart contract may be stored on and accessed on the distributed ledger. In some embodiments, tokens that do not have a smart contract associated therewith may be referred to as placeholder tokens, such that a placeholder token may not be involved in a transaction. In embodiments, tokens can be gifted. In embodiments, recipients of a gifted token may redeem the token, customize the virtual asset represented by the token before redemption, exchange it for another token, obtain the cash value equivalent, and the like.

Once the platform 100 generates a token, the platform may update the distributed ledger to indicate the existence of a new token. As used herein, a distributed ledger may refer to an electronic ledger that records transactions. A distributed ledger may be public or private. In embodiments where the distributed ledger is private, the platform 100 may maintain and store the entire distributed ledger on computing device nodes 160 associated with the platform. In embodiments where the distributed ledger is public, one or more 3rd party computing node devices 160 (or "computing nodes") that are not associated with the platform 100 may collectively store the distributed ledger. In some of these embodiments, the platform 100 may also locally store the distributed ledger and/or a portion thereof. In embodiments, the distributed ledger is a blockchain (e.g., an Ethereum blockchain). Alternatively, the distributed ledger may comport to other suitable protocols (e.g., hashgraph, Byteball, Nano-Block Lattice, and IOTA). By storing tokens on a distributed ledger, the status of that token can be verified at any time by querying the ledger and trust that it is correct. By using the token approach to implementation, tokens cannot be copied and redeemed without permission.

In some embodiments, the platform 100 is configured to shard the distributed ledger, such that there are side chains that fork from a main chain of a distributed ledger. In some of these embodiments, a side chain may store virtual representations of items having a particular category or class. In embodiments, a side chain corresponding to a particular class of items may store tokens corresponding to items belonging to the particular class and ownership records that indicate the current and previous ownerships of those tokens. Each time ownership of a token changes, the side chain containing the implicated token may be amended to indicate the new owner of the token. In embodiments, side chains may store media contents that are associated with virtual representations. For example, a side chain may store videos, photographs, audio clips, and other suitable media contents that are referenced by respective virtual representations.

In addition to item data (e.g., virtual representations), tokens, and transaction data relating to the tokens, the distributed ledger may further store account information. For example, in embodiments, the distributed ledger may store the public addresses of each valid account. In embodiments, a valid account may belong to an entity that is verified and authorized by the platform to participate in a transaction. Thus, in embodiments, a party may only sell, purchase, gift, receive, or otherwise transfer a token if the party has a known account. Each account may be assigned a public key and a private key that may be used to transact on the platform 100. In embodiments, the address of an account may be based on the public key of the account (e.g., the address may be a hash value of the public key). These addresses may be stored in the distributed ledger, such that addresses involved in a transaction may be verified as corresponding to valid accounts using the distributed ledger.

In operation, a seller may instruct the platform 100 to generate virtual representations of one or more respective items, such that each virtual representation represents a respective item that is available for a transaction. It is noted that while many of the examples of transactions in the disclosure relate to purchases of goods, services, and/or experiences, transactions may also include leases, rentals, loans, gifts, trades, rewards, or giveaways. In embodiments, the seller may provide item attributes relating to a set of one or more items, such as a number of items available for transaction, pricing information of an item, delivery restrictions for the item, expiries relating to the item (e.g., how long is the transaction valid), an item description, a serial number (e.g., of physical items), media relating to the item (e.g., photographs, videos, and/or audio content), and the like. In response to the seller providing the item information, the platform 100 generates a set of tokens corresponding to the number of items available for transaction. For example, if the seller indicates that there are 100 Model X widgets available for sale, the platform 100 may generate a virtual representation of the Model X widget and may generate 100 non-fungible tokens corresponding to the virtual representation, whereby each token corresponds to a respective instance of the virtual representation. The virtual representation may include a description of the widgets, a description of the widgets, a price of the widget, shipping restrictions relating to the widgets, photographs of the widgets, videos of the widget, virtual reality data relating to the widget, and the like. The platform 100 may then store the virtual representation and the corresponding tokens on the distributed ledger. For each token, the distributed ledger may store the token, ownership data relating to the token, media content corresponding to the token (or the virtual representation to which the token corresponds), and/or other suitable data relating to the token on the distributed ledger. Initially, the ownership of the token may be assigned to the seller. As such, the distributed ledger may indicate the existence of the token and that the seller owns the token. Once tokenized, end users (e.g., buyers) may participate in transactions for the item using the corresponding token. For example, the user may purchase a token corresponding to the item from the seller via a web interface or application that is provided or supported by the provider of the platform 100. In response to the transaction, the platform 100 may update the distributed ledger to indicate an assignment of the token to the user (e.g., to a wallet associated with an account of the user). In embodiments, a copy of the token may be stored in a digital wallet corresponding to the new owner of the token (e.g., the buyer).

A token may be transmitted amongst users in any suitable manner. For example, a token may be transmitted via email, instant message, text message, digital transfer, social media platforms, and the like. In some of these embodiments, the token may be transmitted directly from the sender's user device 190 (e.g., from the user's digital wallet) to a user device 190 (e.g., smartphone) or account (e.g., email account or messaging application) associated with the intended recipient. Upon initiating the transmission, the digital wallet may transmit a transfer request to the platform 100 and may transmit a copy of the token to the recipient's user device 190 or specified account. In some embodiments, the transmitted token may be embedded in a media content, such as an image, emoji, or video, such that the recipient receives the media content and may opt to accept the token. In this example, the token may be accompanied by a link and/or software instructions that cause the user device 190 that receives the token to add the token to the recipient's account upon the recipient accepting the token. Upon electing to accept the token, the user device 190 of the recipient may transmit a request to the platform to add the token to an account of the recipient. The platform 100 may receive the request and may update the ownership record of the token in the distributed ledger to indicate the transfer of ownership.

In embodiments, an owner of a token may redeem a token. In embodiments, a user may select a token to redeem from a digital wallet of the user. In response to the selection, the digital wallet may transmit a redeem request to the platform 100. The redeem request may include the token (or an identifier thereof) and a public address of the user (or any other suitable identifier of the user). The platform 100 receives the redeem request and verifies the validity of the token and/or the ownership of the token. Once verified, the user is granted permission to redeem the token. In some scenarios, the user may be redeeming a token corresponding to a digital item (e.g., a gift card, an mp3, a movie, a digital photograph). In these scenarios, the platform 100 may determine a workflow for satisfying the digital item. For example, the platform 100 may request an email address from the user or may look up an email address of the user from the distributed ledger. In this example, the platform 100 may email a link to download the digital item to the user's email account or may attach a copy of the digital item in an email that is sent to the user's email account. In another scenario, the user may be redeeming a token corresponding to a physical good (e.g., clothing, food, electronics, etc.) or a physical service (e.g., maid service). In the case of a physical good, the platform 100 may determine a workflow for satisfying the physical item. For example, the platform 100 may request shipping information from the user or may look up the shipping information of the user from the distributed ledger. The platform 100 may then initiate shipment of the physical good. For example, the platform 100 may transmit a shipping request to a warehouse that handles shipments of the good indicating the shipping information. The foregoing are examples of how a token may be redeemed. The platform 100 may execute additional or alternative workflows to handle redemption of a token.

In embodiments, the token may be printed in physical media, such that the token may be redeemed at a brick-and-mortar location. For example, the token (e.g., an alphanumerical string) may be encoded into a QR-code or barcode. In these embodiments, the public key of the party that was used to digitally sign the token (e.g., a public key associated with the platform 100) may also be provided in the physical media. In this way, the token may be verified by scanning the QR-code or barcode using a client application associated with the platform 100. The client application may provide the token and the public key to the platform 100, which may verify the validity of the token based on the token and the public key. If the token and ownership are verified, the platform 100 may transmit a confirmation of the verification to the client application. A clerk may then allow the user to complete the transaction (e.g., take possession of the item).

In some embodiments, tokens may be perishable, in that they lose all value at a predetermined time or upon the occurrence of a predetermined event. In these embodiments, the seller may provide an expiry in the virtual representation that indicates a date and time that the virtual representation is no longer valid, such that when the expiry is reached, the token may be deemed invalid.

Tokens may be fungible tokens or non-fungible tokens. Fungible tokens may refer to tokens that are interchangeable. For example, fungible tokens may all have the same identifier. Non-fungible tokens are unique tokens. Non-fungible tokens are transferrable but not interchangeable.

Platform Components

In embodiments, the platform 100 may execute one or more of: a marketplace system 102, a ledger management system 104, a transaction system 106, an API system 108, an intelligence and automation system 110, an analytics and reporting system 112, and/or virtual world presence system 114, all of which are discussed in greater detail throughout this disclosure.

In embodiments, the platform 100 provides a marketplace system 102 that allows virtual representations of items to be defined, generated, viewed, and/or redeemed. In embodiments, the marketplace system 102 may include graphical user interfaces that: allow sellers to define virtual representations, allow consumers to view virtual representations of items and to transact for tokens corresponding to the items, and allow token owners to redeem tokens, thereby completing transactions for items indicated by the redeemed tokens. The marketplace system 102 may further include backend functionality for supporting these operations.

In embodiments, the platform 100 provides a ledger management system 104 that generates tokens and manages one or more distributed ledgers, including managing the ownership rights of the generated tokens. In embodiments, the ledger management system 104 may also interface with one or more smart contracts that implicate the distributed ledgers.

In embodiments, the platform 100 includes an API system 108 that manages one or more application programming interfaces (APIs) of the platform, so as to expose the APIs to one or more related applications (e.g., native and/or web applications provided by the platform 100 provider), third party systems that are supported by or otherwise interact with the platform 100, and smart contracts that are configured to interface with the platform 100. The API system 108 may expose one or more APIs, such that the API system 108 may receive API calls from requesting devices or systems and/or may push data to subscribing devices or systems. The API system 108 may implement any suitable types of APIs, including REST, SOAP, and the like. In embodiments, the API system 108 may include a smart contract API that allows smart contracts to interface with the platform, a utility API, a merchant API that allows merchants to create tokens corresponding to virtual representations of items, and any other suitable APIs. In embodiments, the platform 100 may implement a micro services architecture such that services may be accessed by clients, such as by APIs and/or software development kits (SDKs). The services abstract away the complexities of blockchain creation, object handling, ownership transfers, data integration, identity management, and the like, so that platform users can easily build, deliver and/or consume platform capabilities. In embodiments, SDK types include, but are not limited to: an Android SDK, an iOS SDK, a Windows SDK, a JavaScript SDK, a PHP SDK, a Python SDK, a Swift SDK, a Ruby SDK, and the like.

In embodiments, the platform 100 includes a transaction system 108 that supports any suitable transactions relating to the platform, including the buying, selling, trading, renting, leasing, exchanging, swapping, transferring, and/or redeeming of tokens that represent corresponding items.

In embodiments, the platform 100 includes an intelligence and automation system 110 that performs machine learning and artificial intelligence tasks. For example, the intelligence and automation system 110 may train machine learned models, make classifications and predictions based on the machine learned models, recommend products to users, identify advertisements to target to specific users, match service providers to service seekers, and/or automate notifications to users.

In embodiments, the analytics and reporting system 112 performs analytics-related tasks relating to various aspects of the tokenization platform 100 and may report the resultant analytics to interested parties (e.g., employees of the platform provider 100 and/or sellers on the platform 100).

In embodiments, the platform includes or supports a virtual world presence system 114 that provides presents virtual representations of items in virtual world environments. For example, the virtual world presence system 114 may present a virtual reality store to a user, whereby virtual representations of items are presented in the store and users can “shop” for the virtual items in the virtual world environment. In these embodiments, the virtual world presence system 114 may render a virtual world environment, which may be displayed at a client application. The virtual world environment may be associated with a seller or a group of sellers, whereby items that are sold by the seller or sellers are made available in the virtual world environment. In these embodiments, the virtual world presence system 114 may further render 3D representations of items that are available from the seller or sellers based on the virtual representations of the items. The 3D representations may then be presented in the virtual world environments, such that users can examine the 3D representations of the items (e.g., look at the representations from different angles). In the event a user wishes to purchase an item, the user may initiate a transaction (e.g., selecting a “buy” button in the virtual representation). Upon the user initiating the transaction, the virtual world presence system 114 may notify the transaction system 106 of the user’s selection, and the transaction may proceed in the manner described above.

In embodiments, the platform 100 includes a user management system 116. In embodiments, the user management system 116 may create new user accounts, assess risk associated with users, provide conditions for users based on respective risk associated with the users when participating in a transaction, and the like.

In some embodiments, the user management system 116 creates new accounts for users. In these embodiments, a new user may access the platform 100 and may request a new account. In embodiments, the platform 100 may allow a user to link their account to an account of an external system (e.g., Google®, Facebook®, Twitter®, etc.). Additionally, or alternatively, a user can provide an email address and login. In embodiments, the user management system 116 may request a user to provide additional authenticating information, such as a home address or business address, a passport number (and/or image of the passport), driver’s license number (and/or an image thereof), state ID card (and/or an image thereof). The user management system 116 may further provide a mechanism for a user to link any financial information to the platform, including entering credit card numbers, banking information, cryptocurrency wallets (e.g., Coinbase® account), and the like. Upon receiving the requested information, the user management system 116 creates a new account for the user, including creating a new public address of the account corresponding to the user.

Once the account is created, the user may begin participating in transactions on the platform 100.

In embodiments, the user management system 116 determines a risk score of a user each time the user attempts to participate in a transaction using the platform 100. A risk score of a user may indicate a degree of risk associated with facilitating a particular transaction involving the user. Examples of risks may include a risk that a seller will not deliver an item purchased by another user, a risk that the seller will deliver a fake or substandard item to another user, a risk that a user will default on a loan, a risk that the user will engage in fraud, and the like. Factors that may be relevant to a user's risk score may include, but are not limited to, whether the user has provided secondary authentication information (e.g., passport or driver's license), whether the user has provided banking information, how many purchases or sales the user has made on the platform 100, the size of those transactions, how many issues the user has had with previous transactions (e.g., how many non-payments or non-deliveries, complaints, etc.), whether the user has defaulted on a loan facilitated by the platform, and the like.

In some embodiments, the user management system 116 may determine the risk score using a risk scoring model trained to assess risks associated with the user given a transaction. Upon a user attempting to engage in a transaction, the user management system 116 may determine the features of the transaction (e.g., type of transaction, the size of the transaction, etc.) and the features of the user (the outcomes of the user's previous transactions, the types of those transactions, whether the user has provided secondary authentication information, whether the user has provided banking information, whether the user has had issues in the past, etc.). For example, when a user requests to sell an item, requests a collateralized loan, or the like, the user management system 116 may determine a risk score. The user management system 116 may provide the features to the intelligence and automation system 110, which may input the features into the risk scoring model. The risk scoring model may output a risk score based on the features, where the risk score indicates a probability that the transaction will be successful given the transaction features and user features. In embodiments, the risk scoring model may be trained by the intelligence and automation system 110 (e.g., the machine learning system 502 of FIG. 5), as is discussed below.

In embodiments, the user management system 116 may impose a set of conditions on a user requesting to participate in a transaction based on the risk associated with the user. Examples of conditions may include requiring a user to place funds in escrow equal to the sale price of an item to be sold on the platform (e.g., an amount to be refunded if a seller does not provide an item or provides a fake item), requiring a user to provide collateral in excess of a loan amount if there is significant risk that the user defaults on a loan, requiring a user to provide secondary authentication information if the user is requesting a loan and has not provided such information, and the like, For example, if the user is requesting to sell an item on the platform 100, but the user does not have a history of selling items, the risk score associated with the potential transaction may indicate that there is a risk that the seller will not successfully deliver an item or that the item may be fake or in an unsatisfactory condition transaction. In this example, the platform 100 may require that the user deposit (or have in his or her account) an amount of funds that are equal to or greater than sale price of the item or items that the user wishes to sell. In this way, the platform 100 may issue a refund to a buyer if the user (i.e., seller) does not successfully complete the transaction. In embodiments, the user management system 116 may implement a set of rules to determine the conditions, if any, to place on a user with respect to a particular transaction if the user wishes to engage in the transaction. In embodiments, a rule may define one or more conditions that correspond to particular types of transactions (e.g., selling, trading, borrowing, etc.) and may define risk score thresholds that trigger the one or more conditions.

The platform 100 may execute additional or alternative systems as well. For example, in embodiments, the platform 100 may include a gamification system (not shown) that gamifies aspects of the platform 100 and/or a rewards system (not shown) that rewards users for participating in certain activities. For example, the gamification system may provide an environment where users are challenged to compete for the most shared virtual items on social media platforms. In this example, the rewards system may reward users with tokens to redeem items when the users are deemed to have shared the most virtual items on the social media platforms. In another example, the rewards system may issue rewards (e.g., tokens to certain items) to a user when the user purchases a certain value or amount of virtual items.

In embodiments, the platform 100 can include a logistics system (not shown) that enables the physical delivery of an item, such as a good or food. The logistics system may be configured to manage the logistics from the source location of the item (e.g., a warehouse or restaurant) to the redeemer of the token (e.g., the house or current location of the redeemer). In embodiments, the logistics system may include a geolocation system (not shown) for determining delivery location. For example, if an owner of a token corresponding to a pizza with one topping from a pizza delivery chain redeems the token, the geolocation system may determine the recipient's current location for delivery. Geolocation information may be acquired by a smart phone, web browser (e.g., IP address), or the like. In this example, the logistics system may generate an electronic notification based on the user's geolocation (or a selected delivery location) and the user's order (e.g., the user's selected topping) and may transmit the electronic notification to a location of the pizza delivery chain that is closest to the intended delivery location.

Marketplace System

Figure 2:
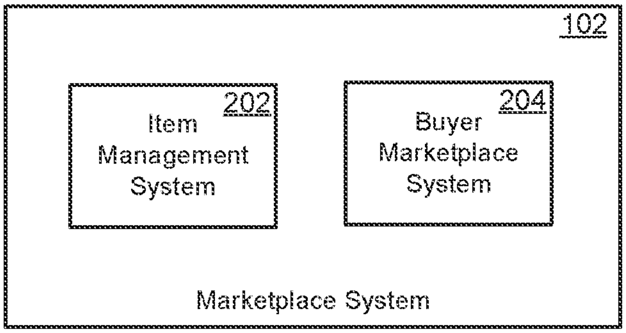
FIG. 2 is a schematic illustrating an example marketplace system according to some embodiments of the present disclosure.

FIG. 2 illustrates an example of a marketplace system 102 according to some embodiments of the present disclosure. In embodiments, marketplace system 102 may include an item management system 202, a buyer marketplace system 204, and a redemption system 206.

The item management system 202 allows a seller of an item to define a virtual representation of an item. In embodiments, the item management system 202 presents a GUI to a user device 190 of the seller that allows the seller to define the attributes of the item. In the case that the item has never been sold on the platform 100, the seller can select an option to add a new item. In response to doing so, the seller may provide an item classification that indicates the type of item (e.g., "shoes," "pizza," "photograph," "movie," "concert tickets," "gift card," and the like) and a name of the item. The seller may then define one or more additional attributes of the item. For example, in embodiments, the seller may provide an item description, media contents associated with the item (e.g., photographs, videos, audio clips, and the like), relevant links (e.g., a link to a website of the seller), a price of the item, restrictions relating to the item (e.g., "US shipping only" or "seller store hours are 10-6"), redemption instructions (e.g., whether in store redemption is allowed, permitted, or mandatory, whether digital assets are downloaded or emailed, whether the items are transferrable, and the like), a number of the item that are available for transaction (e.g., how many units are available), and/or any other suitable attributes. In response to the seller providing the item attributes, the item management system 202 may generate a virtual representation of the item. In embodiments, the virtual representation may be a data record that includes the attributes of the item. In the scenario where the virtual representation was previously defined, the seller may select the previously defined item and may update one or more attributes. For example, the seller may provide additional media contents, may alter the price, and/or may update the number of items that are available. Whether an updated virtual representation or a newly defined virtual representation, the item management system 202 may output the virtual representation to the ledger management system 104, where the ledger management system 104 may tokenize instances of the virtual representation to obtain a set of tokens.

In some embodiments, the item management system 202 may allow the seller to provide seller attributes as well. The seller may provide information such as a physical location where physical items may be shipped from, a digital location where digital items may be retrieved from, physical locations of the seller's brick and mortar stores, hours of operation of the seller, and the like. These attributes may be included in the virtual representation or may be stored in an alternate date record.

In embodiments, the item management system 202 may include an asset type manager for creating and defining new types of items to enable the platform 100 to support the sale and trade of the new type of asset. In these embodiments, the asset type manager may provide a GUI that allows a user to define a new type of asset. In these embodiments, an asset type attributes field allows users to add information specific to new asset types as they are being defined. Attribute information can be understood as information material to purchasers in making a buying decision and must be information specific to an asset type and information capable of being displayed on the platform. Asset type attribute fields include, but are not limited to, an asset type name, an asset type image, an asset redemption URL, an asset descriptor (e.g., physical or digital), and the like.

In embodiments, the item management system 202 may include an item type definition manager for defining new types of items so that they can be listed on the platform. In embodiments, the item type definition manager may provide a GUI that allows a user to define attributes of a new item. To define a new item type, a user may be prompted to select an appropriate asset type from the dropdown menu. The GUI may then allow a user to define the item attributes in item attribute fields. Item attribute fields may include, but are not limited to, an item name, an item description, item notes, an item image, item pricing data (e.g., suggested price, suggested floor price), an instant sell flag, an item URL that links to a webpage for purchasing the item, a quantity of items, and the like. When a user provides the requisite item attributes, the item management system 202 may create a new virtual representation defining the new item.

In embodiments, a digital token (e.g., NFT or a fungible token) may be cryptographically linked to a set of virtual representations, whereby the digital token is redeemable for a plurality of items (also referred to as a "basket of items)". In embodiments, the token may include a one-to-at-least-one link to at least one virtual representation. In some of these embodiments, a single virtual representation may include data relating to multiple items. In other embodiments, each item in a basket of items may be represented by a respective virtual representation such that a digital token corresponding to a basket of items is cryptographically linked to the multiple virtual representations that represent the multiple respective items in the basket of items and is redeemable for the multiple respective items. In some example embodiments, a set of digital tokens may be cryptographically linked to a virtual representation that corresponds to a plurality of instances of an item. In this way, a single virtual representation may link a plurality of tokens to a plurality of items, where each token is redeemable for an instance of the item to which the virtual representation corresponds.

In example embodiments, a digital token may be cryptographically linked to a single virtual representation of a basket of items that includes a plurality of different items and that is redeemable for the plurality of items. In these example embodiments, the virtual representation of the basket of items is referred to as a virtual basket of items and the digital token is redeemable for the items represented by the virtual basket of items. In example embodiments, a virtual basket of items may represent a plurality of items for each of which corresponds a digital token (an item token) and optionally has its own virtual representation.

In some example embodiments, a virtual basket of items may include a generic visual representation of items that it represents. As an example, a virtual basket of new baby items may include a visual representations of typical new baby items (diapers, clothes, baby food, toys, and the like). In example embodiments, the virtual basket of items may be dynamically adapted based on items selected for inclusion in the basket of items that the virtual basket of items represents. Visual item placeholders may be replaced by a visual representation from a virtual representation of an item added to the basket of items. Other aspects of a virtual basket of items may be adapted based on content of the basket of items, such as warranty for one or more of the items, and the like. In example embodiments, a virtual basket of items may link or otherwise aggregate one or more aspects of the virtual representations of items included in the basket of items represented by the virtual basket of items.

In these basket of items embodiments, the digital token linked to the virtual basket of items is redeemable for all of the items represented by the virtual basket of items. In this way, the token is redeemable for the virtual basket of items. In some of these embodiments, the basket of items may be arranged in accordance with a particular theme and/or for an intended recipient or class of recipients. For example, a basket of items may be arranged for an art theme (e.g., multiple pieces of art by the same artist, art supplies, or other art-themed items), sports theme (e.g., multiple pieces of equipment for a particular sport, multiple items of sports memorabilia, team apparel, or other sports themed items), entertainment theme (e.g., items of memorabilia relating to a tv show or movie, a book and movie tickets to a movie based on the book, or other entertainment themed items), music theme (e.g., concert tickets and a digital copy of an album, concert posters and apparel from a band or performer, or other music themed items), gaming themed (e.g., a gaming console, one or more specific games, and one or more accessories for the gaming console, and/or other gaming-related items), or other suitable themes.

In embodiments, the items included in a basket of items may be recommended by a gift prediction model. In these embodiments, the gift prediction model may be trained to receive a set of features relating to an individual (or group of individuals) and to output a set of recommended items for the user. In response to the gift recommendation model outputting the set of recommendations, a gift giver can select a basket of items from the set of recommendations (e.g., by selecting a virtual representation for each item) and the marketplace system 102 may initiate the tokenization of the basket of items, such that the generated token is linked (e.g., via a corresponding virtual basket of items) to the virtual representations of the multiple items. The gift giver may then gift the token to the intended recipient, whereby the intended recipient may redeem the token for the basket of items. Redeeming the token for the basket of items may include performing a plurality of exchanges simultaneously (e.g., n exchanges for n items by redeeming n tokens, wherein n represents a count of items of the basket of items), a sequence of exchanges (e.g., a linked plurality of exchanges where each of the linked exchanges causes a single token to be redeemed for a single item until all of the item tokens are redeemed), conversion of each item token to a percentage of the tokenized token (e.g., based on a value of the item token and the value of the basket of items), and the like.

In some embodiments, the item management system 202 may require sellers without adequate history to escrow an amount of funds equal to the value of the goods being sold on the tokenization platform 100. The seller may sell a token representing an item, and when the token is redeemed by the token owner (e.g., the buyer or downstream recipient), the funds are removed from escrow and returned to an account of the seller. In these embodiments, the seller does not need to escrow the physical item, which requires at least one additional shipment to be made to a warehouse or other storage facility.

In embodiments, the buyer marketplace system 204 allows a consumer to browse or search for items, view virtual representations of items, and engage in transactions for the items. In embodiments, the buyer marketplace system 204 presents a GUI that includes a search bar that allows users to enter a search query comprised of one or more search terms. In response to receiving the search query, the buyer marketplace system 204 may query one or more indexes that index virtual representations using one or more of the search terms. The buyer marketplace system 204 may process the search query and perform the subsequent search using any suitable search techniques. In response to performing the search, the buyer marketplace system 204 may retrieve the virtual representations implicated by the search and may present the virtual representations in a visual manner. For example, the GUI may display a search engine results page (SERP) that displays one or more search results, where each search result corresponds to a different virtual representation and links to a respective page where the user can view the attributes of the item as defined in the virtual representation of the item, including any media contents associated with the item and the price of the item, and can elect to purchase a token corresponding to the item.

In embodiments, the buyer marketplace system 204 may allow users to browse virtual items offered on the platform. For example, the buyer marketplace system 204 may present a GUI that allows a consumer to filter items by category or by other attributes. The GUI may allow a user to select a link corresponding to an item, which directs the user to a page where the user can view the attributes of the item as defined in the virtual representation of the item, including any media contents associated with the item and the price of the item, and can elect to purchase a token corresponding to the item.

In embodiments, when the consumer elects to purchase an item, the buyer marketplace system 204 may notify the ledger management system 104 regarding the purchase. The buyer marketplace system 204 may provide the ledger management system 104 with the public address of the user and an identifier of the virtual representation of the selected item. The ledger management system 104 may effectuate the transaction by assigning a token from the set of tokens corresponding to the virtual representation to the account associated with the public address of the user and updating the distributed ledger to indicate the change of ownership of the assigned token to the public address of the user. For example, the buyer marketplace system 204 (or the transaction system 106) may identify a token that is currently owned by the seller and may transfer ownership of the token to an account of the buyer. Once this occurs, a copy of the token may be deposited into an account of the user. For example, the token may be deposited in a digital wallet of the user.

In embodiments, the buyer marketplace system 205 may depict items as individual thumbnail images. In some of these embodiments, a simple box style user interface element can be added to the Item detail pages to display the attributes of an item, including an item description attribute, item notes attributes, and a seller URL attribute. An item description field on the GUI can support clickable URLs that can redirect platform users to pages with more information about the product or other relevant pages. The item description textbox can be displayed and support links to third-party domains.

In embodiments, the buyer marketplace system 204 may allow users to purchase made-to-order items. For example, a user may order a customized pizza, piece of furniture, flower arrangement, or the like. Users can digitally build items consisting of multiple items from multiple merchants and have the item 3D printed at a 3D printing station.

Ledger Management System

Figure 3:
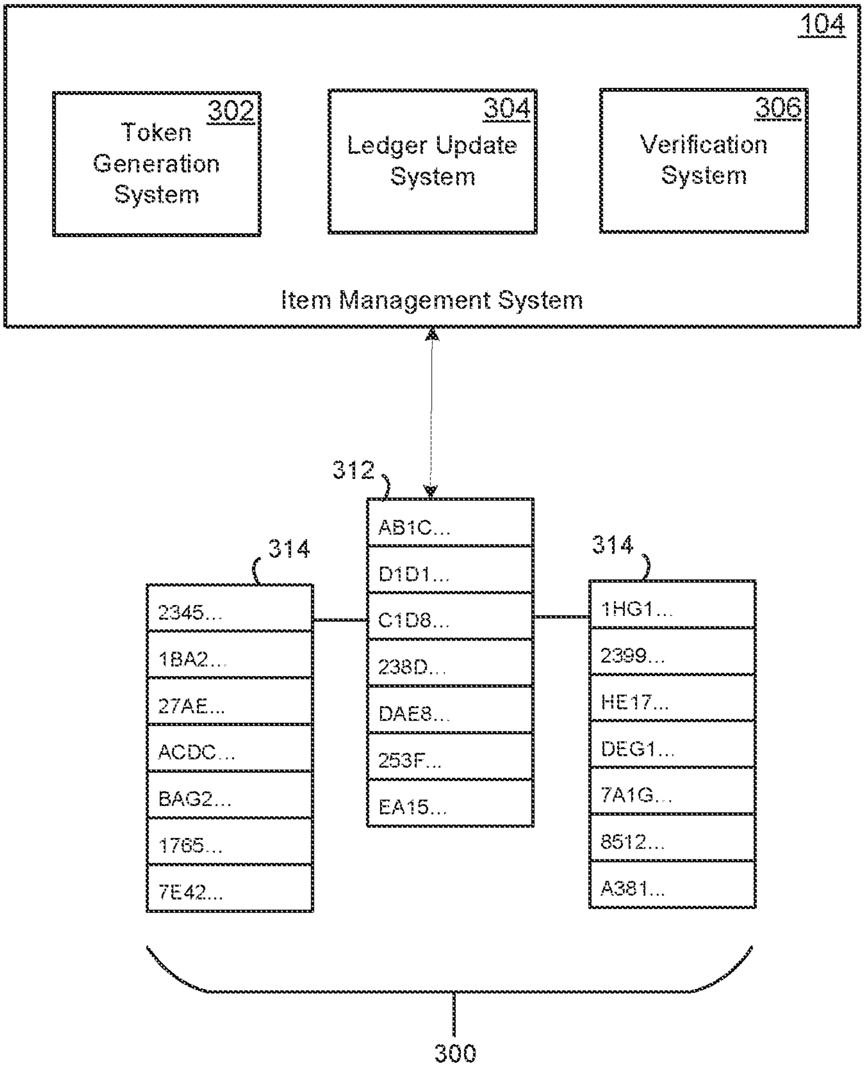
FIG. 3 is a schematic illustrating an example ledger management system according to some embodiments of the present disclosure.

FIG. 3 illustrates an example of a ledger management system 104 of the tokenization platform 100 that manages one or more distributed ledgers 210 in accordance with some implementations of the present disclosure. In embodiments, the ledger management system 104 includes a token generation system 302, a ledger update system 304, and a verification system 306. The token generation system 302 may be configured to generate tokens that correspond to items made available for transaction and that are based on respective virtual representations of the items. The ledger update system 304 receives requests to update the distributed ledger 310 and updates the distributed ledger accordingly 310. The verification system 306 receives requests to verify a token, an account, or the like and attempts to verify the token or account based on the distributed ledger.

In embodiments, the distributed ledger 310 may be a public ledger, such that N node computing devices 160 store N respective copies of the ledger 310, where each copy includes at least a portion of the distributed ledger 310. In other embodiments, the distributed ledger 310 is a private ledger, where the ledger is distributed amongst nodes under control of the platform 100. In embodiments, the distributed ledger 310 is a blockchain (e.g., an Ethereum blockchain comporting to the ETC protocol). Alternatively, the distributed ledger 310 may comport to other suitable protocols (e.g., Hashgraph, Byteball, Nano-Block Lattice, or IOTA). By storing tokens on a distributed ledger 310, the status of that token can be verified at any time by querying the ledger and trusting that it is correct. By using the token approach to implementation, tokens cannot be copied and redeemed without permission.

The distributed ledger 310 may store any suitable data relating to an item, a user, a seller, and the like. In embodiments, the distributed ledger 310 may store item-related data. Item-related data may include, but is not limited to, item identifiers, expiration dates of items, conditions or restrictions placed on the items, item descriptions, media content related to items (e.g., photographs, logos, videos, and the like), documentation of the item, customization options, available sizes, available colors, available materials, functionality options, ingredients, prices, special offers or discounts relating to the item, location information (e.g., where an item can be delivered/provided), hours available, owner/custodian data, reviews, item type, and the like. In embodiments, the distributed ledger 310 may store user data. User data may include, but is not limited to, identifying information (e.g., user ID, email address, name, and the like), public address, financial information (e.g., credit card information), transaction history, location data (e.g., a region of the user or country of the user), preferences, a wish list, subscriptions of the user, items belonging to the user, user connections or contacts, media content relating to the user (e.g., photos or videos of the user), an avatar of the user, and the like. In embodiments, the distributed ledger 310 may store merchant-related data. Merchant-related data may include, but is not limited to, identifying information (e.g., a name of the merchant, a merchant ID, and/or the like), contact information of the merchant, experience data, location data, hours available, reviews, media content (photographs, videos, and the like), and/or any other suitable merchant-related data. A distributed ledger 310 may store additional and/or alternative data.

In embodiments, the distributed ledger 310 includes side chains 314. A side chain 314 may refer to a shard of the distributed ledger 310 that extends from a segment (e.g., a block) of a main chain 312 of the ledger 310. In embodiments, the main chain 312 may store data that is related to merchants and users with accounts (e.g., public addresses). Additionally, or alternatively, the main chain 312 may store item classification data, such as descriptions of item classifications. In embodiments, a side chain 314 may pertain to a particular classification of item. In some of these embodiments, side chains 314 may store virtual representations of items belonging to a respective genus or class of items and data relating to those items. For example, a first side chain 314-1 may store virtual representations of shoes that are available on the platform 100 and any token-related data relating to those virtual representations. In embodiments, side chains 314 may store media contents that are used in connection with items available for transaction on the platform. For example, a second side chain 314-2 may store photographs depicting shoes represented in the first side chain 314-1, video clips depicting shoes represented in the first side chain 314-1, audio clips relating to shoes represented in the first side chain 314-1, virtual reality content depicting shoes represented in the first side chain 314-1, augmented reality content depicting shoes represented in the first side chain 314-1, and the like. The foregoing is one manner to shard a distributed ledger. The distributed ledger 310 may be sharded in any other suitable manner.

In embodiments, the token generation system 302 receives a virtual representation and generates one or more tokens corresponding to the virtual representation. In embodiments, the virtual representation includes attributes of an item, including a number (if bounded) of available items (i.e., the number of items available for transaction). In embodiments, the number of available items indicates the number of tokens that the token generation system 302 generates for a particular virtual representation. The attributes may also include other restrictions relating to the item, such as an expiry of a token (e.g., how long a token may be valid). The token generation system 302 may also receive initial ownership data. The initial ownership data defines the initial owner of a token. As a default, the entity offering the item represented by the virtual representation (e.g., the merchant of the item) is the initial owner of the token. The initial ownership may, however, be assigned to a different entity.

In embodiments, the token is a wrapper that wraps an instance of a virtual representation. In some of these embodiments, the token generation system 302 may generate a token identifier that identifies the token. In scenarios where the tokens are non-fungible tokens, the token generation system 302 may generate a unique identifier for each respective token corresponding to the virtual representation. The token generation system 302 may generate the token identifier using any suitable technique. For example, the token generation system 302 may implement random number genesis, case genesis, simple genesis, and/or token bridge genesis to generate a value that identifies the token. In embodiments, the token generation system 302 may digitally sign the value using a private key/public key pair. The token generation system 302 may utilize a private key/public key pair associated with the platform 100 or the merchant to digitally sign the value that identifies the token. The token generation system 302 may implement any suitable digital signature algorithm to digitally sign the value that identifies the token, such as the Digital Signature Algorithm (DSA), developed by the National Institute of Standards and Technology. In embodiments, the resultant digital signature may be used as the token identifier. For each token, the token generation system 302 may generate a token wrapper that includes the token identifier and the virtual representation of the item. In embodiments, the token generation system 302 may embed or otherwise encode the public key used to digitally sign the token in the token. Alternatively, the token generation system 302 may store the public key apart from the token, such that the public key is communicated to an account of the token owner each time the token is transferred to a new owner. Upon generating a non-fungible token, the token generation system 302 may output the non-fungible token to the ledger update system 304. The wrapper may wrap a plurality of tokens, including fungible tokens and non-fungible tokens.

In some embodiments, the token generation system 302 may generate fungible tokens. In these embodiments, the token generation system 302 may generate identical tokens, where each token has the same token identifier. In these embodiments, the token generation system 302 may generate a single token identifier, in the manner described above, and may generate N fungible tokens using that token identifier, where N is the number of total tokens. Upon generating the N fungible tokens, the token generation system 302 may output the N fungible tokens to the ledger update system 304.

In embodiments, the ledger update system 304 is configured to update and maintain one or more distributed ledgers 310. As used herein, updating and maintaining a distributed ledger 310 may refer to the writing of data to the distributed ledger 310. In embodiments, the ledger update system 304 may generate a block in accordance with the protocol to which the distributed ledger comports, where the block contains the data to be written to the distributed ledger 310. In embodiments, the ledger update system 304 may update the distributed ledger 310 by broadcasting the generated block to the computing nodes 160 that store the distributed ledger 310. The manner by which a computing node 160 determines whether to amend the received block to its local copy of the distributed ledger 310 may be defined by the protocol to which the distributed ledger comports.

In embodiments, the ledger update system 304 receives tokens and updates the distributed ledgers 310 based thereon. In some of these embodiments, the ledger update system 304 receives a token and ownership data (e.g., a public address of the entity to which the token is to be assigned) and updates the distributed ledger 310 based thereon. For example, the ledger update system 304 may generate a block having the token embedded therein. The generated block or a subsequently generated block may include the ownership data pertaining to the token. The ledger update system 304 may then write generated block(s) to the distributed ledger 310. For example, the ledger update system 304 may amend the block(s) to a copy of the distributed ledger 310 maintained at the platform 100 and/or may broadcast the block(s) to the computing nodes 160 that store copies of the distributed ledger 310, which in turn amend the respective copies of the distributed ledger with the broadcast block(s). In embodiments where the distributed ledger 310 is sharded, the ledger update system 304 may designate a side chain 314 (e.g., an item classification) to which the token corresponds. In these embodiments, the generated blocks are amended to the designated side chain 314 to indicate the existence of the token and the current ownership of the token.

In embodiments, the ledger update system 304 receives an ownership change request requesting to change ownership of a token to another account. For example, the ledger update system 304 may receive an ownership change request in response to a purchase of a token, a gifting of a token, a resale of the token, a trade of a token, and the like. In some embodiments, the ownership change request may define a token to be transferred and a public address of the transferee of the token (e.g., a recipient of the token). In some embodiments, the ownership change request may further include a public address of the current owner of the token (assuming the token has a current owner). The ledger update system 304 may receive the ownership change request and may generate a block to indicate the new owner of the implicated token. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In embodiments where the distributed ledger 310 is sharded, the ledger update system 304 may designate a side chain 314 (e.g., an item classification) to which the token corresponds. In these embodiments, the generated blocks are amended to the designated side chain 314 to indicate the new owner of the token.

In embodiments, the ledger update system 304 receives a new or altered virtual representation and updates the distributed ledger 310 to reflect the new or altered virtual representation. For example, the ledger update system 304 may receive a new visual representation when a seller defines a new item that is available for transaction. The ledger update system 304 may receive an altered virtual representation in response to a seller altering one or more attributes of a previously defined virtual representation. In embodiments, the ledger update system 304 receives a new or altered virtual representation and generates one or more blocks based on the received virtual representation. The ledger update system 304 may then write the generated block(s) to the distributed ledger 310 based on the generated block(s). For example, the ledger update system 304 may amend the block(s) to the distributed ledger and/or may broadcast the block(s) to the computing nodes 160 that store the distributed ledger. In embodiments where the distributed ledger 310 is sharded, media content pertaining to a virtual representation may be stored in a separate side chain 314. In some of these embodiments, the media contents may be stored in separate blocks from the virtual representation, where the block containing the virtual representation may include references to the blocks containing the corresponding media contents. The ledger update system 304 may designate a side chain 314 (e.g., an item classification) to which the virtual representation corresponds and a side chain 314 to which the media content block(s) should correspond. In these embodiments, the generated blocks are amended to the respective designated side chains 314 to indicate the new or amended virtual representation. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In embodiments where the distributed ledger 310 is sharded, the ledger update system 304 may designate a side chain 314 (e.g., an item classification) to which the burned token corresponds. In these embodiments, the generated blocks are amended to the designated side chain 314 to indicate the new and/or amended virtual representation(s).

In embodiments, the ledger update system 304 is further configured to "burn" tokens. Burning tokens may refer to the mechanism by which a token is deemed no longer redeemable. A token may be burned when the token expires or when the token is redeemed. In embodiments, the ledger update system 304 may update the ownership of the token to indicate that the token is not currently owned (e.g., owner=NULL) and/or may update the token state to indicate that the token is no longer valid. In some of these embodiments, the ledger update system 304 may generate a block indicating that the token is not currently owned or that the state of the token is not valid. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In some embodiments, the distributed ledger 310 is sharded. In these embodiments, the ledger update system 304 may designate a side chain 314 (e.g., an item classification) to which the token corresponds. In these embodiments, the generated blocks are amended to the designated side chain 314 to indicate the burned token.

The ledger update system 304 may update the distributed ledger 310 to indicate other data as well. In embodiments, the leger update system 304 may maintain and update merchant data and/or user data on the distributed ledger 310. For example, the ledger update system 304 may maintain a public address list of valid accounts. The ledger update system 304 may update the cryptographic ledger to reflect new accounts that are added to the platform 310 with the public addresses of those accounts. The ledger update system 304 may store additional or alternative merchant and user data on the distributed ledger as well.

In embodiments, the verification system 306 verifies data stored on the distributed ledger 310. In embodiments, the verification system 306 may verify the validity of tokens and/or may verify the ownership of a token. The verification system 306 may be configured to validate other types of data stored on the distributed ledger 310 as well.

In embodiments, the verification system 306 receives a token verification request. The token verification request may include a token to be verified or a token identifier thereof. In these embodiments, the verification system 306 may determine whether the token identifier of the token to be verified is stored on the distributed ledger 310. If it is not stored on the distributed ledger 310, the verification system 306 may deem the token to be invalid. In some embodiments, the token verification request may further include a public key to be used to verify the token. In these embodiments, the verification module 306 may use the received public key to determine whether the public key corresponds to a token that is stored in the distributed ledger 310. In some of these embodiments, the verification system 306 uses the received public key and the private key used to encode the digital signature to determine whether the received public key is the public key used to sign the token. For example, in embodiments, the verification system 306 may attempt to decrypt the digital signature using the private key and the received public key. If the private key and the received public key enable decryption of the digital signature to obtain the value used to generate the token, then the verification system 306 may deem the token valid and may notify the requesting system of the verification.

In embodiments, the verification system 306 may be configured to verify the ownership of a token. In these embodiments, the verification system 306 may receive a public address to be verified and a token (or an identifier thereof). In some embodiments, the verification system 306 may verify that the public address corresponds to an account on the platform 100. For example, the verification system 306 may determine whether the public address is stored in the public address list on the distributed ledger 310. If so, the verification system 306 may determine whether the ownership data relating to the token is currently owned by the account indicated by the received public address. If so, the verification system 306 may verify the ownership of the token and may output the verification to the requesting system.

Transaction System

Figure 4:
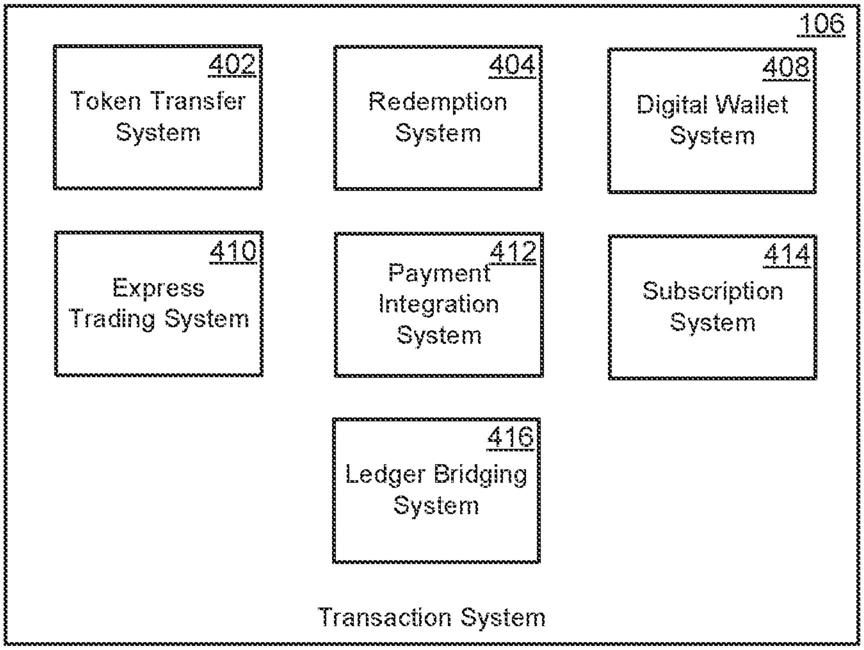
FIG. 4 is a schematic illustrating an example transactions system according to some embodiments of the present disclosure.

FIG. 4 illustrates an example of a transaction system 106 of the tokenization platform 100, according to some embodiments of the present disclosure. In some embodiments, the transaction system 106 includes a token transfer system 402 and a redemption system 404. The transaction system 106 may include additional or alternative systems without departing from the scope of the disclosure. For example, the transaction system 106 may include a digital wallet system 408, an express trading system 410, a payment integration system 412, a subscription system 414, and/or a token bridging system 416.

In embodiments, the token transfer system 402 facilitates the transfer of tokens from an account of an owner of the token an account of a different user. In embodiments, token transfer system 402 may include smart contracts that define the conditions under which a token may be transferred. In some of these embodiments, smart contracts may reside in tokens, such that the smart contract may execute at a node computing device and/or from a digital wallet. In some of these embodiments, a smart contract may interface with the token transfer system 402 via a smart contract API that is exposed by the API system 108.

In embodiments, the token transfer system 402 receives a transfer request that requests a transfer of a token to an account. A transfer request may be received from an account of the token holder or from the account of the intended recipient of the token. In embodiments, the transfer request may include a public address of the account to which the token is to be transferred and may further include or indicate the token to be transferred. For example, the transfer request may include a copy of the token or a value (e.g., an alphanumeric string) that uniquely identifies the token. In some embodiments, the transfer request includes a public key of the entity that digitally signed the token. In some embodiments, the transfer request may include a public address of the token owner that is requesting to transfer the token.

The token holder may initiate the transfer of a token from the digital wallet of the token holder. In some embodiments, transfers of tokens may be performed via the platform 100. In these embodiments, the token owner may initiate a transfer of the token by instructing the digital wallet to send a transfer request to the token transfer system 402 (e.g., via a GUI of the digital wallet). In these embodiments, the token transfer system 402 may receive the transfer request and may determine whether the token is a valid token, and whether the public address of the owner and/or the recipient are valid. If the token is valid and the public addresses of the owner and/or the recipient are valid, the token transfer system 402 may transmit a copy of the token to a user device and/or account associated with the intended recipient. Once accepted by the recipient, the token transfer system 402 may instruct the ledger management system 104 to update the distributed ledger to indicate the change of ownership of the token, such that the distributed ledger indicates that the recipient is the current owner of the token.

Figure 7:
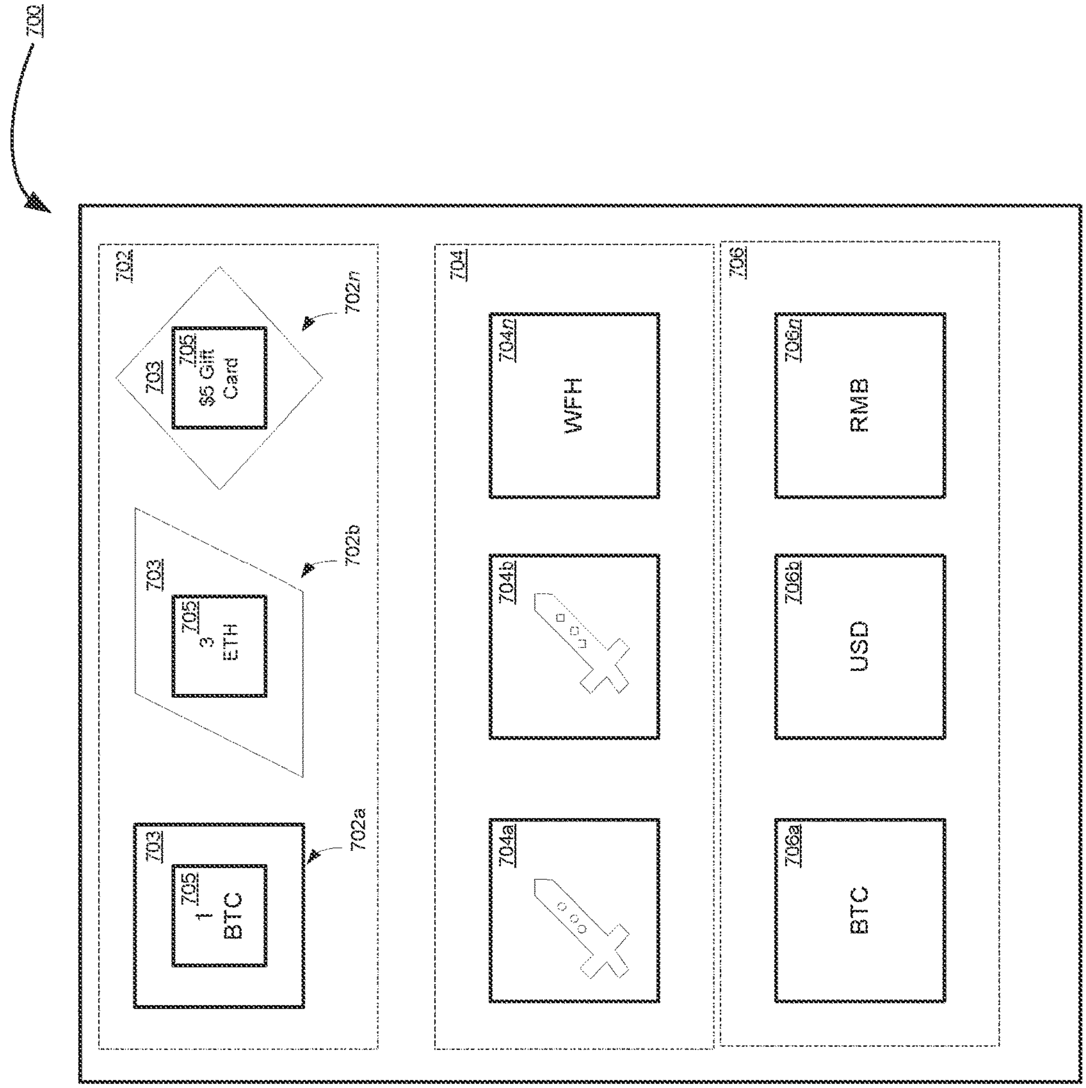
FIG. 7 is a user interface displaying tokens within a wallet, according to some embodiments of the present disclosure.

Referring now to FIG. 7A, an illustration of a wallet 700 display is shown. The display of the wallet 700 includes a plurality of tokens, such as tokenized tokens 702*a*-702*n* (generally 702), non-fungible tokens 704*a*-704*n* (generally 704), and fungible tokens 706*a*-706*n* (generally 706). As can be seen, in embodiments, the tokens are grouped by token type. The tokenized tokens 702 may include displayed indicia 703 communicating the type and, in embodiments, the amount of particular contents 705 contained within the respective tokenized token 702. For example, the user's Bitcoin within the platform 100 may split among a fungible token 706*a* balance and one or more tokenized tokens 702*a*. Moreover, the fungible Bitcoin 706*a* may be a consolidated balance of the user's fungible bitcoin 706*a*, or may be separate balances (e.g., balance equal to amount of bitcoin transferred into the platform 100 in a single transaction).

The non-fungible tokens 704 may include display indicia to communicate pertinent information related to the token. For example, a plurality of purchasable skins 704*a*, 704*b* and work-for-hire 704 may be grouped together, and each may display indicia such as an image of the good. The fungible tokens 706*a*-706*n* are tokens corresponding with fungible goods. For example, the fungible tokens 706*a*-706*n* may include currencies, cryptocurrencies, commodities, etc.

In embodiments, the digital wallet is configured to transmit the token directly to a user device 190 or account (e.g., an email account, an account on a 3rd party messaging app), whereby the recipient of the token may accept the token. In some of these embodiments, the digital wallet of the recipient may transmit a transfer request to the token transfer system 402 indicating a request to transfer the token to the recipient, in addition to sending a copy of the token to the intended recipient. In these embodiments, the token transfer system 402 may determine whether the token is a valid token and whether the public address of the owner and/or the recipient are valid. If the token is valid and the public addresses of the owner and/or the recipient are valid, the token transfer system 402 may allow the recipient to accept the token into a respective digital wallet of the recipient. Once accepted by the recipient, the token transfer system 402 may instruct the ledger management system 104 to update the distributed ledger to indicate the change of ownership of the token, such that the distributed ledger 310 indicates that the recipient is the current owner of the token.

Alternatively, in some embodiments, the digital wallet of the token owner does not transmit a transfer request to the token transfer system 402. In these embodiments, the user device 190 of the recipient of a token may present a mechanism by which the token owner may accept the token. For example, the user device 190 may present a link to accept the token. Upon the intended recipient accepting the token, the user device 190 (e.g., via an instance of the digital wallet of the recipient) may transmit the transfer request to the token transfer system 402. In this scenario, the token transfer system 402 may determine whether the token is a valid token and whether the public address of the owner and/or the recipient are valid. If the token is valid and the public address of the owner and/or the recipient are valid, the token transfer system 402 may instruct the ledger management system 104 to update the distributed ledger to indicate the change of ownership of the token, such that the distributed ledger indicates that the recipient is the current owner of the token.

As discussed, in response to a transfer request, the token transfer system 402 may determine whether the token is a valid token and whether the public address of the owner and/or the recipient are valid. In embodiments, a token may be validated using a public key associated with the token. For example, the token transfer system 402 may provide the token (or an indicator thereof) and a public key indicated in the transfer request to the ledger management system 104. The ledger management system 104 may determine whether the token identifier is stored on the distributed ledger, and if so, may verify that the public key provided with the transfer request is the public key that was used to digitally sign the token. In embodiments, the token transfer system 402 may validate the identities of the recipient and/or the token owner wishing to transfer the token using the public addresses thereof. In some of these embodiments, the token transfer system 402 may provide the public address of the recipient and/or the public address of the token owner to the ledger management system 104, which may, in turn, look up the respective public address to verify that the public address is stored on the distributed ledger. In response to determining that the token is valid and the public addresses of the token owner and/or the recipient are valid, the token transfer system 402 may allow the transfer of the token and may instruct the ledger management system 104 to update the distributed ledger to indicate the change of ownership of the token, such that the distributed ledger indicates that the recipient is the current owner of the token.

In embodiments, the redemption system 404 allows an owner of a token to redeem the token. The redemption system 404 may receive a request to redeem (or "redemption request") the token. The redemption request may include the token or an identifier of the token (e.g., an alphanumeric string) and may include a public address of the user attempting to redeem the token. In embodiments, the redemption request may further include the public key used to digitally sign the token. In response to receiving the redemption request, the redemption system 404 may provide the token, the public address of the user attempting to redeem the token, and the public key used to digitally sign the token to the ledger management system 104. The ledger management system 104 may then either verify or deny the token/public address combination. The ledger management system 104 may deny the combination if the token is not a valid token and/or the user is not the listed owner of the token. The ledger management system 104 may verify the token/public address combination if the token is deemed valid and the requesting user is deemed to be the owner of the token.

In response to verifying the token/public address combination, the redemption system 206 may execute a workflow corresponding to the virtual representation to which the redeemed token corresponds. For example, in some scenarios, the user may be redeeming a token corresponding to a digital item (e.g., a gift card, an mp3, a movie, a digital photograph). In these scenarios, the redemption system 404 may determine a workflow for satisfying the digital item. For example, the redemption system 404 may request an email address from the user or may look up an email address of the user from the distributed ledger. In this example, the redemption system 404 may email a link to download the digital item to the user's email account or may attach a copy of the digital item in an email that is sent to the user's email account. In another scenario, the user may be redeeming a token corresponding to a physical good (e.g., clothing, food, electronics, etc.) or a physical service (e.g., maid service). In the case of a physical good, the redemption system 404 may determine a workflow for satisfying the physical item. For example, the redemption system 404 may present a GUI to the user that allows the user to enter shipping information of the user. Alternatively, the redemption system 404 may look up the shipping information of the user from, for example, the distributed ledger or a user database. The redemption system 404 may then initiate shipment of the physical good. For example, the redemption system 404 (or a logistics system) may transmit a shipping request to a warehouse that handles shipments of the good indicating the shipping information. The foregoing are examples of how a token may be redeemed.

The redemption system 404 may execute additional or alternative workflows to handle redemption of a token. For example, in some scenarios the initial purchaser of the token may not have specified certain parameters of an item that are needed to satisfy the transaction. For example, if the item is clothing, the initial purchaser may not have specified the size and/or color of the item. In another example, if the item is a food item, the initial purchaser may not have specified side orders, toppings, drink choices, or the like. If the item is an experience such as plane tickets or a hotel reservation, the initial purchaser may not have specified dates of travel. In these scenarios, the redemption system 404 may present a GUI that allows the redeemer of the token to specify the needed parameters, so that the transaction may be specified. In response to receiving the parameters, the redemption system 404 may ascribe these parameters to the instance of the virtual representation or to any other suitable data structure corresponding to the satisfaction of the transaction (e.g., a delivery order, a purchase order, etc.), such that the transaction may be satisfied.

In some embodiments, certain tokens generated by the tokenization platform 100 may include temporal attributes that relate to the redeemability of the token. In these embodiments, the temporal attributes may define when a token becomes redeemable and/or when the token is no longer redeemable. The temporal attributes of a token may be implemented in a number of different ways. For example, in some embodiments the temporal attributes may be included in the mutable or immutable attributes of the token. Additionally or alternatively, the temporal attributes of the token may be encoded in the smart contract that governs the redemption of the token. The temporal attributes may be defined by a seller, an entity that is tasked with fulfilling the items upon redemption, and/or other suitable parties.

In some embodiments, certain tokens and/or the redemption rights thereof may be perishable, such that the redemption rights of the token expire at a predetermined time or upon the occurrence of a predetermined event. In some these embodiments, the temporal attributes of the respective tokens may include an expiry attribute that denotes a date on which the token is no longer redeemable and/or another predetermined condition that extinguishes the redemption rights of the token. In these embodiments, the seller may provide an expiry in the virtual representation that indicates a date and/or other condition that the redemption rights are no longer valid, such that when the expiry is reached, the token may be rendered irredeemable and/or invalid and the owner of the token will no longer be able to redeem the token. In these example embodiments, use of an expiry with respect to a redeemable token may avoid having to have the seller or safekeeper store the physical item for an indefinite amount of time and may also facilitate more efficient order fulfillment if the tokens are redeemable at a certain time. In some embodiments, the smart contract that governs the redemption of the token may trigger a specific workflow if the expiry condition is reached, such as automatically initiating a refund to the token owner for the original price (and not the secondary market price) of the token when the expiry condition is triggered. In these embodiments, the seller may then relist the item that was never redeemed without unfairly prejudicing the token owner that was prevented from redeeming the token. It is noted that other tokens may not be refundable upon the expiration of the redemption rights. For example, if the item is a promotional item or an item that loses value after the expiry date, the seller may not wish to refund the token owner if the token owner fails to redeem the token by the expiry date.

Additionally or alternatively, the temporal attributes of certain tokens may designate a date and/or another predetermined conditions that trigger the tokens redemption rights. For instance, in some embodiments certain tokens may be redeemable on a certain date, such that the owner of the token can only redeem the token for the item on or after the certain date. Additionally or alternatively, certain tokens may become redeemable when a certain condition is realized. For instance, for items that were not yet in existence when the tokens were sold, the tokens may become redeemable once the items are in possession of the seller. In another example, for items that are aged, such as wine or whiskey, tokens that are redeemable for such items may become redeemable once the items are ready for distribution. For example, a wine maker or whiskey distiller may decide that a certain batch of wine or whiskey is ready for bottling. Once deemed ready by the appropriate entity, the tokens may become redeemable. In this way, the redemption rights may materialize once the seller believes that certain quality standards have been met. In these embodiments, the smart contract governing redemption of the tokens may include conditional logic that is triggered when electronic verification of the item being ready for redemption is received by the smart contract. In some of these embodiments, the conditional logic may trigger a workflow that alerts the token holders that the tokens are now redeemable. In these example embodiments, the token holders may be identified upon inspection of the distributed ledger and/or the digital wallets of the token holders.

In embodiments, the transaction system 106 includes a digital wallet system 408 that supports digital wallets. A digital wallet may be tokens that are owned by an owner of the account associated with the digital wallet and may provide a graphical user interface that allows the user to view, redeem, trade, transfer, gift, deposit, withdraw, or otherwise transact with their tokens. In embodiments, the digital wallet system 408 provides an instant sell capability, where users can agree to sell tokens corresponding to items. For example, the instant sell capability may allow a user to sell items at the rate of 90% of the floor price. In some embodiments, other users may view some or all of the virtual representation instances owned by the account owner, in accordance with the user's privacy settings. Users may opt to hide or make private individual virtual representations or all virtual representations.

In some embodiments, the platform 100 and/or digital wallet of a user may provide visual indicia that may be associated with the token when being transferred to another person. For example, the visual indicia that may be associated with a token may include emojis, images, gifs, videos, and the like. These visual indicia may be used by the user when transmitting a token to another user. For example, if the token corresponds to a bouquet of flowers and the visual indicia is an emoji of a flower, the user may send the token in a message using the flower emoji. In this example, the user may access the token in the digital wallet (e.g., via a native application on a user device 190) and may select an option to send the token to a recipient. The user may identify the recipient (e.g., selecting from a list of contacts) and may be provided an opportunity to type a message. The client application (e.g., the digital wallet) may present a keyboard that includes the flower emoji, whereby the flower emoji represents the token. In response to the user selection of the flower emoji and subsequent "sending" of the token, the digital wallet application may initiate transmission of the message that includes the token/flower emoji. In this example, the digital wallet may also transmit a transfer request to the token transfer system 402 indicating that the transferring user has requested to transfer the token. The transfer request may include a copy of the token and a public address of the transferring user. In embodiments, the transfer request may further include a public address or other indicator (e.g., an email address, a phone number, a user id, or the like) of the intended recipient of the token.

In embodiments, the transaction system 106 includes an express trading system 410 in which users may trade one or more assets without exchanging money. In these embodiments, the express trading system 410 provides a mechanism by which users can safely trade tokens, where each token represents a different item. In an example operation, a first user may make a trade offer in a smart contract to a second user to exchange one or more tokens for one or more tokens in return. The second user may accept by transferring the requested virtual asset. The smart contract then marks the transaction as completed. In embodiments, the express trade system 410 may provide a GUI that allows a user to view an inventory of tokens, create offers, accept offers, and/or cancel offers.

In embodiments, the transaction system 106 includes a payment integration system 412. The payment integration system 412 allows a user to purchase a token corresponding to an item. The payment integration system 412 may accept credit cards, different forms of currency, and/or cryptocurrency.

In some embodiments, the transaction system 106 includes a subscription system 414. In these embodiments, users can subscribe to a service to receive items that they consume regularly via the subscription system 414.

In embodiments, the transaction system 106 includes a ledger bridging system 416. The ledger bridging system 416 provides a framework to secure or lock down an original virtual asset in a first decentralized ledger system (or any holder of currency, including traditional banks) and creating a tradeable duplicate in a second decentralized ledger system. In this way, users may fund their accounts on the tokenization platform 100 with different currencies and different transfer vehicles, and may then engage in transactions (e.g., trade, gift, or redeem) using the different currencies. In some embodiments, the decentralized ledger bridging system 416 provides an escrow function across decentralized ledger systems (e.g., ledger systems that are separate and apart from the distributed ledgers 310 of the platform 100). In embodiments, the ledger bridging system 416 or a digital wallet may provide a token deposit GUI and/or a token withdrawal GUI.

In embodiments, the ledger bridging system 416 allows a user to fund their account with one or more external currencies. For example, a user may fund an account with Bitcoin, Ethereum coins, other suitable cryptocurrencies, and/or traditional currencies (e.g., U.S. Dollars, British Pounds, Euros, Chinese Yuan, Japanese Yen, and/or the like). In the case of cryptocurrencies, a user may facilitate a transfer of cryptocurrency from an external account, for example, using a non-affiliated digital wallet that stores the user's cryptocurrency. In the case of traditional currencies, a user may transfer funds into his or her account using, for example, a credit card, a direct money transfer, an ACH transfer, or the like. In some embodiments, when the user transfers funds (cryptocurrency or traditional currency) into an account with the tokenization platform 110 (which may be referred to as a "funding transaction"), the ledger bridging system 416 may generate a record corresponding to the funding transaction and may provide the record to the ledger management system 104, which may update the distributed ledger to reflect the funding transaction. The record may indicate the account to which the funds were transferred, the account from which the funds were transferred, an amount that was transferred, a date and time of the transfer, and/or any other suitable data.

Once an account is funded, a user can then use the transferred funds to participate in any transaction on the tokenization platform 100. In some embodiments, at least a subset of the transferred funds is tokenized in a manner that comports with the protocol supported by the tokenization platform 100 and/or the distributed ledger 312 corresponding thereto. In embodiments, the ledger bridging system 416 may tokenize one or more crypto coins (e.g., a bitcoin), any fraction of crypto coins, or any amount of currency in response to a request corresponding to the user. The request to tokenize funds may be an explicit request or an implicit request. An explicit request may refer to when the user specifically requests the tokenization of a certain amount of currency. An implicit request may refer to when the user engages in a transaction on the tokenization platform 100 that implicates the transferred funds in the user's account, such that at least a portion of those funds need to be tokenized to facilitate the transaction (e.g., the user purchases an item and elects to pay for the item using some of the transferred funds in the user's account. Regardless of whether the request is implicit or explicit, the ledger bridging system 416 may tokenize the certain amount of currency.

In some of these embodiments, the ledger bridging system 416 tokenizes a specified amount of currency by minting a tokenized token that "wraps" the certain amount of currency. A tokenized token may refer to a non-fungible token that has attributes that define the type of currency and an amount of currency represented by the coin (e.g., an amount of bitcoin, Ethereum, dollars, pounds, or the like). In some of these embodiments, a tokenized token may refer to a non-fungible token that has a set of attributes defining characteristics of such token in addition to having a set of fungible and/or non-fungible tokens representing digital currency balance(s) enclosed within a tokenized token and/or other digital item(s). In addition, tokenized token can contain business rules governing redemption, transfer and other tokenized token lifecycle mechanisms. In some embodiments, the ledger bridging system 416 mints the new token by requesting the generation of a new token by the token generation system 302. The ledger bridging system 416 may provide the type of currency, the amount of currency, and ownership data (e.g., the account to which the new tokenized token will belong) to the token generation system 302. In response, the token generation system 302 generates a tokenized token, for example, in the manner described above. In this way, the token generation system 302 treats the currency as an "item." In this way, a tokenized token may be exchanged (e.g., for other tokenized tokens or tokenized items), gifted, and/or redeemed. In some embodiments, the types of transactions that a tokenized token may participate in may be restricted. For example, tokenized tokens representing unstable currencies may be restricted from being exchanged but may be redeemed or gifted.

In embodiments, the ledger bridging system 416 further generates a visual indicium corresponding to the tokenized token as part of the minting process. In some embodiments, the visual indicia is a digital sticker (or "sticker"). For example, in some embodiments, the sticker may depict an amount and a symbol representing the currency (e.g., a sticker representing a tokenization of five dollars may depict "$5", or a sticker representing a tokenization of a tenth of a bitcoin may depict "Ƀ 5"). In this way, the sticker may be displayed in a wallet of an owner of the tokenized token. As discussed, the visual indicia may be used to convey to a user the tokenized tokens that the user owns. Additionally, in some embodiments, the visual indicia may be used to transfer tokenized tokens to other parties (e.g., via text message, messaging applications, email, and the like), as is described elsewhere in the disclosure.

In some embodiments, the ledger bridging system 416 may instantiate (or request the instantiation of) a smart contract corresponding to the tokenized token as part of the minting process. In these embodiments, the smart contract may define one or more base functionalities that govern the tokenized token lifecycle mechanisms such as ownership transfer and/or redemption logic. The base functionalities may include the ability to change ownership of the tokenized token, the types of transactions in which the tokenized token may be used (e.g., to make purchases, to gift, to exchange, to redeem for cash, etc.), and the like. Upon a new tokenized token being minted, the ledger bridging system 416 may instantiate an instance of the smart contract corresponding to the newly minted tokenized token. The instance of the smart contract may execute each time the tokenized token is involved in a transfer (e.g., exchanged, gifted, or redeemed). For example, each time an owner of the tokenized token requests to transfer the tokenized token, the instance of the smart contract may be implicated by the request and the instance of the smart contract can either disallow or facilitate the transfer depending on the contents of the request and the smart contract.

Once a tokenized token is minted, the funds represented by the tokenized token may be "escrowed" by the ledger bridging system 416. In this way, the user is prevented from removing funds from his or her account until the tokenized token is redeemed. In some embodiments, the ledger bridging system 416 may transfer the funds corresponding to the tokenized token from the account of the user to a designated escrow account. Alternatively, the ledger bridging system 416 may freeze the funds corresponding to the tokenized token, such that the funds may not be transferred by the user until the tokenized token is redeemed. Once a tokenized token is redeemed, the funds represented by the tokenized token may be released from escrow, deposited into the account of the redeeming user, and the tokenized token may be destroyed (also referred to as being "invalidated").

In embodiments, the ledger bridging system 416 updates, or initiates the update of, the distributed ledger. The distributed ledger may be updated upon a number of different occurrences. As discussed, in embodiments, the distributed ledger may be updated when a user initially funds an account. In embodiments, the ledger bridging system 416 updates (or initiate the update of) the distributed ledger upon a new tokenized token being minted. In these embodiments, the distributed ledger is updated to reflect the existence of the new tokenized token and the ownership of the token. In embodiments, the ledger bridging system 416 updates (or initiate the update of) the distributed ledger with the instance of the smart contract corresponding to the tokenized token. In embodiments, the ledger bridging system 416 may update (or initiate the update of) the distributed ledger each time a tokenized token is transferred. In these embodiments, the distributed ledger may be updated to reflect the new owner of the tokenized token. In embodiments, the ledger bridging system 416 may update (or initiate the update of) the distributed ledger when a tokenized token when the token is redeemed and subsequently destroyed. In these embodiments, the distributed ledger may be updated to reflect that the tokenized token is no longer valid, the account that redeemed the token, and/or when the token was redeemed.

Intelligence System

Figure 5:
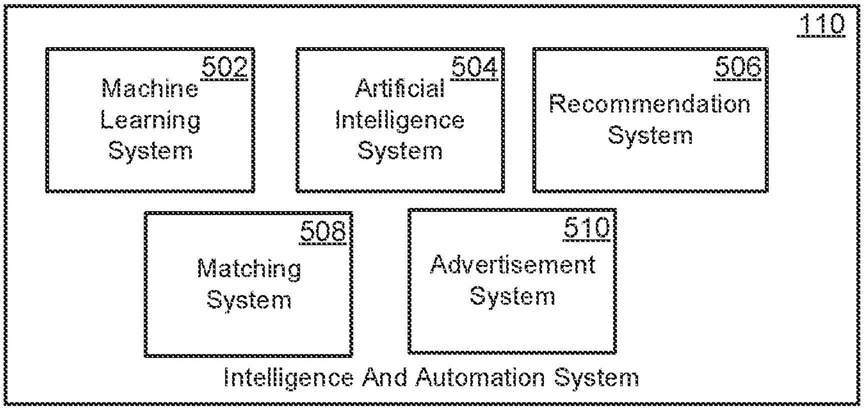
FIG. 5 is a schematic illustrating an example intelligence and automation system according to some embodiments of the present disclosure.

FIG. 5 illustrates the intelligence and automation system 110 according to some embodiments of the present disclosure. In embodiments, the platform includes an intelligence and automation system 110. The intelligence and automation system 110 may include a machine learning system 502, an artificial intelligence system 504, a recommendation engine 506, a service matching engine 508, an advertising system 508, and/or a notification system 510.

In embodiments, the machine learning system 502 may train machine-learning models based on training data. Examples of machine learned may include various types of neural networks, regression-based models, hidden Markov models, scoring models, and the like. The machine learning system 502 may train models in a supervised, semi-supervised, or unsupervised manner. Training can be done using training data, which may be collected or generated for training purposes. The machine learned models may be stored in a model datastore.

In an example, the machine learning system 502 may be configured to train a gift prediction model. A gift prediction model (or prediction model) may be a model that receives recipient attributes (e.g., a profile relating to an intended recipient) and/or item attributes of one or more items that may be provided as a gift and that outputs one or more predictions regarding sending a gift token to that particular consumer. Examples of predictions may be whether to send a gift to that user, gifts the user would value, and the like. In embodiments, the machine learning system 502 trains a model based on training data. In embodiments, the machine learning system 502 may receive vectors containing user data (e.g., transaction history, preferences, wish list virtual assets, and the like), virtual asset data (e.g., price, color, fabric, and the like), and outcomes (e.g., redemption, exchanges, and the like). Each vector may correspond to a respective outcome and the attributes of the respective user and respective item. The machine learning system 502 takes in the vectors and generates predictive model based thereon.

In embodiments, the machine learning system 502 trains risk scoring models using training data sets that indicate the features of users participating in a transaction, features of the transaction (e.g., the type of transaction (e.g., purchase, loan, sale, etc.), the size of the transaction (e.g., a dollar amount), and the like), and an outcome of the transaction indicating whether the transaction was successful or unsuccessful (e.g., did the buyer pay for the item after purchase, did the borrower pay the loan off or default on the loan, was the purchased item delivered and in sufficient condition, etc.). The training data sets may be based on transactions facilitated by the platform and/or generated by an expert.

In embodiments, the machine learning system 502 may store the predictive models in a model datastore. In embodiments, the machine learning system 502 may be further configured to update a model based on captured outcomes, which is also referred to as "reinforcement learning." In embodiments, the machine learning system may receive a set of circumstances that led to a prediction (e.g., item attributes and user attributes) and an outcome related to the treatment (e.g., redemption of item, exchange of item, refund of an item), and may update the model according to the feedback. As used herein, the machine learning techniques that may be leveraged by the machine learning system include, but are not limited to, decision trees, K-nearest neighbor, linear regression, K-means clustering, deep learning neural networks, random forest, logistic regression, Naïve Bayes, learning vector quantization, support vector machines, linear discriminant analysis, boosting, principal component analysis, and hybrid approaches.

In embodiments, the artificial intelligence (AI) system 504 leverages the machine-learned models to make predictions or classifications regarding purchasing, gifting, or other e-commerce outcomes with respect to user data and asset data. Examples of predictions include whether a user will purchase an item, whether a user will exchange a gifted item, redemption options such as delivery timing and delivery location, and the like. For example, the AI system 504 may leverage a gift prediction model to make predictions as to whether a recipient of a particular item will like a gift, return a gift, or exchange a gift.

In embodiments, the recommendation system 506 may be configured to provide recommendations to users regarding items. The recommendation system 506 may request a recommendation from the AI system 504 based on attributes of a user. The AI system 504 may output a set of recommendations and the recommendation system 506 may provide the recommendations to the user or another party. For example, the recommendation system 506 may provide users with recommendations of items to purchase based on a purchase history of the user.

In embodiments, an advertising system 508 is configured to determine advertisements to display to a user, where the advertisements relate to items that are offered for transaction on the platform. In embodiments, the advertising system 508 may present users with discounts, promotions, and the like.

In embodiments, a services-matching system 510 is configured to match consumers to service providers for user-selected services. In these embodiments, a user may be seeking service, and the service matching system 510 may identify service providers that are best suited to provide the service. For example, the services matching system 510 may match service seekers and service providers based on pricing, availability, location, and the like.

Figure 6:
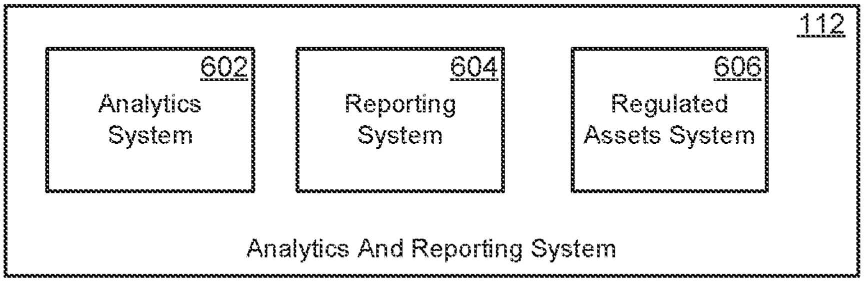
FIG. 6 is a schematic illustrating an example analytics and reporting system according to some embodiments of the present disclosure.

FIG. 6 illustrates the intelligence and automation system 110 according to some embodiments of the present disclosure. In embodiments, the analytics and reporting system 112 is configured to capture and report analytics relating to various aspects of the e-commerce platform 100. In embodiments, the analytics and reporting system 112 may include an analytics system 602, a reporting system 604, and/or a regulated asset system 606. In embodiments, the analytics and reporting system 112 may provide an analytics interface that allows a user to access the analytics and reporting system 112.

Analytics and Reporting

In embodiments, the analytics system 602 may track and analyze data relating to, but not limited to, consumer data, item data, merchant, manufacturer, or provider data, user behavior (e.g., purchase behavior, telemetry data, redemption data, and the like), and/or transaction events (e.g., when items are purchased, how items are purchased, how items are transferred, and the like). In embodiments, the analytics system 602 may track and analyze data relating to specific types of tokens, such as tokenized tokens, various types of NFTs, fungible tokens, and the like. In embodiments, the analytics system 602 is configured to analyze the attributes of one or more tokens (e.g., mutable and/or immutable attributes of a token) and/or data collected from the distributed ledger to provide analytics insight relating to a token or set of tokens. Examples of token attributes may include a schema of a token, a template ID of a token, a mint number of a token (e.g., an NFT), a series number of the NFT, attributes of an underlying asset (e.g., real-world item, digital artwork, digital media content, trading card, or the like), and/or the like. Examples of related data to a token may include: sales data of certain tokens (e.g., a collection of NFTs), such as a price of a sale, a time of the sale, the number of sales of a particular token, and the like; redemption data of certain tokens when redeemed, how many tokens have been redeemed from a set of tokens, how often a token was transferred before redemption, and/or the like; trading data of certain tokens, such as how often a particular token is traded for, the token(s) that are traded, the accounts of users that traded away or for certain tokens, a time of the trade, the values of the tokens that were traded, and/or the like; gifting data of certain tokens, such as accounts of users that gifted or were gifted certain tokens, the type of token that was gifted, the value of a gifted token, and/or the like. The foregoing are non-limiting examples of the types of data that may be collected by the analytics system and additional or alternative types of data may be collected by the analytics system without departing from the scope of the disclosure.

In embodiments, the analytics system 602 may receive the data from one or more data sources. In these embodiments, the data sources may be "on-chain" and/or "off-chain" data sources. An "on-chain" data source may refer to a data source that is executed by one or more nodes that host or otherwise interface with a distributed ledger that stores digital tokens and data relating thereto. Examples of on-chain data may include, but are not limited to, sale prices of digital tokens, trades involving digital tokens, transfers of digital tokens, smart contract data, decentralized marketplace data, decentralized lending data, unboxing data, redemption data, ownership data, on-chain search data, and/or the like. An "off-chain" data source may refer to a data source that provides data that is not stored on a distributed ledger. For example, data obtained from centralized marketplaces, databases, news items, data feeds, RSS feeds, social media data, stock index data, search engine requests, and/or the like may be referred to as "off-chain" data.

In some embodiments, the analytics system 602 may provide a set of interfaces (e.g., application programming interfaces (APIs)) that respectively collect data from the data sources. In some embodiments, the set of interfaces may include a "history" node that monitors a distributed ledger for new blocks being written to the ledger. In embodiments, the history node may be configured to filter the blocks for specific data types, such as blocks containing data that indicates generation, redemption, sale, gift, trade, or other transfer or action relating to one or more types of digital tokens. For instance, the history node may be configured to identify and index any block containing data relating to a specific set of NFTs. In these embodiments, the history node may monitor token identifiers (e.g., schema IDs, template IDs, mint numbers, and/or the like) to identify blocks that pertain to a specified set of NFTs. Once identified, the history node 602 may process and index the data contained in the identified blocks and/or may provide the data to the analytics system 602.

In some embodiments, the set of interfaces of the analytics system 602 may include or communicate with an oracle. In embodiments, an oracle may refer to a set of computing devices that are configured to collect and report off-chain data. For example, an oracle may be configured to obtain and report specific types of data, such as stock prices, sports scores, sales data, weather data, sensor data, and/or any other suitable type of data.

In embodiments, the analytics system 602 may use the collected off-chain data types in conjunction with token-specific on-chain data to provide analytics reports relating to specific sets of tokens. For example, the analytics system 602 may collect on-chain data relating to price data (e.g., primary market pricing and secondary market pricing) of a set of tokens. In this example, the analytics system 602 may process this on-chain data to determine pricing analytics corresponding to a particular token or set of tokens (e.g., an average price of a particular set of tokens, a predicted future price of the particular set of tokens, a range of prices of the set of tokens, and/or the like), transaction analytics corresponding to the set of tokens (e.g., the trading volume of the set of tokens, the types of transactions involving the tokens, and/or the like), redemption analytics (e.g., percentage of tokens that are redeemed, the rate at which tokens are being redeemed, the locations of people redeeming the tokens, and/or the like) and/or other suitable analytics. In embodiments, the analytics system 602 may additionally combine the on-chain analytics (e.g., pricing analytics derived from on-chain sources and/or the underlying data) with off-chain data. For example, the analytics system 602 may combine pricing-related analytics relating to a set of tokens released by or on behalf of a company with off-chain data relating to the performance of the company (e.g., stock prices, sales history, user engagement, social media mentions, and/or the like). In this example, the analytics system 602 may provide analytics insights relating to the performance of the company vis-à-vis the release of the tokens In another example, the analytics system 602 may combine baseball statistics received from a "stats" oracle with sales, trading, and/or transfer data relating to baseball-related NFTs (e.g., digital NFT-based trading cards and/or NFTs linked to and redeemable for physical baseball memorabilia) to identify correlations between player performances and a corresponding performance of baseball-related NFTs. For example, the analytics system 602 may determine correlations between player performance and NFT trading volume, pricing of the NFTs, overall circulation of the NFTs, and/or the like. In this example, the analytics system 602 may provide insight to future pricing of similar NFTs or on how the price of an NFT may change when the player is playing well or poorly.

In these examples, the analytics system 602 may filter, aggregate, and/or further process the received data to determine the defined analytics metrics, such as pricing analytics. In another example, the analytics system 602 may include a set of data collection services that collect data from a distributed ledger to determine cost analytics. In this example, the collected data may include attribute data for a set of virtual representations of real-world items, attribute data of the corresponding tokens, event data relating to the real-world items, event data relating to the digital tokens, transaction data relating to the digital tokens, and/or the like.

In embodiments, the analytics system 602 may maintain one or more data stores that store the collected data in a structured or unstructured manner. For example, the analytics system 602 may store the collected data in a data warehouse, a data lake, a database, and/or the like. For example, in supporting analytics relating to tokens that are cryptographically linked to virtual representations of real-world items, the analytics system 602 may include a set of data collection services that collect data from one or more interfaces. In these examples, the analytics system 602 may filter, aggregate, and/or further process data received from on-chain data sources and/or off-chain data sources to determine the defined analytics metrics. For example, the analytics system 602 may process the collected data to determine pricing analytics (e.g., an average price of a collection of tokens or certain tokens within a collection, a predicted future price of a collection of tokens or certain tokens within a collection, a range of prices of a collection of tokens or certain tokens within a collection, and/or the like), trading analytics (e.g., level of demand for a collection of tokens or certain tokens, trading volume for a collection or certain tokens, a demand curve for a certain type of tokens relative to the price of the tokens), behavioral analytics (e.g., most browsed collections, time spent browsing on a collection or particular type of token, probability of redemption of a collection of tokens or certain tokens, effects of certain external events on the popularity and/or pricing of a collection of tokens or a particular type of token, a measure of conversion of attention to a real-world entity or event and the purchases of the digital tokens, indicators of when or why certain tokens are redeemed, and/or the like), performance analytics (e.g., a sale volume of a collection of tokens or certain tokens within the collection, transfer volume of a collection of tokens or certain tokens within the collection, user attention/views of a collection of tokens or certain tokens within the collection, redemption volume of a collection of tokens or certain tokens within the collection, financial yield of a collection of tokens or certain tokens within the collection, profit margin of a collection of tokens or certain tokens within the collection, and/or the like), and/or cost analytics. In these example embodiments, the collected data may include attribute data for a set of virtual representations of real-world entities, attribute data of the corresponding tokens, event data relating to the real-world items, event data relating to the digital tokens, transaction data relating to the digital tokens, redemption data relating to the digital tokens, and/or the like. The analytics system 602 may collect, process, and/or store additional or alternative on-chain and/or off-chain data relating to the real-world items and/or the corresponding digital tokens.

In another example, the analytics system 602 may include a set of data collection services that collect data from a distributed ledger to determine cost analytics that pertain to a collection of tokens, multiple collections of tokens, or classes of tokens. In this example, the collected data may include data from participant nodes (e.g., nodes that host a distributed ledger) that indicates resources consumed by and/or fees paid to the node providers. For example, node devices may execute smart contracts that report fees they collect and/or fees they incur when performing certain actions. In these examples, the analytics system 602 may filter, aggregate, and/or further process the collected data to determine cost-related analytics, such as an expected cost to launch a collection (e.g., per-token costs), expected "gas fees" paid to node participants for particular actions (e.g., minting tokens, validating tokens, storing tokens, transferring tokens, and/or the like), an expected energy cost for particular types of actions (e.g., minting tokens, validating tokens, storing tokens, transferring tokens, and/or the like), computational costs for particular actions (e.g., minting tokens, validating tokens, storing tokens, transferring tokens, and/or the like), and/or the like.

In some embodiments, the analytics system 602 may include one or more analytic agents that are configured to execute a set of processes on collected data to produce an analytic result data structure. In some embodiments, an analytic agent may be configured to structure and filter data (e.g., on-chain and/or off-chain) collected from the set of interfaces (e.g., oracles, history nodes, APIs, and/or the like) to obtain a multi-dimensional structured data set. In some embodiments, the multi-dimensional structured data set may be stored in a data warehouse or other suitable data store. Once structured, an analytic agent may query the structured data set with a set of queries (e.g., SQL queries) and may further process the results of the queries (e.g., combine, aggregate, perform statistical analyses, and/or the like) to obtain an analytic result data structure. Depending on the types of collected data and the set of queries run, the contents of the analytic data structure will vary. For example, in some embodiments, an analytic result data structure may represent pricing analytics that indicate one or more of an average price of a digital token, a predicted future price of a digital token, a current market price of a digital token, and/or the like. In some of these example embodiments, the analytic agent is configured to obtain marketplace activity data (which may be on-chain and/or off-chain) relating to the buying and selling of a set of digital tokens, and may track, analyze, report on, and/or produce the pricing data based on the collected marketplace activity data.

In embodiments, an analytic agent may execute a set of workflows that produce event data relating to a set of digital tokens and/or transaction data relating to a set of transactions involving the set of digital tokens. In some of these embodiments, the set of workflows may be configured to process the collected data to identify events and/or transactions involving the digital tokens, which may also be stored as attributes in an analytic report data structure.

The analytics data derived from the analytics system 602 may be provided to a number of different systems of the tokenization platform 100. For example, in some embodiments, the analytics system 602 may provide the analytical data to an AI system, such that the AI system may determine whether to recommend buying or selling certain NFTs based on collected on-chain and off-chain data. Additionally or alternatively, analytics data derived from the analytics system 602 may be provided to a reporting system. In embodiments, the reporting system 604 reports analytics gained by the analytics system 602 to one or more parties. Interested parties may access the reporting system 604 and/or may subscribe to receive analytics reports. The reporting system 604 may be configured to generate reports based on the gathered analytics and to provide the reports to requesting users. In embodiments, the reporting system 604 may generate visualizations of the analytics data, data stories that are based on the analytics data, or the like.

It is appreciated that the foregoing provides non-limiting examples of NFT-based analytics and that the analytics system 602 may be configured to provide any suitable analytical insights using on-chain and/or off-chain data. For example, in embodiments the analytics system may be configured to generate and provide reports on aggregated ownership attributes of a category digital tokens, price attributes of a category of set of digital tokens, exchange activities with respect to a category of digital tokens items, search activities with respect to a category of digital tokens, escrow activities with respect to a category of digital tokens, financial performance of category of digital tokens, redemption activities with respect to a category of digital tokens, gifting activities with respect to a category of digital tokens. Furthermore, in the case of tokens linked to real-world objects, the analytics system 602 may generate and provide analytics reports pertaining to activities relating to a category of real-world objects, physical attributes with respect to the category of real-world objects, search activity relating to the category of real-world objects, exchange activities with respect to the category of real world objects, and/or the like.

In embodiments, the reporting system 604 reports analytics gained by the analytics system 602 to one or more parties. Interested parties may access the reporting system 604 and/or may subscribe to receive analytics reports. The reporting system 604 may be configured to generate reports based on the gathered analytics and to provide the reports to interested parties. In embodiments, a regulatory GUI may then allow regulators to access the platform 100. For example, a regulator may access the platform to track and monitor a regulated item, such as 3D printed firearms.

In embodiments, the analytics and reporting system 112 includes a regulated asset system 606. In embodiments, the regulated asset system 606 is configured to manage regulated items. For example, the regulated asset system 606 may manage access to weapons or firearms, pharmaceuticals, alcohol, tobacco products, food products, event/venue entry, airline tickets, and the like. In embodiments, the regulated asset system 606 may track and monitor transactions regarding regulated items and may notify certain regulatory agencies based on the transactions and a corresponding workflow. In a non-limiting example, a token could be used to track a 3D printed firearm, where the item that is purchased would be the model used to print the firearm.

Virtual World Presence System

Referring back to FIG. 1, in embodiments, the platform 100 includes a virtual world presence system 114 for representing tokenized physical world items within virtual world environments. In some embodiments, the virtual world environments may depict virtual world avatars. Virtual world avatars may represent a user (e.g., a potential buyer) and may interact with virtual items in a virtual world environment. Users may "shop" by controlling a virtual world avatar in a virtual world store. For example, a virtual world avatar may try on a virtual representation of a tokenized physical world hat in a virtual world dressing room. In some embodiments, the virtual world presence system may include a virtual reality system that provides a framework for displaying the virtual world environment. In embodiments, the virtual world presence system may also include a virtual asset display system that displays items related to a user, including but not limited to: items that are owned by the user, in the custody of the user, desired by the user, and the like. These items can be displayed publicly to other users or hidden from other users, individually or collectively. In some embodiments, the virtual asset display system may determine the set of tokens owned by a user to determine the items that are owned or possessed by a user.

In embodiments, the virtual world presence system 114 may include a content sharing system that allows sharing of content related to virtual assets to content platforms. The content sharing system enables users to share content related to virtual assets owned by a user or in custody of user or desired by user. Users may obtain additional information about a virtual asset or request to purchase, rent, borrow, trade, or the like. The shared content may include data from the virtual world presence system. For example, a user may share a video of the user's associated virtual world avatar eating a virtual pizza in a virtual pizza parlor.

Figure 8:
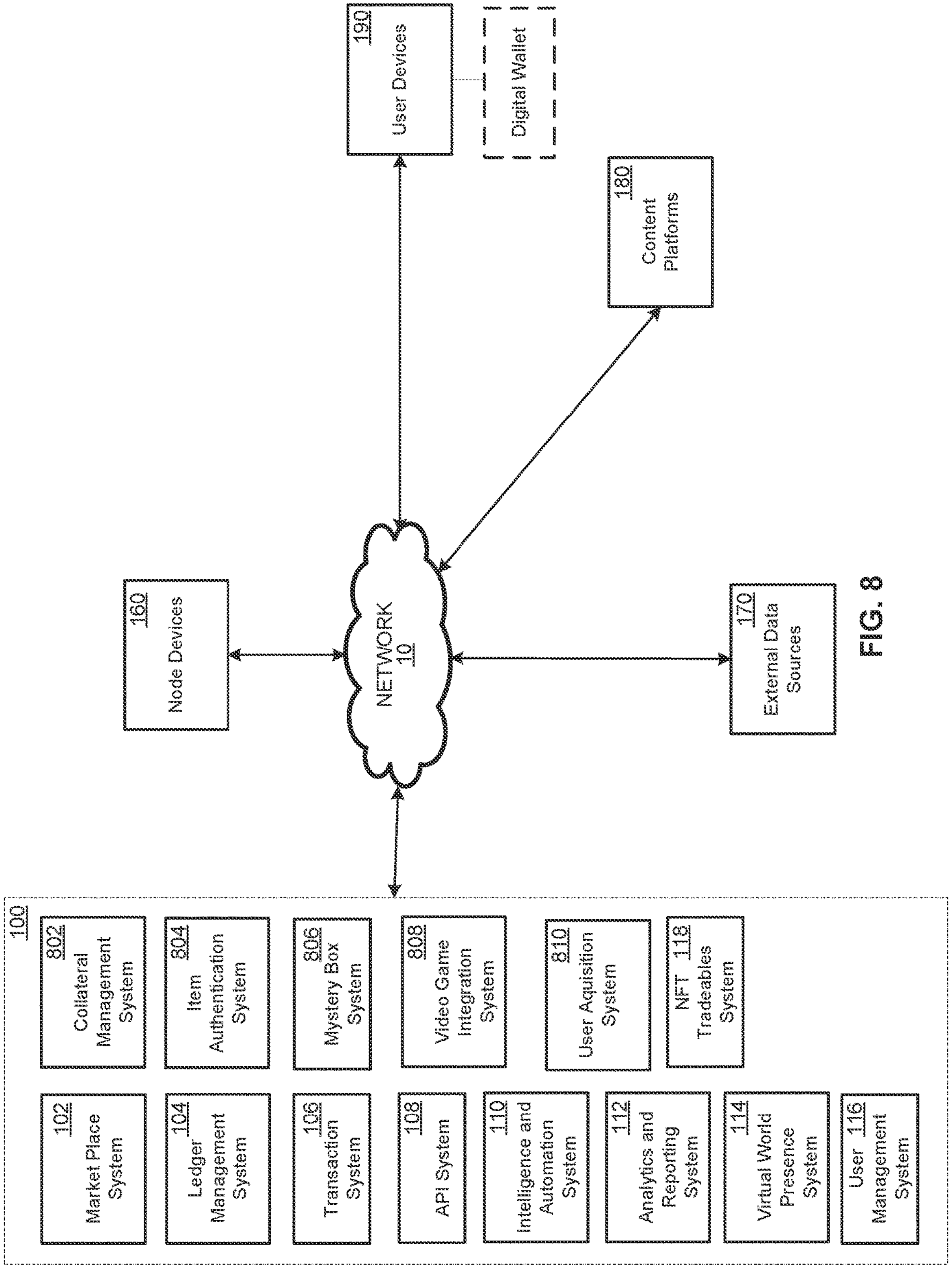
FIG. 8 is a schematic illustrating an example set of components of a tokenization platform according to some embodiments of the present disclosure.

Referring now to FIG. 8, the tokenization platform 100 may support a number of different applications and/or provide a number of different services. For example, the platform 100 may support collateralized lending applications, authentication services, "mystery box" applications, casino-gaming services, and video game streaming services.

Collateral Management System

In embodiments, the platform 100 includes a collateral management system 802. In embodiments, the collateral management system 802 allows a borrower to provide collateral and request a loan. In some of these embodiments, a user wishing to borrow money can take a collateral item (e.g., a collectible item, jewelry, a firearm, a precious metal, or the like) to a facility affiliated or otherwise supported by the platform 100. At the facility, an employee at the facility may inventory the collateral item using an interface provided by the collateral management system 802. Inventorying the collateral item may include requesting an item identifier for the collateral item, associating the item identifier collateral item with an account of the user (i.e., the owner of the collateral item), taking high resolution photographs of the collateral item, weighting the collateral item using a scale, entering a description of the collateral item, an appraisal of the collateral item, and the like. Once inventoried, the collateral management system 802 can create a virtual item representing the collateral item, and then may generate a non-fungible token corresponding to the virtual item (which may be referred to as a "collateral token"). For example, the collateral management system 802 may request the generation of the virtual item and the collateral token from the ledger management system 104. Upon the collateral token being generated, the ledger management system 104 may update the distributed ledger to reflect the new collateral token and the ownership of the collateral token by the borrower. The collateral token may then appear in a digital wallet of the borrower. In some embodiments, the collateral token may be represented by a visual indicium in the digital wallet. The collateral item corresponding to the collateral token may be stored at the facility until the collateral token is redeemed. Once redeemed, the redeeming user (the borrower or a transferee of the collateral token) may pick up the collateral item from the facility or the collateral item may be shipped thereto.

In embodiments, the collateral management system 802 may allow a borrower to seek a loan using the collateral token. In embodiments, the collateral management system 802 may provide a marketplace (e.g., that is accessible via a graphical user interface) where the borrower can request a loan amount and offer the collateral token as collateral. Lenders (who have accounts with the tokenization platform 100) may then make loan offers to the borrower via the marketplace. In example embodiments, the loan offers may specify a loan amount, an interest rate, and a loan length. The loan offers may include additional conditions as well. For example, a loan offer may indicate whether the loan can be sold to another lender, and if so, a payoff amount to be paid to the original lender. The borrower may shop through the loan offers and may ultimately decide on a loan offer to accept.

Once the borrower accepts an offer, the collateral management system 802 may instantiate an instance of a loan smart contract that memorializes the term of the loan and may escrow the collateral token (e.g., no one can redeem the collateral token or transfer the collateral token without complying with the smart contract). In escrowing a collateral token, the collateral management system 802 (or the loan smart contract) may deposit the collateral token into an escrow account, such that no party in the transaction has ownership rights to the collateral token while it is in the escrow account. Such an action will lock the collateral token until the loan is paid off or the underlying item is liquidated. In embodiments, the loan smart contract may indicate the lender, the borrower, the locked collateral token (and an address thereof), the loan amount, a payment schedule, whether the loan is transferrable, when the loan is considered to be in default, ownership rights of the collateral token upon default, and the like. The ledger management system 104 may update the distributed ledger to reflect the loan smart contract.

Once the instance of the smart contract is instantiated, the borrower must commence repayment of the loan according to the loan schedule. It is appreciated that the loan schedule may require a single lump sum payment by a given time or may require multiple payments that are to be made at predetermined intervals. In embodiments, the borrower may make payments to the lender via his or her digital wallet. In these embodiments, the borrower may transfer funds from a bank, credit card, a digital wallet holding other currencies, or the like. The borrower may then transfer those funds to the lender via the digital wallet. In some embodiments, the ledger bridging system 416 facilitates the transfer of funds from the account of the borrower to an account of the lender.

In embodiments, the collateral management system 802 may deploy a listening thread corresponding to an instance of a smart contract governing a loan. A listening thread may listen for payments by the borrower defined in the instance of the smart contract. When a payment is made, the listening thread may notify the ledger management system 104, which updates the distributed ledger to reflect the payment. During this update, the instance of the smart contract governing the loan is provided a notification indicating the payment event, which may cause the smart contract to determine whether the loan is fully repaid. If the loan is fully repaid, the smart contract releases the collateral token to the borrower, bringing the smart contract to a close. If the loan amount is not repaid, the terms of the smart contract (e.g., the loan amount and the next repayment) may be updated based on the payment. If the listening thread does not detect a receipt of a payment before the payment due date, the listening thread may notify the ledger management system 104 of the missed payment. In response to the notification, the ledger management system 104 may update the distributed ledger to reflect the non-payment, which may cause the smart contract to determine whether the loan is in default according to the terms of the contract. If the loan is determined to be in default, then the smart contract transfers ownership of the collateral token to the party specified by the smart contract (e.g., the lender). Once this occurs, the lender may redeem the collateral token, sell the collateral token, gift the collateral token, or exchange the collateral token, as the lender is now the owner of the collateral token.

In embodiments, the collateral management system 802 may provide a marketplace for loans that may be bought or transferred. The marketplace may present the amount due on a loan, the value of the loan (e.g., the amount that is to be collected when fully paid off), the payment history of the loan (e.g., whether the borrower is making or missing payments), the collateral item that secures the loan, the price to purchase the loan, and the like. In some embodiments, potential lenders may opt to purchase the loan from the current lender. In these embodiments, the purchase of the loan causes the collateral management system 802 to terminate the current smart contract and to instantiate a new smart contract to reflect the new owner or to adjust the smart contract, such that payments will be directed to an account of the new lender and to designate the new lender as the destination of the collateral token should the borrower default. Additionally, or alternatively, the borrower may seek better terms on a loan using the marketplace. Assuming a loan is transferrable, the borrower may list the loan on the marketplace whereby potential lenders can view the borrower's payment history, the remaining balance on the loan, the loan payoff amount, and the collateral item. Potential lenders may then make loan offers to the borrower with each loan offer having its terms. The borrower can accept a loan offer. In response to the borrower accepting the loan offer, the new lender must transfer the loan payoff amount to the previous lender, which causes the collateral management system 802 to terminate the current smart contract and to instantiate a new instance of a smart contract in accordance with the newly accepted terms of the loan offer.

In embodiments, the platform 100 includes an authentication system 804. The authentication system 804 may provide authentication and/or appraisal support services on behalf of the platform 100. In some embodiments, the authentication system 804 may be used to authenticate an item that is offered for sale or provided for collateral. Additionally, or alternatively, the authentication system 804 may be used to obtain an appraisal of an item that is offered for sale or provided for collateral.

In some embodiments, the authentication system 804 presents a portal that allows a user (e.g., a seller or an employee of a facility that holds items) to upload a virtual representation of an item. The user may provide an item classification (e.g., a baseball card, vintage clothing, jewelry, artwork, or the like), and one or more of: one or more high resolution photographs of the virtual item; a 3D representation of the item; dimensions of the item; a weight of the item; and/or the like. The authentication system 804 may allow domain-specific experts to sign up as authenticators/appraisers, such that a domain-specific expert can authenticate and/or appraise items classified in the area of their expertise. For example, sports memorabilia experts may be allowed to authenticate baseball cards and memorabilia, but not jewelry or artwork. In some embodiments, authenticators may be rated within their area of expertise and for sub-domains within their area of expertise (e.g., within the general category of sports memorabilia, an expert can be rated with respect to their knowledge on baseball memorabilia, basketball memorabilia, football memorabilia, and the like). When a new item is entered into the portal, the domain-specific experts can bid on the appraisal/authentication job, whereby the bid indicates the terms (e.g., price) under which the expert will perform the appraisal/authentication job. A user may then select the one or more of the experts based on their respective bids and/or their ratings. Alternatively, the authentication system 804 may select the one or more of the experts based on their respective bids and/or their ratings. Once an expert wins a bid, the expert performs the authentication and/or appraisal based on the information uploaded by the user (e.g., one or more high resolution photographs of the virtual item, a 3D representation of the item, dimensions of the item, a weight of the item, and/or the like). The expert may provide an appraisal value and/or a determination indicating the authenticity of the item. The authentication system 804 may include the expert's appraisal and/or authenticity determination in the virtual representation of the virtual item and, in some embodiments, the authentication system 804 may update the distributed ledger with the expert's appraisal and/or authenticity determination. As can be appreciated, the appraisal and/or the authenticity determination may result in an item being kept on or removed from the platform or may impact the ability to collateralize a loan using the item.

In some embodiments, the authentication system 804 requires an expert to provide appraisal/authentication notes that indicate the reasons for the expert's determination. In providing an appraisal and/or providing a determination of authenticity, the expert provides one or more reasons for his or her findings. For example, in opining that a particular shoe is a knockoff, an expert may indicate in the notes that the stitching of the shoe is indicative of a knockoff. The authentication system 804 may include the expert's appraisal/authenticity notes in the virtual representation of the virtual item and, in some embodiments, the authentication system 804 may update the distributed ledger with the expert's appraisal/authenticity notes.

In embodiments, the expert authentication determinations, as well as authentication notes may be used by the machine learning system 502 (FIG. 5) to train one or more models that can determine whether an item is likely a fake. In these embodiments, the models can be trained on images, weights, dimensions, and/or other features of items that were deemed to be fake. The authentication system 804 may leverage these models (via the artificial intelligence system 804) to determine whether a new item is likely fake. If the model classifies the item as being likely fake, the authentication system 804 may include the determination in the virtual representation of the virtual item and, in some embodiments, the authentication system 804 may update the distributed ledger with the determination that the item is likely fake. If the model is unable to classify the item as likely being fake, the authentication system 804 may list the item on the portal, such that experts may assess the item's authenticity. It is noted that in embodiments, a model can classify an item as likely being fake, but only an expert may authenticate the item, as counterfeiters may adapt and improve the quality of the counterfeit items to trick the models into issuing false authentications.

In some embodiments, the collateral management system 802, the authentication system 804, and the ledger management system 104 may be configured to support a securitized decentralized loan process. Example implementations of the securitized decentralized loan process are described throughout the disclosure, including with reference to FIGS. 20-30.

Mystery Box System

In embodiments, the tokenization platform 100 includes a mystery box system 806 that supports a mystery box game. In embodiments, a "mystery box" may refer to a set of tokens that potentially can be won by a player, where each token represents a different item that can be redeemed using a token. In embodiments, each token may have a different probability of being selected. In some embodiments, each token may be assigned a range of numbers, where the range of numbers for each token reflects the probability of being won by a player. For example, if there are three tokens, where the first token has a 10% chance of being won, the second token has a 20% chance of being won, and the third token has a 30% chance of being won, and there is a 40% chance of no token being won, the first token may be assigned 1-10, the second token may be assigned 11-30, and the third token may be assigned 31-60. In this example, the range of values that may be selected would be 1-100. A player may pay for a chance to win an item in the mystery box. In some embodiments, the odds of winning each token, and the item represented by the token, are depicted in relation to the mystery box. In this way, players are informed on their chances of winning the various items.

In response to the receiving payment from the player, the mystery box system 806 may generate a random number that is bound by the overall range of values for the box (e.g., 1-100). The mystery box system 806 may then determine which token, if any, was won by the player based on the random number. For example, a mystery box may be jewelry-themed, whereby the mystery box includes a first token representing a diamond ring, a second token representing a cubic zirconium ring, and eight tokens, each representing a $25 gift card that can be spent at a specific jewelry shop (e.g., the jewelry shop that provided the rings). In this example, the first token may have a 0.1% chance of being won, the second token may have a 4.9% chance of being won, and the gift cards may each have a 10% chance of being won, whereby there is a 15% chance that the player will not win a prize. In this example, the range of numbers may be 1-1000, where the first token corresponds to the number 1, the second token corresponds to the range of 2-50, and the third through eighth tokens have a collective range from 51-850. In this example, the price to play may be set by the jewelry shop, such that the gift cards may be considered a mechanism to drive traffic to the jewelry shop. It is noted that in the foregoing example, the range of tokens is sequential, however, the ranges do not need to be sequential and can be slotted in any suitable manner.

In embodiments, the mystery box system 806, in response to a player winning a prize from the mystery box, may transfer the token to an account of the winning player. In these embodiments, the won token may appear in the digital wallet of the player. Alternatively, the mystery box system 806 may deliver the won token to the user via an electronic message (e.g., a text message, a messaging app message, an email, or the like). As will be discussed below, in some embodiments, the mystery box system 806 provides service to brick-and-mortar casinos, such that the mystery box game is implemented in a physical device. In these embodiments, the mystery box system 806 may print out a ticket that has a token identifier of the won ticket (e.g., a QR code).

In embodiments, the mystery box system 806 may allow players to select a mystery box to play from a plurality of available mystery boxes, where each mystery box may have a respective theme. For example, a first mystery box may be art themed such that the mystery box contains tokens corresponding to art-related items (e.g., arts of work, art related products, services relating to art (e.g., a commissioned painting by an artist), and the like); a second box may be entertainment themed, where the second box may contain tokens corresponding to a movie and television-related items (e.g., memorabilia items from popular movies and/or TV shows, DVDs or download codes for movies and/or TV shows, gift certificates to movie theaters, and the like); a third box may be sports themed, where the third box may contain tokens corresponding to sports-related items that correspond to a particular team (e.g., game worn apparel, tickets to games, replica apparel, team apparel, and the like); a fourth box may be gaming themed, where the fourth box may contain tokens corresponding to gaming-related items (e.g., video game systems, video games, gift certificates, upgrades for characters of a particular game, and the like); a fifth box may be music-themed, where the box may contain tokens relating to items that correspond to a particular band or artist (e.g., a signed show poster, memorabilia from the band or artist, tickets to a show, download codes for an album or song, and the like); and so forth. In this way, players may select to play for prizes that are enticing to them.

In embodiments, a mystery box may contain tokens corresponding to replenishable items and/or non-replenishable items. Replenishable items are items that can be replenished in the mystery box when a player wins a token representing the item. For example, gift certificates, movie tickets, sports game tickets, DVDs, electronics, video games, replica jerseys, and most clothing items are replenishable, while items such as watches, high-end jewelry, game-worn sports apparel, signed memorabilia, limited edition shoes, original artwork, are examples of non-replenishable items. In some embodiments, the party offering the mystery box may designate replacement items of similar value for the non-replenishable items in a mystery box, such that when a non-replenishable item is won from the mystery box, it may be replaced by one of the designated replacement items. In some of these embodiments, a mystery box may be arranged according to a "recipe." A recipe designates two or more tiers of items in the mystery box, and for each tier the odds for winning an item from the tier. In these embodiments, the provider of the mystery box may provide a list of items that belong to each tier. For example, the highest tier (e.g., the tier with the lowest odds) may include the high-value non-replenishable items, while the lower tiers may include various levels of replenishable items. Each item in the recipe may be tokenized, such that the tokens are reserved for use in the mystery box. Each time an item from a tier is won by a player, the mystery box system 806 may replace the token representing the item with another token from the same tier as the won token. In this way, the price to play the mystery box and the odds associated with each item in the mystery box do not change when a non-replenishable item is won from the mystery box.

In embodiments, each mystery box is governed by a smart contract. The smart contract may define the different items or tiers of items, and for each respective item or tier of items, odds for winning the respective item. When a new mystery box is created, the mystery box system 806 may instantiate a new smart contract corresponding to the new mystery box. The instance of the smart contract may define the items or tiers of items of the new mystery box, the odds for each item (or tier of items), the token identifiers of each of items in the mystery box (or replacement items that can be included in the mystery box), and a price to play the mystery box. In embodiments where items are not replaced in a mystery box, the smart contract may further define the manner by which the odds of items or the price of the game may be adjusted when certain items are exhausted. For example, if the highest value item in the mystery box is won, the price to play the game may be lowered and/or the odds of winning the remaining items may be adjusted.

The mystery box system 806 may serve the mystery box game in a variety of different manners. In embodiments, the mystery box system 806 may serve the mystery box game via the tokenization platform 100, whereby users of the tokenization platform 100 may play the mystery box game on a website or application provided by the tokenization platform 100. Additionally, or alternatively, the mystery box system 806 may serve the mystery box game to users via a third-party website or application. In these embodiments, the third-party website or application may access the mystery box system 806 via the API system 108 of the tokenization platform 100.

In some embodiments, the mystery box system 806 may support casino-style machines, whereby players can play the mystery box game on a physical machine located at, for example, a casino or any other suitable brick-and-mortar location. In these embodiments, the items may be located at the brick-and-mortar location where the physical device is located, such that when a player wins an item from the mystery box, the player may redeem the token at the brick-and-mortar location. In these embodiments, the tokenization platform 100 includes the mystery box system 806 that supports mystery box games that are played at the brick-and-mortar locations. In these embodiments, the mystery box system 806 may provide an API that allows network-connected physical gaming devices to communicate with the tokenization platform 100. The mystery box system 806 may serve the mystery box game to the physical gaming devices via the API system 108. In embodiments, the mystery box system 806 may provide token identifiers of won tickets, such that the physical gaming devices may print a ticket that indicates the won token. In some embodiments, the ticket may include a QR-code that indicates the won token.

In embodiments, the player may redeem a ticket indicating a won token at the brick-and-mortar location. In these embodiments, the brick-and-mortar location may include scanning devices that scan the tickets and communicate the token identifier of the won token to the casino gaming system. In response to receiving the token identifier of the won token, the mystery box system 806 may redeem the won token on behalf of the player and may communicate a verification of the redemption of the won token to the scanning device. An employee using the scanning device may then provide the item won by the player to the player. Alternatively, the player may add the won token to a user account of the player. In these embodiments, the player may scan the ticket (e.g., the QR-code). In response to the player scanning the ticket, the mystery box system 806 may facilitate the transfer of the token to an account of the player, whereby the ticket may appear in the player's digital wallet.

Once this occurs, the player may redeem, sell, gift, collateralize, or otherwise transact with the token.

Integration

In embodiments, the tokenization platform 100 includes a video game integration system 808. The video game integration system 808 allows video game makers to place tokens in video games, such that games playing a video game may be able to find, buy, trade, or otherwise interact with tokens in the video game. In embodiments, a video game maker may access an API of the tokenization platform 100 via the API system 108, such that instances of a video game may request certain tokens or types of tokens from the tokenization platform 100. In response to the request, the video game integration system 808 may serve a token to the instance of the video game. The tokens may be fungible or non-fungible. In the latter case, a token may be obtained, purchased, or otherwise transacted for by multiple video games. In the case of a non-fungible token, the first user to transact for the token is the owner of the token. In response to a user transacting for a token, the video game integration system 808 may update the distributed ledger to reflect the new ownership of the token.

In some example embodiments, a video game maker may allow third parties to advertise items for sale in a video game, whereby a user may purchase an item by selecting an icon (or other visual indicia) displayed in the video game that represents a token corresponding to the item. For example, an advertiser representing a pizza delivery chain may wish to offer pizza delivery to gamers in a specific location. In this example, instances of the video game may request food-related tokens from the video game integration system 808, whereby each request indicates a location of the device executing the respective instance of the video game. The video game integration system 808 may identify tokens corresponding to food items that can be delivered to a location where a respective instance of the video game is being executed. For example, the video game integration system 808 may identify tokens having associated metadata that indicates a delivery radius that includes a location indicated in the request. In response to the request, the video game integration system 808 serves the identified token to the requesting instance of the video game. A visual indicium representing the token may then be displayed by the instance of the video game, whereby a user (i.e., video game player) may opt to transact for the token. Upon a user transacting for ownership of the token, the video game integration system 808 updates the ownership data of the token to reflect that it is owned by the user. In scenarios where delivery information or other logistical information are needed, the instance of the video game and/or the user can provide those details at the time of transaction or the user can provide the required information to complete the transaction. For example, if the user elects to buy a pizza token from a pizza delivery chain, the instance of the video game and/or the user may provide the address to where the pizza will be delivered. The user, via the instance of the video game, may also provide details such as toppings for the pizza.

In some example embodiments, the video game maker may allow an item represented by a token to be both used in the digital environment of the video game and to be redeemed in "real-life." In these embodiments, the video game maker may include specific fungible or non-fungible tokens in the video game, whereby users can find, buy, trade for, or otherwise transact for the tokens appearing in the video game. Once a token appearing in a video game is transacted for, the video game integration system 808 may update the ownership data of the transacted for the token to reflect that the user is the owner of the token. A visual indicium of the token may appear in a video game instance corresponding to the user and/or in a digital wallet of the user. Once owned by the user, the user may use the token in the video game and may subsequently redeem the token to receive the physical item represented by the token. In a role-playing game, for example, a token may represent a pair of earrings that give the player of the video game a special power (e.g., invisibility). The user may use the earrings in the game to enjoy the special power or may redeem the earrings. In the latter scenario, the earrings may be shipped to the user, such that the earrings may be physically worn by the user but are no longer able to be used in the video game. In some of these embodiments, the video game maker may allow the user to transact the tokens. For example, the owner of a token may trade or sell the token for a token corresponding to another item. Each time the ownership is changed, the video game integration system 808 may update the distributed ledger to reflect the change in ownership. Once a user no longer owns a token, the user cannot use or redeem the item indicated by the token. In some embodiments, the video game may allow the user to return the item to a verified location (e.g., storage warehouse), whereby once the item is authenticated the user may then use the digital representation of the item in the video game once again.

The video game integration system 808 may allow video game makers to integrate tokens into their video games in additional or alternative manners. For example, video game makers may use tokens as "Easter eggs" or prizes that may be won by players as they uncover the tokens. In another example, a video game maker may integrate one or more mystery boxes in a video game. In another example, users may create digital items within the construct of a video game, such that the digital items may be tokenized and transacted for (e.g., traded, gifted, sold, etc.).

User Acquisition System

In embodiments, the tokenization platform 100 includes a user acquisition system 810. In embodiments, the user acquisition system 810 provides mechanisms that facilitate the promotion of the tokenization platform, and particularly, the enlisting of new users. In some embodiments, the user acquisition system 810 provides each existing user with a unique referral code that each respective user can share with his or her friends, social media followers, contacts, or the like. In addition, the user acquisition system 810 may provide an incentive to each existing user, whereby the incentive indicates a reward for each new user or number of users (e.g., three users) that sign up for an account. The incentive may be any form of payment, including currency (e.g., traditional currency or cryptocurrency), gift cards, physical items, digital items, and the like. In some embodiments, the reward is provided as a tokenized token, whereby the tokenized token represents a set amount of currency. In embodiments, the user acquisition system 810 may provide different incentives to different users. In some embodiments, the incentive may be determined based on the potential reach of each respective user. For example, users that have significant reach (e.g., social media influencers, celebrities, etc.) may be given greater incentive than users with relatively little reach. In some embodiments, the incentive may be determined based on the interests of each respective user. For example, a first user that is interested in golf may be incentivized with golf-related items or gift certificates, while a second user that is interested in art may be incentivized with art-related items or gift certificates. In some embodiments, the user acquisition system 810 codifies the incentive for each user in a respective instance of a smart contract. In some of these embodiments, the smart contract instance governs the incentives/rewards of a user is associated with the referral code of the user and/or the public address of the user. When the referral code of the user is successfully used to enlist a new account, the smart contract may facilitate the transfer of a token representing the reward to an account of the referring user.

Each time a new user enlists for an account using a referral code, the user acquisition system 810 determines whether the new user is legitimate (e.g., not a bot, not a fraudulent account, etc.). Assuming the new user is granted an account (e.g., there is no detected fraud), the user acquisition system 810 determines the user account associated with the referral code. In some embodiments, the user acquisition system 810 determines a smart contract associated with the user account and/or the referral code. The user acquisition system 810 may provide a notification to the smart contract associated with the user account and/or the referral code of a new account. The smart contract may then initiate the transfer of the token representing the reward to an account of the user.

In embodiments, the user acquisition system 810 may perform these services for third-party customers. In these embodiments, a third-party customer may provide rewards (e.g., cash, cryptocurrency, gift cards, physical items, etc.) to a trusted third-party holder (e.g., the tokenization platform or another trusted holder). The rewards may then be tokenized and held in escrow. The third-party may further define the parameters governing the rewards (e.g., how much incentive to award, who may be a promoter, etc.). The user acquisition system 810 may generate a smart contract on behalf of the third-party customer. When a user requests a referral code, the user acquisition system 810 may generate an instance of the smart contract on behalf of the customer and may associate the instance of the smart contract with the account of the user. When the user successfully refers a buyer to the customer using a referral code, the user acquisition system 810 (and/or the instance of the smart contract) may transfer a token representing the reward to an account of the referring user.

As discussed, the tokenization platform may include an API system 108 that configures and manages one or more APIs of the platform 100. In embodiments, the API system 108 may provide APIs that allow various systems to interface with the tokenization platform 100. Additionally, the API system 108 may connect to various systems via APIs provided by respective systems. The systems with which the API system 108 may interface may include content providers, such as streaming platforms, social media platforms, enterprise management platforms (ERPs), customer relationship management platforms (CRMs), content management systems (CMS), messaging platforms, video games, gaming platforms, digital wallets, mobile devices, fulfilment systems, marketplace systems, and/or the like. In embodiments, the API system 108 includes one or more interfaces that allow various systems to provide data to the tokenization system 100 and/or allow the tokenization system 108 to push data to the various system, as described in greater detail below.

In embodiments, the API system 108 includes an API (e.g., a workflow triggering API) that is configured to receive data from a system that causes the API system 108 to trigger a workflow within the tokenization system. For example, in response to the workflow triggering API receiving information from a third-party system of a user purchasing a token that is linked to an item handled by the tokenization platform, the API system 108 may trigger a transaction workflow, whereby the API system 108 initiates the user information to be provided to the transaction system 106 (e.g., by providing it, by providing a link to it, and the like), which in turn facilitates the transaction for the token being purchased, the awarding of the token to an account of the recipient user on the distributed ledger, and any subsequent recordation of the transaction on the distributed ledger. In another example, a workflow triggering API of the API system 108 may receive a request from a digital wallet of a user (e.g., via an API of the digital wallet) to redeem a token stored in the digital wallet. In this example, the API system 108 may trigger a redemption workflow that corresponds to the item and the token. For instance, if the item that is linked to the token is a physical item, the redemption workflow may include triggering actions of various systems of the tokenization platform including verifying the token and the redeeming account, obtaining fulfilment details (e.g., included in the information received by the workflow trigger API from the user wallet, from the user via a user interface and/or from metadata associated with the user, such as "current location", user preferences, and/or the like), triggering a fulfillment notification to a fulfilment system, escrowing (with a cryptographic ledger update system) the token until fulfillment is complete, and then burning the token. In another example, the API system 108 may include a CRM Application Programming Interface (CRM API) that connects the tokenization platform 100 with a CRM, whereby the tokenization platform 100 may allow a CRM to integrate use of tokens into CRM workflows. For instance, as part of a promotion (e.g., to certain customers), a user of the CRM system may automate distribution of redeemable tokens to customers, such as to certain customers that have certain properties that are aligned with one or more objectives of the promotion. In these example embodiments, the CRM API may be configured to receive token distribution information, such as by monitoring a portion of the CRM API that triggers the awarding of specified tokens to accounts of specified customers, such that once a customer has the requisite properties the specified token is transferred to an account of the customer. It is appreciated that the API system 108 may interact with other systems and/or trigger additional and alternative workflows without departing from the scope of the disclosure. Furthermore, as discussed throughout the disclosure, the API system 108 is configured to interface with "on-chain" and/or "off-chain" systems, which may be part of or external to the tokenization platform 100. In some of these embodiments, various node devices, oracles, bridges, and smart contracts may interface with components of the tokenization platform 100 to provide certain services and/or functions.

In embodiments, the API system 108 may provide interfaces (e.g., APIs) that facilitate triggering workflows in external systems. These external trigger APIs may facilitate certain operations within sub-systems of the transaction platform 100 to cause workflows both internal to and external to the platform. In an example, an external trigger API for triggering a gaming system to activate a gaming system workflow that presents a digital game asset that is linked to a token may also signal to a redemption system of the platform to reserve an instance of an item (e.g., through management of an inventory of item instances) for redemption based on actions of players of the game. The actions of the players (and/or information derived therefrom) may be communicated through a game API of the redemption system to trigger a redemption workflow.

To further describe some embodiments in greater detail, reference is next made to examples of techniques which may be performed by or in connection with ecommerce systems, for example, platform 100. The techniques include technique 900 of FIG. 9, 1000 of FIG. 10, 1100 of FIG. 11, 1200 of FIG. 12, 1300 of FIG. 13, 1400 of FIG. 14, 1500 of FIG. 15, 1600 of FIG. 16, 1700 of FIG. 17, 1800 of FIG. 18, and 1900 of FIG. 19. Technique 900, technique 1000, technique 1100, technique 1200, technique 1300, technique 1400, technique 1500, technique 1600, technique 1700, technique 1800, and technique 1900 can be executed using computing devices, such as the systems, hardware, and software described herein. Technique 900, technique 1000, technique 1100, technique 1200, technique 1300, technique 1400, technique 1500, technique 1600, technique 1700, technique 1800, and technique 1900 can be performed, for example, by executing a machine-readable program or other computer-executable instructions, such as routines, instructions, programs, or other code. The steps, or operations, of technique 900, technique 1000, technique 1100, technique 1200, technique 1300, technique 1400, technique 1500, technique 1600, technique 1700, technique 1800, and technique 1900 or another technique, method, process, or algorithm described in connection with the embodiments disclosed herein, can be implemented directly in hardware, firmware, software executed by hardware, circuitry, or a combination thereof. For simplicity of explanation, 900, technique 1000, technique 1100, technique 1200, technique 1300, technique 1400, technique 1500, technique 1600, technique 1700, technique 1800, and/or technique 1900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 9:
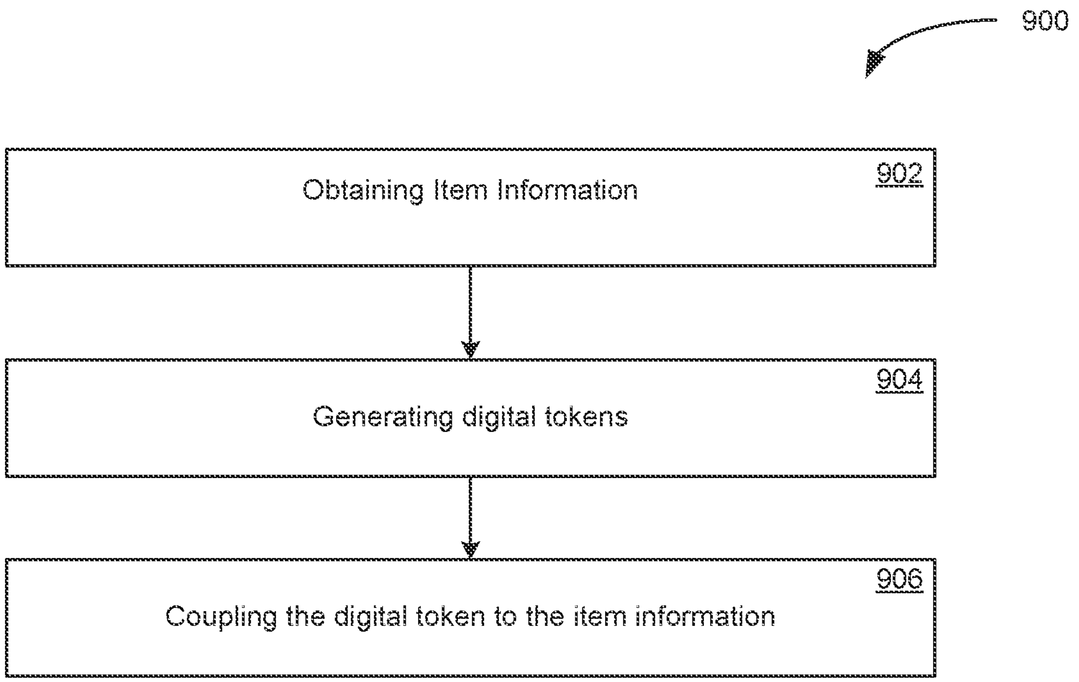
FIG. 9 is a flowchart showing a technique for tokenizing items according to some embodiments of the present disclosure.

FIG. 9 depicts a flowchart showing a technique 900 for tokenizing items according to some embodiments of the present disclosure. At 9002, item information is obtained. The item information may include a unique identifier for a unique unit of the item and a set of item attributes. In embodiments, a processing system of a tokenization platform obtains the information.

At 904, one or more digital tokens are generated. In embodiments, the digital tokens are unique digital tokens. Each unique digital token may include a set of digital attributes that correspond to the set of item attributes. In embodiments, N digital tokens are generated and linked to an item or virtual representation thereof. In embodiments, a token generation system generates the one or more digital tokens.

At 906, the digital token is coupled to the item information. In embodiments, a cryptographic link couples the digital token to the item information such that the digital token provides a representation of the item. For example, the digital token and the item may be unique such that the unique digital token and the unique identifier for the unique unit of the item are cryptographically linked to provide a unique digital representation of the unique unit of the item. In embodiments, a linking system, such as a module of the token generation system 302, couples the digital token to the item information.

In embodiments, tokens may be tokenized (e.g., when generating a token representing an amount of funds). For example, the item information may be funds within the platform 100 or from third-party sources. The tokenized token can be generated in response to validation of receipt of the funds, and the funds may be held from transaction by the user. In some embodiments, the funds remain publicly attributed to the user and the ledger is updated with a hold or lien recorded against the funds to prevent user transaction of the tokenized funds without approval by the platform 100. In some embodiments, the ledger is updated to reflect a transfer of the funds from the user to the platform 100. Beneficially, transferred funds may be tradeable by the platform 100 (e.g., for depositing or investment with third parties), and the tokenized tokens are redeemable for an equivalent amount of the original funds even if the redeemed funds are not the originally tokenized funds such that the tokenized token may be used by transactions within the platform 100 while the deposited funds may participate in economic transactions between the platform 100 and third parties.

Figure 10:
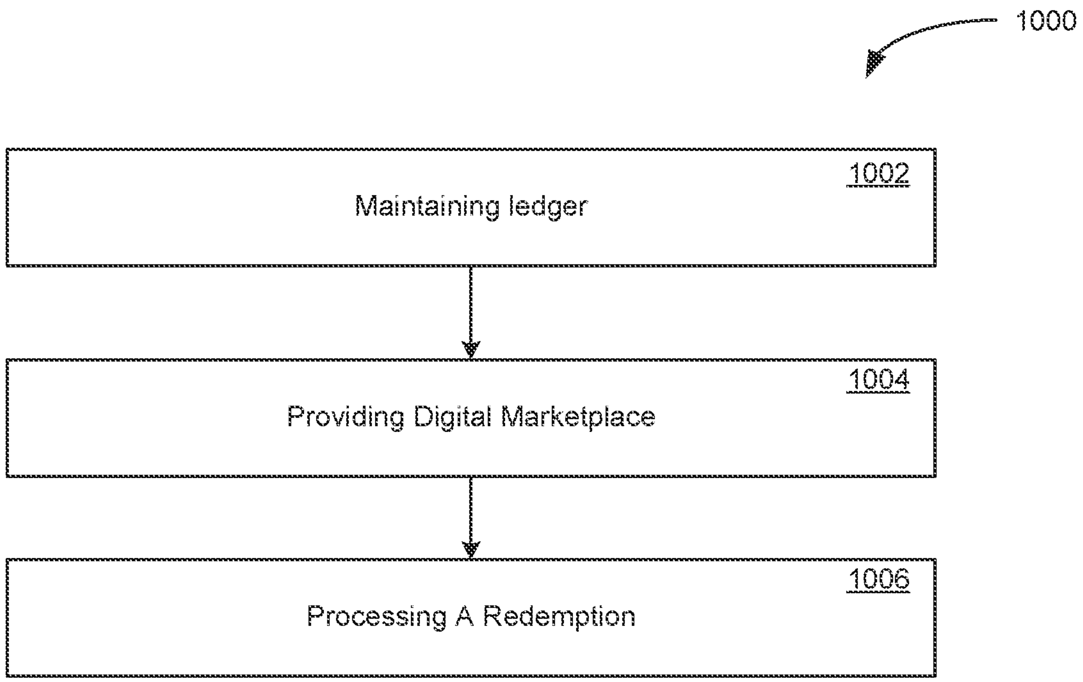
FIG. 10 is a flowchart showing a technique for transferring tokens using a digital marketplace according to some embodiments of the present disclosure.

FIG. 10 depicts a flowchart showing a technique 1000 for transferring tokens using a digital marketplace according to some embodiments of the present disclosure. At 1002, a ledger is maintained. The ledger stores a plurality of public addresses, a plurality of virtual representations of a plurality of respective items, and, for each virtual representation, a set of tokens, and ownership data of each respective token. The set of tokens respectively correspond to a respective instance of the item represented by the virtual representation. Further, each respective public address corresponds to a respective account of a respective user of the tokenization platform.

At 1004, a digital marketplace is provided. In embodiments, the digital marketplace provides a graphical user interface that allows consumers to view visualizations of virtual representations of items including the virtual representation of the item and transact for an instance of the item by purchasing a digital token of the N digital tokens. Upon a user purchasing a token, the ledger may be updated to reflect a change in ownership of the token from the seller of the token to the user. Once a user owns a token, the user may be allowed to transfer the token to another user, sell the token, use the token as collateral, and/or redeem the token.

At 1006, a redemption is processed in response to a user requesting redemption of the token. In embodiments, the redemption may begin by associating a specific token that corresponds to the virtual representation with an account of the transacting user. The association may be made in response to verifying the request to participate in the transaction. A transfer request is received requesting transfer of the specific token to a transferee. The transfer request includes a digital-token identifier that identifies the specific token and a public address of the different user. Further, the specific token is validated. The validation can be based on the digital-token identifier and the ledger. In the process, the account of the transferee on the platform 100 may be verified and/or validated based on the public address of the user and the ledger. Additionally, the ledger is updated with a block that includes ownership data and indicates that a specific token corresponding to the virtual representation is owned by the transacting user. In embodiments, the updating occurs in response to both validating the specific token and verifying the transferee. Yet further, a redemption request is received to redeem the digital token from a user device of the transferee, and a workflow is executed to satisfy the transaction for instance of the item corresponding to the token. The workflow may be initiated in response to receiving the redemption request.

Figure 11:
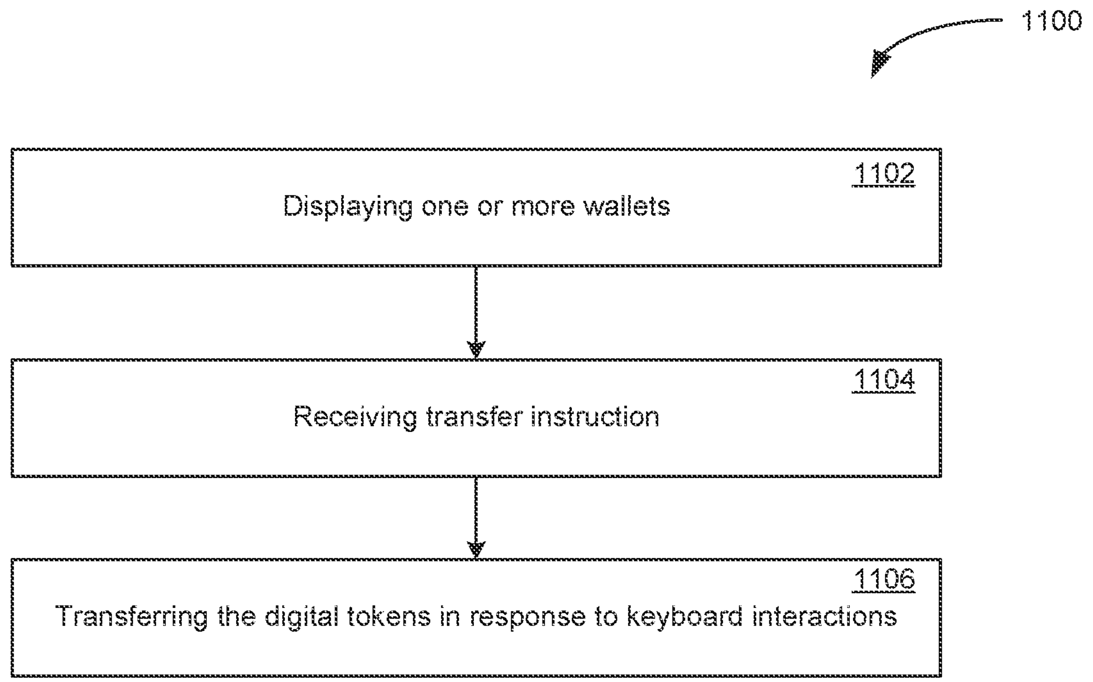
FIG. 11 is a flowchart showing a technique for transferring tokens between wallets via a keyboard interaction according to some embodiments of the present disclosure.

FIG. 11 depicts a flowchart showing a technique 1100 for transferring tokens between wallets via a keyboard interaction according to some embodiments of the present disclosure. At 1102, one or more wallets are displayed. The display of the one or more wallets may include, for example, displaying a digital wallet graphical user interface via a user device of a user associated with the digital wallet. Additionally, an inventory of tokens that are owned by the user may be displayed by the digital wallet graphical user interface. In embodiments, each token corresponds to a respective item and may be redeemable by a user to satisfy a transaction for an instance of the respective item.

At 1104, transfer instructions are received. The transfer instruction may include indication of one or more digital tokens from the inventory of tokens and a recipient of the digital token. The transfer instructions can be received by the digital wallet graphical user interface.

At 1106, the digital tokens are transferred in response to keyboard interactions. In embodiments, a digital keyboard is displayed by the digital wallet graphical user interface. The digital keyboard includes a selectable media content that is representative of the item corresponding to the digital token within the transfer request. User input producing a text-based message including a selection of the selectable media content by the digital keyboard is received. For example, the user may type a message surrounding the transfer (e.g., "Please enjoy this gift from me) and may then select the selectable media content representing the token (e.g., an image of the item represented by the token) to create a message having the token embedded therein. The selectable media content includes the digital token/an identifier of the digital token (e.g., a hash value that uniquely identifies the digital token). The digital token (e.g., an identifier thereof) is embedded within the text-based message by the digital keyboard, and the digital wallet transmits the text-based message to a message account of the recipient. Upon receipt, the digital token is accepted into a respective digital wallet of the recipient in response to the recipient selecting the selectable media content.

Figure 12:
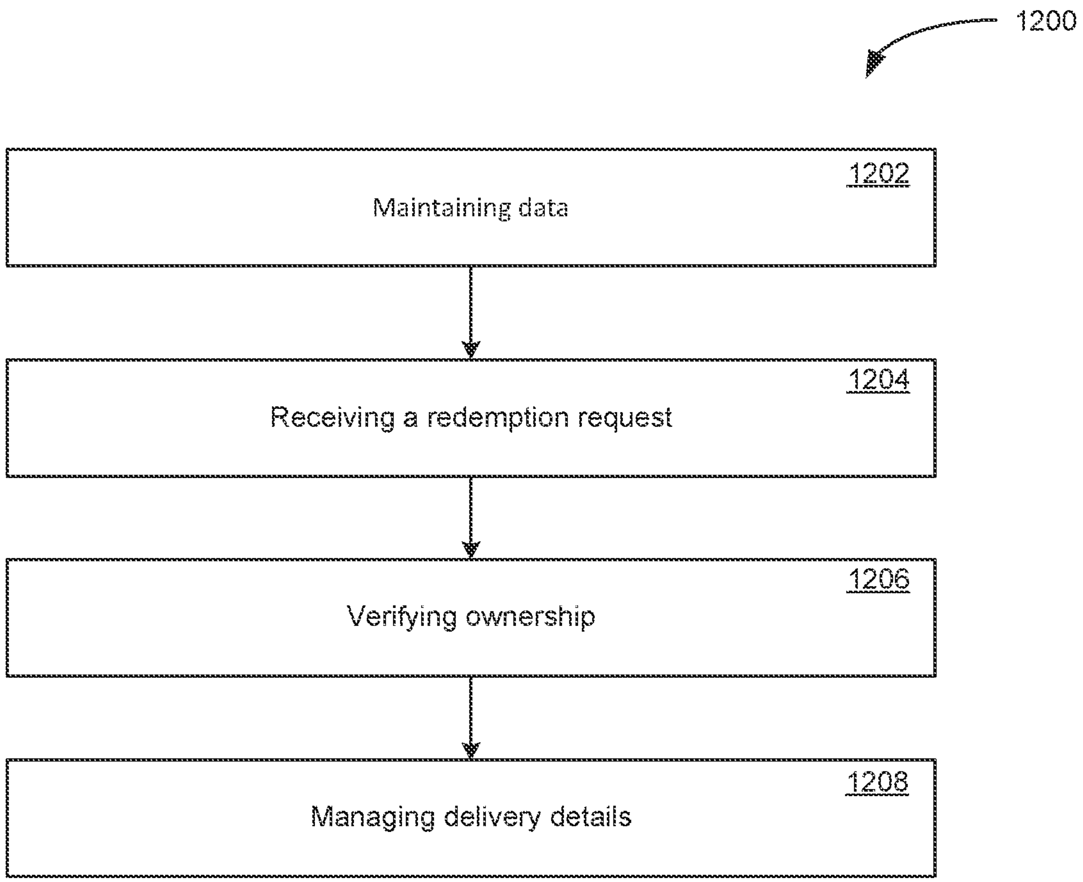
FIG. 12 is a flowchart showing a technique for redeeming tokens according to some embodiments of the present disclosure.

FIG. 12 depicts a flowchart showing a technique 1200 for redeeming tokens according to some embodiments of the present disclosure. At 1202, ledger data is maintained. The ledger data can include a plurality of public addresses, a plurality of virtual representations, a set of tokens for each of the plurality of virtual representations, and ownership data for each of the set of tokens. Each respective public address corresponds to a respective account of a respective user of the tokenization platform. The virtual representations correspond to respective items, and the set of tokens respectively correspond to a respective instance of the respective item for each virtual representation.

At 1204, a redemption request is received. The redemption request seeks to redeem a digital token from a user device of a user, and the digital token corresponds to an instance of the item to be redeemed. At 1206, ownership of the digital token by the user is verified. The verification can be made based on the plurality of public addresses, the sets of digital tokens, and the redemption request. For example, the redemption request may include a user id of a user wishing to redeem a token indicated by a token identifier. The platform 100 may validate the ownership of the token by checking that the ledger data links the token identifier indicated in the redemption request to the public address of the user indicated in the redemption request. If so, the ownership of the digital token is verified.

At 1208, details for fulfilment and/or delivery are managed by the platform 100. In some embodiments, the platform 100 may prompt the user to provide delivery details (e.g., via a graphical user interface). In response, the platform 100 may receive the delivery details from the user via the user device. The delivery details may then be output to a delivery system, which initiates delivery of the redeemed token. For example, the user may provide a physical address and any other relevant delivery data (e.g., best time of day for delivery or phone number). In this case, the delivery system may use the provided address to initiate a delivery of the item represented by the redeemed token. In another example, the token may represent a digital item. In such cases, the user may provide an email address or other account data to which the digital item (or a link thereto) may be delivered. In some embodiments, the platform 100 may request fulfilment details in response to verifying that the user is the owner of the token. The fulfilment details include information needed to satisfy the transaction for the item that were not provided at a time when the token was transacted for. For example, the fulfilment details may include item constituent materials, sizing, color, combinations thereof, and the like. The fulfilment details may be received from the user device of the user and outputted to a fulfilment system. The fulfillment system may initiate delivery of an item that satisfies the fulfillment details.

Figure 13:
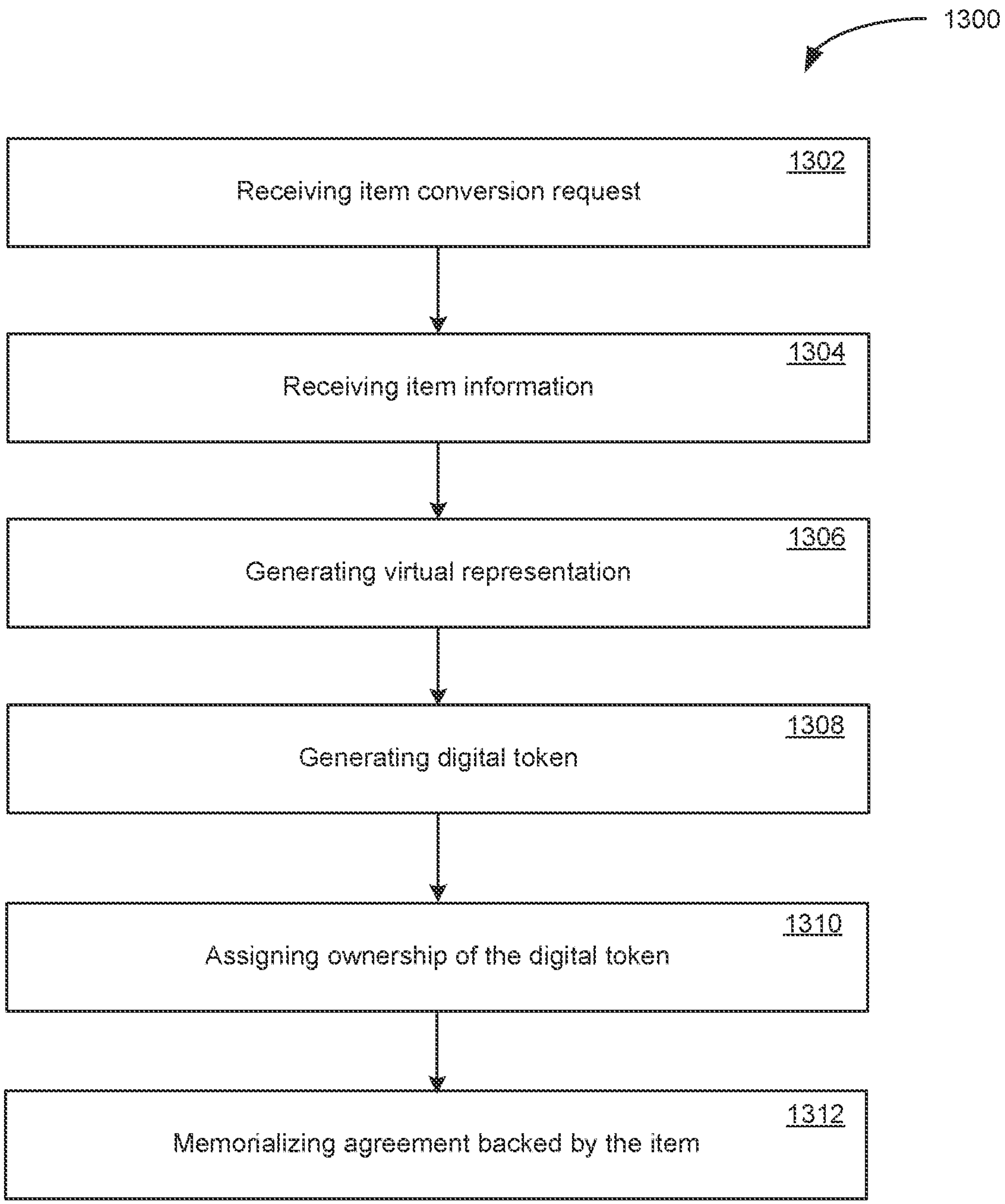
FIG. 13 is a flowchart showing a technique for collateralization and/or securitization according to some embodiments of the present disclosure.

FIG. 13 illustrates a flowchart showing a technique 1300 for collateralization and/or securitization according to some embodiments of the present disclosure. At 1302, an item conversion request is received. In embodiments, the item is a tangible item. In other embodiments, the item is other forms of collateral. At 1304, item information is received. The item information may include information that is required or helpful in determining valuation of the item. For example, the item information may include one or more photographs of the item, a description of the item, an appraisal value of the item, and/or a holding location of the item.

At 1306, a virtual representation of the collateral item is generated based on the item information. At 1308, one or more tokens are generated based on the virtual representation. At 1310, ownership of the digital token is assigned. Initially, the ownership of the digital token is assigned to the owner of the collateralized item represented by the digital token. At 1312, an agreement that is backed by the item is memorialized. In embodiments, the item is an asset that is used as collateral to an agreement to provide a service for the user by a provider. In embodiments, an instance of a smart contract that governs the service is generated. The smart contract indicates an amount to be provided by the user to the provider and one or more conditions that cause ownership of the digital token to be transferred to the provider. The instance of the smart contract may then be deployed by the processing system. In embodiments, the item is a collateralizable item that is used as loan security. The agreement to loan a defined amount of funds to the user by a lender is received by the processing system. An instance of a smart contract governing the loan is generated by the processing system. The instance of the smart contract indicates an amount to be paid back by the user to the lender, as well as one or more conditions that cause ownership of the token to be transferred to the lender (e.g., default conditions). The instance of the smart contract is then deployed by the processing system. In some embodiments, the token may be placed in escrow, such that the lendee cannot redeem or transfer the token until the loan is paid. In these embodiments, the smart contract may define conditions that result in the token being transferred back to the lendee (e.g., when payment is complete).

Figure 14:
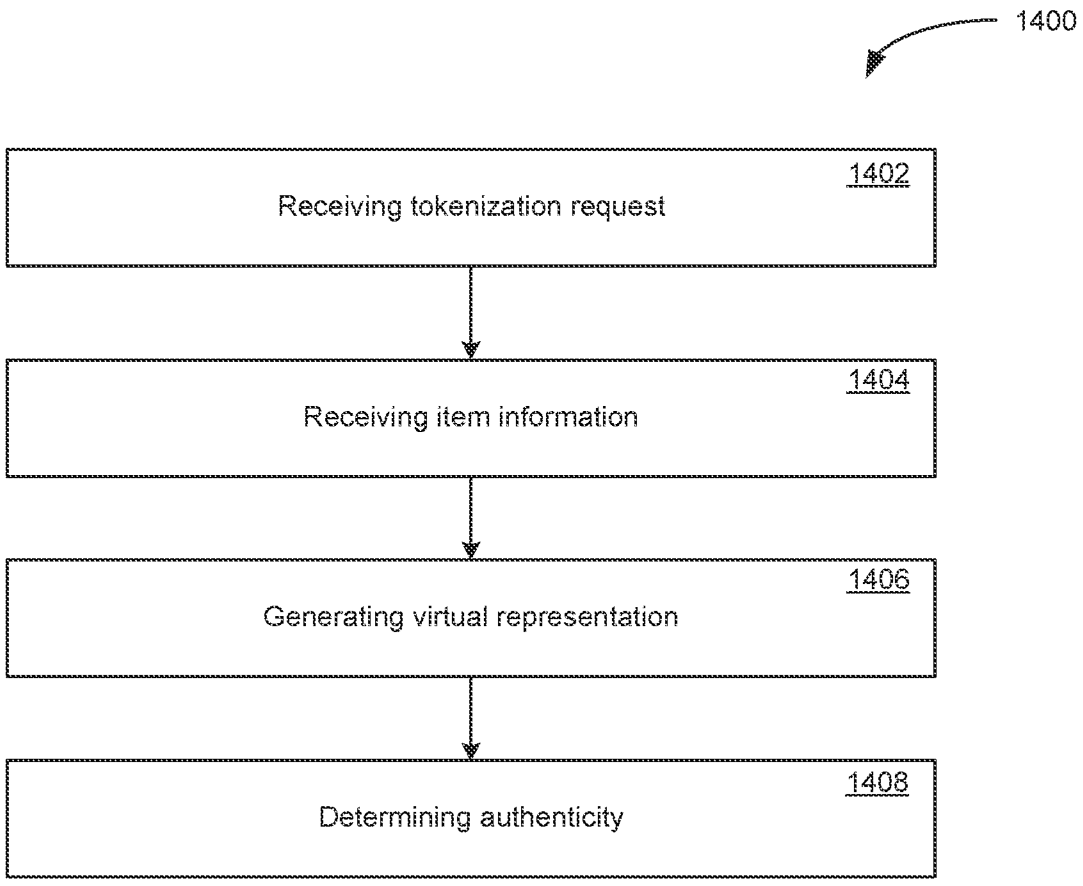
FIG. 14 is a flowchart showing a technique for item authentication according to some embodiments of the present disclosure.

FIG. 14 illustrates a flowchart showing a technique 1400 for item authentication according to some embodiments of the present disclosure. At 1402, a tokenization request is received from a user device. At 1404, item information is received. In some embodiments, the item information may be provided by a user or via an automated process. At 1406, a virtual representation of the item is generated.

At 1408, the authenticity of the item is determined through suitable authentication processes. In embodiments, an authentication of the item may be requested via a portal that is accessible by subject-matter authentication experts. In these embodiments, the portal may further display the virtual representation of the item. For example, the subject-matter expert may be presented with an image of the item, a description of the item (e.g., weight, dimensions, etc.), a video of the item, and/or the like. An authentication report may then be received by the processing system. The authentication report may be provided by a subject-matter authentication expert, which may include an opinion indicating whether the subject-matter authentication expert deemed the item authentic or not-authentic and one or more reasons for the opinion. In some embodiments, the platform may generate a digital token in response to an opinion indicating that the item is deemed authentic, and ownership of the digital token assigned to an owner of the item. The digital token may be based on a virtual representation of the item.

Figure 15:
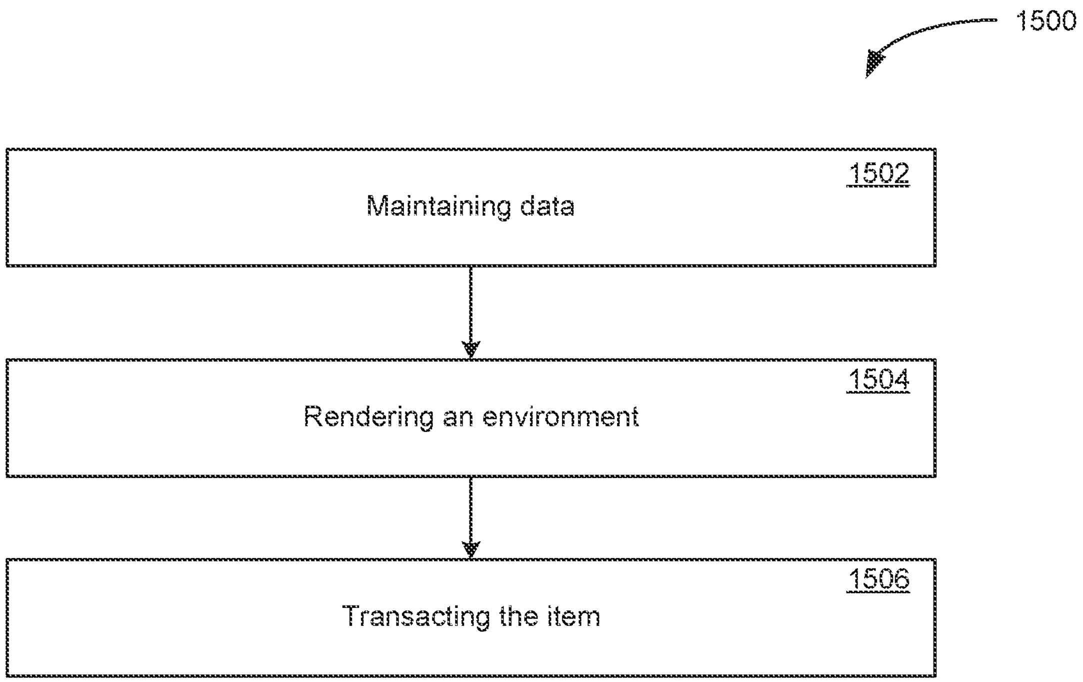
FIG. 15 is a flowchart showing a technique for rendering VR environments according to some embodiments of the present disclosure.

FIG. 15 depicts a flowchart showing a technique 1500 for rendering VR environments. Leger data is maintained at 1502 using suitable processes such as those discussed above. At 1504, an environment is rendered. In embodiments, a virtual reality store environment is rendered, which provides an interface that allows users to view virtual reality visualizations of available items and to transact for instances of the available items. The available items are items which are available for transaction. Further, a virtual reality visualization of an item represented by a virtual representation may also be included within the virtual reality store environment. At 1506, the item within the virtual environment is transacted through suitable processes. For example, a request to participate in a transaction for an instance of the item is received by the platform 100 from a user device of a transacting user. In embodiments, the request to participate in the transaction is received in response to the transacting user viewing the virtual reality representation of the item in the virtual reality store environment. Information associated with the request may be verified, and the specific token corresponding to the virtual representation is associated with an account of the transacting user in response to verifying the request to participate in the transaction.

Figure 16:
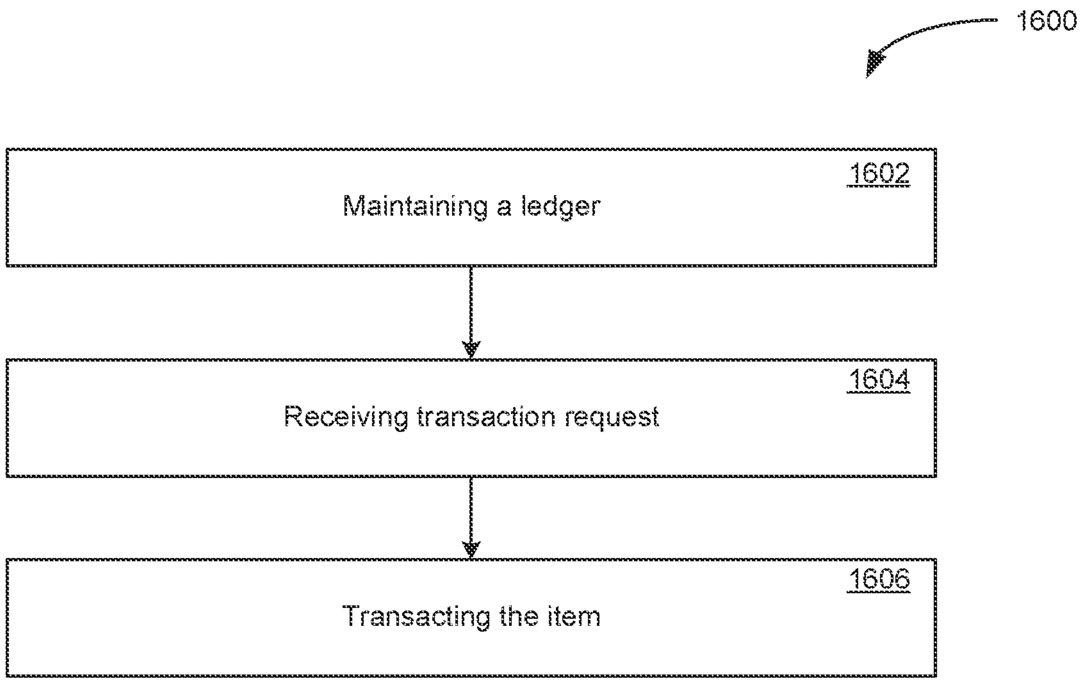
FIG. 16 is a flowchart showing a technique for facilitating transactions using a distributed ledger with a side chain of blocks according to some embodiments of the present disclosure.

FIG. 16 illustrates a flowchart showing a technique 1600 for facilitating transactions using a distributed ledger with a side chain of blocks according to some embodiments of the present disclosure.

At 1602, a ledger is maintained. The ledger includes a main chain of blocks and a side chain of blocks. In embodiments, blocks of the main chain collectively store information relating to a plurality of users, which include both item providers and item consumers. The information relating to the plurality of users includes a plurality of public addresses, and each respective public address corresponds to a respective account of a respective user of the tokenization platform. Blocks of the side chain collectively store a plurality of virtual representations of a plurality of respective items, a set of tokens for each virtual representation, and ownership data of each respective token. Each virtual representation includes virtual reality content to render a virtual reality visualization of the respective item, and each set of tokens respectively corresponds to a respective instance of the item represented by the virtual representation.

At 1604, a transaction request is received through a suitable process, such as those described above. At 1606, transaction of the item occurs. In embodiments, ownership data of a specific token corresponding to the virtual representation in the first side chain of blocks is updated to indicate that the transacting user owns the specific token. In embodiments, the transaction of the item includes validating the specific token based on the digital-token identifier and the first chain of blocks, verifying that the different user has a valid account on the tokenization platform based on the public address of the user and the main chain of blocks, and, in response to validating the specific token and verifying the different user, updating the second chain of blocks with a new block. The new block includes ownership data that indicates that the specific token corresponding to the virtual representation is owned by the different user.

Figure 17:
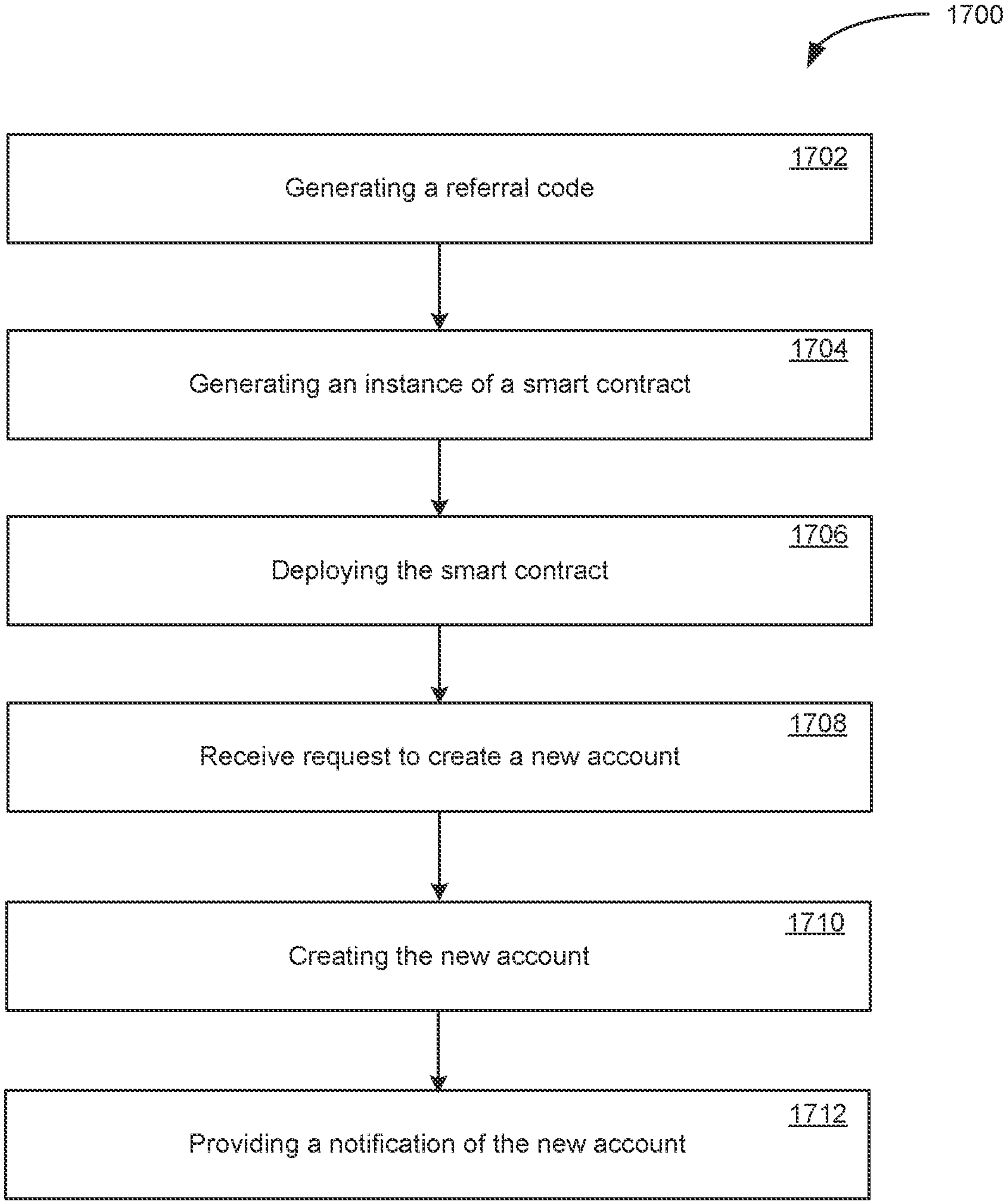
FIG. 17 is a flowchart showing a technique for facilitating user acquisition according to some embodiments of the present disclosure.

FIG. 17 depicts a flowchart showing a technique 1700 for facilitating user acquisition according to some embodiments of the present disclosure. At 1702, a referral code is generated, which corresponds to a user of the tokenization platform. The referral code may be generated by a processing system of the tokenization platform. At 1704, an instance of a smart contract is generated that corresponds to the user of the tokenization platform. The instance of the smart contract may be generated by the tokenization platform. The instance of the smart contract indicates an incentive to be provided to the user when the user successfully refers the tokenization platform. At 1706, the instance of the smart contract is deployed by the processing system. At 1708, a request to create a new account is received from a new user by the processing system. The request includes the referral code of the user. At 1710, the new account is created for the new user by the processing system. At 1712, the processing system provides a notification of the new account to the instance of the smart contract corresponding to the user. The smart contract then facilitates the transfer of a token representing the incentive in response to the notification.

Figure 18:
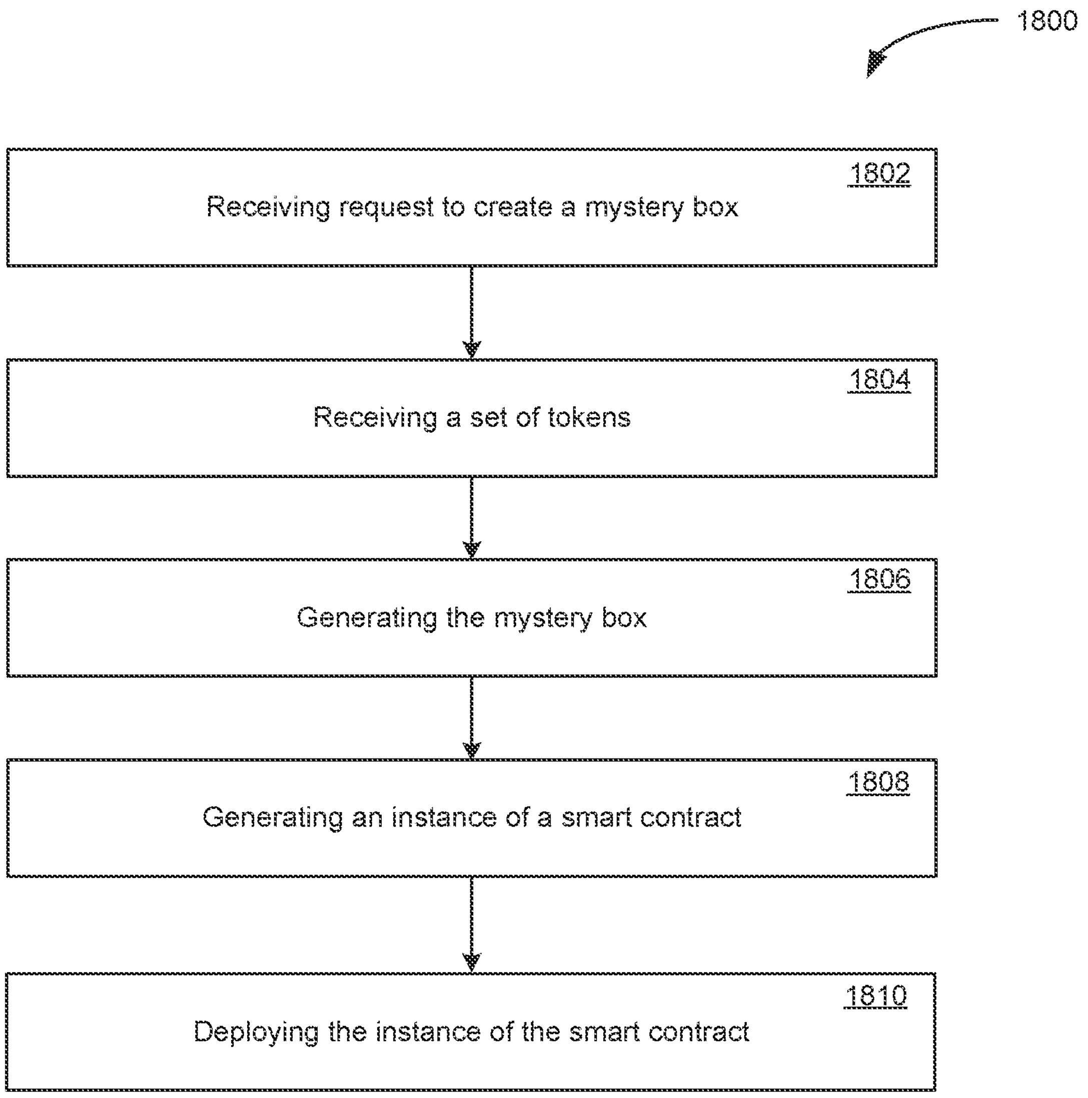
FIG. 18 is a flowchart showing a technique for managing mystery boxes according to some embodiments of the present disclosure.

FIG. 18 depicts a flowchart showing a technique 1800 for managing mystery boxes according to some embodiments of the present disclosure. At 1802, a request to create a mystery box is received by the processing system. At 1804, a set of tokens to be included in the mystery box is received by the processing system. Each token in the set of tokens represents a respective item and has a probability assigned thereto. The probability indicates a probability of winning the respective item.

At 1806, the mystery box is generated by the processing system based on the set of tokens and the probabilities assigned thereto. Each token in the set of tokens is assigned a range of values within an interval of values such that the range of values with respect to the interval of values is proportionate to the probability assigned to the token.

At 1808, an instance of a smart contract is generated by the processing system. The smart contract is associated with the mystery box and governs the transfer of tokens from the set of tokens in support of the mystery box. At 1810, the instance of the smart contract is deployed by the processing system.

Figure 19:
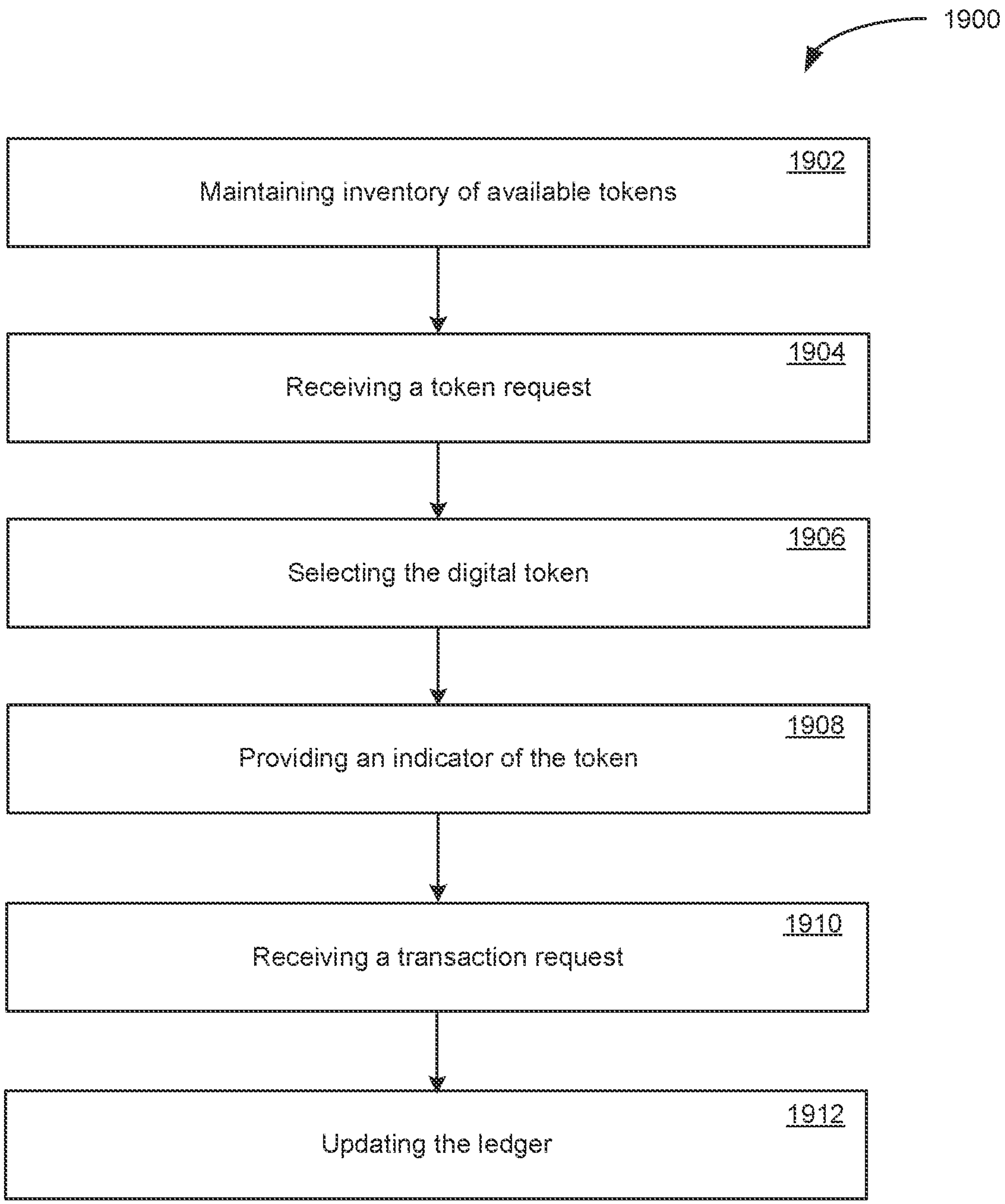
FIG. 19 is a flowchart showing a technique for video-game integration according to some embodiments of the present disclosure.

FIG. 19 depicts a flowchart showing a technique 1900 for video-game integration according to some embodiments of the present disclosure. At 1902, an inventory of available tokens is maintained. The available tokens are available for integration in a video game. Each token in the inventory of tokens represents a respective item. At 1904, a token request for a digital token is received by the processing system. The digital token is from an instance of the video game via an API. At 1906, the processing system selects the digital token from the inventory of available tokens based on the token request. At 1908, an indicator of the token is provided to the instance of the video game by the processing system. At 1910, the processing system receives a transaction request from the instance of the video game. The transaction request is configured to request a transfer of the token provided to the instance of the video game to an account of a user of the instance of the video game. At 1912, the ledger is updated to reflect that the user is the owner of the token.

It is noted that that the example of FIG. 19 may be adapted to provide integration into other forms of media. In some embodiments, the tokenization platform 100 may be configured to serve tokens that are linked to good or services in various types of media streams, whereby viewers of the stream may be presented with opportunities to purchase a token via the stream, such that the user may then later redeem the token for the offering that is linked to the token. In some of these embodiments, the API system 108 of the tokenization platform 100 may be configured to interface with a stream provider (e.g., Twitch®, Youtube®, Instagram®, Facebook®, Twitter®, and/or the like) to allow users of the streaming provider to purchase tokens directly in or from the stream. In these embodiments, the streamer (e.g., influencer, video game player, or other provider of the stream) or another entity (e.g., advertiser, streaming platform, and/or the like) may select the tokens that are made available for purchase from the stream. In some of these embodiments, the token or a visual indicia corresponding to the token may be presented in the stream and users may then interact with their device (e.g., click-to-purchase) to initiate the purchase of the token. In these embodiments, the users may have their account on the streaming platform linked to their wallet or distributed ledger account (e.g., via an email address or another unique identifier of the user). In response to the user initiating the purchase of the token, the API system 108 may receive the purchase request and may initiate a purchase workflow on the tokenization platform 100. For instance, the API system 108 may provide authorization to the digital marketplace 102 to charge the user for the token. The digital marketplace 102 may then initiate the transfer of funds from an account of the user to an account of the seller of the token (or the corresponding offering) and the transfer of the token to an account of the user. At this point, the user then owns the token and may view the token in their digital wallet, where the user may then choose to redeem the token for the offering, sell the token at a later time (e.g., on a secondary market), gift the token, trade the token, or the like. In this way, the tokenization platform 100 allows content providers to sell goods and/or services in-stream (e.g., during a live stream event) without having their viewers be redirected to a landing page where they can purchase an offering being provided or advertised by the streamer. For example, a streamer that has a video game stream can include tokens (and/or mechanisms for It is appreciated that the foregoing integration techniques may be applied in different types of streams as well, such as streams of live sports or concerts, broadcast streams of tv shows or movies, streams of news events, streams specifically constructed to facilitate product demonstrations and/or shopping, and/or the like. Furthermore, the types of offerings may vary depending on the type of stream, target audience, content type, or the like. For example, a live stream during a football game (American or European) may present tokens that are linked with food items, such that a viewer may purchase a token for a particular deal (e.g., "chicken dinner for $12.99"). The user may then redeem the token to initiate the fulfilment of the order (e.g., delivery of the food or pickup of the food). In this way, the user may provide the fulfilment details when the user wishes to have the order fulfilled. In another example, limited edition items that sell out quickly (e.g., makeup, collectibles, signed memorabilia, etc.) may be released during a live stream. In these example embodiments, the API system 108 may provide data indicative of the tokens that are available for transaction, such that the stream provider may receive the data and may integrate the offer into the live stream. In this way, the user may elect to purchase the token from the live stream, such that the streaming platform may detect a user action that indicates the election to purchase a token and, in response, may provide the user selection and user information to the tokenization platform 100 via the API system 108. In response, the tokenization platform 100 may facilitate the transaction for the token between the user and the seller. In these example embodiments, users may act to purchase items that are expected to sell out quickly without having to leave the stream.

Decentralized/Collateralized NFT-Based Lending

Figure 20:
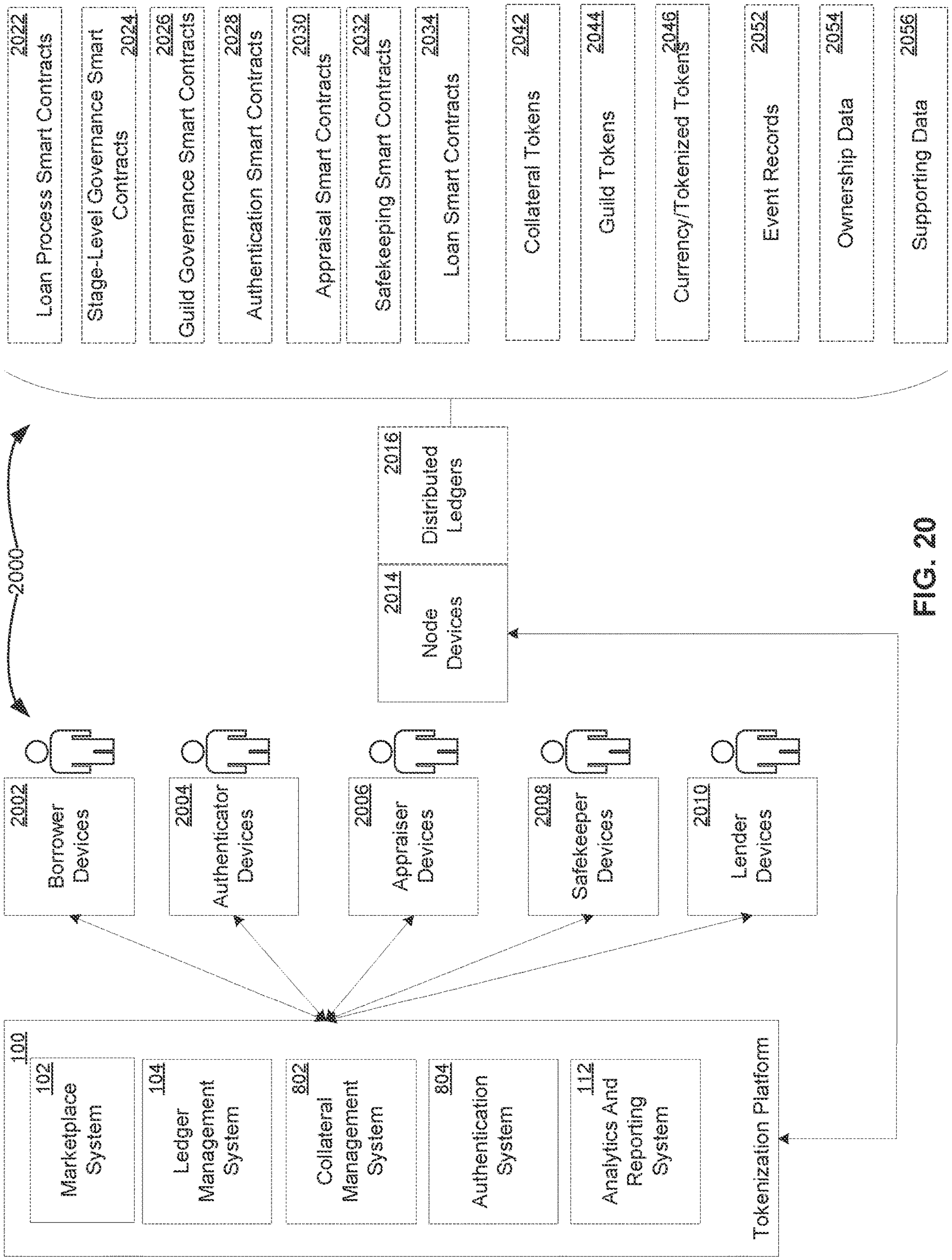
FIG. 20 is a schematic illustrating an example ecosystem of a decentralized lending system according to some embodiments of the present disclosure.

FIG. 20 illustrates an example ecosystem 2000 for facilitating securitized decentralized loan processes (also referred to as a "decentralized loan process", "securitized loan process", or "loan process"). A securitized decentralized loan process may refer to a process that is distributed amongst a series of participants (e.g., vis-à-vis computing systems 100, 2014 and devices 2002, 2004, 2006, 2008, 2010) and a set of smart contracts hosted on the set of distributed ledgers 2016, such that a borrower can collateralize one or more physical items in a trustless or substantially trustless manner and a lender is empowered to loan money to the borrower in a trustless or substantially trustless manner (e.g., without having to personally authenticate, appraise, safekeep, and/or liquidate the collateral item). In particular, the disclosed ecosystem and the systems and methods that support it provide mechanisms that allow a borrower to digitally collateralize a physical item into a digital collateral token 2042, such that the digital collateral token 2042 can be used to secure a loan from a lender using smart contracts. In embodiments, the stages of a decentralized loan process may include one or more of: a request stage where a borrower requests to being a loan process; an authentication stage where a collateral item is authenticated by one or more authenticators; an appraisal stage where the collateral item is appraised by one or more appraisers; a safekeeping stage where the collateral item is deposited with a safekeeper until an instance of the loan process ends; a virtualization stage where a VIRL corresponding to the collateral item is generated; a tokenization stage where the VIRL is tokenized into a collateral token 2042; a loan request stage where a borrower may request a loan and/or negotiate the terms of the loan with one or more potential lenders that ends with the borrower and lender agreeing to the terms of the deal and the locking of the collateral token into an escrow account until the loan process is completed; a loan repayment stage where the loan is repaid by the borrower or defaulted on; and a post-loan stage where the collateral token 2042 is transferred back to the borrower if the loan is successfully repaid or liquidated to a buyer if the borrower has defaulted, the collateral token is redeemed for the collateral item from the safekeeper, and/or any post-loan analytics are performed.

In some example embodiments, a tokenization platform 100 supports securitized decentralized loan processes. In these example embodiments, a marketplace system 102, a ledger management system 104, a collateral management system 802, an authentication system 804, and an analytics and reporting system 112 may be configured to interface with a set of user devices (e.g., borrower devices 2002, authenticator devices 2004, appraiser devices 2006, safekeeper devices 2008, and/or lender devices 2010) in facilitating the decentralized loan processes vis-à-vis a set of distributed ledgers 2016 hosted by a set of node devices 2014. In embodiments, the securitized decentralized loan ecosystem 2000 includes a number of different participants that participate in different stages of a securitization decentralized loan process. In some embodiments, the participants in the loan may include borrowers that seek to obtain a loan using physical collateral items, authenticators that authenticate the physical collateral items, appraisers that appraise the physical collateral items, safekeepers that safely store the physical collateral items, lenders that lend currency to the borrowers, as well as other suitable participants that support a distributed ledger ecosystem (e.g., "miners" and/or distributed ledger node devices 2014). As will be discussed, some types of participants may be organized into guilds, which are groups of entities (e.g., individuals and/or businesses) that have subject-matter expertise that pertains to a particular stage, such as authentication, appraisal, and safekeeping. It is appreciated that the participants in the securitized decentralized ecosystem 2000 may interact with one another and with the distributed ledger(s) 2106 via various computing devices, such as laptop computers, desktop computers, tablets, video game consoles, server computers, and/or the like. For purposes of explanation, a borrower participates in the ecosystem 2000 via a borrower device 2002, an authenticator participates in the ecosystem 2000 via an authenticator device 2004, an appraiser participates in the ecosystem 2000 via an appraiser device 2006, a safekeeper participates in the ecosystem 2000 via a safekeeper device 2008, a lender participates in the ecosystem 2000 via a lender device 2010, and the like.

In embodiments, a securitized decentralized loan process may be at least partially implemented using a set of distributed ledgers 2016 hosted by a network of node devices 2014, where the node devices 2014 execute smart contracts instances that are created in connection with a securitized loan process, including one or more smart contracts that manage the authentication, appraisal, and/or securitization of one or more collateral items. In some embodiments, one or more stages in the decentralized loan process are managed by a respective set of smart contracts. In general, a smart contract may include computer executable code that, when executed, executes conditional logic that triggers one or more actions. Smart contracts may receive data from one or more data sources, whereby the conditional logic analyzes the data to determine if certain conditions are met, and if so, triggers one or more respective actions. Examples of smart contracts are discussed throughout the disclosure, including examples of conditional logic and triggering actions. In embodiments, the smart contracts may be defined in accordance with one or more protocols, such as the Ethereum protocol, the WAX protocol, and the like. Smart contracts may be embodied as computer-executable code and may be written in any suitable programming languages, such as Solidity, Golang, Java™, JavaScript™, C++, or the like. Various examples of smart contracts that may be used in connection with various embodiments of the securitized decentralized are discussed throughout the disclosure. In example embodiments of FIG. 20, a distributed ledger 2016 may store and the node devices 2014 may execute instances of: loan process smart contracts 2022, stage-level governance smart contracts 2024, guild governance smart contracts 2026, authentication smart contracts 2028, appraisal smart contracts 2030, safekeeping smart contracts 2032, loan smart contracts 2034, and/or other suitable smart contracts. The different types of smart contracts are discussed throughout the disclosure.

In embodiments, the distributed ledgers 2016 may store tokens that are used in connection with a decentralized loan process, including, but not limited to, collateral tokens 2042 that are generated in connection with the decentralized loan process and held as collateral to secure a loan, guild tokens 2044 that are owned and/or used by guild members (which can be used by guild members to vote, as discussed below) that perform a certain task in connection with a decentralized loan process, currency/tokenized tokens 2046 that are utilized in connection with the decentralized loan process (e.g., for lending, for repayment, for rewarding, for staking, or the like), and other suitable tokens. In embodiments, a collateral token 2042 may be a digital token that wraps one or more virtual representations of a physical item (VIRLs) of one or more respective collateral items that are used to securitize a loan in a decentralized loan process. In embodiments, the VIRL corresponds to a physical item and may include descriptions of the item, photographs of the item, videos of the item, and the like. Virtual representations (VIRLs) of physical items are discussed throughout the disclosure. In embodiments, a collateral token 2042 may include a smart contract wrapper, such that when an owner of the collateral token (as determined from an ownership record of the collateral token after a loan has been repaid and/or after a liquidation event) redeems the token (as discussed above), the smart contract associated with the collateral token 2042 may provide a notification to the safekeeper of a collateral item represented by the collateral token 2042 to provide the collateral item. Once the safekeeper confirms that the holder of the collateral token 2042 has taken possession of the collateral item, the smart contract of the collateral token 2042 may burn the redeemed collateral token 2042, as described above. Currency tokens may refer to digital tokens that are used as currency. Examples of currency tokens may include Bitcoin tokens, Ethereum tokens, Ripple tokens, Wax tokens, and the like. In some embodiments, a tokenized token refers to a digital token that "wraps" an amount of currency (e.g., a currency token and/or fiat currency). When a tokenized token is created, an amount of currency is held escrow and the tokenized token represents an ownership right to the escrowed amount of currency, such that when the tokenized token is redeemed by a verified owner of the tokenized token, the owner may take possession of the escrowed amount of currency. As currency tokens and tokenized tokens are both representative of currency, use of the term "currency/tokenized" tokens may refer to either currency tokens, tokenized tokens, or a combination of both currency tokens and tokenized tokens.

In embodiments, the distributed ledgers 2016 may store additional data, such as event records 2052, ownership data 2054, and/or supporting data 2056. Event records 2052 may include records that memorialize any events that occur in connection with a decentralized loan process. Event records 2052 may include records of events such as, but not limited to: a request by a borrower to being a loan process, an authentication task being assigned, an authentication task being completed, an appraisal task being assigned, an appraisal task being completed, a safekeeping task being assigned, a safekeeping task being completed, a loan being requested by a borrower, a loan being accepted by a lender, a locking of a collateral token of a borrower that is locked in escrow in response to a loan agreement being entered into by the borrower, a payment being made by the borrower to the lender, a payment being missed by the borrower, the transfer of a loan contract to a secondary lender from a current lender, a loan being determined to be in default by a borrower, a liquidation event occurring, a loan being fully repaid by the borrower; rewards being awarded to participants in a decentralized process, an item being deemed fake after a liquidation event, an item failing to reach an appraised value during a liquidation event, and the like. In embodiments, an event record may be generated by any suitable computing device within the ecosystem 2000, such as the tokenization platform 100, borrower devices 2002, authenticator devices 2004, appraiser devices 2006, safekeeper devices 2008, lender devices 2010, node devices 2014 (e.g., by smart contracts executed by the node devices 2014), or other suitable devices. In embodiments, an event record 2052 may be hashed using a hashing function to obtain a hash value. The event record 2052 may be written into a data block and stored in a distributed ledger, where the data block may include the hash value. In this way, the data within the event record 2052 cannot be changed without changing the hash value of the event record 2052, thereby making the event record 2052 immutable. Once a block containing an event record 2052 is stored on a distributed ledger, the event record 2052 may be referenced using an address of the block with respect to the distributed ledger 2016.

In embodiments, supporting data 2056 may be documentation and data that is provided in support of a task performed or other events that occur in connection with decentralized loan processes and/or the participants of the decentralized loan processes. As will be discussed, supporting data 2056 may include authentication reports and supporting photographs, videos, scans or the like; appraisal reports and supporting photographs, videos, scans or the like; safekeeping reports and supporting photographs, videos, scans or the like; loan negotiation records that indicate negotiation events during negotiation of a loan contract; disbursement records that correspond to disbursement events by a lender to the borrower; repayment records that indicate payment events by the lender; default records that indicate default events; and/or other suitable data.

In embodiments, ownership data 2054 may include data that associates a token (e.g., collateral tokens 2042, currency/tokenized tokens 2046, and/or guild tokens 2044) to an account. In embodiments, ownership data 2054 may be stored in data blocks, where a data block may include a link between a token address and an account address. For example, if Bob owns 10 currency tokens (e.g., bitcoins), the ownership data 2054 of each token may be stored on a distributed ledger and may link the respective tokens to an account associated with Bob. If Bob uses one of those tokens 2046 to purchase an item from Alice, the ownership data 2054 of the token can be updated to link the token 2046 used to purchase the item to an account of Alice. When ownership changes to a new account, a new block may be amended to the distributed ledger 2016 that links the token with the new account. In embodiments, tokens (e.g., collateral tokens 2042 and/or currency/tokenized tokens 2046) may be locked during the course of a loan process. As used herein, "locking" a token may refer to storing the token in an escrow account (e.g., on a distributed ledger that stores escrowed tokens), whereby a locked token cannot be transferred from the escrow account unless a smart contract associated with the token determines that the token has been unlocked. In embodiments, a collateral token may be "locked," for example, upon a borrower and lender agreeing to loan terms. In some embodiments, a certain amount of currency/tokenized tokens 2046 belonging to participants (e.g., authenticators, appraisers, and/or safekeepers) may be locked when the participants perform certain tasks in relation to securing a loan (e.g., authentication tasks, appraisal tasks, and safekeeping tasks) to provide an incentive to the participants to participate in the loan process in good faith (e.g., err on the side of not authenticating a collateral item, not overvalue collateral items to increase rewards for appraising, and to store collateral items property). When a token is "locked," ownership data 2054 that links the token to an escrow account that is managed by a trusted third party (e.g., the tokenization platform 100) may be added to the distributed ledger. Once locked in the escrow account, the token cannot be redeemed or transferred unless it is unlocked. Once an event that triggers a change in ownership of a token (e.g., repayment of at least a portion of the loan) occurs, the ownership data 2054 of the token may be updated in the distributed ledger 2016 storing the ownership data 2054 to reflect that the token is owned by the rightful owner (e.g., the borrower, a participant, a buyer of the token, or the like), thereby unlocking the token. In some embodiments, when a collateral token 2054 is locked, the owner of the physical item may be precluded from using the virtual representation of the item in a virtual environment. For example, if the owner of a physical item that is tied to a video game via a VIRL (e.g., the owner of shoes also owns a VIRL of the shoes that when used in the video game give the owner special features in the video game, such as running faster or jumping higher) collateralizes the physical item using the techniques described herein and locks the resultant collateral token 2042 in an escrow account, the locking of the collateral token will result in the user being precluded from using the VIRL of the physical item in the video game. In embodiments, an external virtual environment, such as a marketplace, a video game, a social media platform or the like may be configured to query a distributed ledger to obtain the ownership data 2054 of a VIRL. If the VIRL is wrapped in a collateral token 2042 that is held in escrow, the virtual environment may determine that the corresponding collateral token is held in escrow and may preclude a user from using the VIRL in the virtual environment until the ownership data 2054 of the VIRL indicates that the user owns the VIRL.

It is noted that in addition distributed ledgers 2016, event records 2052, ownership data 2054, and supporting data 2056 and other suitable data that supports the decentralized loan processes may be stored in non-distributed datastores, filesystems, databases, and the like. For example, in embodiments, the tokenization platform 100 may maintain data stores that store event records 2052, ownership data 2054, and supporting data 2056 and other suitable data that supports the decentralized loan processes.

In embodiments, certain groups of participants (e.g., authenticators, appraisers, safekeepers, and the like) in the decentralized loan process may form or be organized into guilds based on a common expertise in an area in accordance with a set of governances that are defined to facilitate a securitized decentralized loan process. In general, guild formation, membership, and operations thereof, as well as the transactions (and other events) performed during a loan process and mechanisms for facilitating a loan process adhere to a set of governances. Governances may refer to respective sets of rules and/or regulations to which one or more aspects of the loan process and the participants adhere. In embodiments, governance may be defined in a set of files and/or documents (e.g., governance documents) that are stored on a distributed ledger and/or a centralized computing system (e.g., the tokenization platform). In some embodiments, governance may be enforced by the use of smart contracts and/or software applications that are executed by a centralized computing system (e.g., the tokenization platform 100). In embodiments, the set of governances may include a system-level governance that applies to the entire loan process (e.g., all transactions and participants that participate in the loan process), stage-level governances that apply to participants that participate in a particular stage (or set of stages) of the loan process and the transactions that are performed during the particular stage (or set of stages), guild-level governances that apply to respective guilds that participate in a respective stage and/or the transactions in which the guild members participate, and/or sub-guild governances that apply to respective sub-guilds formed from respective guilds and the transactions in which the sub-guild members participate. In embodiments, the set of governances is hierarchical, whereby the system-level governance takes precedent over stage-level governances that correspond to respective stages of the loan process, a stage-level governance of a respective stage takes precedent over guild-level governances of respective guilds that participate in the respective stage, and a guild-level governance of a respective guild takes precedent over sub-guild governances of sub-guilds formed from within the respective guild. Put another way, a sub-guild governance of a sub-guild can expand on or further refine, but not contradict, the rules and regulations put forth in the guild-level governance of the guild from which the sub-guild was formed; a guild-level governance can expand on or further refine, but not contradict, the rules and regulations put forth in the stage-level governance of the stage in which the guild participates, and a stage-level governance can expand on or further refine, but not contradict, the rules and regulations put forth in the system-level governance. It is appreciated that none of the different types of governances are required and certain stages and guilds may adhere to a higher-level of governance (e.g., the system-level governance or a stage-level governance) without departing from the scope of the disclosure.

As discussed, the term "guild" may refer to a set of entities (e.g., individuals or companies) that perform a defined type of specialized task (e.g., authentication, appraisal, and/or safekeeping of specific types of collateral items) that may be domain specific (e.g., authentication of watches, appraisal of sneakers, safekeeping of valuable and/or perishable items), whereby members of the guild adhere to a set of governances. For purposes of explanation, guild members are described as individuals, but it is appreciated that organizations may be comprised of individuals that have the same areas of expertise and therefore may be included in guilds. In some embodiments, a guild must adhere to the system-level governance, a stage-level governance corresponding to the stage in which the guild participates, and/or a guild-level governance of the guild to which the guild member belongs. The stage-level governance may define the rules and regulations that pertain to all participants that can participate in a stage (e.g., authentication stage, appraisal stage, safekeeping stage, lending stage, and the like). For example, an authentication stage-level governance may apply to any authenticators that perform authentication tasks in connection in a decentralized loan process, an appraisal stage governance may apply to any appraisers that perform appraisal tasks in connection with a decentralized loan process, a safekeeping stage governance may apply to any safekeepers that perform safekeeping tasks in connection with a decentralized loan process, a lending stage governance may apply to any lenders that lend money with a decentralized loan process, and the like. Guild-level governances may define rules and regulations to members of a particular guild that participate in a particular stage. For example, a watch authentication guild governance may only pertain to members of a watch authentication guild, a handbag authentication guild governance may only pertain to members of a handbag authentication guild, a jewelry authentication guild governance may only pertain to members of a jewelry authentication guild, a watch appraisal guild governance may only pertain to members of a watch appraisal guild, a handbag appraisal guild governance may only pertain to members of a handbag appraisal guild, a sneaker appraisal guild governance may only pertain to members of a sneakers appraisal guild, and the like. In embodiments, a stage-level guild governance may define one or more of: the manner by which guilds can be created, the manner by which guild members are added to a guild; the manner by a guild member is removed from the guild, the manner by which guild members vote on amending the governance, workflows, smart contracts, and/or documents that are implicated by certain tasks that are performed by a respective guild (e.g., appraisals, authentications, safekeeping, and the like); voting mechanics; and the like. As discussed, the sets of governances may be hierarchical in nature, such that lower-level governances are required to adhere and/or not contradict higher level governances. For instance, the authentication stage-level governance may define a set of rules and regulations that applies to all authenticators and a guild-level governance may define a set of rules, recommendations, and/or regulation that applies to a respective guild (e.g., a watch authentication guild or a jewelry authentication guild) within the broader group of authenticators (e.g., all authenticators). In this example, the guild-level governance may be required to adhere and not contradict to the stage-level governance, but may refine rules and/or regulations in the stage-level governance as well as add new rules and/or regulations that were not defined in the stage-level governance. For instance, an example authentication stage-level governance may require that authenticators temporarily stake at least certain amount of funds (e.g., half of a loan amount) for each authentication task performed by a guild member. In this example, a guild-level governance of an authentication guild (e.g., watch authentication guild) must require its guild members at least stake the amount of funds defined in the authentication stage-level governance in connection with authentication tasks performed by guild members, but the guild-level governance may require a greater amount (e.g., the entire loan amount) than the amount defined in the authentication stage-level governance. In another example, an appraisal stage-level governance may require that appraisers provide documentary support for an appraisal and a guild-level appraisers governance that pertains to a specific guild of appraisers may further refine what documentary support is to be provided in support of an appraisal performed by a guild member. Additional examples of governance rules, recommendations, and/or regulations are provided throughout the disclosure.

In some embodiments, membership to a guild is at least in part decided by existing guild members in accordance with the stage-level and/or guild-level governance of the guild. For example, in example embodiments, the stage-level governance and/or a guild-level governance of a guild may provide that a guild member may nominate an individual not in the guild to be added to the guild and the members of the guild may vote to admit or deny the entity to the guild and may further include the mechanics on how to nominate, vote on, and admit a new member to the guild. Thus, in order to add a new member to the guild, the existing guild members must conduct the nomination and voting process in accordance with the controlling governances. In some embodiments, voting may be managed using a guild governance smart contract 2026. A guild governance smart contract 2026 may refer to a smart contract that is configured to manage administrative tasks of a guild, such as voting on amending a guild-level governance and/or stage-level governance (if the guild governance smart contract 2026 pertains to the broadest guild), voting on adding new members to a guild, voting on removing members from a guild, issuing guild tokens 2044 to guild members, and/or the like. In some of these embodiments, a guild governance smart contract 2026 that is used to vote in new members into a guild may include conditional logic that receives a nomination of a potential guild member and determines whether certain conditions are met (e.g., does the nominator have a high enough rating to nominate, has the nominator been a guild member long enough to nominate, does the nominator have a minimum number of guild tokens 2044 or other analogous status indicators to nominate a new guild member, was the proper protocol used, and/or the like). In response to verifying that the nomination is valid, the guild governance smart contract 2026 may execute an action that solicits votes from the current guild members and to tally the votes. Once a member is voted on, the guild governance smart contract 2026 may be configured to determine whether the nominee has received enough votes to be admitted to the guild. If so, the nominee is added to the guild. If not, the nominee is denied admittance to the guild. In doing so, the guild governance smart contract 2026 may create one or more event records 2052 identifying the results of the vote and/or whether a new member was added to the guild. In embodiments, the event records 2052 may be written to a distributed ledger 2016. The guild governance contract 2026 may perform additional actions, such as granting the new member guild tokens 2044, creating a profile for the new guild member, adding the new guild member to a roster from which guild members are selected to perform tasks, and/or the like. Guild members may be added to a guild in other manners without departing from the scope of the disclosure.

In embodiments, an authentication guild may include a set of individuals or organizations that have domain specific expertise authenticating a particular type (or types) of item(s). For example, a watch authentication guild may be comprised of individuals that have expertise authenticating watches, a shoe authentication guild may be comprised of individuals that have expertise authenticating shoes, a handbag authentication guild may be comprised of individuals that have expertise authenticating handbags, an art authentication guild may be comprised of individuals that have expertise authenticating works of art, a sports memorabilia guild may be comprised of individuals that have expertise authenticating sports memorabilia, a toy authentication guild may be comprised of individuals that have expertise authenticating collectible toys, a jewelry authentication guild may be comprised of individuals that have expertise authenticating jewelry, a clothing authentication guild may be comprised of individuals that have expertise authenticating designer clothing, an instrument authentication guild may be comprised of individuals that have expertise authenticating musical instruments, a record authentication guild may be comprised of individuals that have expertise authenticating rare or collectible records, a wine authentication guild may be comprised of individuals that have expertise authenticating units (e.g., barrels or bottles) of wine, a whiskey authentication guild may be comprised of individuals that have expertise authenticating units (e.g., barrels or bottles) of whiskey, an automobile authentication guild may be comprised of individuals that have expertise authenticating limited edition automobiles, and any other suitable authentication guild.

In embodiments, an appraisal guild may include a set of individuals or organizations that have domain specific expertise appraising a particular type (or types) of item(s). For example, a watch appraisal guild may be comprised of individuals that have expertise appraising watches, a shoes appraisal guild may be comprised of individuals that have expertise appraising shoes, a handbag appraisal guild may be comprised of individuals that have expertise appraising handbags, an art appraisal guild may be comprised of individuals that have expertise appraising works of art, a sports memorabilia appraisal guild may be comprised of individuals that have expertise appraising sports memorabilia, a toy appraisal guild may be comprised of individuals that have expertise appraising collectible toys, a jewelry appraisal guild may be comprised of individuals that have expertise appraising jewelry, a clothing appraisal guild may be comprised of individuals that have expertise appraising designer clothing, an instrument appraisal guild may be comprised of individuals that have expertise appraising musical instruments and equipment, a record appraisal guild may be comprised of individuals that have expertise appraising rare or collectible records, a wine appraisal guild may be comprised of individuals that have expertise appraising units (e.g., barrels or bottles) of wine, a whiskey appraisal guild may be comprised of individuals that have expertise appraising units (e.g., barrels or bottles) of whiskey, an automobile appraisal guild may be comprised of individuals that have expertise appraising limited edition automobiles, and any other suitable appraisal guild.

Within some guilds, there may be different classes of items that are much more popular than others and/or may require additional expertise. For example, within the watch authentication guild, there may be a large number of authentication requests to authenticate Rolex® watches some guilds, both because of the number of such watches on the market and the number of counterfeit watches that are meant to pose as Rolex® watches. Thus, in some embodiments, some stage-level governances and/or guild-level governances may provide a mechanism by which one or more sub-guilds can be formed, where a sub-guild of a guild is comprised of individuals of the guild that have expertise in authenticating a particular subdomain of the guild's area of expertise. For example, within the watch guild, there may be respective sub-guilds that specialize in authenticating different brands of watches, such as Rolex® watches, Omega® watches, Hamilton® watches, and the like. In another example, the shoe authentication guild, there may be respective sub-guilds that specialize in authenticating different types of shoes, such as sneakers, high-tops, skateboarding shoes, heels, dress shoes or the like, and/or sub-guilds that specialize in authenticating different brands of shoes, such as Nike® shoes, Jordan® shoes, Adidas® shoes, Gucci® shoes, Louboutin® shoes, or the like. In another example, within the art authentication guild, there may be respective sub-guilds that specialize in authenticating works of art in different mediums, such as paintings, oil paintings, sculptures, lithographs, concert posters, swords, vases, pottery, and the like; different styles of art, such as impressionist paintings, abstract paintings, post-modern art, pop art, graffiti, Japanese swords, Chinese vases, Faberge eggs, or the like; and/or art by different artists. As can be appreciated, different guilds may be broken down into sub-guilds in different manners. Furthermore, because a sub-guild exists for a subdomain of the guild, does not mean that all items must fall within a sub-guild. For example, if the watch authentication guild includes a Rolex sub-guild but no other sub-guilds, a Rolex® watch may be authenticated by one or more authenticators in the Rolex® sub-guild, but an Omega® watch may be authenticated by one or more authenticators within the broader watch authentication guild, including members of the Rolex sub-guild.

In embodiments, the ability to form a sub-guild from within a respective guild may be defined in the respective guild's guild-level governance and/or stage level governance. In some of these embodiments, formation of new sub-guilds from a respective guild may be managed and enforced using a guild governance smart contract 2026 corresponding to the respective guild. In some embodiments, a guild governance smart contract 2026 may define the mechanics by which a sub-guild can be requested (e.g., automatically or by a set of guild members) and created. For example, a guild governance smart contract 2026 that is used by a particular authentication guild (e.g., watch authentication guild) may include conditional logic that defines a minimum number and/or minimum percentage of guild members (e.g., watch authenticators) that are required to request/approve the creation a new sub-guild (e.g., a Rolex sub-guild). In this example, the guild-level governance of the particular authentication guild may require that at least ten guild members and/or that at least 50% of the guild members voting power (where voting power may be determined using a voting token scheme where members with more guild tokens 2044 have more voting power or a "one-member-one-vote" scheme where every member has one equally weighted vote) agree to the creation of a sub-guild. Additionally or alternatively, the guild governance smart contract 2026 may include conditional logic that requires a minimum number or minimum percentage of verified successful authentication events (or other tasks if another stage) performed by the guild members involving a particular subclass of items to authorize the creation of a new sub-guild. For example, the guild governance smart contract 2026 of a shoe authentication guild may require proof of at least one thousand successful authentication events and at least 5% of the total authentication events to involve a particular class of shoes, and the shoe authentication guild has collectively performed 10,000 successful authentication events involving a pair of shoes, and over 1000 of those authentication events have involved Nike® sneakers, the shoe guild may vote to create a Nike® sub-guild (or a "sneaker" sub-guild). In this example, the shoe authentication guild's guild governance smart contract may require analytics to prove the over 1000 successful authentication events (which may include successful identification of knock-off sneakers and/or successful authentication of authentic Nike® sneakers). In embodiments, the analytics to prove that the guild has reached the requisite number of successful authentications may be obtained based on an analysis of a distributed ledger that stores authentication records. Furthermore, the shoe authentication guild-level governance may then require the guild members to vote on the creation of the new Nike® sub-guild, where the voting scheme is defined in the shoe guild-level governance and/or the authentication stage-level governance. Assuming all of the conditions to create a new sub-guild within the shoe guild are met, a guild governance smart contract may trigger a "create new sub-guild" action. In embodiments, the create new sub-guild action may include the creation of a new governance that corresponds to the sub-guild that defines the rules for the particular sub-guild, including rules for membership into the sub-guild, compensation and commissions for the sub-guild, mechanics for verifying items that are classified in the sub-guild, how the sub-guilds secure the authentication event, authentication forms used by the sub-group, and the like. It is noted that in embodiments, the sub-guild governance of the sub-guild may initially inherit one or more aspects of the broader guild governance (some of which are changeable by the sub-guild and some of which may not be changed by the sub-guild). In embodiments, the "create new sub-guild" action may include issuing a notification of the new sub-guild to the tokenization platform 100, such that the platform 100 may update the assignment of authentication tasks involving items that are classified under the expertise of the new sub-guild to the new sub-guild.

Figure 21:
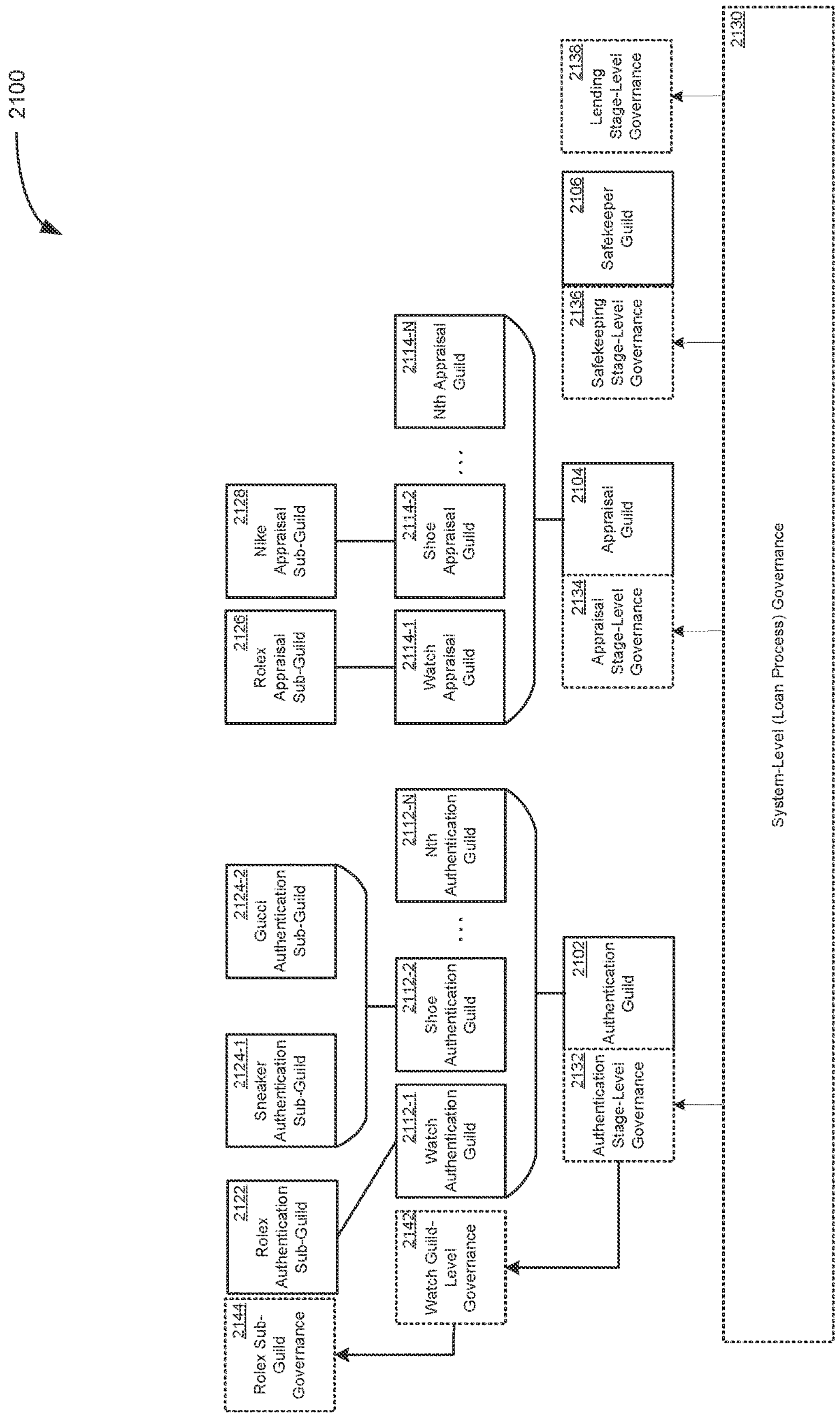
FIG. 21 is a schematic illustrating an example of guilds, sub-guilds, and various types of governances that govern various stages of a decentralized loan process according to some embodiments of the present disclosure.

FIG. 21 illustrates an example of guilds within a decentralized loan ecosystem 2000 and the different types of governances that may govern the guild members and/or different aspects of the loan system. In the illustrated example, the stage-level guilds may include an authentication guild 2102 comprised of authenticators that perform authentication tasks, an appraisal guild 2104 comprised of appraisers that perform appraisal tasks, and a safekeeper guild 2106 comprised of safekeepers that perform safekeeping tasks. It is appreciated that additional or alternative types of participants may form guilds in different examples. For example, lenders may form a lenders guild (not shown). As discussed, within the authentication guilds, there may be guilds that include members having certain authentication specialties or that are located in certain regions. In the illustrated example, within the authentication guild, there may be a watch authentication guild 2112-1, a shoe authentication guild 2112-2, and/or any other suitable authentication guilds (e.g., Nth authentication guild 2112-N). Within some of the authentication guilds, authentication sub-guilds may be formed. For example, within the watch guild 2112-1, a Rolex sub-guild may be formed, where the members of the Rolex sub-guild 2122 may be watch guild members that have a special expertise in authenticating Rolex® watches. In this way, members of the Rolex sub-guild 2112-1 will be assigned authentication tasks pertaining to Rolex® watches (and potentially of other types of watches), while watch guild 2112-1 members that are not in the sub-guild 2122 cannot authenticate Rolex® watches but can authenticate any other type of watch (assuming no other watch sub-guilds exist). Similarly, within the shoe authentication guild 2112-2, a sneaker authentication sub-guild 2124-1 and a Gucci authentication sub-guild 2124-1 can be formed by members of the shoe authentication guild 2112-2. In this example, members of the sneaker authentication sub-guild 2124-1 can authenticate any type of sneakers, but shoe authenticators that are not in the sneaker authentication sub-guild 2124-1 cannot authenticate sneakers. Similarly, members of the Gucci authentication sub-guild 2124-2 can authenticate Gucci® shoes, but shoe authenticators that are not in the Gucci authentication sub-guild 2124-2 cannot authenticate Gucci® shoes.

Within the appraisal guild 2104, there may be guilds that are directed to members having certain appraisal specialties or that are located in certain regions. In the illustrated example, within the appraisal guild 2104 there may be a watch appraisal guild 2114-1, a shoe appraisal guild 2114-2, and/or any other suitable appraisal guilds (e.g., Nth appraisal guild 2114-3). In the illustrated example, a Rolex appraisal sub-guild 2126 has been formed from the watch appraisal guild 2114-1 and a Nike appraisal guild 2128 has been formed from the shoe appraisal guild 2114-2. As can be appreciated, the sub-guilds that are formed from within the various guilds do not need to be congruent with sub-guilds that are formed from guilds that participate in different stages. For example, while Rolex authenticators and Rolex appraisers formed respective sub-guilds 2122, 2126, there is no counterpart Nike authentication sub-guild and no counterpart sneaker appraisal sub-guild or Gucci appraisal sub-guild formed. The manner by which sub-guilds are formed may be defined in the stage-level governance and/or the guild governance of the guild from which a sub-guild is to be formed.

In this example, there are no guilds formed out of the safekeeper guild 2106. While this is the case in the current example, in some scenarios there may be guilds that include safekeepers having certain safekeeping specialties or that are located in certain regions. In the illustrated example, there are no guilds within the safekeeper guild, but safekeepers may organize according to region (e.g., states, cities, or the like), the ability to store certain types of items (e.g., vehicles, perishables, and/or the like), or other suitable common features.

In embodiments, the overall ecosystem 2100 (including the overall loan process workflow) may be governed by a system-level governance 2130. In this example, one or more stages may be governed by a stage-level governance that pertains to the participants in the stage and/or the workflows performed in connection with the stage. For example, an authentication stage-level governance 2132 pertains to all authenticators 2102 and the authentication stage, the appraisal stage-level governance 2134 pertains to all appraisers 2104 and the appraisal stage, the safekeeping stage-level governance 2136 pertains to all safekeepers 2106 and the safekeeping stage, the lending stage-level governance 2138 pertains to lenders (not shown) and the loan negotiation and repayment stages, and the like. As discussed, the stage-level governances 2132, 2134, 2136, 2138 can refine the system-level governance 2130 and may add rules and regulations that do not contradict the system-level governance 2130. Similarly, a watch guild-level governance pertains 2142 to the watch authentication guild 2112-1, but does not pertain to the other authentication guilds 2112-2 . . . 2112-N. The watch guild-level governance 2142 may include rules that further refine the system-level governance 2130 and/or add rules and regulations to the authentication stage-level governance 2132. In the example, a Rolex sub-guild governance 2144 may be created by the members of the Rolex authentication sub-guild 2122. The Rolex sub-guild governance 2144 defines additional rules and regulations that apply to members of the Rolex sub-guild 2122 when performing authentication of Rolex® watches, but that do not apply to other members of the watch authentication guild 2112-1. It is noted that the sub-guilds do not need a sub-guild governance and may use the guild-level governance of the guild from which the sub-guild was formed. More detailed discussion of guilds and governances is described below.

Referring back to FIG. 20, governances may define rules and regulations pertaining to different aspects of a securitized decentralized loan process. In embodiments, a system-level governance defines rules and regulations pertaining to the entire loan process. Examples of system-level governance include loan process workflow definitions (e.g., which stages must be performed and in what order); allowed types of collateral items; rules for guild formation and membership (e.g., can guilds be formed, can guilds change rules, how can guilds change rules, and/or the like); rules for managing a loan process workflow between stages (e.g., can an authenticator that authenticated a collateral item appraise the same collateral item and/or safekeep the collateral item, when the loan process can progress to the next stage, and the like); rules that require guild members to stake currency (e.g., cryptocurrency and/or fiat currency wrapped in a tokenized token) in relation to authentication tasks, appraisal tasks, and/or safekeeping tasks involving a collateral item; rules for performing tasks (e.g., the type of supporting documentation required to show consensus); rules for changing the governance (e.g., who can vote to change governance, how votes to change governances are conducted, and the like); rules for rewarding participants (e.g., any requirements and/or restrictions relating to amounts or percentages of payments that can be made in performing a specific task, regulatory requirements for different jurisdictions); and/or other suitable rules and regulations.

In embodiments, a system-level governance may include references to one or more respective loan process smart contracts 2022 that are stored on the distributed ledger 2016. A loan process smart contract 2022 may enforce one or more aspects of the system-level governance for instances of the decentralized loan process, including, for example, initiating each stage of the loan process when a previous stage is completed in accordance with a loan process workflow defined in the system-level governance. In embodiments, a loan process smart contract 2022 includes conditional logic that, once instantiated, listens (e.g., using an event listener thread) for a notification from a stage-level smart contract that indicates that the stage was successfully completed. In response to a stage being completed, the loan process smart contract 2022 may then initiate a next stage in the loan workflow process. For instance, an example loan process workflow may be defined as including a request stage where the borrower requests to collateralize one or more items, followed by an authentication stage where one or more authenticators authenticate the one or more items, followed by an appraisal stage where the authenticated items are appraised, followed by a safekeeping stage where the appraised items are stored in escrow with a trusted safekeeper, a tokenization stage where the ledger management system 104 (or another suitable component) generates VIRLs of the one or more escrowed items, generates a collateral token by tokenizing the VIRLs of the escrowed items, and locks the collateral token (e.g., in an escrow account on a distributed ledger 2016), a lending stage where a loan is negotiated and accepted by the borrower and a lender, a repayment stage where the loan is repaid by the borrower, and a post-loan stage where the collateral token is unlocked and returned to the borrower or liquidated if the borrower defaults on the loan. In facilitating this example loan process workflow, the loan process smart contract 2022 may be configured with conditional logic that determines whether a current stage has been successfully completed and if so to initiate a next stage in the loan process workflow. In embodiments, initiating a next stage of the loan process workflow may include instantiating an instance of a stage-level smart contract (e.g., an authentication smart contract 2028, an appraisal smart contract 2030, a safekeeping smart contract 2032, or a loan smart contract 2034), whereby the instantiated instance of the stage-level smart contract performs a stage-specific workflow and issues a notification that is received by the loan process workflow when the stage-specific workflow is completed successfully or unsuccessfully. In embodiments, a loan process smart contract 2022 may perform one or more tasks that are described as being performed by other types of smart contracts. For example, loan process smart contracts 2022 may be configured to facilitate loan negotiations and loan signing, monitoring repayment of the loan, determining default events, triggering liquidation events, awarding participants with rewards, and/or the like.

The system-level process governance may include additional rules and requirements, examples of which are provided throughout the disclosure. For example, the system-level process governance may include rules that preclude a single entity serving as an authenticator and appraiser, that require authenticators, appraisers, and/or safekeepers to stake at least a percentage of the loan value (e.g., to prevent manipulation of the system), and/or other rules that pertain to a decentralizing the loan process, reducing the likelihood of fraud, promoting trust, maximizing value for the participants, minting tokens, and/or the like. In embodiments, at least a portion of the system-level process governance is implemented by a loan process smart contract 2022. In embodiments, the loan process governance smart contract may include conditional logic that determines whether each respective stage was successfully completed, and if so, triggers the next action in the loan process.

In embodiments, a stage-level governance defines rules and regulations pertaining to a respective stage in the loan process, such that each stage of a loan process may be executed in accordance with one or more respective stage-level governances. It is appreciated that in some embodiments, a stage-level governance may apply to two stages. For example, the authentication stage may comport to a stage-level authentication governance that defines rules for any authentication tasks performed in connection with a decentralized loan process, the appraisal stage may comport a stage-level appraisal governance that defines rules for any appraisal tasks performed in connection with the decentralized loan process, the safekeeping stage may comport a stage-level safekeeping governance that defines rules for any safekeeping tasks performed in connection with the decentralized loan process, a VIRL stage-level governance that defines rules for generating a VIRL of a collateral item, a tokenization stage-level governance that defines rules for generation a token of a VIRL of a collateral item (in some embodiments, the VIRL stage and the tokenization stage may be treated as a single stage), a loan governance that defines rules for requesting and negotiating a loan, and/or any other suitable stage-level governances.

In embodiments, a stage-level governance may further refine rules set forth in the system-level governance and/or may include additional rules that pertain to the stage. For example, a stage-level governance may further refine rules and/or regulations from the system level governance, such as further refinements of adding and/or removing guild members; further refinements on how guild members stake currency in relation to a guild-specific task (e.g., authentication task, appraisal task, or safekeeping task); further refinements on what types of evidence are needed to support an authentication task; or the like. For example, the system-level governance may state that new members must be voted into any guild and may be removed by at least a 60% majority but may not define any other specifics. In this example, the authentication stage-level governance rules may define a first voting scheme for voting in and removing members from authentication guilds, while the appraisal stage-level governance may define a second scheme for voting in and removing members from the appraisal guilds. For example, the authenticators may have a one-member-one-vote voting scheme where a new member may be added to the guild with a simple majority vote and removed with a 60% majority vote, where the appraisers may have a token-based vote, where each guild member has a certain amount of guild tokens 2044, whereby each guild member's voting power is proportionate to the amount of guild tokens 2044 the guild member owns. In the second scheme, more senior or active members have more voting power than less senior or less active guild members. In embodiments, the stage-level governance may further define the types of documentation and supporting data required by the guilds in that stage. In this example, the authentication stage-level governance may further refine this rule to require that an authenticator fill out an authentication report and provide photographic evidence to support the report. Similarly, the appraisal stage-level governance may further refine this rule to require that an appraiser file an appraisal report that indicates an appraised value and provide documentary evidence of past sales of similar items to support the appraised value. In this example, the safekeepers stage-level governance may further refine this rule to require that the safekeeper provide photograph evidence of the item in safe storage and fill out a safekeeping report that indicates any damage that was visible when the item was deposited by the owner (e.g., the borrower) and a verification by the owner of the item of said visible damage. Furthermore, the appraisal stage-level governance may further define that an appraisal report includes a liquidation value of a collateral item in addition to the appraised value of the collateral item, where the liquidation value indicates a low-end price that the collateral item would be expected to be sold for (e.g., in a short-notice liquidation event or at a set price sale to achieve a quick liquidation sale).

As mentioned, a stage-level governance may also define new rules and regulations, to the extent those new rules and regulations do not contradict or otherwise vitiate the system-level governance. For example, assuming no such rules are defined in the system-level governance, a stage-level governance may define rules on how a stage-specific task is performed. For example, with respect to the authentication stage, the authentication stage-level governance may require a primary authenticator to make a determination on the authenticity of a collateral item and at least one other authenticator (acting as a "secondary authenticator) to validate the primary authenticator's determination on the authenticity of the item. In this example, the stage-level governance may further define that the primary authenticator gets a certain percentage (e.g., 60% or 70%) of the authentication fees/rewards and the remaining amount is split amongst the one or more secondary authenticators. Furthermore, in this example, the authentication stage-level governance may refine the system-level requirement for authenticators to stake currency tokens by defining an allocation of risk to the primary authenticator and the other secondary authenticators (e.g., primary authenticator stakes 60% or 70% of the loan amount (assuming a loan is agreed to) and the secondary authenticators evenly split the remaining portion of the loan amount. In another example, the appraisal stage-level governance may define the mechanics and workflows of an appraisal. For example, the governance may define the manner by which appraisal tasks are assigned to appraisers and that any appraisal must be validated by one or more additional appraisers. In this example, the appraisal stage-level governance may further refine the manner by which primary and secondary appraisers are rewarded and/or the amount of currency the primary and secondary appraisers must stake to secure their appraisals. In another example, the safekeepers stage-level governance may define additional rules for safekeeping of certain types of collateral items. For example, if items require temperature-controlled storage, the safekeeping stage-level governance may define a rule that requires that a safekeeper provide proof of such temperature-controlled storage. In another example, if the collateral item is a vehicle, the safekeeping stage-level governance may define a rule that requires that a safekeeper provide evidence of the mileage of the vehicle on the day it was first received and on the day it is repossessed by the rightful owner (e.g., the borrower or buyer via liquidation). The stage-level governances may include additional or alternative refinements of system levels rules and regulations and/or additional or alternative definitions of rules and/or requirements that were not indicated in the system level governance.

In embodiments, some stage-level governances may include form templates that are used in connection with the stage or references thereto (e.g., an address where the form templates may be obtained). In some example embodiments, the authentication stage-level governance may include a reference to an authentication form template that may be used by authenticators when performing an authentication task. The form template may include a set of fields that are to be filled out by an authenticator that is tasked with authenticating a collateral item, such that the authenticator completes the form and submits the form to the authentication system 804, the authenticator smart contract 2028, and/or a loan process smart contract 2022. In filling out the form, the authenticator can provide an opinion as to the authenticity of an item and may provide an analysis that supports the opinion. The form may include instructions to provide supporting evidence, such as photographs, serial numbers, videos, or the like. In some example embodiments, the appraisal stage-level governance may include a reference to an appraisal form template that may be used by appraisers when performing an appraiser task. Assuming that authentication is performed before the appraisal, the appraiser can trust that the item is authentic but may require inspection of either the item itself or photographs and/or video of the item to provide a proper assessment. The appraiser form may include a set of fields that are to be filled out by an appraiser that is tasked with appraising the collateral item, such that the appraiser completes the form and submits the completed form to the authentication system 804 and/or to an appraisal smart contract). In filling out the form, the appraiser can provide an appraised value and may provide an analysis that supports the appraised value. The form may include instructions to provide supporting evidence, such as evidence of past sales of similar items, bluebook values, auction data, or the like. In some example embodiments, the safekeeping stage-level governance may include a reference to a safekeeping form template that may be used by safekeepers when performing a safekeeping task. In some embodiments, the form may require the appraiser to provide a liquidation value of the collateral item in addition to the appraised value. The liquidation value may be a low-end valuation of the collateral item, such as if the collateral item needs to be quickly liquidated. The liquidation value in combination to the appraised value may provide a potential lender an opportunity to assess the risk associated with lending the money given the collateral item's appraised value and liquidation value. The form may include a set of fields that are to be filled out by a safekeeper that is tasked with safekeeping the collateral item, such that the authenticator completes the form and submits it (e.g., to the collateral management system 802 and/or to a safekeeping smart contract). In filling out the form, the safekeeper can provide a condition of the collateral item when it was received and verify that the collateral item is being stored at a physical location that has adequate precautions to secure the collateral item. The form may include instructions to provide supporting evidence, such as photographs of the collateral item (including any visible damage). It is appreciated that the form templates are provided for example and additional or alternative form templates may be used during the various stages of a decentralized loan process. Furthermore, some guilds may further refine a form template for a particular type of collateral item. In these scenarios, the guild-refined form templates may be used in connection with a respective task in lieu of the form templates defined in the stage-level governance. It is noted that other stage-level governances may include other form templates. Furthermore, it is appreciated that some guild-level governances and/or sub-guild-level governances may include or reference form templates that are to be used by members of the guild or sub-guild in lieu of form templates defined in the stage-level governance or if the stage-level governance does not include or reference a broader form template.

In some embodiments, the stage-level governances may include references to one or more smart contracts that are used in connection with stage-level tasks and/or managing guilds that participate in the stage. These smart contracts may include stage-level governance smart contracts 2024 corresponding to the managing of the participants at respective stages that enforce the stage-level governance of the respective stage as well as any relevant rules and regulations defined in the system level governance. In embodiments, stage-level governance smart contracts 2024 may be configured to enforce the mechanics of a particular stage. For example, the stage-level governance of a particular stage may require that changes to the governance be voted on by all participants in the stage and may use a stage-level governance smart contract 2024 to enforce the voting process. In this example, the authenticators (across all guilds) may wish to change the authentication stage governance to require an authentication fee that is paid by a borrower to an authenticator (in addition to the reward paid to the authenticator when a loan process is successfully completed) so that an authenticator may still get paid when an item is determined to be fake or if the borrower decides not to enter into a loan agreement (which would prevent the authenticator from being paid out a reward for participating in a loan transaction). The stage-level governance 2024 may require that the authenticators have a supermajority (e.g., ⅔ majority) vote to amend the stage-level governance and must further receive approval from a decision maker affiliated with a central authority to make such amendments. In this example, a stage-level governance smart contract 2024 may include a listening thread that receives votes from authenticators and determines whether a super majority voted to amend the authentication stage-level governance. If so, the smart contract may perform an action to amend the authentication stage-level governance and may generate a block indicating the results of the vote that is written to a corresponding distributed ledger 2014. While this example was described with respect to the authentication stage and for voting, stage-level governance smart contracts 2024 may be configured to enforce other aspects of the various stage-level governances.

Furthermore, in example embodiments, stage-level governances may include references to respective smart contracts that are used to manage stage-level events and transactions. For example, the authentication stage-level governance may include a reference to an authentication smart contract 2028 that is used to facilitate authentication tasks performed in connection with a loan process; the appraisal stage-level governance may include a reference to an appraisal smart contract 2030 that is used to facilitate appraisal tasks performed in connection with a loan process; the safekeeping stage-level governance may include a reference to an safekeeping smart contract 2032 that is used to facilitate appraisal tasks performed in connection with a loan process safekeeping tasks performed in connection a loan process; a lending stage level governance may include a reference to loan smart contract 2034 that is used to manage the loan agreement and loan repayment stage; and the like. In some embodiments, the loan workflow may include a pre-loan liquidation stage (discussed below) that is governed by a pre-loan liquidation stage-level governance. In these embodiments, the pre-loan liquidation stage-level governance may include a reference to a pre-loan liquidation smart contract, which is discussed in greater detail below.

In example embodiments, the authentication stage-level governance may include a reference (e.g., an address) of an authentication smart contract 2028 that may be used for authentication tasks. The reference may define an address that can be used to retrieve an authentication smart contract 2028 (e.g., from a distributed ledger 2016). In these embodiments, a loan process smart contract 2022, an authenticator device 2004, and/or the tokenization platform 100 may instantiate an instance of the authentication smart contract 2028 in response to an authenticator being assigned a new authentication task and/or the authenticator accepting the new authentication task via an authenticator device 2004. Once instantiated, the instance of the authentication smart contract 2028 may be written to a distributed ledger 2016, where the authentication smart contract instance executes to manage the authentication task. In embodiments, an authentication smart contract 2028 may be configured to receive input from an authenticator device 2004, a borrower device 2002, and/or the collateral management system 804 and may include conditional logic that determines whether all the required steps were performed in connection with an authentication task based on the received input.

Figure 22:
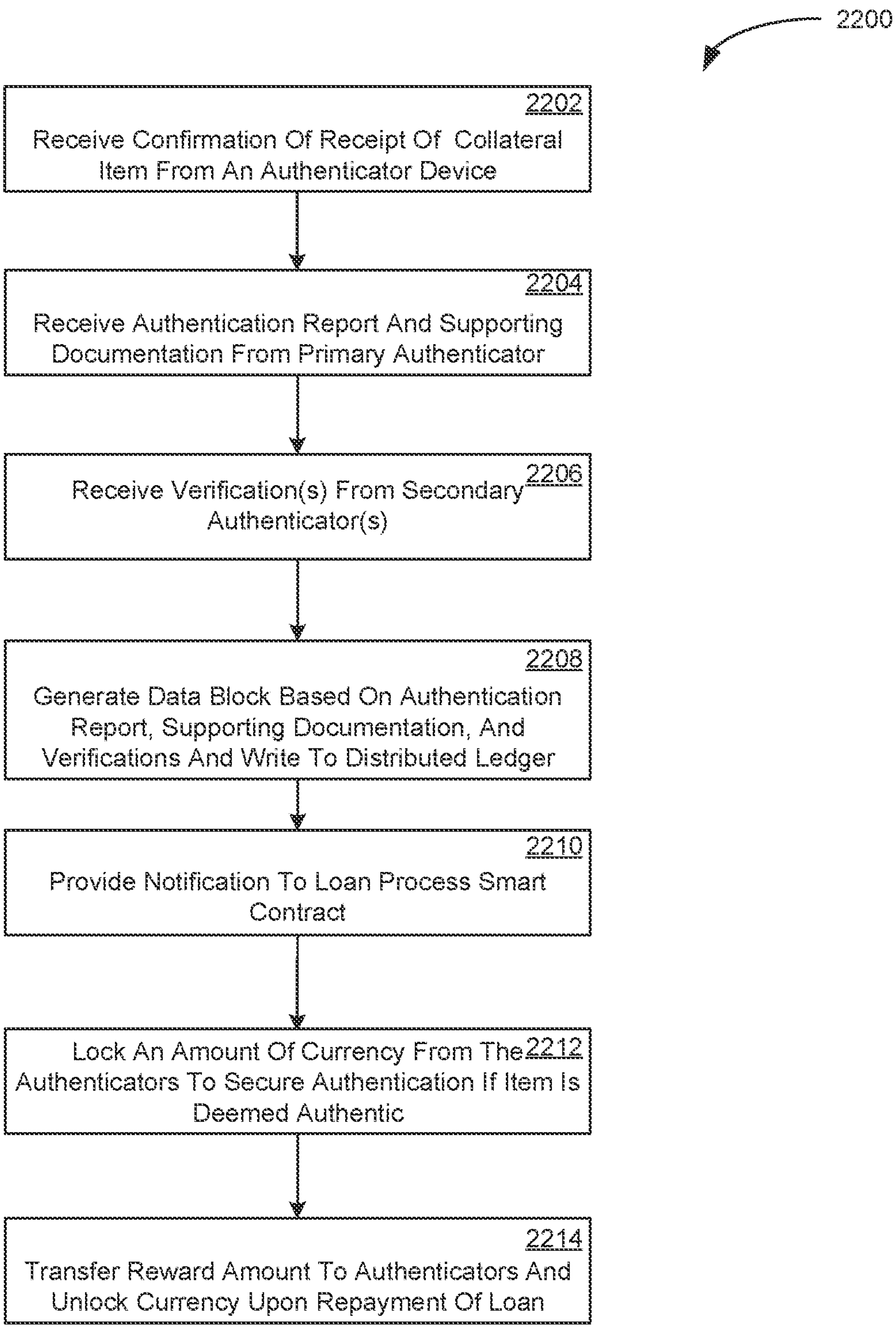
FIG. 22 is a flow chart illustrating an example set of operations of a method for performing an authentication workflow according to some embodiments of the present disclosure.

FIG. 22 illustrates a set of operations of an example method 2200 that may be executed to perform an authentication workflow. The method 2200 may be executed by a smart contract, such as an authentication smart contract 2028 or a loan process smart contract 2022. For purposes of explanation, the method 2200 is described as being performed by the authentication smart contract.

At 2202, an instance of an authentication smart contract 2028 may receive confirmation of receipt of collateral item from an authenticator device. In some scenarios, the collateral item is physically sent to a primary authenticator to perform a task. In such a scenario, the primary authenticator may confirm receipt of the collateral item using the authenticator device 2004. In these embodiments, the authenticator can provide images of the collateral item and may note any damage that is visible to the item. Alternatively, the primary authenticator may be sent a VIRL of the collateral item. In these embodiments, the VIRL may include ultra-high-resolution images of the collateral item and/or other media that may aid the authenticator in performing the authentication task.

At 2204, the authentication smart contract instance may receive an authentication report and supporting documentation from the primary authenticator. In these embodiments, a primary authenticator may be required to generate an authentication report in accordance with the authentication stage-level governance and/or the guild level governance of the authentication guild to which the authenticator belongs. In some embodiments, the primary authenticator may use a form template that is included in the stage authentication stage-level governance and/or the guild level governance to generate the report. The report may indicate the primary authenticator's conclusion (e.g., whether the item is authentic or fake) and reasons for the conclusion. The supporting documentation may include photographs, serial numbers, test results, or like to support the authenticator's conclusion. Once the authenticator provides the authentication report, the report and supporting documentation may be provided to one or more secondary authenticators (if required by the stage-level governance).

At 2206, the authentication smart contract instance receives verification from one or more secondary authenticators. In some embodiments, the authentication smart contract 2028 may include conditional logic that requests the opinions of secondary authenticators in response to receiving the primary authenticator's report. In some embodiments, the smart contract instance (or the primary authenticator) may provide the primary authenticator's report and supporting evidence to the secondary authenticators (after they are assigned to the task) and may listen for responses from the secondary authenticators. Once received, the authentication smart contract 2028 may determine whether a requisite number of secondary authenticators provided a supporting opinion and, if so, the authentication smart contract instance executes logic to determine whether the secondary authenticators verified the primary authenticator's opinion as to the authenticity of the collateral item.

At 2208, a data block based on the authentication report, the supporting documentation, and the secondary authenticator's opinions is generated and the data block may be written to a distributed ledger 2016. In some embodiments, the authentication smart contract may generate the data block and write the data block to the distributed ledger. Alternatively, the authentication smart contract may transmit the authentication report, the supporting documentation, and the secondary authenticator's opinions to the ledger management system 202 (or another suitable system), which in turn may generate the data block and write the data block to the distributed ledger.

At 2210, the authentication smart contract instance may provide notification to a loan process smart contract 2022 indicating the results of the authentication task. In particular, the authentication smart contract may provide a notification to the loan process smart contract 2022 indicating whether the item was deemed authentic by the primary authenticator and the secondary authenticator(s). If so, the authentication smart contract instance may continue to proceed through the authentication workflow until the authenticator(s) that participated in the authentication process are rewarded (e.g., from the repayment funds and/or the proceeds of a liquidation event). If not, the authentication smart contract instance may end the authentication task.

At 2212, the authentication smart contract instance may lock an amount of currency from the authenticators to secure the authentication in case the item is deemed inauthentic. In some embodiments, the authentication smart contract instance may enforce a requirement set forth in the authentication stage-level governance and/or guild-level governance of the authenticator to lock a certain amount of currency (e.g., currency/tokenized tokens) when the authenticator(s) deem the item authentic so as to provide a greater amount of security to a lender. In this way, authenticators will have less incentive to authenticate items that might be fake. In embodiments, the amount that is locked may be equal to or a percentage of the loan amount, the total repayment amount, the appraised value, or another suitable value, where the amount to be locked is defined in accordance with the appraisal-stage governance. In some embodiments, the locked currency tokens are returned to the authenticators during the course of repayment, such that the amount of locked currency from the authenticators that does not exceed the remaining balance of the loan as the locked currency provides a contingency should an authenticated item later be discovered to be fake.

At 2214, the authentication smart contract instance may transfer a reward amount to the authenticators that participated in the authentication task upon repayment of the loan. Once the loan process is complete (e.g., after repayment of the loan and collateral item is returned to borrower; after a liquidation event with a prescribed amount of time after the sale for the buyer of the collateral time to inspect the collateral item; and/or if the buyer decides to not engage in a loan and wishes to retake possession of the collateral item) may issue a reward to the primary authenticator and any secondary authenticators that participated in the authentication task. For example, the authenticators may be rewarded with a percentage of the loan or repayment amount, a predefined fee, and/or the like. Once the loan process is complete, the instance of the authentication smart contract may be deconstructed.

The example of FIG. 22 is provided as an example authentication workflow. Other authentication workflows may be executed in connection with authentication tasks. Furthermore, within respective authentication guilds, the members of the respective authentication guilds can refine the authentication workflows and/or authentication smart contracts to improve the authentication of certain tasks, provided such refinements are in accordance with the authentication stage-level governance.

Referring back to FIG. 20, an appraisal stage-level governance may include a reference (e.g., an address) of an appraisal smart contract 2030 that may be used for appraisal tasks. The reference may define an address that can be used to retrieve an appraisal smart contract 2030 (e.g., from a distributed ledger 2016). In these embodiments, a loan process smart contract 2022, an appraiser device 2006, and/or the tokenization platform 100 may instantiate an instance of the appraisal smart contract 2030 in response to an appraiser being assigned a new appraisal task and/or the appraiser accepting the new appraisal task via an appraiser device 2006. Once instantiated, the instance of the appraiser smart contract 2030 may be written to a distributed ledger 2016, where the appraisal smart contract instance executes to manage the appraisal task. In embodiments, an appraisal smart contract 2030 may be configured to receive input from an appraiser device 2006, a borrower device 2002, and/or the tokenization platform 100 and may include conditional logic that determines whether all the required steps were performed in connection with an appraisal task based on the received input.

Figure 23:
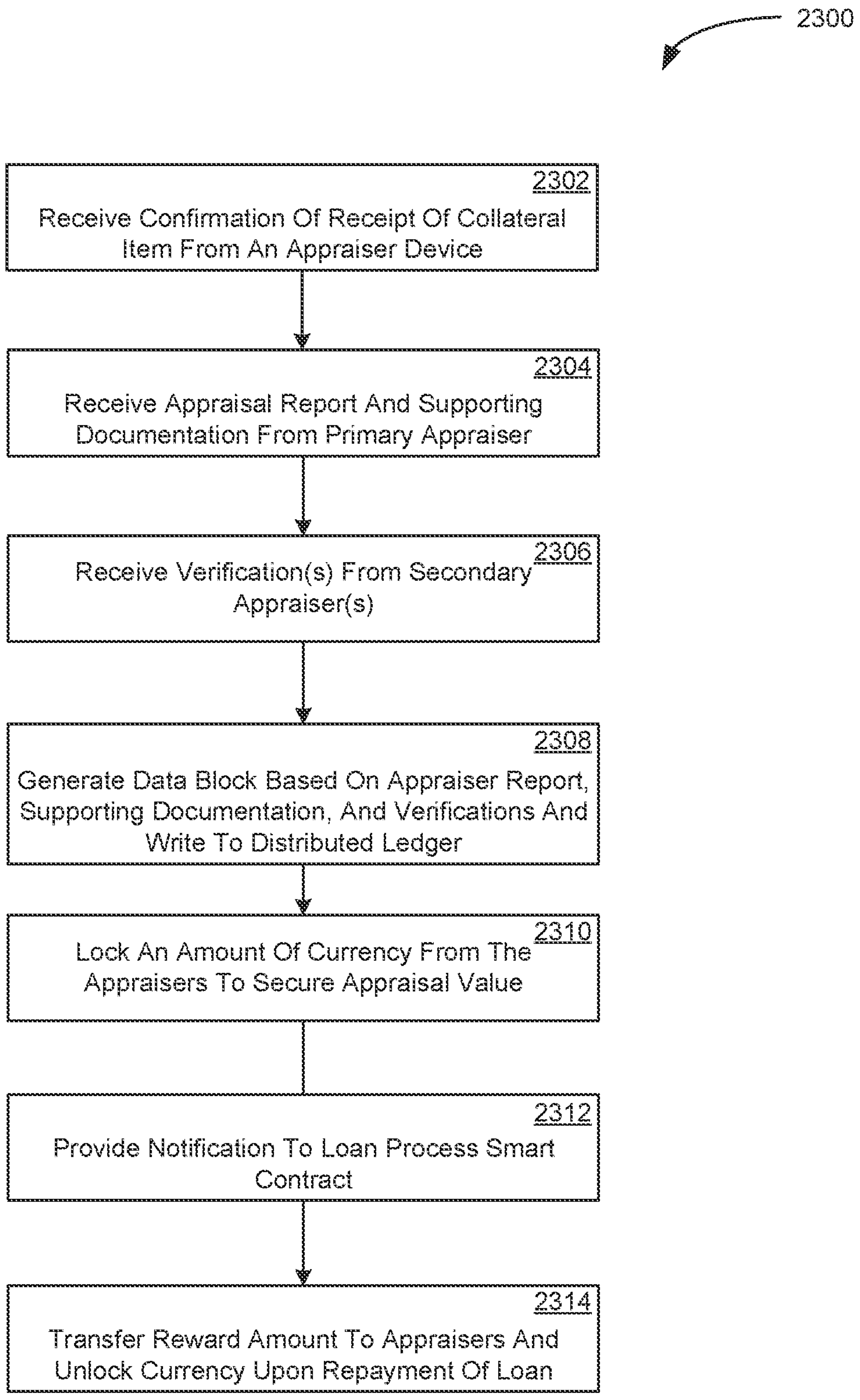
FIG. 23 is a flow chart illustrating an example set of operations of a method for performing an appraisal workflow according to some embodiments of the present disclosure.

FIG. 23 illustrates an example set of operations of a method 2300 that may be executed to perform an appraisal workflow. The method 2300 may be executed by a smart contract, such as an appraisal smart contract 2030 or a loan process smart contract 2022. For purposes of explanation, the method 2300 is described as being performed by the appraisal smart contract.

At 2302, an instance of an appraisal smart contract 2030 may receive confirmation of receipt of collateral item from an appraiser device 2006. In some scenarios, the collateral item is physically sent to a primary appraiser to perform a task. In such a scenario, the primary appraiser may confirm receipt of the collateral item using the appraiser device 2006. In these embodiments, the appraiser can provide images of the collateral item and may note any damage that is visible to the item. Alternatively, the primary appraiser may be sent a VIRL of the collateral item. In these embodiments, the VIRL may include ultra-high-resolution images of the collateral item and/or other media that may aid the authenticator in performing the appraisal task. In some embodiments, the appraiser may receive additional information, such as a confirmation that a set of authenticators authenticated the collateral item.

At 2304, the appraisal smart contract instance may receive an appraisal report and supporting documentation from an appraiser device 2006 of the primary appraiser. In these embodiments, a primary appraiser may be required to generate an appraisal report in accordance with the appraisal stage-level governance and/or the guild level governance of the appraisal guild to which the appraiser belongs. In some embodiments, the primary appraiser may use a form template that is included in the appraisal stage-level governance and/or the guild level governance of the appraiser's appraisal guild to generate the report. The report may indicate an appraised value determined by the appraiser and documentation that support the appraised value. The supporting documentation may include links to bluebook values of similar items, screenshots of sales of similar items, historical data relating to sales of similar items, and/or other suitable information to support the appraiser's appraised value. Once the appraiser provides the appraisal report, the report and supporting documentation may be provided to one or more secondary appraiser(s) (if required by the appraisal stage-level governance). In some embodiments the appraisal stage-level governance or a guild-level governance of the appraiser may require the appraiser to submit a liquidation value in the appraisal report in addition to the appraised value.

At 2306, the appraisal smart contract instance receives verification from one or more secondary appraisers. In some embodiments, the appraisal smart contract 2030 may include conditional logic that requests the opinions of a secondary appraiser in response to receiving the primary appraiser's report. In some embodiments, the appraisal smart contract 2030 (or the primary appraiser) may provide the primary appraiser appraiser's report and supporting evidence to the secondary appraisers (after they are assigned to the task) and may listen for responses from the secondary appraisers. Once received, the appraisal smart contract 2030 may determine whether a requisite number of secondary appraisers confirmed the primary appraiser's valuation.

At 2308, a data block based on the appraisal report, the supporting documentation, and the secondary appraiser's opinions is generated and the data block may be written to a distributed ledger 2016. In some embodiments, the appraisal smart contract may generate the data block and write the data block to the distributed ledger 206. Alternatively, the appraisal smart contract may transmit the appraisal report, the supporting documentation, and the secondary appraisers' opinions to the ledger management system 202 (or another suitable system), which in turn may generate the data block and write the data block to the distributed ledger 2016. In some embodiments, the data block may further include the liquidation value of the collateral item as determined by the appraiser.

At 2310, the appraisal smart contract may provide notification to a loan process smart contract 2022 indicating the results of the appraisal task. In particular, the appraisal smart contract may provide a notification to the loan process smart contract 2022 indicating the appraised value. Assuming the borrower agrees to a loan agreement, the appraisal smart contract may continue to proceed through the appraisal workflow until the appraiser(s) that participated in the appraisal process are rewarded (e.g., from the repayment funds and/or the proceeds of a liquidation event). If the borrower does not form a loan contract and decides to end the loan process, the appraisal smart contract may end the appraisal task.

At 2312, the appraisal smart contract may lock an amount of currency from the appraisers to secure the appraisal in case the item is not liquidated at or more than the appraised value provided by the appraiser. In some embodiments, the appraisal smart contract 2030 may enforce a requirement set forth in the appraisal stage-level governance and/or guild-level governance of the appraiser's guild to lock a certain amount of currency (e.g., currency/tokenized tokens) when the appraiser(s) provide an appraised value so as to provide a greater amount of security to a lender. In this way, the appraiser will have less incentive to appraise items at higher prices to improve the chances that a loan agreement will be entered into. In embodiments, the amount that is locked may be equal to or a percentage of the loan amount, the total repayment amount, the appraised value, or another suitable value, where the amount to be locked is defined in accordance with the appraisal-stage governance. In some embodiments, the locked currency tokens are returned to the appraisers during the course of repayment, such that the amount of locked currency from the appraisers does not exceed the remaining balance of the loan as the locked currency provides a contingency should an appraised item be sold at a liquidation event at a value that is less than the appraised value.

At 2314, the appraisal smart contract may transfer a reward amount to the appraisers that participated in the appraisal task upon repayment of the loan. Once the loan process is complete (e.g., after repayment of the loan and collateral item is returned to borrower or after a liquidation event) may issue a reward to the primary appraiser and any secondary appraisers that participated in the appraisal task. For example, the appraisers may be rewarded with a percentage of the loan or repayment amount, a predefined fee, and/or the like. Once the loan process is complete, the instance of the appraisal smart contract may be deconstructed.

The example of FIG. 23 is provided as an example appraisal workflow. Other appraisal workflows may be executed in connection with appraisal tasks. Furthermore, within respective appraisal guilds, the members of the respective appraisal guilds can refine the appraisal workflows and/or appraisal smart contracts to improve the appraisal of certain tasks, provided such refinements are in accordance with the appraisal stage-level governance.

Referring back to FIG. 20, a safekeeping stage-level governance may include a reference (e.g., an address) of a safekeeping smart contract 2032 that may be used for appraisal tasks. The reference may define an address that can be used to retrieve a safekeeping smart contract 2032 (e.g., from a distributed ledger 2016). In these embodiments, a loan process smart contract 2022, an appraiser device 2006, and/or the tokenization platform 100 may instantiate an instance of the safekeeping smart contract 2030 in response to a safekeeper being assigned a new appraisal task and/or the safekeeper accepting the new safekeeping task via a safekeeping device 2008. Once instantiated, the instance of the appraiser smart contract 2030 may be written to a distributed ledger 2016, where the safekeeping smart contract instance executes to manage the safekeeping task. In embodiments, a safekeeping smart contract 2032 may be configured to receive input from a safekeeper device 2008, a borrower device 2002, and/or the tokenization platform 100 and may include conditional logic that determines whether all the required steps were performed in connection with a safekeeping task based on the received input.

Figure 24:
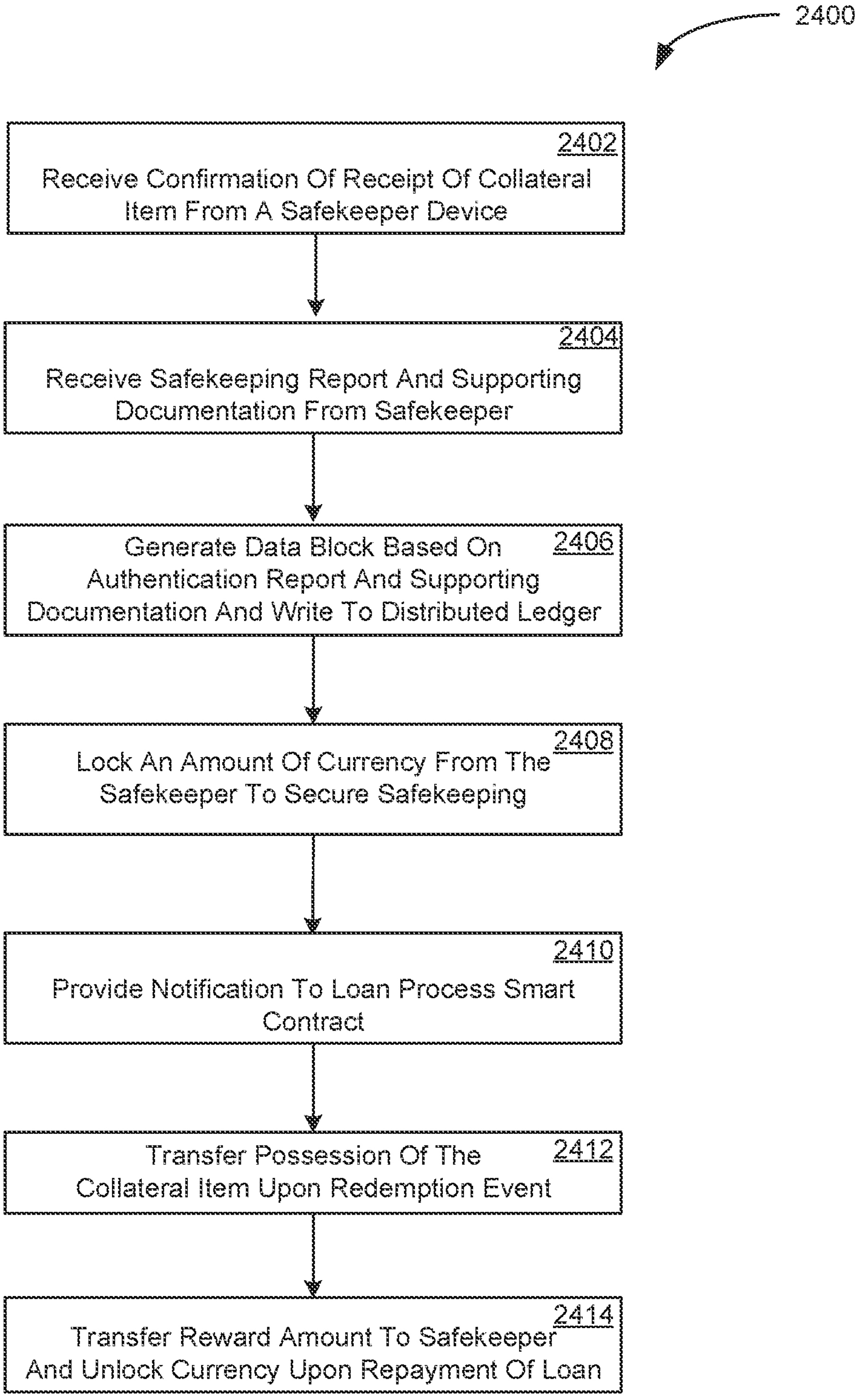
FIG. 24 is a flow chart illustrating an example set of operations of a method for performing a safekeeping workflow according to some embodiments of the present disclosure.

FIG. 24 illustrates an example set of operations of a method 2400 that may be executed to perform a safekeeping workflow. The method 2400 may be executed by a smart contract, such as a safekeeping smart contract 2032 or a loan process smart contract 2022. For purposes of explanation, the method 2400 is described as being performed by an instance of a safekeeping smart contract.

At 2402, an instance of a safekeeping smart contract 2032 may receive confirmation of receipt of collateral item from a safekeeper device 2008. In some scenarios, the collateral item is sent to a safekeeper for safekeeping during the pendency of a loan. Alternatively, the item may be deposited with the safekeeper by another party, such as the borrower. In either scenario, the safekeeper may confirm receipt of the collateral item using the appraiser device 2006. In these embodiments, the safekeeper can document the collateral item upon receipt, such as by taking images of the collateral item and noting any damage that is visible to the item.

At 2404, the safekeeping smart contract instance may receive a safekeeping report and supporting documentation from a safekeeper device 2008 of the safekeeper. In these embodiments, a safekeeper may be required to generate a safekeeping report in accordance with the safekeeping stage-level governance and/or the guild level governance of a safekeeper guild to which the safekeeper belongs (to the extent such guild exists). In some embodiments, the safekeeper may use a form template that is included in the safekeeper stage-level governance and/or the guild level governance of the safekeeper guild to generate the report. In the report, the safekeeper may indicate that the item was received, a condition in which it was received, any damage that is visible to the collateral item, where the item is being stored, whether the item is in secured storage, and/or other relevant information. In embodiments, the safekeeper may provide supporting documentation, such as images of the collateral item, including any documentation of noticeable damage, images of the item in storage, and the like. Once the safekeeper provides the safekeeping report, the safekeeper report and supporting documentation may be written to a distributed ledger 2016.

At 2406, a data block based on the safekeeping report and the supporting documentation, and the secondary appraiser's opinions is generated and the data block may be written to a distributed ledger 2016. In some embodiments, the safekeeping smart contract may generate the data block and write the data block to the distributed ledger 206. Alternatively, the safekeeping smart contract may transmit the safekeeping report, the supporting documentation, and the secondary appraisers' opinions to the ledger management system 202 (or another suitable system), which in turn may generate the data block and write the data block to the distributed ledger 2016.

At 2408, the safekeeping smart contract instance may lock an amount of currency from the safekeeper to mitigate the risk associated with property loss or damage during safekeeping. In some embodiments, the safekeeping smart contract 2030 may enforce a requirement set forth in the safekeeping stage-level governance and/or a guild-level governance to lock a certain amount of currency (e.g., currency/tokenized tokens) when an item is safekept so as to provide a greater amount of security to a lender. In embodiments, the amount that is locked may be equal to or a percentage of the loan amount, the total repayment amount, the appraised value, or another suitable value, where the amount to be locked is defined in accordance with the safekeeping-stage governance. In some embodiments, the locked currency tokens are returned to the safekeeper during the course of repayment, such that the amount of locked currency from the safekeeper does not exceed the remaining balance of the loan as the locked currency provides a contingency should a stored collateral item be damaged or lost. At 2410, the safekeeping smart contract instance may provide notification to a loan process smart contract 2022 indicating that the collateral item has been secured and that event records 2052 relating to the safekeeping task have been written to the distributed ledger 2016.

At 2412, the safekeeping smart contract instance may facilitate the transfer of possession of the collateral item to the owner of the collateral token 2042 corresponding to the collateral item upon a redemption event. In embodiments, the redemption of a collateral token 2042 may be performed in accordance with a collateral redemption workflow, which may be executed off-chain (e.g., by a computing system of a trusted-third party, such as the tokenization platform 100) and/or on-chain (e.g., by instances of one or more smart contracts). In embodiments, the collateral redemption workflow may include, but is not limited to, the following operations: receiving a request to redeem a collateral item indicated by a collateral token 2042 from a user device; verifying the user that is attempting to redeem the collateral token 2042 is the rightful owner of the collateral token 2042 based on ownership data 2052 stored on a distributed ledger 2016; identifying a safekeeper of the collateral item indicated by the collateral token 2042 from the distributed ledger 2016 and/or the loan process smart contract 2022; transmitting a redemption notification to a safekeeper device 2008 of the identified safekeeper that the rightful owner has redeemed the collateral token 2042; receiving a confirmation notification from the safekeeper device 2008 of the identified safekeeper indicating that the rightful owner of the collateral token has taken ownership of the collateral item; and burning the collateral token 2042 in response to receiving the notification from the safekeeper (as described above). In embodiments, the redemption workflow may include additional or alternative steps, such as receiving feedback from the redeeming owner of the collateral item indicating that the collateral item has been returned in satisfactory condition and/or updating a distributed ledger 2016 to indicate the occurrence and content of such feedback events (which may be used to update analytics and/or a rating of the safekeeper).

At 2414, the safekeeping smart contract may transfer a reward amount to the safekeeper upon repayment of the loan and/or redemption of the collateral item. For example, the safekeeper may be rewarded with a percentage of the loan or the repayment amount, a predefined fee, and/or the like. Once the loan process is complete, the instance of the safekeeping smart contract may be deconstructed.

The example of FIG. 24 is provided as an example safekeeping workflow. Other safekeeping workflows may be executed in connection with safekeeping tasks. Furthermore, within a safekeeper guild, the members of the respective guild can refine the safekeeping workflows and/or safekeeper smart contracts to improve the safekeeping of certain items, provided such refinements are in accordance with the safekeeping stage-level governance.

Referring back to FIG. 20, a lending stage-level governance may include a reference (e.g., an address) of a loan smart contract 2034 that may be used to monitor repayment of a loan. The reference may define an address that can be used to retrieve a loan smart contract 2034 (e.g., from a distributed ledger 2016). In these embodiments, a loan process smart contract 2022, a borrower device 2002, a lender device 2010 and/or the tokenization platform 100 may instantiate an instance of the loan smart contract 2034 in response to a loan agreement being reached. In embodiments, the negotiation of a loan is performed by the borrower and lender off-chain (e.g., via the tokenization platform 100). In these embodiments, the loan smart contract instance may be instantiated in response to the parties' agreement to the terms of a loan agreement. Once instantiated, the loan smart contract instance may be written to a distributed ledger 2016, where the loan smart contract instance executes to manage the loan repayment stage. In embodiments, a loan smart contract 2034 may be configured to receive input from a borrower device 2002, a lender device 2010, and/or the tokenization platform 100.

Figure 25:
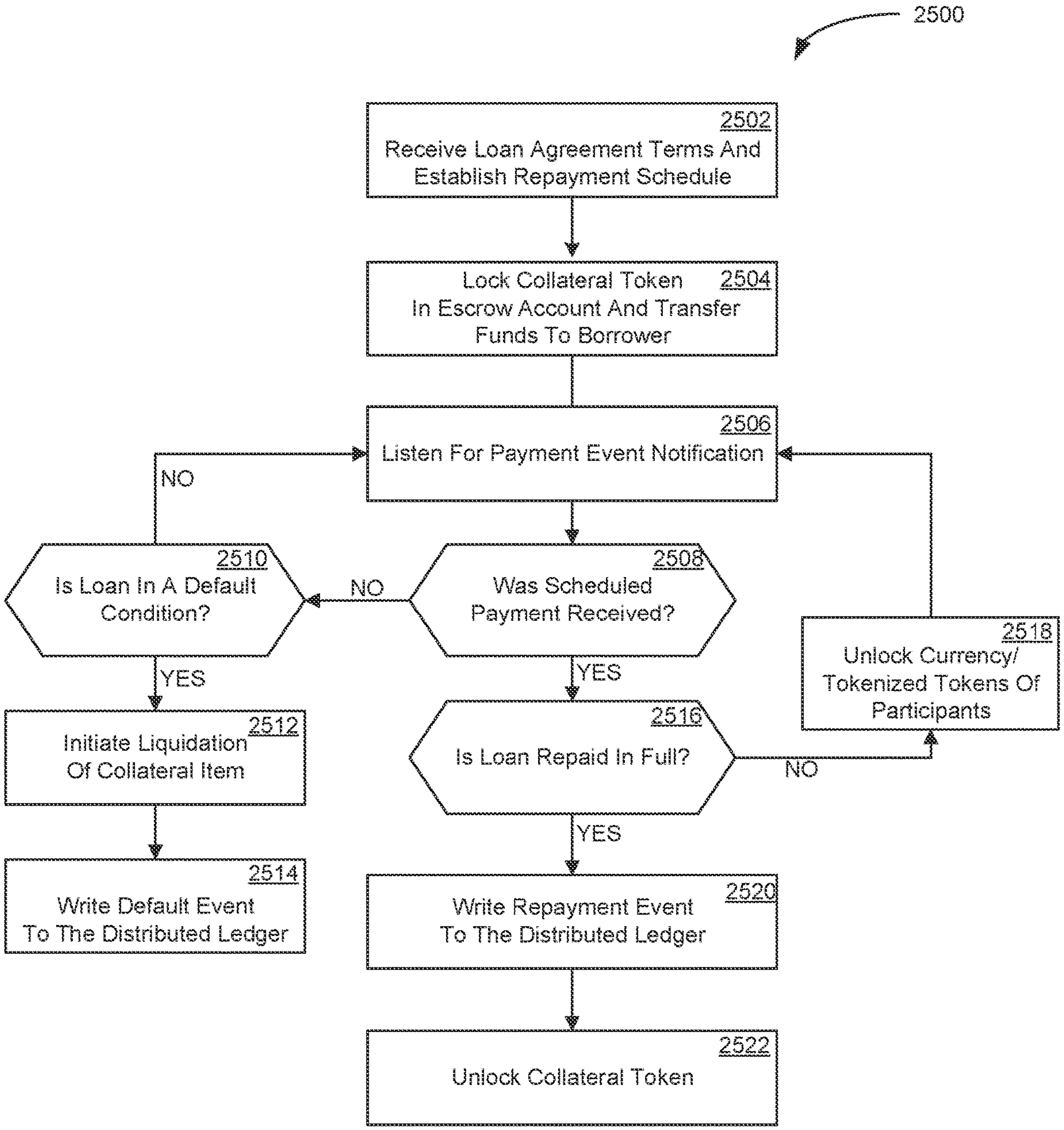
FIG. 25 is a flow chart illustrating an example set of operations of a method for performing a loan workflow according to some embodiments of the present disclosure.

FIG. 25 illustrates an example set of operations of a method 2500 that may be executed to perform a loan repayment workflow. The method 2500 may be executed by a smart contract, such as a loan smart contract 2034 or a loan process smart contract 2022. For purposes of explanation, the method 2500 is described as being performed by an instance of a loan smart contract. In the depicted example, the loan smart contract 2034 may be instantiated upon the borrower and lender agreeing to a loan agreement off-chain. In some embodiments, however, the loan contract 2032 may be configured to facilitate the negotiation of the loan as well.

At 2502, an instance of a loan smart contract 2034 may receive the loan agreement terms and may establish a repayment schedule in accordance with the loan agreement terms. In some scenarios, the loan smart contract 2034 may receive the loan agreement terms from a computing system (e.g., the tokenization platform) that facilitated the negotiation of the loan agreement. The loan agreement terms may include a loan amount, a loan term, a loan repayment amount, an interest rate, late fee penalties, default condition definitions, and the like. In embodiments, the loan smart contract instance may determine the repayment schedule based on the repayment amount and the loan term. The loan smart contract instance may determine the repayment schedule such that the payments are equally distributed over the loan term. The loan smart contract instance may determine the repayment schedule in any other suitable manner.

At 2504, the loan smart contract instance locks the collateral token in an escrow account and facilitates the transfer of funds from an account of the lender to the borrower. In embodiments, once the loan agreement is in place, the loan smart contract instance may lock the collateral token in an escrow account for the duration of the loan repayment period. Once the collateral token is locked, thereby preventing the borrower from redeeming the collateral token, the loan smart contract instance may facilitate the transfer of funds equal to the loan amount from an account of the lender to an account of the buyer. In some embodiments, the loan smart contract instance may transfer the funds by updating the ownership data 2054 of a set of currency/tokenized tokens 2044 owned by the lender to reflect an account of the borrower.

At 2506, the loan smart contract instance listens for payment event notifications. In embodiments, the loan smart contract 2034 may be configured with an event listener that listens for payment event notifications. In some embodiments, the payment event notifications may be received from a borrower device 2002, a lender device 2004, or a trusted third-party computing system that is facilitating repayment of the loan (e.g., the tokenization platform 100). In embodiments, a payment event notification may indicate an amount paid and a date and/or time at which the payment was received.

At 2508, the loan smart contract instance may determine whether a scheduled payment was received. If the payment was not received, the loan smart contract instance may determine whether the loan is in a default condition pursuant to the loan agreement. A loan may be in a default condition if a borrower misses one or more payments, such that the loan agreement may define how many payments may be missed before the loan enters a default condition. If the loan is not in a default condition, the loan smart contract instance may apply any penalties and/or fees to the principal balance and may continue to listen for a payment event notification.

If the loan is in a default condition, the loan smart contract instance may initiate a liquidation of the collateral item, as shown at 2512. In some embodiments, the loan smart contract instance may provide a liquidation request to a marketplace (e.g., marketplace system 102) that indicates the collateral token 2042 and/or the VIRL wrapped therein. The liquidation request may include additional data, such as an appraised amount, appraisal records, authentication records, safekeeping records, and/or a remaining balance on the loan repayment amount. In response, the marketplace may conduct a liquidation sale. In embodiments, the liquidation sale may be a fixed price sale (e.g., set at the appraised value) or an auction (e.g., starting at the remaining balance of the loan repayment amount). Once the item is liquidated and the buyer has paid for the collateral item, the loan smart contract instance may receive a liquidation notification that indicates that the item was liquidated. In response, the loan smart contract instance may initiate the transfer of the collateral token 2042 that was used to secure the defaulted-upon loan from the escrow account in which it was held to an account of the buyer of the collateral item. Once the ownership data 2054 of the collateral token is updated to indicate that the collateral token 2042 is owned by the buyer, the buyer may then redeem the collateral token 2042 (e.g., as described throughout the disclosure). In embodiments, the remaining balance of the loan is paid to the lender from proceeds of the sale as well as the rewards to the participants of the loan process (e.g., authenticators, appraisers, and/or safekeepers). At 2514, the loan smart contract instance may generate a data block indicating a default event and may write the data block to the distributed ledger, thereby creating a record of the default event.

If at 2508 the payment was received, the loan smart contract instance may determine whether the loan is paid in full, as shown at 2516. If the loan is not paid in full, the loan smart contract instance may determine the remaining balance on the loan repayment amount. In some embodiments, the loan smart contract instance may unlock currency/tokenized tokens 2044 of guild members that staked the tokens in connection with performance of their respective authentication, appraisal, and safekeeping tasks. In embodiments, the loan smart contract instance may unlock an amount of tokens that is proportionate to the payment received, as shown at 2518. In these embodiments, the remaining locked tokens of any guild member do not exceed the remaining balance on the loan repayment amount.

If at 2516, the loan smart contract instance determines that the loan is paid in full, the loan smart contract instance may generate a data block indicating a repayment event and may write the data block to the distributed ledger, as shown at 1520. In this way, the loan smart contract instance creates a record of the repayment event indicating that the loan has been paid in full. Once the loan is repaid in full, the loan smart contract instance may issue a repayment notification to the loan process smart contract instance governing the loan and/or to the tokenization platform 100, such that the notification initiates the awarding of rewards to the participants of the loan process (e.g., authenticators, appraisers, and/or safekeepers).

At 2522, the loan smart contract instance may unlock the collateral token 2042 from the escrow account and may reinstate ownership to the borrower. In embodiments, the loan smart contract instance may update the ownership data 2054 of the collateral token 2042 to reflect that the borrower is once again the owner of the collateral token. Once the loan process is complete, the instance of the safekeeping smart contract may be deconstructed.

The example of FIG. 25 is provided as an example loan repayment workflow. Other loan repayment workflows may be executed in connection with lending and loan repayment without departing from the scope of the disclosure.

Referring back to FIG. 20, in some embodiments, different variations of a decentralized loan process may include a pre-loan liquidation event. A pre-loan liquidation event may be a conditional liquidation sale that is conducted before the loan is negotiated. It is noted that the sale may be a set-price sale where the price is set ahead of the sale or an auction sale where the collateral item is auctioned. In some embodiments, an example loan process workflow may include a request stage, followed by an authentication stage, a safe keeping stage, and a tokenization stage (in any suitable order), followed by a pre-loan liquidation stage, which is then followed by the lending stages and repayment stage. In these example embodiments, once the collateral items are authenticated, escrowed and tokenized, an auction or a set-price sale is conducted for the collateral item (e.g., via the marketplace system 102), whereby the buyer of the collateral item obtains an ownership option that is triggered upon the borrower's default (or if the borrower decides to forego the loan and relinquish ownership rights to the item). In this way, the borrower and lender know the true value of the collateral item before a loan is negotiated, which determines how much can be borrowed by the borrower and removes the need for an appraiser. Furthermore, in some embodiments, the contingent buyer may be required to escrow an amount of currency/tokenized tokens 2046 equal to the amount of the purchased item (or a portion thereof) and/or prove that he or she has enough funds to cover the sale (e.g., by providing an address of the buyer's account or providing banking information). In exchange, the contingent buyer may be rewarded with a portion of the repayment amount should the borrower successfully repay the loan, where the reward amount may be a flat fee, a percentage of the sale price, or an interest-based reward.

In example embodiments, the rules and regulations surrounding a pre-loan liquidation stage are defined in a pre-loan liquidation stage-level governance. In these embodiments, the pre-loan liquidation stage-level governance may refine and/or define rules such as: an amount of currency the contingent buyer must deposit to secure the contingent sale; an amount of monetary reward the contingent buyer is provided if the loan is successfully repaid; the allowed mechanics of a pre-loan liquidation event (e.g., auctions, set-price sales, or the like); and other suitable rules and regulations.

In some embodiments, the pre-loan liquidation stage-level governance may include a reference (e.g., an address) of a pre-loan liquidation smart contract (not shown) that may be used in facilitating pre-loan liquidation events. The reference may define an address that can be used to retrieve a pre-loan liquidation smart contract (e.g., from a distributed ledger 2016). In these embodiments, a loan process smart contract 2022 and/or the tokenization platform 100 may instantiate an instance of the pre-loan liquidation smart contract in response to the loan process progressing to the pre-loan liquidation stage. In embodiments, a pre-loan liquidation smart contract may be configured to receive input from a borrower device 2002, a contingent buyer device, a loan process smart contract 2022, loan process smart contract 2028, and/or the tokenization platform 100 (e.g., the marketplace system 102). Once instantiated, the instance of the pre-loan liquidation smart contract may be written to a distributed ledger 2016, where the pre-loan liquidation smart contract instance executes a pre-loan liquidation workflow that may include a pre-loan liquidation sale stage, a transaction verification stage, and a contingency resolution stage. In example embodiments, the pre-loan liquidation smart contract may initiate the sale of a collateral item during the pre-loan liquidation sale stage, initiating a pre-loan liquidation event based on a collateral token corresponding to the collateral item. Assuming that the collateral item is sold (pursuant to a contingency), the pre-loan liquidation smart contract may execute the transaction verification stage, where the borrower is provided an opportunity to a) reject the sale price and end the loan process; b) agree to the sell the collateral item to the contingent buyer at the sale price and end the loan process; or c) proceed with the loan process at the given sale price. During the contingency resolution stage, the pre-loan liquidation smart contract instance may receive notifications relating to the state of a subsequent loan, such that if the loan is repaid in full, the pre-loan liquidation smart contract may initiate the transfer the collateral token 2042 from the escrow account to the borrower and reward the contingency buyer with the defined reward amount. Conversely, if the seller defaults, the pre-loan liquidation smart contract may transfer the collateral token 2042 from the escrow account to the buyer and may transfer the agreed upon purchase price to the lender and the participants (e.g., authenticator and safekeeper), such that any remaining balance is returned to the borrower.

Figure 26:
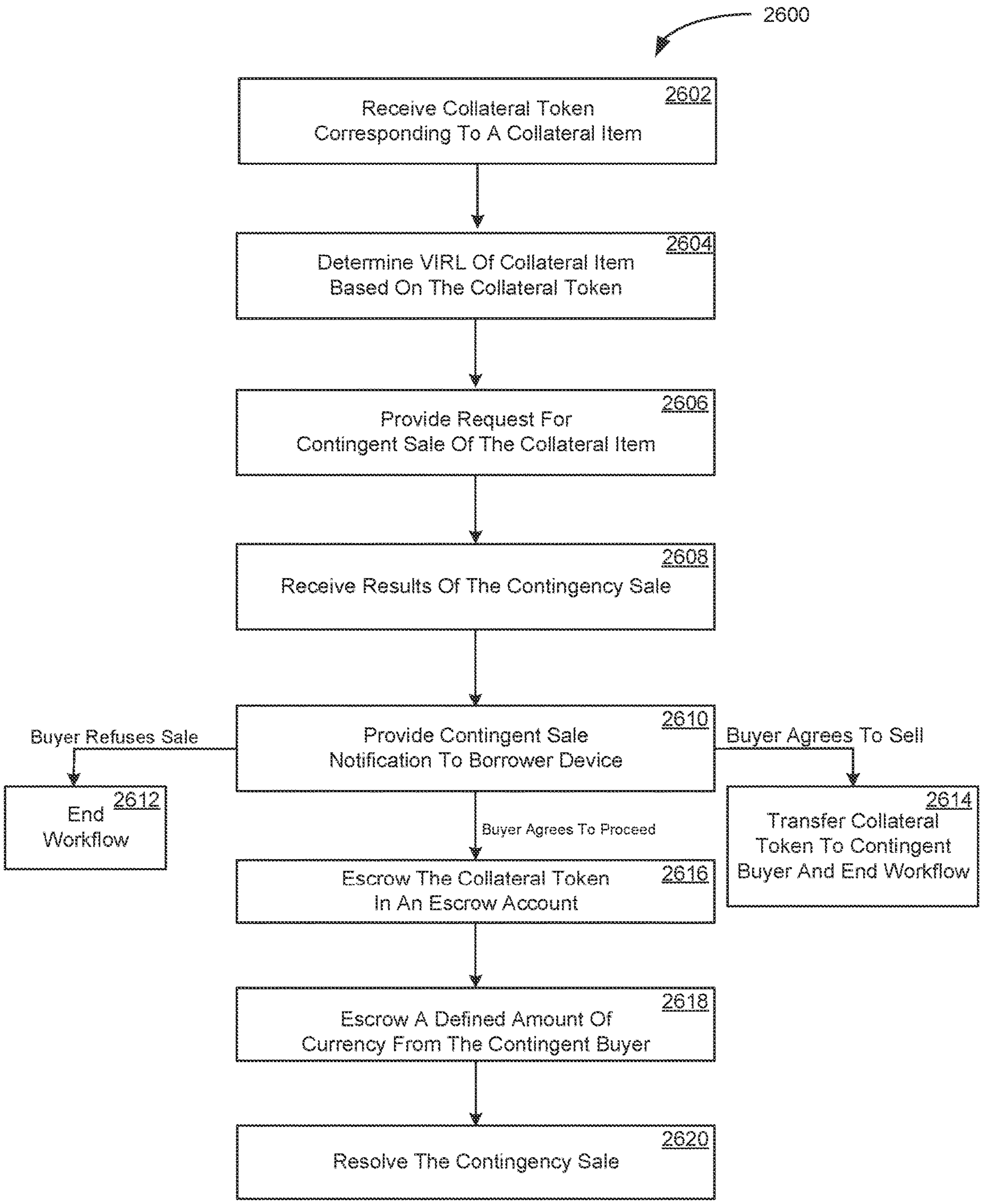
FIG. 26 is a flow chart illustrating an example set of operations of a method for performing a pre-loan liquidation workflow according to some embodiments of the present disclosure.

FIG. 26 illustrates an example set of operations of a method 2600 for performing a pre-loan liquidation workflow according to some embodiments of the present disclosure. The method 2600 may be executed by a smart contract, such as a pre-loan liquidation smart contract or a loan process smart contract 2022. For purposes of explanation, the method 2600 is described as being performed by an instance of a pre-loan liquidation smart contract.

At 2602, the pre-loan liquidation smart contract instance receives a collateral token 2052 (or an indicator thereof, such as a block address of the collateral token). At 2604, the pre-loan liquidation smart contract instance determines the VIRL corresponding to the collateral token 2052. In some embodiments, the pre-loan liquidation smart contract instance may determine a VIRL identifier of the VIRL from the collateral token 2042 and/or from the distributed ledger 2016. In the latter scenario, the pre-loan liquidation smart contract instance may read the data block that contains the collateral token 2042 from the distributed ledger 2016 that stores the token 2042 and may obtain the VIRL identifier therefrom.

At 2606, the pre-loan liquidation smart contract instance may provide a request for a contingent sale of the collateral item to a marketplace (e.g., marketplace system 102). In embodiments, the request may include the VIRL (or an indicator thereof, such as a VIRL ID or the like) and/or other documentation describing and/or showing the collateral item. In embodiments, the contingent sale request may include other suitable information, such as a contingent sale type (e.g., auction or set price sale), a location of the collateral item, a sought price for the collateral item (if a set price sale), a minimum price for the collateral item (if an auction), a length of the contingency (e.g., the amount of time that the borrower needs to secure and repay the loan), a reward offer (e.g., a predefine reward amount or a percentage of the purchase price, desired loan amount, or repayment amount), and/or the like. In response the marketplace can facilitate the contingent sale, which may result in the collateral item being sold (e.g., a contingent buyer buys the collateral item at a set price or wins an auction) with a set of contingencies or no sale.

At 2608, the pre-loan liquidation smart contract may receive the results of the contingent sale from the marketplace. Once the contingent sale is completed, the marketplace can send a sale notification to the liquidation smart contract instance indicating the results of the pre-loan liquidation event. In embodiments, the results of the pre-loan liquidation event indicate whether the item was sold, and if sold, a price at which the item was sold (minus any fees taken by the marketplace for hosting the sale).

At 2610, the pre-loan liquidation smart contract may provide a contingent sale notification to a borrower device 2002 of the borrower (assuming a pre-loan sale of the collateral item occurred). In response to receiving the contingent sale notification, the borrower has an option to agree to the contingent sale to advance the loan process, refuse the contingent sale (e.g., if the sale was an auction and the agreed upon liquidation price was too low to secure a loan), or to complete the contingent sale (e.g., if the sale was an auction and the price was high enough to convince the buyer to sell the collateral item rather than seek a loan using the collateral item). If the borrower refuses the sale, the retains possession of the collateral token 2042, as shown at 2612. If the borrower agrees to complete the contingent sale, the pre-loan liquidation smart contract may initiate the transfer the collateral token 2042 to the contingent buyer and the transfer of the proceeds of the sale to the buyer (e.g., a purchase amount in currency/tokenized tokens or fiat currency minus any fees taken by the marketplace), as shown at 2614. In the event that the borrower agrees to the contingent sale, the pre-loan liquidation smart contract may lock the collateral item in an escrow account, as shown at 2616.

At 2618, the pre-loan liquidation smart contract instance may escrow a defined amount of currency from the contingent buyer based on the contingent sale amount. During the transaction verification stage, the pre-loan liquidation smart contract may be configured to ensure that the contingent buyer can pay the sale price, should the loan go into default. In some embodiments, the pre-loan liquidation smart contract may require the contingent buyer to escrow currency/tokenized tokens 2046 equal to the full sale amount or a portion of the full sale amount (e.g., 50%), which may be achieved by locking the defined amount of currency/tokenized tokens 2046 from an account of the contingent buyer in an escrow account. Alternatively, the contingent buyer may provide evidentiary documents (e.g., bank statements, tax statements, or the like) to prove a liquidity threshold is met, thereby providing confidence that the contingent buyer can afford to complete the sale, should the borrower default. In these embodiments, the pre-loan liquidation smart contract instance may write the evidentiary documents to a distributed ledger 2016.

At 2620, the pre-loan liquidation smart contract instance may resolve the contingency sale. Once the borrower agrees to the terms and the buyer confirms that they can pay the sale price, the pre-loan liquidation smart contract instance may execute a contingency resolution stage. During the contingency resolution stage, the pre-loan liquidation smart contract instance may monitor the loan process to verify that the borrower was able to secure the loan. If the borrower is unable to secure a loan and decides to end the loan process, the pre-loan liquidation smart contract may initiate a refund of any escrowed funds (and potentially a reward fee) to the conditional buyer and may initiate the transfer of the collateral token 2042 from the escrow account to the account of the borrower. Assuming the borrower does enter into a loan agreement, the pre-loan liquidation smart contract may monitor the repayment of the loan. In some embodiments, the pre-loan liquidation smart contract may receive a default notification if the borrower is deemed to have defaulted on repaying the loan pursuant to the terms of the loan agreement (e.g., from the loan process smart contract 2022 or a loan smart contract 2034 governing the loan). In response, the pre-loan liquidation smart contract may provide a notification to the contingent buyer to pay any remaining balance on the collateral item (assuming the entire amount was not put in escrow by the buyer). Upon verifying that the contingent buyer has paid the full balance of the price or if the buyer had escrowed the entire sale price at the time of the contingent sale, the pre-loan liquidation smart contract may issue a notification that the sale amount has been secured (e.g., to the loan process smart contract instance 2022 and/or the loan smart contract 2034) and may initiate the transfer of the collateral token 2052 to the contingent buyer. It is noted that the repayment of the funds to the lender and/or issuing of rewards to the safekeeper and authenticator(s) from the proceeds of the contingent sale may be handled via a different workflow. In some embodiments, the pre-loan liquidation smart contract may receive a notification of a repayment event when the borrower successfully repays the entire repayment amount of the loan (the loan amount and any interest and fees). Upon receiving the repayment notification, the pre-loan liquidation smart contract instance may initiate the transfer of any staked funds back to the contingent buyer and may initiate a transfer of a reward (e.g., currency/tokenized tokens 2046) to an account of the contingent buyer as a reward for the buyer staking the funds to help secure the loan vis-à-vis by participating in the contingency sale. In embodiments, the reward amount may be paid by the lender and/or may have been held in escrow from the payments made by the borrower to the lender during the repayment stage of the loan. The pre-loan liquidation workflow may include additional or alternative stages without departing from the scope of the disclosure.

The example of FIG. 26 is provided as an example pre-loan liquidation workflow. Other pre-loan liquidation workflows may be executed in connection with pre-loan liquidation events.

Referring back to FIG. 20, according to some embodiments of the present disclosure, the smart contracts associated with respective stages of a decentralized loan process may include various types of guild-level smart contracts (or sub-guild-level smart contracts) that are configured to ensure those guild members that perform a specific task adhere to the stage-level governance as well as guild-level governance set by a specific guild. For example, the smart contracts associated with the decentralized loan process may include guild-level authentication smart contracts that are configured to, inter alia, ensure that an instance of the authentication process conforms to an authentication workflow as defined by a particular authentication guild-level governance (e.g., watch authentication guild-level governance).

In embodiments, one or more components of the tokenization platform 100 supports the securitized, decentralized loan processes. In some embodiments, the tokenization platform 100 may receive requests from borrowers (or other parties) to initiate an instance of a loan process. In example embodiments, the collateral management system 804 may present a GUI to a user (e.g., a borrower), whereby the user can request initiation of a new loan process via the GUI. For example, the user may provide a location or general area, a type of the collateral item (e.g., a watch, a pair of sneakers, a car, a whiskey collection, jewelry, or the like), and an approximate loan amount that the borrower wishes to secure. In some embodiments, the collateral management system 804 may receive the request and may instruct the ledger management system 104 (or another suitable system) to instantiate a new loan process smart contract 2022. In embodiments, the loan process smart contract 2022 manages a loan process workflow by progressing the loan process through various stages of a decentralized loan process. Alternatively, the collateral management system 2022 may manage the loan process workflow as the loan process progresses through the stages of the decentralized loan process. As discussed, a loan process workflow may define a set of stages that are performed in connection with an instance of a decentralized loan process, where the stages are performed in a predefined order. Different variations of decentralized loan processes may implement different loan process workflows. An example of a series of stages of a loan process workflow may be: a request stage where a user requests a new loan process, followed by an authentication stage where the borrower provides the collateral item to be authenticated by one or more authenticators, followed by an appraisal stage (if the item is deemed authentic) where the item is appraised by one or more appraisers, followed by a safekeeping stage where the collateral item is stored in escrow by a safekeeper, followed by a tokenization stage where a VIRL representing the collateral item is generated and the VIRL is tokenized, followed by a lending stage where the borrower negotiates the loan with one or more lenders, a repayment stage where the lender pays back the loan or defaults on the loan, and a post-loan stage where the collateral item may be liquidated if the seller defaulted on at least a portion of the repayment amount, where rewards are issued to various participants of the loan process, and/or analytics are updated based on the results of the loan process. The foregoing loan process workflow is an example loan process workflow and other loan process workflows are disclosed and within the scope of the disclosure. It is noted that different loan process workflows may achieve different efficiencies and may be better suited for different types of collateral and/or sizes of loans. The example loan process workflow discussed above is meant to minimize the number of stages that are performed if an item is deemed fake by an authenticator. Other workflows may achieve different efficiencies, such as lessening the number of times a collateral item needs to be transferred between participants, mitigating the need to transfer the collateral item between parties, maximizing the amount of a loan, and/or other desirable efficiencies.

In some embodiments, the collateral management system 804 may select a particular loan process workflow from a set of loan process workflows upon receiving a request from a user. In some of these embodiments, the collateral management system 804 may select a particular loan process workflow from a set of different loan process workflows based on the location of the borrower, the type of collateral, and/or the amount that the borrower wishes to secure in a loan. For example, if the collateral item is large and/or difficult or expensive to transport (e.g., a vehicle, a large wine or whiskey collection, a rare painting, or a crystal chandelier) between different participants, the collateral management system 804 may select a loan process workflow that begins with a safekeeping stage (after the request stage) followed by a tokenization stage, such that the safekeeper may take photographs, videos, and/or other supporting data that are used to generate a VIRL that may be provided to an authenticator and appraiser, rather than shipping the collateral item between locations. In another example, if the item is the type of item that is often counterfeited (e.g., a watch, handbag, or sneakers), the collateral management system 804 may select a loan process where authentication occurs before appraisal and/or safekeeping, such that the authenticator(s) may determine whether the item is fake before moving forward with any other stages. It is noted that some variations of loan process workflows may include additional or alternative stages. For instance, in some embodiments, a loan process workflow may include a pre-loan liquidation stage where a pre-loan liquidation event is conducted, as is discussed in the disclosure.

In embodiments, the collateral management system 802 and the authentication system 804 may operate in conjunction with the ledger management system 104 to instantiate or initiate the instantiation of a series of smart contract instances that are used to manage decentralized loan process in general (e.g., loan process smart contracts 2022) and/or the respective stages of the decentralized loan process, such as item authentication (e.g., authentication smart contracts 2028), item appraisal (e.g., appraisal smart contracts 2030), contingency liquidation events (e.g., liquidation smart contracts), item safekeeping (e.g., safekeeping smart contracts 2032), and/or loan generation/repayment (e.g., loan smart contracts 2034). In some embodiments, the collateral management system 802 may instantiate a loan process smart contract 2022, and the loan process smart contract 2022 may, in turn, instantiate smart contracts that manage one or more stages of the loan process as the loan process smart contract 2022 determines certain defined conditions have been met and the loan process progresses through the loan process workflow.

In some embodiments, the authentication system 804 may be configured to assign tasks to different participants as the loan process advances to different stages. In embodiments, the authentication system 804 may be configured to assign tasks to participants during a loan process. In particular, the authentication system 804 may be configured to assign authentication tasks to authenticators, appraisal tasks to appraisers, and/or safekeeping tasks to safekeepers. In embodiments, the authentication system 804 may select authenticators, appraisers, and safekeepers based on the contents of the request. For instance, in embodiments where authenticators and appraisers are organized into guilds that specialize in authenticating or appraising specific types of items, the authentication system 804 may determine a respective authentication guild or appraisal guild based on the type of item being authenticated and appraised. For instance, if a watch is being authenticated and appraised, the authentication system 804 may identify the watch authentication guild and the watch appraisal guild as the relevant guilds. From the identified guilds, the authentication system 804 may select a respective guild member from the identified guilds to perform the authentication task and the appraisal task. To the extent that safekeepers have specialized and/or regional guilds, as opposed to a single guild comprised of all eligible safekeepers, the authentication system 804 may select a certain safekeeper guild based on the type of guild (e.g., automobile safekeepers, safekeepers of perishable items, or the like) and/or based on a proximity of a particular guild to the collateral (e.g., Nevada-based safekeeper guild is selected when the collateral item is located in or near Nevada). Once a guild is identified to perform a task (assuming a guild needs to be identified before a task is assigned to a guild member), the authentication system 804 may assign one or more members of the guild to perform the task.

In embodiments, the authentication system 804 can implement a number of different approaches for identifying a guild member to perform a task. In example embodiments, the authentication system 804 may use a first-in-first-out queue where guild members are assigned to respective tasks in an order determined by the queue. In example embodiments, the authentication system 804 may use a round-robin selection scheme to select a participant. In embodiments, the authentication system 804 randomly assigns the authentication and appraisal tasks to a guild member. In example embodiments, the authentication system 804 may use a weighted selection process where guild members are assigned to respective tasks based on a set of selection criteria, such as respective bandwidths of the participants that can perform the task (e.g., guild members), a brand or subspecies of the collateral item, the ratings of the respective participants, the respective proximities of the respective participants to the collateral item, respective amounts of time since a most recent task was assigned to each respective participant, the number of successful tasks performed by each respective participant, the number of unsuccessful tasks performed by each respective participant, a percentage of successful or unsuccessful tasks performed by each respective participant, and/or the like. In embodiments, the authentication system 804 may employ a bidding system where guild members can bid on a task and the guild member is selected based on the bid (and/or other selection criteria). In embodiments, the bids may indicate be a price for which the guild member will perform the task. In these embodiments, the authentication system 804 may select the guild member based on the bid amount and/or selection criteria (e.g., using a selection model that takes in bid amount as well as any other suitable selection criteria as factors) or the borrower may select the authenticator (e.g., the borrower may be presented with the bid amounts as respective fees the borrower would have to pay to a respective bidder and may also be shown their location and ratings and the borrower selects the bid that makes the most sense to him or her). Alternatively, the bids may indicate the price the guild member is willing to pay to obtain the respective task. In these embodiments, the authentication system 804 may be configured to select the guild member based on the highest bid. In the scenarios where primary and secondary participants perform a task (e.g., primary and secondary authenticators and primary/secondary appraisers), available participants can provide a bid to be the primary participant and/or a bid to be the secondary participant, such that the primary participants and the one or more secondary participants are selected based on the respective bids and a winner of the right to perform the primary task cannot be the winner of the right to perform the secondary task. The authentication system 804 may employ any other suitable techniques to select a guild member to perform authentication or appraisal tasks. Once the authentication system 804 has a task to an individual, the authentication system 804 may provide a notification to the selected individual and/or the instance of the loan process smart contract 2022 governing the loan process at issue.

For purposes of explanation, the authentication system 804 is described as assigning tasks to participants, but other suitable components of the tokenization platform 100 may assign tasks to participants. Alternatively, task assignments can be handled "on-chain", such that one or more smart contracts may be configured to assign tasks to participants. For example, an instance of a loan process smart contract 2022 may be configured to assign tasks to participants during the execution of an instance of a loan process. Additionally or alternatively, instances of stage-level smart contracts may be configured to assign tasks to participants upon being instantiated during the course of the loan process. In the latter implementations, the stage-level smart contracts may use a combination of selection criteria and/or selection schemes to assign tasks. For instance, a stage-level smart contract (e.g., an authentication smart contract 2028, an appraisal smart contract 2030, and/or a safekeeping smart contract 2032) or a guild-level smart contract (if a guild has a guild-level smart contract) can be configured to assign a respective tasks to one or more participants randomly, in accordance with a queue, via a bidding process, in a round-robin manner, and/or according to a set of selection criteria. Examples of selection criteria may include the respective bandwidths of the participants that can perform the task (e.g., guild members), the ratings of the respective participants, the respective proximities of the respective participants to the collateral item, respective amounts of time since a most recent task was assigned to each respective participant, the number of successful tasks performed by each respective participant, the number of unsuccessful tasks performed by each respective participant, a percentage of successful or unsuccessful tasks performed by each respective participant, and/or the like.

In some embodiments, the marketplace system 202 (e.g., item management system 202 (FIG. 2)) is configured to generate virtual representations (VIRLs) of collateral items and the ledger management system 104 (e.g., the token generation system 302) may be configured to tokenize one or more VIRLs into a collateral token. It is appreciated that if a borrower wishes to collateralize more than one item to secure a single loan, the item management system 202 may generate a set of VIRLs that respectively correspond to the different collateral items, while the ledger management system 102 may individually tokenize the VIRLs into respective collateral tokens 2042 or may tokenize the set of VIRLs in a single collateral token 2042 that wraps the set of VIRLs. Example methods and systems for generating VIRLs and tokens are discussed in greater detail with respect to FIGS. 1-4 and elsewhere throughout the disclosure. Initially, the ledger management system 104 may assign the ownership of the collateral token 2042 to the borrower by writing ownership data 2054 to the collateral token 2042 to a distributed ledger 2019 and/or depositing the collateral token 2042 into an account of the borrower. Even after the borrower has provided the corresponding collateral item to a safekeeper, the borrower may maintain ownership rights to the collateral token 2042. Upon the borrower and one or more lenders agreeing to a loan and executing the loan, the collateral token 2042 may be "locked" by transferring the collateral token 2042 to an escrow account and updating the ownership data 2054 of the collateral token 2042 to indicate that the collateral token 2042 is currently held in escrow. Once a loan has been repaid (e.g., by the borrower or from the proceeds of a post-default liquidation event), a collateral token is unlocked by transferring the collateral token 2042 to an account either the borrower (if the loan was fully repaid) or the buyer of the collateral token 2042 (if the collateral item was liquidated). In unlocking a collateral token, the ledger management system 104 or a smart contract (e.g., an instance of a smart loan process smart contract 2022 or loan smart contract 3034) may facilitate the transfer of the collateral token 2042 to the rightful owner post-repayment by updating the ownership data 2054 corresponding to the collateral token 2042 in a distributed ledger 2054 with a data block that indicates an account of the owner of the collateral token 2042.

In some embodiments, the collateral management system 802 (or any other suitable component of the tokenization platform) facilitates the negotiation of a loan agreement between a borrower and lender. The collateral management system 802 may be configured to facilitate the negotiation of loan agreements in any suitable manner. In some embodiments, the collateral management system 802 may provide a GUI to a borrower that allows the borrower to request a loan. Assuming that the collateral item has been authenticated and appraised (or bought on a contingency), the collateral management system 802 may allow the user to request a loan amount that does not exceed the appraised value and to request an amount of time to pay back the loan. In some of these embodiments, the collateral management system 802 may generate a loan request that is presented to potential lenders via a GUI, whereby the loan request indicates the sought amount, the length of the loan, and information relating to the collateral item provided by the borrower. The information relating to the collateral item may include the VIRL of the collateral item (which may include images, descriptions, videos, and other suitable information), authentication reports, appraisal reports, safekeeping reports, verification that the authentication, appraisal, and safekeepers have secured their respective tasks (as described above), and/or the like. In embodiments, the collateral management system 802 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the collateral management system 802 may provide a notification to the loan process smart contract indicating that a loan agreement has been agreed to by the borrower and a lender may provide the details of the loan agreement to the smart contract (e.g., in a. JSON file). In response, the loan process smart contract 2022 (or the collateral management system 802) may instantiate a loan smart contract instance that executes a loan repayment workflow, in the manner described above. It is appreciated that in some embodiments, the loan negotiation may be handled on-chain, such that a smart contract instance (e.g., the instance of the loan process smart contract 2022 or an instance of a loan smart contract) facilitates the negotiation of the loan agreement in the manner described above. Once a loan is negotiated, the collateral token 2042 may be locked in an escrow account and repayment of the loan may be handled by the loan smart contract instance. If the loan is repaid in full, the collateral token 2042 may be unlocked and returned to the borrower, whereby the ownership data 2052 of the token 2042 is updated to reflect that the borrower is the owner of the collateral token 2052 and the borrower may redeem the token 2052 to retake possession of the collateral item. If the borrower does not successfully repay the loan in accordance with the terms of the loan agreement, the loan contract instance may deem the loan in default.

In some embodiments, the default of the loan may trigger a liquidation stage, where the collateral token 2042 is liquidated to cover the remaining balance of the loan. In embodiments, a liquidation stage may be automatically triggered when a borrower defaults on a loan in accordance with a loan agreement. In embodiments, a smart contract instance (e.g., an instance of a loan process smart contract 2022 or an instance of a loan smart contract 2036) may receive payment event notifications indicating payments made by the borrower towards repayment of the loan. Each time a payment is due, the smart contract instance may determine whether a payment was received. If a schedule payment is missed, the smart contract instance may determine if the borrower is in a default condition. A default condition may not necessarily be the missing of a single payment but may be defined in the loan agreement as missing a number of consecutive payments or being behind on a certain amount of payments relative to the loan repayment amount. If the borrower is in a default condition, the smart contract instance may trigger a liquidation event. In some embodiments, the smart contract may issue a liquidation request to a marketplace (e.g., marketplace system 102) that indicates the collateral token 2042 and/or the VIRL wrapped therein. The liquidation request may include additional data, such as an appraised amount, appraisal records, authentication records, safekeeping records, and/or a remaining balance on the loan repayment amount. In response, the marketplace may conduct a liquidation sale. In embodiments, the liquidation sale may be a fixed price sale (e.g., set at the appraised value) or an auction (e.g., starting at the remaining balance of the loan repayment amount). Once the item is liquidated, the smart contract instance may receive a liquidation notification that indicates that the item was liquidated. In response, the smart contract instance may initiate the transfer of the collateral token 2042 that was used to secure the defaulted upon loan from the escrow account in which it was held to an account of the buyer of the collateral item. Once the ownership data 2054 of the collateral token is updated to indicate that the collateral token 2042 is owned by the buyer, the buyer may then redeem the collateral token 2042 (e.g., as described throughout the disclosure).

Upon taking ownership of a collateral token 2042, an owner of the collateral token 2042 can redeem the token (e.g., using a GUI that provides a mechanism to initiate redemption of a token). Redemption of a collateral token may be handled off-chain by a trusted third party, such as by the redemption system 404 of the tokenization platform 100 and/or on-chain by an instance of a smart contract corresponding to the completed loan transaction, such as the instance of the loan process smart contract 2022 that managed the loan transaction and/or the instance of the safekeeping smart contract 2032 that was created when the collateral item was deposited with the safekeeper of the collateral item to ensure that a collateral item is returned to the rightful owner in a trustless manner, such that the safekeeper can be confident that they are returning the collateral item to the rightful owner.

In embodiments, the redemption of a collateral token 2042 may be performed in accordance with a collateral redemption workflow, which may be executed off-chain (e.g., by a computing system of a trusted-third party) or on-chain (e.g., by instances of one or more smart contracts). In embodiments, the collateral redemption workflow may include, but is not limited to, the following operations: receiving a request to redeem a collateral item indicated by a collateral token 2042 from a user device; verifying the user that is attempting to redeem the collateral token 2042 is the rightful owner of the collateral token 2042 based on ownership data 2052 stored on a distributed ledger 2016; identifying a safekeeper of the collateral item indicated by the collateral token 2042 from the distributed ledger 2016 and/or the loan process smart contract 2022; transmitting a redemption notification to a safekeeper device 2008 of the identified safekeeper that the rightful owner has redeemed the collateral token 2042; receiving a confirmation notification from the safekeeper device 2008 of the identified safekeeper indicating that the rightful owner of the collateral token has taken ownership of the collateral item; and burning the collateral token 2042 in response to receiving the notification from the safekeeper (as described above). In embodiments, the redemption workflow may include additional or alternative steps, such as receiving feedback from the redeeming owner of the collateral item indicating that the collateral item has been returned in satisfactory condition and/or updating a distributed ledger 2016 to indicate the occurrence and content of such feedback events (which may be used to update analytics and/or a rating of the safekeeper).

In embodiments, the tokenization platform 100 is configured to performs analytics on various stages of performed loan processes. In some of these embodiments, the analytics and reporting system 112 may be configured to obtain event records 2052 and/or supporting data 2056 from the set of distributed ledgers 2016 to determine outcomes related to the loan process, including negative outcomes such as false positive authentications (e.g., when an item is deemed authentic but later proven to be fake), false negative authentications (e.g., when an item is deemed fake but later proven to be authentic), overvalued appraisals, undervalued appraisals, damaged or lost collateral items during safekeeping, loan defaults, or the like. For example, the analytics and reporting system 112 may be configured to determine authentication-related statistics, such as the percentage of false positive authentications were issued by each guild and/or guild members. In this example, the analytics and reporting system 112 may read any event records 2052 associated with liquidated items that were deemed authentic by a guild or guild member and later reported to be fake by the purchaser (which may be referred to as "false positives) against the total number of authentications that were performed by a guild or guild member. In another example, the analytics and reporting system 112 may identify instances where authentication tasks resulted in undervalued or overvalued appraised values. In this example, analytics and reporting system 112 may determine a number of event records 2052 associated with liquidated items that were sold below (overvalued by a certain percentage from the liquidation value) or above (undervalued by a certain percentage from the liquidation value) the appraised value provided by the appraiser in relation to the number of all appraisals and/or successful appraisals (e.g., within a certain percentage of the liquidation value). These types of statistical insights may then be used to identify common features of tasks that result in negative outcomes (e.g., false positive cases, false negative cases, undervaluation cases, overvaluation cases, and/or lost or damaged collateral cases) that are not shared with successful cases and in some instances may adjust the stage-level governance to mitigate those features.

In another example, the analytics and reporting system 112 may determine turnover time by task performers (e.g., authenticators and/or appraisers). In this example, the analytics and reporting system 112 may obtain various event records 2052 associated with certain portions of loan processes, such as event records 2052 that indicate when tasks were assigned to particular participants with a loan process and event records 2052 that indicate when those participants finished the task. The analytics and reporting system 112 may then determine a time to complete each instance of the task and may determine various analytical insights such as average turnover time for individual guild members, average turnaround times for a particular task for an entire guild or sub-guild, average turnaround times across all stage participants, average turnaround times for particular types of collateral items or subspecies of collateral items, and the like. These insights may be used to set time constraints on tasks in future governances, such that the participants reward may be lessened if the time constraints are not met.

In embodiments, the analytics and reporting system 112 may be configured to provide ratings to different participants in the loan process ecosystem 2000, such as borrowers, authenticators, appraisers, safekeepers, and/or lenders. In embodiments, the analytics and reporting system 112 may determine negative and positive outcomes associated with the various different participants, such as successful repayments v. default events by borrowers, false negatives/false positives v. successful authentications by authenticators, under-valuations and/or overvaluations by appraisers v. successful appraisals by appraisers, instances of damaged or lost collateral items v. successful safekeeping tasks by safekeepers, and the like. The analytics and reporting system 112 may collect additional or alternative data relating to participants, such as feedback of other participants. The analytics and reporting system 112 may then apply a scoring function to the outcome and other feedback data related to participants to assign scores to the participants. These scores may be relevant when assigning tasks, awarding guild tokens, rewarding participants, and/or the like.

In embodiments, the analytics and reporting system 112 may obtain data from the distributed ledgers. In some of these embodiments, a node device 2014 may be configured as a "history node" that monitors all data blocks being written to the distributed ledgers 2016. The history node device may process and index each block as it is being written to the ledger 2016 and may provide this information to the analytics and reporting system 112. The analytics and reporting system 112 may then perform its analytics on the data collected by the history node. The analytics and reporting system 112 may collect data from the distributed ledger 2016 in other suitable manners without departing from the scope of the disclosure.

Figure 27:
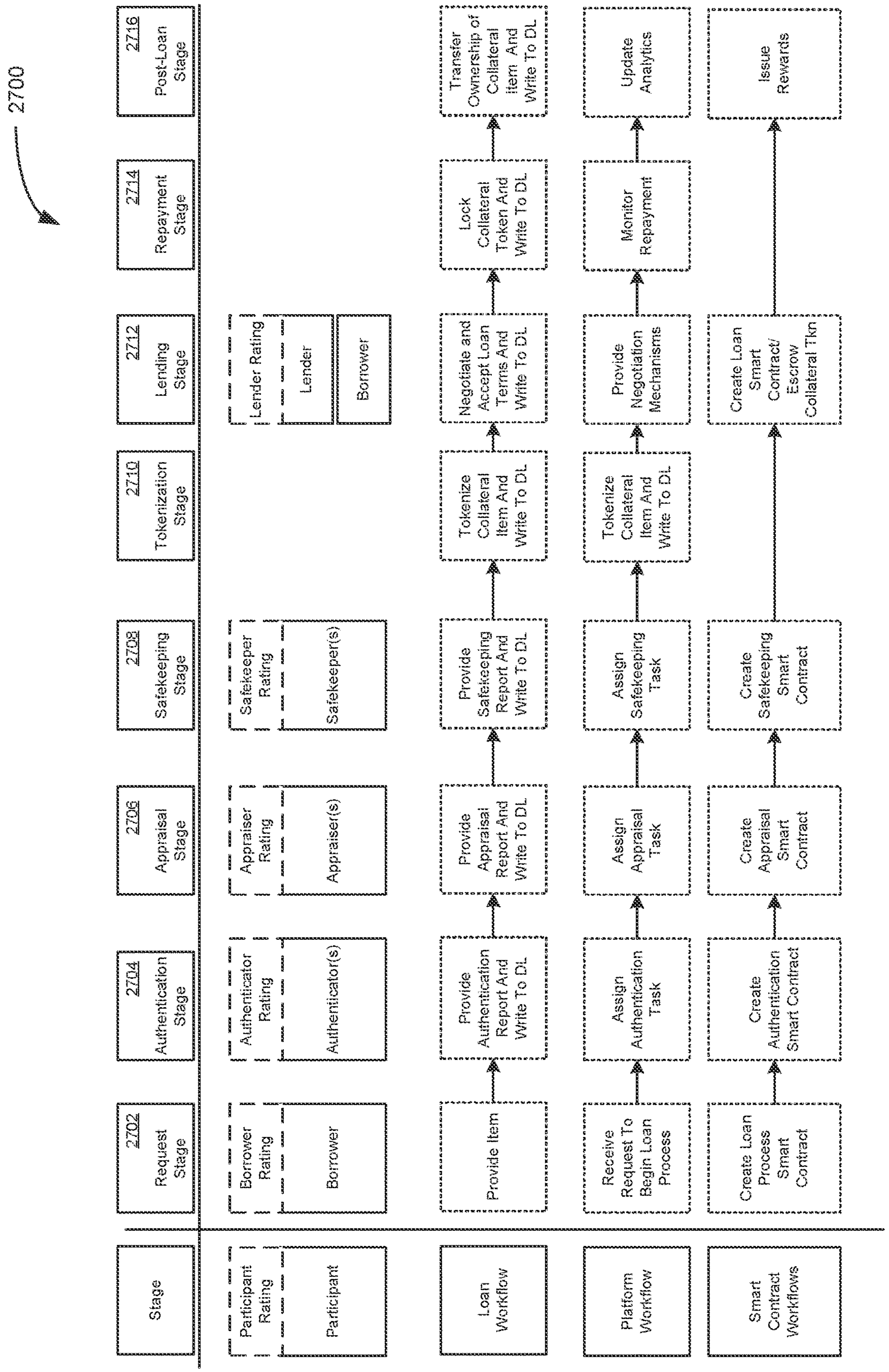
FIG. 27 is a diagram illustrating a set of stages of a loan process workflow according to some embodiments of the present disclosure.

FIG. 27 illustrates an example of loan process workflow 2700 according to some embodiments of the present disclosure. In the example of FIG. 27, the loan process workflow may be performed for collateral items that are easily counterfeited, such as watches, jewelry, handbags, sneakers, or the like. In the example of FIG. 27, the loan process workflow 2700 may include: a request stage 2702 where the borrower requests to begin a loan process; followed by an authentication stage 2704 where one or more authenticators authenticate the one or more items; followed by an appraisal stage 2706 where the authenticated items are appraised; followed by a safekeeping stage 2708 where the appraised items are stored in escrow with a trusted safekeeper; followed by a tokenization stage 2710 where the ledger management system 104 (or another suitable component) generates VIRLs of the one or more escrowed items and generates a collateral token by tokenizing the VIRLs of the escrowed items; followed by a lending stage 2712 where a loan is negotiated and accepted by the borrower and a lender; followed by a repayment stage 2714 where the loan is repaid by the borrower; and followed by a post-loan stage 2716 where the collateral token is unlocked and returned to the borrower or liquidated if the borrower defaults on the loan and any rewards are issued to the participants of the loan process.

During the request stage 2702, a borrower may request to begin a new loan process that includes collateralizing an item owned by the borrower. In embodiments, the borrower may request the loan via a borrower device 2002 that interfaces with the tokenization platform 100. In these embodiments, the tokenization platform 100 (or another suitable system) may provide a GUI where the borrower may provide information such as a collateral item to be collateralized, a location of the collateral item, a loan amount sought, and/or a proposed loan term. In response to the borrower request, the tokenization platform 100 may instantiate a loan process smart contract instance. In embodiments, the loan process smart contract instance may determine a type of the collateral item (e.g., from the request provided by the borrower) and may request an authenticator (and potentially secondary authenticators) to authenticate the collateral item, thereby progressing the loan process to the authentication stage 2704.

During the authentication stage 2704, the loan process smart contract instance may instantiate an instance of an authentication smart contract 2028. In embodiments, the tokenization platform 100 may assign an authentication task to a primary authenticator (and potentially secondary authenticators) from an authentication guild that specializes in authenticating items such as the collateral item, as described above. In embodiments, the primary authenticator may confirm receipt of the item to be authenticated via an authenticator device 2004. In embodiments, the authenticator may generate an authentication report indicating a determination to the authenticity of the collateral item, as well as any supporting documentation. In embodiments, the authentication report and supporting evidence may be provided to one or more secondary authenticators, who in turn may validate the authentication report and may provide additional supporting documentation. In embodiments, the authentication report and any supporting documentation may be written to a distributed ledger 2016. In some embodiments, the authenticators that participated in the authentication task may be required to stake an amount of currency/tokenized tokens as a safeguard in case the item is liquidated and later deemed fake. In example embodiments, the loan process smart contract 2022 may include a listening thread that listens for an authentication notification issued by the instantiated authentication smart contract 2028 indicating whether the item was authentic or deemed fake by the authenticator(s), where the notification from the authentication smart contract 2028 may include the opinion of the authenticators (e.g., fake or authentic), a hash value of the authentication report and any other supporting evidence, and/or a block address to the authentication report and the supporting evidence. If the loan process smart contract instance determines that the item was deemed authentic, the loan process smart contract instance may advance the loan process to an appraisal stage 2706.

During the appraisal stage 2706, the loan process smart contract instance may request one or more appraisers to appraise the authenticated item and may instantiate an instance of an appraisal smart contract 2030. In embodiments, the tokenization platform 100 may identify one or more appraisers to perform the task based on the type of collateral item, as discussed above. In embodiments, a primary appraiser may receive the collateral item (e.g., via mail or other shipping) and/or may receive a VIRL of the collateral item. Knowing that the item was deemed authentic by the authenticators, the appraiser may determine an appraised value of the collateral item and may generate an appraisal report that indicates the appraised value and any supporting documentation to support the appraised value. In some embodiments, one or more secondary appraisers may validate the appraisal report and may provide supporting documentation for their respective validations. In embodiments, the appraisal report and any supporting documentation may be written to a distributed ledger 2016. In some embodiments, the appraisers that participated in the appraisal task may be required to stake an amount of currency/tokenized tokens equal or proportionate to the appraised value of the collateral item as a safeguard in case the item is liquidated at a price that is significantly less than the remaining balance on the repayment amount and/or the appraised value. In embodiments, the appraisal smart contract 2030 may send a notification to the loan process smart contract 2022 indicating that an appraisal workflow was successfully completed, where the notification may include an appraised value, a hash value of the appraisal report and any other supporting evidence, and/or a block address to the appraisal report and the supporting evidence. Upon determining that the appraisal stage is complete, the loan process smart contract 2022 may advance the loan process to the safekeeping stage 2708.

During the safekeeping stage 2708, the loan process smart contract instance may request a safekeeper to safekeep the appraised item and may instantiate an instance of a safekeeping smart contract 2032, which executes a safekeeping workflow. In embodiments, the tokenization platform 100 may assign a safekeeper to the safekeeping task, for example, based on the type of collateral item and/or the safekeeper's proximity to the collateral item. Once the safekeeper has confirmed receipt of the item, the safekeeper may generate a safekeeping report that indicates that the item is stored and notes any damage to the collateral item at the time it was received and inspected, as well as any supporting documentation that supports the safekeeping report. In embodiments, the safekeeping report and any supporting documentation may be written to a distributed ledger 2016. In some embodiments, the safekeeper may be required to stake an amount of currency/tokenized tokens equal or proportionate to the appraised value of the collateral item as a safeguard in case the item is lost or damaged during safekeeping (or may provide proof of insurance). In embodiments, the safekeeping smart contract instance may then provide a notification to the loan process smart contract instance indicating that the item has been safely stored in escrow, where the notification may include a hash value of the safekeeping report and any other supporting evidence and/or a block address to the safekeeping report and the supporting evidence. In response to the notification, the loan process smart contract may advance the loan process to a tokenization stage 2710.

During the tokenization stage 2710, the tokenization platform 100 (or another suitable component) may generate tokenize the collateral item. In embodiments, the tokenization platform 100 may generate a VIRL of the collateral item based on data that describes and/or depicts the collateral item, such as descriptions, images, videos, 2D scans, and/or 3D scans of the collateral item. In embodiments, the borrower, the safekeeper, and/or the authenticator may provide the data used to generate the VIRL. In embodiments, the tokenization platform 100 generates a collateral token of the item based on the VIRL of the collateral item. Once an item is tokenized, the tokenization platform 100 may write the token to the distributed ledger 2016 and may initially assign the ownership rights to the collateral token to the borrower (until a loan agreement is reached). Once the collateral item has been tokenized, the tokenization platform 100 may provide a notification to the loan process smart contract 2022 indicating the tokenization event and/or an address of the collateral token. Upon receiving notification of tokenization event, the loan process smart contract 2022 may advance the loan process to a lending stage 2712.

During the lending stage 2712, the borrower may request a loan and/or may negotiate a loan with one or more lenders. Upon receiving confirmation that the lender and borrower have agreed to loan terms, the loan process smart contract 2022 may instantiate a loan smart contract 2034 in accordance with the agreed upon terms of the loan. In some embodiments, the tokenization platform 100 may provide a GUI to a borrower that allows the borrower to request a loan from one or more potential lenders and/or negotiate a loan agreement with the one or more lenders. It is appreciated that in some embodiments, the loan negotiation may be handled on-chain rather than via a centralized service, such as the tokenization platform 100. In embodiments, the borrower may request a loan amount that does not exceed the appraised value and a proposed loan term that indicates an amount of time to pay back the loan. In some of these embodiments, the tokenization platform 100 may generate a loan request that is presented to potential lenders via a GUI, whereby the loan request indicates the sought amount, the length of the loan, and information relating to the collateral item provided by the borrower (e.g., a VIRL of the collateral item, authentication reports, appraisal reports, safekeeping reports, verification that the authentication, appraisal, and safekeepers have secured their respective tasks (as described above), and/or the like). In embodiments, the tokenization system 100 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the requested loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the tokenization platform 100 may provide a notification to the loan process smart contract instance indicating that a loan agreement has been agreed to by the borrower and a lender. In embodiments, the notification may include the details of the loan agreement including the terms of the loan agreement. In response, the loan process smart contract instance may instantiate a loan smart contract instance that executes a loan repayment workflow. Once a loan agreement is executed, the loan smart contract may lock the collateral token in an escrow account and may facilitate the transfer of the funds from an account of the lender to an account of the borrower. In embodiments, the loan agreement, records of any offers/counteroffers, and records relating to the escrowing of the collateral token and the transfer funds to the borrower may be written to a distributed ledger 2016. Once the loan process smart contract instance receives notification that the collateral token has been locked and the funds have been transferred, the loan process smart contract instance may advance the loan process to the repayment stage 2714.

During the repayment stage 2714, the loan smart contract instance may monitor the borrower's payment history to ensure that payments are made by the borrower to the lender (or an account that distributes payments to the lender) in accordance with a loan schedule and that the loan is not in a default condition. During the loan repayment stage, the borrower may remit payments. Each time a payment is made, the loan process smart contract instance may receive a payment notification indicating that a payment has been made and an amount of the payment. The loan smart contract instance may then determine whether the loan has been repaid in full. If the loan has not been paid in full, the loan smart contract instance may adjust the loan repayment amount and may perform additional operations, such as returning some of the staked funds from the authenticators, appraisers, and/or safekeepers to reflect the new loan repayment amount. If the loan smart contract instance determines that the loan repayment amount has been paid in full, the loan smart contract instance may send a repayment notification to the loan process smart contract instance indicating that the loan has been paid in full and may advance the loan process to the post-loan stage 2716. In embodiments, the repayment notification may include hash values of payment event records indicating that payments were made and the amount of the payments and/or addresses of the payment records on the distributed ledger 2016. Conversely, if the loan smart contract instance determines that the borrower defaulted, the loan smart contract instance may trigger a liquidation event and/or send a default notification to the loan process smart contract indicating that the loan is in default in accordance with the terms of the loan. In embodiments, the default notification may include hash values of a default event record indicating which payments were missed and the remaining balance on the loan and/or addresses of the default event record on the distributed ledger 2016. In response to receiving a default notification, the loan smart contract instance may initiate a liquation event and may advance the loan process to the post-loan stage 2716.

During the post-loan stage 2716, the collateral token is either returned to the owner if the loan has been fully paid or a liquidation event is conducted. In response to receiving a repayment notification that the loan has been repaid in full, the loan smart contract instance may initiate the transfer of the collateral token from the escrow account to an account of the borrower, who may then redeem the collateral token to obtain possession of the collateral item. Once the loan has been successfully repaid, the loan process smart contract instance may initiate the awarding of rewards to accounts of the authenticator, appraiser, and safekeeper (e.g., from the funds that were paid back to the lender) in accordance with the terms set forth in the authentication smart contract, the appraisal smart contract, and the safekeeping contract.

In initiating a liquidation event, the loan smart contract instance may send an address of the collateral token to an appropriate marketplace (e.g., marketplace system 102), which may liquidate the collateral item (e.g., in an auction). During the liquidation event, a buyer may purchase the collateral token, which results in the ownership data 2054 of the collateral token being assigned to the buyer, who may then redeem the collateral token to obtain possession of the collateral item. Once liquidated, the loan process smart contract instance may distribute the remainder of the outstanding balance to the lender (or a secondary lender if the loan was sold to a secondary lender) from the proceeds of the liquidation event. After the liquidation event, the loan process smart contract instance may initiate the awarding of rewards to accounts of the authenticators, appraisers, and safekeeper from the proceeds of the liquidation event in accordance with the terms set forth in the authentication smart contract, the appraisal smart contract, and the safekeeping contract. To the extent any balance remains, the remainder may be credited to the account of the borrower.

Once the loan process is complete, the loan process smart contract instance may notify the tokenization platform 100 that the loan process has been completed, and the tokenization platform 100 may run an analytics processes based on the completed loan process. In some embodiments, the results of the loan process may be used to update the ratings of one or more of the authenticators, the appraisers, the safekeeper, the lender, and/or the borrower.

It is appreciated that the foregoing is an example of a decentralized loan process workflow 2700 and that alternative workflows may be executed. Furthermore, the decentralized loan process workflow 2700 may include additional or alternative steps that were not explicitly discussed.

Figure 28:
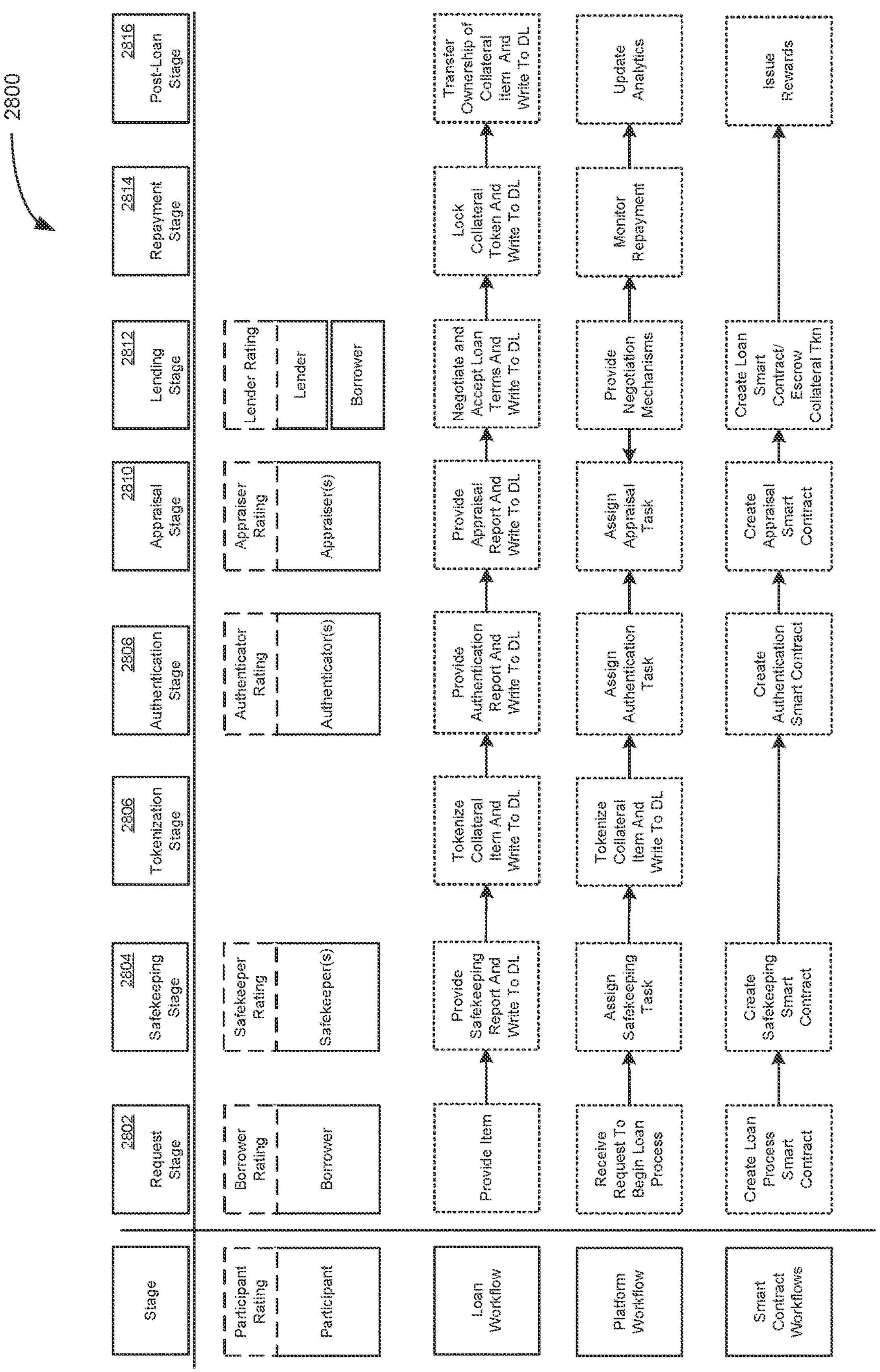
FIG. 28 is a diagram illustrating a set of stages of a loan process workflow according to some embodiments of the present disclosure.

FIG. 28 illustrates an example of loan process workflow 2800 according to some embodiments of the present disclosure. In the example of FIG. 28, the loan process workflow 2800 may be performed for collateral items that are not easily shipped and/or are very large, such as vehicles, works of art, delicate objects (e.g., vases or chandeliers), wine or whiskey collections, and the like. In the workflow 2800 of FIG. 28, the collateral item is deposited with a safekeeper, who in turn can generate the VIRL that is tokenized into a collateral token. The VIRL of the collateral item may then be provided to the authenticators and appraisers without having to transport the physical collateral item between parties. In the example of FIG. 28, the loan process workflow 2800 may include a request stage 2802 where the borrower requests to begin a loan process; followed by a safekeeping stage 2804 where possession of the collateral item is taken by the safekeeper; followed by a tokenization stage 2806 where the safekeeper may provide the requisite documentation to generate a VIRL of the collateral item is tokenized into a collateral token; followed by an authentication stage 2808 where one or more authenticators authenticate the one or more items; followed by an appraisal stage 2810 where the authenticated items are appraised; followed by a lending stage 2812 where a loan is negotiated and accepted by the borrower and a lender; followed by a repayment stage 2814 where the loan is repaid by the borrower; and followed by a post-loan stage 2816 where the collateral token is unlocked and returned to the borrower or liquidated if the borrower defaults on the loan and any rewards are issued to the participants of the loan process.

During the request stage 2802, a borrower may request to begin a new loan process that includes collateralizing an item owned by the borrower. In embodiments, the borrower may request the loan via a borrower device 2002 that interfaces with the tokenization platform 100. In these embodiments, the tokenization platform 100 (or another suitable system) may provide a GUI where the borrower may provide information such as a collateral item to be collateralized, a location of the collateral item, a loan amount sought, and/or a proposed loan term. In response to the borrower request, the tokenization platform 100 may instantiate a loan process smart contract instance. In embodiments, the loan process smart contract instance may determine a type of the collateral item (e.g., from the request provided by the borrower) and may request a safekeeper to safekeep the collateral item in escrow during the loan process, thereby progressing the loan process to the safekeeping stage 2804.

During the safekeeping stage 2804, the loan process smart contract instance may request a safekeeper to safekeep the collateral item and may instantiate an instance of a safekeeping smart contract 2032, which executes a safekeeping workflow. In embodiments, the tokenization platform 100 may assign a safekeeper to the safekeeping task, for example, based on the type of collateral item and/or the safekeeper's proximity to the collateral item. Once the safekeeper has confirmed receipt of the item, the safekeeper may generate a safekeeping report that indicates that the item is stored and notes any damage to the collateral item at the time it was received and inspected, as well as any supporting documentation that supports the safekeeping report. In embodiments, the safekeeping report and any supporting documentation may be written to a distributed ledger 2016. In some embodiments, the safekeeper may be required to stake an amount of currency/tokenized tokens equal or proportionate to an approximate value of the collateral item as a safeguard in case the item is lost or damaged during safekeeping (or may provide proof of insurance). In embodiments, the safekeeping smart contract instance may then provide a notification to the loan process smart contract instance indicating that the item has been safely stored in escrow, where the notification may include a hash value of the safekeeping report and any other supporting evidence and/or a block address to the safekeeping report and the supporting evidence. In response to the notification, the loan process smart contract may advance the loan process to a tokenization stage 2806.

During the tokenization stage 2806, the tokenization platform 100 (or another suitable component) may generate tokenize the collateral item. In embodiments, the tokenization platform 100 may generate a VIRL of the collateral item based on data that describes and/or depicts the collateral item, such as descriptions, images, videos, 2D scans, and/or 3D scans of the collateral item. In embodiments, the borrower or the safekeeper may provide the data used to generate the VIRL. In embodiments, the tokenization platform 100 generates a collateral token of the item based on the VIRL of the collateral item. Once an item is tokenized, the tokenization platform 100 may write the token to the distributed ledger 2016 and may initially assign the ownership rights to the collateral token to the borrower (until a loan agreement is reached). Once the collateral item has been tokenized, the tokenization platform 100 may provide a notification to the loan process smart contract 2022 indicating the tokenization event and/or an address of the collateral token. Upon receiving notification of tokenization event, the loan process smart contract 2022 may advance the loan process to an authentication stage 2808.

During the authentication stage 2808, the loan process smart contract instance may instantiate an instance of an authentication smart contract 2028. In embodiments, the tokenization platform 100 may assign an authentication task to a primary authenticator (and potentially secondary authenticators) from an authentication guild that specializes in authenticating items such as the collateral item, as described above. In embodiments, the primary authenticator may be sent the VIRL of the item to be authenticated and the authenticator may generate an authentication report indicating a determination to the authenticity of the collateral item, as well as any supporting documentation. In embodiments, the authentication report and supporting evidence may be provided to one or more secondary authenticators, who in turn may validate the authentication report and may provide additional supporting documentation. In embodiments, the authentication report and any supporting documentation may be written to a distributed ledger 2016. In some embodiments, the authenticators that participated in the authentication task may be required to stake an amount of currency/tokenized tokens as a safeguard in case the item is liquidated and later deemed fake. In example embodiments, the loan process smart contract 2022 may include a listening thread that listen for an authentication notification issued by the instantiated authentication smart contract 2028 indicating whether the item was authentic or deemed fake by the authenticator(s), where the authentication notification from the authentication smart contract 2028 may include the opinion of the authenticators (e.g., fake or authentic), a hash value of the authentication report and any other supporting evidence, and/or a block address to the authentication report and the supporting documentation. If the loan process smart contract instance determines that the item was deemed authentic, the loan process smart contract instance may advance the loan process to an appraisal stage 2810.

During the appraisal stage 2810, the loan process smart contract instance may request one or more appraisers to appraise the authenticated item and may instantiate an instance of an appraisal smart contract 2030. In embodiments, the tokenization platform 100 may identify one or more appraisers to perform the task based on the type of collateral item, as discussed above. In embodiments, a primary appraiser may be sent the VIRL of the collateral item. Knowing that the item was deemed authentic, the appraiser may determine an appraised value of the collateral item and may generate an appraisal report that indicates the appraised value and any supporting documentation to support the appraised value. In some embodiments, one or more secondary appraisers may validate the appraisal report and may provide supporting documentation for their respective validations. In embodiments, the appraisal report and any supporting documentation may be written to a distributed ledger 2016. In some embodiments, the appraisers that participated in the appraisal task may be required to stake an amount of currency/tokenized tokens equal or proportionate to the appraised value of the collateral item as a safeguard in case the item is liquidated at a price that is significantly less than the remaining balance on the repayment amount and/or the appraised value. In embodiments, the appraisal smart contract 2030 may send a notification to the loan process smart contract 2022 indicating that an appraisal workflow was successfully completed, where the notification may include an appraised value, a hash value of the appraisal report and any other supporting evidence, and/or a block address to the appraisal report and the supporting evidence. Upon determining that the appraisal stage is complete, the loan process smart contract 2022 may advance the loan process to the lending stage 2812.

During the lending stage 2812, the borrower may request a loan and/or may negotiate a loan with one or more lenders. Upon receiving confirmation that the lender and borrower have agreed to loan terms, the loan process smart contract 2022 may instantiate a loan smart contract 2034 in accordance with the agreed upon terms of the loan. In some embodiments, the tokenization platform 100 may provide a GUI to a borrower that allows the borrower to request a loan from one or more potential lenders and/or negotiate a loan agreement with the one or more lenders. It is appreciated that in some embodiments, the loan negotiation may be handled on-chain rather than via a centralized service, such as the tokenization platform 100. In embodiments, the borrower may request a loan amount that does not exceed the appraised value and a proposed loan term that indicates an amount of time to pay back the loan. In some of these embodiments, the tokenization platform 100 may generate a loan request that is presented to potential lenders via a GUI, whereby the loan request indicates the sought amount, the length of the loan, and information relating to the collateral item provided by the borrower (e.g., a VIRL of the collateral item, authentication reports, appraisal reports, safekeeping reports, verification that the authentication, appraisal, and safekeepers have secured their respective tasks (as described above), and/or the like. In embodiments, the tokenization system 100 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the requested loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the tokenization platform 100 may provide a notification to the loan process smart contract instance indicating that a loan agreement has been agreed to by the borrower and a lender. In embodiments, the notification may include the details of the loan agreement including the terms of the loan agreement. In response, the loan process smart contract instance may instantiate a loan smart contract instance that executes a loan repayment workflow. Once a loan agreement is executed, the loan smart contract may lock the collateral token in an escrow account and may facilitate the transfer of the funds from an account of the lender to an account of the borrower. In embodiments, the loan agreement, records of any offers/counteroffers, and records relating to the escrowing of the collateral token and the transfer funds to the borrower may be written to a distributed ledger 2016. Once the loan process smart contract instance receives notification that the collateral token has been locked and the funds have been transferred, the loan process smart contract instance may advance the loan process to the repayment stage 2814.

During the repayment stage 2814, the loan smart contract instance may monitor the borrower's payment history to ensure that payments are made by the borrower to the lender (or an account that distributes payments to the lender) in accordance with a loan schedule and that the loan is not in a default condition. During the loan repayment stage, the borrower may remit payments. Each time a payment is made, the loan process smart contract instance may receive a payment notification indicating that a payment has been made and an amount of the payment. The loan smart contract instance may then determine whether the loan has been repaid in full. If the loan has not been paid in full, the loan smart contract instance may adjust the loan repayment amount and may perform additional operations, such as returning some of the staked funds from the authenticators, appraisers, and/or safekeepers to reflect the new loan repayment amount. If the loan smart contract instance determines that the loan repayment amount has been paid in full, the loan smart contract instance may send a repayment notification to the loan process smart contract instance indicating that the loan has been paid in full and may advance the loan process to the post-loan stage 2816. In embodiments, the repayment notification may include hash values of payment event records indicating that payments were made and the amount of the payments and/or addresses of the payment records on the distributed ledger 2016. Conversely, if the loan smart contract instance determines that the borrower defaulted, the loan smart contract may instance may trigger a liquidation event and/or send a default notification to the loan process smart contract indicating that the loan is in default in accordance with the terms of the loan. In embodiments, the default notification may include hash values of a default event record indicating which payments were missed and the remaining balance on the loan and/or addresses of the default event record on the distributed ledger 2016. In response to receiving a default notification, the loan smart contract instance may initiate a liquation event and may advance the loan process to the post-loan stage 2816.

During the post-loan stage 2816, the collateral token is either returned to the owner if the loan has been fully paid or a liquidation event is conducted. In response to receiving a repayment notification that the loan has been repaid in full, the loan smart contract instance may initiate the transfer of the collateral token from the escrow account to an account of the borrower, who may then redeem the collateral token to obtain possession of the collateral item. Once the loan has been successfully repaid, the loan process smart contract instance may initiate the awarding of rewards to accounts of the authenticator, appraiser, and safekeeper (e.g., from the funds that were paid back to the lender) in accordance with the terms set forth in the authentication smart contract, the appraisal smart contract, and the safekeeping contract.

In initiating a liquidation event, the loan smart contract instance may send an address of the collateral token to an appropriate marketplace (e.g., marketplace system 102), which may liquidate the collateral item (e.g., in an auction). During the liquidation event, a buyer may purchase the collateral token, which results in the ownership data 2054 of the collateral token being assigned to the buyer, who may then redeem the collateral token to obtain possession of the collateral item. Once liquidated, the loan process smart contract instance may distribute the remainder of the outstanding balance to the lender (or a secondary lender if the loan was sold to a secondary lender) from the proceeds of the liquidation event. After the liquidation event, the loan process smart contract instance may initiate the awarding of rewards to accounts of the authenticators, appraisers, and safekeeper from the proceeds of the liquidation event in accordance with the terms set forth in the authentication smart contract, the appraisal smart contract, and the safekeeping contract. To the extent any balance remains, the remainder may be credited to the account of the borrower.

Once the loan process is complete, the loan process smart contract instance may notify the tokenization platform 100 that the loan process has been completed, and the tokenization platform 100 may run an analytics processes based on the completed loan process. In some embodiments, the results of the loan process may be used to update the ratings of one or more of the authenticators, the appraisers, the safekeeper, the lender, and/or the borrower.

It is appreciated that the foregoing is an example of a decentralized loan process workflow 2800 and that alternative workflows may be executed. Furthermore, the decentralized loan process workflow 2800 may include additional or alternative steps that were not explicitly discussed.

Figure 29:
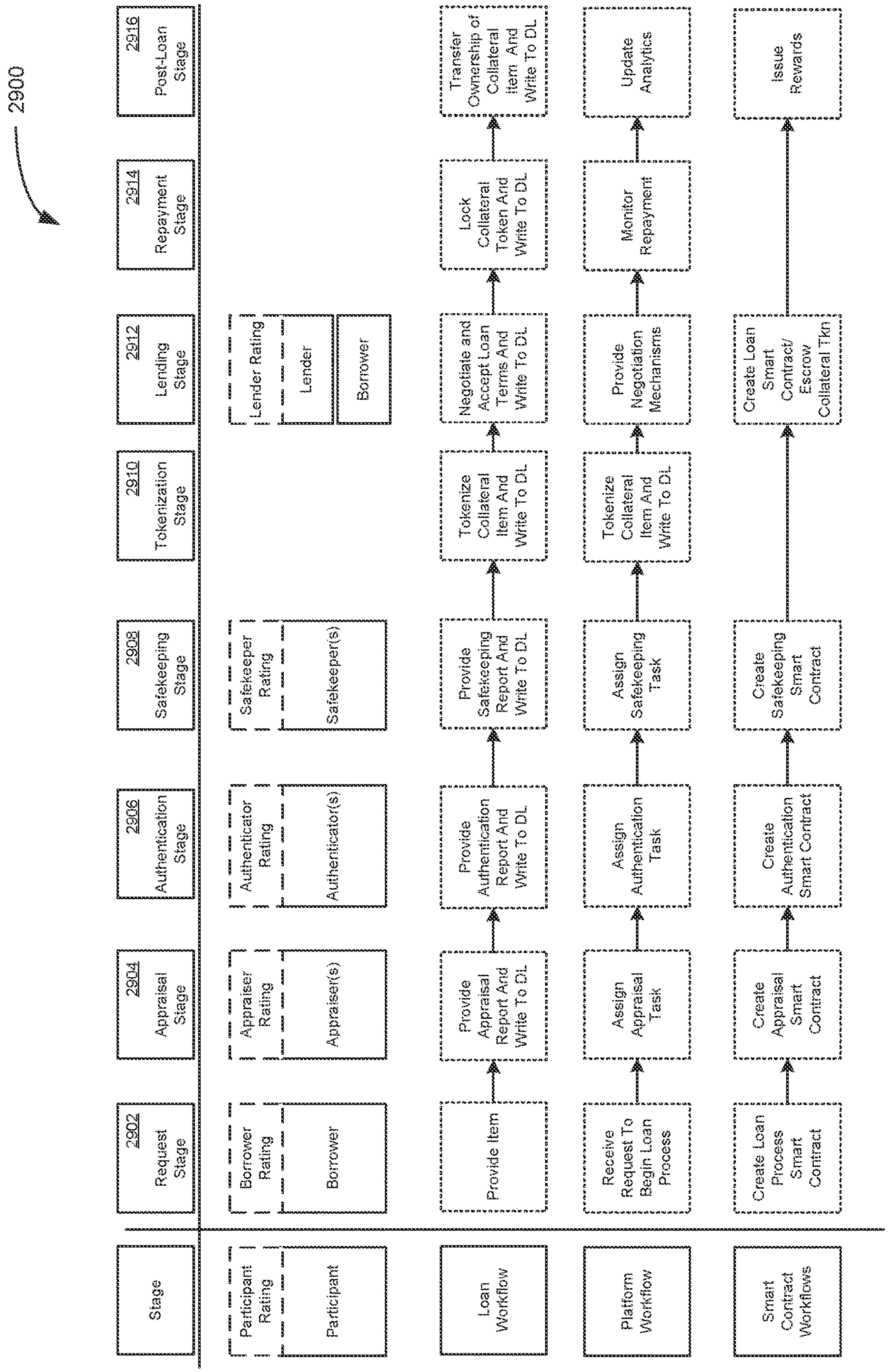
FIG. 29 is a diagram illustrating a set of stages of a loan process workflow according to some embodiments of the present disclosure.

FIG. 29 illustrates an example of loan process workflow 2900 according to some embodiments of the present disclosure. In the example of FIG. 29, the loan process workflow 2900 may be performed when a borrower is likely overvaluing the collateral item. For example, the borrower may wish to secure a loan amount that is equal to $10,000 and wants to secure the loan with a pair of designer sneakers. In this situation, the loan process workflow 2900 of FIG. 29 may be executed, with the appraisal stage being performed before the authentication stage and safekeeping stage. In this way, if the appraised value is much less than the desired loan amount, the borrower may elect to forego the loan process without having to pay an authentication fee and/or a safekeeping fee. In the example of FIG. 29, the loan process workflow 2900 may include: a request stage 2902 where the borrower requests to begin a loan process; followed by an appraisal stage 2904 where one or more appraisers appraise the one or more items; followed by an authentication stage 2906 where the appraised items are authenticated; followed by a safekeeping stage 2908 where the authenticated items are stored in escrow with a trusted safekeeper; followed by a tokenization stage 2910 where the ledger management system 104 (or another suitable component) generates VIRLs of the one or more escrowed items, generates a collateral token by tokenizing the VIRLs of the escrowed items; followed by a lending stage 2912 where a loan is negotiated and accepted by the borrower and a lender; followed by a repayment stage 2914 where the loan is repaid by the borrower; and followed by a post-loan stage 2916 where the collateral token is unlocked and returned to the borrower or liquidated if the borrower defaults on the loan and any rewards are issued to the participants of the loan process.

During the request stage 2902, a borrower may request to begin a new loan process that includes collateralizing an item owned by the borrower. In embodiments, the borrower may request the loan via a borrower device 2002 that interfaces with the tokenization platform 100. In these embodiments, the tokenization platform 100 (or another suitable system) may provide a GUI where the borrower may provide information such as a collateral item to be collateralized, a location of the collateral item, a loan amount sought, and/or a proposed loan term. In response to the borrower request, the tokenization platform 100 may instantiate a loan process smart contract instance. In embodiments, the loan process smart contract instance may determine a type of the collateral item (e.g., from the request provided by the borrower) and may request an appraiser (and potentially secondary appraisers) to appraise the collateral item, thereby progressing the loan process to the appraisal stage 2904.

During the appraisal stage 2904, the loan process smart contract instance may instantiate an instance of an appraisal smart contract 2030 and may request one or more appraisers to appraise the authenticated. In embodiments, the tokenization platform 100 may identify one or more appraisers to perform the task based on the type of collateral item, the location of the item, and/or the like, as was discussed above. In embodiments, a primary appraiser may receive the collateral item (e.g., via mail or other shipping) and may determine an appraised value of the collateral item. In this workflow 2900, the appraiser does not have the benefit of knowing that the item was deemed authentic by the authenticators. Nevertheless, the appraiser may assume that the item will be deemed authentic by the authenticators. In embodiments, the primary appraiser may generate an appraisal report that indicates the determined appraised value and any supporting documentation to support the appraised value. In some embodiments, one or more secondary appraisers may validate the appraisal report and may provide supporting documentation for their respective validations. In embodiments, the appraisal report and any supporting documentation may be written to a distributed ledger 2016. In some embodiments, the appraisers that participated in the appraisal task may be required to stake an amount of currency/tokenized tokens equal or proportionate to the appraised value of the collateral item as a safeguard in case the item is liquidated at a price that is significantly less than the remaining balance on the repayment amount and/or the appraised value. In embodiments, the appraisal smart contract 2030 may send a notification to the loan process smart contract 2022 indicating that an appraisal workflow was successfully completed, where the notification may include an appraised value, a hash value of the appraisal report and any other supporting evidence, and/or a block address to the appraisal report and the supporting evidence. In some scenarios, the appraised value will be much less than the requested loan amount, in which case, the borrower may opt to end the loan process. Assuming the borrower decides to continue the loan process given the appraised value, the loan process smart contract 2022 may advance the loan process to the appraisal stage 2906.

During the authentication stage 2906, the loan process smart contract instance may instantiate an instance of an authentication smart contract 2028. In embodiments, the tokenization platform 100 may assign an authentication task to a primary authenticator (and potentially secondary authenticators) from an authentication guild that specializes in authenticating items such as the collateral item, as described above. In embodiments, either the collateral item is physically sent to the primary authenticator (e.g., from the appraiser) or a VIRL of the collateral item is digitally sent to authenticator. In embodiments, the primary authenticator may confirm receipt of the collateral item to be authenticated (or a VIRL thereof) via an authenticator device 2004. In embodiments, the authenticator may generate an authentication report indicating a determination to the authenticity of the collateral item, as well as any supporting documentation. In embodiments, the authentication report and supporting evidence may be provided to one or more secondary authenticators, who in turn may validate the authentication report and may provide additional supporting documentation. In embodiments, the authentication report and any supporting documentation may be written to a distributed ledger 2016. In some embodiments, the authenticators that participated in the authentication task may be required to stake an amount of currency/tokenized tokens as a safeguard in case the item is liquidated and later deemed fake. In example embodiments, the loan process smart contract 2022 may include a listening thread that listen for an authentication notification issued by the instantiated authentication smart contract 2028 indicating whether the item was authentic or deemed fake by the authenticator(s), where the notification from the authentication smart contract 2028 may include the opinion of the authenticators (e.g., fake or authentic), a hash value of the authentication report and any other supporting evidence, and/or a block address to the authentication report and the supporting evidence. If the loan process smart contract instance determines that the item was deemed authentic, the loan process smart contract instance may advance the loan process to a safekeeping stage 2908.

During the safekeeping stage 2908, the loan process smart contract instance may request a safekeeper to safekeep the collateral item and may instantiate an instance of a safekeeping smart contract 2032, which executes a safekeeping workflow. In embodiments, the tokenization platform 100 may assign a safekeeper to the safekeeping task, for example, based on the type of collateral item and/or the safekeeper's proximity to the collateral item. Once the safekeeper has confirmed receipt of the item, the safekeeper may generate a safekeeping report that indicates that the item is stored and notes any damage to the collateral item at the time it was received and inspected, as well as any supporting documentation that supports the safekeeping report. In embodiments, the safekeeping report and any supporting documentation may be written to a distributed ledger 2016. In some embodiments, the safekeeper may be required to stake an amount of currency/tokenized tokens equal or proportionate to the appraised value of the collateral item as a safeguard in case the item is lost or damaged during safekeeping (or may provide proof of insurance). In embodiments, the safekeeping smart contract instance may then provide a notification to the loan process smart contract instance indicating that the item has been safely stored in escrow, where the notification may include a hash value of the safekeeping report and any other supporting evidence and/or a block address to the safekeeping report and the supporting evidence. In response to the notification, the loan process smart contract may advance the loan process to a tokenization stage 2910.

During the tokenization stage 2910, the tokenization platform 100 (or another suitable component) may generate tokenize the collateral item. In embodiments, the tokenization platform 100 may generate a VIRL of the collateral item based on data that describes and/or depicts the collateral item, such as descriptions, images, videos, 2D scans, and/or 3D scans of the collateral item. In embodiments, the borrower, the safekeeper, and/or the authenticator may provide the data used to generate the VIRL. In embodiments, the tokenization platform 100 generates a collateral token of the item based on the VIRL of the collateral item. Once an item is tokenized, the tokenization platform 100 may write the token to the distributed ledger 2016 and may initially assign the ownership rights to the collateral token to the borrower (until a loan agreement is reached). Once the collateral item has been tokenized, the tokenization platform 100 may provide a notification to the loan process smart contract 2022 indicating the tokenization event and/or an address of the collateral token. Upon receiving notification of tokenization event, the loan process smart contract 2022 may advance the loan process to a lending stage 2912.

During the lending stage 2912, the borrower may request a loan and/or may negotiate a loan with one or more lenders. Upon receiving confirmation that the lender and borrower have agreed to loan terms, the loan process smart contract 2022 may instantiate a loan smart contract 2034 in accordance with the agreed upon terms of the loan. In some embodiments, the tokenization platform 100 may provide a GUI to a borrower that allows the borrower to request a loan from one or more potential lenders and/or negotiate a loan agreement with the one or more lenders. It is appreciated that in some embodiments, the loan negotiation may be handled on-chain rather than via a centralized service, such as the tokenization platform 100. In embodiments, the borrower may request a loan amount that does not exceed the appraised value and a proposed loan term that indicates an amount of time to pay back the loan. In some of these embodiments, the tokenization platform 100 may generate a loan request that is presented to potential lenders via a GUI, whereby the loan request indicates the sought amount, the length of the loan, and information relating to the collateral item provided by the borrower (e.g., a VIRL of the collateral item, authentication reports, appraisal reports, safekeeping reports, verification that the authentication, appraisal, and safekeepers have secured their respective tasks (as described above), and/or the like). In embodiments, the tokenization system 100 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the requested loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the tokenization platform 100 may provide a notification to the loan process smart contract instance indicating that a loan agreement has been agreed to by the borrower and a lender. In embodiments, the notification may include the details of the loan agreement including the terms of the loan agreement. In response, the loan process smart contract instance may instantiate a loan smart contract instance that executes a loan repayment workflow. Once a loan agreement is executed, the loan smart contract may lock the collateral token in an escrow account and may facilitate the transfer of the funds from an account of the lender to an account of the borrower. In embodiments, the loan agreement, records of any offers/counteroffers, and records relating to the escrowing of the collateral token and the transfer funds to the borrower may be written to a distributed ledger 2016. Once the loan process smart contract instance receives notification that the collateral token has been locked and the funds have been transferred, the loan process smart contract instance may advance the loan process to the repayment stage 2914.

During the repayment stage 2914, the loan smart contract instance may monitor the borrower's payment history to ensure that payments are made by the borrower to the lender (or an account that distributes payments to the lender) in accordance with a loan schedule and that the loan is not in a default condition. During the loan repayment stage, the borrower may remit payments. Each time a payment is made, the loan process smart contract instance may receive a payment notification indicating that a payment has been made and an amount of the payment. The loan smart contract instance may then determine whether the loan has been repaid in full. If the loan has not been paid in full, the loan smart contract instance may adjust the loan repayment amount and may perform additional operations, such as returning some of the staked funds from the authenticators, appraisers, and/or safekeepers to reflect the new loan repayment amount. If the loan smart contract instance determines that the loan repayment amount has been paid in full, the loan smart contract instance may send a repayment notification to the loan process smart contract instance indicating that the loan has been paid in full and may advance the loan process to the post-loan stage 2916. In embodiments, the repayment notification may include hash values of payment event records indicating that payments were made and the amount of the payments and/or addresses of the payment records on the distributed ledger 2016. Conversely, if the loan smart contract instance determines that the borrower defaulted, the loan smart contract may instance may trigger a liquidation event and/or send a default notification to the loan process smart contract indicating that the loan is in default in accordance with the terms of the loan. In embodiments, the default notification may include hash values of a default event record indicating which payments were missed and the remaining balance on the loan and/or addresses of the default event record on the distributed ledger 2016. In response to receiving a default notification, the loan smart contract instance may initiate a liquation event and may advance the loan process to the post-loan stage 2916.

During the post-loan stage 2916, the collateral token is either returned to the owner if the loan has been fully paid or a liquidation event is conducted. In response to receiving a repayment notification that the loan has been repaid in full, the loan smart contract instance may initiate the transfer of the collateral token from the escrow account to an account of the borrower, who may then redeem the collateral token to obtain possession of the collateral item. Once the loan has been successfully repaid, the loan process smart contract instance may initiate the awarding of rewards to accounts of the authenticator, appraiser, and safekeeper (e.g., from the funds that were paid back to the lender) in accordance with the terms set forth in the authentication smart contract, the appraisal smart contract, and the safekeeping contract.

In initiating a liquidation event, the loan smart contract instance may send an address of the collateral token to an appropriate marketplace (e.g., marketplace system 102), which may liquidate the collateral item (e.g., in an auction). During the liquidation event, a buyer may purchase the collateral token, which results in the ownership data 2054 of the collateral token being assigned to the buyer, who may then redeem the collateral token to obtain possession of the collateral item. Once liquidated, the loan process smart contract instance may distribute the remainder of the outstanding balance to the lender (or a secondary lender if the loan was sold to a secondary lender) from the proceeds of the liquidation event. After the liquidation event, the loan process smart contract instance may initiate the awarding of rewards to accounts of the authenticators, appraisers, and safekeeper from the proceeds of the liquidation event in accordance with the terms set forth in the authentication smart contract, the appraisal smart contract, and the safekeeping contract. To the extent any balance remains, the remainder may be credited to the account of the borrower.

Once the loan process is complete, the loan process smart contract instance may notify the tokenization platform 100 that the loan process has been completed, and the tokenization platform 100 may run an analytics processes based on the completed loan process. In some embodiments, the results of the loan process may be used to update the ratings of one or more of the authenticators, the appraisers, the safekeeper, the lender, and/or the borrower.

It is appreciated that the foregoing is an example of a decentralized loan process workflow 2900 and that alternative workflows may be executed. Furthermore, the decentralized loan process workflow 2900 may include additional or alternative steps that were not explicitly discussed.

Figure 30:
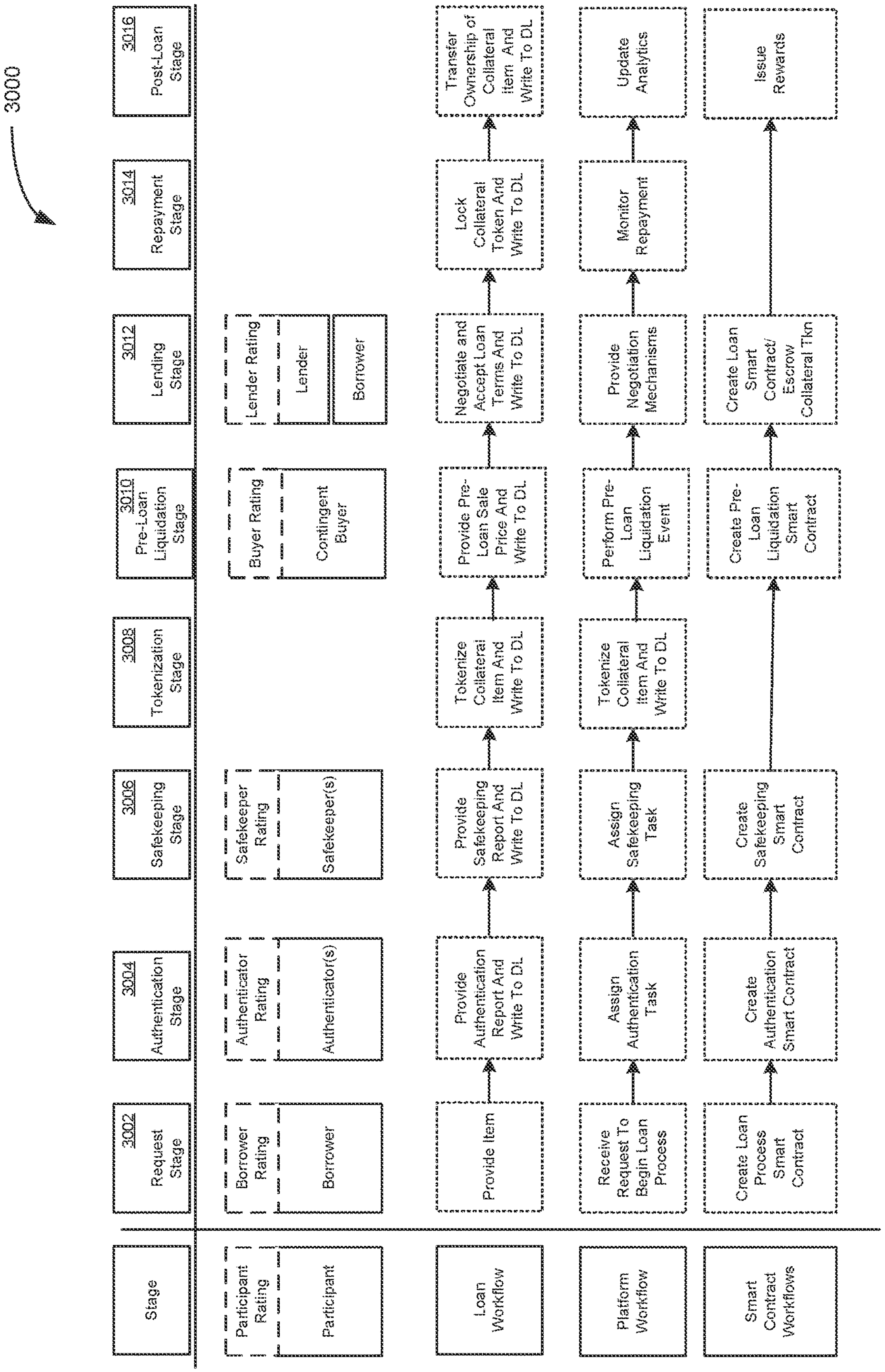
FIG. 30 is a diagram illustrating a set of stages of a loan process workflow according to some embodiments of the present disclosure.

FIG. 30 illustrates an example of loan process workflow 3000 according to some embodiments of the present disclosure. In the example loan process workflow 3000 a pre-loan liquidation event is conducted before the loan terms are agreed to. During an example pre-loan liquidation stage, a marketplace (e.g., a marketplace hosted by or in communication with the marketplace system 102 of the tokenization platform 100) may sell a collateral item to a contingent buyer at a set price or auction off the collateral item to the contingent buyer prior to the negotiation and/or execution of a loan involving the collateral item with a set of contingencies. In embodiments, the set of contingencies may include a possession contingency and a reward contingency. In embodiments, a possession contingency conditions the contingent buyer's possession rights to the collateral item upon a confirmed default event with respect to a loan agreement entered into by the borrower that is secured by the collateral item. Put another way, the contingent buyer would only be able to take possession of the collateral item (e.g., by redeeming a corresponding collateral item) if the borrower was able to secure a loan using the collateral item as collateral and the borrower later defaulted on that loan. In embodiments, a reward contingency may condition the awarding of a reward (e.g., an amount of currency/tokenized tokens or fiat currency) to the contingent buyer (e.g., by depositing the reward into an electronic account thereof) if the borrower successfully repays the loan. In this way, the contingent buyer is incentivized to purchase collateral items on a contingency, as he or she will be rewarded if the loan is successfully repaid. Put another way, the contingent buyer may be provided a monetary reward in exchange for agreeing to set a liquidation price of a collateral item before a loan is entered into by the current owner of the collateral item (i.e., the borrower). It is noted that in some embodiments, a borrower may agree to sell the collateral item to the contingent buyer and forego the opportunity to seek out a loan after the pre-loan liquidation stage. The pre-loan liquidation stage may be performed in place of an appraisal stage or may be requested after the appraisal stage (e.g., by a borrower and/or lender if one or more both of the parties do not agree to the appraised value of the collateral item).

In the example of FIG. 30, the loan process workflow 3000 may include: a request stage 3002 where the borrower requests to begin a loan process; followed by an authentication stage 3004 where one or more authenticators authenticate a collateral item; followed by a safekeeping stage 3006 where the authenticated item is stored in escrow with a trusted safekeeper; followed by a tokenization stage 3010 where a VIRL corresponding to the collateral item is generated and tokenized into a collateral token; followed by a pre-loan liquidation stage 3006 where the authenticated items are conditionally sold via a marketplace to set a liquidation value of the collateral item before the loan terms are negotiated; followed by a lending stage 3012 where a loan is negotiated and accepted by the borrower and a lender; followed by a repayment stage 3014 where the loan is repaid by the borrower; and followed by a post-loan stage 3016 where the collateral token is unlocked and returned to the borrower or liquidated if the borrower defaults on the loan and any rewards are issued to the participants of the loan process.

During the request stage 3002, a borrower may request to begin a new loan process that includes collateralizing an item owned by the borrower. In embodiments, the borrower may request the loan via a borrower device 2002 that interfaces with the tokenization platform 100. In these embodiments, the tokenization platform 100 (or another suitable system) may provide a GUI where the borrower may provide information such as a collateral item to be collateralized, a location of the collateral item, a loan amount sought, and/or a proposed loan term. In response to the borrower request, the tokenization platform 100 may instantiate a loan process smart contract instance. In embodiments, the loan process smart contract instance may determine a type of the collateral item (e.g., from the request provided by the borrower) and may request an authenticator (and potentially secondary authenticators) to authenticate the collateral item, thereby progressing the loan process to the authentication stage 3004.

During the authentication stage 3004, the loan process smart contract instance may instantiate an instance of an authentication smart contract 2028. In embodiments, the tokenization platform 100 may assign an authentication task to a primary authenticator (and potentially secondary authenticators) from an authentication guild that specializes in authenticating items such as the collateral item, as described above. In embodiments, the primary authenticator may confirm receipt of the item to be authenticated via an authenticator device 2004. In embodiments, the authenticator may generate an authentication report indicating a determination to the authenticity of the collateral item, as well as any supporting documentation. In embodiments, the authentication report and supporting evidence may be provided to one or more secondary authenticators, who in turn may validate the authentication report and may provide additional supporting documentation. In embodiments, the authentication report and any supporting documentation may be written to a distributed ledger 2016. In some embodiments, the authenticators that participated in the authentication task may be required to stake an amount of currency/tokenized tokens as a safeguard in case the item is liquidated and later deemed fake. In example embodiments, the loan process smart contract 2022 may include a listening thread that listens for an authentication notification issued by the instantiated authentication smart contract 2028 indicating whether the item was authentic or deemed fake by the authenticator(s), where the notification from the authentication smart contract 2028 may include the opinion of the authenticators (e.g., fake or authentic), a hash value of the authentication report and any other supporting evidence, and/or a block address to the authentication report and the supporting evidence. If the loan process smart contract instance determines that the item was deemed authentic, the loan process smart contract instance may advance the loan process to a safekeeping stage 3006.

During the safekeeping stage 3006, the loan process smart contract instance may request a safekeeper to safekeep the collateral item and may instantiate an instance of a safekeeping smart contract 2032, which executes a safekeeping workflow. In embodiments, the tokenization platform 100 may assign a safekeeper to the safekeeping task, for example, based on the type of collateral item and/or the safekeeper's proximity to the collateral item. Once the safekeeper has confirmed receipt of the item, the safekeeper may generate a safekeeping report that indicates that the item is stored and notes any damage to the collateral item at the time it was received and inspected, as well as any supporting documentation that supports the safekeeping report. In embodiments, the safekeeping report and any supporting documentation may be written to a distributed ledger 2016. In some embodiments, the safekeeper may be required to stake an amount of currency/tokenized tokens equal or proportionate to an approximate value of the collateral item as a safeguard in case the item is lost or damaged during safekeeping (or may provide proof of insurance). In embodiments, the safekeeping smart contract instance may then provide a notification to the loan process smart contract instance indicating that the item has been safely stored in escrow, where the notification may include a hash value of the safekeeping report and any other supporting evidence and/or a block address to the safekeeping report and the supporting evidence. In response to the notification, the loan process smart contract may advance the loan process to a tokenization stage 3008.

During the tokenization stage 3008, the tokenization platform 100 (or another suitable component) may generate tokenize the collateral item. In embodiments, the tokenization platform 100 may generate a VIRL of the collateral item based on data that describes and/or depicts the collateral item, such as descriptions, images, videos, 2D scans, and/or 3D scans of the collateral item. In embodiments, the borrower, the safekeeper, and/or the authenticator may provide the data used to generate the VIRL. In embodiments, the tokenization platform 100 generates a collateral token of the item based on the VIRL of the collateral item. Once an item is tokenized, the tokenization platform 100 may write the token to the distributed ledger 2016 and may initially assign the ownership rights to the collateral token to the borrower (until a loan agreement is reached). Once the collateral item has been tokenized, the tokenization platform 100 may provide a notification to the loan process smart contract 2022 indicating the tokenization event and/or an address of the collateral token. Upon receiving notification of tokenization event, the loan process smart contract 2022 may advance the loan process to a pre-loan liquidation stage 3010.

During the pre-loan liquidation stage 3010, the loan process smart contract instance may instantiate an instance of a pre-loan liquidation smart contract. In embodiments, the pre-loan liquidation smart contract instance may provide a pre-loan liquidation request to a marketplace (e.g., marketplace system 102). In embodiments, the request may include the VIRL (or an indicator thereof, such as a VIRL ID or the like) and/or other documentation describing and/or showing the collateral item. In embodiments, the contingent sale request may include other suitable information, such as a contingent sale type (e.g., auction or set price sale), a location of the collateral item, a sought price for the collateral item (if a set price sale), a minimum price for the collateral item (if an auction), a length of the contingency (e.g., the amount of time that the borrower needs to secure and repay the loan), a reward offer (e.g., a predefine reward amount or a percentage of the purchase price, desired loan amount, or repayment amount), and/or the like. In response the marketplace can facilitate a contingent sale, which may result in the collateral item being sold (e.g., a contingent buyer buys the collateral item at a set price or wins an auction) with a set of contingencies or no sale. In embodiments, the pre-loan liquidation smart contract may receive the results of the contingent sale from the marketplace. Once the contingent sale is completed, the marketplace can send a sale notification to the liquidation smart contract instance indicating the results of the pre-loan liquidation event. In embodiments, the results of the pre-loan liquidation event indicate whether the item was sold, and if sold, a price at which the item was sold (minus any fees taken by the marketplace for hosting the sale). At this juncture, the pre-loan liquidation smart contract may provide a contingent sale notification to a borrower device 2002 of the borrower (assuming a pre-loan sale of the collateral item occurred) and the borrower may a) agree to the contingent sale to advance the loan process, b) refuse the contingent sale and end the loan process (e.g., if the sale was an auction and the agreed upon liquidation price was too low to secure a loan), or c) decide to complete the contingent sale and end the loan process. If the borrower agrees to complete the contingent sale, the pre-loan liquidation smart contract may initiate the transfer of the collateral token 2042 to the contingent buyer and the transfer of the proceeds of the sale to the buyer (e.g., a purchase amount in currency/tokenized tokens or fiat currency) minus any fees taken by the marketplace. In the event that the borrower agrees to the contingent sale, the pre-loan liquidation smart contract instance may lock the collateral item in an escrow account. Additionally, the pre-loan liquidation smart contract instance may escrow the proceeds of the sale from the contingent buyer (or a portion thereof) in an escrow account to ensure that the contingent buyer can pay the sale price should the loan go into default. The pre-loan liquidation smart contract instance may write a pre-loan liquidation event record to the distributed ledger and may issue a notification to the loan process smart contract instance that indicates that the conditional sale was completed and a pre-loan liquidation price of the collateral item. In response, the loan process smart contract instance may advance the loan process to a lending stage 3012.

During the lending stage 3012, the borrower may request a loan and/or may negotiate a loan with one or more lenders. Upon receiving confirmation that the lender and borrower have agreed to loan terms, the loan process smart contract 2022 may instantiate a loan smart contract 2034 in accordance with the agreed upon terms of the loan. In some embodiments, the tokenization platform 100 may provide a GUI to a borrower that allows the borrower to request a loan from one or more potential lenders and/or negotiate a loan agreement with the one or more lenders. It is appreciated that in some embodiments, the loan negotiation may be handled on-chain rather than via a centralized service, such as the tokenization platform 100. In embodiments, the borrower may request a loan amount that does not exceed the pre-loan liquidation sale value and a proposed loan term that indicates an amount of time to pay back the loan. In some of these embodiments, the tokenization platform 100 may generate a loan request that is presented to potential lenders via a GUI, whereby the loan request indicates the sought amount, the length of the loan, and information relating to the collateral item provided by the borrower (e.g., a VIRL of the collateral item, authentication reports, pre-sale liquidation reports, safekeeping reports, verification that the authentication, appraisal, and safekeepers have secured their respective tasks (as described above), and/or the like). In embodiments, the tokenization system 100 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the requested loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the tokenization platform 100 may provide a notification to the loan process smart contract instance indicating that a loan agreement has been agreed to by the borrower and a lender. In embodiments, the notification may include the details of the loan agreement including the terms of the loan agreement. In response, the loan process smart contract instance may instantiate a loan smart contract instance that executes a loan repayment workflow. Once a loan agreement is executed, the loan smart contract may lock the collateral token in an escrow account and may facilitate the transfer of the funds from an account of the lender to an account of the borrower. In embodiments, the loan agreement, records of any offers/counteroffers, and records relating to the escrowing of the collateral token and the transfer funds to the borrower may be written to a distributed ledger 2016. Once the loan process smart contract instance receives notification that the collateral token has been locked and the funds have been transferred, the loan process smart contract instance may advance the loan process to the repayment stage 3014.

During the repayment stage 3014, the loan smart contract instance may monitor the borrower's payment history to ensure that payments are made by the borrower to the lender (or an account that distributes payments to the lender) in accordance with a loan schedule and that the loan is not in a default condition. During the loan repayment stage, the borrower may remit payments. Each time a payment is made, the loan process smart contract instance may receive a payment notification indicating that a payment has been made and an amount of the payment. The loan smart contract instance may then determine whether the loan has been repaid in full. If the loan has not been paid in full, the loan smart contract instance may adjust the loan repayment amount and may perform additional operations, such as returning some of the staked funds from the authenticators and/or safekeeper to reflect the new loan repayment amount. If the loan smart contract instance determines that the loan repayment amount has been paid in full, the loan smart contract instance may send a repayment notification to the loan process smart contract instance indicating that the loan has been paid in full and may advance the loan process to the post-loan stage 2716. In embodiments, the repayment notification may include hash values of payment event records indicating that payments were made and the amount of the payments and/or addresses of the payment records on the distributed ledger 2016. Conversely, if the loan smart contract instance determines that the borrower defaulted, the loan smart contract may transmit a default notification to the loan process smart contract indicating that the loan is in default in accordance with the terms of the loan. In embodiments, the default notification may include hash values of a default event record indicating which payments were missed and the remaining balance on the loan and/or addresses of the default event record on the distributed ledger 2016. In response to receiving a default notification, the loan smart contract instance may provide a default notification to the loan process smart contract instance and/or the pre-loan liquidation event smart contract to initiate the transfer of the collateral token 2042 to the contingent buyer. Upon a default condition being determined, the loan process may advance to the post-loan stage 3016.

During the post-loan stage 3016, the collateral token 2042 is either returned to the owner if the loan has been fully paid or the collateral token 2042 is transferred to the contingent buyer pursuant to the possession contingency. In response to receiving a repayment notification that the loan has been repaid in full, the loan smart contract instance may initiate the transfer of the collateral token from the escrow account to an account of the borrower, who may then redeem the collateral token to obtain possession of the collateral item. Once the loan has been successfully repaid, the loan process smart contract instance may initiate the awarding of rewards to accounts of the authenticator, contingent buyer pursuant to the reward contingency, and safekeeper (e.g., from the funds that were paid back to the lender) in accordance with the terms set forth in the authentication smart contract, the pre-loan liquidation smart contract, and the safekeeping contract.

In the case of a default condition, the loan contract instance may provide a default notification to the loan process smart contract and the pre-loan liquidation smart contract. In response to receiving the default condition, the pre-loan liquidation smart contract may unlock the funds that were escrowed from the contingent buyer during the pre-loan liquidation event. The loan process smart contract instance may distribute the outstanding balance on the loan repayment amount to the lender (or a secondary lender if the loan was sold to a secondary lender) from the proceeds of the pre-loan liquidation event (e.g., the unlocked funds from the contingent buyer as well as any remaining balance owed by the contingent buyer). Upon confirming that the contingent buyer has no outstanding balance form the pre-liquidation sale, the pre-loan liquidation smart contract instance may unlock the collateral token 2042 from escrow and may transfer the collateral token 2042 to an account of the contingent buyer, who may then redeem the collateral token to take possession of the collateral item. Additionally, the loan process smart contract instance may initiate the awarding of rewards to accounts of the authenticators and safekeeper from the proceeds of the pre-loan liquidation event in accordance with the terms set forth in the authentication smart contract and the safekeeping contract. To the extent any balance remains, the remainder may be credited to the account of the borrower.

Once the loan process is complete, the loan process smart contract instance may notify the tokenization platform 100 that the loan process has been completed, and the tokenization platform 100 may run an analytics processes based on the completed loan process. In some embodiments, the results of the loan process may be used to update the ratings of one or more of the authenticators, the safekeeper, the contingent buyer, the lender, and/or the borrower.

It is appreciated that the foregoing is an example of a decentralized loan process workflow 3000 and that alternative workflows may be executed. Furthermore, the decentralized loan process workflow 3000 may include additional or alternative steps that were not explicitly discussed. It is noted that order of some of the stages of the loan process workflow 3000 may varied to achieve certain efficiencies. For example, if the collateral item is difficult to ship and/or is perishable, the safekeeping stage and tokenization stage may be performed prior to the authentication stage.

Crafting and Unboxing Collectible Tokens

In some embodiments, the tokenization platform 100 and/or mystery box system 806 may provide functionalities for automatically generating and deploying digital tokens that may be used as collectible tokens for trading, gaming, crafting, and the like. In these embodiments, the digital collectible tokens may be "minted" (e.g., generated and stored on blockchains or other distributed ledgers) programmatically such that they have various features/attributes that enable them to function as collectibles. For example, the tokenization platform 100 may mint a collection of baseball player trading cards, where each card corresponds to a particular professional baseball player with corresponding attributes (e.g., name, image, stats). In such embodiments, although each token may be unique (e.g., the token may be an NFT), it may follow a certain template, such that there may be multiple tokens corresponding to the same player, character, item, etc. In these embodiments, the use of templates and/or other data structures may enable the collectible tokens to be generated programmatically using recipes, and to be combined with other tokens using various crafting recipes to level up the collectible tokens, create new tokens, or the like, as described in more detail below.

Additionally or alternatively, the tokenization platform 100 may be configured to automatically generate collectible tokens that correspond to unique combinations of various attributes. For example, the tokenization platform 100 may mint a collection of unique character portraits, each of which may include a randomly-selected background, a randomly-selected hairstyle, randomly-selected clothing items, randomly-selected facial features, and the like. In these examples, although each digital token may have a unique combination of features, the individual features may be associated with multiple tokens (e.g., a first set of tokens may all share the same hairstyle, a different set may all share the same background, etc.). Here again, the use of reusable and combinable attributes enable the collectible tokens to be generated programmatically using recipes, and to be combined with other tokens using various crafting recipes.

In embodiments, the collectible token attributes may include mutable and/or immutable attributes. Mutable attributes refer to attributes of a digital token (e.g., an NFT, a tokenized token, a fungible token, or the like) that can be changed after the digital token has been minted, whereas immutable attributes refer to attributes of the digital token that cannot change once the token has been minted. Immutable attributes of a collectible NFT may include a token identifier, a schema identifier, a template identifier, a name of the NFT, a name of the NFT, a collection of the NFT, and/or the like. Mutable attributes of a collectible NFT may vary depending on the underlying subject matter of the NFT. It is appreciated that some of the immutable attributes of a collectible NFT may also vary depending on the underlying subject matter of the NFT. For example, in the case of the digital baseball cards, examples of mutable attributes may include the current season statistics of a player, a current team of the player, and the like. Examples of immutable attributes may include the name of the player, a token identifier, a mint number, a schema identifier, a collection identifier, a template identifier, historical statistics (e.g., statistics from previous seasons), and/or the like. In some embodiments, a collectible token may be configured so that immutable attributes may be added and/or mutable attributes may be converted to immutable attributes. For example, after a baseball season ends, a player's statistics for that season may be made immutable for a baseball player token, whereas an attribute containing the token's statistics for a current season may remain mutable. In this way, attributes associated with collectible tokens may be updated over time to reflect changes associated with the token. Furthermore, it is noted that a creator of the NFT may designate certain attributes as mutable or immutable. For example, in the case of a baseball card, the team of a player of the baseball-related NFT may be set as immutable attributes, such that even if a player is traded during the season, the team of the player cannot be changed after the token is minted.

Figure 31:
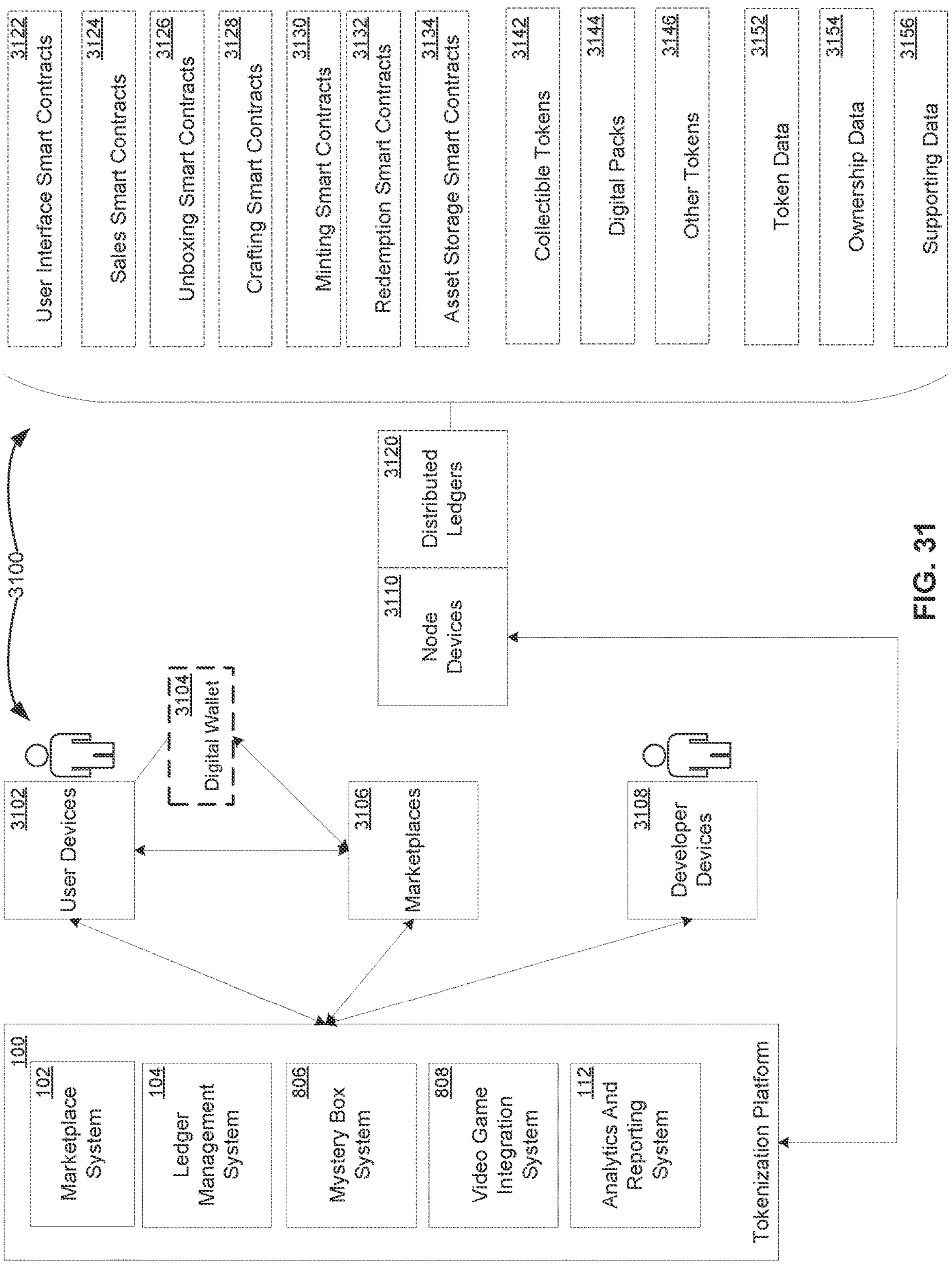
FIG. 31 is a schematic illustrating an example environment of a tokenization platform according to some embodiments of the present disclosure.

In addition to programmatically generating new collectible tokens with various attributes, the tokenization platform 100 and/or mystery box system 806 may be configured to provide mystery boxes that enhance the functionality and value of the collectible tokens. In some embodiments, the mystery box system 806 (e.g., as shown in FIGS. 8 and 31) is configured to provide mystery boxes that "contain" digital token-based trading cards (e.g., such that an unboxing smart contract may redeem the mystery box for a predefined number of digital token-based trading cards, as described in more detail below). In embodiments, digital token-based trading cards and other collectible tokens may be digital assets that are cryptographically linked with a fungible token or a non-fungible token. In embodiments, the mystery box itself may be a non-fungible token, such that the mystery box is a digital "pack" that may be "unpacked" or "unboxed". In some embodiments, a user may select a pack from their digital wallet and may, via a GUI of the digital wallet, select an option to unpack the mystery box (a digital pack in this example). In response, the mystery box system 806 (e.g., by executing a smart contract that wraps the mystery box or by executing other logic) may determine a set of digital token-based trading cards to assign to the user. In some embodiments, the mystery box system 806 may leverage a recipe (also referred to as an "unboxing recipe") associated with the mystery box to unpack the mystery box, as discussed above. In these examples, the mystery box system 806 may be configured to determine one or more token-based trading cards to assign to the user's account in accordance with a recipe and may assign the trading card to the account of the user on a corresponding distributed ledger.

In some embodiments, the mystery box system 806 may mint the one or more token-based trading cards or other collectible tokens in response to a user unboxing a digital pack. For purposes of explanation, use of the term "minting" a digital token may include initiating the minting by instructing a component of the tokenization platform 100 to mint a token. Additionally or alternatively, some or all of the winnable token-based trading cards or collectible tokens may be pre-minted, whereby pre-minted token-based trading cards or collectible tokens are minted before the digital packs are distributed. In these embodiments, the pre-minted token-based trading cards or collectible tokens may be minted by the mystery box system (e.g., by a minting smart contract or by another component of the tokenization platform) and may be assigned to an account (e.g., an account affiliated with the mystery box system, the seller of the trading card packs, or the like) on the distributed ledger. Upon unpacking the digital trading card pack (e.g., in accordance with the unpacking recipe of the digital trading card pack), the mystery box system 806 may assign the digital trading cards (e.g., NFTs) to an accounting user the unpacking user, such that the digital trading cards may be accessed by the unpacking user via their digital wallet.

In some of these embodiments, one or more of the winnable digital token-based trading cards or collectible tokens may be cryptographically linked with a virtual representation of a real-world item, such that the digital token may be redeemed for the real-world item. Linking, redemption and other capabilities may be provided to each trading card in various forms described in embodiments referencing VIRLs, tokenized tokens, and the like as described throughout this disclosure and the documents incorporated by reference herein. For instance, some or all of the winnable digital token-based trading cards or collectible tokens may be redeemable for a physical item, such as a piece of sports or entertainment memorabilia, a collectible figurine, an article of clothing (e.g., shoes, hat, shirt, etc.), jewelry, a piece of tangible art, a toy, a spirit (e.g., a whiskey release, a wine release, a tequila release, etc.), and/or the like. Additionally or alternatively, some or all of the winnable digital token-based trading cards or collectible tokens may be redeemable for a service, such as access to an event (e.g., a VIP event, a ticketed event, etc.), access to additional areas at an event (e.g., a premium lounge), access to special services at an event (e.g., early entrance into an event, premium seating, free drinks or food items at an event, an open bar, etc.), and any other services. In some of these embodiments, the redeemable goods and/or services may be time-limited such that they may only be accessed during a certain period of time. In some of these embodiments, a redeemable token-based trading card may include a smart contract that defines the manner by which the item may be redeemed. For instance, in some embodiments, the smart contract of a redeemable token-based trading card may include conditional logic that allows the token-based trading card to be redeemed by the token holder during a redemption period (e.g., on or after a first date and/or on or before a second date). In this example, an owner of a redeemable token-based trading card may redeem the token-based trading card during the redemption period or may transfer (e.g., sell) the trading card prior to or during the redemption period to another user, such that the other user may redeem the token-based trading card during the redemption period (or may transfer the trading card to yet another user). In such embodiments, the redemption rights to the physical item may expire after the redemption period. In some of these embodiments, the digital token-based trading card may still be accessible by the owner thereof after the redemption rights are exhausted (e.g., as a result of redemption or expiration of the redemption period). Furthermore, the trading card may be transferrable or non-transferrable after the redemption rights are exhausted. Thus, a digital token-based trading card (or token itself), may comprise a set of redemption rights (optionally of limited duration and optionally involving redemption for a physical item) as well as a set of other rights (such as rights to display, transfer, or otherwise use the digital token or token-based trading card) (which may persist indefinitely or may have duration different than the redemption period for the physical item). In embodiments, setting an expiration date on the right to redeem for a physical item may solve significant problems, such as the need to store physical items in escrow, to maintain them in good condition, to authenticate their possession and condition, and the like. In embodiments, one or more systems for supporting commerce in token-based trading cards that are linked to physical items (e.g., VIRLs as described herein and in the documents incorporated herein by reference) may include, link to, incorporate, communicate with, or integrate with the digital token or token-based trading cards and/or the system or systems that design, mint, deploy and manage them; for example, such other systems may include, in embodiments, systems for escrow of physical items, systems for authentication of physical items, logistics and transportation systems, storage management systems, and the like. In each case, such systems may communicate with the system(s) that handle the digital token or token-based item to understand the current redemption status of an item (e.g., whether it is eligible or expired, whether it has already been redeemed, and the like).

In some embodiments, the redemption rights to a physical item may be conveyed in a separate token that accompanies the digital token-based trading card. For example, if an unpacking user is awarded a redemption right to a real-world item that corresponds to a digital-based trading card won by the user, the user's account may be assigned the digital token-based trading card and a second redeemable token (e.g., a fungible token or an NFT that may be referred to as a "redemption token") that is cryptographically linked with the virtual representation of the physical item, such that the token holder of the redemption token may redeem the redemption token to take possession of the physical item. In embodiments, the transferability of the redemption token may be managed by a smart contract. For instance, in some embodiments, a smart contract that wraps the redemption token may require that the redemption token be transferred only with the corresponding digital token-based trading card, such that the redemption right to the physical item cannot be bifurcated from the digital token-based trading card. In another example, the smart contract that wraps the redemption token may allow the redemption token to be transferred to another account without any restrictions relating to the digital token-based trading card, such that the winner of the digital token-based trading card may transfer either the digital token-based trading card or the redemption token to another user independently. In embodiments, a redemption token may be destroyed (e.g., burnt) upon the redemption token being redeemed, such that the redemption token can no longer be traded or redeemed. In this way, the redeeming user (or a transferee of the corresponding digital token-based trading card) may keep the digital token-based trading card after the redemption of the corresponding redemption token. In some embodiments, the redemption token may be minted and conveyed to a user that owns a digital token-based trading card (or another token conveying a redemption right) at the time that the digital token-based trading card is minted and conveyed to the user. In other words, the redemption token and the digital token may be minted at the same time (e.g., when the digital token-based trading card is unboxed), and either kept together (e.g. as enforced by a smart contract) or conveyed separately. Additionally or alternatively, a redemption token may be minted and/or conveyed to an owner of the digital token-based trading card when a redemption period opens. In these embodiments, it may be possible for a digital token-based trading card to change hands (e.g., be transferred between wallets) once or more times before a redemption period opens, and at the time a redemption period opens, a smart contract may mint and convey a redemption token only to the current owner (e.g., not to the past owners of the digital token-based trading card).

In some embodiments, the mystery box system 806 supports a distributed digital ecosystem for minting, trading, and crafting non-fungible token-backed digital assets. In some embodiments, the NFT-backed digital assets include digital trading cards (or "cards") or other collectible tokens and packs of digital trading cards (which may be mystery boxes) or other digital packs. In embodiments, the ecosystem is supported by a set of smart contracts that are collectively configured to perform certain ledger-based operations such as creating new NFTs and assigning the NFTs to an account (e.g., blockchain address and/or digital wallet) of a respective owner of the NFT; unboxing a pack of cards and assigning the "unboxed" cards to an account the respective owner of the pack of cards; and "crafting" a new NFT from two or more tokens (e.g., NFTs and/or fungible tokens) owned by a respective user according to a "crafting recipe" and assigning the new crafted card to the account of the user. Each pack or card may be represented by a respective NFT (which may have a unique ID and a mint number associated therewith) and may have an associated sticker or other media asset that designates the type of card. It is appreciated that multiple cards may be of the same type, but nevertheless are backed by different NFTs. Furthermore, in embodiments, the cards may be organized according into levels according to a predetermined hierarchy (e.g., Build/level 0 cards (lowest level), level 1 cards, level 2 cards, level 3 cards . . . , level N cards), whereby the users may craft higher level cards according to a set of rules defined in a respective crafting recipe that defines which cards may be combined to obtain the newer higher-level cards. In some embodiments, within a level of cards there may be different types of cards within that level and each card may have a relative rarity (e.g., some cards might be rarer than others). In some embodiments, the rarity of respective cards are controlled by the logic with which a respective smart contract is configured with. For example, there may be four different types of level-1 cards, whereby each type of level-1 card may have a respective probability assigned thereto. When the smart contract is generating a card for that level, the smart contract may be configured to generate a random number and may determine which type of card to generate based on the random number and the probabilities. In some of these embodiments, the smart contract may be configured with rules that assign each type of card to a different "bucket" and, for each respective bucket, assign a non-overlapping range of numbers to the respective bucket. For example, the types of cards and their associated probabilities may be: Collector's Card with a 1% probability of being generated, Action Card with a 5% probability, Weld Card with a 10% probability, Battle Card with 15% probability, Foil Card with a 25% probability, and Base Card with a 44% probability. In this example, the range of the Collector's card bucket may be 0-0; the range of the Action Card may be 1-5; the range of the Weld Card may be 6-15; the range of the Battle Card may be 16-30; the range of the Foil Card may be 31-55; and the range of the Base card may be 56-99. In this example, the smart contract may be configured to generate a new card for the user (assuming other conditions are met to generate the card are met) by generating a random number, N, and calculating N modulo 100 to determine which type of card to generate. For example, if the random number is 10000, the user will be generated a Collectors card, whereas if the random number is 10099, the user will be generated and assigned a Base Card. As can be appreciated, cards having lower probabilities will be rarer than cards having higher probabilities. In embodiments, the manner by which certain cards of a collection are generated is defined in a respective "recipe". In embodiments, a recipe may be embodied as computer readable instructions that are executed by the smart contract, whereby each recipe defines a set of conditions that must be satisfied before one or more new cards are generated and the manner by which the new cards are generated (e.g., the types of cards that can be generated and, in some cases, the probabilities associated with each type of card, and/or the like).

In embodiments, a "collection" of collectible tokens (e.g., cards) and digital packs may refer to the entire set of tokens that can be generated for a specific theme. For example, a collection of cards may be defined for a release of a video game (e.g., Street Fighter V®), a movie (Star Wars®), a tv series (e.g., Star Trek®), a band (e.g., Phish®), a sports league (e.g., NBA), or the like. When configuring a collection, the configuring user may define the smart contracts, NFTs, and other components of the ecosystem in accordance with a protocol (or a set of layered and/or interoperable protocols). For example, in some embodiments, the configuring user may define the ecosystem in accordance with an NFT protocol that governs the generation and management of NFTs. In embodiments, the user defines a hierarchal set of schemas that define a hierarchy of the collection. In an example, a configuring user may be defining an ecosystem for generating cards that represent characters of an upcoming video game release (or any other suitable promotion). In this example, the schema of a collection may define a set of attributes of the collection, such as a promotion name (e.g., Street Fighter), a promotion owner (e.g., Capcom), types of Packs (e.g., Standard and Ultimate), and Cards (e.g., all the different types of cards that may be generated).

Figure 36:
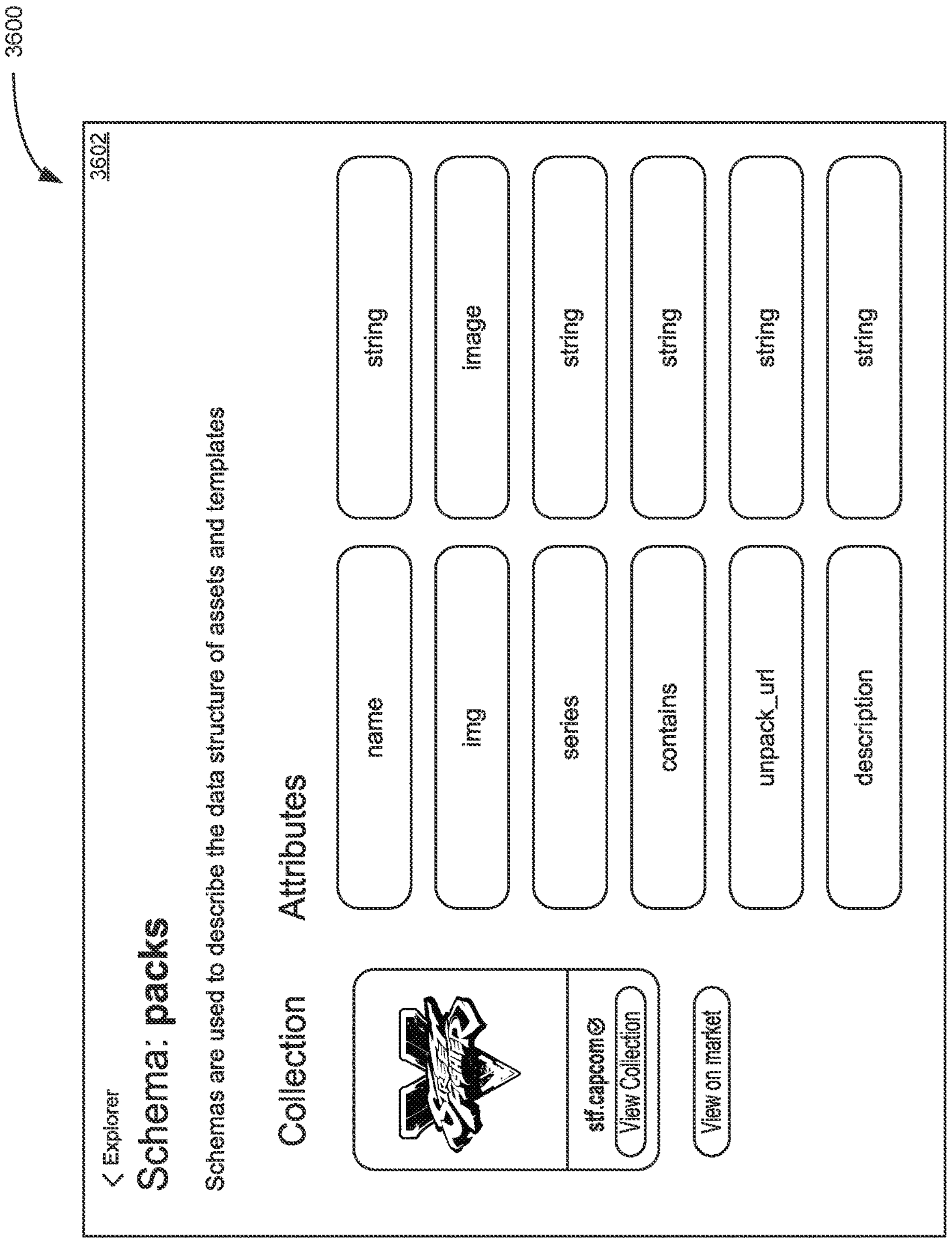
FIG. 36 is a schematic illustrating an example schema for minting tokens according to some embodiments of the present disclosure.
Figure 38:
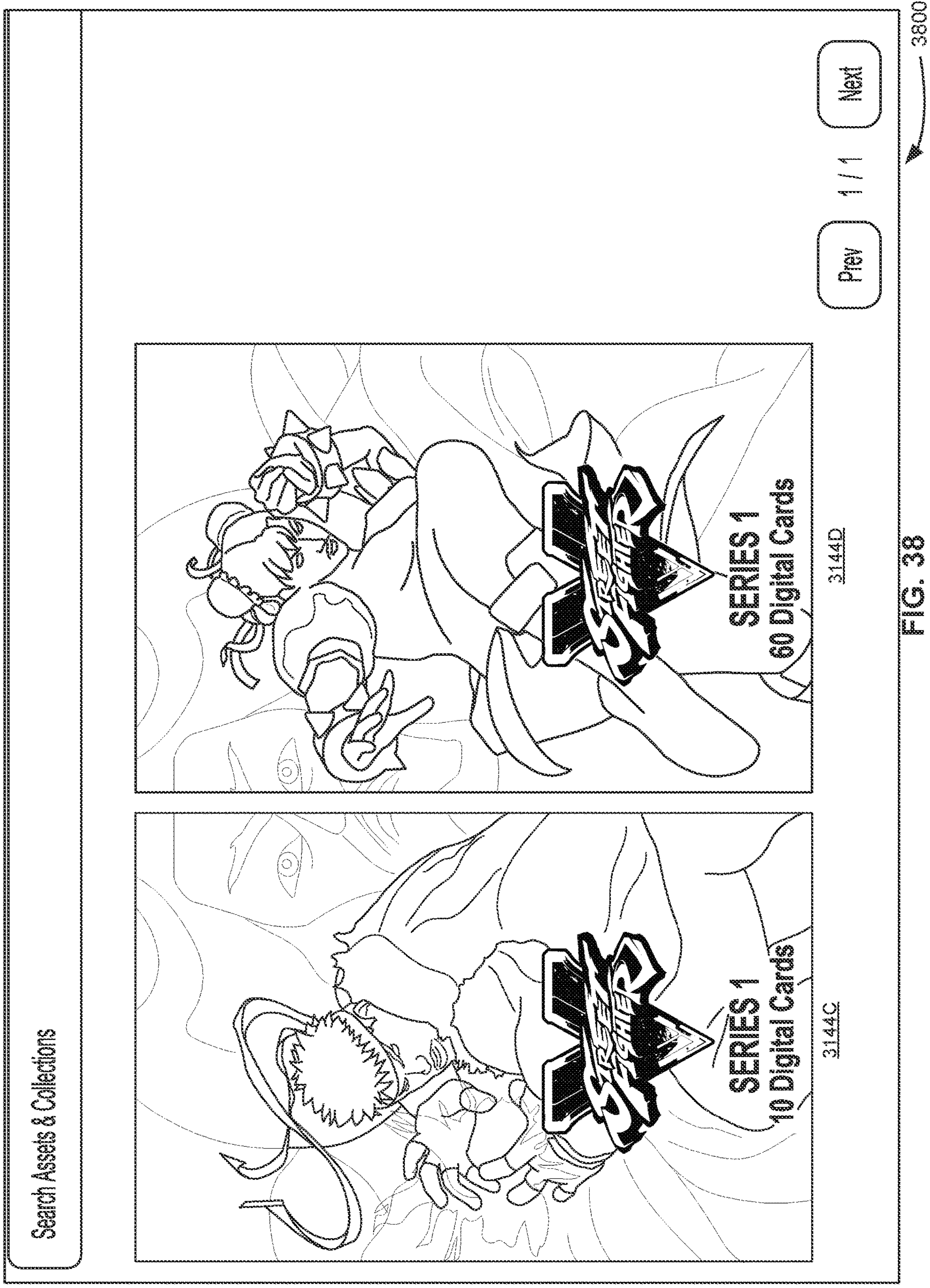
FIG. 38 is a schematic illustrating example digital pack tokens according to some embodiments of the present disclosure.
Figure 39:
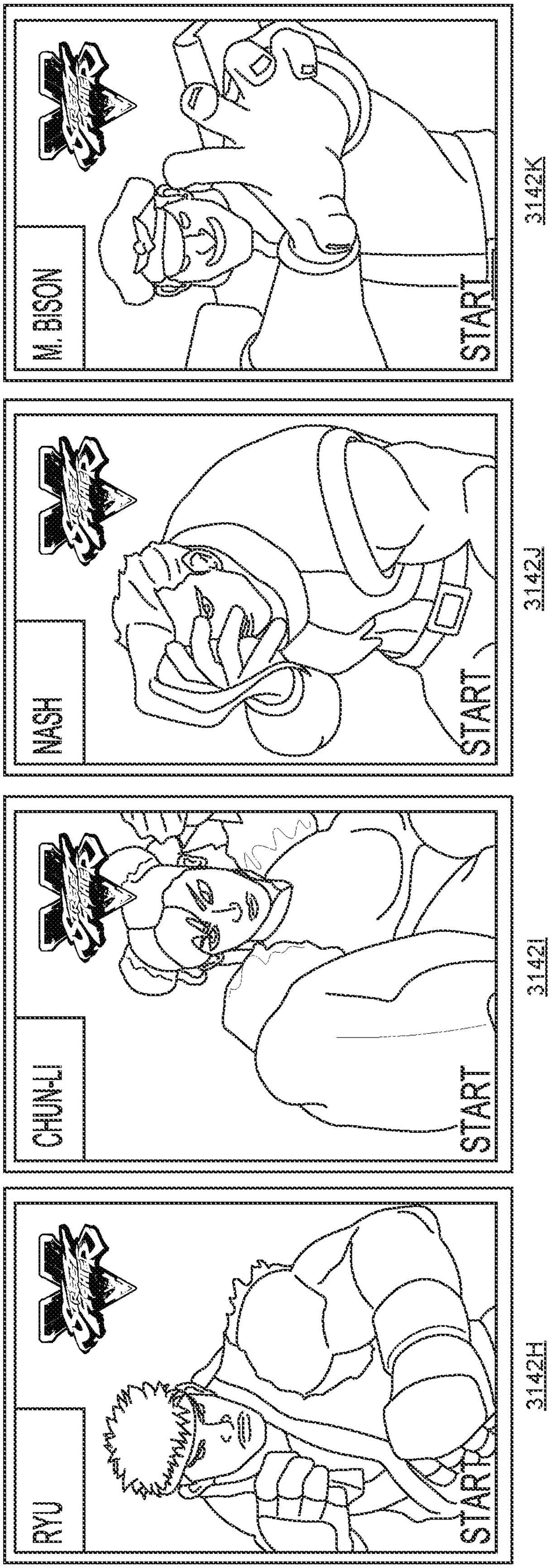
FIG. 39 is a schematic illustrating example collectible tokens according to some embodiments of the present disclosure.

In embodiments, each type of pack may have a schema that defines the attributes of the pack. FIG. 38 illustrates a screen shot of an example of different types of packs that may be purchased by users (e.g., a standard pack "containing" ten cards and an Ultimate pack "containing" 60 cards) with respect to a particular collection. FIG. 36 illustrates an example schema of a pack, whereby a configuring user can define a name of the pack, an image that is associated with the pack (e.g., the images shown in FIG. 38), a series of the pack, a number of cards in each pack, a description of the pack, and/or other suitable attributes (e.g., default attributes such as a unique ID of each pack, a mint number of each instance of a pack, an owner of each instance of a pack, and the like). Similarly, the configuring user may configure a schema that applies to the different cards that are offered in a collection and defines the attributes of the cards. In some embodiments, the attributes of cards may include a name of the card, an image that is depicted in the card, a subject of the card (e.g., a character or a set of all the characters), a level of the card, the level-specific type of the card, a description of the card, and/or other suitable attributes (e.g., default attributes such as a unique ID of the card, a mint number of each instance of the card, an owner of the card, and the like). FIG. 39 illustrates graphical depictions of example rendered cards showing different characters. In this example, the cards are "build" level cards. As will be discussed, a trading card collection may be configured such that when a user initially buys and "unboxes" a pack of cards, only build level cards can be generated from an unboxing. Furthermore, as a redeeming user collects more cards, the redeeming user can "craft" higher level cards when the user has an adequate combination of cards. For example, a user may craft a level 1 Ryu (a character) card if the user has two Ryu Build cards. As will be discussed, when a new card is crafted, the cards that were "traded in" are burnt (e.g., by burning the underlying NFT), thereby removing the traded in cards from the collection and ecosystem.

Figure 37:
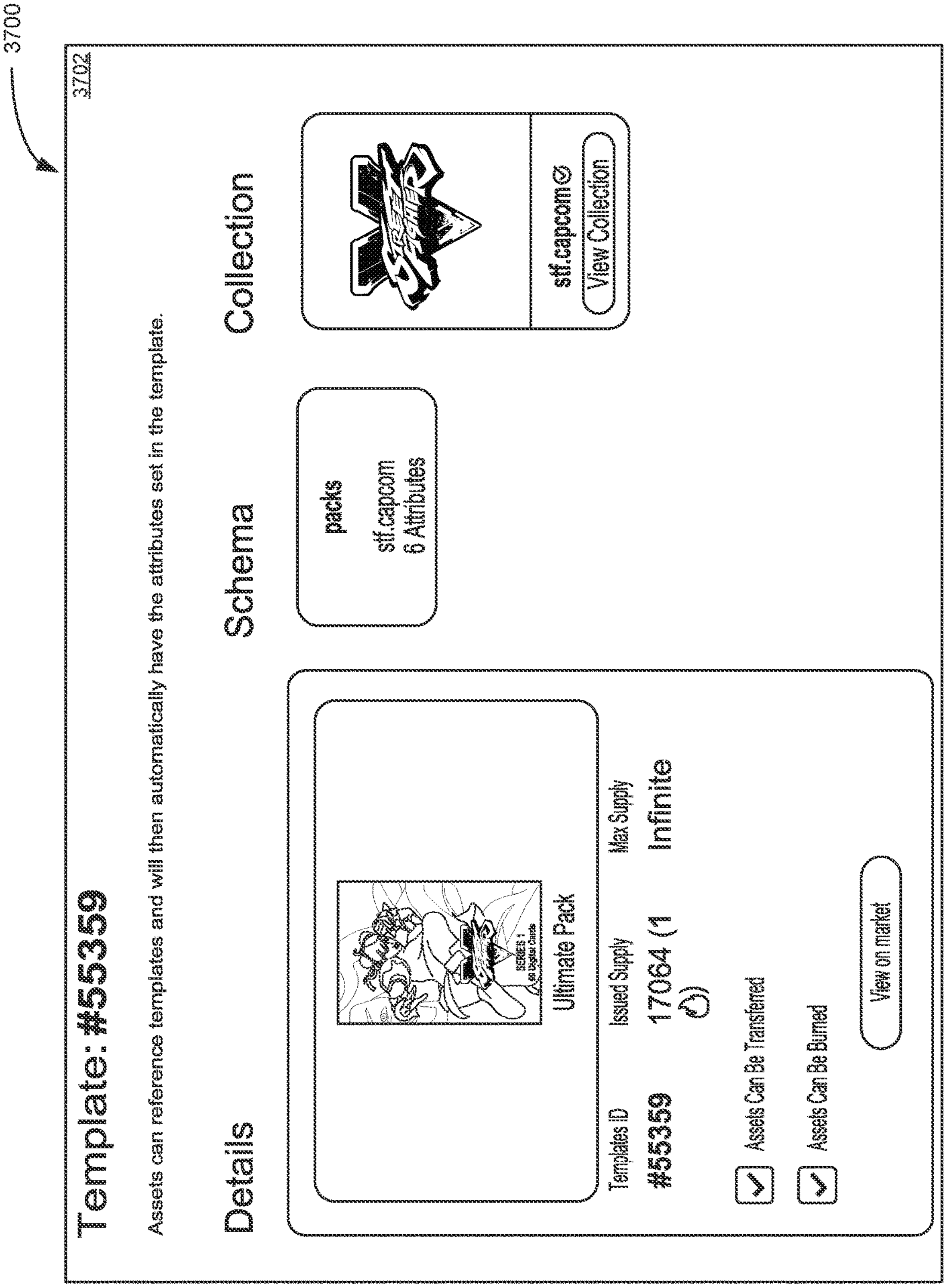
FIG. 37 is a schematic illustrating an example template for minting tokens according to some embodiments of the present disclosure.

In embodiments, the configuring user defines a set of templates that are used in connection with a collection. Examples of templates may include a "pack" template and a card "template". In embodiments, a template is used (e.g., by a smart contract) to generate a respective instance of a particular type of pack or card. In embodiments, a template may include a unique ID that references the template and may reference the schema that corresponds to the template. FIG. 37 illustrates a graphical depiction of a template that is used to generate "Ultimate" packs. In this example, the template references the schema (e.g., stf. capcom) of an Ultimate pack, the collection to which the schema belongs (e.g., Street Fighter V), a template ID of the template, a maximum supply (e.g., infinite), a number of instances that have been generated (e.g., 17064), and a set of rules that apply to the instances (e.g., Ultimate packs can be transferred and burned). Similarly, a card template may reference the schema that is used for a particular card or set of cards, the collection to which the card belongs, a template ID of the template used to generate a card, a set of rules that apply to the instances of the cards, and the like.

Referring to FIG. 31, the tokenization platform 100 may include a mystery box system 806 (as also shown above at FIG. 8) for deploying and implementing the minting, crafting, unboxing/unpacking, and other related functionalities (either alone or in conjunction with various smart contracts). Additionally or alternatively, the mystery box system 806 and/or ledger management system 104 of the tokenization platform 100 may further provide functionality to interact with developer devices 3108 to easily configure and deploy various collections of tokens (e.g., NFT trading cards, NFT gaming cards, and the like) and to configure various smart contracts that provide functionality for minting the tokens, storing the tokens on a blockchain or other distributed ledger 3120, selling the tokens, trading the tokens, unboxing/unpacking the tokens, crafting using the tokens, redeeming the tokens, and the like. In some cases, the mystery box system 806 and ledger management system 104 may work together to configure the various smart contracts. For example, the mystery box system 806 may receive configuration information from developer devices 3108, reformat the configuration information, and/or generate configured smart contracts based on the configuration information, and the ledger management system 104 may then communicate with node devices 3110 to cause one or more transactions that upload the configured smart contracts to the distributed ledgers 3120 and/or configure pre-existing smart contracts on the distributed ledger 3120 using the configuration information. These and other functionalities are described in more detail below.

In some embodiments, the mystery box system 806 may provide one or more user interfaces that allow developer devices 3108 to easily provide configuration information to the mystery box system 806. Additionally or alternatively, the mystery box system 806 may configure and/or deploy user interfaces that allow user devices 3102 to purchase the configured tokens, view the user's tokens, unbox/unpack digital pack tokens to obtain individual collectible tokens, craft tokens by combining one or more tokens to yield a new token, sell or trade their tokens, redeem their tokens for real-world items, and the like. In other words, the mystery box system 806 may implement a collectible token ecosystem that allows for trading, unboxing/unpacking, crafting, redemption, and other such mechanics.

The systems and methods described herein provide a novel technological solution for enhancing digital collector ecosystems. In comparison to the digital collectible system described herein, physical trading cards or other collectibles suffer from several drawbacks. For example, physical trading cards may be difficult to purchase and maintain in pristine condition, purchasers may have difficulty identifying and obtaining certain highly-desirable (e.g., rare, special-edition, etc.) collectibles, purchasers may not know whether packs (e.g., of trading cards) may or may not contain certain desirable collectibles. All of these issues make collectibles difficult to obtain and trade, and thereby reduce their value. Additionally, collectors of physical collectibles may be suspicious that a creator of collectibles will be tempted to create and sell more of the most valuable collectibles, thereby diluting the value of the collectibles already owned by collectors. Furthermore, physical trading cards do not update over time (e.g., attributes cannot be added), and do not have mutable attributes.

The systems and techniques described herein improve the state of art for digital collectible tokens by allowing users to maintain their tokens in digital form on distributed ledgers (which provides transparency and prevents damage or destruction), and allows for updating attributes, such as mutable attributes, in order to provide for dynamic collectible tokens, tokens that may be used an in-game items, and the like. Systems and techniques described herein further enable users to see which types of collectibles are rare and hence more valuable, enable users to view unboxing recipes that may reveal the precise odds of obtaining a particular desired collectible when they open a digital pack, allow users to programmatically level up or exchange their collectibles for other collectibles using crafting recipes (thereby increasing the functionality and utility, and hence value, of the collectibles), and allow users to view supply data, such as the maximum number of collectibles that be created, the currently-issued supply, and the like.

The systems and methods described herein further provide benefits that are unique to blockchain or other distributed ledger collections. Blockchain-based collections have the benefit that cards can be minted dynamically on demand (e.g., when a user purchases one, generates one using a crafting or unboxing recipe, etc.). For example, the collectible that a player obtains when they unbox a digital pack may be generated at the time of unboxing based on mathematical probabilities. This fact may be leveraged to ensure greater fairness by guaranteeing a certain probability that every user who unboxes a digital pack has an equal shot at obtaining rare or valuable cards, and/or to drive the value of digital packs higher by implementing dynamic odds that a player obtains a certain desired collectible based on issued supply data.

Additionally, the systems and methods described herein solve problems that may be unique to blockchain or distributed ledger collections. In particular, the use of dynamic minting may lead to problems that are solved by the techniques and systems described herein. For example, blockchain collections may have a unique "mint number" that is assigned to collector cards when they are generated, with cards that are generated earlier having lower mint numbers. Collectors tend to assign a great deal of value to a card's mint number, such that cards with low mint numbers may be much more valuable. This phenomenon may lead to problems when dynamic generation/minting of cards is combined with unboxing or crafting mechanics, as it may create a "race" to be the first to unbox a certain type of card or craft a certain type of card in order to obtain a low mint number. This effect may lead to player abuse, such as the use of bots or automated scripts to win the race, with ordinary collectors unable to obtain the most valuable cards. It may also generate a rush of transactions shortly after new types of cards are issued or new functionality is enabled, which may choke up a distributed ledger with a surfeit of transactions, thereby blocking or delaying other activity that takes place on the same distributed ledger.

In some embodiments, systems and techniques described herein solve these problems by combining probabilistic techniques, such as the use of weights or probabilities to fairly assign cards at the time of unboxing or crafting, with pre-minting techniques. Pre-minting techniques may include generating trading cards or other collector's items in advance and assigning mint numbers to each. These preminted cards, if available, may be randomly selected at the time of "minting" to remove the incentive to race to be the first to use an unboxing or crafting recipe. These techniques beneficially improve the functioning of blockchains or other distributed ledgers at least because they reduce the spikes of traffic that result from these races, thereby balancing the demand placed on the devices that host the distributed ledger and/or the smart contracts that facilitate the unboxing of a particular set of digital trading cards. These and many other improvements are provided by the system and techniques as described herein.

Additionally, the systems and methods described herein may beneficially reduce the duplication of data stored on blockchains or other distributed ledgers by using templates and schemas to store redundant data for token collections. By storing such data in templates and schemas, the amount of data stored on a blockchain may be reduced, thereby conserving resources, reducing transaction fees, improving the speed of reconstructing blockchain state, reducing the size of databases maintained used by node devices 3110, and the like. At the same time, such reduced data storage improves the ability of a token collection to support a large number of tokens, thus enabling larger and more complex token collections and associated functionalities, such as crafting, unboxing, game functionality, and the like.

The tokenization platform 100 may communicate and interact with user devices 3102, which may include any device used by any user that buys, collects, unboxes, crafts, redeems, or otherwise interacts with the tokens as described herein. The user devices 3102 may be the same devices as the user devices 190 described elsewhere throughout this specification. In some embodiments, a user device may have access to a digital wallet 3104, which may be used to store a user's tokens. The digital wallet may be the same as the digital wallet shown in FIG. 8 and described elsewhere throughout this specification or may be any other suitable wallet. A digital wallet 3104 may be implemented on a corresponding user device 3102, or may be implemented by another device. In some embodiments, the digital wallet may be a cloud wallet implemented by the tokenization platform 100. Alternatively, the digital wallet may be a "cold" wallet that is stored locally at a device associated with the user.

In some embodiments, marketplaces 3106 may be used to buy, sell, and/or trade tokens with other users. For example, marketplaces 3106 may allow users to list their tokens for sale, hold auctions, take bids on their tokens, swap tokens with other users, and/or the like. Additionally or alternatively, such marketplace functionality may be provided by the marketplace system 102 of the tokenization platform 100.

In embodiments, developers may use developer devices 3108 to communicate with and interact with the tokenization platform 100. Developers may generate configuration information for the deployment of token collections, such as by creating templates and schemas for the generation/minting of tokens, creating pre-minting instructions for generating tokens ahead of time, generating user interface configurations that configure websites or other user interfaces usable by users to buy, sell, trade, unbox, or otherwise interact with the tokens, generating rules and recipes for unboxing tokens or crafting new tokens, generating redemption rules and recipes that may allow trading certain tokens for real world items, and the like. In some embodiments, the developer devices 3108 may generate these configurations and transmit them to the tokenization platform 100 (e.g., using software running at least partially on the developer devices 3108). Additionally or alternatively, the developer devices 3108 may interact with the tokenization platform 100 to generate these configurations (e.g., by entering information into a user interface provided at least partially by the tokenization platform 100).

In embodiments, the tokenization platform 100 may connect (directly or indirectly) with one or more node devices 3110, which may be used to read data from the distributed ledgers 3120 and/or write data to the distributed ledgers 3120 (e.g., using one or more blockchain transactions). The distributed ledgers 3120 may store a plurality of smart contracts, tokens, event records, and other data that may be used to implement the minting, crafting, unboxing, redemption, and other features in relation to the trading cards and other collectible tokens, as described in more detail below. In embodiments, the smart contracts may be hosted on the distributed ledgers 3120 by the tokenization platform 100, which may communicate with the node devices 3110 in order to cause distributed ledger transactions that store and/or update the various smart contracts. Non-limiting examples of smart contracts that may be deployed to a distributed ledger in support of a token-based collection may include: one or more user interface smart contracts 3122 for configuring a user interface that user devices 3102 may access to interact with a particular token collection; one or more sales smart contracts 3124 that may be configured to offer tokens for sale and transfer purchased tokens to a user's wallet; one or more unboxing smart contracts 3126 that may be used to unbox digital packs or mystery boxes (e.g., by swapping a digital pack token for a plurality of collectible tokens); one or more crafting smart contracts 3128 that may be used to craft new collectible tokens (e.g., by exchanging a first set of collectible tokens for a second set of collectible tokens according to a crafting recipe); one or more minting smart contracts 3130 for pre-minting and/or dynamically minting tokens; one or more redemption smart contracts 3132 for redeeming tokens (e.g., VIRLs) for real-life items; and/or one or more asset storage smart contracts 3134 for storing token information on the distributed ledgers 3120. In some embodiments, different token collections may be linked to different smart contracts; for example, a first token collection may use a first minting smart contract 3130 to mint the tokens, store the first token collection in a first asset storage smart contract 3134, use a first unboxing smart contract 3126 to implement mystery boxes and/or digital packs for the first token collection, etc., whereas a second token collection may use a second minting smart contract 3130, a second asset storage smart contract 3134, a second unboxing smart contract 3126, etc., to implement the same or similar functionality. Additionally or alternatively, each of the smart contracts may be configured to work with multiple token collections, such that a single minting smart contract 3130, for example, may be configured to mint tokens for multiple different token collections. Accordingly, as will be described in more detail below, each of the smart contracts may have configuration functions that may be used to configure the smart contract to work with additional token collections. Additionally or alternatively, although the various functions described herein are ascribed to separate smart contracts, a single smart contract is capable of implementing multiple functions, and thus the various functions described herein may be performed by a single smart contract or multiple separate smart contracts. In these implementations, the single smart contract may perform the functions described with respect to the collection of smart contracts indicated above.

The tokenization platform 100 may further cause the distributed ledgers 3120 to store various tokens, such as collectible tokens 3142 (e.g., tokens that represent trading cards or other collectibles), digital packs 3144 (e.g., tokens that implement mystery boxes/trading card packs or the like), and/or other tokens 3146 such as currency tokens or other fungible tokens, redemption tokens, etc. as described elsewhere herein. Although in some embodiments, the collectible tokens 3142 and/or digital packs 3144 may be stored in asset storage smart contracts 3134, they may also be stored separately within the distributed ledgers as shown in FIG. 31. The tokenization platform may further cause the distributed ledgers 3120 to store various supporting data, such as token data 3152 (e.g., template/schema data and the like), ownership data 3154 (e.g., an account associated with a token), and other supporting data 3156 for implementing the features described herein. Again, such data may also be stored in smart contracts, such as an asset storage smart contract 3134.

In embodiments, an analytics and reporting system 112 of the tokenization platform 100 may be configured to provide analytics data concerning tokens that are minted, sold, unboxed, crafted, redeemed, or otherwise used as described herein. The analytics data may be reviewed by developers to determine how the token collections they developed are being used, may be reviewed by users to determine what types of tokens are available to obtain via sale, unboxing, crafting, or trading, and the like. Additionally or alternatively, the analytics and reporting system 112 may make analytics data available to any of the smart contracts described herein, which may use the analytics data to modify certain operations as described herein. In these embodiments, the analytics and reporting system 112 may store the analytics data in a smart contract that may be accessed by other smart contracts (e.g., the asset storage smart contract 3134).

The analytics and reporting system 112 may generate various analytics and statistical data measuring the usage of tokens for a given token collection. For example, the analytics and reporting system 112 may calculate supply data for tokens (e.g., how many have been issued, how much supply is left), popularity data for tokens (e.g., how frequently users purchase and trade certain tokens), value data for tokens (e.g., how much tokens sell for on marketplaces 3106). The analytics and reporting system may also generate probability data that may measure the likelihood of obtaining a particular token using an unboxing recipe or a crafting recipe. In embodiments, the likelihoods may be dynamic based on the amount of issued or available supply, in which case the analytics and reporting system 112 may compute adjusted probabilities based on supply data. Furthermore, the analytics and reporting system 112 may maintain data on the current status of tokens, such as how many and what types of digital packs have been unboxed, how many and what types of tokens have been burned, how many and what types of tokens have been "levelled up" or otherwise used in crafting recipes, whether tokens of certain mint numbers are available or not, and the like.

The analytics and reporting system 112 may obtain the data to generate analytics by reading logs of tokens minted by minting smart contracts 3130, crafted by crafting smart contracts 3128, unboxed by unboxing smart contracts 3126, sold by sales smart contracts 3124, redeemed by redemption smart contracts 3132, by reading ownership information and other token data from asset storage smart contracts 3134, by monitoring sales or trades that take place via marketplaces 3106, and the like, as described in more detail below.

In embodiments, a configuring user may define a set of smart contracts that perform different functions. In some embodiments, the set of smart contracts may include at least a minting smart contract 3130, an unboxing smart contract 3126, and a crafting smart contract 3128. In embodiments, the minting smart contract 3130 may be configured to mint NFTs. In some of these embodiments, the minting smart contract 3130 may receive a template (or a set of attributes) and generate an NFT in accordance with the defined attributes. For example, the minting smart contract 3130 may be configured to generate NFTs that represent instances of respective types of packs and NFTs that represent instances of respective types of cards. In some embodiments, the minting smart contract 3130 is a standard minting smart contract as defined in a protocol that governs the ecosystem (e.g., an NFT standards protocol). A minting smart contract 3130 may be called in response to a user purchasing a new pack, a user unboxing a pack (for each card in the pack), and a user crafting a new card (or multiple times if multiple cards). In each of these scenarios, the minting smart contract 3130 is called but with a different set of parameters that indicate the type of NFT that is generated. In the first scenario, the minting smart contract generates instances of packs (e.g., standard 10 card pack or ultimate 60 card pack). In the other two scenarios, the minting smart contract generates instances of cards, whereby the type of the card (e.g., level, subject, and rarity) that is minted may differ based on the conditions that triggered the minting function. Additionally or alternatively, a minting smart contract 3130 may be called to pre-mint a set of NFTs that will be released at a future time.

Figure 32:
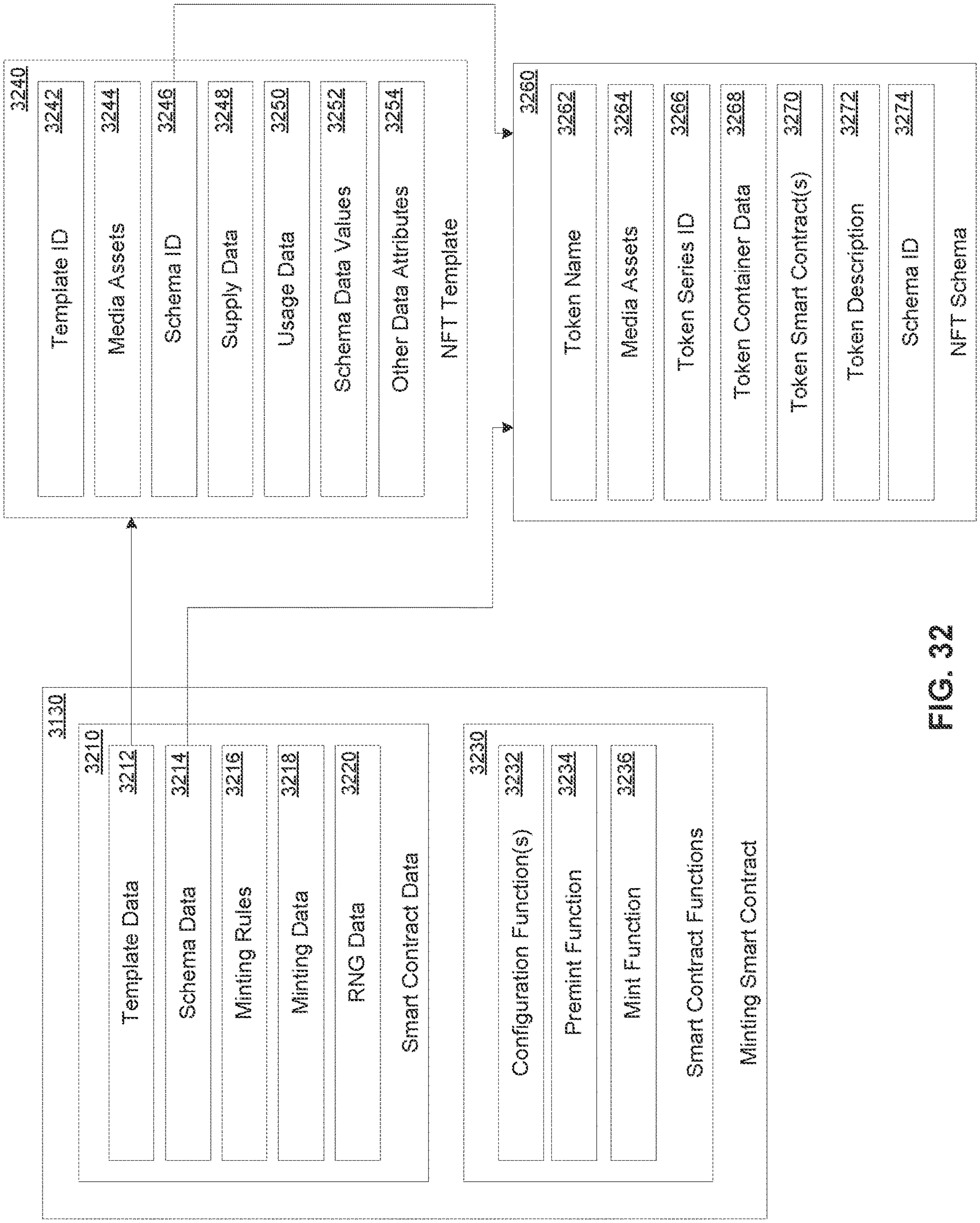
FIG. 32 is a schematic illustrating an example smart contract, template, and schema for minting tokens according to some embodiments of the present disclosure.

FIG. 32 illustrates certain exemplary details of a minting smart contract 3130, including data and functions, and example template and schema data structures, which may be used to mint tokens as described herein. The minting smart contract may store smart contract data 3210 that may be used by smart contract functions 3230 of the minting smart contract to mint or pre-mint tokens. Additionally, the minting smart contract 3130 may include one or more configuration functions 3232, which may be used to add, read, edit, or delete the data 3210 stored in the minting smart contract 3130. Using the configuration functions 3232, the minting smart contract 3130 may be reconfigured to support new token collections, new tokens, and to otherwise modify the operation of the minting smart contract 3130.

The minting smart contract may store templates and schemas as smart contract configuration data. The template data 3212 may include one or more templates 3240, each of which may specify various data values/attributes for minting tokens. FIG. 32 shows an exemplary NFT template 3240 for minting an NFT. The NFT template 3240 may include a data value containing a unique template identifier 3242, which may be used to distinguish the NFT template from other NFT templates. In embodiments, the templates may be indexed using the template identifier and/or a collection identifier, such that each template may be identified and retrieved from the smart contract configuration data structure using a corresponding template identifier and/or a collection identifier. For example, if another smart contract instructs the minting smart contract 3130 to mint a particular token (as will be described in more detail below), it may specify a particular collection identifier and a template identifier 3242 in order to indicate what type of token should be minted. The NFT template 3240 may further include a media assets 3244 data value that may link to or store one or more media assets. For example, the media assets data field may include one or more interplanetary filesystem (IPFS) links to media assets that may be used for any NFT minted using the template (e.g., an image of a baseball player for a baseball card NFT or the like, an animated image of a fighting game character for a trading card NFT, etc.). Example media assets are illustrated in FIG. 39 and discussed in greater detail below.

In some embodiments, the template 3240 may store links to multiple media assets 3244. For example, a first media asset 3244 link may reference a first image, audio, and/or video component, a second media assets link may reference a second image, audio, and/or video component, etc., and the image components may be combined together to generate a composite media asset for the minted token (e.g., using overlay techniques). Additionally or alternatively, the media asset 3244 links may reference different media assets that may be displayed at different times; for example, tokens that correspond to characters or items usable within a game may display different media assets based on a state of the character/item in the game (e.g., a first animation for when a fighting character is fighting, a second animation for when the fighting character is not fighting, and/or a first image for display when an item has full health and a second image for display when an item has low health, etc.).

The template 3240 may further store one or more schema 3246 data values that may contain links to an NFT schema, which may describe the data structure for the templates and, therefore, the tokens minted using the templates. In some embodiments, the schemas 3260 may be referenced by multiple templates 3240, which may use a common data structure from the referenced schemas 3260. In other words, the schemas 3260 may store structures that may be reused by multiple token templates 3240, whereas the templates 3240 may store data values that are only used by one type of token. The schemas 3260 are described in more detail below.

The template 3240 may further store a supply data 3248 data value, which may indicate how many tokens corresponding to the template have already been issued, a maximum number of tokens that may be issued, and/or the like. The minting smart contract 3130 may check that the current supply is less than the maximum supply before allowing a token to be minted using the template and may increment the currently supply whenever a new card is minted using the template. The template 3240 may further store usage data 3250 indicating how a minted token can be used (e.g., whether it can be transferred to other users, burned, etc.). The template 3240 may further store schema data values 3252 containing the data values specified in the schema, which may include a token name, media assets, a token series ID, token container data, token smart contract, a token description, and other data as described in more detail below).

The template 3240 may also store any number of other data attributes 3254 as necessary or desired. For example, if the template 3240 is for a VIRL redemption token, additional data values related to redemption rights may be stored in the template. Similarly, if the template 3240 is for a baseball card token, the other data attributes 3254 may include a name of the baseball player, statistics associated with the player, a team of the player, a name of the player, and/or the like. As another example, if the template is for a trading card used in a battle game, the other data attributes 3254 may include data values that indicate a name of the character/subject of the card, an attack power, defense power, a health attribute, and/or the like. In some of these embodiments, the other data attributes may include attributes that may be used for a video game (e.g., by the video game integration system 808), for example, to render the collectible token inside a game universe (e.g., art assets for rendering the token as an in-game item, and any other attributes necessary to integrate the item within a video game). In the example shown in FIG. 49, the other data attributes 3254 could include, for example, a level attribute (e.g., whether a collectible token is a build level, level 1, level 2, etc.) and/or a particular type (e.g., "Collector's Edition", "Action", etc.). Additionally or alternatively, separate templates may be used for each type of card.

In some embodiments, a template 3240 may further include, for each data attribute, an indication of whether the data attribute is mutable or immutable. Additionally or alternatively, indications of which data attributes are mutable, and which are immutable, may be stored as a separate data attribute (e.g., in the other data attributes 3254). In embodiments, the template 3240 may further define (e.g., in the other data attributes 3254) whether additional attributes may be added, whether the added attributes may be mutable or immutable, which parties have permission to add the attributes, and the like. For example, a data attribute may indicate that additional immutable data attributes specifying baseball player statistics for a past season may be added, such that a corresponding token may be updated over time.

Returning to the data 3210 of the minting smart contract 3130, the minting smart contract 3130 may store schema data 3214 including one or more schemas 3260, each of which may specify the structure of various data values used for minting tokens, and that may be referenced by one or more templates 3240. FIG. 32 shows an exemplary NFT schema 3260 for minting an NFT corresponding to the NFT template 3240. The schema 3260 may specify a token name 3262 for describing the tokens that correspond to the schema. For example, as shown in FIG. 39, a trading card for a token collection may be named "Ryu." The structure of this data value may be described in the schema 3260 (e.g., a string), and the specific string "Ryu" may be stored in the template 3240 (e.g., in the schema data values 3252).

The schema 3260 may further specify a media assets 3264 data value, which may be specified as an image or other media item, or a string containing a link to a media asset. The schema 3260 may further specify a token series identifier, which may be a string for a series identifier for the token. The schema 3260 may further specify a token container 3268, which may contain a string specifying a number of cards in a digital pack 3144. Such digital packs 3144 may be unboxed to obtain a number of additional cards as specified by a value for the token container 3268. For example, as shown in FIG. 38, a first digital pack 3144 may contain 10 cards, and a second digital pack 3144 may contain 60 cards.

The schema 3260 may further include data value(s) specifying strings that may be used to store one or more links to smart contracts 3270. For example, if the schema 3260 corresponds to a digital pack 3144, then the smart contracts 3270 data value may be used to store a link to an unboxing smart contract 3126 that allows a player to unbox the digital pack. Additionally or alternatively, if the schema 3260 corresponds to a token that is redeemable for a real-life item, then the smart contracts 3270 data value may be used to store a link to a redemption smart contract 3132. Similarly, the smart contracts 3270 data value may include links to sales smart contract 3124 (for selling the token), crafting smart contracts 3128 (for crafting using the token), asset storage smart contracts 3134 (for storing the minted token), and/or the like. The schema 3260 may further specify a token description 3272 data value, which may be used to indicate textual and/or other information about the token. The schema 3260 may further store a schema identifier 3274 for uniquely identifying the schema.

In embodiments, the configuration data 3210 of a minting smart contract 3130 may store minting rules 3216, which may be followed by the pre-mint or minting functions of the smart contract 3130. For example, the minting rules may require the minting smart contract 3130 to check a template's supply data 3248 before allowing minting to proceed, to obtain data from other accounts or smart contracts on the blockchain for use in minting, to generate particular analytics data for storage by the minting smart contract, and/or the like. In some cases, the minting rules 3216 may prevent minting from proceeding if certain conditions are not met. In some cases, the minting rules 3216 may be used to randomly select one or more templates 3240 and/or one or more schemas 3260 for minting. For example, another smart contract may request minting of a card corresponding to a certain schema, and the minting rules may then randomly select to mint a card corresponding to one of the templates that reference that schema. In some cases, the minting rules 3216 may specify weights or probabilities for the random selection—for example, a first template (e.g., specifying a common-level card) may be associated with a 70% probability, a second template (e.g., specifying a rare-level card) may be associated with a 25% probability, and a third template (e.g., specifying an epic-level card) may be associated with a 5% probability. Similarly, minting rules 3216 may specify weights or probabilities for randomly selecting one or more schemas (e.g., when another smart contract requests minting of a card belonging to a particular series identifier (e.g., as specified by the token series identifier 3266), then the minting smart contract 3130 may use first rules to randomly select a schema 3260, followed by second rules to randomly select a template 3240 corresponding to the randomly-selected schema, and then mint the card based on the selected template and schema). It is appreciated that the minting rules 3216 may include additional or alternative rules for selecting a schema and/or template for minting.

In embodiments, the minting smart contract 3130 may further include minting data 3218, which may include a log of past minting (e.g., tallies of which cards were minted, etc.) and data generated therefrom, such as values indicating how much supply of each type of token is available for minting, what tokens are most often minted, and the like. This data may be used for analytics purposes, as described in further detail below.

The minting smart contract 3130 may further include random-number generator data 3220 (which may include pseudo-random number generators), which may be used to generate a random number for use in the random selections (e.g., randomly selecting schemas or templates as described above). Additionally or alternatively, the minting smart contract 3130 may receive a random seed from another smart contract that requests minting. Using the random number generator data 3220 and/or the received random seed, the minting functions may generate a random number for use in decision making.

The minting smart contract 3130 may further include one or more functions 3230, including various configuration functions 3232 for adding, reading, editing, or removing configuration data 3210, a pre-mint function 3234 for batch minting a set of tokens, and/or a mint function 3236 for dynamically minting a token.

The pre-mint function 3234 may allow a caller (e.g., another smart contract, the mystery box system 806, etc.) to request minting of a set of tokens having certain characteristics. For example, the pre-mint function 3234 may receive, as arguments, a collection identifier (e.g., an identifier to distinguish between various collections, such as a baseball card collection, a fighting game card collection, etc.), schema identifier (e.g., corresponding to the schema identifier 3274), and/or template identifier (e.g., corresponding to the template identifier 3242), and a quantity of tokens to mint. The pre-mint function may then mint the specified quantity of tokens based on the specified collection, schema, and/or template.

Similarly, the mint function 3236 may allow a caller (e.g., another smart contract, the mystery box system 806, etc.) to request minting of a set of tokens having certain characteristics. The mint function 3236 may receive, as arguments, an account to which the minted token is initially assigned, a collection identifier, schema identifier, and/or template identifier, a quantity of cards to mint, and/or a random number seed.

Additionally or alternatively, the mint function 3236 and/or pre-mint function 3234 may not use templates and/or schemas, but may receive a data structure containing a list of attributes that it may use to mint a new token.

In some embodiments, the mint function 3236 and/or pre-mint function 3234 may calculate, for each minted token, one or more dynamic values using one or more minting rules. For example, the function may randomly select one of several data values from a list of data values that may be used for a certain attribute, may calculate a random number within a certain range for a certain attribute, or the like. In these embodiments, one or more minting rules or formulas may be received as arguments by the mint function 3236 and/or pre-mint function 3234 and used to resolve the dynamic value.

The pre-mint function 3234 and/or mint function 3236 may generate a unique identifier for each token (thus creating a non-fungible token). These functions may further generate a mint number for each token, which may indicate which card of the specified type was minted first, second, etc. In other words, the pre-mint function 3234 and mint function 3236 may increment a mint counter for each successive token that is minted per template. The mint counter may be tracked, for example, using supply data 3248 of the template 3240, which may indicate how many tokens have been minted for each template.

FIG. 33 illustrates an example assets storage smart contract 3134. In the that stores a first NFT collection 3302 and a second NFT collection 3304. Exemplary details of some tokens of the first NFT collection 3302, including collectible tokens 3142A-G and digital packs 3144A-B are also shown in tabular format, although this is merely illustrative and the token data may be stored using any appropriate data structure.

As illustrated by the example table of FIG. 33, token collections 3302 may include a plurality of a collectible tokens 3142 and/or digital packs 3144, both of which may be embodied as non-fungible tokens. For example, each of example collectible tokens 3142A-D may have minted using a first template ("Template A"), and thus (in this example) may share the same name ("NFT A"). Each of the example tokens may be assigned to a different account, which may be an individual account (e.g., Account A, Account B) associated with a user device 3102, or may be a smart contract (e.g., a crafting smart contract 3128). When the token is assigned to a user's account, the token may appear in a digital wallet 3104 associated with that user. When the token is assigned to a smart contract, it may be used by that smart contract to implement various functionalities (e.g., crafting functionalities) as described herein. FIG. 33 further shows that each NFT includes a unique identifier, which may have been generated by the minting smart contract 3130 at minting time. Furthermore, each of the NFTs may be assigned a mint number, which may indicate which token of a given type (e.g., corresponding to a given template) was minted first, second, etc. In the illustrated example, each of the example NFTs 3142A-D may have a different asset link. The various example IPFS links A-D may each link to the same media assets or to different media assets, such the example NFTs 3142A-D may have a unique appearance or may have the same appearance. Additionally or alternatively, a group of example NFTs (e.g., NFTs 3142A-D) may all contain the same link(s) to the same media asset(s) (e.g., to reduce the number of common assets stored via IPFS). Each token may further store a template identifier (e.g., the template identifier 3242), and/or may store any other data from a corresponding template 3240 and/or schema 3260 (not shown in FIG. 33).

Although the exemplary table shows only a few example tokens, an asset storage smart contract 3134 may store a large number of tokens of various types. For example, a developer device 3108 may cause pre-minting of 1000 tokens using Template A, 500 tokens using Template B, and 100 tokens using Template C, as well as other amounts of tokens matching other templates. Initially, the tokens may be "owned" by a minting smart contract or some other default smart contract. In some examples, once all of the tokens of a given type have been sold or transferred (e.g., once all of Template A tokens are no longer assigned to the minting smart contract), then additional tokens of that type may be either pre-minted in batches or dynamically minted as needed. For example, when a user device 3102 attempts to purchase a new Template A token, but the asset storage smart contract 3134 does not have any available tokens, then a new token matching Template A may be dynamically minted (e.g., if permitted by minting rules, supply caps, etc.), stored in the asset storage smart contract 3134, and assigned to the purchasing user.

FIG. 33 further shows example NFTs 3142E-G associated with a second template (Template B). In contrast to the example NFTs 3142A-D associated with a first template, the second template NFTs may have a different name (although, as discussed with respect to FIG. 32 above, in some cases multiple templates may share a common name) and may use a different series of mint numbers. In other words, mint numbers may be tracked separately for tokens matching a first template and tokens matching a second template (e.g., by storing supply data 3248 in a corresponding template 3240 data structure, as discussed above for FIG. 32). Additionally, the second example NFTs 3142E-G may link to different media assets, although in some cases at least a subset of the media assets may be common to the different types of NFTs.

FIG. 33 further shows example digital pack 3144A-B NFTs, which may be exchanged for collectible token 3142 NFTs using an unboxing mechanism. As will be discussed in further detail below, to use the unboxing mechanism, a user device may transfer the token to an unboxing smart contract 3126 (or any other smart contract with unboxing functionality), which may then be designated as the owner of the account, as shown for the example digital pack 3144A. The digital pack 3144 NFTs may store similar data as the collectible token 3142 NFT, as shown in the exemplary table. The digital pack 3144 NFTs may also include data fields that are distinct or contain different data compared to the collectible token 3142 NFTs, such as a data field containing a link to an unboxing smart contract 3126, a data field indicating how many tokens will be received upon unboxing, and/or the like.

Figure 34:
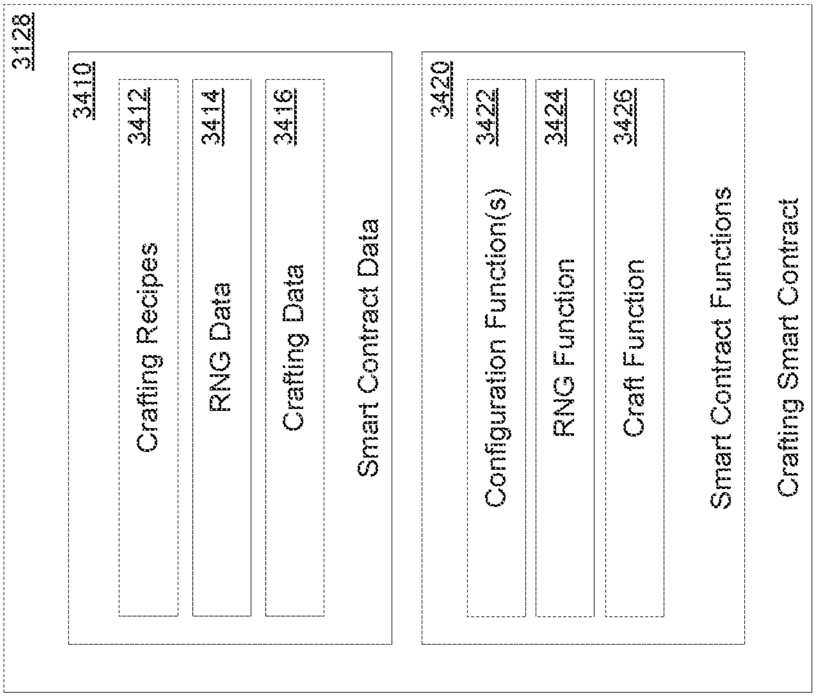
FIG. 34 is a schematic illustrating an example smart contract for crafting tokens according to some embodiments of the present disclosure.

FIG. 34 illustrates an example crafting smart contract 3128. In embodiments, a crafting smart contract 3128 may be configured to implement crafting functionalities for leveraging a first set of "component" tokens to generate a second set of one or more "crafted" tokens. For example, crafting functionality may be used to "level up" a player's trading tokens, such as by swapping two level 1 trading card tokens for a level 2 trading card token, swapping two level 2 trading card tokens for a level 3 trading card token, and the like. As another example in a different context, if a user has a first token representing a sword and a second token representing a magical enchantment, a user might use a crafting smart contract to generate a magical sword token. As a third example, if a user has a first token representing a white dog and a second token representing a black dog, the user may be able to use a crafting smart contract to generate a token representing a white and black dog. In some cases, it may be appropriate to "burn" the original component tokens, as in the first two examples above, whereas in others it may be appropriate to keep the original component tokens in the owner's possession, as in the third example. These and other functionalities may be enabled by crafting recipes 3412 stored in a crafting smart contract 3128 or elsewhere in a distributed ledger.

As shown in FIG. 34, an example crafting smart contract may include smart contract data 3410 and smart contract functions 3420. The configuration data may include crafting recipes 3412, which may specify which component tokens may be used to craft, and which crafted tokens may be generated. For example, a simple recipe for leveling up tokens may specify that if two level 1 "Ryu" cards are provided as components, the components should be burned and the owner should receive one level 2 "Ryu" card. In embodiments, crafting recipes may also use weights/probabilities when a specified combination of tokens may be crafted into one of two or more types of cards. For example, as shown in the example crafting recipes of FIG. 49, a crafting recipe may specify that if two "Ryu" build-level cards are provided as components, the crafted token has a 1% chance of being a level 1 "Collector's edition" card, a 5% chance of being a level 1 "Action" card, a 10% chance of being a level 1 "Weld" card, a 15% chance of being a level 1 "Battle" card, a 25% chance of being a level 1 "Foil" card, and a 44% chance of being a level 1 "Base" card. In this example, each of the different types of level 1 card may correspond to a different template 3240, and thus may have different template IDs, media assets, etc. Additionally or alternatively, a crafting recipe may specify a single template and weights or probabilities of setting a particular dynamic value that is associated with that template. For example, a crafting recipe may specify that two dog cards may be used as "parents" to make a new dog card with a dynamic color variable, where the dynamic color variable has a 25% chance of being the same color as the first parent, a 25% chance of being the same color as the second parent, and a 50% chance of being half and half. In this way, the crafting recipes 3412 may specify probabilities that may be used to probabilistically select a template and/or resolve a dynamic value during the crafting, and/or may specify other types of rules for resolving a dynamic value at crafting time. Such rules may be passed as arguments to a minting smart contract for resolution, and/or may be resolved by the crafting function before transmitting a selected value In some embodiments, crafting recipes may yield redeemable tokens (e.g., VIRLs), which may be high level tokens (e.g., level 5 NFTs crafted using levelling recipes), and/or may be randomly-selected using various weights or probabilities. For example, a crafting recipe may specify a small chance of obtaining a first type of VIRL token, another small chance of obtaining a second type of VIRL token, and a higher chance of obtaining a non-VIRL token. Additionally or alternatively, a crafting recipe may designate the redeemable tokens as the highest level of token that can be awarded to a user.

In embodiments, crafting recipes may depend on supply data or any other analytics data. For example, a crafting recipe may use dynamic weights or probabilities that may be adjusted up or down based on supply data (e.g., such that a user is more likely to obtain a token with a relatively higher supply remaining). Similarly, recipe weights may be adjusted up or down based on past or projected sales values for a token, a popularity of the token, or the like. These mechanics may be used to balance the supply of tokens and/or to reward players with higher value or more popular tokens. In these embodiments, a crafting smart contract 3128 may obtain supply or other analytics data from crafting data 3416 and/or from analytics data stored at another smart contract (e.g., at an asset storage smart contract 3134).

The crafting smart contract 3128 may further include random number generator (RNG) data 3414, which may be used to generate a random number for use in the resolution of probabilities for crafting (e.g., randomly selecting templates and/or resolving dynamic values). Additionally or alternatively, the crafting smart contract may request a random number from another smart contract that generates random numbers, and may subsequently receive a random number. Using the random number generator data 3414 and/or the received random number, the crafting smart contract 3128 may generate a random number for use in decision making.

In embodiments, the crafting smart contract 3128 may further include crafting data 3416, which may include a log of past crafting (e.g., tallies of which cards were crafted, etc.) and data generated therefrom, such as values indicating which tokens are most often crafted, and the like. This data may be used for analytics purposes, as described in further detail below.

The crafting smart contract 3128 may further include smart contract functions 3420, which may include one or more configuration functions 3422 for creating, editing, or deleting crafting recipes 3412 and/or RNG data 3414. For example, a developer device 3108 may cause a first distributed ledger transaction that invokes a first configuration function 3422 to upload a first crafting recipe 3412, cause a second distributed ledger transaction that invokes the first configuration function 3422 again to upload a second crafting recipe 3412, and repeating this process, thereby configure the crafting smart contract 3128 to provide all the crafting recipes for a given token collection. Later, the developer device 3108 may cause another distributed ledger transaction to invoke a second configuration function 3422 for deleting a crafting recipe (e.g., in response to reaching a supply limit for the tokens crafted by the recipe) or a third configuration function 3422 (e.g., to modify the probability of obtaining a certain rare token, or the like).

In embodiments, the crafting smart contract 3128 may further include a random number generator function for generating a random number (e.g., based on the RNG data 3414 and/or a random seed received from another smart contract). Alternatively, the crafting smart contract 3128 may simply use a random number requested and received from another smart contract to resolve probabilities. For example, the crafting smart contract 3128 may cause a first transaction requesting a random number from a different smart contract, and then may receive the random number in a second transaction.

In embodiments, the crafting smart contract 3128 may further include a craft function 3426 for crafting a card using a crafting recipe. The craft function 3426 may be invoked by other smart contracts, by user devices 3102 (e.g., when a user wants to craft a new card), and/or by the tokenization platform 100 (e.g., on behalf of a user device 3102). The craft function 3426 may take, as arguments, a collection identifier, an account identifier of the user requesting the crafting, and a crafting recipe identifier. The craft function may then proceed if the requesting user transferred control of the necessary component tokens that are required for the specified crafting recipe. For example, before invoking the craft function 3426, a user account may transfer the necessary component tokens to the crafting smart contract 3128. Then, when the craft function 3426 is invoked, it may first check that the correct component tokens were received before proceeding with crafting. In some implementations, the craft function 3426 may then burn some or all of the component tokens, generate a random number (e.g., by invoking the RNG function 3424 and/or by requesting a random number from another smart contract), log the crafting data (e.g., to the crafting data 3416), call the minting smart contract 3130 to generate the crafted token, and cause assignment of the crafted token to the user account that requested the crafting. The operations of the craft function 3426 are described in more detail below with respect to FIG. 47.

Figure 35:
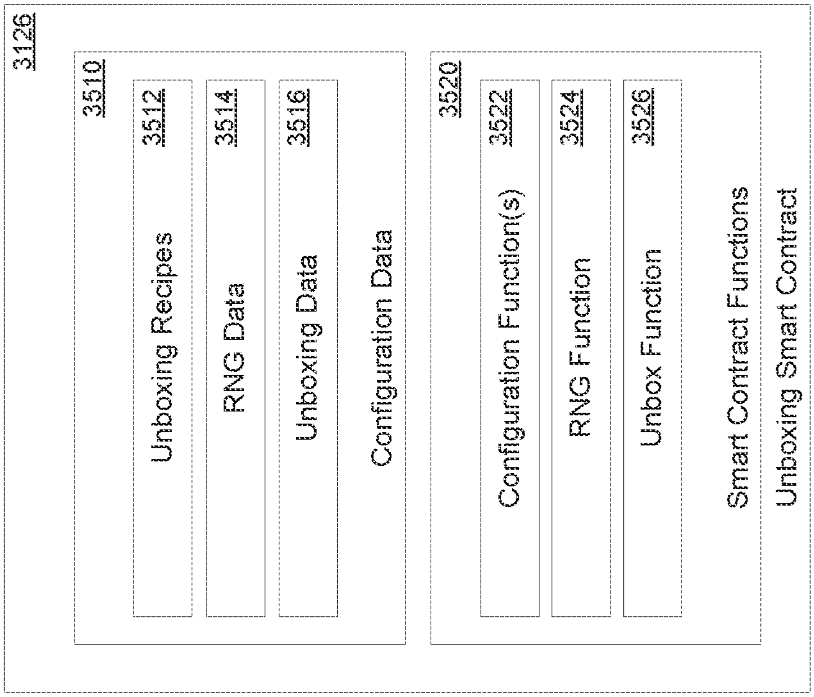
FIG. 35 is a schematic illustrating an example smart contract for unboxing digital pack tokens according to some embodiments of the present disclosure.

FIG. 35 illustrates an example unboxing smart contract 3126, which may be used to implement unboxing functionalities for redeeming a digital pack 3144 token for a set of collectible tokens 3142 (e.g., NFT trading cards, NFT-based digital artwork, and/or the like). In some embodiments, the collectible tokens may be determined dynamically using unboxing recipes and may be drawn from pre-minted pools and/or dynamically minted. For example, a simple unboxing recipe may specify that a player may redeem a digital pack 3144 for a specified amount (e.g., thirty (30) or ten (10) collectible tokens, each of which may be randomly selected from a set of corresponding templates. In some embodiments, the recipe may specify that each template has an associated weight or probability of being selected. Thus, an unboxing recipe may be more likely to yield common tokens, and certain types of tokens may be made rare by assigning a low weight or probability to the corresponding template in the unboxing recipe. Each template may or may not be associated with a set of pre-minted tokens. If a given template is randomly selected in the unboxing process, and pre-minted tokens matching that template are available, then the owner of the digital pack may be given a randomly-selected token from the pool of pre-minted tokens. Accordingly, a particular unboxing recipe may use pre-minting, dynamic minting, or both.

By using the pre-minting function together with the unboxing function, several technical benefits are provided. As discussed previously, users may tend to value lower mint numbers on tokens (e.g., mint numbers 1-5 are more valuable than mint numbers in the hundreds), and this may negatively affect the functioning of a distributed ledger if it encourages players to rush to unbox digital packs 3144 upon their release, which may cause a demand spike on the distributed ledger or associated computing resources, blocking or delaying other traffic. Moreover, such rushes may tend to encourage the use of automated scripts or bots. However, if a pool of tokens is pre-minted, and one of the pre-minted tokens is randomly selected upon unboxing, then the first player to use an unboxing function has an equal chance of getting a high mint number as a low mint number. Thus, the combined use of pre-minting and unboxing mechanisms may tend to improve the functioning of blockchains and other distributed ledgers by removing the incentive for users to cause traffic spikes.

In some cases, pre-minting may be used together with dynamic minting. As a first example, although a certain number of cards may be pre-minted for the reasons described above or for other reasons, once all of those cards have been assigned to users, then dynamic minting may be used to ensure that the unboxing functionality continues to work according to the unboxing recipe. Additionally or alternatively, some types of tokens may not be associated with mint numbers (e.g., tokens that may tend to have a low value), may be rare or difficult enough to obtain that no "rush" to obtain them is likely, and/or the like. Thus, an unboxing recipe may specify a chance of receiving a token that is pre-minted, and a chance of receiving a token that is dynamically minted.

In embodiments, the unboxing smart contract 3126 may obtain multiple unboxing recipes 3512 that may be used for unboxing different digital packs 3144. The unboxing recipes 3512 may specify weights or probabilities per-token, for a set of tokens, and/or for all tokens of a digital pack. For example, an unboxing recipe for a digital pack that is redeemable for ten tokens may specify that four of the tokens may be selected using a first rule that selects from a first set of templates (each of which may have a corresponding weight or probability of selection) and six of the tokens may be selected using a second rule that selects from a second set of templates (each of which has a corresponding weight or probability of selection). In this example, the first token may be randomly selected from the first set, the second token may be randomly selected from the first set, etc., whereas each of the fifth, sixth, etc. tokens may be randomly selected from the second set. Thus, for example, an unboxing recipe may specify that a player receives a certain number of cards selected using a first rule, a certain number of cards selecting using a second rule, etc. using as many rules as desired. In this way, although the tokens may be randomly selected, the sets from which each token is selected may be specified in the unboxing recipe, and therefore the composition of the randomly-selected set of tokens may be controlled.

Unboxing recipes and associated rules may further specify multiple weights or probabilities that may be resolved to determine a single token. For example, an unboxing recipe or rule may specify, for awarding a single token, a first set of weights/probabilities for determining a set of templates from which the single token will be selected from (e.g., a class of tokens, such as "epic", "rare", "common", or the like) and a second set of weights/probabilities that is used to select a specific template from the randomly-determined set of templates (e.g., a particular type of card within the selected class of cards that the user may be awarded). For example, an unboxing recipe may specify a first set of weights or probabilities for resolving the rareness of a token (e.g., 70% chance for a common card, 25% chance for a rare card, 5% chance for an epic card), each of which may include a set of one or more specific templates that may be awarded. In this example, the unboxing recipe may include, for each "rareness" class of tokens, a second set of weights/probabilities for selecting a particular template within the "rareness" class (e.g., 10% chance of being awarded a card minted using Template A, 30% chance of being awarded a card minted using Template B, and 60% chance of being awarded a card minted with Template C). In this example, the unboxing recipe may further include additional steps for awarding a specific token to a user account when the selected template corresponds to a set of pre-minted assets (e.g., a third random number generation step to award a particular mint number to the user).

In some embodiments, unboxing recipes may be dynamic based on supply data or other analytics data. For example, an unboxing recipe may specify that, if relatively more tokens matching a first template have been minted than tokens matching a second template, then the first template weight should be lowered and/or the second template weight should be raised, thereby "balancing" the supply. In this way, unboxing recipes may change over time as supply changes. Thus, an unboxing recipe may use dynamic weights or probabilities that may be adjusted up or down based on supply data (e.g., such that a user is more likely to obtain a token with a relatively higher supply remaining). Similarly, in some embodiments, recipe weights may be adjusted up or down based on past or projected sales values for a token, a popularity of the token, or the like. These mechanics may be used to balance the supply of tokens and/or to reward players with higher value or more popular tokens. In these embodiments, an unboxing smart contract 3126 may obtain supply or other analytics data from unboxing data 3516 and/or from analytics data stored at another smart contract (e.g., at an asset storage smart contract 3134).

In some embodiments, unboxing recipes may designate redeemable tokens that may be exchanged for real-world items using a redemption smart contract 3132. In these embodiments, the collectible tokens 3142 themselves may be the redeemable tokens, for example, because they store redemption data as an attribute of the collectible token, and thus are VIRLs as described herein. Additionally or alternatively, redeemable tokens may be separate from collectible tokens 3142, and may have their own weights or probabilities in unboxing recipes, and/or may be given to a player automatically if a corresponding collectible token 3142 is unboxed. In these embodiments, the redeemable tokens may not count towards the number of tokens that are contained within the digital pack 3144, such that the redeemable token (which may be referred to as a "redemption token" may accompany a corresponding collectible token 3142; for example, a developer device 3108 may specify, in an unboxing recipe, that a 30-card digital pack 3144 may be unboxed to yield 30 collectible items as well as any associated redemption tokens, such that a user may receive, for example, 31 tokens comprising 30 collectible tokens 3142 and a redemption token. These and the other functionalities described herein may be enabled by the unboxing recipes 3526 stored in an unboxing smart contract 3126 or elsewhere in a distributed ledger.

The unboxing smart contract 3126 may further include random number generator (RNG) data 3514, which may be used to generate a random number for use in the resolution of probabilities for unboxing (e.g., randomly selecting templates and/or resolving dynamic values). Additionally or alternatively, the unboxing smart contract 3126 may request a random number from another smart contract that generates random numbers, and may subsequently receive a random number. Using the random number generator data 3514 and/or the received random number, the unboxing smart contract 3126 may generate a random number for use in decision making.

The unboxing smart contract 3126 may further include unboxing data 3516, which may include a log of past unboxing (e.g., tallies of which tokens were selected and assigned to users via unboxing, which tokens remain in pre-minted pools, how many tokens were generated dynamically, etc.) and data generated therefrom, such as values indicating which tokens are most often unboxed, and the like. This data may be used for analytics purposes, as described in further detail below.

The unboxing smart contract 3126 may further include smart contract functions 3420, which may include one or more configuration functions 3522 for creating, editing, or deleting unboxing recipes 3512 and/or RNG data 3414. For example, a developer device 3108 may cause a first distributed ledger transaction that invokes a first configuration function 3522 to upload a first unboxing recipe 3512, cause a second distributed ledger transaction that invokes the first configuration function 3522 again to upload a second unboxing recipe 3512, and repeating this process, thereby configure the unboxing smart contract 3126 to provide all the unboxing recipes for a given token collection. Later, the developer device 3108 may cause another distributed ledger transaction to invoke a second configuration function 3522 for deleting an unboxing recipe (e.g., in response to all of the corresponding digital packs 3144 having been unboxed) or a third configuration function 3522 (e.g., to modify the probability of obtaining a certain rare token via unboxing, or the like).

The unboxing smart contract 3126 may further include a random number generator function for generating a random number (e.g., based on the RNG data 3514 and/or a random seed received from another smart contract). Alternatively, the unboxing smart contract 3126 may simply use a random number requested and received from another smart contract to resolve probabilities. For example, the unboxing smart contract 3126 may cause a first transaction requesting a random number from a different smart contract, and then may receive the random number in a second transaction.

The unboxing smart contract 3126 may further include an unbox function 3526 for unboxing a digital pack 3144 using an unboxing recipe. The unbox function 3526 may be invoked by other smart contracts, by user devices 3102 (e.g., when a user wants to unbox a digital pack), and/or by the tokenization platform 100 (e.g., on behalf of a user device 3102). The unbox function 3526 may take, as arguments, a collection identifier, an account identifier of the user requesting the unboxing, and an identifier of the digital pack 3144 to be unboxed. The unbox function may then proceed if the requesting user transferred control of the corresponding digital pack 3144 to the unboxing smart contract. The unbox function 3526 may then burn the digital pack token, generate a random number (e.g., by invoking the RNG function 3424 and/or by requesting a random number from another smart contract), log the unboxing data (e.g., to the unboxing data 3516), call the minting smart contract to generate (or assign from a pre-minted pool) the unboxed token, and cause transfer of the unboxed token to the user account that requested the unboxing. This process may repeat for each token that is unboxed, and/or all of the tokens may be determined, minted, and assigned using batch operations. The operations of the unbox function 3526 are described in more detail below with respect to FIG. 44.

FIG. 36 illustrates an example user interface 3600 for viewing an example schema 3602 that may be used for a digital pack 3144. In embodiments, the tokenization platform 100 and/or mystery box system 806 may generate the user interface 3600, as well as other user interfaces for viewing schema data, template data, NFT data, and the like. Such user interfaces may be accessed by various user devices 3102 and/or developer devices 3108. In the illustrated example, the schema is for a CAPCOM digital pack that may be used to generate STREET FIGHTER trading cards. The schema 3602 may be associated with a collection identifier corresponding to a STREET FIGHTER collection and may define one or more attributes. The user interface 3600 may display information about the collection (e.g., an image for the collection, a link to view additional collection information via the user interface 3600, and a marketplace 3106 link). The attributes of the schema 3602 may include a name attribute specified as a string, an image attribute specified as an image, a series attribute specified as a string, a contains attribute specified as a string, a URL of an unpacking smart contract specified as a string, a description specified as a string. These attributes may correspond to, for example, the token name 3262, media assets 3264, token series ID 3266, token container data 3268, token smart contract 3270, and token description 3273 respectively, as illustrated at FIG. 32. In this example, a corresponding schema identifier 3274 is not shown in the user interface 3600.

FIG. 37 shows an example user interface 3700 for viewing an example template 3702 for defining a digital pack 3144 of STREET FIGHTER tokens. As shown, the user interface 3700 may display an image for the digital pack 3144 and a descriptor ("Ultimate Pack") of the digital pack 3144. The user interface 3700 may further display a template identifier for the template 3702, an issued supply (e.g., indicating that 17,064 corresponding tokens have been generated), a number of burned tokens (indicating that 1 card has been burned), and a max supply (e.g., infinite to indicate that there is no limit to the number of corresponding collectible tokens 3142 that may be minted). The template 3702 may further indicate that corresponding tokens 3142 may be transferred and burned, may include a schema identifier that identifies a schema (e.g., the example schema 3602), and a collection identifier.

FIG. 38 shows an example user interface 3800 depicting two different digital packs 3144C-D. The example user interface 3800 may be displayed on a user device 3102, for example, if a user is viewing digital packs 3144 owned by the user that are in the user's digital wallet 3104. The example user interface 3800 may also be displayed on a developer device 3108, for example, if a developer is interacting with the mystery box system 806 to view or configure digital packs for a token collection. A first digital pack may be unboxed to obtain 10 STREET FIGHTER collectible tokens 3142, whereas a second digital pack may be unboxed to obtain 60 STREET FIGHTER collectible tokens 3142, as shown in FIG. 38.

The example digital packs 3144 shown in FIG. 38 may each correspond to different templates 3240 that share a common schema 3260. For example, as shown at FIG. 36, an example schema 3260 may specify a name attribute, image attribute, series attribute, contains attribute, unpack_url attribute, and description attribute. Here, the first digital pack 3144 may have a first name value (e.g., "Normal Pack"), a link to a first image (as shown in FIG. 38), a series value (e.g., "Series 1"), a first contains value (e.g., "10" indicating that the pack contains 10 cards), an unpack URL referring to an unpacking smart contract, and a first description value (e.g., "10 Digital Cards"). Each of these data values may be specified by a first template corresponding to the first digital pack 3144. The second digital pack 3144 may contain a different name (e.g., "Ultimate Pack"), a different link to a different image (as shown in FIG. 38), the same series value (e.g., "Series 1"), a different contains value (e.g., "60" indicating that the pack contains 60 cards), the same unpack URL referring to the same unpacking smart contract, and a different description value (e.g., "60 Digital Cards"). Each of these data values may be specified by a second template corresponding to the second digital pack 3144. In this case, the common schema may be a "Series 1 Pack" schema.

FIG. 39 illustrates example media assets for different collectible tokens 3142H-K. As above, each of the different media assets may correspond to different templates that share a common schema. Here, the different templates may define different names for each token (e.g., "Ryu," "Chun Li", etc.), different image assets (as shown), a level value (e.g., "Start" level), and other such values, whereas the common schema may be a "Series 1 token" schema or the like. As discussed, a specified media asset may be designated by a respective template, such that any tokens generated from the respective template may be cryptographically linked to the specified media asset.

Figure 40:
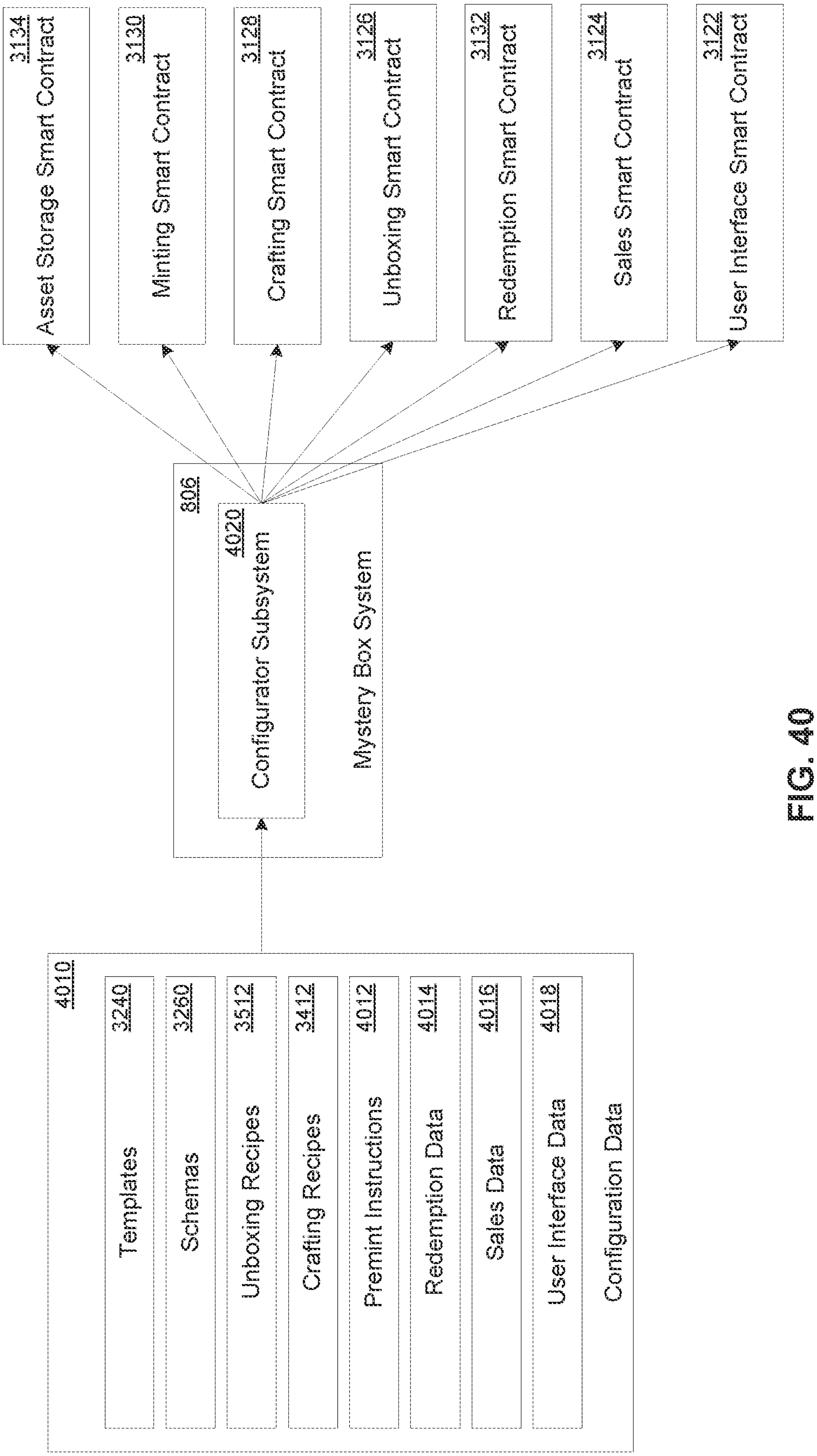
FIG. 40 is a schematic illustrating an example system for configuring smart contracts according to some embodiments of the present disclosure.

FIG. 40 shows an example data flow for using configuration data 4010 to configure the various smart contracts used to implement a token collection and associated functionality. The configuration data 4010 may be generated by developer devices 3108, which may create the configuration data 4010 using manual input from a developer, using one or more automated tools, and/or the like, and then transmit the configuration data 4010 to the tokenization platform 100. Additionally or alternatively, the developer devices 3108 may interface with the tokenization platform 100 to generate the configuration data 4010. For example, the tokenization platform 100 (e.g., using the configurator subsystem 4020 of the mystery box system 806) may provide a user interface that developers may access to create, modify, edit, or delete data in order to generate the configuration data 4010.

In either case, the developer devices 3108 and/or tokenization platform 100 may generate configuration data 4010 comprising one or more of templates 3240, schemas 3260, unboxing recipes 3512, crafting recipes 3412, pre-mint instructions 4012, redemption data 4014, sales data 4016, and/or user interface data 4018. The configurator subsystem 4020 of the mystery box system 806, in turn, may receive the configuration data 4010, perform any formatting, error-checking, verification, or other such procedures, and may use the configuration data 4010 to configure the one or more smart contracts described herein.

The configurator subsystem 4020 may use the configuration functions 3232 of the minting smart contract 3130 to store the templates 3240 and/or schemas 3260 as template data 3212 and/or schema data 3214 in the minting smart contract 3130. Similarly, the configurator subsystem 4020 may use the configuration functions 3522 of the unboxing smart contract 3126 to store the unboxing recipes 3512 in the unboxing smart contract 3126, and may use the configuration functions 3422 of the crafting smart contract 3128 to store the crafting recipes 3412 in the crafting smart contract 3128.

The configurator subsystem 4020 may further configure the asset storage smart contract 3134 using one or more pre-mint instructions 4012 to pre-mint tokens using the pre-mint function 3234 of the minting smart contract 3130, which may cause the minted tokens to be stored in the asset storage smart contract 3134. For example, the pre-mint instructions, when provided to the pre-mint function of the minting smart contract 3130, may initiate minting of 500 tokens matching a first template, 1000 tokens matching a second template, 100 tokens matching a third template, and/or the like. Thus, by pre-minting tokens, such as the tokens that may be obtained via the crafting or unboxing processes, the crafting and unboxing mechanics may be preconfigured for immediate use.

In embodiments, the configurator subsystem 4020 may further use redemption data 4014 to configure the redemption smart contract 3132. In embodiments, the redemption data 4014 may define how tokens may be redeemed for real world items, shipping information from the real-world items (e.g., shipping costs, shipping restrictions), expiration dates for redemptions, and the like. In general, the redemption smart contract 3132 may implement a redemption process as described throughout (and particularly with respect to FIG. 12), and thus the redemption data 4014 may include any data necessary for such an implementation.

The configurator subsystem 4020 may further use sales data 4016 to configure the sales smart contract 3124. In embodiments, the sales data 4016 may define prices that may be paid for specific tokens (e.g., prices of different packs of digital trading cards and/or collectible tokens) and may configure the sales smart contract 3124 to manage the transfer of tokens from one user to another (e.g., including updating the assigned owner in the asset storage smart contract 3134), and/or the like. In some cases, the sales data 4016 may configure the sales smart contract 3124 to call the minting smart contract 3130 to mint a token when the token is sold.

The configurator subsystem 4020 may further include user interface data 4018, which may be used by a website or other user interface accessed by user devices 3102 to interact with the token collection. For example, the user interface data 4018 may include data that indicates how a website should display tokens, configures the website to allow users to invoke crafting or unboxing mechanics, and the like. In some embodiments, the tokens may be associated with gaming mechanics (e.g., play to earn games), and in these embodiments, the user interface data may configure the user interface to allow users to use the tokens for various gaming mechanics.

In some embodiments, the configurator subsystem 4020 may use the configuration data 4010 corresponding to a collection to configure and parameterize a pre-existing set of smart contracts 3122-3134. In these embodiments, smart contracts 3122-3134 may be and/or contain parameterizable smart contract templates that are reused for multiple collections, providing functionality for each according to the configuration data 4010 received for each corresponding collection. Additionally or alternatively, in response to receiving configuration data 4010, the configurator subsystem 4020 may deploy new smart contracts 3122-3134 to the distributed ledgers, then configure the new smart contracts 3122-3134 using the configuration data 4010. Additionally or alternatively, in response to receiving configuration data 4010, the configurator subsystem 4020 may parameterize smart contracts 3122-3134, then deploy the parameterized smart contracts to the distributed ledgers.

Figure 41:
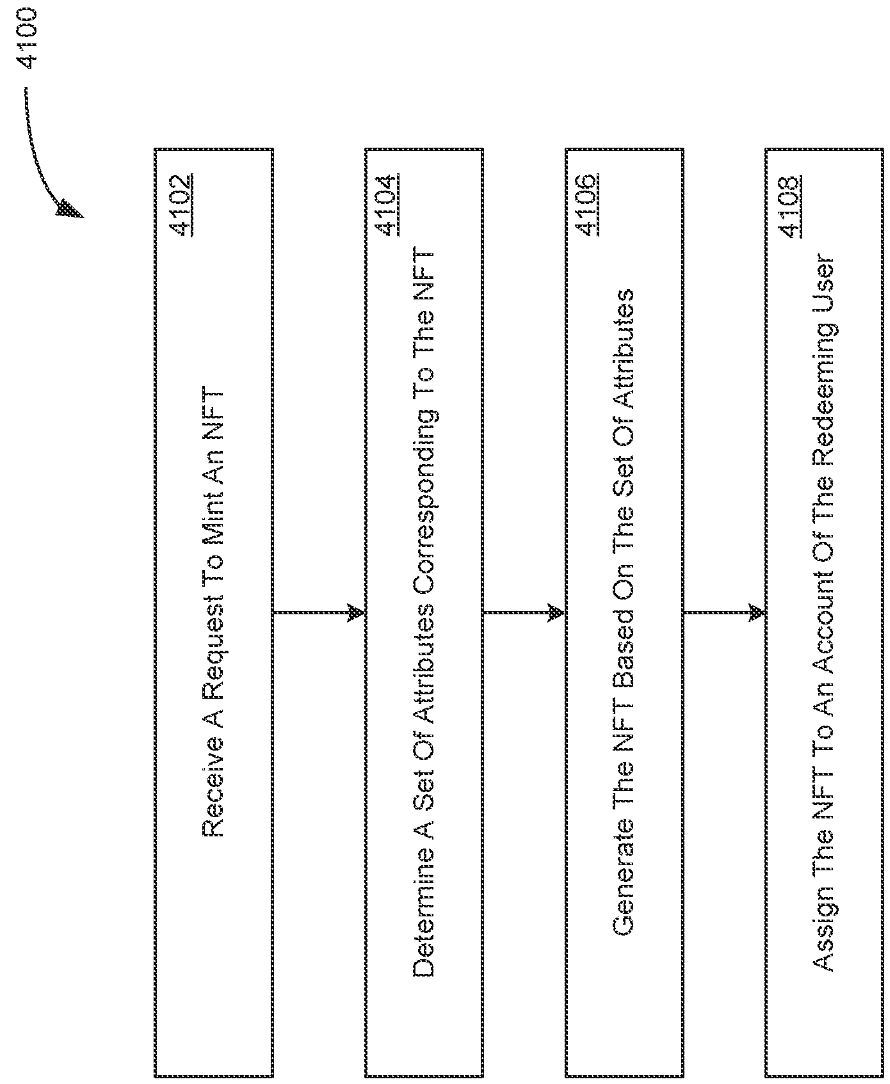
FIG. 41 is a flow chart illustrating an example set of operations of a method for minting tokens according to some embodiments of the present disclosure.

FIG. 41 indicates a set of operations that may be executed by a minting smart contract 3130 to mint a new NFT or other token. In embodiments, the minting smart contract may generate different types of NFTs, such as NFTs representing different types of packs or cards. The minting smart contract 3130 may be implicated, for example, when a user purchases a new pack, when the user unboxes a purchased pack of cards, and/or when a user crafts a new card based on cards already owned by the user.

At 4102, the minting smart contract receives a request to mint a new NFT. The request may indicate a template ID and/or a set of other attributes and a user account to which the NFT will be assigned. In embodiments, the template ID and/or set of other attributes are indicative of the type of NFT that will be generated, as the template (or the set of attributes) will define the name of the NFT (whether a pack or a card), an image depicted on the card, and/or any other differentiating features.

At 4104, the minting smart contract determines a set of attributes for the NFT to be minted. In embodiments, the set of attributes is defined in the template indicated by the template ID provided in the request. In these embodiments, the minting smart contract may retrieve the template based on the template ID. Alternatively, the request may explicitly include the set of attributes.

At 4106, the minting smart contract mints a new NFT based on the set of attributes. In embodiments, the minting smart contract will generate a unique value (e.g., a hash value) that represents and uniquely identifies the NFT. In embodiments, the minting smart contract may also determine a minting number, whereby the minting number indicates a relative order when the NFT was generated in comparison to other NFTs of the same type. For example, a first Ryu Build card may have a minting number of 00001 and a second Ryu Build card may have a minting number of 00002. It is noted that NFTs of the same type cannot have the same minting number. In embodiments, NFTs of different types have common minting numbers. Put another way, the minting number is defined with respect to a respective type of NFT, but a minting number may be repeated in different types of NFTs within the same collection.

In some embodiments, the minting smart contract 3130 may check that an issued supply of tokens is less than a maximum supply of tokens associated with the minting attributes. For example, if the minting smart contract received a request to mint a token associated with a first token, it may verify that a sufficient supply of that token is available (e.g., by checking the supply data 3248) prior to proceeding with minting. Upon minting the new token, the minting smart contract may update the supply data 3248 to indicate that the minted supply has increased.

Additionally or alternatively, the minting smart contract may, prior to minting a new token, first check whether a pre-minted token matching the specified attributes is available. In a pre-minted token matching the specified attributes is available (e.g., stored in the asset storage smart contract and assigned to the minting smart contract or some other default account), then the minting smart contract may use the pre-minted token as the "minted" token instead of minting a new one.

At 4108, the minting smart contract assigns the NFT to an account of the user. In embodiments, the minting smart contract may update a ledger (e.g., a blockchain) to reflect that the new NFT is owned by an account indicated by the request. Once this occurs, the NFT (pack or card) may be reflected in the user's digital wallet (see e.g., FIG. 50).

FIG. 42 illustrates an exemplary blockchain transaction log 4200 for minting a token using a minting smart contract. In the illustrated example, minting may occur using a single transaction that logs two distinct actions. In the first action 4202, a mint function 3236 of a particular minting smart contract 3130 (named "premint.nft" in this example) may be called. Several data values may be associated with the first action. A collection name data value, for example, may specify the collection to which the minted token belongs, a memo data value may indicate a reason for the minting (here, because a gift code was redeemed), a quantity data value may indicate how many tokens were minted, an RNG data seed value may indicate the random number used by the minting smart contract 3130, a schema name data value and template identification data value may indicate the schema and template that were used for minting, and a to data value may indicate the user account that should receive the minted token (here, an account called "bfoma.c.wam"). Although not shown in the transaction data, after the first action, a token matching the specified schema and template may be stored in an asset storage smart contract 3134. If the token is assigned to the requesting user account from a pre-minted pool, then a pre-minted token already stored in the asset storage smart contract 3134 may be assigned to the user. However, if the token is dynamically minted, the token may be first stored in the asset storage smart contract 3134 (or elsewhere, depending on the configuration), and then transferred to the requesting user account.

In a second action 4204, the minted token may be transferred from the minting smart contract 3130 to the user account (e.g., to a particular address associated with a digital wallet 3104). The second action may be associated with several data values, including an asset identification data value indicating the unique identifier of the NFT, a from data value indicating the transferring account (here, the premint-.nft smart contract), a memo data value, and a to data value indicating the receiving account.

Figure 43:
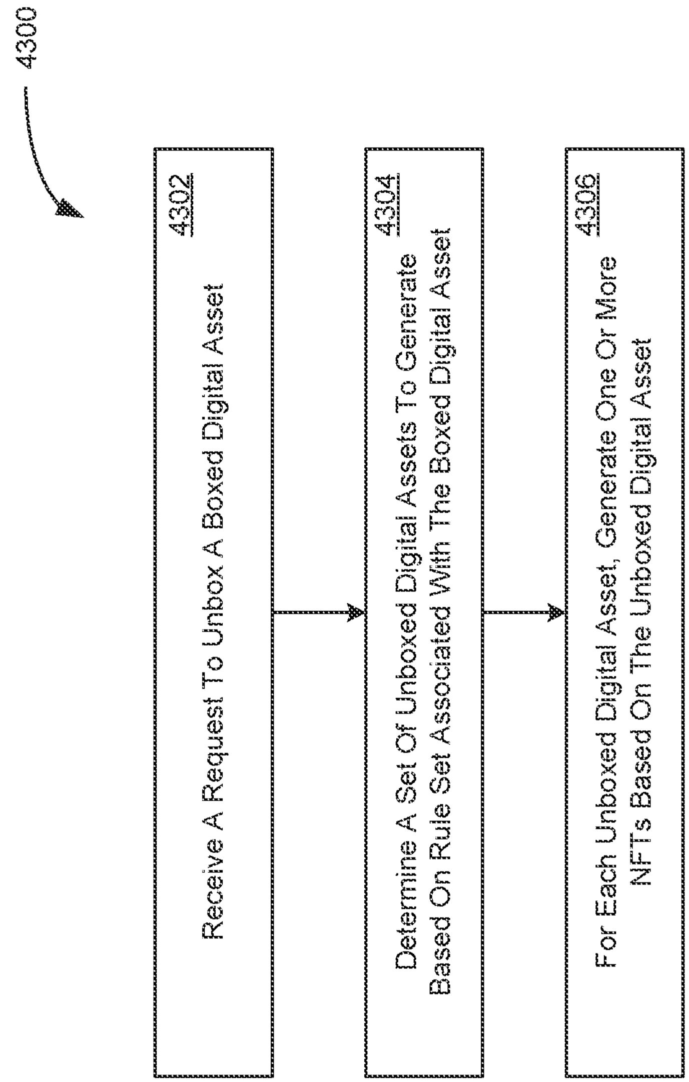
FIG. 43 is a flow chart illustrating an example set of operations of a method for unboxing digital pack tokens according to some embodiments of the present disclosure.

FIG. 43 illustrates an example method that may be executed by a first example unboxing smart contract 3126 and/or tokenization platform 100. In embodiments, the unboxing smart contract is implicated when a user requests to redeem a pack of cards that is owned by the user. For example, a user may select a pack from his or her digital wallet and may click on a GUI element to request the unboxing of the pack. As discussed, a pack will define a number of cards. The contents of the pack (e.g., the types of cards) that are "contained" in the pack are determined by a rules system.

At 4302, the unboxing smart contract receives a request to unbox a digital pack 3144, which may be a mystery box. In embodiments, the request may include a unique identifier of the instance of the pack (e.g., the NFT ID, the minting number, and/or the like). The request may further indicate an account of the redeeming user. Upon receiving the request, the unboxing smart contract may unbox the digital pack 3144 according to a set of rules, instructions, commands and the like based on an unboxing recipe defined in the unboxing smart contract, and may burn the NFT representing the specified digital asset (e.g., pack), such that the user cannot trade, sell, or try to re-redeem the unboxed pack.

At 4304, the unboxing smart contract determines a set of tokens to award the owner of the digital pack based on the unboxing rules corresponding to the digital pack. In embodiments, the attributes of the digital pack define the quantity of digital assets to award the unboxing user, and the unboxing rules define weights/probabilities of awarding respective types of digital asset (e.g., a specific type of card) to the user. In an example, if the digital pack is redeemable for ten token-based trading cards, the unboxing smart contract may randomly determine a characteristic, type, or some other aspect for each of the ten token-based cards in the digital pack at unboxing time in accordance with the unboxing rules. In some of these example embodiments, the cards that are generated by the unboxing rules in connection with an unboxing may be all "build level" (or level 0) cards, which are the lowest tier of cards. In some embodiments, the unboxing rules define the probability of each type of card that can be awarded during an unboxing. For example, if there are ten different characters that may appear on a build level card, then the unboxing rules may define ten probabilities. In some implementations, the probabilities are evenly distributed, such that each card has an equal chance of being any of the types. In other implementations, some build level cards may be rarer than others and the probabilities reflect the relative rarity of each type of card (e.g., Ryu card is 5%, Chung-Li is 10%, Blanco is 12%, Ken is 15%, and so on and so forth). As discussed above, the unboxing smart contract may be configured with a set of buckets that represent different ranges of values, whereby each bucket has a non-overlapping range of numbers to which it corresponds. In these embodiments, the unboxing smart contract and associated unboxing rules may leverage a random number generator to determine the type of card to generate. In these embodiments, the unboxing smart contract may generate the random number N and may calculate N modulo M, where M is the overall range of all the buckets (e.g., M=100 if the range is 0-99). For each card to be generated, the unboxing smart contract generates a random number and then determines the type of the card (e.g., template ID) based on the random number and the corresponding range of values in which the random number falls. It is appreciated that the type of cards to be awarded to the user at unboxing may be determined in other suitable means without departing from the scope of the disclosure.

At 4306, the unboxing smart contract and associated unboxing rules may mint one or more NFTs, as described herein, based on the type(s) of cards(s) determined by the unboxing smart contract at 4306. In embodiments, a new NFT may be minted for each a new card, corresponding to the type of the card and/or some characteristic of a card, such as a sub-variant of a given card type. In some of these embodiments, the unboxing smart contract and associated unboxing rules may send a request to generate a new NFT to the minting smart contract, whereby the request indicates an account ID (e.g., of the user that redeemed the pack) and a template ID or a set of attributes of the card to be minted. As discussed above, the minting smart contract mints the new NFT representing the card and assigns the new NFT to the account of the user. The unboxing contract may operate in this manner for each card in the pack (e.g., the unboxing smart contract may repeat steps 4704 and 4706 for each card in the pack). It is noted that in some embodiments, some or all of the digital assets that are awarded to the user may have been pre-minted. In these embodiments, the unboxing smart contract may select a particular pre-minted asset from a set of available assets to award the user instead of minting a new digital asset, as is discussed elsewhere in the disclosure.

In embodiments, the unboxing smart contract burns the NFT representing the digital pack. In some of these embodiments, the unboxing smart contract (or another smart contract) may update the ownership data of the NFT representing the digital pack to NULL or to an inaccessible account, such that the digital pack cannot be traded, sold, or redeemed again.

Figure 44:
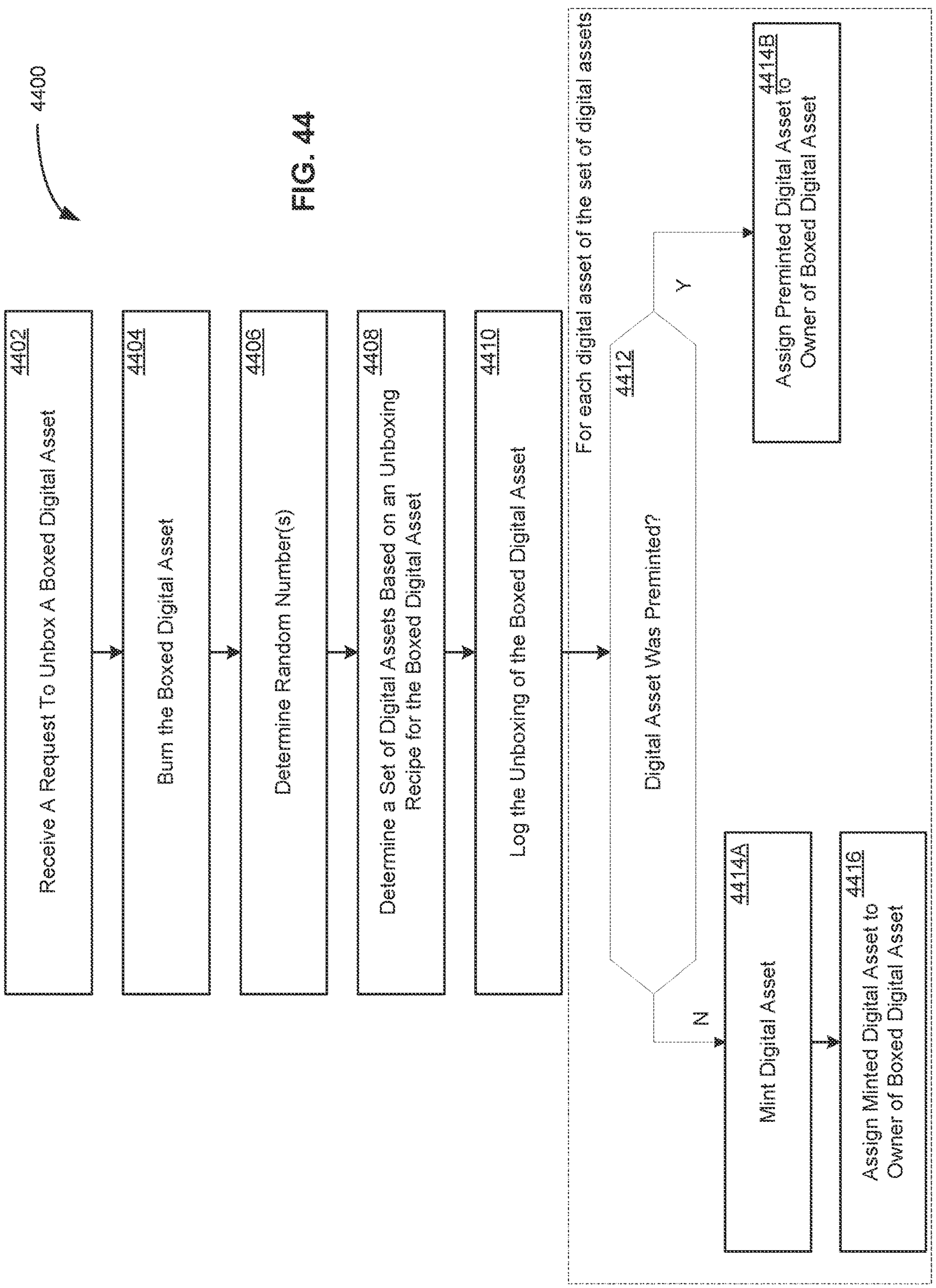
FIG. 44 is a flow chart illustrating an example set of operations of a method for unboxing digital pack tokens according to some embodiments of the present disclosure.

FIG. 44 illustrates a second example method 4400 that may be executed by an unboxing smart contract 3126. It should be understood that a particular unboxing smart contract 3126 may implement the methods of FIGS. 43 and/or 44, as the method of FIG. 44 overlaps with the method of FIG. 43, but includes additional steps, each of which may be optional.

At 4402, the unboxing smart contract 3126 receives a request to unbox a digital pack 3144. The request may come in the form of a distributed ledger transaction invoking a function of the unboxing smart contract (e.g., the unbox function 3526). As part of the transaction involving the request, or in a separate transaction, the digital pack 3144 may be transferred from the owner to the unboxing smart contract. As noted above, the digital pack 3144 may pertain to trading cards or some other type of digital tokens.

At 4404, the unboxing smart contract 3126 may "burn" the digital pack 3144 so that it may no longer be used by any users (i.e., because it was already unboxed). Burning may be accomplished in any suitable manner. For example, the unboxing smart contract may burn the digital pack 3144 by setting the ownership data of the digital pack to NULL or to an address of a "burn account" on the distributed ledger, by marking the "burn" account as the owner of the digital pack 3144 in the asset storage smart contract 3134, by setting a flag (e.g., in the asset storage smart contract 3134) indicating that the digital pack 3144 has been burned and therefore is no longer available for use by any user, by maintaining possession of the digital pack 3144 without transferring it back to the former owner, and/or using some other method. Although depicted as the second step in the method of FIG. 44, the burning step could alternately take place after the unboxing and minting steps described below (e.g., at the end of the method 4400).

At 4406, the unboxing smart contract 3126 may determine one or more random numbers, which may be used to resolve weights and/or probabilities for each collectible token 3142 awarded to the owner of the digital pack 3144. In some embodiments, at 4406 the unboxing smart contract may request and receive a random seed from another smart contract (e.g., from a random number generator smart contract), and the unboxing smart contract may later use the random seed to generate a random number for use in determining each collectible token 3142 using the unboxing recipe. For example, the unboxing smart contract may use the received random seed, RNG data 3514, and the RNG function 3524 to generate 30 random numbers for use in unboxing a digital pack 3144 containing 30 tokens. Additionally or alternatively, the unboxing smart contract may receive multiple random numbers (e.g., 30 random numbers to select 30 tokens to award the user) from a random number generator smart contract, and thus may not need to generate any random numbers on its own.

At 4408, the unboxing smart contract 3126 may use the unboxing recipe corresponding to the digital pack 3144 to determine a set of unboxed digital collectibles 3142. The unboxing smart contract may access a set of unboxing recipes 3512 and, based on one or more identifiers corresponding to the digital pack 3144 (e.g., a collection identifier, a template identifier, etc.), access an unboxing recipe corresponding to the digital pack 3144 to determine one or more attributes. The unboxing smart contract may then use the unboxing recipe to determine the attributes of the digital collectibles 3142 to be awarded to the user. For example, for each unboxed collectible token 3142, the unboxing smart contract may select a template specified by the unboxing recipe given a random number determined at 4406, where the template may specify the attributes of each collectible token. As a specific example, if an unboxing recipe requires a first unboxed collectible token to be selected from a group comprising a first template, a second template, and a third template, then one of the first template, second template, and third template may be selected at 4408 to determine the attributes of the first unboxed collectible token. Each template may be associated with a weight or probability, which may control its odds of being selected. The unboxing smart contract may use a first random number (e.g., the first of 30 random numbers generated for the unboxing of a 30-token digital pack) to resolve these odds and thereby determine which template will be selected for a first unboxed digital collectible. Then, for the second collectible token, the unboxing smart contract may select another template from the same group of templates or from a different group of templates, as specified by the unboxing recipe. This process may iterate until the attributes of each unboxed collectible token have been determined.

Referring to FIG. 38, when unboxing one of the example digital packs 3144, the unboxing smart contract 3126 may select among one or more of the example tokens shown at FIG. 39. An example unboxing recipe for the 10-card digital pack 3144 may specify that 5 of the tokens should be randomly selected from among the tokens shown at FIG. 39 (each of which may have equal weights or different weights), another 4 of the tokens should be selected from a second set (again using the same weights or different weights for the second set), and a final card should be selected from a third set (e.g., of relatively more rare tokens).

In some embodiments, the unboxing smart contract may use a multi-step process to determine the attributes of a collectible token. For example, the unboxing smart contract may use a particular unboxing recipe that causes the smart contract to randomly determine a template (e.g., from a set of templates associated with weights or probabilities), and then to randomly determine a level value for the template (e.g., from a set of levels associated with weights or probabilities). In another example, a particular recipe may cause the unboxing smart contract to first randomly determine a rarity of the collectible token (e.g., common, rare, epic, etc., where each category may be associated with a weight or probability), and then to randomly select a particular template associated with the selected category (where each template may be associated with a weight or probability). Any number of random determinations may be used for any number of attributes in this manner. In these embodiments, a single random number may be used for each random determination corresponding to a given collectible token (e.g., a first random number may be used to determine every attribute for a first collectible token), or separate random numbers may be used for every attribute determination.

In some embodiments, one or more dynamic value attributes may be determined using mathematical formulas, which may be specified in the unboxing recipe. For example, the unboxing smart contract may randomly determine attack and defense values for a collectible token used for a collection associated with a battle game. In these examples, the unboxing smart contract may include mathematical formulas that may specify, for example, a range in which a particular value may fall, a formula for randomly selecting a number in the specified range, and the like. The values for these formulas/rules may be determined by the unboxing smart contract itself and/or the formulas/rules may be passed as arguments to the minting smart contract for resolution by the minting smart contract.

In some embodiments, an unboxing recipe may depend on a supply of issued tokens, in order to adjust the probability of obtaining a particular token as supply changes over time. In these embodiments, the unboxing smart contract may obtain the supply data itself, either from its own data (e.g., from unboxing data 3516) and/or by requesting supply data from another smart contract. Additionally or alternatively, the unboxing smart contract may provide rules for determining the dynamic probabilities to a minting smart contract 3130, which may access data stored at the minting smart contract 3130 (e.g., the supply data 3248) to resolve the probabilities.

At 4410, the unboxing smart contract 3126 may log data associated with the unboxing, including data about the unboxed digital pack 3144 and/or data about each unboxed collectible token 3142. For example, the determined attributes of each unboxed collectible token 3142 may be stored as unboxing data 3516, as well as data about the unboxed digital pack 3144. In embodiments, tallies of various templates, determined attributes, etc. may be updated such that the unboxing data 3516 may indicate how many tokens corresponding to a particular template have been unboxed, how many tokens having particular attributes have been unboxed, and the like.

At 4412, the unboxing smart contract 3126 and/or the minting smart contract 3130 may determine, for each collectible token whose attributes were determined at 4408, whether a collectible token with the corresponding attributes already exists (e.g., whether a particular collectible token was pre-minted and remains available in an asset storage smart contract 3134) or whether a new token needs to be dynamically minted. In some cases, some of the collectible tokens can be taken from pre-minted pools, and others may need to be dynamically minted. In embodiments, the unboxing smart contract 3126 may determine whether a token needs to be dynamically minted or not by referencing data stored in the asset storage smart contract 3134. Additionally or alternatively, the unboxing smart contract 3126 may provide the attributes of each token to the minting smart contract 3130, which may determine whether the specified tokens can be selected from a pre-minted pool or must be dynamically minted.

At 4414A, the unboxing smart contract 3126 may instruct the minting smart contract 3130 to dynamically mint the token by transmitting the attributes necessary for minting the token to the minting smart contract 3130 when a token needs to be dynamically minted. The minting smart contract 3130, in turn, may mint the token using the designated attributes. Then, at 4416, either the unboxing smart contract 3126 or the minting smart contract 3130 may cause the minted token to be transferred to the owner of the unboxed digital pack 3144 (e.g., to the account number from which the digital pack 3144 was received at 4402).

At 4414B, the unboxing smart contract 3126 may select a pre-minted token from a set of pre-minted tokens having the same template ID and may transfer the selected pre-minted token to an account of the owner of the unboxed digital pack 3144 (e.g., to the account number from which the digital pack 3144 was received at 4402). In embodiments, the unboxing smart contract 3126 may update the ownership data of the selected pre-minted token to an account of the user from an account that holds the pre-minted tokens (e.g., asset storage smart contract 3134).

It is appreciated that operation 4414A and/or 4414B may be performed for each digital collectible that is awarded to the owner of the unboxed digital pack 3144.

FIG. 45 illustrates a log of example distributed ledger transaction data 4500 that may be used to carry out the methods of FIGS. 43 and/or 44. As shown in FIG. 45, a first example transaction may include a first action for receiving a digital pack token, a second action for invoking an unbox function of an unboxing smart contract, a third action for boosting an account balance, a fifth action for burning the digital pack 3144, and a fifth action for requesting a random number from a random number generator smart contract. Then, a second example transaction may include a first action for receiving the requested random number, and a second action for logging the unboxing. Then, a third example transaction may include a first action for claiming a collectible token, and a second action for minting the collectible token.

In the first action 4502, the unboxing smart contract 3126 may receive a digital pack 3144 token with a unique identifier (shown as an "asset_ids" value) from a user account (here, an account named "tlxfu.wam"), as described for 4402. Then, in the second action 4504, the unbox function 3526 may be invoked using arguments that specify a collection identifier, a box identifier (which may be the same as a template identifier), and the owner account. In the third action 4506, the owner account may be boosted by transferring fungible tokens to the owner account. In the fourth action 4508, the digital pack 3144 may be burned by setting the ownership data for the digital pack 3144 to a burner account in an asset storage smart contract 3134, as described for 4404. In the fifth action 4510, a random number may be requested from a random number generator smart contract (here called "orng.wax"), as described for 4406.

In the second transaction, in a first action 4512 the unboxing smart contract 3126 may receive the random number from the random number generator smart contract, as described for 4406. The unboxing smart contract 3126 may then be able to determine the set of collectible tokens, as described for 4408 (not shown as transaction data). In a second action 4514, the unboxing smart contract 3126 may log the unboxing data, as described for 4410.

In a third transaction, in a first action 4516 the unboxing smart contract 3126 may claim the first collectible token (e.g., from a pre-minted pool). In a second action 4518, the unboxing smart contract 3126 may transmit the attributes of a first unboxed collectible token to the minting smart contract 3130. In this example, the attributes may be specified by referencing a template and schema, where the template was selected using an unboxing recipe, and the schema matches the selected template. Additionally, a random number seed (which may have been determined based on the random value received at 4512, for example using the RNG function 3524) may be transmitted to the minting smart contract 3130, which may use the random number seed for minting purposes (e.g., to randomly select one of the pre-minted tokens from the pre-minted pool, or in other examples to dynamically mint a token). Although not shown, in other embodiments additional attributes may be passed to the minting smart contract 3130. Additional transactions and/or actions (not shown) may be used to mint other unboxed collectible tokens (e.g., there may be 30 actions similar to action 4518 when a user unboxes a digital pack 3144 containing 30 tokens).

In the example of FIG. 45, the minting smart contract 3130 may be responsible for transferring the minted or pre-minted token to the account associated with the owner of the digital pack 3144. Additional transaction(s), such as shown at FIG. 42, may be used for this purpose.

Figure 46:
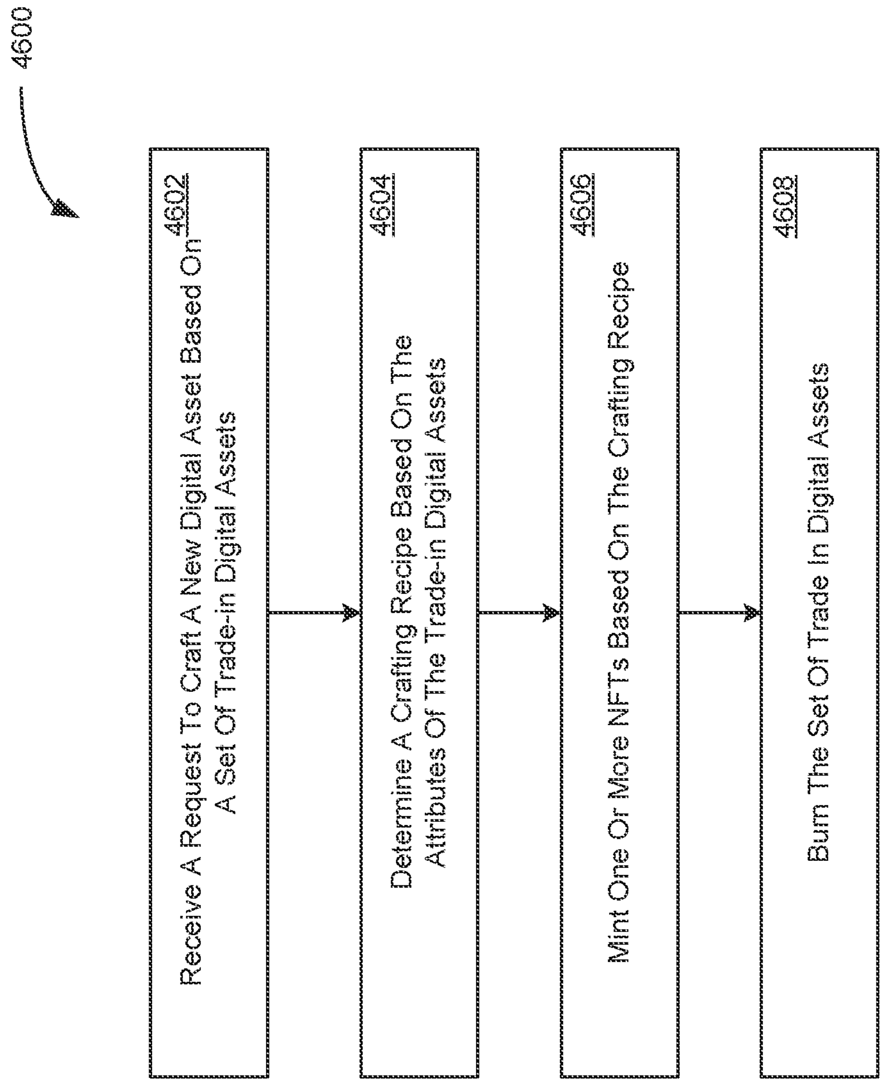
FIG. 46 is a flow chart illustrating an example set of operations of a method for crafting tokens according to some embodiments of the present disclosure.
Figure 49:
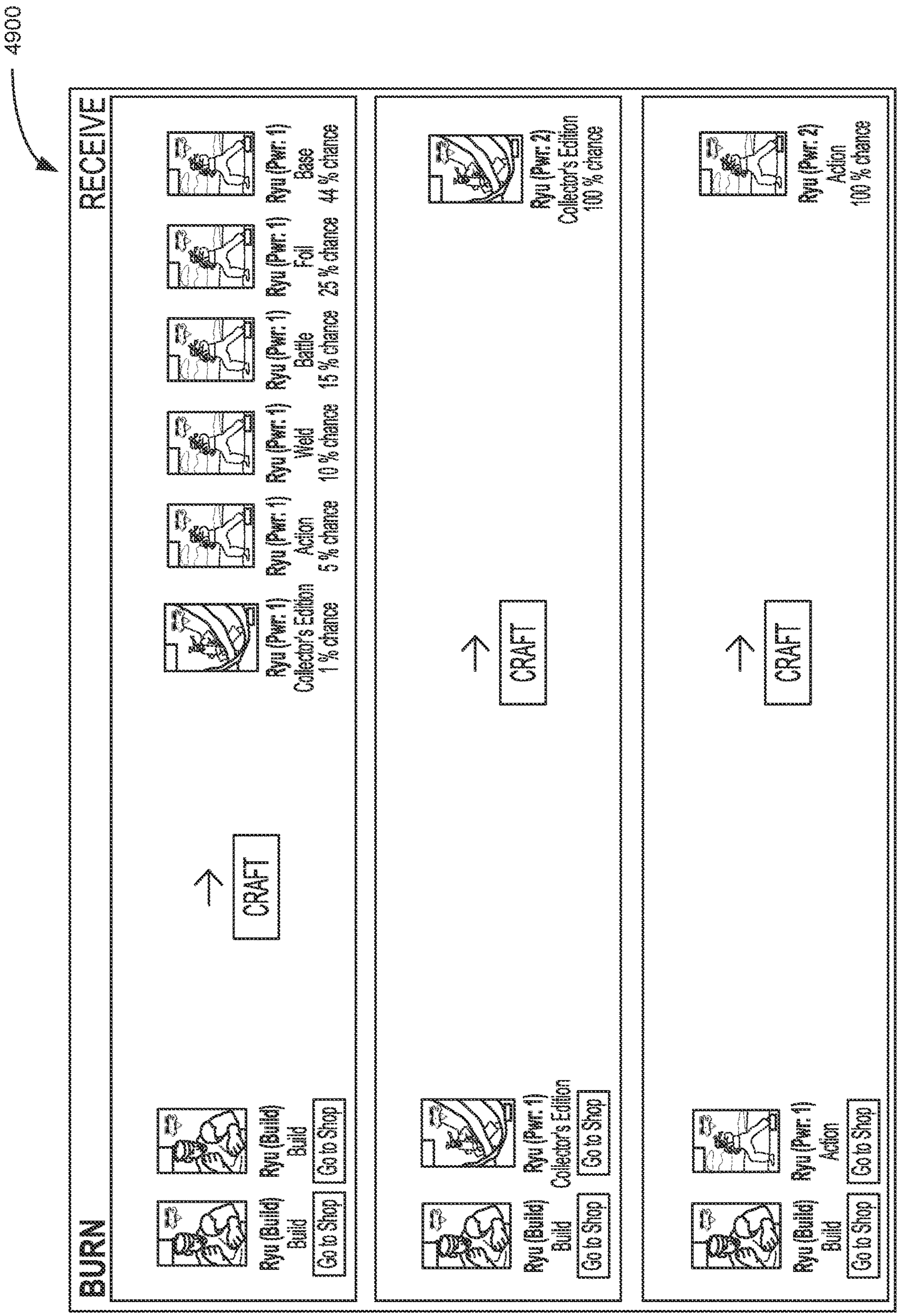
FIG. 49 is an example user interface displaying tokens and crafting recipes, according to some embodiments of the present disclosure.

FIG. 46 illustrates an example method that may be executed by a crafting smart contract to craft a new card based on a set of trade in cards. In embodiments, the crafting smart contract is implicated when a user requests to craft a new card based on two or more tokens (e.g., NFT-based trading cards and/or other types of tokens) that are owned by the requesting user. In embodiments, certain combinations of tokens may be traded in by a user to achieve higher level cards. In embodiments, each combination may correspond to a different crafting recipe that results in a crafted card being awarded to the user (e.g., assigned to an account of the user). FIG. 49 illustrates an example of different crafting recipes. In the examples of FIG. 49, a user may trade in two build level RYU cards to obtain a Level 1 RYU card, whereby the exact type of level 1 RYU card is determined randomly and according to a set of probabilities (e.g., Level 1 RYU Collector's Card with a 1% probability of being generated, Level 1 RYU Action Card with a 5% probability, Level 1 RYU Weld Card with a 10% probability, Level 1 RYU Battle Card with 15% probability, Level 1 RYU Foil Card with a 25% probability, and Level 1 RYU Base Card with a 44% probability). In this example, a user may trade in a Build Level RYU card and a Level 1 RYU Collector's edition card for a level 2 RYU collector's edition card or may trade in a Build Level RYU card and a Level 1 RYU Action card for a level 2 RYU Action card. In embodiments, the recipe for each type of craftable card is defined in the crafting smart contract or is accessible to the crafting smart contract. It is appreciated that the configuring user may define the recipes and probabilities associated with certain types of cards, thereby making different cards more difficult to craft, which may enhance the values of certain cards.

At 4602, the crafting smart contract receives a request to craft a card. In embodiments, the user may select two or more cards to trade in and may initiate the crafting from their digital wallet. The request may indicate the two or more cards (e.g., the identifiers of the two or more NFTs) and may indicate an account of the user that is crafting the new card. In response to receiving the request, the crafting smart contract may temporarily lock (e.g., escrow) the two or more cards being traded in, such that the user cannot sell, trade, or otherwise try to trade in the two or more cards during the crafting operation.

At 4604, the crafting smart contract determines a recipe corresponding to the request. In embodiments, the recipe corresponds to the types of the combination of cards being traded in. For example, if the user is trading in two build level RYU cards, the crafting smart contract may determine a first crafting recipe, but if a user is trading in two build level Ken cards, the crafting smart contract may determine a second crafting recipe. In embodiments, the crafting smart contract may leverage a lookup table that indexes crafting recipes to combinations of card types. Alternatively, the digital wallet may be configured to determine which crafting recipe to use (e.g., based on the user's selection of cards) and may indicate the crafting recipe in the request.

At 4606, the crafting smart contract mints one or more NFTs based on the crafting recipe. Depending on the crafting recipe, the crafting smart contract will determine a type of card (or types of cards) that are to be generated. In some recipes, the type of card(s) that is/are generated is predetermined based on the combination of cards being traded in. For example, a user may trade in a Build Level RYU card and a Level 1 RYU Collector's edition card for a level 2 RYU collector's edition card. In other recipes, the type of card that is generated is determined in a probabilistic manner. For example, trading in two build level cards (e.g., two RYU build level cards) may implicate a recipe where the type of card that is traded in may be determined based on a randomly generated number and a set of buckets corresponding to different probabilities of each type of card (e.g., Level 1 RYU Collector's Card with a 1% probability of being generated, Level 1 RYU Action Card with a 5% probability, Level 1 RYU Weld Card with a 10% probability, Level 1 RYU Battle Card with 15% probability, Level 1 RYU Foil Card with a 25% probability, and Level 1 RYU Base Card with a 44% probability). In these scenarios, the crafting smart contract generates a random number and then determines a bucket corresponding to the random number (e.g., using N modulo M as discussed above), whereby the bucket indicates the type of card to be generated. It is noted that in some recipes, two or more cards may be crafted. In these implementations, the recipe may indicate one or more types of cards that are generated 100% of the time and may further define one or more types of cards that are determined probabilistically.

In response to determining the type of card that is to be generated, the crafting smart contract mints the new card. In some of these embodiments, the crafting smart contract requests a new NFT from the minting smart contract. In these embodiments, the crafting smart contract sends a request to generate a new NFT to the minting smart contract, whereby the request indicates an account ID (e.g., of the user that redeemed the pack) and a template ID or a set of attributes of the card to be minted, whereby the template ID or the set of attributes indicate the type of card to be generated. As discussed above, the minting smart contract may mint the new NFT representing the card and may assign the new NFT to the account of the user. Alternatively, the crafting smart contract may select a pre-minted NFT representing the card and may assign the selected NFT to the account of the user, as described above. The crafting smart contract may repeat this step if more than one cards are to be crafted during a trade in.

At 4608 the crafting smart contract burns the NFTs representing the traded in cards. In these embodiments, the crafting smart contract (or another smart contract) may destroy the NFTs that were locked (e.g., at 4602) such that the NFTs cannot be traded, sold, or redeemed again.

Figure 47:
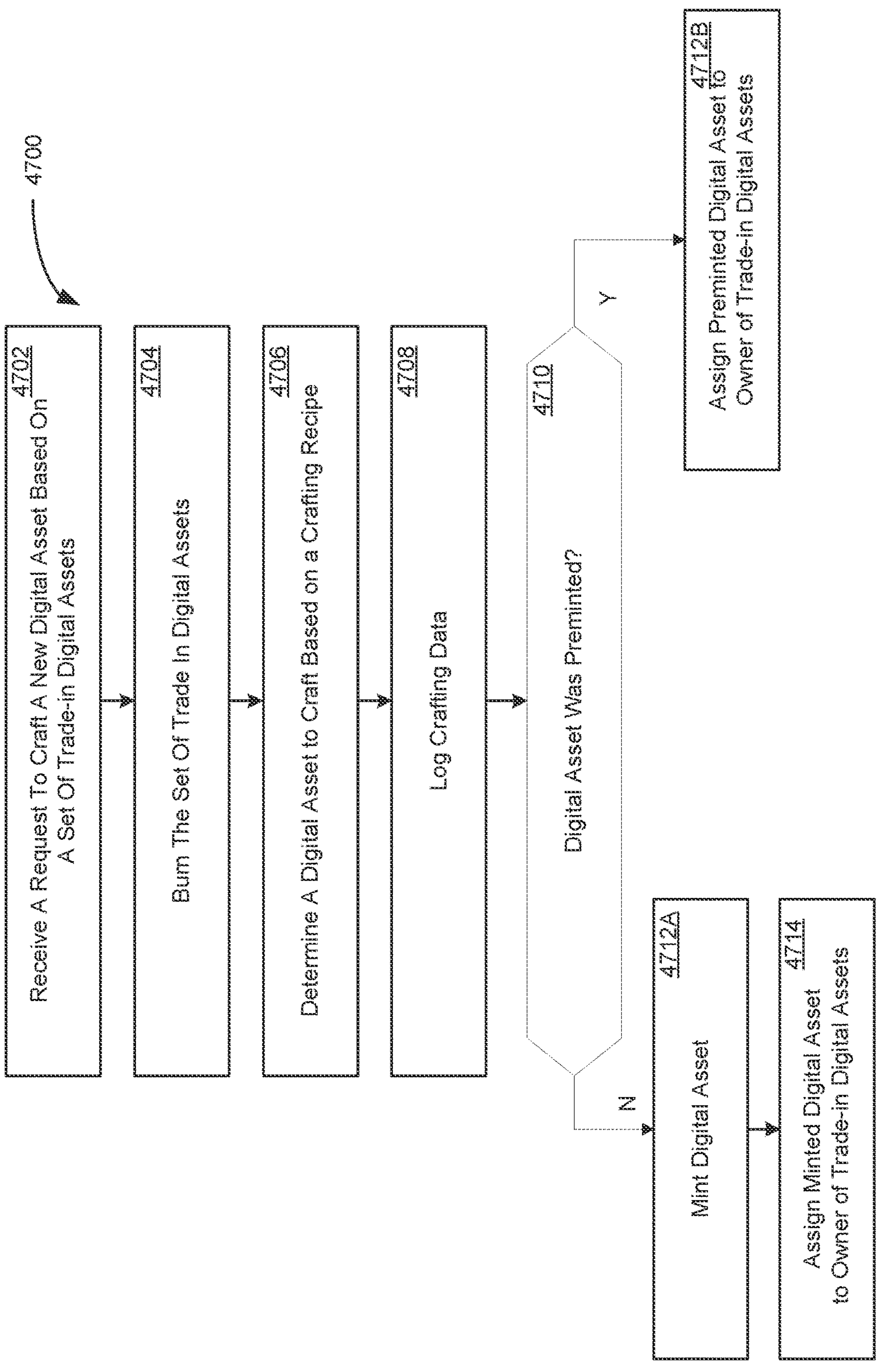
FIG. 47 is a flow chart illustrating an example set of operations of a method for crafting tokens according to some embodiments of the present disclosure.

FIG. 47 illustrates a second example method 4700 that may be executed by an example crafting smart contract 3128. It should be understood that a particular crafting smart contract 3128 may implement the methods of FIGS. 46 and/or 47, as the method of FIG. 47 overlaps with the method of FIG. 46, but includes additional steps, each of which may be optional.

At 4702, the crafting smart contract 3128 receives a request to craft a new collectible token 3142 (e.g., a new digital asset) based on a set of one or more component collectible tokens 3142 (e.g., trade-in digital assets). The request may come in the form of a distributed ledger transaction invoking a function of the crafting smart contract (e.g., the craft function 3426). As part of the transaction involving the request, or in a separate transaction, the component collectible tokens 3142 may be transferred from the owner to the crafting smart contract.

At 4704, the crafting smart contract 3128 may "burn" the component collectible tokens 3142 so that they may no longer be used by any users. Burning may be accomplished in any suitable manner. For example, the crafting smart contract may burn the component collectible tokens 3142 by setting the ownership data of the collectible tokens 3142 to NULL or to an address of a "burn account" on the distributed ledger, by marking the "burn" account as the owner of the collectible tokens 3142 in the asset storage smart contract 3134, by setting a flag (e.g., in the asset storage smart contract 3134) indicating that the collectible tokens 3142 have been burned and therefore are no longer available for use by any user, by maintaining possession of the collectible tokens 3142 without transferring them back to the former owner, and/or using some other method. Although depicted as the second step in the method of FIG. 47, the burning step could alternately take place after the crafting and minting steps described below (e.g., at the end of the method 4700).

At 4706, the crafting smart contract 3128 may use the crafting recipe corresponding to the combination of collectible tokens 3142 to determine a crafted digital collectible 3142. The crafting smart contract may access a set of stored crafting recipes 3412 and, based on one or more identifiers corresponding to the component collectible tokens 3142 (e.g., a collection identifier, a template identifier for each component collectible token, etc.), access a matching crafting recipe that uses the received collectible tokens 3142 as components. The crafting smart contract may then use the crafting recipe to determine one or more attributes of the crafted digital collectible 3142.

In some implementations, the crafting smart contract may select a template specified by the crafting recipe from a set of selectable templates, where each respective template may specify the respective attributes of a respective collectible token. As a specific example, if a crafting recipe requires a crafted collectible token to be selected from a group comprising a first template, a second template, and a third template, then one of the first template, second template, and third template may be selected at 4408 to determine the attributes of the crafted collectible token. Each template may be associated with a weight or probability, which may control its odds of being selected. The crafting smart contract may use a random number to resolve these odds and thereby determine which template will be selected for the crafted digital collectible. In some embodiments, the crafting smart contract may request and receive a random seed from another smart contract (e.g., from a random number generator smart contract), and the crafting smart contract may use the random seed to generate a random number for use in determining the template from the set of selectable templates using the crafting recipe. For example, the crafting smart contract may use the received random seed, RNG data 3414, and the RNG function 3424 to generate a random number for use in crafting. The crafting smart contract may then select a template from the set of templates based on the random number and the crafting recipe, as described above.

Referring to the first example crafting recipe shown at FIG. 49, the crafting smart contract 3128, after receiving two "Ryu (Build)" tokens, may access the first crafting recipe that specifies a 1% of crafting a collector's edition Ryu level 1 card, a 5% chance of crafting an Action Ryu level 1 card, and the like as shown in the example user interface 4900. The probabilities may be specified in the recipe using weights, such as a weight of 100 for the first card, a weight of 500 for the second card, and the like. The crafting smart contract 3128 may use the random number determined at 3706 to select one of the cards (e.g., it may calculate the random number modulo the sum of the weights, then round up to the closest weight).

It is appreciated that some recipes do not require random selection of a template. For instance, in the example of FIG. 49, the higher-level recipes (e.g., from Level 1 to Level 2, from Level 2 to Level 3, etc.), the crafting recipes may define a specific type of collectible token that is crafted given a specific combination of lower-level cards. In these scenarios, the crafting smart contract may determine the specific type of collectible token to award the user given the provided combination of collectible tokens provided by the user for crafting.

In some embodiments, one or more dynamic value attributes may be determined using mathematical formulas, which may be specified in the crafting recipe. For example, the crafting smart contract may randomly determine attack and defense values for a crafted collectible token used for a collection associated with a battle game. In these examples, the crafting recipe may include mathematical formulas that may specify, for example, a range in which a particular value may fall, a formula for randomly selecting a number in the specified range, and the like.

At 4708, the crafting smart contract 3128 may log data associated with the crafting, including data about the component collectible tokens 3142 and/or data about each crafted collectible token 3142. For example, the determined attributes of each crafted collectible token 3142 may be stored as crafting data 3416. In embodiments, tallies of various templates, determined attributes, etc. may be updated such that the crafting data 3416 may indicate how many tokens corresponding to a particular template have been crafted, how many tokens having particular attributes have been crafted, and the like.

At 4710, the crafting smart contract 3128 and/or the minting smart contract 3130 may determine whether a collectible token matching the attributes determined at 4706 already exists (e.g., whether a particular collectible token was pre-minted and remains available in an asset storage smart contract 3134) or whether a new token needs to be dynamically minted. In embodiments, the crafting smart contract 3128 may determine whether a token needs to be dynamically minted or not by referencing data stored in the asset storage smart contract 3134. Additionally or alternatively, the crafting smart contract 3128 may provide the attributes determined at 4706 to the minting smart contract 3130, which may determine whether a matching token can be taken from a pre-minted pool or must be dynamically minted.

At 4712A, the crafting smart contract 3128 may instruct the minting smart contract 3130 to dynamically mint the token by transmitting the attributes necessary for minting the token to the minting smart contract 3130 when a token needs to be dynamically minted. The minting smart contract 3130, in turn, may mint the token using the designated attributes. Then, at 4714, either the crafting smart contract 3128 or the minting smart contract 3130 may cause the minted token to be transferred to the owner of the component collectible tokens 3142 (e.g., to the account number from which the collectible tokens 3142 were received at 4702).

At 4712B, the crafting smart contract 3128 may select a pre-minted token from a set of pre-minted tokens having the same template ID and may transfer the pre-minted token an account of the owner of the component collectible tokens 3142 (e.g., to the account number from which the collectible tokens 3142 were received at 4702). In embodiments, the crafting smart contract 3128 may update the ownership data of the selected pre-minted token to an account of the user that holds the pre-minted tokens (e.g., asset storage smart contract 3134).

The method of FIG. 47 is provided for example only and additional or alternative methods may be implemented in a crafting smart contract without departing from the scope of the disclosure. Furthermore, it is noted that in some embodiments, the crafting smart contract may include recipes for crafting tokens that are cryptographically linked to physical items (e.g., collectible goods, action figures, sports memorabilia, clothing items, and/or the like). In this way, users may trade in lower-level tokens to earn an NFT (e.g., VIRL) that can be redeemed for a respective item or set of items. Additionally or alternatively, the crafting smart contract may include crafting recipes for crafting collectible tokens (e.g., NFT-based cards) that can be integrated into a video game. In these embodiments, a user may craft lower-level cards (e.g., NFTs) to obtain a higher-level card that can be integrated into a video game. Once the user is awarded the higher-level card, the user may then access the card from their wallet and may use the higher-level card in the corresponding video game (e.g., via the video game integration system 808) to unlock special characters, unlock special powers (e.g., for the character depicted in the card), enhance game play, or unlock other suitable in-game enhancements.

FIG. 48 illustrates a log of example distributed ledger transaction data 4800 that may be used to carry out the methods of FIGS. 46 and/or 47. As shown in FIG. 48, a first example transaction may include a first action for receiving two collectible tokens, a second action for invoking a craft function of a crafting smart contract, a third action for boosting an account balance, fourth and fifth actions for burning the two component collectible tokens, and a sixth action for requesting a random number from a random number generator smart contract. Then, a second example transaction may include a first action for receiving the requested random number, and a second action for logging the crafting. Then, a third example transaction may include a first action for claiming a collectible token, and a second action for minting the collectible token.

In the first action 4802, the crafting smart contract 3128 may receive two collectible tokens 3142, each with a unique identifier (shown as two "asset_ids" values), from a user account (here, an account named "hcmb.wam"), as described for 4702. Then, in the second action 4804, the craft function 3426 may be invoked using arguments that specify a collection identifier, a recipe identifier, and the owner account. In the third action 4806, the owner account may be boosted by transferring fungible tokens to the owner account. In the fourth action 4808 and fifth action 4810, the component collectible tokens 3142 may be burned (e.g., by setting the ownership data for the component collectible tokens 3142 to a burner account in an asset storage smart contract 3134), as described for 4704. In the sixth action 4812, a random number may be requested from a random number generator smart contract (here called "orng.wax"), as described for 4706.

In the second transaction, in a first action 4814 the crafting smart contract 3128 may receive the random number from the random number generator smart contract, as described for 4706. The crafting smart contract 3128 may then be able to determine the crafted collectible token, as described for 4708 (not shown as transaction data). In a second action 4816, the crafting smart contract 3128 may log the crafting data, as described for 4710.

In a third transaction and in a first action 4818, the crafting smart contract 3128 may claim the crafted collectible token (e.g., from a pre-minted pool). In a second action 4820, the crafting smart contract 3128 may transmit the attributes of the crafted collectible token to the minting smart contract 3130. In this example, the attributes may be specified by referencing a template and schema, where the template was selected using a crafting recipe, and the schema matches the selected template. Additionally, a random number seed (which may have been determined based on the random value received at 4712, for example using the RNG function 3424) may be transmitted to the minting smart contract 3130, which may use the random number seed for minting purposes (e.g., to randomly select one of the pre-minted tokens from the pre-minted pool, or in other examples to dynamically mint a token).

In the example of FIG. 48, the minting smart contract 3130 may be responsible for transferring the minted or pre-minted token to the account associated with the owner of the component collectible tokens 3142. Additional transaction(s), such as shown at FIG. 42, may be used for this purpose.

In embodiments, the tokenization platform 100 and/or mystery box system 806 may provide one or more user interfaces that allow user devices 3102 to purchase tokens from token collections, view their tokens (e.g., in a wallet), sell or trade their tokens, craft their tokens, unbox their tokens, redeem their tokens for real-world items, and the like. These user interfaces may be in the form of websites or applications made available for download to the user devices 3102. The user interfaces may be part of various types of applications, such games, virtual reality applications, or the like. In embodiments where the token collections are integrated as part of a game, the video game integration system 808 may render at least part of the user interface (e.g., by rendering the tokens as interactive items within a game, virtual reality application, or the like).

FIG. 49 shows an example user interface 4900 that may be used by a user device 3102 to specify which tokens the user wishes to use for crafting, to view the potential crafting outcomes, and to indicate that the user wishes to use the crafting smart contract 3128 to perform crafting. In some embodiments, the example user interface 4900 may be provided to the user device 3102 by the tokenization platform 100. In these cases, the example user interface 4900 may be generated by the mystery box system 806 of the tokenization platform 100.

In some embodiments, to render the user interface 4900, the user device 3102 and/or tokenization platform 100 may communicate with node devices 3110 in order to request and receive data from the distributed ledgers. For example, to render the user interface 4900, the user device 3102 and/or tokenization platform 100 may request crafting recipes 3412 from the crafting smart contract 3128, which may be used to configure the user interface 4900.

Additionally or alternatively, to render the example user interface 4900, the user device 3102 and/or tokenization platform 100 may communicate with a user's digital wallet 3104 (or some other wallet, e.g., a cloud wallet implemented by the tokenization platform 100) in order to obtain data about collectible tokens associated with the user. Additionally or alternatively, the user device 3102 and/or tokenization platform 100 may communicate with node devices 3110 in order to receive data from the asset storage smart contract 3134 indicating which collectible tokens are associated with a user account. Then, using this data, the example user interface 4900 may determine which crafting recipes a player is able to use (e.g., because they have the correct component collectible tokens) and provide a selectable list of these crafting recipes, as shown in the example user interface 4900.

A user of the user device 3102 may use the user interface 4900 to invoke the crafting functionality of the crafting smart contract 3128. For example, a user may select the "Craft" button, which may cause the user device 3102 and/or tokenization platform 100 to communicate with the node devices 3110 to generate one or more transactions on the distributed ledgers. For example, the user device 3102 and/or tokenization platform 100 may cause a first transaction that transmits component collectible tokens to a crafting smart contract, invokes a craft function of the crafting smart contract, boosts a user account, burns the component collectible tokens, and requests a random number from a random number generator smart contract, as discussed above with respect to FIG. 48. The crafting process may then proceed as discussed above with respect to FIGS. 46-48.

It is appreciated that the example crafting recipes of FIG. 49 are provided for example only and that a creator of a digital token collection may define any suitable combination of crafting rules in support thereof.

Figure 50:
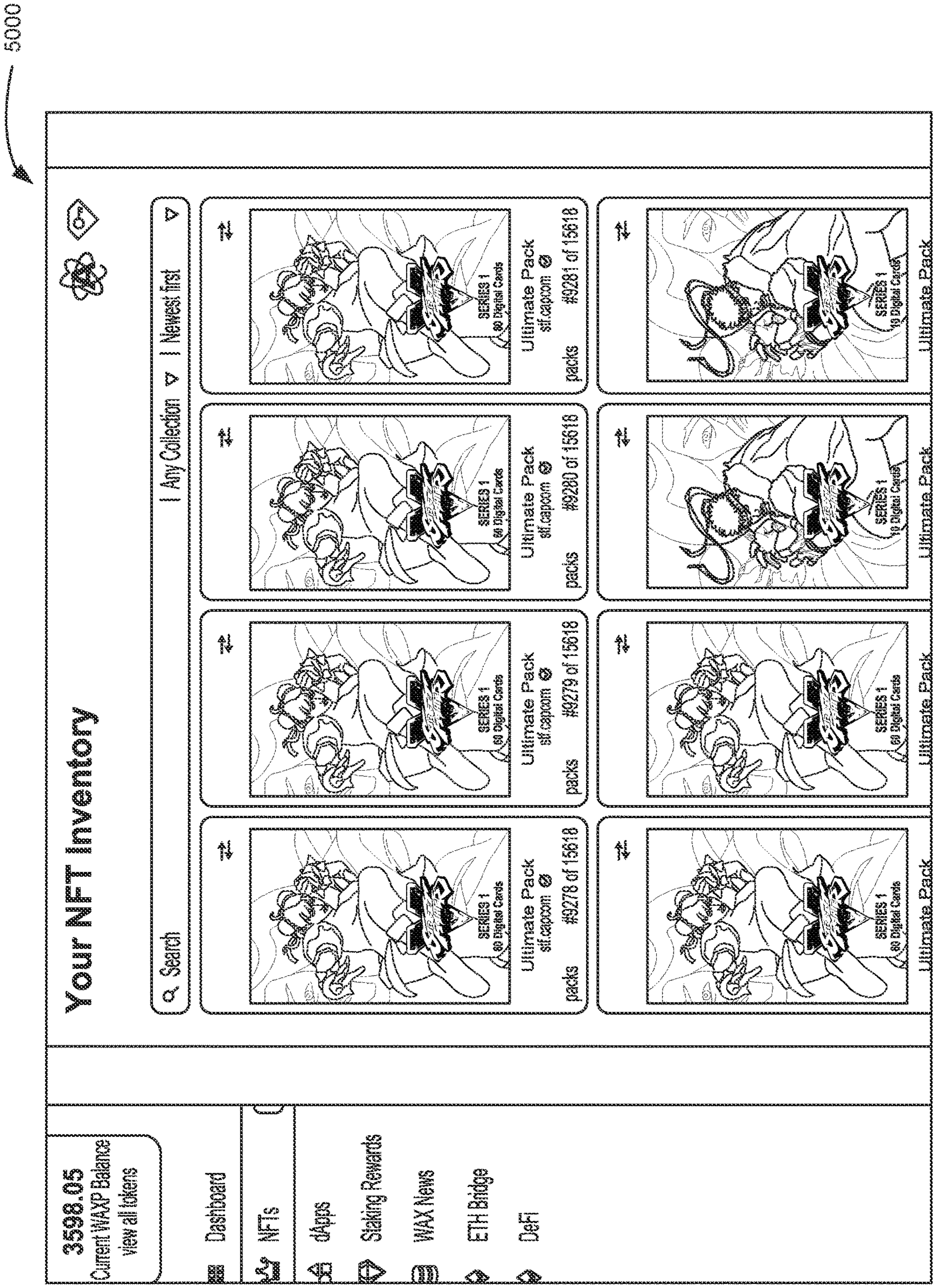
FIG. 50 is an example user interface displaying tokens within a digital wallet, according to some embodiments of the present disclosure.

FIG. 50 further illustrates a user interface 5000 for browsing a user's digital wallet, which may contain various collectible tokens 3142, digital packs 3144, and any other tokens (e.g., fungible tokens) associated with a user account. In embodiments, the tokenization platform 100 may be configured to generate the user interface 5000 for access by the user device 3102. To render the example user interface 5000, the user device 3102 and/or tokenization platform 100 may communicate with a user's digital wallet 3104 (or some other wallet, e.g., a cloud wallet implemented by the tokenization platform 100) in order to obtain data about collectible tokens 3142, digital packs 3144, and/or other tokens owned by the user. Additionally or alternatively, the user device 3102 and/or tokenization platform 100 may communicate with node devices 3110 in order to receive data from the asset storage smart contract 3134 indicating which tokens are associated with a user account and various data associated with each token. Then, using this data, the example user interface 5000 may display the tokens, which may entail display of any media assets associated with the token (e.g., by following IPFS links), display of a name of the token, display of a mint number of the token, and the like.

In some embodiments, the example user interface 5000 may include a function for selecting a particular digital pack 3144 and then selecting an unbox option to cause unboxing of the digital pack 3144. For example, a user may select an "Unbox" button, which may cause the user device 3102 and/or tokenization platform 100 to communicate with the node devices 3110 to generate one or more transactions on the distributed ledgers. For example, the user device 3102 and/or tokenization platform 100 may cause a first transaction that transmits the digital pack 3144 to an unboxing smart contract, invokes an unbox function of the unboxing smart contract, boosts a user account, burns the digital pack token, and requests a random number from a random number generator smart contract, as discussed above with respect to FIG. 45. The crafting process may then proceed as discussed above with respect to FIGS. 43-45.

As noted above, the analytics and reporting system 112 may be responsible for generating some or all of the analytics data, which may be stored in the asset storage smart contract 3134, within the storage of the tokenization platform 100, and/or elsewhere. The analytics and reporting system 112 may obtain the data for generating analytics by reading and storing the minting data 3218 of the minting smart contract, the crafting data 3416 of the crafting smart contract 3128, the unboxing data 3516 of the unboxing smart contract 3510, and other data logs obtained from other smart contracts, as well as by reading the collection data stored in the asset storage smart contract 3134, by monitoring sales or trades on the marketplace 3106, and the like.

The analytics data may be provided at several levels. At a highest level, the analytics and reporting system 112 may provide analytics data about token collections as a whole. For example, analytics and reporting system 112 may generate analytics data comprising a total issued number of tokens for a given collection, an average price for all collection tokens sold via a marketplace 3106, a total available supply, a total issued supply, or total maximum supply for all tokens, a total number of VIRL tokens redeemed, a total number of real-world items available to be redeemed, and the like. The analytics and reporting system 112 may further generate one or more popularity factors that may measure the amount of activity for a particular collection, including minting activity, sales activity, unboxing activity, crafting activity, redemption activity, and the like.

At a slightly lower level, the analytics and reporting system 112 may generate analytics data corresponding to various types of tokens, such as various schemas, templates, attributes, or groups of attributes. For example, the analytics and reporting system 112 may monitor which types of tokens are most popular according to the various popularity factors mentioned above, which types cause a token to increase or decrease in value on a marketplace, average prices for various types, supply information for various types (e.g., available supply, issued supply, maximum supply), and the like. Furthermore, the analytics and reporting system 112 may keep logs of changes in value, popularity, supply, or other measurements for different types of tokens over time.

The analytics and reporting system 112 may further generate probability data that measure the probability of obtaining a particular type of token. For example, the analytics and reporting system 112 may read crafting recipes 3412 or unboxing recipes 3512 to determine the probability of obtaining a particular token when performing certain actions (e.g., when unboxing a particular digital pack 3144). Such information may be provided to user devices upon request. In embodiments, the analytics and reporting system 112 may take into account dynamic recipes that change the probability of obtaining a particular token based upon supply data. In these cases, the analytics and reporting system 112 may obtain the recipe probabilities (including any associated rules for adjusting the probability up or down based on supply data), may obtain the supply data, and may determine the adjusted probabilities based at least on the recipe data and the supply data.

The analytics and reporting system 112 may further generate analytics data indicating the current usage of tokens of various types, such as percentages or totals of a particular type that have been sold, traded, burned, unboxed, used in crafting, levelled up, redeemed, or the like. The analytics and reporting system 112 may further generate statistics indicating a current usage of tokens of a particular type, such as percentages or totals of tokens that are in user's wallets, that are in various smart contract accounts, that are listed for sale or trade on the marketplace 3106, that are available for purchase, and the like. In some cases, the analytics and reporting system 112 may use data indicating that a token is listed on a marketplace, stored in a smart contract, or the like to adjust the supply data for that token (e.g., to indicate that fewer tokens are currently available), which may impact recipes and other functions that depend on supply data.

At a lower level, the analytics and reporting system 112 may further generate token-specific analytics data. For example, the analytics and reporting system 112 may generate data indicating which mint number tokens are available for sale or trade (e.g., via the marketplace 3106). Furthermore, the analytics and reporting system 112 may determine the probability of obtaining cards having a particular mint number or other particular desired attribute when using a particular unboxing or crafting recipe. For example, if a particular #1 mint number card is available along with 19 other cards of the same type in a pre-minted pool (e.g., so there is a 5% chance of randomly selecting the card from the pre-minted pool), the analytics and reporting system 112 may determine that an unboxing recipe has a 50% chance of selecting one card of the given type, and thus an overall 2.5% chance of obtaining the specified #1 mint number card when the unboxing recipe is used. Such data may be provided to users to give them more information about their likelihood of obtaining a particular desired card when unboxing a particular digital pack 3144. Additionally or alternatively, the analytics and reporting system 112 may use the likelihood of obtaining one or more particular rare or valuable cards (e.g., a #1 mint card) to determine a projected sales value of the unopened digital pack 3144 (e.g., by adjusting the value upwards as the likelihood of obtaining particularly rare or valuable cards increases). The projected sales value data may be provided to user devices 3102 (e.g., for use in deciding whether to sell, trade, or unbox a digital pack 3144), to marketplaces 3106 (e.g., to determine an opening bid, minimum bid, buy-it-now price, etc.), or the like.

In some cases, the analytics and reporting system 112 may provide user-specific analytics data based on requests received from user devices 3102. For example, a user device may request a probability of receiving a particular desired token or type of desired token if the user opens all of the user's digital packs 3144, where the request may indicate how many and what type of digital packs 3144 are owned by the user. The analytics and reporting system 112 may then generate the probabilities of obtaining the particular desired token for each digital pack owned by the user (e.g., taking into account supply data in embodiments where supply data impacts recipes) and combine the various probabilities to obtain an overall probability, which it may transmit to the user device 3102 in response to the request. Similarly, the analytics and reporting system 112 may generate predictions indicating whether levelling up or otherwise using a particular card in crafting is likely to yield a more valuable card or not. For example, when a user has a BUILD card of a low mint number, the card may have a particular estimated sales value (e.g., as determined by the analytics and reporting system 112 based on sales of similar or same type of tokens with similar mint numbers), so the user may be unsure of whether to level up the BUILD card to a level 1 card, because a low mint number level 1 card may be more valuable than the BUILD card the user already has, but a high mint number level 1 card may be less valuable than the low mint number BUILD card. In such a case, the analytics and reporting system 112 may receive a user request indicating the user's token and a crafting recipe, may determine a projected value of the user's token, may determine one or more probabilities of obtaining various cards using the crafting recipe, and may estimate the projected values of each card that may be obtained using the crafting recipe, in order to generate a probability distribution indicating the likelihood of obtaining a more valuable card based on the probabilities of obtaining each token and the projected values of each token. In another example, the analytics and reporting system 112 receive a request from a user indicating that the user wishes to view the likelihood of obtaining a token associated with a particular range of values (e.g., a mint number of less than a certain number, a value of more than a certain number, a certain combination of preferred attributes, etc.), and the analytics and reporting system 112 may calculate the probability of obtaining the request token when using a particular recipe using techniques similar to those described above.

The analytics and reporting system 112 may make any of the analytics data available to various smart contracts, which may use the analytics data to adjust dynamic weights or probabilities in various recipes. To make the analytics data easily available to the various smart contracts, the analytics and reporting system 112 may regularly update analytics data 3306 stored in a smart contract (e.g., the asset storage smart contract 3134), where it may be obtained by another smart contract as necessary.

The foregoing methods provide example implementations and may include additional or alternative steps without departing from the scope of the disclosure. Furthermore, in some embodiments, a single smart contract may perform multiple functions (e.g., an unboxing smart contract or a crafting smart contract may also mint new NFTs).

As can be appreciated, the foregoing framework provides a mechanism to generate new NFTs and/or to combine NFTs owned by the user to create a new "higher level" NFT. In some scenarios, the type of the new NFT is determined in a probabilistic manner (e.g., using a random number generator), such that the rarity of the new NFT depends on a relative probability assigned to the type of the new NFT (e.g., as defined in the crafting recipe).

In some embodiments, the level of a card (e.g., the "Final Card") may be increased from a Build card to a highest-level card (e.g., level 5 or "powerscore 5"). In some of these embodiments, to increase a Final card Powerscore, a user combines a Final card with one of the originally issued NFT Build cards of the same character to reach a next level card. In some embodiments, reaching the maximum powerscore level (e.g., powerscore 5) unlocks a class card. In some of these embodiments, the type of the Class card may be randomly generated (e.g., using a random number generator) and may result in cards having different rarities. In some of these embodiments, unlocking the class card does not result in the burning of the highest-level card, but is rather awarded as a bonus whereby the user keeps the highest-level card and the class card.

NFT-Casino Gaming

In some embodiments, the tokenization platform 100 (e.g., the mystery box system 806) is configured to facilitate gamified NFT mystery boxes, NFT games and the like. In some of these embodiments, the NFT mystery boxes may incorporate casino-style gamification, wherein probabilities, conditional probabilities, random selection and the like determine game play and outcomes including in a manner that incorporates elements of games of chance such as a slot machine, roulette and the like to the unpacking and crafting of NFTs. In embodiments, an "NFT mystery box" may refer to a mystery box that is configured with a smart contract that awards one or more NFTs from a set of winnable NFTs, each of which is associated with a digital and/or physical card, or other item, that potentially can be won by a player. In embodiments, each winnable NFT represents a different digital card or a physical item that can be redeemed using the NFT. It is noted that the winnable NFTs may be pre-minted (e.g., minted before the release of the NFT mystery box, such that there is a finite number of winnable NFTs) or minted at unpacking (e.g., where a minting smart contract mints the NFTs in accordance with an unboxing recipe when the user unpacks the mystery box). In some embodiments, an NFT mystery box (also referred to as a "pack" of cards) may be "unpacked" to reveal a set of won NFTs, whereby one or more of the won NFTs may include elements of animation that are casino-themed, such as animation mimicking the movement of graphic icons on slot machine wheels, the spinning of a roulette wheel, the dealing of a blackjack hand, or the like. The outcomes of the animation (e.g., the icon or other visual element presented at the conclusion of the animation sequence) may determine a set of crafting rules, as described herein. The crafting rules may determine token/card sequences, combinations, additions and the like that may be redeemed for a digital and/or physical item. In an example, redemption may be for coins, cards, passcodes or some other authorization means accepted by a physical slot machine or other gaming device, where the coins, cards, passcodes or some other authorization means permits the user to play the physical slot machine or other gaming device. In embodiments, each token may have a different probability of being selected. In some embodiments, each token may be assigned a range of numbers, where the range of numbers for each token reflects the probability of being won by a player. For example, if there are three tokens, where the first token has a 5% chance of being won, the second token has a 25% chance of being won, and the third token has a 35% chance of being won, and there is a 35% chance of no token being won, the first token may be assigned 1-5, the second token may be assigned 6-35, and the third token may be assigned 36-65. In this example, the range of values that may be selected is 1-100. A player may pay for a chance to win an item in the NFT game. In some embodiments, the odds of winning each token, and an item, such as a card represented by the token, may be depicted in relation to the NFT game. In this way, players may be informed on their chances of winning the various items, cards, and the like.

In response to receiving a payment from a player, the mystery box system may generate a random number that is bound by the overall range of values for the NFT game (e.g. 1-100). The mystery box system 806 may then determine which token, for example associated with a card or card pack, if any, was won by a player based on the random number. For example, an NFT game may be slot machine-themed, whereby the NFT game includes a first token representing the number "7," a second token representing a pair of cherries, a third token representing a lemon, and a plurality of random other tokens representing other images. In this example, probabilities may be set by the tokenization platform to determine the frequency of each token type being presented within the NFT game.

In embodiments, a crafting recipe, as described herein, may be associated with the tokens representing the slot machine-themed symbols and/or tokens representing a pack of a plurality of slot machine-themed symbols. Each pack or card may be represented by a respective NFT (which may have a unique ID and a mint number associated therewith) and may have an associated symbol that designates the type of card. It is appreciated that multiple cards may be of the same type, but nevertheless may be backed by different NFTs. Furthermore, in embodiments, the slot machine symbol cards may be organized according into levels according to a predetermined hierarchy, for example build cards, whereby the users may craft higher level cards according to a set of rules defined in a respective crafting recipe that defines which cards may be combined to obtain the newer higher-level cards. In some embodiments, within a level of the slot machine-themed symbol cards there may be different types of cards within that level and each card may have a relative rarity (e.g., some cards might be rarer than others). In some embodiments, the rarity of respective cards may be controlled by the logic with which a respective smart contract is configured. For example, there may be four different types of "7" cards, whereby each type of card may have a respective probability assigned thereto, and different crafting options associated with each. When the smart contract is generating a card for that level, the smart contract may be configured to generate a random number and may determine which type of card to generate based on the random number and the probabilities. In some of these embodiments, the smart contract may be configured with rules that assign each type of card to a different slot machine category (e.g., a "Free Play" card, a "Double Bonus" card, and the like) and, for each respective category, assign a non-overlapping range of numbers to the respective category. In this example, the smart contract may be configured to generate a new card for the user (assuming other conditions are met to generate the card are met) by generating a random number, N, to determine which type of card to generate. For example, if the random number is 13, the user may be generated a Lemon Card, whereas if the random number is 99, the user may be generated and assigned a 7 Card. As can be appreciated, cards having lower probabilities will be rarer than cards having higher probabilities. For example, a token associated with a card that permits the holder to a Free Play on a physical slot machine may have a lower probability that a token associated with a card having less economic or other value. In embodiments, the manner by which certain cards are generated may be defined in a respective recipe, as described herein. In embodiments, a recipe may be embodied as computer readable instructions that are executed by the smart contract, whereby each recipe defines a set of conditions that must be satisfied before one or more new cards are generated and the manner by which the new cards are generated (e.g., the types of cards that can be generated and, in some cases, the probabilities associated with each type of card).

In embodiments, the mystery box system, in response to a player winning a prize from an NFT game, may transfer the token to an account of the winning player so that the winning player may earn a payout. As can be appreciated, the transfer of the token may be initiated by a centralized system or a smart contract that is executed by one or more node devices. In these embodiments, the won token may appear in the digital wallet of the player. Alternatively, the mystery box system may deliver the won token to the user via an electronic message (e.g., a text message, a messaging app message, an email, or the like). In some embodiments, the Mystery box system may provide service to brick-and-mortar casinos, such that the NFT game is implemented in a physical device. In these embodiments, the Mystery box system may print out a ticket, or other physical item, that has a token identifier of the won ticket (e.g., a QR code).

In embodiments, the mystery box system may allow players to select a NFT game to play from a plurality of available NFT games, where each NFT game may have a respective theme, probability of success, cost, length of play, or some other characteristic.

In embodiments, an NFT game may contain tokens corresponding to replenishable items and/or non-replenishable items. Replenishable items are items that can be replenished in the NFT gaming when a player wins a token representing the item. In embodiments, an NFT game may be arranged according to a recipe designating tiers of tokens in the NFT game, and for each tier the odds for winning an item from the tier, and the crafting steps a token from each tier may enable. In these embodiments, the provider of the NFT game may provide a list of items that belong to each tier. For example, the highest tier (e.g., the tier with the lowest odds) may include the high-value non-replenishable items, while the lower tiers may include various levels of replenishable items. Each item in the recipe may be tokenized, such that the tokens are reserved for use in the NFT game. Each time an item from a tier is won by a player, the Mystery box system may replace the token representing the item with another token from the same tier as the won token. In this way, the price to play the NFT game and the odds associated with each item in the NFT game do not change when a non-replenishable item is won from the NFT game. As a player earns tokens that permit card crafting, the user may craft cards that are only available in the NFT game via crafting and are therefore rarer still, for example, a card with a monetary redemption prize, free play prize, or something else of value to the player.

In embodiments, each NFT game may be governed by one or more smart contracts. In some embodiments, a smart contract may define the different items or tiers of items, and for each respective item or tier of items, odds for winning the respective item. When a new NFT game is created, the Mystery box system may instantiate a new smart contract corresponding to the new NFT game. The instance of the smart contract may define the items or tiers of items of the new NFT game, the odds for each item (or tier of items), the token identifiers of each of items in the NFT game (or replacement items that can be included in the NFT game), and a price to play the NFT game. In embodiments where items are not replaced in a NFT game, the smart contract may further define the manner by which the odds of items or the price of the game may be adjusted when certain items are exhausted. For example, if the highest value item in the NFT game is won, the price to play the game may be lowered and/or the odds of winning the remaining items may be adjusted.

The Mystery box system may serve the NFT game in a variety of different manners. In embodiments, the Mystery box system may serve the NFT gaming game via the tokenization platform 100, whereby users of the tokenization platform 100 may play the NFT game on a website or application provided by the tokenization platform 100. Additionally, or alternatively, the Mystery box system may serve the NFT gaming game to users via a third-party website or application. In these embodiments, the third-party website or application may access the Mystery box system via the API system 108 of the tokenization platform 100. In embodiments, the Mystery box system may serve the NFT gaming game to users via a physical gaming device, such as a slot machine, roulette wheel or other device, and the Mystery box system may support casino-style machines, whereby players can play the NFT gaming game on a physical machine located at, for example, a casino or any other suitable brick-and-mortar location. In these embodiments, the items may be located at the brick-and-mortar location where the physical device is located, such that when a player wins an item from the NFT gaming, such as a crafted card/token, the player may redeem the token at the brick-and-mortar location. In these embodiments, the tokenization platform 100 includes the Mystery box system that supports NFT games that are played at the brick-and-mortar locations. In these embodiments, the Mystery box system may provide an API that allows network-connected physical gaming devices to communicate with the tokenization platform 100. The Mystery box system may serve the NFT game to the physical gaming devices via the API system 108. In embodiments, the Mystery box system may provide token identifiers of won tickets, such that the physical gaming devices may print a ticket that indicates the won token. In some embodiments, the ticket may include a QR-code that indicates the won token.

In embodiments, the player may redeem a ticket indicating a won token at the brick-and-mortar location. In these embodiments, the brick-and-mortar location may include scanning devices that scan the tickets and communicates the token identifier of the won token to the casino gaming system. In response to receiving the token identifier of the won token, the Mystery box system may redeem the won token on behalf of the player and may communicate a verification of the redemption of the won token to the scanning device. An employee using the scanning device may then provide the item won by the player to the player. Alternatively, the player may add the won token to a user account of the player. In these embodiments, the player may scan the ticket (e.g., the QR-code). In response to the player scanning the ticket, the Mystery box system may facilitate the transfer of the token to an account of the player, whereby the ticket may appear in the player's digital wallet. Once this occurs, the player may redeem, sell, gift, collateralize, or otherwise transact with the token.

In embodiments, an NFT may include the attributes of the NFT and may be embedded in a smart contract that includes executable instructions that when executed perform one or more tasks related to the NFT. In some embodiments, a smart contract may include executable instructions that when executed perform one or more tasks related to the NFT and other NFTs that are controlled by the smart contract.

NFT Fantasy Gaming

In some embodiments, an oracle (e.g., a stats oracle) may be configured to support an NFT-based fantasy sports league (or other variations of fantasy games, such as fantasy music producer, fantasy movie producer, fantasy stock trader, or the like). In embodiments, an NFT-based fantasy league may be a fantasy style game where players can assemble fantasy teams using their own NFT trading cards. For example, a fantasy game may allow players to assemble teams using NFT trading cards having specific immutable digital attributes. For example, an NFT fantasy baseball game may require that users assemble teams using NFT baseball trading cards released during a specific season by a specific company. In some embodiments, the players may assemble their respective fantasy teams using NFT trading cards that they have in their digital wallets based on the constraints of the game, which may include the specific immutable attributes of eligible NFT trading cards and other rules that define how a team may be selected. The other rules may define the number of NFT trading cards that may be played during a game period (e.g., an entire season, one week, one day, a specified time period during the schedule, or the like), positions of players, and the like. Once the teams are set for the game period, then each team may be awarded points based on their selected team and a set of scoring rules, which may be applied to the data streams obtained by the oracle or other source regarding game outcomes, player statistics, and the like in order to determine the outcome of the game (e.g., the total points earned by each fantasy team). The scoring rules may vary depending on the game. For example, in a fantasy football game, touchdowns may be scored as six points, 10 yards rushing or receiving may be scored as one point, 25 passing yards being scored as one point, field goals being scored as 3 points, and/or the like. It is appreciated that a fantasy game may be configured with any suitable scoring rules. In embodiments a fantasy sports game outcome is thus determined by application a set of eligibility rules that are based on ownership of NFTs within a defined eligible class of NFTs and a set of scoring rules that are applied to a data stream of outcomes from a set of real sport activities. Furthermore, the scoring rules, the team selection rules, trading rules, and/or other suitable rules may be adjusted by one or more of the users (e.g., "league administrators"). In some embodiments, the fantasy game may be managed using a set of smart contracts, such that an instance of a smart contract may be configured with the league settings (e.g., default rules and/or user defined rules). In these embodiments, the smart contract instance may be configured to receive stats from a stats oracle, such that the smart contract instance receives relevant statistics from the stats oracle (and/or values derived by the stats oracle) and adjusts each fantasy team's scores in accordance with the received statistics. At the end of the game period, the smart contract may determine the winners and losers.

It is appreciated that the foregoing may be applied to various types of fantasy sports games as well as non-sports games. For instance, with respect to fantasy sports, the foregoing framework may be applied in daily fantasy sports, season-long fantasy sports, or the like. With respect to non-sports, new types of fantasy games may include fantasy "record producer", fantasy "movie producer", fantasy "stock trader", and/or the like.

NFT Tickets

As described herein, in embodiments VIRLs and/or other tokens can be created with respect to experiences and/or events. For example, VIRLs created with respect to experiences can be tokenized in NFTs, such that the experience-based items can be transferred from one account to another account of a user. In these embodiments, VIRLs and/or other tokens may act as tickets to events, such as concerts, sporting events, theatre events, and the like (e.g., as tokenized tickets).

Several problems are addressed by the use of tokenized tickets, including NFT-based tickets (also referred to herein as "NFT tickets"). One issue that affects ticket sales is that when demand is high for an event, tickets to the event sell out quickly. This has created a cottage industry where ticket scalpers prospectively purchase tickets with the intention of selling the tickets on secondary markets (e.g., Stubhub, Craigslist, on the street before the event, and the like), and the original seller may be unable to efficiently manage or otherwise participate in such transactions. Also, malicious actors may create and sell counterfeit tickets, and these counterfeits may be difficult to detect by potential purchasers. At the same time, traditional event tickets often lack flexibility, for example, the event ticket may specify a specific date, time, seat number, etc. for an event, but the event ticket may lack more advanced functionalities, such as the ability to enter any of several events (e.g., a ticket for a baseball game that might be usable for any game in an entire season), enter several different events using a single ticket, receive multiple goods/services using a single ticket, and the like. In some cases, traditional tickets may be incompatible with these more advanced functionalities because it would be difficult for purchasers of such tickets to detect that a ticket had already been partially or fully used, and therefore the potential for fraud would discourage secondary ticket markets.

These and other problems may be solved by the use of tokenized tickets as described herein. In embodiments, a primary-market seller of tickets (e.g., LiveNation®, Ticketmaster®, or the like) may sell tokenized tickets that may be either NFT-based tickets or fungible tokenized tickets in lieu of physical or electronic tickets. In embodiments, an NFT-based ticket may uniquely identify and/or uniquely associate with a particular seat for a particular event. While general admission events may utilize fungible tokens, the uniqueness of NFTs may provide a number of benefits for both general admission events, seated events, or hybrid events (e.g., some seats and some GA). For instance, the redeemer of the NFT ticket (e.g., the possessor of the token that actually attends the event) may keep the NFT in their digital wallet as a digital souvenir of the event. In such a scenario, the NFT ticket may include associated digital artwork that may be unique to the event (or a set of events, such as a season or a tour) and may have a unique differentiating attribute (e.g., mint number) that makes the NFT ticket collectible and tradeable even after the event. Furthermore, in some embodiments, NFT tickets may provide a mechanism for allowing attendees into the venue for general admission shows (or seated events). For example, owners of NFT-based tickets having lower minting numbers may be admitted into a show earlier. Additionally, or alternatively, NFT tickets having minting numbers lower than a threshold may be kept after redemption (i.e., admission into the event), whereas NFT tickets having a higher number may be burnt after the event (e.g., by a redemption smart contract), thereby making the unburnt NFT tickets scarcer, and therefore, more valuable. In these examples, the NFT tickets may include a digital asset (e.g., artwork related to the event) that is tradeable after the ticket is used.

Tokenized tickets may be configured to supplement or replace traditional tickets. For example, an NFT ticket may include as much information as a traditional ticket, such as a particular event, a particular date and/or time of admission to the event, one or more seats assigned to a ticket, etc. NFT tickets may also be linked to one or more smart contracts for controlling various functionalities, such as a smart contract for providing a revenue share (such as a percent of the profit or a share of fees) from ticket resales to the original seller.

In embodiments, NFT tickets may be flexibly configurable such that they may include more or less data than traditional tickets in order to reduce complexity, facilitate resale, and/or enable new functionalities. For example, NFT tickets may specify a particular section or class (e.g., section A, section B, box C, etc.), and a holder of the NFT ticket may then be able to enter the particular section and/or may be assigned a particular place (e.g., a particular seat) within the section at the time of ticket redemption. NFT tickets may also enable secondary goods/services functionalities, such as functionality for receiving a free drink or food item at an event, functionality for entering a special section (e.g., a VIP area) at an event, and/or functionality for getting into an event early. The NFT ticket may enable these functionalities by including data that defines one or more benefits associated with the ticket. Additionally or alternatively, NFT tickets may enable multiple uses, for example, a ticket that is valid at two basketball games, a ticket to enter a museum up to 10 times in a calendar year, a ticket for two one-way train rides, etc. In embodiments, information indicating how many times the ticket has been used may be stored on a blockchain or distributed ledger (e.g., within a data attribute of the NFT ticket), such that a potential secondary purchaser of the NFT ticket may be able to value the ticket accordingly (e.g., the price of a ticket with 5 out of a maximum 10 uses remaining may be half that of a similar ticket with all uses remaining). In embodiments, information indicating how many times a set of tickets have been used may be aggregated, such that the cumulative remaining number of potential uses is known, which may also be factored into a determination of an appropriate price for one or more remaining tickets in the set; for example, as uses are collectively consumed, remaining uses may be valued more highly, resulting in an increase in price-per-use. In embodiments, NFT tickets may be configurable such that the ticket may include attributes that specify a particular time of admission for an event, whether a user is allowed to enter a VIP area and/or obtain one or more free or discounted items. Additionally or alternatively, an NFT ticket may include a redemption code (e.g., a QR code) that another system (e.g., a point-of-sale system) may use to determine whether/when a user can enter an event, can enter certain special areas of the event, can obtain free items at an event, and/or the like.

Although some of the examples herein describe an NFT ticket in connection with one or more events, the tokenized tickets (including NFT tickets) described herein are not limited to use with events. For example, tokenized tickets may be used to define recurring membership benefits, such as a recurring membership to a particular gym, recurring access to airport lounges or other exclusive areas, access to coworking facilities, and/or the like. In these embodiments, a tokenized NFT-based or other ticket defining a recurring right and/or benefit (also referred to herein as an "NFT membership card") may include a unique identifier associated with a particular member, a shared identifier associated with a group of members (e.g., for a family membership, a business membership or the like), and/or the like. Additionally or alternatively, the NFT membership card may include information defining a level of access privileges (e.g., whether the holder of the NFT membership card can access a premium area), certain dates and/or times that the membership card is valid for, and/or any other access information. In embodiments, the NFT membership card may store a log of previous uses of a particular benefit. For example, for an NFT-based timeshare membership and/or some other benefit that may allow a limited number of uses within a given time period (e.g., day/month/year/etc.), the NFT membership card may store a log of uses (and/or timestamps for when the membership was used), which may allow a partially-used NFT membership card to be sold for a fair price (e.g., because a potential purchaser can inspect the NFT membership card to see how many uses are allowed, remaining, etc.).

In embodiments, NFT tickets (which include NFT membership cards) and other tokenized tickets may be associated with codes (e.g., QR codes), which may be unique and/or may indicate a certain type of ticket. In embodiments, these codes may be scanned by redemption systems that integrate with traditional point of sale systems. Thus, for example, a user may be able to use an NFT ticket at an electronic theater kiosk in order to obtain admission to a theater (e.g., because the point-of-sale kiosk is integrated with the redemption system). In some embodiments, a point-of-sale system may have functionality for interacting with distributed ledgers that store the NFT ticket, such that the point-of-sale system may obtain data from the distributed ledgers and/or user wallets containing NFT tickets, and, if necessary, cause distributed ledger transactions that update data attributes associated with the NFT ticket. Additionally or alternatively, a redemption system may be configured to act as a "bridge" between a distributed ledger ecosystem and a point-of-sale system, which may be unable to read and/or interact with distributed ledger data. Accordingly, an exemplary electronic theater kiosk may interface with a separate redemption system that is capable of causing blockchain transactions to redeem the ticket, or may be configured to more directly cause distributed ledger transactions for accessing distributed ledger data, verifying NFT tickets stored in user wallets, updating NFT ticket data, and/or the like. In some embodiments, a point-of-sale system may have functionality for interacting with a set of smart contracts (optionally operating on a set of distributed ledgers) that store data regarding the NFT ticket, such that the point-of-sale system may obtain data from the smart contracts that govern the NFT tickets and, if necessary, cause smart contract-controlled transactions (optionally involving transactions captured on the set of distributed ledgers) that update data attributes associated with the NFT ticket, including attributes in the smart contract and/or the set of distributed ledgers. In embodiments, the smart contract may include a set of rules for pricing, redemption, usage tracking, or the like, which may be static or dynamic (e.g., where the rules are contextual); for example, a smart contract may take data from a venue that determines whether it is approaching capacity, such as to determine whether a general admission ticket can be used, or whether a specific seat should be assigned.

In embodiments, NFT tickets and/or other tokenized tickets may be tradable via marketplaces, such that tickets may be resalable after purchase. In these embodiments, a first user may own an NFT ticket corresponding to a particular experience and/or benefit (e.g., an event ticket) and transfer the NFT ticket (e.g., sell, gift, or trade it) to another user. In embodiments, NFT tickets and/or other tokenized tickets may be preferable to traditional tickets because they may be easily and securely sold to other users. Additionally or alternatively, NFT tickets may be preferred by purchasers for the same reasons, and/or because a purchaser may be able to obtain data on past uses of the ticket, whether the ticket has been redeemed, whether the ticket has a certain number of uses remaining, and/or the like, in a verifiable and secure way. Accordingly, systems and methods described herein provide a technological improvement to previous tickets at least by providing a secure and verifiable transfer of admission rights and/or other benefits (including partially-used benefits) to other users.

In addition to tickets and other admission-based use cases, the tokens described herein may be used in other ways. For example, an NFT may be an "experience-based item" that represents a particular experience. For example, such an NFT may be implemented as a tokenized VIRL representing the experience (e.g., a commemorative NFT for an event the user attended), which may be salable on a secondary market. In some of these example embodiments, the NFT representing the experience-based item may be transferred from an account of a first user to an account of a second user in response to a transaction being completed. For example, the NFT representing the experience-based item may be transferred to a digital wallet of the second user. In embodiments, the experience-based item may include a unique celebrity experience, such as meeting a performer or athlete, obtaining a photograph with the celebrity, receiving a signature, recording video or audio, or the like. In embodiments, the experience-based item, such as a signature on an item of artwork, may be incorporated into the NFT ticket, such that the NFT ticket is a collectible, celebrity-endorsed, experience-based item that includes proof of attendance at an event and proof of a direct encounter with the celebrity.

In embodiments, NFT tickets and/or other tokenized tickets may be integrated with crafting and unboxing functionalities as described elsewhere herein. For example, unboxing functionalities for redeeming NFT digital packs to obtain digital tokens may be configured to (e.g., in rare cases) provide an NFT ticket to a special event when a user unboxes a digital pack. Similarly, the crafting functionalities described above may be used to "upgrade" a ticket (e.g., combine a ticket NFT with some other NFT to obtain an upgraded NFT) in order to, for example, upgrade a normal ticket to a VIP ticket, upgrade a normal ticket to a normal ticket with a secondary benefit (e.g., one or more free food and/or drinks), upgrade an assigned seat to a better seat, and/or the like. Upgrades and benefits may be used to encourage or reward ticket-related behavior; for example, an NFT ticket holder that attends a number of consecutive games or entertainment events may be awarded improved seating, VIP access, additional uses, guess passes, or the like, thereby rewarding the most passionate or consistent fans with additional upgrades and benefits. NFT tickets may also be configured to reward other behaviors, such as charitable giving, such as by rewarding NFT ticket holders for gifting, loaning, or otherwise enabling utilization (e.g., of a subset of permitted uses of a multi-use NFT ticket) by beneficiaries of non-profit organizations; for example, an NFT ticket holder may make five uses of a season ticket available for auction by a non-profit organization, and in turn the NFT ticket holder may be given an additional benefit, such as an upgrade in seating, VIP access, or other benefits as noted throughout this disclosure.

The systems and methods described herein provide a novel technological solution for enhancing ticketing ecosystems. In comparison to the tokenized ticketing system described herein, traditional tickets suffer from several drawbacks. For example, physical tickets may be susceptible to loss or destruction, and may be easily counterfeited, leading to an inability to trust ticket resellers, thereby reducing the value of tickets. Meanwhile, electronic tickets may be delivered via email or other communication mechanisms, making them potentially easy to lose in cluttered inboxes. Additionally, electronic tickets may require storing images of QR codes inside a variety of different applications (e.g., a first application for a first type of ticket, a second application for a second type of ticket, etc.), thereby limiting the ease of using and reselling tickets. Furthermore, electronic tickets may be difficult to resell in a secure and verifiable way. For example, a potential purchaser may have no way of determining whether an electronic ticket has already been used, which limits the value and utility of electronic tickets.

The systems and techniques described herein improve the state of art for ticketing and membership cards by allowing users to maintain tokenized tickets with advanced functionalities on distributed ledgers (which provides transparency and prevents damage or destruction). Moreover, techniques described herein allow for updating attributes, such as mutable attributes, in order to provide for dynamic tokenized tickets that may be updated to reflect partial use while still enabling transfer of ownership. Systems and techniques described herein further enable users to consolidate tickets for a variety of use cases on a distributed ledger, thereby allowing a single digital wallet as a centralized point of ownership for a variety of tickets, cards, and the like. Additionally, storage of ticket data on a distributed ledger allows users to see data about other tickets, thus enabling analytics applications such as viewing an issued supply of a particular type of ticket, viewing statistical or other analytic information about attributes assigned to various tickets, and viewing other such information. This information transparency further facilitates resale ability because it enhances the ability of purchasers and sellers to accurately price tickets. Moreover, by storing tickets as tokens on distributed ledgers, other token-related and/or NFT-related functionality may easily be adapted to work with tokenized tickets, such that tokenized tickets may be combined with unboxing functionalities, crafting functionalities, token marketplaces, minting smart contracts, and/or the like.

Additionally, the pre-minting functionalities described herein for pre-minting NFTs in order to, among other benefits, avoid a bot-enabled "rush" to purchase tickets when they are initially released for sale may be applied to NFT tickets. Thus, for example, pools of NFT tickets may be pre-minted in batches and stored in pools such that, when a user purchases a particular type of NFT ticket, a ticket of that type with a random mint number or some other random attribute may be assigned to the user.

Figure 51:
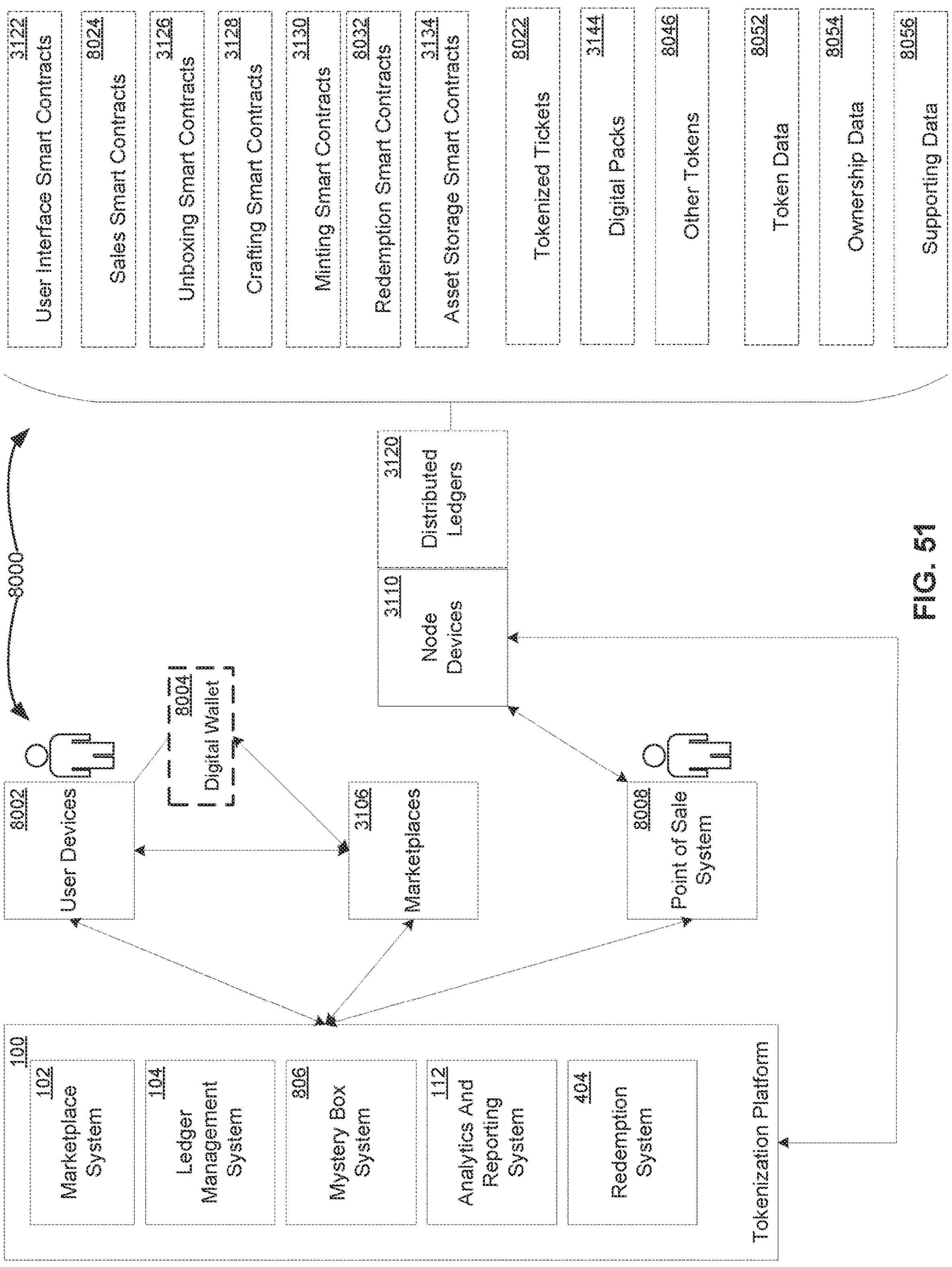
FIG. 51 is a schematic illustrating an example environment of a tokenization platform configured to implement ticketing functionality according to some embodiments of the present disclosure.

Referring to FIG. 51, the environment 8000 may include several components for implementing the techniques described herein. The tokenization platform 100 may include a redemption system 404 (also shown in FIG. 4) for redeeming an NFT ticket, interfacing between a point-of-sale system 8008 and one or more distributed ledgers 3120, interacting with one or more redemption smart contracts 8032, providing NFT redemption services to the user devices 8002, interfacing with other components of the tokenization platform 100 to configure various services related to NFT tickets, and/or the like. For example, the redemption system 404 of the tokenization platform 100 may provide functionality to communicate with the point-of-sale system 8008 to reserve a block of seats for NFT tickets, cause the tokenization platform 100 to configure the minting smart contract 3130 to mint the NFT tickets for the reserved block of seats, cause the minting of the NFT tickets, cause the tokenization platform 100 to configure one or more sales smart contracts 8024 controlling the sale of the NFT tickets, invoke a redemption smart contract 8032 to redeem the NFT tickets, interface with the point-of-sale system 8008 to provide event admission to a user who redeemed an NFT ticket, and/or the like.

In embodiments, various systems of the tokenization platform 100 may configure the various smart contracts stored on the distributed ledgers 3120 to provide functionality in support of the NFT tickets as described herein. For example, a configuration subsystem (described elsewhere herein) and/or the ledger management system 104 may configure one or more user interface smart contracts 3122 to provide a user interface for viewing tokenized tickets 8022 (which include NFT tickets 8022A), viewing digital packs 3144 that contain tokenized tickets 8022, and viewing other tokens 8046 related to NFT tickets 8022A), and interacting with the various tokens (e.g., redeeming NFT tickets 8022A, unboxing digital packs 3144 to obtain NFT tickets 8022A, etc.). Additionally or alternatively, a configuration subsystem and/or the ledger management system 104 may configure one or more sales smart contracts 8024 to control sales of the NFT tickets 8022A (e.g., to share resale profits with an original seller of the NFT ticket, as described in more detail below). Additionally or alternatively, a configuration subsystem and/or the ledger management system 104 may configure one or more unboxing smart contracts 3126 with unboxing recipes that provide a chance of obtaining an NFT ticket 8022A when a digital pack 3144 is unboxed (e.g., as described elsewhere herein). Additionally or alternatively, a configuration subsystem and/or the ledger management system 104 may configure one or more crafting smart contracts 3128 with crafting recipes for "levelling up" an NFT ticket (e.g., from a more common, lower-level NFT ticket to a less common, higher-level, more exclusive NFT ticket) or from a non-ticket NFT to a ticket NFT (e.g., as a reward for crafting NFTs to a certain level, the crafting user may be awarded an NFT ticket). In these examples, the crafting framework described elsewhere in the disclosure may be used to facilitate such crafting of NFT tickets. Additionally or alternatively, a configuration subsystem and/or the ledger management system 104 may configure one or more minting smart contracts 3130 to mint (and/or batch pre-mint) NFT tickets, which may include assigning particular attributes such as specific seats to specific NFT tickets, as described in more detail below. Additionally or alternatively, a configuration subsystem and/or the ledger management system 104 may configure one or more redemption smart contracts 8032 to redeem NFT tickets, which may include burning the NFT ticket, updating one or more attributes of the NFT ticket, or otherwise indicating that the NFT ticket has been (at least partially) used. Additionally or alternatively, a configuration subsystem and/or the ledger management system 104 may configure one or more asset storage smart contracts 3134 to store one or more NFT tickets, such as pre-minted pools of NFT tickets, ahead of selling the NFT tickets in order to prevent a rush of transactions when the NFT tickets go on sale, as described elsewhere herein. These and other functionalities are described in more detail below.

In some embodiments, the tokenization platform 100 may provide one or more interfaces that allow entities associated with a point-of-sale system 8008 (e.g., event organizers) to easily provide configuration information to the tokenization platform 100, in order to configure one or more of the smart contracts described herein. The set of interfaces may include APIs, graphical user interfaces, SDKs, and/or the like. Additionally or alternatively, the tokenization platform 100 may configure and/or deploy user interfaces that allow the user devices 8002 to purchase NFT tickets, view the user's NFT tickets, redeem the NFT tickets, sell the user's NFT tickets (e.g., via a marketplace provided by the marketplace system 102 and/or the marketplaces 3106) and/or otherwise interact with various functionalities of the NFT tickets as described herein. In other words, the tokenization platform 100 may implement an NFT ticket ecosystem that allows for purchasing, trading, reselling, redeeming, and other NFT ticketing functionalities, as well as alternative methods of awarding NFT tickets to users, such as unboxing/unpacking digital packs containing NFT tickets, crafting NFT tickets, and other such mechanics described elsewhere herein.

The tokenization platform 100 may communicate and interact with the user devices 8002, which may include any device used by any user that buys, redeems, trades, sells, or otherwise interacts with the tokenized tickets as described herein. The user devices 8002 may be the same devices as the user devices 190, user devices 3102, or other user devices described elsewhere throughout this specification. In some embodiments, a user device may have access to a digital wallet 8004, which may be used to store a user's tokens. The digital wallets may be the same as the digital wallets shown in FIGS. 8 and/or 31 and described elsewhere throughout this specification or may be any other suitable wallet. The digital wallet 8004 may be implemented on a corresponding user device 8002 or may be implemented by another device. In some embodiments, the digital wallet may be a cloud wallet implemented by the tokenization platform 100. Alternatively, the digital wallet may be a "cold" wallet that is stored locally at a device associated with the user.

In some embodiments, a point-of-sale system 8008 may communicate with and interact with the tokenization platform 100. Point of sale systems 8008 may include systems that may provide event admission to a user, which may be in the form of a pass (e.g., a ticket kiosk outside a theater that prints a paper admission slip), a physical unlock (e.g., a subway turnstile that unlocks when a ticket is scanned), a handheld point of sale system 8008 (such as a dedicated tablet with a touchscreen, QR code reader, near-field communication system and/or the like), or any other method. Additionally or alternatively, a point-of-sale system 8008 may be operated by a human operator, who may assist a ticket holder in redeeming their tokenized ticket 8022. In embodiments, a point-of-sale system may be on the premises of an event (e.g., at or near an event entrance). As described in more detail below, in some embodiments the point-of-sale system 8008 may be blockchain-aware or otherwise capable of interfacing with node devices 3110 and distributed ledgers 3120 directly (e.g., without going through a centralized system, such as a bridge service provided by the tokenization platform 100). In these embodiments, the redemption system 404 may be integrated with the point-of-sale system 8008 (not shown in FIG. 51), such that any actions of functions attributed to the redemption system 404 may additionally or alternatively be performed directly by the point-of-sale system 8008. In other embodiments, the point-of-sale system 8008 may not have a capability of directly interfacing with node devices 3110 and distributed ledgers 3120. In some of these embodiments, the point-of-sale system 8008 may communicate with a centralized system (e.g., a bridge service provided by the tokenization platform 100) in order to cause redemption of NFT tickets.

In embodiments, the tokenization platform 100 may be configured to facilitate redemption of an NFT ticket without directly communicating with the point-of-sale system 8008. For example, in these embodiments, a user may redeem an NFT ticket online (e.g., via a website, which may be configured by a user interface smart contract 3122), and the tokenization platform 100 may then provide event admission information (e.g., a QR code) that may be provided by the user to the point-of-sale system 8008. In some of these embodiments, the event admission information (e.g., the QR code) may be stored as an attribute of an NFT ticket 8022A on the distributed ledgers 3120. For example, a QR code may be stored as an image associated with the NFT ticket, which the user may display (e.g., via the user's digital wallet 8004) for scanning by the point-of-sale system 8008. In some of these embodiments, the stored event admission information may be encrypted using DRM to prevent unauthorized users from obtaining the event admission information, as described elsewhere herein.

In embodiments, the tokenization platform 100 may include and/or interface (directly or indirectly) with one or more node devices 3110, which may be used to read data from the distributed ledgers 3120 and/or write data to the distributed ledgers 3120 (e.g., using one or more blockchain transactions). In addition to the user interface smart contracts 3122, unboxing smart contract 3126, crafting smart contract 3128, minting smart contracts 3130, asset storage smart contracts 3134, and/or other smart contracts described elsewhere herein, the distributed ledger may include sales smart contracts 8024 configured to support NFT ticket sales and/or redemption smart contracts 8032 configured to redeem the NFT tickets. In embodiments, the sales smart contracts 8024 may be the same as the sales smart contracts 3124 described elsewhere herein (e.g., a single smart contract may be configured to manage sales of NFT tickets as well as sales for other applications described herein). Additionally or alternatively, in embodiments the redemption smart contracts 8032 may be the same as the redemption smart contract 3132 described elsewhere herein (e.g., a single smart contract may be configured to manage redemption of VIRLs as well as tickets). In some embodiments, an NFT ticket may be a form of VIRL, with a copy (hard copy or digital copy) of a ticket or admission pass being the "real life" item that may be obtained when the VIRL is redeemed. In embodiments, an NFT ticket may be a form of VIRL that corresponds both to an admission pass and a right to redeem for a physical item, such as a unique, non-fungible collectible item (e.g., a signed souvenir with a unique ID in a limited-edition set) or a fungible item (e.g., a food or beverage unit).

In embodiments, different tokenized ticket collections may be linked to different smart contracts; for example, a first ticket collection (e.g., for a first event) may use a first minting smart contract 3130 to mint the tokenized tickets, a first sales smart contract 8024 to sell the tokenized tickets, a first redemption smart contract 8032 to redeem the tokenized tickets, etc., whereas a second ticket collection (e.g., for a second event) may use a second minting smart contract 3130, a second sales smart contract 8024, a second redemption smart contract 8032, etc., to implement the same or similar functionality. Additionally or alternatively, each of the smart contracts may be configured to work with multiple ticket collections, such that a single redemption smart contract 8032, for example, may be configured to redeem tokenized tickets for different events, event types, and/or the like. Accordingly, as will be described in more detail below, each of the smart contracts may have configuration functions that may be used to configure the smart contract to work with additional ticket collections. Additionally or alternatively, although the various functions described herein are ascribed to separate smart contracts, the various functions described herein may be performed by a single smart contract instead of multiple separate smart contracts.

The tokenization platform 100 may further cause the distributed ledgers 3120 to store various tokens, such as tokenized tickets 8022 (e.g., including NFT tickets as well as fungible tickets, NFT membership cards, and the like), digital packs 3144 (e.g., tokens that may be redeemed for tokenized tickets 8022 and/or other tokens 8046), and/or other tokens 8046 such as crafting tokens, currency tokens or other fungible tokens, redemption tokens, etc. as described elsewhere herein. Although in some embodiments, the tokenized tickets 8022 and/or digital packs 3144 may be stored in asset storage smart contracts 3134, they may also be stored separately within the distributed ledgers as shown in FIG. 31. The tokenization platform may further cause the distributed ledgers 3120 to store various supporting data, such as token data 8052 (e.g., template/schema data and the like), ownership data 8054 (e.g., an account associated with a token), and other supporting data 8056 for implementing the features described herein. Again, such data may also be stored in smart contracts, such as an asset storage smart contract 3134, as part of a token, and/or the like.

In embodiments, an analytics and reporting system 112 of the tokenization platform 100 may be configured to provide analytics data concerning tokenized tickets that are minted, sold, traded, redeemed, or otherwise used as described herein. The analytics data may be leveraged by potential sellers and/or purchasers of the tokenized tickets (e.g., in order to set a fair price, determine how much to bid, determine the volume and timing of sales, etc.) and by event organizers or other interested parties to determine how the tokenized tickets collections are being used (e.g., sold and resold, traded, redeemed, consumed, etc.). Additionally or alternatively, the analytics and reporting system 112 may make analytics data available to any of the smart contracts described herein, which may use the analytics data to modify certain operations as described herein (e.g., adjust the odds of obtaining a rare and valuable "golden ticket" from a digital pack 3144 based on supply data or the like). In these embodiments, the analytics and reporting system 112 may store the analytics data in one or more smart contract(s) that may be accessed by other smart contracts. In general, the analytics and reporting system may generate analytics and statistical data including supply data, popularity data, value data, probability data, and/or any other data for various ticket collections, as described herein. The analytics and reporting system 112 may obtain the data to generate analytics by reading logs of tokenized tickets minted by minting smart contracts 3130, sold by sales smart contracts 3124, redeemed by redemption smart contracts 3132, by reading ownership information and other token data from asset storage smart contracts 3134, by monitoring sales or trades that take place via marketplaces 3106, and/or the like, or using any other method of obtaining data about the tokenized tickets. In embodiments, a set of smart contracts may be configured to produce, store and/or publish a set of analytic event logs or event streams, such as to report on transactions, prices, utilization, crafting, redemption, and other events that can be processed by an analytic system.

Figure 52:
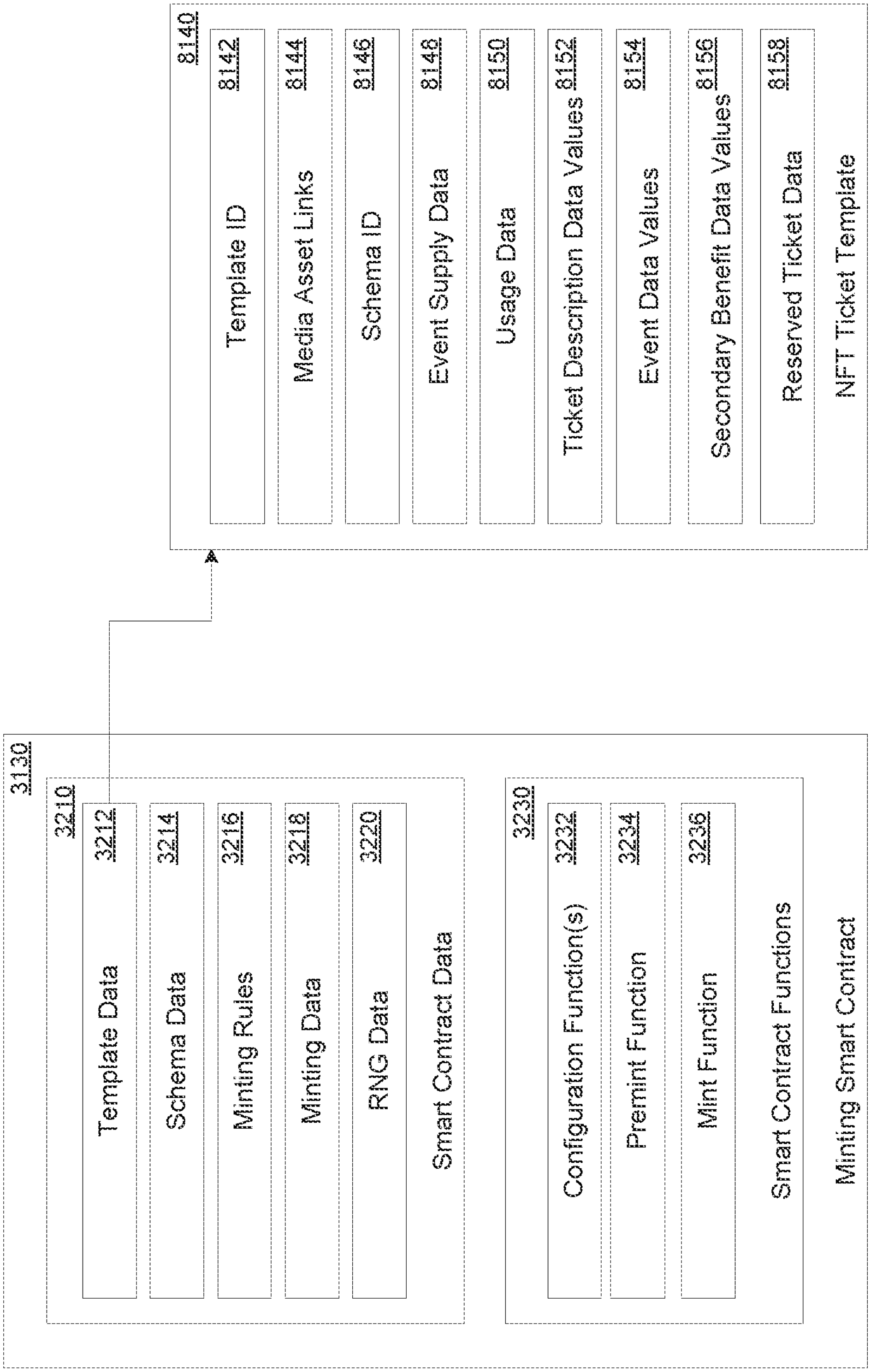
FIG. 52 is a schematic illustrating an example smart contract and template for minting tokenized tickets according to some embodiments of the present disclosure.

FIG. 52 illustrates an example NFT ticket template for minting NFT tickets that include the functionality described herein. As shown in FIG. 52, template data 3212 of the minting smart contract may store an NFT ticket template 8140 that defines various data values for NFT tickets. These data values may include a template ID 8142 indicating a unique value for a particular NFT ticket template, one or more media asset links 8144, a schema identifier 8146 of a schema (not shown in FIG. 52) that defines the types of various template data values, event supply data 8148, usage data 8150, one or more ticket description data values 8152, one or more event data values 8154 (e.g., information defining one or more particular events that may be accessed by the ticket, and/or one or more attributes associated with the event, such as a seat number, class of ticket, and/or the like), one or more secondary benefit data values 8156 (e.g., defining additional benefits associated with the ticket, such as free or reduced price goods or services at an event and/or other such benefits associated with the ticket), and/or reserved ticket data 8158 (e.g., specifying reserved data values such as a block of seats that may be assigned to NFT tickets and/or which data values have already been assigned to tickets). By storing (and/or otherwise linking to) an NFT ticket template, the minting smart contract 3130 may be configured to pre-mint and/or dynamically mint (e.g., mint on demand) NFT tickets up to a maximum supply as specified by the event supply data 8148. Additionally or alternatively, the minting smart contract 3130 may use reserved ticket data 8158 to assign data values such as seat numbers to NFT tickets when the tickets are minted, and to mark the assigned seats as unavailable for future minting.

In embodiments, the unique template identifier 8142 may be used (e.g., by the minting smart contract 3130) to distinguish an NFT ticket template from other NFT ticket templates. For example, a minting request transaction (e.g., as received by the pre-mint function 3234 or mint function 3236) may specify the template identifier 8142 in order to indicate what type of ticket should be minted. In embodiments, the templates may be retrieved using the template identifier and/or a collection identifier. For example, if another smart contract instructs the minting smart contract 3130 to mint a particular token, it may specify a particular collection identifier and the template identifier 8142. The NFT ticket template 3240 may further include the media asset links 8144 (e.g., IPFS links) to media assets that may be shown, for example, in a user's wallet when the user views the user's NFTs. Additionally or alternatively, the media asset links may include one or more links to images containing event admission information, such as an image of a QR code that may be scanned (e.g., by a point-of-sale system 8008) at the time of admission. In some embodiments, however, (e.g., when each minted NFT ticket is associated with a different QR code), code images (e.g., QR codes) may be left unassigned until minting time, and thus the media assets links 8144 field of the NFT ticket template 8140 may not contain any links to code images. In embodiments, code images stored by a template 8140 and/or by an NFT ticket 8022A may be encrypted and decrypted using DRM techniques, as described elsewhere herein.

The NFT ticket template 8140 may further include the schema identifier 8146 that may specify an NFT schema, which may describe the data structure for the templates and, therefore, the tokens minted using the templates. The use and functionality of schemas is described elsewhere herein.

The NFT ticket template 8140 may further include the event supply data 8148, which may indicate how many NFT tickets corresponding to the NFT ticket template 8140 have already been minted, a maximum number of NFT tickets that may be minted, and/or the like. The minting smart contract 3130 may check that the current supply is less than the maximum supply before allowing an NFT ticket to be minted using the template and may increment the current supply whenever a new ticket is minted using the NFT ticket template 8140. In embodiments, a maximum supply specified by the event supply data 8148 may correspond to a number of tickets blocked off for minting by the minting smart contract 3130. The NFT ticket template 8140 may further store usage data 8150 indicating how a minted ticket can be used (e.g., whether it can be transferred to other users, burned, etc.). The NFT ticket template 8140 may further include ticket description data values 8152 containing, for example, a token name, a token series identifier, a token description, and/or the like.

The NFT ticket template 8140 may further include event data values 8154 specifying which event(s) the NFT ticket may be used to enter and/or parameters for the events. In embodiments, the event data values 8154 may specify a single event, a type of event, multiple events, etc. as desired by the event organizer or other ticket issuer. For example, some tickets may be one-time use tickets that may be used at various places or times, such as a subway train ticket, and in these cases no date, time, or location information may need to be specified in the event data values 8154 of a corresponding NFT ticket template 8140. Other tickets may be for specific events (e.g., occurring at a specific place and/or time), and in these cases the event date, time, and/or location may be specified. Some tickets may be for any one of multiple events (e.g., any baseball game in a season, seeing a movie one of many available times and/or dates), and the NFT ticket template 8140 for these tickets may thus specify a list of dates/times/locations and/or some other indicators (e.g., a year during which the ticket is valid for any game). Some tickets may specify multiple uses (e.g., good for 10 train rides, good for four new release movies, good for five games in a season, or the like), and in these cases the event data values 8154 may specify a maximum number of uses, an indicator of the remaining number of uses, an indicator of how many times the ticket has been used, and/or the like. Moreover, the event data values 8154 may specify a specific seat in some cases, whereas in others the ticket may be general admission or admission to a specific section, etc., such that a seat value may not be necessary. Thus, the event data values 8154 may be include more or fewer data values depending on the type of ticket, use cases of the ticket, etc. In embodiments, multi-use tickets may be subject to a set of rules (optionally embodied in a set of smart contracts) that specify consequences of potential conflicts, such as where use of a general admission ticket, or full season ticket, is sought for an event or venue that is sold-out or at a capacity limit; for example, the set of rules may offer compensation, such as additional access rights, a free meal, or the like, for an NFT ticket holder that is denied access under a general admission or season ticket due to sold-out capacity for a particular time, game or event within the season. In embodiments, a smart contract may be configured to poll or otherwise receive venue data (including sales data, attendance data, ticket usage data, or the like) in order to predict constraints on the usage rights of a general admission or season ticket NFT ticket holder, or the like, such that the NFT ticket holder is automatically notified in advance of the possibility that the ticket cannot be used, and the NFT ticket holder is offered an alternative benefit (thereby avoiding unnecessary travel or other costs associated with a failed attempt to use a ticket).

The NFT ticket 8140 may further include secondary benefit data values 8156 if the corresponding ticket includes (or has a chance of including or may be modified to include) secondary benefits with the ticket. The secondary benefit data values 8156 may specify, for example, one or more goods or services that come with the ticket (e.g., free food or drink items during the event, access to a VIP section during, before or after the event, signed memorabilia, or the like), a number of the corresponding good or service that may be redeemed (e.g., if more than one), and/or other secondary benefits. In some cases, such as when a particular ticket has a chance of including or being upgraded to include a secondary benefit, one or more secondary benefit data values 8156 may be specified as empty values in the NFT template 8140. In some of these embodiments, for example, unboxing recipes and/or crafting recipes (as described elsewhere herein) may be used to add one or more secondary benefits to the ticket in some cases (e.g., based on the outcomes of recipes that leverage randomness to resolve data attributes).

In embodiments, the NFT ticket template 8140 may include reserved ticket data 8158, which may specify a block of attributes that are reserved for NFT tickets 8022A, and/or whether each corresponding attribute has been assigned to a minted ticket and/or is still available for assignment to a ticket minted in the future. For example, the reserved ticket data 8158 may specify a block of seat numbers that may be assigned to the NFT tickets 8022A and/or which seats are still available (e.g., because a corresponding NFT ticket has not yet been minted). Additionally or alternatively, the reserved ticket data 8158 may include, for example, links to corresponding QR codes (which may be stored as images via IPFS, for example) that may be assigned to a ticket at minting time, and may be used for redemption and/or for entrance to the event (e.g., by scanning the QR code at a point-of-sale system 8008).

Thus, for example, the NFT ticket template 8140 may be configured (e.g., by an event organizer) with event supply data 8148 and/or reserved ticket data 8158 in order to allow the minting of NFT tickets with specific attributes such as seat number. When a minting smart contract 3130 is used to mint and/or pre-mint NFT tickets, the mint function 3236 and/or pre-mint function 3234 may use this data to parameterize one or more NFT tickets 8022A. In embodiments, for example, the tokenization platform 100 and/or another smart contract may cause a distributed ledger transaction that invokes one of the mint function 3236 and/or pre-mint function 3234. The distributed ledger transaction may further specify an NFT ticket template 8140 that may be used to specify one or more attributes of the NFT ticket 8022A.

In some embodiments, the NFT ticket template 8140 may further indicate, for each data attribute, whether the data attribute is mutable or immutable. For example, some attributes may be updated when a ticket is redeemed or sold to another user. As one example, if an NFT ticket 8022A is usable up to a maximum number of times, the NFT ticket template 8140 may define a mutable attribute for keeping track of how many times the NFT ticket 8022A has been used and, optionally, an immutable attribute for the maximum number of times.

Although only a single example NFT ticket template 8140 is shown in FIG. 52, in embodiments the minting smart contract 3130 may store or otherwise link to a set of multiple ticket templates that may define tickets for various types of ticket (e.g., different templates may be used to define different types of tickets for a single event) and/or events (e.g., different templates may define tickets for different events, such as different templates for basketball games and hockey games that are played at the same arena, or different templates used for different movies shown in the same theatre or chain of theatres). Additionally or alternatively, the NFT ticket templates 8140 may be used to define data values for various types of NFT tickets, such as NFT tickets for an event, NFT membership cards defining one or more recurring events, NFT experience-based items, and/or the like. In embodiments, an NFT tour ticket may be configured in a tour ticket event template, such as providing a right to attend a concert or other event at each location throughout a tour of a band, musician, comedian, or other performer. In embodiments, the template may access venue information, attendance information, and the like, such that the NFT ticket usage rights may be associated with an appropriate seat in each venue of the tour, for a given set of dates. The template may be configured to allow the tour ticket owner to attend, or to loan the ticket to a third party for a subset of the locations of the tour.

Figure 53A:
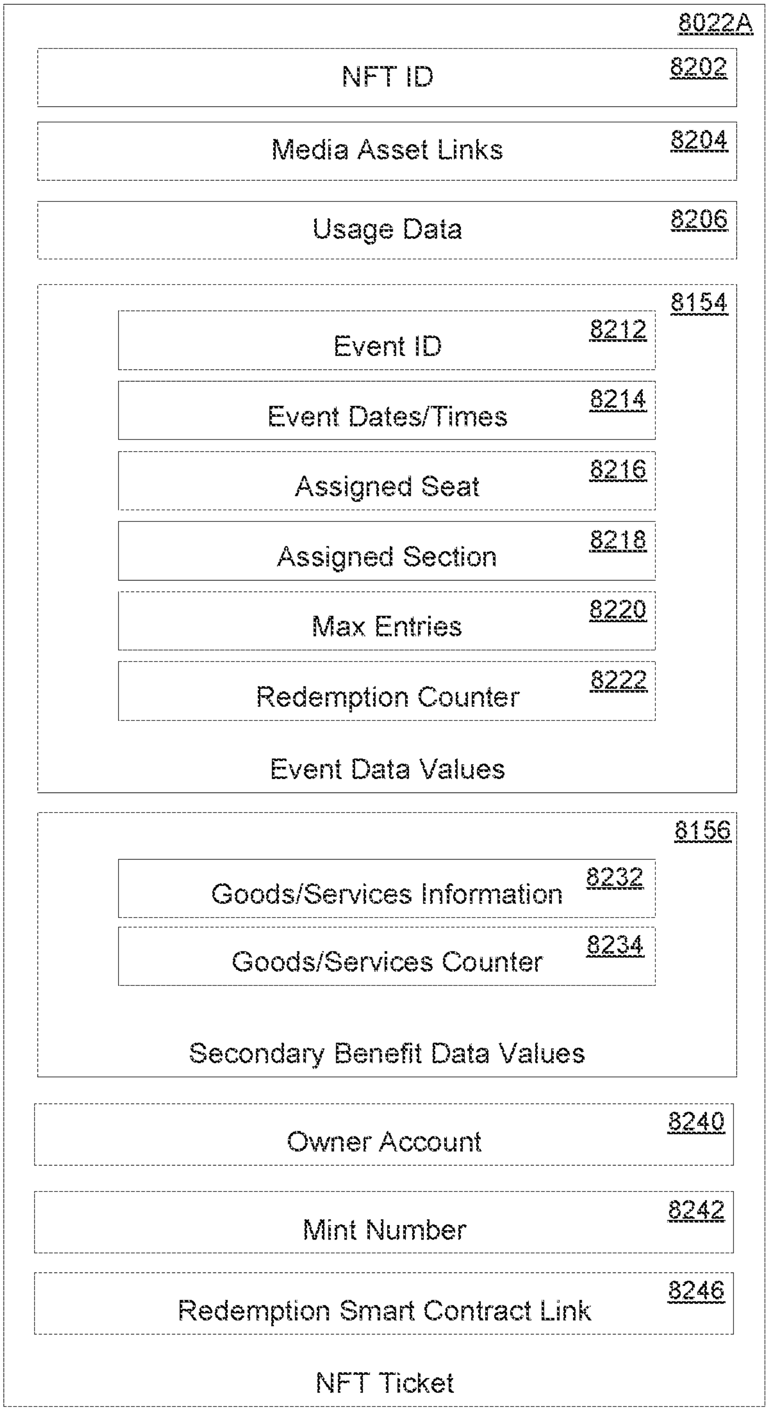
FIGS. 53A-B are schematics illustrating example non-fungible tokens for providing ticketing functionality according to some embodiments of the present disclosure.

FIG. 53 illustrates an example NFT ticket 8022A. The NFT ticket 8022A may comprise a plurality of attributes with associated data values specifying various data for the NFT ticket 8022A. Although all of the data values shown in FIG. 53 may be stored as part of an NFT ticket 8022A, in some embodiments, certain NFT tickets 8022A may reference templates instead of storing attributes containing data values already specified by a corresponding template (e.g., in order to reduce data duplication). The NFT tickets 8022A may include attributes specifying an NFT identifier (ID) 8202, one or more media asset links 8204, usage data 80206, various event data values 8154, which, in the illustrated example, may include one or more of an event identifier (ID) 8212, one or more event dates/times 8214, an assigned seat 8216, an assigned section 8218, a maximum number of entries 8220, and/or a redemption counter 8222. The NFT tickets 8022A may further specify one or more secondary benefit data values 8156, which may include, as illustrated, goods/service information 8232 and/or a goods/service counter 8234.

The NFT identifier 8202 may uniquely identify the NFT. The media asset links 8204, as described above for the NFT ticket template 8140, may include links (e.g., IPFS links) to off-chain data that may be displayed or output when a user views an NFT in a wallet (e.g., image, audio, and/or video data). Additionally or alternatively, the media asset links 8204 may link to a QR code or other code for redeeming the NFT and/or gaining entrance to an event, which may be encrypted using DRM. The usage data 8206 may specify whether the NFT is burnable, transferable, resalable, and/or otherwise limit the usage of the NFT.

The event data values 8154 may include an event identifier 8212, which may be a name or code that uniquely identifies the event and/or type of event to which the NFT ticket is related. In some cases, the event identifier may indicate a unique event; additionally or alternatively, the event identifier may indicate a type of admission (e.g., a particular transit system in which the ticket may be used). The event data values 8154 may further indicate one or more event dates and/or times 8214, which may specify various dates and/or times during which the ticket is valid, may be redeemed, may be used for admission, and/or the like.

In embodiments, the NFT ticket 8022A may include an assigned seat 8216 and/or assigned section 8218 (e.g., if the event includes assigned seats, sections, etc.). Although in embodiments, the NFT ticket 8022A may directly indicate the assigned seat 8216 and/or assigned section 8218, in other embodiments, the NFT ticket 8022A may avoid storing this data in order to simplify the integration of the NFT ticket 8022A with a point-of-sale system 8008. In these embodiments, for example, seats or sections may be dynamically assigned at the time a user redeems the NFT ticket 8022A and/or uses a redemption code to gain admittance to an event. Dynamic resolution of attributes such as assigned seat and/or assigned section may beneficially allow for simplified integration because the minting smart contract 3130 need not be aware of which seats are already assigned, are still available, etc. However, in other embodiments, the assigned seat 8216 and/or assigned section 8218 may be stored in the NFT ticket 8022A, which may improve a user experience in some cases. In embodiments of multi-use NFT tickets 8022A, results of dynamic resolution of attributes for a first set of uses of the NFT tickets 8022A may be used to configure dynamic resolution of attributes for a second set of uses; for example, if a user receives seats that are distant from the stage of a concert in a first dynamic resolution associated with a first ticket usage (e.g., due to the venue being near capacity), the user may then be pre-allocated a better seat for a subsequent event, such that, on average, the user is assured a given level of seating quality. In embodiments, a multi-use NFT ticket 8022A may thus be configured to guarantee an average quality of seating, such as measured by average distance from stage or other measure of quality.

In embodiments, the event data values 8154 may include a redemption counter, which may be used to track how many times a ticket has been redeemed in order to obtain entrance to an event specified by the event data values. A redemption counter 8222 may thus be used to indicate that a ticket has already been redeemed or partially redeemed. Therefore, the redemption counter 8222 may affect the resale value of the NFT ticket 8022A, since an unredeemed ticket may be worth more than a partially redeemed ticket, which may be worth more than a redeemed ticket. As noted above, collective levels of redemption across a set of tickets may also be collected and analyzed, such as to estimate the impact of the total remaining number of available redemptions.

In embodiments, the NFT ticket 8022A may define goods/service information 8232, which may specify one or more secondary benefits associated with the NFT ticket 8022A (e.g., goods or services that the owner of the NFT ticket 8022A may obtain). In some cases, multiple goods or services may be included, which may be tracked using a goods/services counter 8234 that may operate similarly to the redemption counter 8222.

The goods/services counter 8234 and/or the redemption counter 8222 may be examples of mutable attributes that may be updated when the ticket is redeemed. For example, if the NFT owner redeems the ticket to obtain admission to an event, the redemption counter 8222 may be updated by a redemption smart contract. Similarly, if the NFT owner later redeems the ticket for a secondary benefit, the goods/services counter 8234 may be updated by a redemption smart contract. If an owner has already redeemed an NFT ticket as many times as allowed, the redemption smart contract may prevent redemption.

The NFT ticket 8022A may further include an owner account 8240 that indicates the distributed ledger account of the owner of the NFT. In embodiments, the owner account 8240 may be a mutable attribute that may be updated upon resale, trade, or some other transfer from one account to another. The NFT ticket 8022A may further include a mint number 8242 indicating how many NFT tickets 8022A (e.g., for a given event and/or matching a given NFT ticket template 8140) were minted prior to the NFT ticket 8022A.

In some scenarios, the mint number 8242 may affect the resale value. For example, if certain mint numbers are provided with certain benefits (e.g., entrance to general admission based on mint number) and/or if the NFT tickets include a collectible element that persists after the event (e.g., collectible NFT digital assets), then the lower mint numbers may be more sought after, and therefore, potentially more valuable on secondary markets. Additionally or alternatively, in embodiments, a minting smart contract 3130, redemption smart contract 8032, redemption system 404, and/or point of sale system 8008 may be configured to provide additional benefits based on mint number. For example, users with lower mint numbers may be given access to a special area or other benefit (e.g., to award early purchases of tickets to an event or to provide early entry to an event). Additionally or alternatively, mint numbers may be used in random drawings to obtain additional benefits. In embodiments, these additional benefits may be determined and/or assigned at minting time (e.g., the minting smart contract 3130) and stored as attributes of the NFT ticket 8022A. Additionally or alternatively, the additional benefits may be awarded at redemption time (e.g., by a redemption system and/or point of sale system 8008) by providing one or more additional tokens (e.g., tokenized tickets) representing the additional benefits to the owner of the NFT ticket 8022A.

The NFT ticket 8022A may further include a link to a redemption smart contract link 8246 that references a particular redemption smart contract 8032 configured to redeem the NFT ticket 8022A. As described in more detail below, the redemption smart contract 8032 may be used to redeem the NFT ticket 8022A in order to obtain access to an event and/or to obtain one or more secondary benefits.

Figure 53B:
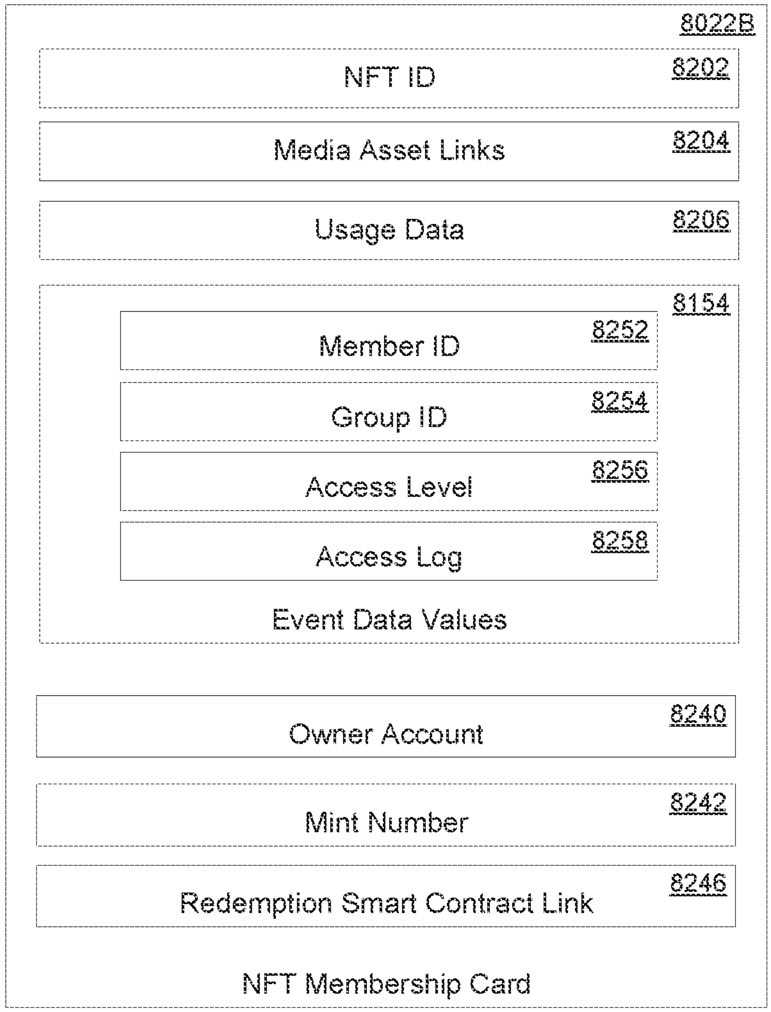

FIG. 53B illustrates another example NFT ticket 8022A that may be an NFT membership card 8022B. The example NFT membership card 8022B may include different event data values 8154 reflecting a different use case. Additionally, the example NFT membership card 8022B does not define any secondary benefits, although other example NFT membership cards may include secondary benefits. The NFT membership card 8022B may define event data values indicating, for example, a member identifier 8252, a group identifier 8254, an access level 8256, and an access log 8258. The member identifier 8252, for example, may be a unique identifier of a particular member, and the group identifier 8254 may be an identifier for a particular group including one or more members (e.g., family members for a family account or the like). In embodiments, the member ID and/or the group ID may be mutable attributes that may be updated (e.g., by a sales smart contract and/or marketplace) when the NFT membership card 8022B is transferred to another distributed ledger account. The access level 8256 may identify a level of access associated with the membership (e.g., "platinum-level", "gold-level", or "silver-level", each corresponding to different levels of access), which may be used (e.g., by a redemption smart contract, redemption system 404, and/or point-of-sale system 8008) to determine whether to allow redemption of the NFT membership card in order to access to a particular membership-related location, to allow redemption at a particular time, and/or the like. The access log 8258 may store information indicating past redemptions of the NFT membership card 8022B. In embodiments, the access log 8258 may be used (e.g., by a redemption smart contract, redemption system 404, and/or point-of-sale system 8008) to determine whether to grant a requested redemption. Thus, for example, a membership with a limited number of uses/times/etc. (e.g., a timeshare membership) could be embodied as a NFT membership card 8022B that is redeemable in certain contexts.

Figure 54:
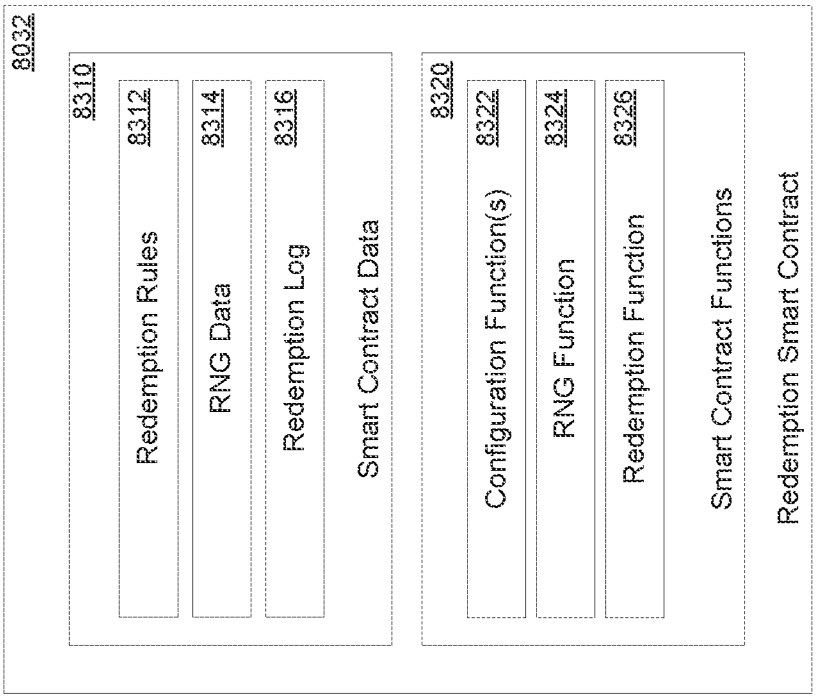
FIG. 54 is a schematic illustrating an example smart contract for redeeming tokenized tickets according to some embodiments of the present disclosure.

FIG. 54 illustrates an example redemption smart contract 8032, which may be configured to redeem a tokenized ticket 8022, such as an NFT ticket 8022A. For example, redemption functionality may be used to obtain event access information and/or to mark a ticket as having been used or "redeemed" after event access information has been granted. Additionally or alternatively, redemption functionality may be used to obtain one or more secondary benefits at an event or outside of an event, and/or to mark the secondary benefits specified in a ticket as having been redeemed. These and other functionalities may be enabled by redemption rules 8312 stored in a redemption smart contract 3128 or elsewhere in a distributed ledger.

As shown in FIG. 54, an example redemption smart contract may include smart contract data 8310 and smart contract functions 8320. The smart contract data may include redemption rules 8312, which may specify whether to allow redemption, whether and how to provide information (e.g., even access information) at a time of redemption, and/or the like. For example, a simple redemption rule may specify that an NFT ticket of a given type should have a redemption counter incremented when the NFT ticket is redeemed, and that the redemption smart contract should refuse to redeem the NFT ticket if the redemption counter is above a predetermined value. Another example redemption rule may cause storage of a current date and/or time in an access log of a particular NFT ticket when the NFT ticket is redeemed. In embodiments, redemption rules may also use data (e.g., data obtained from event organizers) to assign attributes to an NFT ticket 8022A at the time of redemption. For example, a user may be assigned a seat or section at the time of redemption, and a corresponding attribute of the NFT ticket 8022A may be set by the redemption smart contract 8032 as specified by one or more redemption rules. In some embodiments, the redemption rules may leverage randomness. For example, a redemption rule may specify a percentage chance that a redeemed NFT ticket will be provided with a seat upgrade, a free drink, or the like upon redemption. In embodiments, probabilistic elements within redemption rules may be tracked and/or governed by a set of rules across a set of NFT tickets, such that outcomes with respect to a first set of NFT tickets impact redemptions of a subsequent set of NFT tickets; for example, if seat upgrades are provided upon redemption of a number of NFT tickets in the first set, the probability of an upgrade upon redemption of NFT tickets in the second set may be reduced in order to satisfy an overall constraint on the number of available upgrades.

In some embodiments, redemption rules may depend on minting data, redemption data, or any other analytics data. For example, a redemption rule may use dynamic weights or probabilities that may be adjusted up or down based on redemption data (e.g., such that a user is more likely to obtain a secondary benefit if it has a low mint number). Similarly, rule probabilities may be adjusted up or down based on projected redemptions for an event and/or particular type NFT ticket. These mechanics may be used to balance the issuance of secondary benefits, the awarding of seat upgrades, and/or the like that may be awarded based on supply (e.g. how many tickets have been minted and/or are expected to be redeemed) and/or demand (e.g., how many other ticketholders have purchased upgrades via point-of-sale systems 8008). In these embodiments, a redemption smart contract 8032 may obtain redemption or other analytics data from a redemption log 8316 and/or from analytics data stored at other smart contract(s) (e.g., at minting smart contract 3130). The redemption rules may thus leverage and/or refer to analytics data, including logs of minting data, logs of redemption data, logs of data obtained from a point-of-sale system 8008, and/or the like, as discussed in more detail below.

The redemption smart contract 8032 may further include random number generator (RNG) data 8314, which may be used to generate a random number for use in any redemption rules that depend on randomness (e.g., randomly selecting to award). Additionally or alternatively, the redemption smart contract 8032 may request a random number from another smart contract that generates random numbers, and may subsequently receive a random number. Using the random number generator data 8314 and/or the received random number, the redemption smart contract 8032 may generate a random number for use in decision making.

In embodiments, the redemption smart contract 8032 may further include a redemption log 8316, which may include a log of past redemption (e.g., tallies of which tickets were redeemed, whether secondary benefits were redeemed, etc.) and data generated therefrom, such as values indicating a remaining supply of unredeemed tickets for a particular event, and/or the like. This data may be used for analytics purposes (e.g., by the analytics and reporting system 112) and/or as to modify a redemption rule that is based on redemption log data.

The redemption smart contract 8032 may further include smart contract functions 8320, which may include one or more configuration functions 7322 for creating, editing, or deleting redemption rules 8312 and/or RNG data 8314. For example, a device used by an event organizer may cause a first distributed ledger transaction that invokes a first configuration function 8322 to upload a first redemption rule 8312, cause a second distributed ledger transaction that invokes the first configuration function 8322 again to upload a second redemption rule 8312, and repeating this process, thereby configure the redemption smart contract 8032 to provide all the redemption rules for a given event, set of events, etc.

In embodiments, the redemption smart contract 8032 may further include a random number generator function 8324 for generating a random number (e.g., based on the RNG data 8314 and/or a random seed received from another smart contract).

In embodiments, the redemption smart contract 8032 may further include a redemption function 8326 for redeeming an NFT ticket using a redemption rule. The redemption function 8326 may be invoked by other smart contracts, by user devices 8102 (e.g., when a user wants to obtain event admission information), by the tokenization platform 100, and/or by a point-of-sale system 8008 (e.g., when a user scans a QR code associated with an NFT ticket at a point-of-sale system, logs into the point-of-sale system 8008 using a digital wallet, and/or the like). The redemption function 8326 may take, as arguments, an event identifier, an account identifier of the user requesting the redemption, an identifier of the NFT ticket 8022A to be redeemed, and/or the like. The redemption function may then proceed if the requested NFT ticket 8022A was transferred to the redemption smart contract 8032. For example, before invoking the redemption function 8326, a user account may transfer the NFT ticket 8022A to the redemption smart contract 8032. Then, when the redemption function 8326 is invoked, it may first check that the NFT ticket 8022A was received before proceeding with redemption. In some implementations, the redemption function 8326 may then redeem the NFT ticket 8022A (e.g., set an attribute indicating the NFT ticket was redeemed, burn the NFT ticket, and/or the like). Example implementations of the redemption function 8326 are described in greater detail below (e.g., with respect to FIGS. 55-57).

Figure 55:
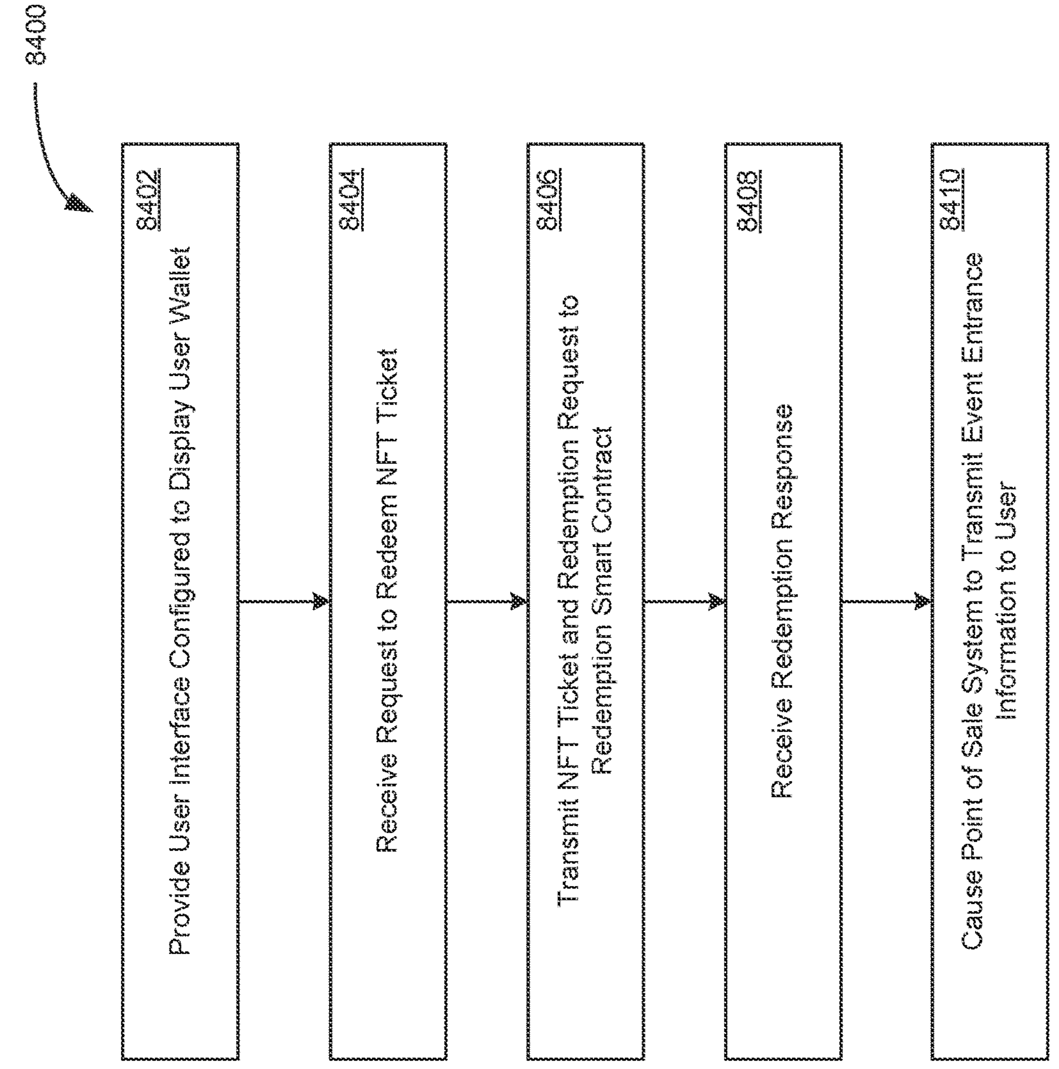
FIG. 55 is a flow chart illustrating an example set of operations of a method for redeeming tokenized tickets according to some embodiments of the present disclosure.

FIG. 55 illustrates an example workflow that may be executed by the tokenization platform 100 (e.g., by the redemption system 404 of the tokenization platform 100) and/or the user device 8002 in order to redeem an NFT ticket 8022A. At 8402, the tokenization platform 100 may provide a user interface to the user device 8002 that may be configured to allow a user to login to the user interface in order to access NFT-related functionality, such as functionalities for viewing NFTs in a user's wallet (e.g., a cloud wallet), selecting NFTs, and performing various NFT-related function on selected NFTs, such as redeeming an NFT ticket, crafting, unboxing, and/or the like. For example, a user may sign into a cloud wallet using cloud wallet credentials, which may enable the user interface to display the NFTs in the user's cloud wallet. In the example of FIG. 55, these NFTs may include an NFT ticket. Accordingly, the user interface may display information about the NFT ticket, such as a name of the NFT ticket, one or more event data values 8154 stored within and/or associated with the NFT ticket (e.g., the data values may be stored in a template referenced by the NFT ticket), one or more media assets that referred to media assets links 8204 stored within and/or associated with the NFT ticket, one or more secondary benefit data values 8156 stored within and/or associated with the NFT ticket, and/or any data associated with the NFT ticket. In some embodiments, the user interface provided by the tokenization platform 100 may be configured using data stored in a smart contract, such as a user interface smart contract 3122. Additionally or alternatively, the user interface provided by the tokenization platform 100 may be configured using traditional techniques.

At 8404, the user device 8002 and/or the tokenization platform 100 may receive a request to redeem a particular NFT ticket 8022A. For example, a user may interact with a user device 8002 to select a particular NFT ticket, then request redemption of the selected NFT ticket (e.g., by selecting a "redeem" button displayed in a user interface). In some embodiments (e.g., embodiments using server-side code execution), the user device 8002 may then transmit the request to the tokenization platform 100 (e.g., to the redemption system 404 of the tokenization platform 100).

In embodiments, the redemption functionality may be initiated by the user device 8002 using client-side code (e.g., code downloaded from the tokenization platform 100). For example, once the redemption request has been received by the user device 8002, the user device 8002 may communicate with node devices 3110 to cause a transaction with a redemption smart contract 8032 that redeems the NFT ticket 8022A. Additionally or alternatively, the redemption functionality may be initiated by the tokenization platform 100 (e.g., using server-side code). For example, the tokenization platform 100 may require wallet permissions that enable the tokenization platform 100 to cause transfer of the NFT ticket 8022A to the redemption smart contract 8032 on behalf of the owner of the NFT ticket. In any case, in the example workflow, at 8406 the user device 8002 and/or the tokenization platform 100 may communicate with the node devices 3110 to cause one or more distributed ledger transactions that cause the NFT ticket 8022A to be transferred to the redemption smart contract 8032 and invoke a redemption function of the redemption smart contract 8032. The redemption smart contract 8032 may be specified using a redemption smart contract link 8246 that may be stored as part of the NFT ticket 8022A and/or in an associated template, and accordingly the tokenization platform 100 and/or the user device 8002 may use the specified redemption smart contract for redemption.

At 8408, a response may be received from the redemption smart contract 8408. The response may comprise, for example, a distributed ledger transaction indicating that the redemption was successful, which the tokenization platform 100 and/or the user device 8002 may listen for by polling one or more node devices 3110. Additionally or alternatively, the response may include a transfer of the redeemed NFT back to the owner's wallet (e.g., assuming the NFT ticket was not burned). In some cases, the redeemed NFT ticket 8022A may have updated attributes (e.g., the redemption smart contract 8032 may have updated a field to indicate the NFT ticket was redeemed, such as a redemption counter 8222, may have added a media asset link 8204 that includes a QR code that may be scanned by a point-of-sale system 8008, etc.).

At 8410, the tokenization platform 100 and/or the user device 8002 may then communicate with the point-of-sale system 8008 in order to cause the point-of-sale system 8008 to transmit event entrance information to the user. In some embodiments (e.g., if the NFT ticket 8022A does not specify a specific seat, include a QR code for entrance, etc.), the point-of-sale system 8008 may select a particular seat, a particular entrance code, and/or the like, and transmit the information to the user. In some embodiments, the point-of-sale system 8008 may select these and/or other attributes using rules akin to the redemption rules 8312. For example, if the redeemed NFT ticket 8022A was associated with a particular rarity attribute (e.g., common, rare, epic), the point-of-sale system 8008 may assign a particular type of seat, admission to one or more areas, one or more secondary benefits, and/or the like based on the rarity attribute (e.g., such that rarer tickets may result or may have a greater chance of resulting in better seats, more access, more or better secondary benefits, etc.). The point-of-sale system 8008 may cause the event entrance information to be transmitted to the redeemer of the NFT ticket 8022A in any suitable manner, such as using email, text messages, printing a paper ticket (e.g., if the user is nearby), by minting and transmitting a new tokenized ticket 8022 to the redeeming user's wallet (e.g., an NFT ticket 8022A that includes a scannable QR code that may be used for entrance), by displaying information on a screen visible to a user or event staff, by unlocking a turnstile or other locked admission system, and/or the like.

Figure 56:
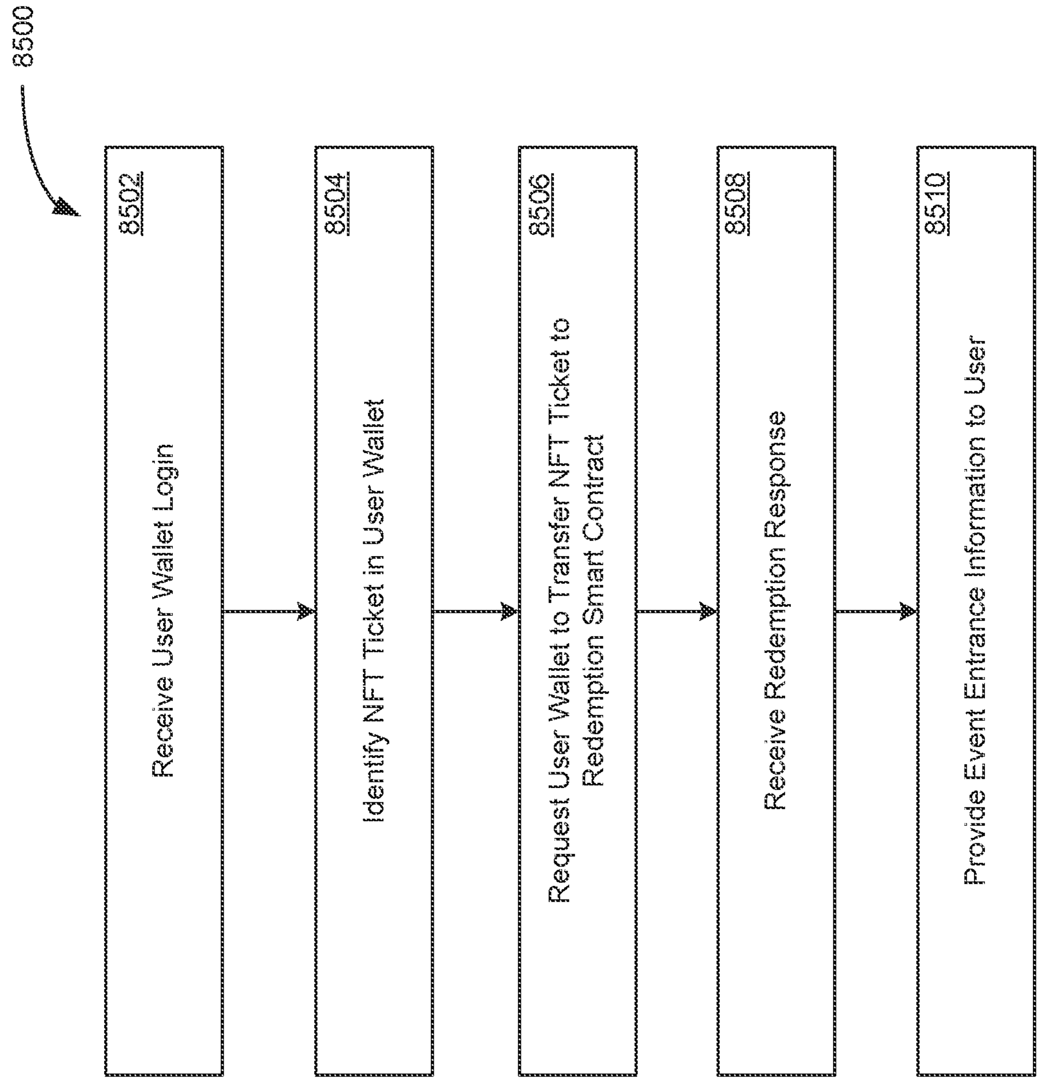
FIG. 56 is a flow chart illustrating an example set of operations of a method for providing event entrance information based on tokenized tickets according to some embodiments of the present disclosure.

FIG. 56 illustrates a second example redemption workflow that may be carried about a system that includes a point-of-sale system 8008 (e.g., a point-of-sale system 8008 that is blockchain-aware and/or that is integrated with the tokenization platform 100 and redemption system 404). At 8502, the point-of-sale system 8008 may receive a login to a user wallet. For example, at a point-of-sale system 8008 (which may be at an event entrance, for example), a user may sign in using cloud wallet credentials in order to allow access to the user's NFTs at the point-of-sale system 8008. At 8504, the point-of-sale system 8008 may identify an NFT ticket 8022A stored in the user wallet, for example by automatically selecting an NFT that may be used to gain entrance to an event happening at a time and/or place nearby the point-of-sale system 8008, and/or by requesting that the user select or confirm a matching NFT ticket 8022A.

At 8506, the point-of-sale system 8008 may request redemption of the NFT ticket 8022A. In some embodiments, the user may have granted permissions to the point-of-sale system 8008 (e.g., at login) to transfer the NFT ticket 8022A to a redemption smart contract 8032. Additionally or alternatively, the user may confirm that the point-of-sale system 8008 may cause redemption of the NFT ticket 8022A and/or manually initiate redemption of the NFT ticket 8022A. Accordingly, the point-of-sale system 8008 may communicate with the node devices 3110 to cause one or more distributed ledger transactions that cause the NFT ticket 8022A to be transferred to the redemption smart contract 8032 and invoke a redemption function of the redemption smart contract 8032. The point-of-sale system 8008 may use the redemption smart contract 8032 specified in by a redemption smart contract link 8246 for redemption.

At 8508, a response may be received from the redemption smart contract 8408. The response may comprise a distributed ledger transaction indicating that the redemption was successful, which may be read and/or received by the point-of-sale system 8008. Additionally or alternatively, the response may include a transfer of the redeemed NFT back to the owner's cloud wallet (e.g., assuming the NFT ticket was not burned). In some cases, the redeemed NFT ticket 8022A may have updated attributes (e.g., the redemption smart contract 8032 may have updated a field to indicate the NFT ticket was redeemed, such as a redemption counter 8222). At 8510, the point-of-sale system 8008 may then provide event entrance information to a user. The point-of-sale system 8008 may select a particular seat or some other attribute (e.g., if the redeemed NFT ticket 8022A does not already specify a particular attribute) and provide the information to the user. In some embodiments, the point-of-sale system 8008 may have already configured the redemption smart contract 8032 with various redemption rules 8312, such that the redeemed NFT ticket 8022A may be received with updated attributes. The point-of-sale system 8008 may cause the event entrance information to be transmitted to the redeemer of the NFT ticket 8022A in any suitable manner, such as by printing a paper ticket, by displaying information on a screen visible to a user or event staff, by unlocking a turnstile or other locked admission system, by otherwise communicating a message to the user, and/or the like.

Figure 57:
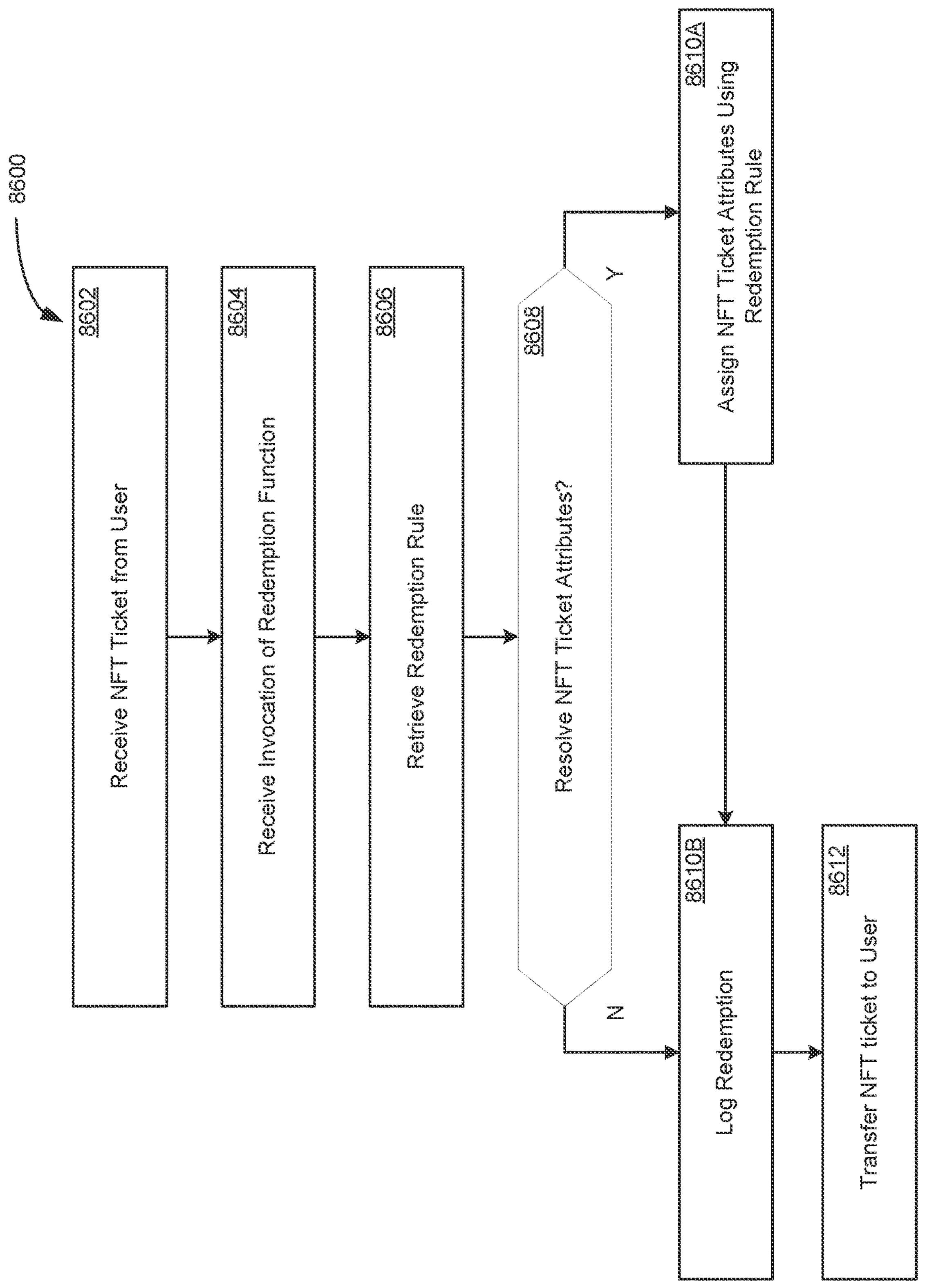
FIG. 57 is a flow chart illustrating an example set of operations of a method for redeeming tokenized tickets according to some embodiments of the present disclosure.

FIG. 57 illustrates an example method 8600 that may be executed by a redemption smart contract 8032 in order to redeem an NFT ticket 8022A. At 8602, the redemption smart contract 8032 may receive a first distributed ledger transaction that causes an NFT ticket 8022A to be received by an address of the redemption smart contract 8032. In embodiments, the first distributed ledger transaction may be initiated by the user device 8002 or some other device with permissions to perform transactions on behalf of a user (e.g., the tokenization platform 100 and/or point-of-sale system 8008, if the user has granted permissions to cause transactions on the user's behalf).

At 8604, the redemption smart contract 8032 may receive a second distributed ledger transaction invoking a redemption function 8326 of the redemption smart contract 8032. The second distributed ledger transaction may specify, for example, an identifier of the NFT ticket 8022A (e.g., an NFT identifier 8202), a template identifier associated with the NFT ticket 8022A (which, in some embodiments, may be used to find a particular redemption rule for the NFT ticket 8022A), an account of the owner of the NFT ticket 8022A (e.g., in order to transfer the NFT ticket 8022A back to the correct user wallet after redemption), and/or other such attributes that specify one or more redemption rules 8312 to be applied to the NFT ticket 8022A. In some embodiments, (e.g., when an NFT ticket may be redeemed in multiple ways, for example because an NFT ticket 8022A may provide access to multiple events and/or specify secondary benefit information), the second distributed ledger transaction may include an identifier of which event and/or secondary benefit the user wishes to redeem.

At 8606, the redemption smart contract 8032 may retrieve one or more matching redemption rules 8312 for redeeming the NFT ticket 8022A. In embodiments, an NFT ticket 8022A may correspond to a single redemption rule 8312, which may be specified, for example, using a template identifier associated with the NFT ticket 8022A and/or using event data values 8154 associated with the NFT ticket 8022A. Additionally or alternatively, some NFT tickets 8022A may correspond to different redemption rules 8312, which may be used, for example, to redeem the NFT ticket 8022A in different circumstances (e.g., for a particular event and/or secondary benefit specified by the NFT ticket 8022A). In some these embodiments, the redemption smart contract 8032 may determine which of the multiple redemption rules 8312 apply to the requested redemption (e.g., based on the data values received at step 8604, based on a current date and/or time, and/or using other contextual information).

In some embodiments, the applicable redemption rule(s) 8312 may specify one or more attributes of the NFT ticket 8022A to check prior to redeeming the NFT ticket (e.g., to determine if the NFT ticket has already been redeemed), one or more attributes of the NFT ticket 8022A to update as part of the redeeming the NFT ticket (e.g., a redemption counter 8222 that must be incremented), one or more attributes to determine using mathematical formulas (e.g., a probability of receiving a particular upgrade or benefit), one or more attributes to assign based on data stored at a different smart contract (e.g., a separate smart contract storing seat availability data, which may be polled to determine whether a particular seat is available), and/or the like. Accordingly, the redemption rule 8312 may specify one or more operations for updating the NFT ticket 8022A during redemption. Additionally or alternatively, a redemption rule 8312 may indicate that an NFT ticket 8022A should be burned during redemption.

At 8608, the redemption workflow may proceed differently depending on whether any NFT attributes need to be updated. If any attributes need to be updated, at 8610A the redemption smart contract 8032 may first determine the updated attributes and update the NFT ticket 8022A accordingly before proceeding with the workflow. In some of these embodiments, the redemption smart contract 8032 may, as part of determining the updated attributes, generate additional distributed ledger transactions in order to obtain data that may be used for the determination of the updated attributes. For example, if the redemption smart contract 8032 need a random number seed to determine a random number used to update an attribute of the NFT ticket 8022A, it may cause a distributed ledger transaction that requests the random number seed from a random number generator smart contract and wait to receive the random number seed in another distributed ledger transaction before proceeding to complete step 8610. As another example, the redemption smart contract 8032 may cause a distributed ledger transaction requesting an available seat number from another smart contract storing a table of available seats, and wait to receive an indication of an available seat via another distributed ledger transaction.

At 8610B, the redemption smart contract 8032 may log the redemption (e.g., in the redemption log 8316 maintained by the redemption smart contract 8032). The logged redemption may specify, for example, an identifier of the redeemed NFT ticket 8022A, one or more data values indicating the event and/or secondary benefit that was redeemed, one or more attributes that were assigned to the NFT ticket 8022A during redemption (e.g., a seat number that is no longer available), and/or any other data that may be used for logging and/or analytics purposes as described herein. It is noted that in logging a redemption event, the redemption smart contract 8316 may update the distributed ledger with a redemption event record indicating the NFT ticket has been redeemed. The redemption event record may include data such as the public account address of the redeeming user, the location at which the NFT ticket was redeemed, the time/date at which the NFT ticket was redeemed, and/or any other suitable data relating to the redemption event.

At 8612, the redemption smart contract 8032 may cause a distributed ledger transaction that transfers the redeemed NFT ticket 8022A back to the account of the user that owns the NFT ticket 8022A (e.g., as specified at 8604). In some embodiments, instead of transferring the NFT ticket 8022A back to the user, the redemption smart contract 8032 may cause the NFT ticket 8022A to be burned.

In some embodiments, the sale and transfer of tokenized tickets 8022 may be governed by a smart contract that allows the original seller to control or otherwise participate in the resale of the tokenized tickets 8022. For example, in some embodiments, a sales smart contract may be configured by or on behalf of the initial seller of tickets (e.g., LiveNation®, Ticketmaster®, or the like). In the sales smart contract, conditional logic may carve out payments that are to be shared with one or more parties in the event of a resale. For example, the conditional logic may require that any transfer of an NFT ticket 8022A incur a flat fee charge (e.g., $10) and/or a portion of the proceeds or profits of the sale (e.g., 10% of the proceeds or profits) be paid to the initial seller of the ticket. In the latter scenario (e.g., portion of the profits), the sales smart contract may require that the transaction be linked to the sales smart contract, such that the sale amount is conveyed in the transfer request. In these embodiments, the sales smart contract may define conditions that would allow resellers to transfer the ticket without paying a transfer fee if the ticket is being resold at no profit but would require that resellers pay a portion of the proceeds or profits when the item is sold for a profit. Furthermore, such smart contracts could be used to track the ownership/transfers of the NFT ticket from when it is sold until the time of the event.

Figure 58:
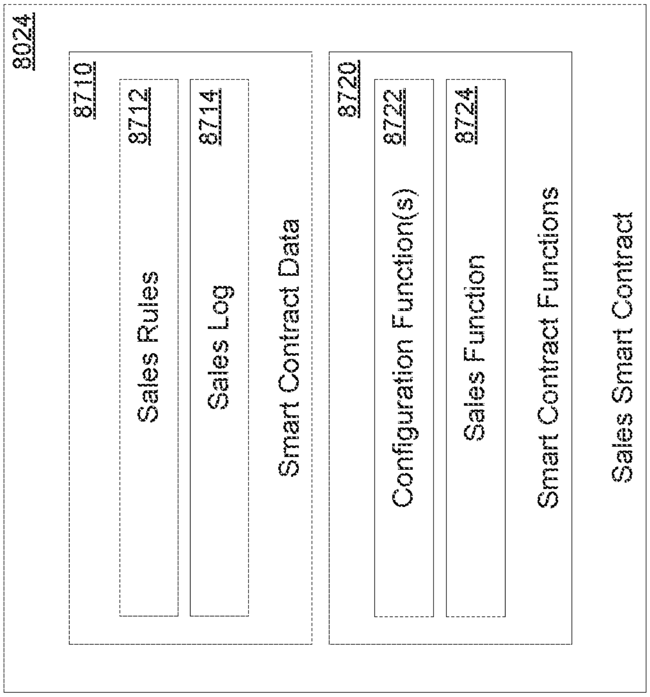
FIG. 58 is a schematic illustrating an example smart contract for managing sales of tokenized tickets according to some embodiments of the present disclosure

FIG. 58 illustrates an example sales smart contract 8024, which may be configured to govern the resales of NFT ticket 8022A according to embodiments described herein. The sales smart contract 8024 may include sales rules 8712 specifying conditions for transferring and/or reselling, such as a flat fee or percentage that must be paid to the initial seller, conditions for applying the flat fee or percentage (e.g., only if the price is greater than the initial sale price by a certain amount), a minimum price, a maximum price, or other such controls. In embodiments, these sales rules may be designed to discourage high prices for certain types of tickets or events, or conversely to encourage resales by allowing the original ticket issuer to charge a (relatively) lower price while being assured that profits from resales will still be captured. The sales rules 8712 may thus specify one or more accounts that will receive a portion of a resale price, the conditions for determining whether the accounts should receive a portion of the resale price, and/or the logic for determining how much of the resale price to transfer to the specified account(s).

The sales smart contract 8024 may further store a sales log 8714 including records of prior sales, resales, and/or other transfers of NFT tickets 8022A. For example, the sales log may specify a seller account, a buyer account, and a NFT identifier for each sale. In embodiments, some of the sales rules 8712 may refer to sales log data (e.g. to determine, how much a resale profit by subtracting a past sales price from a current sales price). Additionally or alternatively, the sales log 8714 may be used to generate various analytics data (e.g., by an analytics and reporting system 112).

The sales smart contract 8024 may further include one or more configuration functions for creating, editing, or deleting sales rules 8712. For example, a device used by an event organizer may cause a first distributed ledger transaction that invokes a first configuration function 8722 to upload a first sales rule 8712, cause a second distributed ledger transaction that invokes the first configuration function 8722 again to upload a second sales rule 8712, and repeating this process, thereby configure the sales smart contract 8024 to provide all the sales rules for a given collection of NFT tickets 8022A.

The sales smart contract 8024 may further include a sales function 8724, which be used (e.g., by a marketplace 3106) to share profits according to one or more sales rules 8712. For example, the marketplace 3106 may transfer an NFT ticket 8022A (and/or any other NFT or token being transferred or sold as described herein) and an amount of currency (e.g., cryptocurrency, tokenized tokens, fiat currency, or the like) corresponding to the sales price (which may be the sales price plus or minus certain fees) to the sales smart contract 8024. Then, the sales smart contract 8024 may distribute the received currency (e.g., cryptocurrency, tokenized tokens, or fiat currency) to the seller and/or any other parties that receive a portion of the sales price as specified by the sales rules, and may deliver the sold NFT ticket 8022A to the buyer. Accordingly, the sales function 8724 may receive as inputs one or more of an identifier of the NFT ticket 8022A being sold, an account of the buyer, an account of the seller, an account of the original seller, and/or an indication of the sales price.

Figure 59:
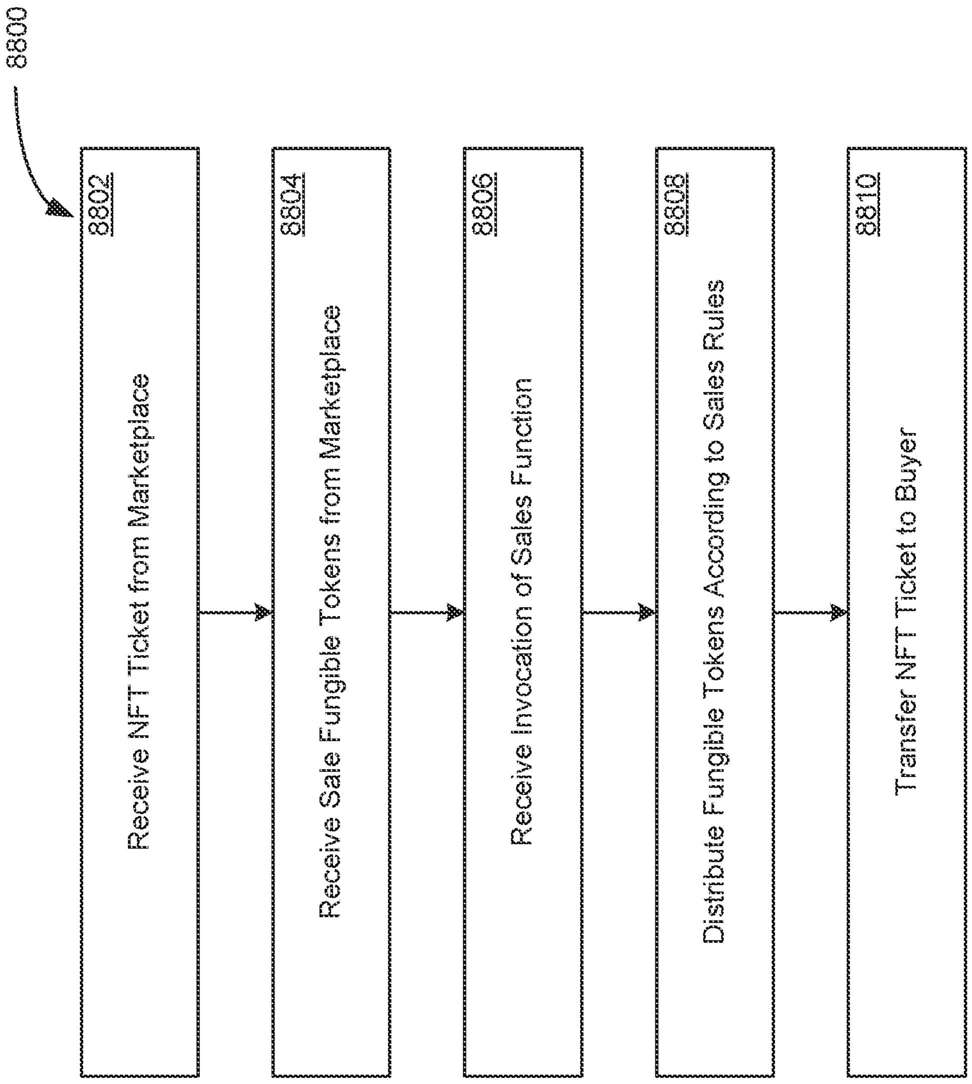
FIG. 59 is a flow chart illustrating an example set of operations of a method for selling tokenized tickets according to some embodiments of the present disclosure.

FIG. 59 illustrates an example workflow 8800 that may be executed by a sales smart contract 8024 to distribute profits from a resale of an NFT, such as an NFT ticket 8022A. At 8802, the sales smart contract 8024 may receive an NFT ticket 8022A (or some other NFT) via a first distributed ledger transaction, which may be caused by the marketplace 3016. For example, a seller may have transferred an NFT ticket 8022A to a marketplace 3106 as part of creating and/or completing a listing, and the marketplace 3106 in turn may transfer the NFT ticket 8022A to the sales smart contract 8024 after a purchase price is paid for the NFT ticket 8022A.

At 8804, the sales smart contract 8024 may receive an amount of an amount of currency (e.g., cryptocurrency, tokenized tokens, fiat currency, or the like) corresponding to the sale from the marketplace 3106 via a second distributed ledger transaction. For example, the marketplace may receive the amount of currency (e.g., cryptocurrency, tokenized tokens, fiat currency, or the like) from the buyer as part of a resale process, take out any fees (e.g., marketplace fees), and transfer the remaining amount to the sales smart contract 8024.

At 8806, the sales smart contract 8024 may receive an invocation of a sales function 8724 from the marketplace 3106 via a third distributed ledger transaction, which may specify one or more of an identifier of the NFT ticket 8022A that was received at 8802, an account of the seller of the NFT ticket 8022A, an account of the buyer of the NFT ticket 8022A, an account of the original creator of the NFT ticket 8022A, an indicator of a sales rule 8712, and/or an indicator of the amount of currency that was received at 8804.

At 8808, the sales smart contract 8024 may determine an amount of the currency to distribute to the seller and/or other accounts (e.g., an original creator of the NFT ticket 8022A) using one or more sales rules 8712. For example, the sales smart contract 8024 may determine a sales rule based on a value specified at 8806, based on a template identifier associated with the NFT ticket 8022A, based on an identifier associated with one or more event data values of the NFT ticket 8022A, and/or the like. In some cases, a sales rule 8712 may indicate that a portion of the sales price should be distributed to an account other than the seller account (e.g., to an original creator account) depending on a previous sales price for the NFT ticket 8022A. For example, the distributed portion may be a portion of the resale profit (e.g., the current sales price minus a previous sales price). In these embodiments, the sales smart contract 8024 may determine a previous sales price of the NFT ticket 8022A, for example by referring to the sales log 8714. The sales smart contract 8024 may thus determine the amount of currency to distribute to a seller and/or one or more other accounts using a sales rule 8712, and may cause distributed ledger transaction(s) to distribute the currency accordingly. At 8810, the sales smart contract may cause a final distributed ledger transaction that transfers the sold NFT ticket 8022A to the buyer.

Figure 60:
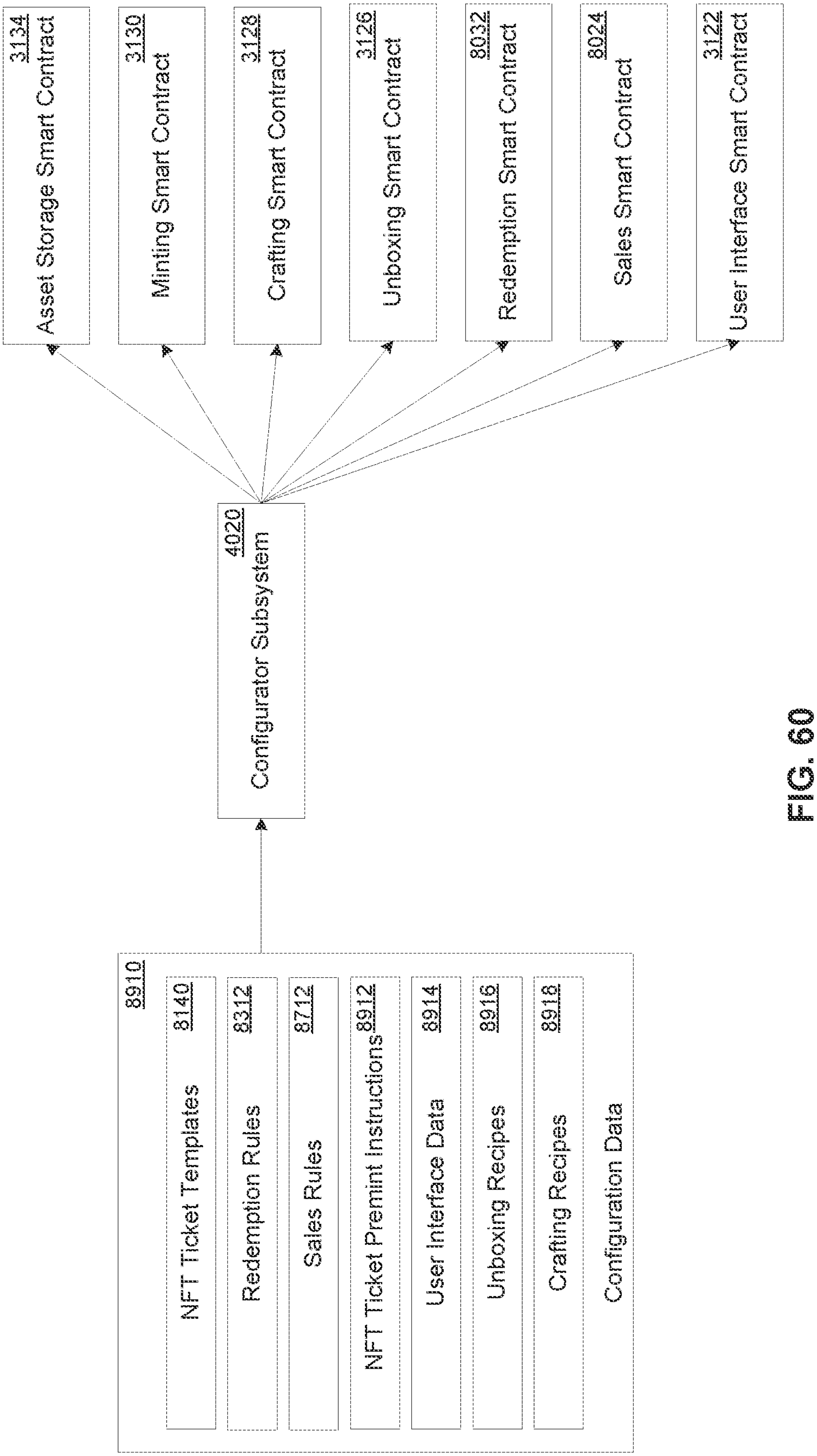
FIG. 60 is a data flow diagram illustrating an example data flow for configuring a ticketing environment according to some embodiments of the present disclosure.

FIG. 60 shows an example data flow for using configuration data 8910 to configure the various smart contracts used to implement NFT ticket collections and associated functionality. The configuration data 8910 may be generated by event organizers, which may create the configuration data 8910 using one or more automated tools and then transmit the configuration data 8910 to the tokenization platform 100. In some embodiments, such automated tools may be provided by the tokenization platform 100.

The configuration data 8910 may comprise one or more of NFT ticket templates 8140, redemption rules 4014, sales rules 8712, NFT ticket pre-mint instructions 8912, user interface data 8914, unboxing recipes 8916, and/or crafting recipes 8918. The configurator subsystem 4020 may receive the configuration data 8910, perform any formatting, error-checking, verification, or other such procedures, and may use the configuration data 8910 to configure the one or more smart contracts described herein.

The configurator subsystem 4020 may use the configuration functions 3232 of the minting smart contract 3130 to store the NFT ticket templates 8140 in the minting smart contract 3130. Similarly, the configurator subsystem 4020 may use the configuration functions 8322 of the redemption smart contract 8032 to store the redemption rules 8312 in the redemption smart contract 8032 and may use the configuration functions 8722 of the sales smart contract 8024 to store the sales rules 8712 in the sales smart contract 8024.

The configurator subsystem 4020 may further configure an asset storage smart contract 3134 using one or more NFT ticket pre-mint instructions 8912 to pre-mint NFT tickets using the pre-mint function 3234 of the minting smart contract 3130, which may cause data associated with the minted NFT tickets 8022A to be stored in the asset storage smart contract 3134. For example, the pre-mint instructions, when provided to the pre-mint function of the minting smart contract 3130, may initiate minting of 500 NFT tickets 8022A matching a first template, 1000 NFT tickets 8022A matching a second template, 100 NFT tickets 8022A matching a third template, and/or the like.

The configurator subsystem 4020 may further include user interface data 8914, which may be used by a website or other user interface accessed by the user devices 8002 to interact with the NFT tickets 8022A (e.g., to select a redemption function). For example, the user interface data 8914 may include data that indicates how a website should display the NFT tickets, configures the website to allow users to invoke redemption functions, and the like.

In some embodiments (e.g., if the NFT tickets 8022A are associated with unboxing and/or crafting functionalities), the configurator subsystem 4020 may use the configuration functions 3522 of the unboxing smart contract 3126 to store unboxing recipes 8916 associated with NFT tickets 8022A in the unboxing smart contract 3126, and/or may use the configuration functions 3422 of the crafting smart contract 3128 to store the crafting recipes 8918 associated with NFT tickets 8022A in the crafting smart contract 3128.

In some embodiments, the configurator subsystem 4020 may use the configuration data 8910 corresponding to a collection to configure and parameterize a pre-existing set of smart contracts already stored on distributed ledgers 3120. In these embodiments, the smart contracts may be and/or contain parameterizable smart contract templates that are reused for multiple collections, providing functionality for each according to the configuration data 8910 received for each corresponding collection. Additionally or alternatively, in response to receiving configuration data 8910, the configurator subsystem 4020 may deploy new smart contracts to the distributed ledgers, then configure the new smart contracts using the configuration data 8910. Additionally or alternatively, in response to receiving configuration data 8910, the configurator subsystem 4020 may parameterize smart contracts, then deploy the parameterized smart contracts to the distributed ledgers.

In embodiments, the analytics and reporting system 112 may provide various analytic, statistical, and/or other reporting data based on various uses of the tokenized tickets 8022. For example, analytics data may be provided to a marketplace 3106 in order to provide data that may be useful for potential purchasers in valuing (e.g., deciding whether to purchase or not, deciding how much to bid, etc.) the NFT or other tokenized tickets.

The analytics and reporting system 112 may obtain the data for generating analytics by reading and storing the minting data 3218 of the minting smart contract, the redemption log 8316 of the redemption smart contract 8032, the sales log of the sales smart contract 8714, and/or any other data generated by various other smart contracts described herein, data from sales or trades on the marketplace 3106 (e.g., price data, trading volume, and the like), data from venues (e.g., attendance data, weather data, capacity data, and the like), data relating to popularity of performers (e.g., bands, musicians and the like, such as download and playing data for music, viewership of video content, and the like), and the like.

The analytics data may be provided for several use cases. For example, the analytics and reporting system 112 may provide analytics data about NFT ticket collections and/or events as a whole, such as a total issued number of sold and/or redeemed NFT tickets for a given collection/event, an average price of resales for all NFT tickets for a particular event, an available supply of NFT tickets remaining for purchase, and the like. The analytics and reporting system 112 may further generate one or more popularity factors that may measure the amount of activity for a particular event, series of event, etc., including ticket sales activity, redemption activity, resales activity, and the like. The analytics and reporting system 112 may further generate comparative data for comparing various events, such as data indicating which events (e.g., of a series of events) performed best or worst, were resold for the highest price, had the most trading activity on a marketplace 3106, and/or the like.

The analytics and reporting system 112 may further generate analytics data indicating the current usage of NFT tickets of various types (e.g., different levels of ticket), such as percentages or totals of a particular type that have been sold, traded, redeemed, partially redeemed, and/or used for other uses (e.g., crafted, levelled up, or the like). The analytics and reporting system 112 may further generate statistics indicating a current usage of NFT tickets of a particular type, such as percentages or totals of NFT tickets that are in user's wallets, that are in various smart contract accounts, that are listed for sale or trade on the marketplace 3106, that are available for purchase, and the like. In some cases, event organizers may use data indicating that an NFT ticket is listed on a marketplace for a particular average price to adjust the sales price for similar NFT tickets (e.g., such that a high resale value may lead to raising prices for original ticket sales, whereas a low resale value may lead to lowering prices).

The analytics and reporting system 112 may further generate ticket-specific analytics data. For example, the analytics and reporting system 112 may generate data indicating which seat number tickets are available for sale or trade (e.g., via the marketplace 3106). Such data may be provided to users to give them more information that may enable them to obtain tickets for two adjacent seats, for example.

The foregoing methods provide example implementations and may include additional or alternative steps without departing from the scope of the disclosure. Furthermore, in some embodiments, a single smart contract may perform multiple functions (e.g., an unboxing smart contract or a crafting smart contract may also mint new NFTs).

In some embodiments, NFT-based tickets can be collateralized for short term loans. In these embodiments, an owner of an NFT ticket may collateralize a ticket (e.g., using the collateralized token system described above), such that the term of the loan must expire before the day of the event so the ticket may be liquidated in the case of default. One benefit here is that the NFT ticket is self-authenticating, can be digitally escrowed on the distributed ledger, and the liquidation value can be easily derived from secondary markets, thereby allowing for more opportunity to lenders and/or better rates for borrowers. In some of these embodiments, an NFT ticket may be "conditionally sold", as described above before the loan is executed, thereby granting the "conditional buyer" executable rights to the NFT ticket should the borrower default. In these embodiments, the conditional buyer may be granted a monetary reward should the borrower successfully repay the loan. In these example embodiments, a loan repayment smart contract may designate a public address of an account of the conditional buyer as part of the default event workflow. In these example embodiments, the loan repayment smart contract may unlock an NFT ticket held in escrow and automatically transfer the NFT ticket to an account of the conditional buyer, should the loan repayment smart contract determine that the loan is in a default condition.

NFT-Facilitated Pre-Sales

In embodiments, tokens (including NFTs) may be used to provide a pre-sale interest in goods or services. For example, goods and services producers may wish to solicit funding from potential customers before creating the goods and services, and thus may pre-sell tokens entitling holders of the tokens to goods or services that are not yet in existence and/or not yet deliverable. Several benefits may be realized by minting and selling pre-sale tokens, including pre-sale NFTs. Pre-sale tokens may be configured to be tradable on token-based marketplaces, thereby creating secondary markets for the interests in future goods/services. Thus, holders of the tokens, if they decide they no longer want the pre-sold goods/services, may easily be able to transfer their right to purchase the goods/services to another customer. Users may be much more willing to invest in a pre-sale token that may be sellable at any time, sometimes even for a profit. This effect alone may vastly increase the potential market for pre-funding any type of goods or services, including creative projects (e.g., movies, games, music albums, etc.), physical goods (e.g., new technology devices, wine, whiskey, etc.), startup companies, or anything else. Existing crowdfunding solutions such as KICKSTARTER do not offer the ability to trade interest stakes in anything funded via the platform, and thus purchasing a product that does not yet exist comes with a vastly increased risk and no chance of profit.

Additionally, users who pre-purchase goods often have no recourse if the goods are not delivered. Using techniques described herein, pre-sale tokens and/or smart contracts may provide an automatic and verifiable recourse if/when a good or service fails to be delivered. For example, smart contracts may escrow funds that may be automatically refunded if a certain amount of time passes and a pre-sold good or service has not been delivered, and/or pre-sale tokens may define alternate benefits that may be redeemable if a primary benefit fails to be delivered (e.g., a pre-sale token may be redeemable for a similar good/service if the pre-sold good/service is not delivered on time).

Pre-sale NFTs may provide additional advanced functionality based on various attributes associated with each pre-sale NFT. For example, pre-sale NFTs may store a mint number that may entitle a holder to a benefit based on the value of the mint number (e.g., users with lower mint numbers may receive their goods/services earlier, may be upgraded to a higher tier good/service, etc.). Similarly, pre-sale NFTs may be collectible NFTs, VIRL NFTs, in-game NFTs, craft-able NFTs and/or inputs to crafting recipes, unbox-able NFTs and/or NFTs that may be obtained using unboxing recipes, NFTs that are redeemable for entry to an event (e.g., NFT tickets), and/or may use any of the other NFT functionalities defined herein.

In embodiments, the stages of a pre-sale marketplace process may include one or more of: a request stage where a would-be purchaser of a pre-sale item or a token relating to the pre-sale item requests the production of the token or the production of the item (such as a good, which may be a physical, digital, or other good); an announcement stage where a user of the platform (such as a producer of a pre-sale item, a retailer of the pre-sale item, an advertiser of the pre-sale item, and/or a party affiliated with a pre-sale item or production thereof) announces a pre-sale event during which would-be purchasers may obtain a right, represented by a token, to purchase, obtain, and/or control a physical, digital, or other good; a virtualization stage where a VIRL corresponding to the pre-sale item is generated; a contracting stage where the contractual terms governing the configuration, minting, management and redemption of a token associated with the pre-sale item(s) are manifested; a tokenization stage where the VIRL is tokenized into at least one pre-sale token 9042 and at least one redemption NFT token 9044 (in embodiments, a pre-sale token 9042 and a redemption NFT token 9044 may be inherent to a single token, rather than independent tokens); a placement stage where the pre-sale item is placed on the pre-sale marketplace 9010 for purchasers to purchase the right to purchase, obtain, and/or control a physical, digital, or other good; and a purchase stage in which a token associated with a pre-sale item is bought.

Figure 61:
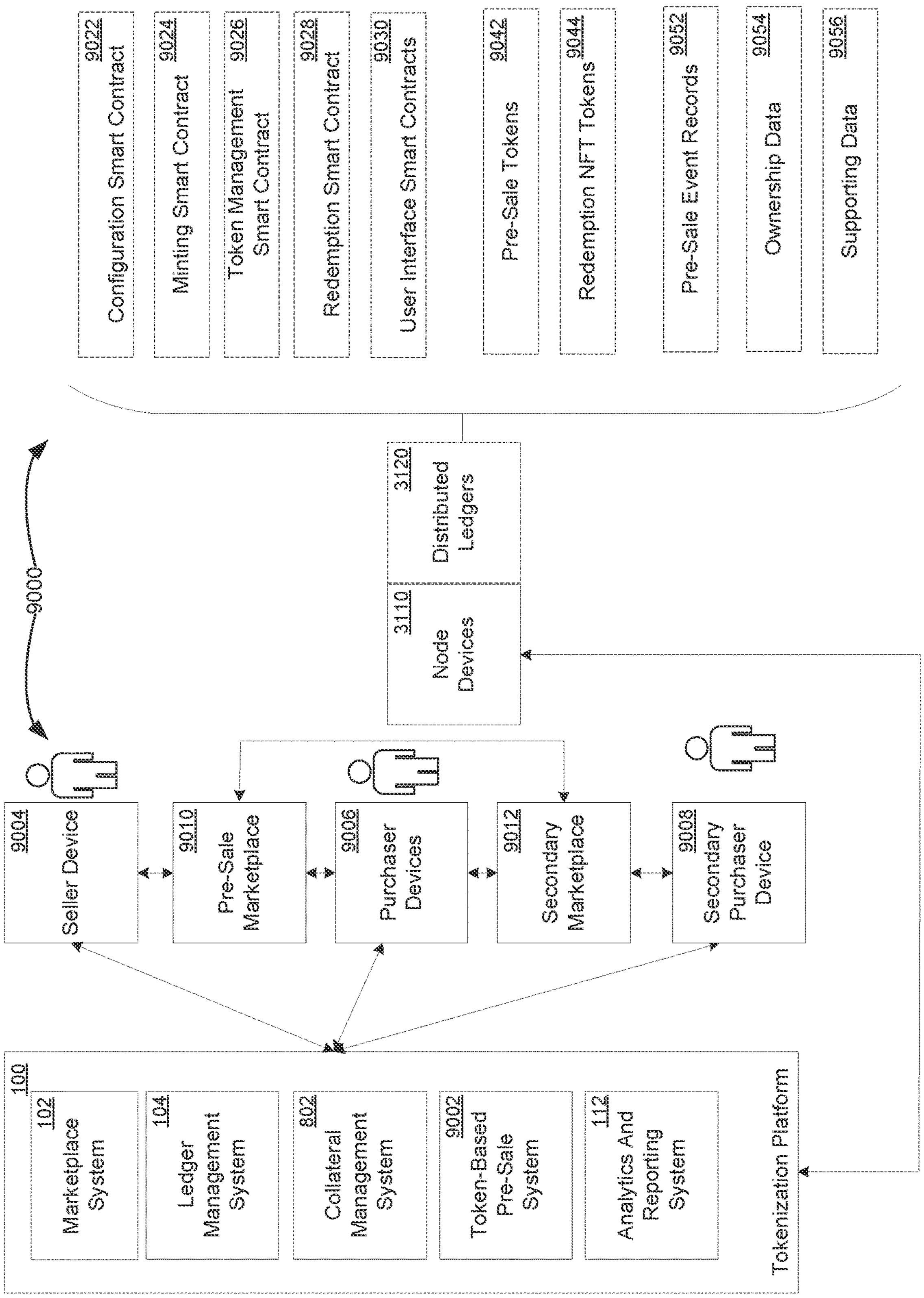
FIG. 61 is a schematic illustrating an example environment of a tokenization platform configured to provide pre-sale functionality according to some embodiments of the present disclosure.

Referring to FIG. 61, in example embodiments, a marketplace system 102, a ledger management system 104, a collateral management system 802, a token-based pre-sale system 9002, and an analytics and reporting system 112 may be configured to interface with a set of user devices (e.g., seller devices 9004, purchaser devices 9006, secondary purchaser devices 9008, or some other type of device associated with the pre-sale marketplace 9010) in facilitating the pre-sale processes using, in part, a set of distributed ledgers 3120 hosted by a set of node devices 3110. The participants in the pre-sale marketplace 9010 may interact with one another and with the distributed ledger(s) 3120 via various computing devices, such as laptop computers, desktop computers, tablets, video game consoles, server computers, and/or the like. For purposes of explanation, a purchaser may participate in the pre-sale marketplace 9010 via a purchaser device 9006, a seller may participate in the pre-sale marketplace 9010 via a seller device 9004, a purchaser on a secondary market, as described herein may participate in the pre-sale marketplace 9010 via a secondary purchaser device 9008, and the like.

In embodiments, the seller device(s) 9004, purchaser device(s) 9006, and/or secondary purchaser device(s) 9008 may be the same devices as the buyer devices, seller devices, and/or other user devices described elsewhere herein. In other words, the same user devices may engage with multiple functionalities, as buyers, sellers, purchasers, secondary purchasers, and otherwise as described herein. Additionally or alternatively, the pre-sale marketplace 9010 and/or secondary marketplace 9012 may be the same as other marketplaces described herein. Moreover, functionalities attributed to the marketplaces may alternately be performed by the tokenization platform 100 (e.g., using the marketplace system 102). In embodiments, the various smart contracts described in connection with pre-sales may be the same or different smart contracts than those described elsewhere herein (e.g., the minting smart contract 3130 may be the same as the minting smart contract 9024, etc.).

In embodiments, a seller may instruct the platform 100 and/or the pre-sale marketplace 9010 to generate virtual representations of one or more items (which may be goods or services yet to be produced) within a pre-sale marketplace 9010, such that each virtual representation represents an item that is available for a transaction, such as a pre-sale reservation, purchase, or some other type of transaction. In embodiments, the producer/seller of a pre-sale item may provide item attributes and description relating to an item, or set of one or more items, such as a number of items available for transaction, pricing information of an item, delivery restrictions for the item, expiries relating to the item (e.g., how long the transaction is valid), an item description, a serial number (e.g., of physical items), media relating to the item (e.g., photographs, videos, and/or audio content), and/or the like. In response to the producer/seller providing the item information on the pre-sale marketplace 9010, the tokenization platform 100 may generate a set of tokens corresponding to the number of items available for transaction. For example, if the seller indicates that there are fifty pieces of limited-edition digital art prints available for pre-sale, the platform 100 may generate a virtual representation of the digital art print and may generate fifty pre-sale tokens 9042 corresponding to the virtual representation, whereby each pre-sale token 9042 corresponds to a respective instance of the virtual representation. The virtual representation may include a description of the digital art, a price, delivery information relating to the digital art, a reproduction of the digital art, and/or other suitable types of information. The platform 100 may then store the virtual representation and the corresponding pre-sale tokens 9042 in a distributed ledger and/or a filesystem that may be accessible from the distributed ledger (e.g., IPFS). For each pre-sale token 9042, the distributed ledger may store the pre-sale token, ownership data relating to the pre-sale token, media content corresponding to the pre-sale token (or the virtual representation to which the pre-sale token corresponds), and/or other suitable data relating to the pre-sale token in the distributed ledger. In some embodiments, the ownership of the pre-sale token may be assigned initially to the producer/seller of the item that is the subject of the pre-sale token 9042. As such, the distributed ledger may indicate the existence of the pre-sale token and that the producer/seller owns the pre-sale token. Once tokenized, end users (e.g., registered buyers on the pre-sale marketplace 9010) may participate in transactions for the item using the corresponding pre-sale token. In response to a transaction, the platform 100 may update the distributed ledger to indicate an assignment of the pre-sale token 9042 to the user (e.g., to a wallet associated with an account of the user). In embodiments, a copy of the pre-sale token 9042 may be stored in a digital wallet corresponding to the new owner of the pre-sale token (e.g., the buyer).

In embodiments, minting smart contracts 9024 may generate different types of tokens, such as NFTs or fungible tokens representing different types of pre-sale goods, varieties of pre-sale goods, and the like. It is noted that NFTs may be used in scenarios where the token corresponds to a non-fungible item (e.g., a work of art, a numbered piece of art, a limited-edition item, or any other scenario where the NFT may be tied to a particular item) and/or where the order of redemption is determined using the NFTs (e.g., by the minting number of the NFT). In embodiments, fungible tokens may be used in scenarios where the presale items are non-fungible (or the supply of items will exceed the number of presale tokens that are sold). In some embodiments, the minting smart contract 9024 may be implicated, for example, when a pre-sale marketplace user purchases a right to purchase, obtain, and/or control a physical, digital, or other good on a pre-sale marketplace 9010. Alternatively, the minting smart contract 9024 may be implicated when the seller of the presale item(s) requests the generation of a set number of tokens (e.g., by batch pre-minting the set number of tokens).

In embodiments, the minting smart contract 9024 may receive a request to mint one or more new pre-sale tokens, such as NFTs or fungible tokens tied to a pre-sale event. The request may indicate a template ID and/or a set of attributes and a user account to which the pre-sale token will be assigned. In embodiments, the template ID or set of attributes may be indicative of the type of pre-sale token that will be generated, as the template (or the set of attributes) may define the name of the pre-sale token (e.g., a descriptor of the pre-sale item), an image of the pre-sale item, and/or any other item features of interest. The minting smart contract may determine a set of attributes for the pre-sale token to be minted. In embodiments, the set of attributes may be defined in the template indicated by the template ID provided in the request. In these embodiments, the minting smart contract may retrieve the template based on the template ID. Alternatively, the request may explicitly include the set of attributes.

In embodiments, the minting smart contract 9024 may mint a new pre-sale token 9042 based on the set of attributes and generate a unique value (e.g., a hash value) that represents and uniquely identifies the pre-sale token 9042. The minting smart contract may also determine a minting number, whereby the minting number is indicative of a relative order when the pre-sale token 9042 was generated in comparison to other pre-sale tokens 9042 of the same type. In embodiments, pre-sale tokens 9042 of different types may have common minting numbers. In embodiments, the minting smart contract 9024 may assign a pre-sale token 9042 to an account of a user of the pre-sale marketplace 9010. In embodiments, the minting smart contract 9024 may update a ledger (e.g., a blockchain) to reflect that the new pre-sale token 9042 is owned by a specified account. In embodiments, the minting smart contract 9024 may be configured to pre-mint the pre-sale tokens 9042, as described elsewhere herein.

In embodiments, the platform 100 may include a collateral management system 802. In embodiments, the collateral management system 802 allows a borrower to collateralize a pre-sale token 9042 to be used as a collateral item, for example, when requesting a loan. In some of these embodiments, a user wishing to borrow money can present a collateralized pre-sale token to a facility affiliated or otherwise supported by the platform 100. At the facility, an employee at the facility may inventory the collateralized pre-sale token using an interface provided by the collateral management system 802. Inventorying the collateralized pre-sale token may include requesting an item identifier for the collateralized pre-sale token, associating the item identifier with an account of the user (i.e., the owner of the collateralized pre-sale token), entering a description of the collateralized pre-sale token, an appraisal of the collateralized pre-sale token, and the like. Once inventoried, the collateral management system 802 may use the collateralized pre-sale token as a collateral token, as described herein.

In embodiments, the pre-sale marketplace 9010 process may be at least partially implemented using a set of distributed ledgers 3120 hosted by a network of node devices 3110, where the node devices 3110 execute smart contract instances that are created in connection with a pre-sale marketplace process, including one or more smart contracts that manage the tokenization of one or more pre-sale items. In some embodiments, one or more stages in the pre-sale marketplace process are managed by a respective set of smart contracts. In general, a smart contract may include computer executable code that, when executed, executes conditional logic that triggers one or more actions. Smart contracts may receive data from one or more data sources, whereby the conditional logic analyzes the data to determine if certain conditions are met, and if so, triggers one or more respective actions. Examples of smart contracts are discussed throughout the disclosure, including examples of conditional logic and triggering actions. In embodiments, the smart contracts associated with a pre-sale marketplace may be defined in accordance with one or more protocols, such as the Ethereum protocol, the WAX protocol, and the like. Smart contracts may be embodied as computer-executable code and may be written in any suitable programming languages, such as Solidity, Golang, Java™, JavaScript™, C++, or the like. In example embodiments of FIG. 61, a distributed ledger 3120 may store and the node devices 3110 may execute instances of: configuration smart contracts 9022, minting smart contracts 9024, token management smart contracts 9026, redemption smart contracts 9028, or some other type of smart contract as described herein. In embodiments, these smart contracts may work as described elsewhere herein. For example, the minting smart contract 9024 may perform any action attributed to the minting smart contract 3130 described elsewhere herein, the redemption smart contract 9028 may perform any action attributed to the redemption smart contract 8032 described elsewhere herein, and the like. The different types of smart contracts are discussed throughout the disclosure.

In embodiments, each virtual representation of a pre-sale item may include or be associated with an NFT and/or smart contract that, for example, provides a set of verifiable conditions that must be satisfied in order to self-execute a transaction (e.g., transfer of ownership, redemption and/or expiration) relating to a pre-sale item represented by the virtual representation. In embodiments, each token corresponding to a virtual representation may be associated with the smart contract that corresponds to the virtual representation. In embodiments, a smart contract corresponding to a virtual representation may define the conditions that must be verified to generate new tokens, conditions that must be verified in order to transfer ownership of tokens, conditions that must be verified to redeem a token, and/or conditions that must be met to destroy a token. A smart contract may also contain code that defines actions to be taken when certain conditions are met. When implicated, the smart contract may determine whether the conditions defined therein are satisfied, and if so, to self-execute the actions corresponding to the conditions. In embodiments, each smart contract may be stored on and accessed on a distributed ledger 3120 that is associated with the pre-sale marketplace 9010. In embodiments, pre-sale tokens may be sold, traded, exchanged or otherwise transferred, in whole or in part, on a secondary marketplace platform, as described herein. In embodiments, purchasers of a pre-sale token on a secondary marketplace may redeem the token, customize the pre-sale item represented by the token before redemption (if applicable to the given item), trade it for another token, obtain the cash value equivalent, and/or some other type of permitted transaction, exchange or action.

In embodiments, once the platform 100 and/or pre-sale marketplace 9010 generates a token, the distributed ledger may be updated to indicate the existence of a new token. A distributed ledger associated with a pre-sale marketplace 9010 may be public or private. In embodiments where the distributed ledger is private, the platform 100 may maintain and store the entire distributed ledger on computing device nodes 3110 associated with the pre-sale marketplace 9010. In embodiments where the distributed ledger is public, one or more third party computing node devices (or "computing nodes") may collectively store the distributed leger. In some of these embodiments, the pre-sale marketplace 9010 may locally store the distributed leger and/or a portion thereof. In embodiments, the distributed ledger associated with a pre-sale marketplace 9010 may be a blockchain, such as Ethereum blockchain, an EOS blockchain, or a distributed ledger that comports with any other suitable protocols (e.g., hashgraph, Byteball, Nano-Block Lattice, IOTA, or some other protocol). By storing tokens on a distributed ledger, the status of that token can be verified at any time by querying the ledger and trust that it is correct. By using the token approach to implementation, pre-sale tokens 9042, redemption NFT tokens 9044, and the like cannot be copied and redeemed without permission.

In embodiments, the distributed ledgers 3120 may store tokens that are used in connection with a pre-sale marketplace, including, but not limited to, pre-sale tokens 9042, redemption NFT tokens 9044, and other suitable tokens as described herein, that are generated in connection with the pre-sale marketplace process and held to secure a right to purchase, obtain, and/or control a physical, digital, or other good. In embodiments, the pre-sale token 9042 may be a digital token that wraps one or more virtual representations of a physical or digital item (VIRLs), including a physical or digital item not yet in existence (e.g., an item still in production or concept phase). In embodiments, a VIRL corresponding to a physical or digital item and may include descriptions of the item, photographs of the item, videos of the item, descriptions of the production timeline, descriptions or a redemption process, and the like. In embodiments, the pre-sale token 9042 may include a link to a smart contract and/or smart contract wrapper, such that when an purchaser/owner of a pre-sale token (as determined from an ownership record of the pre-sale token such as that maintained by, or in association with, a pre-sale marketplace) redeems the token (as described herein), the smart contract associated with the pre-sale token 9042 may provide a notification to the owner or holder of a pre-sale item represented by the pre-sale token 9042 to provide the pre-sale item once it is produced and available to possess and/or transfer ownership. Once the owner or holder of a pre-sale item confirms that the redemption process is complete (e.g., the holder of the pre-sale token 9042 has taken possession of the item or the item has been delivered to the holder of the pre-sale token), the smart contract of the pre-sale token 9042 may burn the redemption NFT token 9044, as described herein.

In embodiments, distributed ledgers 3120 may store additional data, such as pre-sale data and pre-sale event records, ownership data, and/or supporting data. Pre-sale event records 9052 may include records that memorialize any events that occur in connection with a pre-sale process. Pre-sales event records may include records of pre-sale events such as, but not limited to: a request for an item or a token by a would-be purchaser, a sales offer by a producer/seller of a pre-sales item or token, time data, such as the production and/or redemption timetable for a pre-sale item, information such as a physical location from which a pre-sale item may be shipped, a digital location from which a digital pre-sale item may be retrieved, pricing information for a token and/or item (which may include variable pricing information, such as where the price of the token varies by time and/or based on input parameters, such as information about the value of the pre-sale item), or some other type of pre-sales event record data. In embodiments, an event record may be generated by any suitable computing device within the environment 9000, such as the tokenization platform 100, seller devices 9004, purchaser devices 9006, secondary purchaser devices 9008, or some other type of device associated with the pre-sale marketplace 9010. In embodiments, a pre-sale event record 9052 may be hashed using a hashing function to obtain a hash value. The pre-sale event record 9052 may be written into a data block and stored in a distributed ledger, where the data block may include the hash value. In this way, the data within the pre-sale event record 9052 cannot be changed without changing the hash value of the event record 9052, thereby making the pre-sale event record 9052 immutable. Once a block containing a pre-sale event record 9052 is stored on a distributed ledger, the pre-sale event record 9052 may be referenced using an address of the block with respect to the distributed ledger 3120.

In embodiments, the supporting data 9056 may be documentation and data that is provided in support of a task performed or other events that occur in connection with a pre-sale marketplace 9010 and/or the participants of the pre-sale marketplace 9010.

In embodiments, the ownership data 9054 may include data that associates a pre-sale token 9042 to an account, including but limited to a purchaser's account, a pre-sale item producer's account, or some other type of account associated with a pre-sale marketplace 9010. In embodiments, the ownership data 9054 may be stored in data blocks, where a data block may include a link between a token address and an account address. For example, if a purchaser, such as an individual registered on a pre-sale marketplace platform 9010, owns cryptocurrency tokens (e.g., bitcoins), the ownership data 9054 of each token may be stored on a distributed ledger 3120 and may link the respective tokens to an account associated with the purchaser. If the purchaser uses one of those tokens to purchase an item from a pre-sale item producer that is registered on the pre-sale marketplace platform 9010, the ownership data 9054 of the token can be updated to link the token used to purchase a right to the pre-sale item to an account of pre-sale item producer/seller. When ownership changes to a new account, a new block may be amended to the distributed ledger 3120 that links the token with the new account. In embodiments, the pre-sale tokens and/or the redemption NFT tokens 9044 may be locked during the course of a pre-sale marketplace process or may be released for trading on a pre-sale token secondary marketplace, as described herein. As used herein, "locking" a token may refer to storing the token in a pre-sale marketplace account, or some other account type that does not permit further trading (e.g., on a distributed ledger that stores tokens) until the token is unlocked (e.g., transferred to another account). When a token is "locked," ownership data 9054 that may link the token to an account that is managed by a trusted third party (e.g., the tokenization platform 100) may be added to the distributed ledger. Once locked in the account, the token cannot be redeemed or transferred unless it is unlocked (e.g., by the pre-sale marketplace 9010). Once a pre-sale event that triggers a change in the status of a token occurs (e.g., the item subject to the pre-sale event is produced and available for distribution), the ownership data 9054 of the token may be updated in the distributed ledger 3120 storing the ownership data 9054 to reflect that the token is owned by the rightful owner, thereby unlocking the token.

In embodiments, the distributed ledgers 3120, pre-sale event records 9052, ownership data 9054, and supporting data 9056 and other suitable data that supports the pre-sale marketplace 9010 may be stored in non-distributed datastores, filesystems, databases, and the like. For example, in embodiments, the tokenization platform 100 may maintain data stores that store pre-sale event records 9052, ownership data 9054, and supporting data 9056 and other suitable data that supports the pre-sale marketplace 9010.

In embodiments, an owner of a pre-sale token 9042 may redeem the token. In embodiments, a user may select a pre-sale token to redeem from a digital wallet of the user. In response to the selection, the digital wallet may transmit a redemption request to the redemption smart contract 9028, the pre-sale marketplace 9010, and/or the associated platform 100. The redemption request may include the pre-sale token (or an identifier thereof) and a public address of the user (or any other suitable identifier of the user). In an example, the pre-sale marketplace 9010 may receive the redemption request and verify the validity of the pre-sale token and/or the ownership of the pre-sale token (e.g., by inspecting a digital wallet of the redeeming user and/or the distributed ledger). Once verified, the user may be granted permission to redeem the pre-sale token 9042. In some examples, the user may be redeeming a pre-sale token 9042 corresponding to a digital item (e.g., an mp3, a movie, a digital artwork). In these scenarios, the platform 100 may determine a workflow for satisfying the digital item. For example, the pre-sale marketplace 9010 may request an email address from the user or may look up an email address of the user from the distributed ledger. In this example, the pre-sale marketplace 9010 may email a link to download the digital item to the user's email account or may attach a copy of the digital item in an email that is sent to the user's email account. In another scenario, the user may be redeeming a pre-sale token 9042 corresponding to a physical good (e.g., painting, kitchen utensil) and the pre-sale marketplace 9010 may determine a workflow for satisfying the physical item. For example, the pre-sale marketplace 9010 may request shipping information from the user or may look up the shipping information of the user from the distributed ledger. The pre-sale marketplace 9010 may then initiate shipment of the physical good. For example, the pre-sale marketplace 9010 may transmit a shipping request to a warehouse that handles shipments of the good indicating the shipping information. The foregoing are examples of how a token may be redeemed. The pre-sale marketplace 9010 may execute additional or alternative workflows to handle redemption of a token.

In embodiments, pre-sale tokens and/or redemption tokens may be perishable, in that they lose all value at a predetermined time or upon the occurrence of a predetermined event. For example, a seller may provide an expiry in the virtual representation that indicates a date and time that the virtual representation is no longer valid, such that when the expiry is reached, the token may be deemed invalid. In some of these embodiments, temporal attributes of the respective tokens may include an expiry attribute that denotes a date on which the token is no longer redeemable and/or another predetermined condition that extinguishes the redemption rights of the token. In these example embodiments, use of an expiry with respect to a redeemable token may avoid having to have the seller or safekeeper store the physical item for an indefinite amount of time and may also facilitate more efficient order fulfillment if the tokens are redeemable at a certain time. In some embodiments, the smart contract that governs the redemption of the token may trigger a specific workflow if the expiry condition is reached, such as automatically initiating a refund to the token owner for the original price (and not the secondary market price) of the token when the expiry condition is triggered. In these embodiments, the seller may then relist the item that was never redeemed without unfairly prejudicing the token owner that was prevented from redeeming the token. It is noted that other tokens may not be refundable upon the expiration of the redemption rights. For example, if the item is a promotional item or an item that loses value after the expiry date, the seller may not wish to refund the token owner if the token owner fails to redeem the token by the expiry date.

Additionally or alternatively, the temporal attributes of certain tokens may designate a date and/or another predetermined conditions that trigger the tokens redemption rights. For instance, in some embodiments certain tokens may be redeemable on a certain date, such that the owner of the token can only redeem the token for the item on or after the certain date. Additionally or alternatively, certain tokens may become redeemable when a certain condition is realized. For instance, for items that were not yet in existence when the tokens were sold, the tokens may become redeemable once the items are in possession of the seller. In another example, for items that are aged, such as wine or whiskey, tokens that are redeemable for such items may become redeemable once the items are ready for distribution. For example, a wine maker or whiskey distiller may decide that a certain batch of wine or whiskey is ready for bottling. Once deemed ready by the appropriate entity, the tokens may become redeemable. In this way, the redemption rights may materialize once the seller believes that certain quality standards have been met. In these embodiments, the smart contract governing redemption of the tokens may include conditional logic that is triggered when electronic verification of the item being ready for redemption is received by the smart contract. In some of these embodiments, the conditional logic may trigger a workflow that alerts the token holders that the tokens are now redeemable. In these example embodiments, the token holders may be identified upon inspection of the distributed ledger and/or the digital wallets of the token holders.

In another example of a temporal attribute, a seller may set a minimum cumulative investment amount in the pre-sale event that must be reach in order for each of the pre-sale tokens related to a pre-sale item to be redeemable; if such minimum cumulative investment amount is not met, all pre-sale tokens 9042 associated with the pre-sale item may be void.

In embodiments, a token may be configured and minted, with an associated set of smart contract terms and conditions, that represents the right to redeem for a pre-sale item in the case that another token for the pre-sale item expires without redemption. Such a token may, for example, allow a prospective purchaser of the pre-sale item to secure a place in line in case a prior token holder does not redeem prior to an expiration date. This may be referred to as, for convenience, a "waiting list" token, a "back-up token," or the like. In embodiments, such a waiting list token may provide for refund of some or part of the consideration upon the redemption of the prior token, which thereby may extinguish the opportunity for the waiting list token holder to obtain the pre-sale item. A waiting list token may be configured, minted, managed, redeemed, and otherwise handled like other tokens described herein and in documents incorporated by reference herein. A waiting list token may, in embodiments, be used as collateral for token-based lending like other tokens described herein and in the documents incorporated by reference herein.

In embodiments, the token-based pre-sale system 9002, as described herein, may allow an owner of a pre-sale token 9042, redemption NFT token 9044, waiting list token, or other token, to redeem a token. In embodiments, the token-based pre-sale system 9002 may be and/or include a redemption system 404. The redemption system 404 may receive a request (a "redemption request"), such as a request from a user of a pre-sale marketplace 9010, to redeem the pre-sale token. The redemption system 404 may be included in a pre-sale marketplace 9010, associated with a pre-sale marketplace 9010, or independent from and operably connected with a pre-sale marketplace 9010. The redemption request may include the pre-sale token or an identifier of the pre-sale token (e.g., an alphanumeric string) and may include a public address of the account of the user attempting to redeem the pre-sale token. In response to receiving the redemption request, the redemption system 404 may provide the pre-sale token, the public address of the account of the user attempting to redeem the token, and the public key used to digitally sign the pre-sale token to the ledger management system 104. The ledger management system 104 may then either verify or deny the token/public address combination. The ledger management system 104 may deny the combination if the pre-sale token is not a valid pre-sale token and/or the user is not the listed owner of the pre-sale token. The ledger management system 104 may verify the token/public address combination if the pre-sale token is deemed valid and the requesting user is deemed to be the owner of the pre-sale token. In embodiments, the redemption system 404 may execute a workflow corresponding to the virtual representation to which the redeemed pre-sale token corresponds, as described herein.

In embodiments, the ledger update system 304 may be further configured to "burn" pre-sale tokens 9042. Burning pre-sale tokens 9042 (or redemption tokens) may refer to the mechanism by which a pre-sale token 9042 (or redemption token) is no longer redeemable. A pre-sale token 9042 may be burned when the pre-sale token 9042 expires or when the pre-sale token is redeemed. In embodiments, the ledger update system 304 may update the ownership of the pre-sale token 9042 to indicate that the token is not currently owned (e.g., owner=NULL) and/or may update the pre-sale token 9042 state to indicate that the token is no longer valid. In some of these embodiments, the ledger update system 304 may generate a block indicating that the pre-sale token 9042 is not currently owned or that the state of the pre-sale token 9042 is not valid. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In some embodiments, the distributed ledger 310 is sharded. In these embodiments, the ledger update system 304 may designate a side chain 314 (e.g., an item classification) to which the pre-sale token 9042 corresponds. In these embodiments, the generated blocks are amended to the designated side chain 314 to indicate the burned pre-sale token 9042.

In embodiments, the pre-sale tokens 9042 may be tokenized, as described herein. For example, an owner of a pre-sale token 9042 wanting to sell a plurality of fractional ownership of the right inherent in the pre-sale token 9042 to third parties, such as third parties in a secondary trading marketplace, may tokenize a single pre-sale token into a plurality of tokenized tokens where each tokenized token represents a fractional ownership of the right inherent in the pre-sale token 9042. In an example, a user on the pre-sale marketplace 9010 may purchase a pre-sale token 9042 giving the user the right to purchase a digital artwork from a limited run of 50 once the producer/seller of the digital artworks satisfies the initial pre-sale minimum and produces the works. As the pre-sale tokens for the digital artwork are sold, some may be offered for resale on a secondary marketplace, for example to parties that were unable to purchase a pre-sale token for a digital artwork before the lot of pre-sale tokens were sold out. The user who successfully purchased a pre-sale token may see that the value of her pre-sale token on the secondary marketplace is increasing in value and decide to tokenize her pre-sale token into 10 new tokens where each represents a fractional share (i.e., 10%) of her pre-sale token 9042. Such tokenized pre-sale tokens may be subject to additional smart contracts specifying additional terms. For example, the sale of the tokenized pre-sale token may require the seller of the pre-sale token to monetize the digital artwork within a specified time from receipt so that proceeds of the sale may be fractionally distributed to the owners of the tokenized tokens at a rate proportionate to the fractional ownership inherent in the tokenized pre-sale token. Continuing the example, the conditions of the sale of the tokenized pre-sale tokens may require also require that the purchasers of the tokenized pre-sale tokens immediately redeem their tokenized pre-sale tokens upon the monetization of the digital artwork that is subject to the pre-sale token's rights. While an example of fractional ownership of a pre-sale token was discussed with respect to a digital asset, it is appreciated that pre-sale tokens relating to physical assets may also be fractionalized as well. For instance, an individual may purchase a pre-sale token granting redemption rights to a limited-edition watch that is likely to increase in value. In this example, the individual may tokenize the pre-sale token and sell fractional ownership rights to the watch, such that when the individual is able to monetize the watch and does monetize (e.g., sells) the watch, each holder of the fractional ownership tokens may receive a proportional amount of the sale.

Figure 62:
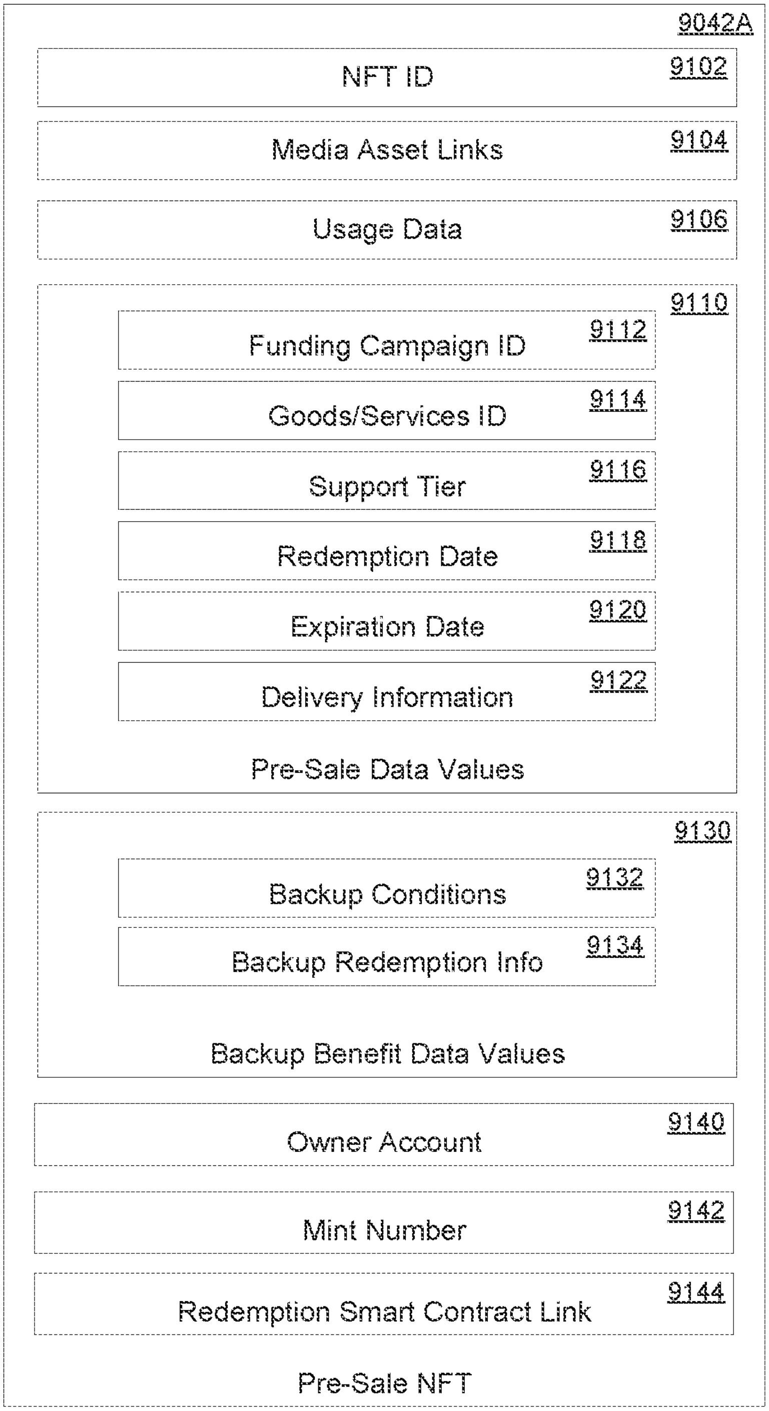
FIG. 62 is a schematic illustrating an example non-fungible token for providing pre-sale functionality according to some embodiments of the present disclosure.

FIG. 62 illustrates an example pre-sale NFT 9042A according to some embodiments of the present disclosure. In the illustrated example, the pre-sale NFT 9042A embodies both a pre-sale token 9042 and the functionality of a redemption NFT token 9044 (e.g., the pre-sale NFT 9042A may be redeemed). The pre-sale NFT 9042A may comprise a plurality of attributes with associated data values specifying various data for the pre-sale NFT ticket 9042A. Although all of the data values shown in FIG. 62 may be stored as part of a pre-sale NFT 9042, in some embodiments, certain pre-sale NFTs 9042 may reference templates instead of storing attributes containing data values already specified by a corresponding template (e.g., in order to reduce data duplication). Pre-sale NFTs 9042 may include attributes specifying an NFT identifier (ID) 9102, one or more media asset links 9104, usage data 9106, and various pre-sale data values 9110, which, in the illustrated example, may include one or more of a campaign identifier (ID) 9112, one or more goods/services identifiers 9114, a support tier 9116, a redemption date 9118, an expiration date 9120, and/or delivery information 9122. Pre-sale NFTs 9042 may further specify one or more backup benefit data values 9130, which may include, as illustrated, backup conditions 9132 and/or backup redemption information 9134.

The NFT identifier 9102 may uniquely identify the NFT. The media asset links 9104 may include links (e.g., IPFS links) to off-chain data that may be displayed or output when a user views an NFT in a wallet (e.g., image, audio, and/or video data). Additionally or alternatively, the media asset links 9104 may link to a product code (e.g., a QR code) for redeeming the NFT and/or obtaining an item after a delivery date. In embodiments, a product code may be encrypted using DRM, as described elsewhere herein. The usage data 9106 may specify whether the NFT is burnable, transferable, resalable, and/or otherwise limit the usage of the NFT.

In embodiments, the pre-sale data values 9154 may include a campaign identifier 9112, which may be a name or code that uniquely identifies a funding campaign that the pre-sale NFT represents an interest in. In some cases, the funding campaign may indicate a unique good or service, such as when a campaign is to produce a single good or service, or when a campaign includes a default good or service that all pre-sale NFTs may be redeemed for; additionally or alternatively, unique goods/service information may be needed to determine what type of goods or service the pre-sale NFT may be redeemed for. Thus, for example, the pre-sales NFT may include goods/services identifier(s) 9114 indicating what the pre-sale NFT 9042A may be used to obtain. In embodiments, the goods/services identifier(s) 9114 may include one or more identifiers of different goods/services, which the user may select from at redemption time, as described in more detail below.

In embodiments, the pre-sale data values 9110 may further indicate a support tier 9116, which may indicate, for example, a quality of goods/services (e.g., a higher tier token may be redeemed for better goods/services), a number of goods/services (e.g., a higher tier token may be redeemed for more goods/services), extra benefits (e.g. a high support tier may indicate that the owner may receive acknowledgement in the credits of a creative work), and/or the like. In embodiments, the holder of the token at redemption time may be entitled to receive a variable amount/quality of benefits/goods/services, and/or may receive extra benefits/goods/services, based on the support tier 9116.

In embodiments, pre-sale NFTs 9042 may include various temporal attributes that relate to the redeemability of the token, such as an assigned redemption date 9118 indicating when the token may be redeemed for the good/service. In other embodiments, a redemption date 9118 may not be appropriate, for example if the pre-sale NFT 9042 can be redeemed for a creative product (e.g., film) with an uncertain release date. In such a case, for example, redemption timelines may be configured by a redemption smart contract, which may be updated (e.g., by the creator of the good/service) when redemption becomes available. In embodiments, the pre-sale NFT 9042A may include an expiration date 9120, which may be a temporal attribute defining a time after which, if the pre-sale NFT 9042A still has not been redeemed, the pre-sale NFT 9042A may be deemed expired and may no longer be traded and/or redeemed. Other temporal attributes may also be included as attributes of the pre-sale NFT 9042A.

The temporal attributes of a pre-sale NFT 9042 may be implemented in a number of different ways. For example, in some embodiments the temporal attributes may be included in the mutable or immutable attributes of the pre-sale NFT 9042, as illustrated at FIG. 62. Additionally or alternatively, the temporal attributes of the pre-sale NFT 9042 may be encoded in the smart contract that governs the redemption of the token. The temporal attributes may be defined by a seller, an entity that is tasked with fulfilling the items upon redemption, and/or other suitable parties.

In some embodiments, the pre-sale NFT 9042A may store delivery information 9122 (e.g., information indicating a delivery mailing address, email address, or other information) indicating where the finished good/service should be delivered. In these embodiments, the delivery information 9122 may be encrypted, and may be updated upon transfer of the token to a new distributed ledger address. Additionally or alternatively, delivery information 9122 may not need to be stored. In these embodiments, for example, a holder of the pre-sale NFT 9042A may input delivery information to a tokenization platform 100 and/or marketplace 9010 before or after redemption of the pre-sale NFT 9042A (e.g., in order to cause delivery of the good/service for which the token is being redeemed).

In embodiments, the pre-sale NFT 9042A may further define backup benefit data values 9130, which may specify certain conditions under which a backup benefit (e.g., a refund of some or all of the purchase price of the pre-sale NFT 9042A, an ability to redeem the token for a similar good or service, etc.) may be awarded. Accordingly, the backup benefit data values 9130 may include one or more backup conditions which, if triggered, allow redemption of the backup benefit. For example, an example condition may trigger if the expiration date 9120 passes without a redemption smart contract allowing redemption of the goods/services. Another example condition may trigger if the pre-sale NFT 9042A is provided to a redemption smart contract for redemption, but the redemption smart contract rejects the redemption of the pre-sale NFT 9042A. The backup conditions 9132 may include one or more of these example conditions or other conditions. In embodiments, the backup redemption information 9134 may store information for redeeming the backup benefit, such as an address of an escrow smart contract that may provide a refund of some or all of the purchase price is the backup conditions are triggered, an address of a backup redemption smart contract that may be used to redeem the backup benefit, one or more data values to provide to a redemption smart contract in order to receive a backup benefit, and/or the like.

A pre-sale NFT 9042A may further include an owner account 9140 that indicates the distributed ledger account of the owner of the NFT. In embodiments, the owner account 9140 may be a mutable attribute that may be updated upon resale, trade, or some other transfer from one account to another. The pre-sale NFT 9042A may further include a mint number 9142 indicating how many pre-sale NFTs 9042 (e.g., for a given campaign and/or matching a given pre-sale NFT template) were minted prior to the pre-sale NFT 9042A. In embodiments, the mint number 9142 may affect the resale value. Additionally or alternatively, in embodiments, a minting smart contract 9024, redemption smart contract 9028, and/or token-based pre-sale system 9002 may be configured to provide benefits based on mint number. For example, token holders with lower mint numbers may be given priority for delivery of the goods/services, may receive an upgraded quality or amount of the goods/services, may receive additional benefits, and/or the like. Additionally or alternatively, mint numbers may be used in random drawings to obtain additional benefits. In embodiments, these additional benefits may be determined and/or assigned at minting time (e.g., by the minting smart contract 9024) and stored as attributes of the pre-sale NFT 9042. Additionally or alternatively, the additional benefits may be awarded at redemption time (e.g., by the token-based pre-sale system 9002) by providing one or more additional tokens representing the additional benefits to the owner of the pre-sale 9042A.

The pre-sale NFT 9042A may further include a redemption smart contract link 9144 that references a particular redemption smart contract 9028 configured to redeem the pre-sale NFT 9042A. As described in more detail below, the redemption smart contract 9028 may be used to redeem the pre-sale NFT 9042A in order to obtain the good/service specified in the pre-sale NFT 9042A.

Figure 63:
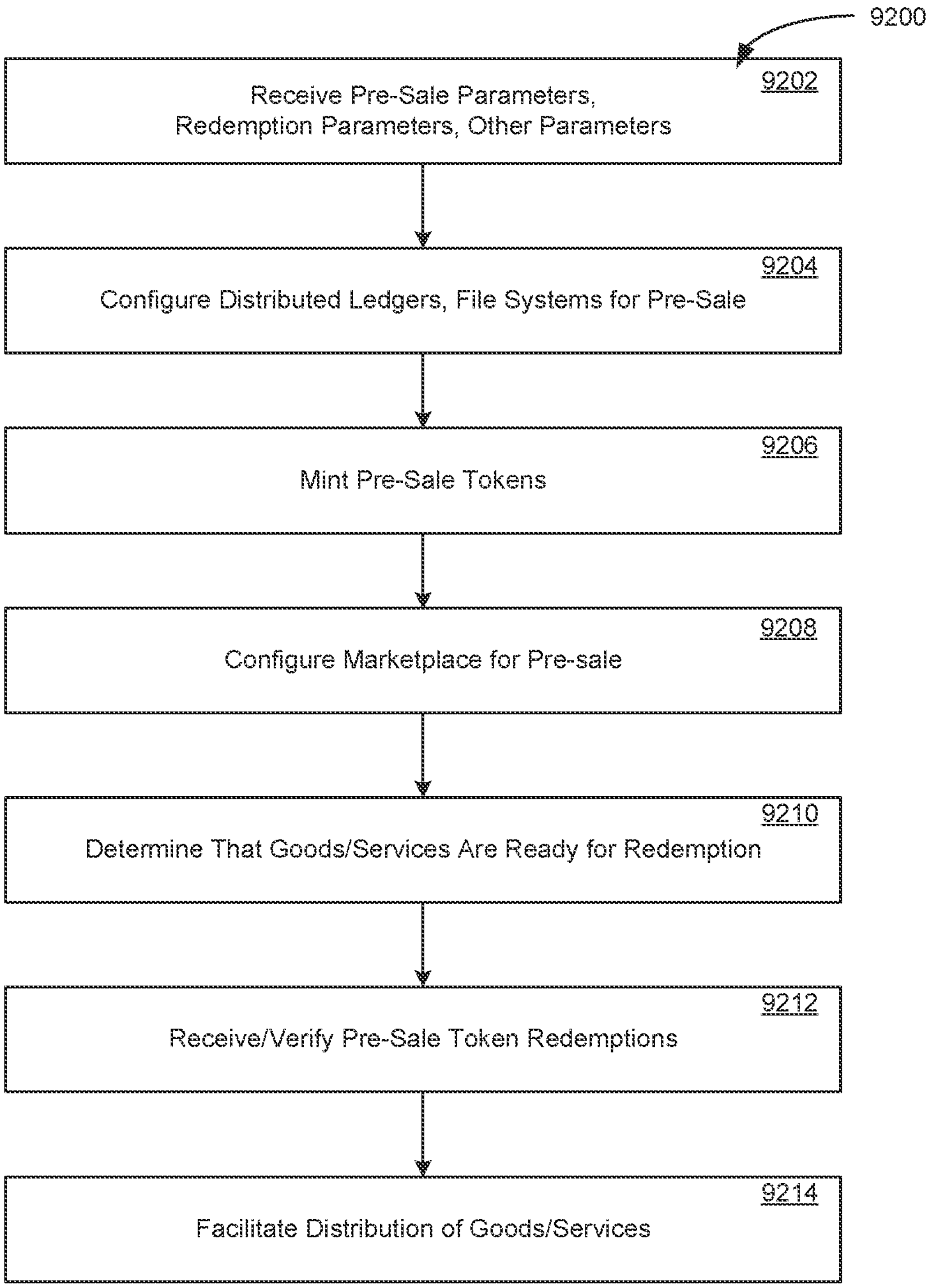
FIG. 63 is a flow chart illustrating an example set of operations of a method for conducting a pre-sale campaign according to some embodiments of the present disclosure.

FIG. 63 illustrates an example method that may be executed by one or more platforms/systems of the environment 9000, including the tokenization platform 100, seller device 9004, and/or pre-sale marketplace 9010. At 9202, the tokenization platform 100, for example, may receive various parameters for configuring a pre-sale campaign, including pre-sale parameters, redemption parameters, and/or other parameters. In embodiments, these parameters may include one or more of templates and/or schemas for minting pre-sale tokens 9042, pre-minting instructions for batch minting one or more pre-sale tokens 9042, media assets, support tier data, expiration dates, redemption dates, data about backup benefits, and/or other data that may be used by pre-sale tokens 9042, and any other data that may be used for minting pre-sale tokens 9042. For example, a seller device 9004 may provide these and other parameters to the tokenization platform. In embodiments, the tokenization platform 100 (e.g., using the token-based pre-sale system 9002) may provide a user interface to the seller device 9004 that the seller device 9004 may use to input some or all of the parameters.

In embodiments, the parameters received at 9202 may further include one or more parameters for configuring a pre-sale of the pre-sale tokens 9042 via a pre-sale marketplace 9010. For example, the parameters may specify price(s) of the pre-sale tokens, a method of selling the tokens (e.g., auction), minimum bid(s), pre-sale kickoff dates, and/or the like.

In embodiments, the parameters received at 9202 may further include one or more parameters for configuring various smart contracts, such as minting data for configuring a minting smart contract 9024 (which may include, for example, the templates, schemas, and/or other minting data described herein), one or more redemption rules and/or other data (e.g., redemption time periods) for configuring a redemption smart contract 9028, user interface data for configuring one or more user interface smart contracts 9030, and/or the like. In embodiments, the user interface data may configure the one or more user interface smart contract 9030 to provide data for a redemption user interface (e.g., a website for redeeming a token, entering delivery information, and/or the like).

At 9204, the tokenization platform 100 may configure the distributed ledgers 3120 and/or one or more filesystems to prepare the pre-sale. The tokenization platform 100 may configure the various smart contracts using the smart contract parameters received at 9202. For example, the tokenization platform 100 may cause one or more distributed ledger transactions that call respective configuration functions for each function, provide configuration data to teach smart contract, verify the successful configuration of each smart contract, and/or the like. In embodiments, the tokenization platform 100 may use a configurator sub-system 4020 (e.g., as described elsewhere herein) to perform the configuration.

The tokenization platform 100 may further store one or more assets on filesystems, which may include distributed filesystems (e.g., IPFS). For example, the tokenization platform 100 may store media assets and/or other token-related data on distributed filesystems so that it may be accessed (e.g., by various user interfaces) for purposes of displaying tokens, displaying one or more images relating to goods/services, displaying information about a campaign (e.g., a current status, expected completion date, updates from the goods/services creators, and/or the like).

At 9206, the tokenization platform 100 may cause minting of the pre-sale tokens 9042 for the pre-sale. The tokenization platform 100 may thus cause one or more distributed ledger transactions that invoke a mint function and/or pre-mint function of the minting smart contract 9024 to mint the pre-sale tokens 9042 with a set of designated attributes. In embodiments, the tokenization platform 100 may instruct the minting smart contract 9024 (e.g., by providing arguments to the mint function and/or pre-mint function) to transfer the minted pre-sale tokens 9042 to an account of the seller. For example, in these embodiments, the seller may be responsible for setting up the pre-sales via a pre-sale marketplace 9010. In other embodiments, the minting smart contract 9024 may mint the pre-sale tokens 9042 into an account controlled by the tokenization platform 100 or the pre-sale marketplace 9010.

At 9208, the tokenization platform 100, seller device 9004, and/or pre-sale marketplace 9010 may configure the pre-sale of the pre-sale tokens 9042. For example, the pre-sale marketplace 9010 may create a listing of a plurality of pre-sale tokens 9042 at a set price, may create a plurality of auctions corresponding to the number of pre-sale tokens 9042, may configure a start time at which the pre-sale tokens 9042 go on sale, may configure a countdown timer announcing when the pre-sale will take place, and/or may otherwise configure the pre-sale marketplace 9010 to make the pre-sale tokens 9042 purchasable by purchasers (e.g., using purchaser devices 9006). The pre-sale marketplace 9010 may configure the pre-sales based on a request from the tokenization platform 100 and/or seller device 9004, based on monitoring the status of minted pre-sale tokens 9042, or otherwise.

The purchasers may then use purchaser devices 9006 to purchase the pre-sale tokens 9042 via the configured pre-sale marketplace 9010, which may cause the pre-sale marketplace 9010 to transfer the purchased pre-sale tokens 9042 to respective addresses associated with the purchasers. In embodiments (e.g., if the pre-sale tokens 9042 are transferable), the purchasers may then go on to list the pre-sale tokens for secondary sales or trading via a secondary marketplace 9012 and/or via the pre-sale marketplace 9010. A secondary market may develop, with purchasers setting up sales, auctions, etc. for the pre-sale tokens 9042.

In embodiments, the primary seller may be able to participate in the secondary sales/transactions, for example by configuring a sales smart contract that governs secondary sales of the tokens, as described elsewhere herein. For example, a sales smart contract may be configured to transfer a percentage of the profit from a secondary sale to the original seller. In these embodiments, a sales smart contract may have been configured by the original seller at 9202 and 9204, as described above.

At 9210, the tokenization platform 100 and/or seller device 9004 may determine that the goods/services represented by the pre-sale tokens 9042 are available (e.g., after some time passes). For example, the seller device 9004 may send a request to the tokenization platform 100 to enable redemption functionality. The tokenization platform 100 may then cause a distributed ledger transaction that enables a redemption functionality of the redemption smart contract, update a website indicating that the redemption functionality is now active, cause messages to be sent to holders of the pre-sale tokens 9042 (e.g., via email), cause redemption NFT tokens 9044 to be pushed to owners of pre-sale tokens 9042 (e.g., when pre-sale tokens 9042 do not have redemption functionality), Additionally or alternatively, the seller device 9004 may cause a distributed ledger transaction that enables a redemption functionality of the redemption smart contract, and/or otherwise enable the redemption, with or without the assistance of the tokenization platform 100.

At 9212, the tokenization platform 100 and/or seller device 9004 may receive an indication of and/or verify the redemption of the pre-sales tokens 9042 and/or redemption NFT tokens 9044. In some embodiments, holders of the tokens may cause redemption of the tokens via the redemption smart contract, which may log the redemptions and/or information about the holders of the tokens. The tokenization platform 100, for example, may then read the redemption log to determine that a token was redeemed and/or to determine information about the redeemer of the token (e.g., delivery information, messaging information, etc.). Additionally or alternatively, the tokenization platform 100 and/or seller device 9004 may receive information whenever a token holder selects a token for redemption via a configured user interface. In these embodiments, for example, the configured user interface may require a token holder to submit delivery information when the token holder selects a token for redemption, and the user interface may be further configured to submit the delivery information to the tokenization platform 100 and/or seller device 9004.

At 9214, the tokenization platform 100 and/or seller device 9004 may facilitate the distribution of goods/services to holders of the redeemed tokens. For example, the tokenization platform 100 and/or seller device 9004 may communicate with token holders to obtain any necessary additional information (e.g., delivery information if not already obtained), may communicate unlock codes or other redemption codes to unlock digital goods/services, and/or the like. In some embodiments, upon redemption of the pre-sale token 9042 and/or redemption NFT token 9044, a new token may be minted (or selected from a pre-minted pool) and transferred to the holder of the redeemed token, where the new token may allow access to the good/service. For example, the new token may be a tokenized ticket, NFT ticket, and/or the like, as described elsewhere herein. Additionally or alternatively, the new token may include an unlock code for a digital good/service, which may be encrypted/decrypted using DRM techniques as described elsewhere herein.

Figure 64:
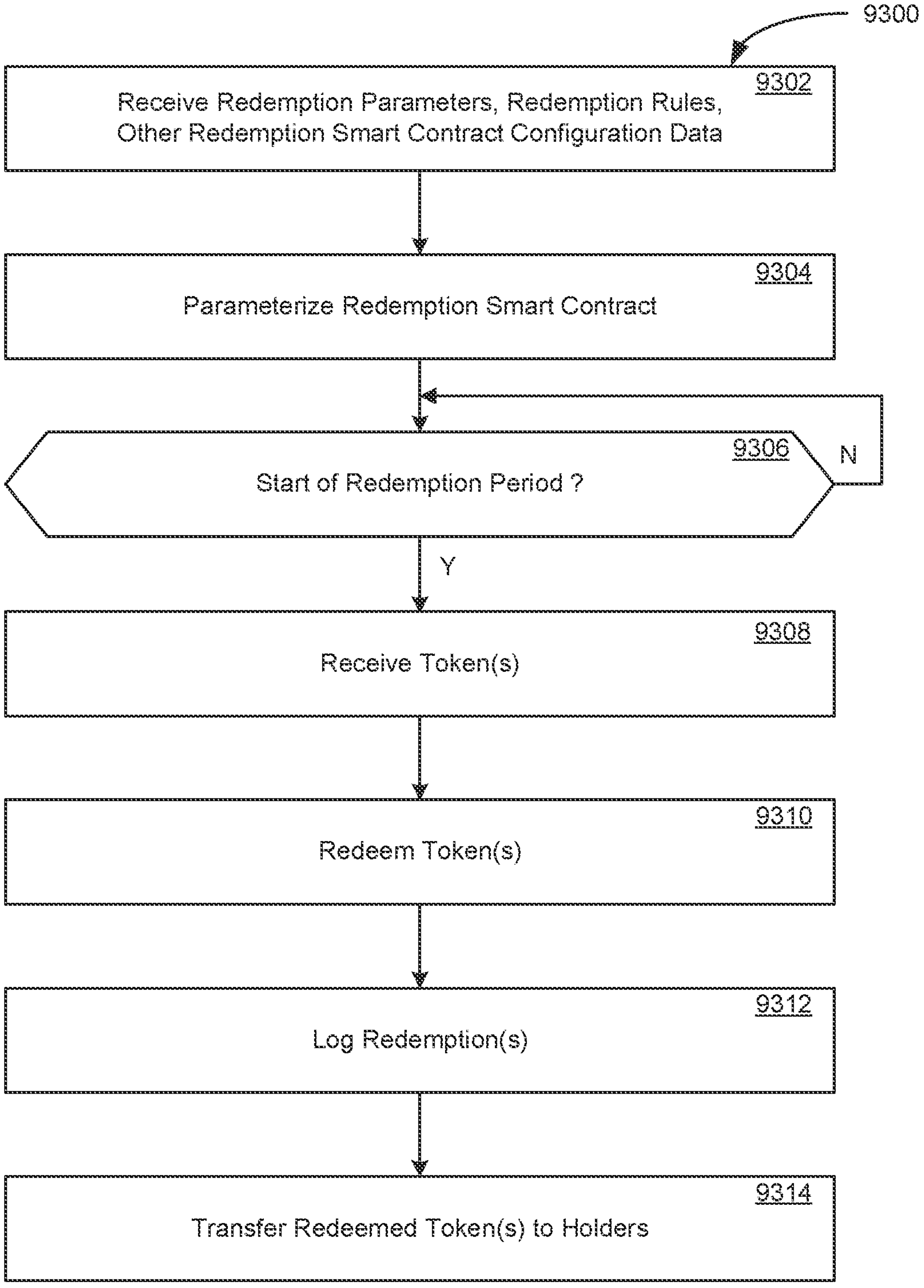
FIG. 64 is a flow chart illustrating an example set of operations of a method for redeeming pre-sale tokens according to some embodiments of the present disclosure.

FIG. 64 illustrates an example logical flow that may be performed by a redemption smart contract 9028 to redeem tokens (e.g., pre-sale tokens 9042, redemption NFT tokens 9044). At 9302, the redemption smart contract 9028 may receive one or more redemption parameters, redemption rules, and/or other redemption smart contract configuration data. The redemption parameters may include, for example, a schedule redemption date/time (e.g., a time after which redemptions may occur), an expiration date/time (e.g., a time after which redemptions may no longer occur), and/or other data for controlling redemption. The redemption rules may specify for example, which attributes of the received tokens to update during redemption, what data to store in a redemption log, and/or the like. In embodiments, some or all of this data may be specified as mutable configuration data that may be re-configured (e.g., in case the redemption date needs to be pushed back due to delays). Additionally or alternatively, some data may be specified as immutable (e.g., if redemption is required by a certain date, the redemption date may be unchangeable). At 9304, the redemption smart contract may store the data, configure various smart contract functions (e.g., redemption functions), and/or the like.

At 9306, the workflow may wait until a redemption period begins. The redemption period may begin when a redemption time stored by the redemption smart contract is reached. Additionally or alternatively, a seller may cause a distributed ledger transaction that calls a function of the redemption smart contract 9028 in order to begin the redemption period. In embodiments, a seller may initiate a partial redemption period, such as when there is enough supply of a goods/service to redeem some, but not all, of the pre-sale tokens 9042 and/or redemption NFT tokens 9044. For example, the seller may cause a distributed ledger transaction that updates an "available supply" data attribute stored by the redemption smart contract 9028.

At 9308, the redemption smart contract 9028 may receive tokens for redemption. In embodiments, the token holders may also submit one or more redemption parameters at the time they transfer the tokens to the redemption smart contract 9028. For example, token holders may be able to specify which of several products/services they would like their tokens to be redeemed for. Additionally or alternatively, token holders may be able to customize their goods/services, select a particular brand or logo, change a design, and/or otherwise customize a goods/services selection. In these embodiments, the customization may take place at redemption time, and the token holders may specify the customization parameters when they provide tokens to the redemption smart contract 9028.

In some embodiments, although the logical flow 9300 shows tokens being received after a redemption period begins, tokens may additionally or alternatively be received before the redemption periods begins. In these embodiments, for example, token holders may submit their tokens to the redemption smart contract 9028 before the redemption smart contract 9028 prior to the redemption period beginning in order to store their place in a redemption queue, to receive their goods/services at the earliest possible time, and/or simply so that they do not need to remember to submit their tokens once redemption begins. Accordingly, in some embodiments, when the redemption period begins, the redemption smart contract 9028 may already have received a plurality of tokens for redemption.

At 9310, the redemption smart contract 9028 may redeem one or more of the received tokens. In some embodiments, the redemption smart contract 9028 may redeem tokens immediately upon receipt. Additionally or alternatively, the redemption smart contract 9028 may prioritize certain tokens and redeem higher priority tokens first. For example, in a partial redemption scenario (e.g., in an example scenario where 1000 tokens have been issued, but only 400 items have yet been produced), the redemption smart contract 9028 may only redeem some received tokens and may wait to redeem other tokens. For example, in the example scenario, the redemption smart contract 9028 may only allow redemption of tokens with a mint number of 400 or lower, may only allow redemption of the first 400 tokens received, and/or may select the 400 received tokens with the lowest mint numbers for redemption. In a second example scenario, the redemption smart contract 9028 may be configured to dynamically mint a new NFT every time a token is redeemed, such that earlier redeemers receive lower mint numbers on the new NFTs. In this second example scenario, the redemption smart contract 9028 may redeem the received tokens in the order they were received, in mint number order, or using some other order, in order to provide an award (a lower mint number) to the holders of the pre-sale tokens based on some criterion.

To redeem the received token, the redemption smart contract 9028 may update one or more attributes of the received token based on one or more redemption rules. For example, the redemption smart contract 9028 may update any attribute to indicate that the token was redeemed, may update a redemption counter (e.g., if the token may be redeemed multiple times), may update a media asset associated with the token, and/or the like. Additionally or alternatively, the redemption smart contract 9028 may perform other redemption actions, such as minting new tokens and transferring the new tokens to the holder of the token being redeemed. In some embodiments, the redemption smart contract 9028 may burn the redeemed token.

At 9312, the redemption smart contract 9028 may store data about the redeemed token, the holder of the redeemed token, any options/customizations specified by the holder of the redeemed token, and/or the like in the redemption log. The redemption log may be monitored by external devise (e.g., a tokenization platform 100) to verify a token's redemption, and may be used by the analytics and reporting system 112 to generate analytics data (e.g., as described elsewhere in the disclosure).

At 9314, the redemption smart contract 9028 may transfer the redeemed token to the holder of the token. The redeemed token may serve as verification of the redemption, and/or may be kept as a memento of the campaign, sold on a secondary marketplace, or the like.

In embodiments, the pre-sale tokens 9042 and/or redemption NFT tokens 9044 may be integrated with other NFT-related functionalities, such as play-to-earn (PTE) gaming functionalities, crafting functionalities, unboxing functionalities, ticket functionalities, DRM functionalities, lending functionalities, etc. as described herein. For example, unboxing recipes may be configured to provide redemption NFT tokens 9044 as rare tokens that may be received when unboxing a digital pack, as described elsewhere herein. Additionally or alternatively, crafting recipes may be used to level up pre-sale tokens 9042 and/or redemption NFT tokens 9044 to receive more/better goods/services, upgrade a support tier of the pre-sale token, or otherwise increase the value of the pre-sale tokens 9042 and/or redemption NFT tokens 9044. Pre-sale tokens 9042 may also be used as items in PTE games, which may be set up (e.g., by sellers of the pre-sale tokens 9042) for promotional reasons (e.g., to drive up the value of the pre-sale tokens 9042, to draw attention to the pre-sale, etc.). In these embodiments, for example, PTE games could be configured such that pre-sale tokens 9042 may be used in PTE game rewards cycles in order to earn tokens that may be used to upgrade pre-sale tokens 9042, to obtain additional pre-sale tokens 9042, and/or the like.

In embodiments, the tokenization platform 100 may be configured to performs analytics on various stages of the pre-sale marketplace 9010 processes. In some of these embodiments, the analytics and reporting system 112 may be configured to obtain pre-sale event records 9052 and/or supporting data 9056 from the set of distributed ledgers 3120 to determine outcomes related to a pre-sale marketplace 9010 process. The analytics and reporting system 112 may be configured to provide ratings to different participants in the pre-sale marketplace 9010, such as purchasers, producers, sellers, and so forth. The analytics and reporting system 112 may collect additional or alternative data relating to pre-sale marketplace 9010 participants, such as feedback of other participants. The analytics and reporting system 112 may then apply a scoring function to the outcome and other feedback data related to participants to assign scores to the participants. In embodiments, the analytics and reporting system 112 may obtain data from the distributed ledgers. In some of these embodiments, a node device 3110 may be configured as a "history node" that monitors all data blocks being written to the distributed ledgers 3120. The history node device may process and index each block as it is being written to the ledger 3120 and may provide this information to the analytics and reporting system 112. The analytics and reporting system 112 may then perform its analytics on the data collected by the history node.

The analytics and reporting system 112 may obtain the data for generating analytics by reading and storing the minting data stored by the minting smart contract 9024, the redemption log of the redemption smart contract 9028, and/or any other data generated by various other smart contracts described herein, data from sales or trades on the pre-sale marketplaces 9010 and/or secondary marketplace 9012, and the like.

The analytics data may be generated for several use cases. For example, the analytics and reporting system 112 may provide analytics data about pre-sale campaigns as a whole, such as a total issued number of sold and/or redeemed pre-sale tokens for a given campaign, an average price of secondary transactions for all pre-sale tokens for a campaign, an available supply of pre-sale tokens remaining for purchase, and the like. The analytics and reporting system 112 may further generate one or more popularity factors that may measure the amount of activity for a particular campaign, including pre-sales activity, secondary sales activity, redemption activity, and the like. The analytics and reporting system 112 may further generate comparative data for comparing various campaigns, such as data indicating which campaigns performed best or worst, had the most trading activity on a secondary marketplace 9012, and/or the like.

The analytics and reporting system 112 may further generate analytics data indicating the current usage of pre-sale tokens of various types (e.g., different support tiers), such as percentages or totals of a particular type that have been sold, traded, redeemed, and/or used for other uses (e.g., crafted, levelled up, or the like). The analytics and reporting system 112 may further generate statistics indicating a current usage of pre-sale tokens of a particular type, such as percentages or totals of tokens that are in user's wallets, that are in various smart contract accounts, that are listed for sale or trade on the secondary marketplace 9012, that are available for purchase, and the like. In some cases, campaign organizers may use data indicating that a pre-sale token is listed on a secondary marketplace 9012 for a particular average price to adjust the sales price for similar pre-sale tokens (e.g., such that a high secondary sale value may lead to raising prices for pre-sales, whereas a low secondary sale value may lead to lowering pre-sale prices).

In embodiments, the analytics and reporting system 112 may leverage artificial intelligence (AI) techniques to provide various predictions, predictive analytics, etc. For example, the analytics and reporting system 112 may use one or more trained machine learning models to estimate the likelihood of successful delivery of goods/services based on pre-sale activity, secondary sale activity, other data involving the seller, and/or the like. As another example, the analytics and reporting system 112 may predict the future value of pre-sale tokens on secondary markets based on data indicating a speed of pre-sales, a number of pre-sales, other distributed ledger activity linked to a campaign, and/or any other data that may tend to indicate a campaign that will become popular. Accordingly, using these and other techniques, sellers may be able to more accurately predict a number of pre-sales tokens that are likely to sell, estimate demand for the goods/services at issue, and/or the like. The analytics and reporting system 112 may collect data from the distributed ledger 3120 in other suitable manners without departing from the scope of the disclosure.

It is appreciated that in embodiments, some or all of the functionalities of the tokenization platform 100, including the pre-sale marketplace 9010 and the other systems described throughout the disclosure may be implemented in smart contracts which may be distributed at a plurality of node devices, such that the node devices execute the smart contracts, which in turn perform the implicated functionalities.

DRM System

In some embodiments, the tokenization platform 100 may be configured to facilitate digital rights management (DRM) that allows content creators and rights holders (e.g., copyright owners) to manage access to digital assets that are linked to digital tokens (e.g., NFTs or other suitable types of tokens), while allowing users to easily and securely access the digital assets, and to trade their access rights to other users. Existing DRM systems often limit access to particular access devices and/or particular regions, may require a difficult authorization process for authorizing new devices before allowing access, and/or may make it impossible to transfer access rights among users while still complying with DRM rules. Because of these and other downsides of existing systems, users may be unable to access digital assets or may find it very difficult to access digital assets. These downsides may promote piracy by making users less willing to purchase rights to digital assets.

Digital assets stored on blockchains, distributed filesystems, distributed ledgers, and the like may also be difficult to secure (e.g., because a distributed ledger may be available for inspection by anyone) in a flexible and accessible way. For example, although content can be encrypted before storing it on cryptographic ledgers (e.g., distributed ledgers and/or distributed filesystems), it may be difficult to allow other users to access the encrypted content while still maintaining control over the encrypted content.

Techniques described herein solve these and other problems by providing a DRM NFT that may be used to securely store digital assets on cryptographic ledgers (e.g., distributed ledgers, distributed filesystems, etc.) using cryptographic techniques. Using these techniques, encrypted digital assets may be easily accessible to any holder of a DRM NFT. Additionally, a holder of the DRM NFT may be able to transfer the DRM NFT to another user in a way that removes the transferor's ability to access the content and provides the access to the transferee. Thus, secure access to content may be provided in a way that benefits both consumers and rights-holders.

The DRM NFTs described herein may be used to provide secure access to encrypted digital assets or other NFT information of any type. For example, digital assets may include media assets such as audio content, image content, video content, etc. Digital assets may also include textual information such as access codes, ticketing information, and/or other secret information. In embodiments, the digital assets may be encrypted and stored on a distributed ledger (e.g., a blockchain), on a distributed filesystem (e.g., IPFS), or using any other storage technology. In embodiments, the encrypted digital assets may be stored as part of DRM NFTs. Additionally or alternatively, the DRM NFTs may include information that links to one or more encrypted digital assets stored separately from the DRM NFTs.

Figure 65:
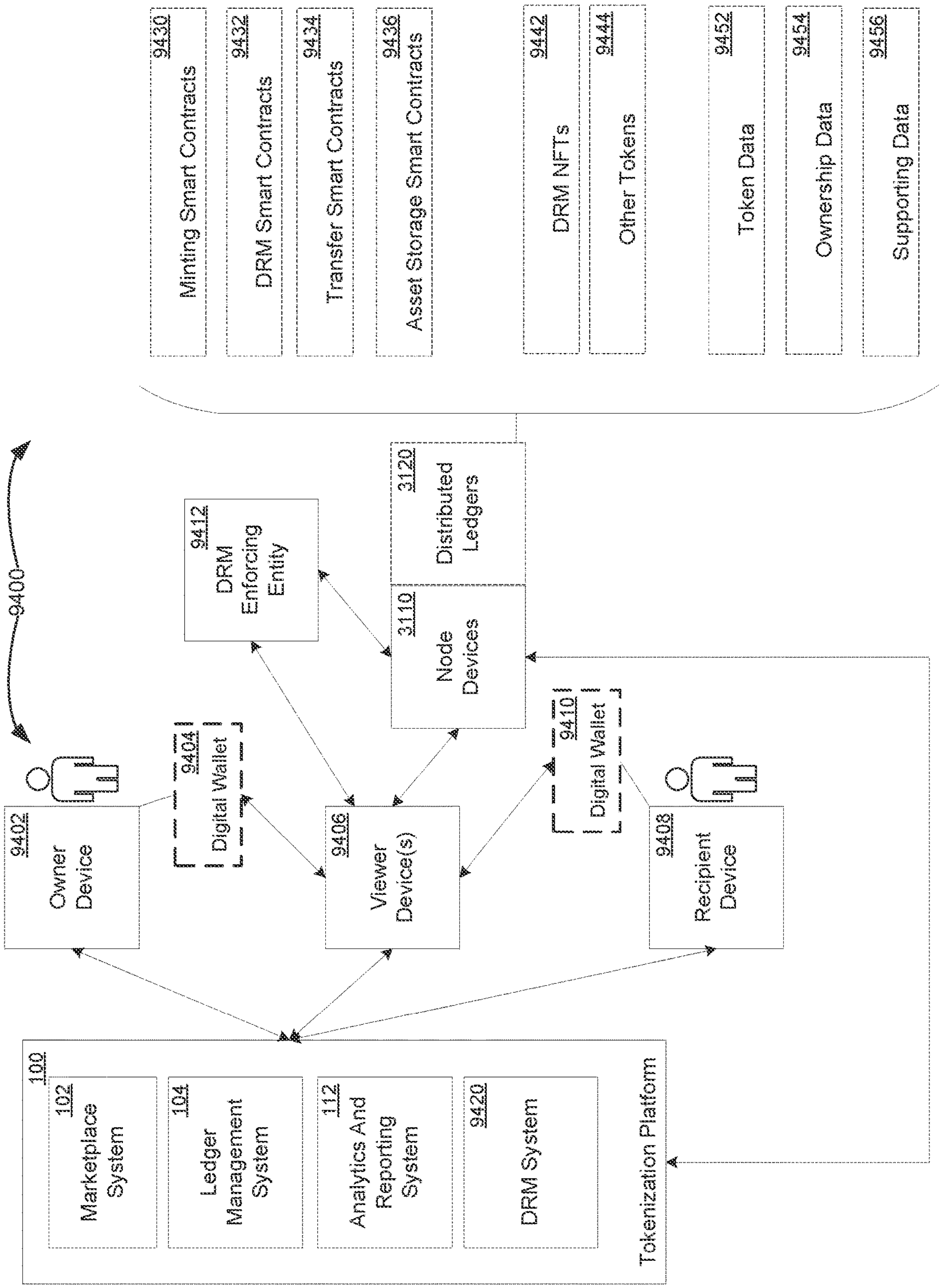
FIG. 65 is a schematic illustrating an example environment of a tokenization platform configured to provide digital rights management functionality according to some embodiments of the present disclosure.

Referring to FIG. 65, an environment 9400 may include several components for implementing the techniques described herein. In embodiments, the tokenization platform 100, as described herein, may include and/or be operably connected to a digital rights management (DRM) system 9420 for managing access to digital assets, such as digital music files, videos, digital artwork, files, and/or other suitable digital information. In an example, the tokenization platform 100 and/or DRM system 9420 may facilitate or cause the minting of DRM NFTs having specific attributes (e.g., using a DRM NFT template) that may be used to associate a digital asset with a DRM NFT. In embodiments, the DRM system 9420 may cause generation of DRM NFTs and encryption of digital assets using asymmetric encryption and/or symmetric key encryption as described in more detail below. Additionally or alternatively, the DRM system 9420 may configure and/or support one or more viewer devices 9406 to allow the viewer devices 9406 to decrypt and access the encrypted digital assets using the DRM NFTs. Additionally or alternatively, the DRM system 9420 may facilitate the transfer of DRM NFTs from a first distributed ledger account and/or first digital wallet 9404 associated with a first device (e.g., an owner device 9402) to a second distributed ledger account and/or second digital wallet 9410 associated with a second device (e.g., a recipient device 9408).

In embodiments, various systems of the tokenization platform 100 may configure the various smart contracts stored on the distributed ledgers 3120 to provide functionality in support of the DRM NFTs as described herein. For example, a configuration subsystem (described elsewhere herein) and/or the ledger management system 104 may configure one or more minting smart contracts 9430 to mint (and/or batch pre-mint) DRM NFTs and/or encrypt digital assets linked to the DRM NFTs. Additionally or alternatively, the configuration subsystem and/or the ledger management system 104 may configure one or more DRM smart contracts 9432 to generate encryption keys, encrypt and/or decrypt digitals assets and/or DRM NFT attributes, govern access to encrypted digital assets in accordance with DRM rules, and/or the like. Additionally or alternatively, the configuration subsystem and/or the ledger management system 104 may configure one or more transfer smart contract 9434 to decrypt and re-encrypt DRM NFT attributes and/or encrypted digital assets when access rights are transferred from a first user (e.g., from a first account and/or wallet) to a second user (e.g., to a second account and/or wallet). Additionally or alternatively, a configuration subsystem and/or the ledger management system 104 may configure one or more asset storage smart contracts 3134 to store one or more DRM NFTs, such as pre-minted pools of DRM NFTs, ahead of releasing the DRM NFTs in order to prevent a rush of transactions when DRM NFTs go on sale, as described elsewhere herein. These and other functionalities are described in more detail below.

In some embodiments, the tokenization platform 100 may provide one or more user interfaces that allow devices associated with rights holders (e.g., owner devices 9402 and/or DRM enforcement entities 9412) to easily provide configuration information to the tokenization platform 100, in order to configure one or more of the smart contracts described herein. Additionally or alternatively, the tokenization platform 100 may configure and/or deploy user interfaces that allow user devices (e.g., and owner device 9402 and/or recipient device 9408) to purchase DRM NFTs, view the user's DRM NFTs, sell the user's DRM NFTs (e.g., via a marketplace provided by the marketplace system 102) and/or otherwise interact with various functionalities of the DRM NFTs as described herein. In other words, the tokenization platform 100 may implement a DRM NFT ticket ecosystem that allows for purchasing, trading, reselling, and other functionalities linked to DRM NFTs, as well as unboxing/unpacking digital packs containing DRM NFTs, crafting DRM NFTs, and other such mechanics described elsewhere herein.

The tokenization platform 100 may communicate and interact with owner devices 9402, which may include any device used to create a DRM NFT, purchase a DRM NFT, use a DRM NFT to access content, resell a DRM NFT, and/or the like. The owner devices 9402 may be the same devices as the user devices 190, user devices 3102, or other user devices described elsewhere throughout this specification. Additionally or alternatively, the owner devices 9402 may be associated with rights holders. In some embodiments, an owner device 9402 may have access to a digital wallet 9404, which may be used to store DRM NFTs, and may be used to authorize access to the encrypted digital assets via one or more viewer devices 9406 (e.g., by providing a private key associated with the digital wallet 9404 to the viewer devices 9406). The digital wallet may be the same as the digital wallets described elsewhere herein or may be any other suitable wallet. A digital wallet 9404 may be implemented on a corresponding owner device 9402 or may be implemented by another device. In some embodiments, the digital wallet may be a cloud wallet implemented by the tokenization platform 100. Alternatively, the digital wallet may be a "cold" wallet that is stored locally at a device associated with the user.

In embodiments, a viewer device 9406 may communicate with and interact with the tokenization platform 100. Viewer devices 9406 may be various types of output devices, such as media players, video players, audio players, video game consoles, virtual reality (VR) devices, digital/electronic picture frames, other user devices (e.g., smartphones, tablets, personal computers, laptops, etc.), and/or the like. Viewer devices 9406 may be used to access and output (e.g., display on a screen, play through speakers, etc.) encrypted digital assets using a DRM NFT. The digital assets may include, for example, audio data, video data, image data, digital trading cards, digital artwork, digital photos, digital videos, video games, video game characters, video game levels, video game items, video game skins, VR items or locations, songs, albums, podcasts, audio recordings, files, virtual representations of items, and/or any other digital assets. In embodiments, the viewer device 9406 may retrieve information from a DRM NFT and/or from a digital wallet that may be used in decrypting an encrypted digital asset. Additionally or alternatively, the viewer devices 9406 may check DRM rules for compliance (e.g., rules that specify when/where content may be output, rules that specify how many times content may be accessed, etc.) and only authorize access to encrypted digital assets when the DRM rules are satisfied. In embodiments, viewer devices 9406 may use public/private key cryptography to decrypt a symmetric key stored in the DRM NFT, where the symmetric key allows decryption of an encrypted digital asset.

In embodiments, one or more of a DRM system 9420, a DRM enforcing entity 9412, and/or a DRM smart contract 9432 may be used to provide encryption and decryption of digital assets and/or keys for accessing the encrypted digital assets, including during creation of DRM NFTs, for allowing access to the encrypted digital assets (e.g., by the viewer device 9406), and/or during transfer of a DRM NFT from one holder to another. In embodiments, the functionality of a DRM enforcing entity 9412 may be performed by a tokenization platform 100.

The tokenization platform 100 may further cause the distributed ledgers 3120 to store various tokens, including DRM NFTs 9442 and/or other tokens 9444, which may include various fungible tokens, non-fungible tokens, cryptocurrencies, and/or any other tokens described herein. The tokenization platform 100 may further cause the distributed ledgers 3120 to store various supporting data, such as token data 9452 (e.g., template/schema data and the like), ownership data 9454 (e.g., an account associated with a token), and other supporting data 9456 for implementing the features described herein. Such data may also be stored in smart contracts, such as an asset storage smart contract 9436, as part of a token, and/or the like.

In embodiments, an analytics and reporting system 112 of the tokenization platform 100 may be configured to provide analytics data concerning DRM NFTs that are minted, sold, traded, used to access content, or otherwise used as described herein. The analytics data may be leveraged by potential sellers and/or purchasers of the DRM NFTs (e.g., in order to set a fair price, determine how much to bid, etc.) and by rights holders or other interested parties to determine how the DRM NFTs are being used (e.g., sold and resold, traded, etc.). Additionally or alternatively, the analytics and reporting system 112 may make analytics data available to any of the smart contracts described herein, which may use the analytics data to modify certain operations as described herein (e.g., to adjust DRM rules). In these embodiments, the analytics and reporting system 112 may store the analytics data in one or more smart contract(s) that may be accessed by other smart contracts. In general, the analytics and reporting system may generate analytics and statistical data including supply data, popularity data, value data, probability data, and/or any other data for various DRM NFT collections, as described herein. The analytics and reporting system 112 may obtain the data to generate analytics by reading logs of DRM NFTs minted by minting smart contracts 9430, DRM NFTs accessed by viewer devices 9406, DRM NFTs authorized by DRM smart contract 9432, DRM NFTS transferred using transfer smart contract 9434, and/or the like, or using any other method of obtaining data about the DRM NFTs.

In embodiments, a viewer device 9406 may require that a DRM NFT owner login to authorize the use of their private key to access encrypted digital assets. A viewer device 9406 may retrieve a DRM NFT to be played from an inventory of a user (e.g., the user's digital wallet or a distributed ledger). The DRM player may obtain an encrypted asset encryption key from the DRM token and decrypt the asset encryption key using the DRM NFT owner's private key to obtain the asset encryption key (also referred to as a "decrypted asset encryption key"). Additionally or alternatively, in embodiments, the viewer devices 9406 may require a public key (e.g., a key of a DRM enforcing entity 9412) together with the user's private key to decrypt the encrypted asset encryption key. In these embodiments, the asset encryption key may be a symmetric key, and therefore the viewer devices 9406 may use the asset encryption key to decrypt the encrypted digital asset. In some of these embodiments, the viewer device 9406 may retrieve an IPFS hash of the encrypted asset (which may be stored as an attribute of the DRM NFT) and download the encrypted asset from a distributed filesystem (e.g., IPFS), decrypt the encrypted digital asset with the asset encryption key, and output the digital asset. Additionally or alternatively, the encrypted digital asset may be stored as an attribute of the DRM NFT, and the viewer device 9406 may thus retrieve the encrypted digital asset without accessing a distributed filesystem and may decrypt the encrypted digital asset with the decrypted asset encryption key. In embodiments, the viewer device 9406 may also ensure compliance with any additional DRM rules, conditions or other instructions associated with the DRM NFT, such as by requesting authorization using a DRM smart contract 9432 that is associated with the tokenization platform 100. In these embodiments, the viewer device 9406 may output the decrypted digital asset in accordance with any associated DRM rules.

In embodiments, DRM NFTs may be transferred among owners or other parties using the platform 100. In an example, a DRM NFT may be transferred by a DRM system 9420, transfer smart contract 9434, and/or DRM smart contract 9432 configured to retrieve the private key of a current owner of a digital asset and a public key of a new owner to whom the digital asset is to be transferred. The DRM system 9420 and/or smart contract(s) may retrieve an encrypted asset encryption key stored as an attribute of the DRM NFT and decrypt the asset encryption key using the private key that is associated with the current owner of the digital asset. In some embodiments, DRM system 9420 and/or smart contract(s) may then decrypt the digital asset using the asset encryption key. The DRM system 9420 and/or smart contract(s) may then re-encrypt the digital asset using a new asset encryption key and encrypt the new asset encryption key using a public key that is associated with a new owner to whom the digital asset is to be transferred. The DRM system 9420 and/or smart contract(s) may then update the asset decryption key attribute using a new encrypted asset decryption key and transfer the digital asset NFT to the new owner's account.

It is appreciated that a viewer device 9406 may be any suitable device capable of decrypting and presenting the encrypted digital asset. Examples of viewer devices 9406 may include, but are not limited to, mobile devices, smart TVs, smart picture frames, smart speakers, dedicated music players, connected vehicles, and/or the like. In these embodiments, the viewer devices may, at the direction of a user, interface with an inventory (e.g., digital wallet) of the user to access and decrypt DRM NFTs and to present the underlying digital asset.

Figure 66:
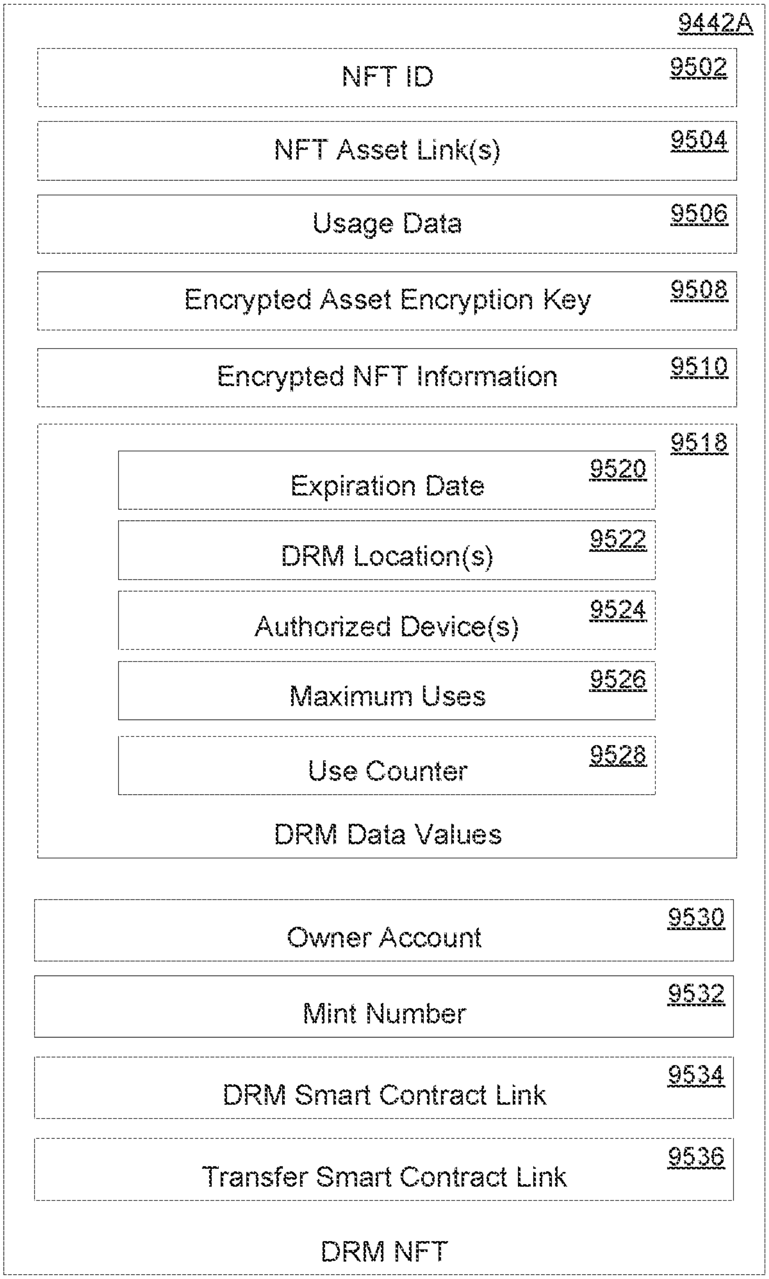
FIG. 66 is a schematic illustrating an example non-fungible token for providing digital rights management functionality according to some embodiments of the present disclosure.

FIG. 66 illustrates an example DRM NFT 9442A. The DRM NFT 9442A may comprise a plurality of attributes with associated data values specifying various data for the DRM NFT 9442A. Although all of the data values shown in FIG. 66 may be stored as part of a DRM NFT 9442, in some embodiments, certain DRM NFTs 9442 may reference templates instead of storing attributes containing data values already specified by a corresponding template (e.g., in order to reduce data duplication). DRM NFTs 9442 may include attributes specifying an NFT identifier (ID) 9502, one or more NFT asset links 9504, usage data 9506, an encrypted asset encryption key 9508, encrypted NFT information 9510 (e.g., an encrypted digital asset, a link to an encrypted digital asset, an encrypted link to a digital asset, and/or the like), and various DRM data values 9518, which, in the illustrated example, may include one or more of an expiration date 9520 of the DRM NFT, one or more authorized device(s) 9524, a maximum number of uses 9526, and a use counter 9528 for keeping track of uses. The DRM NFTs may further specify an owner account 9530, a mint number 9532, a DRM smart contract link 9534, and/or a transfer smart contract link 9536.

The NFT identifier 9102 may uniquely identify the NFT. The asset links 9504 may include links (e.g., IPFS links or the like) to data that may be used to distinguish one DRM NFT from another (e.g., data that may be displayed when a user views the user's NFTs in a user wallet). In some embodiments, the NFT asset links may link to reduced versions of a digital asset (e.g., a screenshot of a video asset, a short amount of audio from an audio asset, a reduced-size image representing an image asset, etc.). The usage data 9506 may specify whether the NFT is burnable, transferable, resalable, and/or otherwise limit the usage of the NFT.

The encrypted asset encryption key 9508 may be an asset encryption key (e.g., symmetrical key that may be used to encrypt and decrypt a digital asset or other NFT information) that is further encrypted using a public key of the NFT owner. In this way, the asset encryption key may only be obtained by using the owner's private key to decrypt the encrypted asset encryption key. Additionally or alternatively, the asset encryption key may be encrypted using multiple keys and/or using a key generated using multiple keys (e.g., an owner's public key and a private key provided by a DRM enforcement entity 9412 or a DRM enforcement entity's public key and an owner's private key), such that the asset encryption key may only be obtained by a party with access to both keys and the shared secret.

The DRM NFT 9442A may further include encrypted NFT information 9510, which may be an encrypted digital asset stored as an NFT attribute and/or one or more links to an encrypted digital asset. The encrypted digital asset (whether it is stored as a DRM NFT attribute or not) may be decryptable using the asset encryption key (e.g., a decrypted version of the encrypted asset encryption key 9508). In embodiments, an encrypted digital asset may be stored via a distributed filesystem, and the encrypted NFT information 9510 may therefore contain an IPFS hash or a similar link/identifier of the encrypted digital asset.

In embodiments, the DRM NFT may include one or more DRM data values 9518, which may be used to govern and/or track the access to the encrypted digital asset or other NFT information. For example, DRM data values 9518 may specify when a digital asset may be accessible (e.g., specifying one or more access time periods). Accordingly, the DRM data values 9518 may include one or more temporal attributes, such as an expiration date 9552 indicating when the DRM NFT may no longer be used to obtain access to the encrypted digital asset. In embodiments, the DRM data values 9518 may identify one or more authorized devices 9524 in order to specify what specific devices and/or types of devices may be used to access the digital asset. Additionally or alternatively, the DRM data values 9518 may include a maximum uses 9526 value specifying how many times the digital asset may be accessed (e.g., for a movie rental, watching a sports game or highlight, or the like). In embodiments, the DRM data values 9518 may include a use counter 9528 to keep track of how many times the digital asset was already accessed. In embodiments, the DRM data values 9518 may include DRM locations 9522 that may indicate locations (e.g., countries, regions, cities, states, geofences, and/or the like) where the digital asset may be accessed.

In embodiments, a DRM NFT 9442 may further include an owner account 9530 that indicates the distributed ledger account of the owner of the DRM NFT. In embodiments, the owner account 9530 may be a mutable attribute that may be updated upon resale, trade, or some other transfer from one account to another. The DRM NFT 9442 may further include a mint number 9532 indicating how many DRM NFTs 9442 (e.g., for a given campaign and/or matching a given pre-sale NFT template) were minted prior to the DRM NFT 9442. In embodiments, the mint number 9532 may affect the resale value.

The DRM NFT 9442 may further include a DRM smart contract link 9534 that references a particular DRM smart contract 9432 configured to authorize access to the encrypted digital asset (e.g., by using one or more DRM rules to check DRM data values 9518), update DRM data values 9518 as appropriate (e.g., incrementing a use counter 9528), and/or the like. Additionally or alternatively, the DRM NFT 9442 may further include a transfer smart contract link 9536 that references a particular transfer smart contract 9434 that is configured to transfer the DRM NFT from one owner's account to another owner's account.

Figure 67:
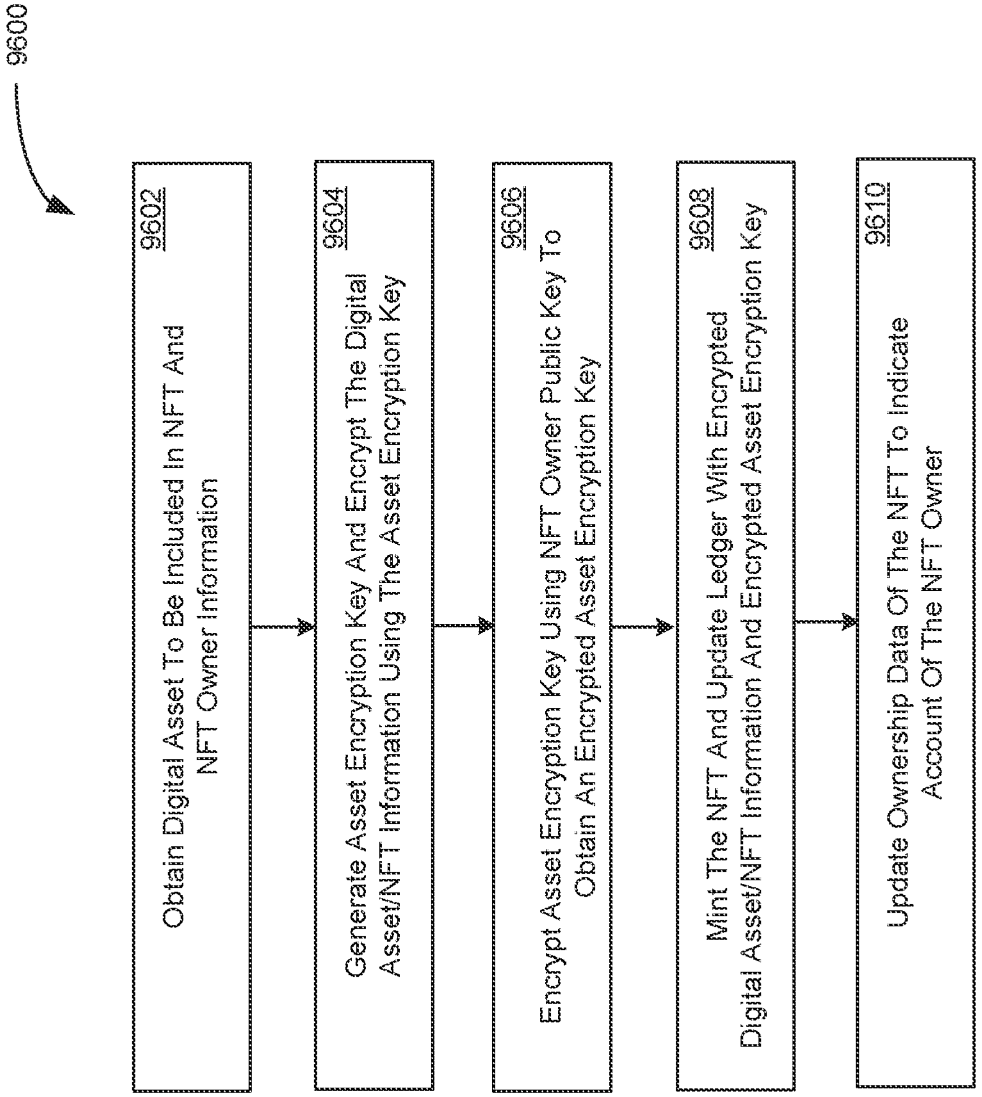
FIG. 67 is a flow chart illustrating an example set of operations of a method for creating digital rights management tokens according to some embodiments of the present disclosure.

FIG. 67 illustrates a method of creating a DRM NFT and assigning the DRM NFT to an initial owner of the NFT. The method may be executed by a tokenization platform 100, a DRM enforcement service (e.g., provided by a DRM enforcing entity 9412, a device associated with a rights holder, or some other device), one or more smart contracts, and/or the like. In embodiments, the DRM NFT may be assigned to a user (e.g., the owner of the DRM NFT) that purchased rights to access a digital asset, which may be time-limited (e.g., a movie rental) or not (e.g., a movie purchase), or may be limited using DRM rules in any other manner. Additionally or alternatively, the DRM NFT may be assigned to a rights-holder, a digital marketplace, a minting smart contract, or other default owner, such that the DRM NFT may be sold to an end user (e.g., on a marketplace), awarded, and/or otherwise transferred to the end user.

At 9602, the tokenization platform 100 (e.g., the DRM system 9420) and/or DRM smart contract 9432 may obtain NFT information that will be included in the DRM NFT and/or NFT owner information (e.g., an account number and/or public key for the distributed ledger account to which the created DRM NFT will be assigned). In embodiments, the tokenization platform 100 may receive the NFT information and/or NFT owner information from a token creator in order to begin creation of a DRM NFT. Additionally or alternatively, the tokenization platform 100 may retrieve a public key from a distributed ledger 3120. For example, an initial owner of the NFT's public key may be the owner's distributed ledger address on the distributed ledger 3120, or a publicly viewable value associated therewith, which may be stored on the distributed ledger 3120. In embodiments, the DRM NFT that is be created may include a digital asset or other NFT information within NFT attributes and/or may include NFT information comprising a link (e.g., an IPFS hash) to a digital asset, which may be stored separately from the DRM NFT (e.g., on a distributed filesystem).

At 9604, the tokenization platform 100 and/or DRM smart contract 9432 may generate an information encryption key (also referred to as an "asset encryption key" or an "attribute encryption key") for encrypting the NFT information (e.g., the digital asset or link to digital asset), and encrypt the digital asset and/or other NFT information using the asset encryption key. The asset encryption key may be generated as a symmetric encryption key. In some embodiments, the tokenization platform 100 and/or DRM smart contract 9432 may randomly generate the symmetric encryption key, such that the asset encryption key is a random value of a specified bit length (e.g., 256 bits). The tokenization platform 100 and/or DRM smart contract 9432 may then use a symmetric encryption function to encrypt the digital asset and/or other NFT information. The symmetric encryption function, such as AES (Advanced Encryption Standard), DES (Data Encryption Standard), IDEA (international data encryption algorithm), Blowfish, RC4, RC5, RC6, and/or the like. Encrypting the digital asset and/or other NFT information using the asset encryption key may yield an encrypted digital asset and/or encrypted NFT information.

At 9606, the tokenization platform 100 and/or DRM smart contract 9432 may encrypt the asset encryption key (e.g., the symmetric key) using an asymmetric encryption function to yield an encrypted asset encryption key. In embodiments, the asset encryption key may be encrypted using the public key of the NFT owner specified at 9602. When the asset encryption key is encrypted using the NFT owner's public key, it may only be decrypted using the NFT owner's private key. Additionally or alternatively, the asset encryption key may be encrypted using a key provided by a DRM enforcing entity. For example, the asset encryption key may be encrypted using both the public key of the NFT owner and a private key of the DRM enforcing entity (e.g., using a shared secret generated using the public key of the NFT owner and the private key of the DRM enforcing entity). In these embodiments, the asset encryption key may be decryptable by the NFT owner (using the NFT owner's private key and the DRM enforcing entity's public key) and by the DRM enforcing entity (using the NFT owner's public key and the DRM enforcing entity's private key). Examples of asymmetric encryption algorithms may include Rivest Shamir Adleman (RSA), Digital Signature Standard (DSS), Elliptical Curve Cryptography (ECC) Diffie-Hellman exchange method, and/or the like.

At 9608, the tokenization platform 100 and/or DRM smart contract 9432 may cause a minting smart contract 9430 to mint the DRM NFT. In embodiments, the tokenization platform 100 and/or DRM smart contract 9432 may provide the encrypted NFT information (e.g., encrypted digital asset and/or a link to it, such as an IPFS hash) and the encrypted asset encryption key to the minting smart contract 9430 so that the minted DRM NFT 9442 may include attributes including the encrypted NFT information and encrypted asset encryption key. The tokenization platform 100 and/or DRM smart contract 9432 may also specify other attributes of the DRM NFT 9442 in a mint request transmitted to the minting smart contract 9430. In embodiments, at least some of the DRM NFT attributes may be specified using a template and/or schema, which may be referenced in an argument provided to a mint function of the minting smart contract 9430. The minting smart contract 9430 may then cause minting of the DRM NFT, thereby storing the encrypted NFT information and/or encrypted asset encryption key on the distributed ledgers 3120. In some embodiments, the tokenization platform 100 may also store the encrypted digital asset separately in a ledger (e.g., using a distributed filesystem such as IPFS).

In embodiments, the minting smart contract 9430 may, as part of the minting process, store one or more DRM data values 9518 (e.g., in the DRM NFT 9442). In embodiments, the DRM data values 9518 may be specified in a template used to mint the DRM NFT 9442. In these embodiments, the mint request sent to the minting smart contract 9430 may indicate a template for minting the DRM NFT 9442 with one or more DRM data values 9518. The DRM data values 9518, for example, may include an expiration date 9520, one or more DRM location 9522 values, one or more authorized device(s) 9524, a maximum number of uses 9526, a mutable use counter 9528 (which may be initialized to zero), or any other DRM data values for controlling access to encrypted NFT information and/or an encrypted digital asset.

At 9610, the minting smart contract 9430 may update the ownership data of the DRM NFT to assign it to the NFT owner specified in 9602. For example, the NFT owner attribute may be updated to include the distributed ledger address of the NFT owner's account. Alternatively, in some embodiments, the NFT owner may not be specified in 9602 (e.g., because the DRM NFT is being assigned to a default account, such as a seller account, marketplace account, minting account, etc.). In these embodiments, the minting smart contract 9430 may retrieve the default address and use it to update the DRM NFT owner attribute.

Figure 68:
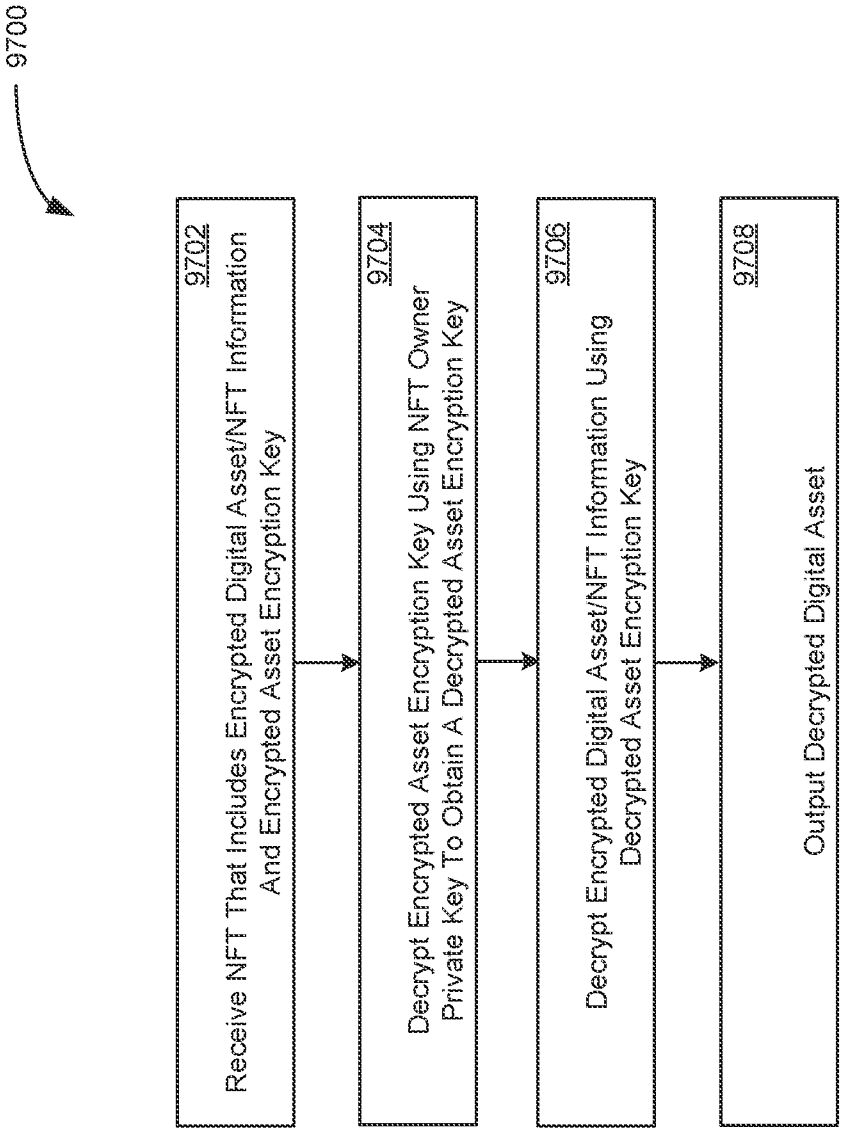
FIG. 68 is a flow chart illustrating an example set of operations of a method for using digital rights management tokens to access content according to some embodiments of the present disclosure.

FIG. 68 illustrates a method of using a DRM NFT to access an encrypted digital asset. In some embodiments, the method of FIG. 68 may be executed by a viewer device 9406 (e.g., a media player, user device, etc.). It is appreciated that the method may be executed by other suitable computing devices and/or smart contracts without departing from the scope of the disclosure. At 9702, the viewer device 9702 may receive an NFT that includes encrypted NFT information (e.g., an encrypted digital asset or a link to one) and an encrypted asset encryption key. For example, the viewer device 9702 may provide a user interface that allows the DRM NFT owner to sign into a digital wallet in order to provide access to the DRM NFT to the viewer device 9406. Additionally or alternatively, the DRM NFT owner may cause a distributed ledger transaction that transfers the DRM NFT to a distributed ledger account associated with the viewer device 9406.

At 9704, the viewer device 9406 may decrypt the encrypted asset encryption key (which may be stored as an attribute of the DRM NFT) using a private key associated with the owner of the DRM NFT. For example, the DRM NFT owner may sign a transaction providing access to the owner's private key (which may be stored in the owner's wallet) to the viewer device 9406. The viewer device 9406 may then use the private key to decrypt the encrypted asset encryption key in order to obtain a decrypted asset encryption key. Additionally or alternatively (e.g., if the asset encryption key was encrypted using the NFT owner's public key and a private key associated with the DRM enforcing entity), the viewer device 9406 may obtain the DRM enforcing entity's public key and, using the private key of the NFT owner and the public key of the DRM enforcing entity, may decrypt the encrypted asset encryption key.

At 9706, the viewer device 9406 may use the decrypted asset encryption key to decrypt the encrypted NFT information and/or encrypted digital asset. The decrypted asset encryption key may be a symmetrical key, such that it may be used for decryption as well as encryption. In some embodiments, the viewer device 9406 may obtain the encrypted NFT information from an attribute of the DRM NFT. Additionally or alternatively (e.g., if the digital asset is stored via IPFS), the viewer device 9406 may use the encrypted NFT information (e.g., an IPFS hash) to obtain an encrypted digital asset (e.g., stored via IPFS). After using the asset encryption key to decrypt the encrypted NFT information and/or encrypted digital asset, the viewer device 9406 may have a decrypted digital asset and/or other decrypted NFT information.

In some embodiments, prior to or after decrypting the encrypted NFT information and/or encrypted digital asset, the viewer device 9406 may verify that one or more DRM rules is satisfied and/or update one or more DRM data values 9518 is updated. For example, the viewer device 9406 may communicate with the DRM system 9420, DRM enforcing entity 9412, and/or DRM smart contract 9432, which may verify that one or more DRM rules or conditions (e.g., an expiration date rule specifying that a DRM NFT may only be used up to a certain date) are satisfied. Additionally or alternatively, the DRM system 9420, DRM enforcing entity 9412, and/or DRM smart contract 9432 may cause one or more distributed ledger transactions for updating one or more DRM data values 9518 of the DRM NFT 9442. For example, the use counter 9528 of the DRM NFT 9442 may be updated. In embodiments, if the DRM rules or conditions are not satisfied, the DRM system 9420, DRM enforcing entity 9412, and/or DRM smart contract 9432 may instruct the viewer device 9406 not to proceed with decrypting the NFT information and/or digital asset and/or outputting the decrypted NFT information and/or decrypted digital asset.

At 9708, the viewer device 9406 may output the decrypted NFT information and/or decrypted digital asset. For example, the viewer device 9406 may display the NFT information and/or digital asset on a screen, playback the NFT information and/or digital asset using audio equipment, or otherwise output the NFT information and/or digital asset. In embodiments, at least some of the steps of the method of FIG. 68 may be performed by a smart contract (e.g., the DRM smart contract 9432) and/or by the tokenization platform 100.

Figure 69:
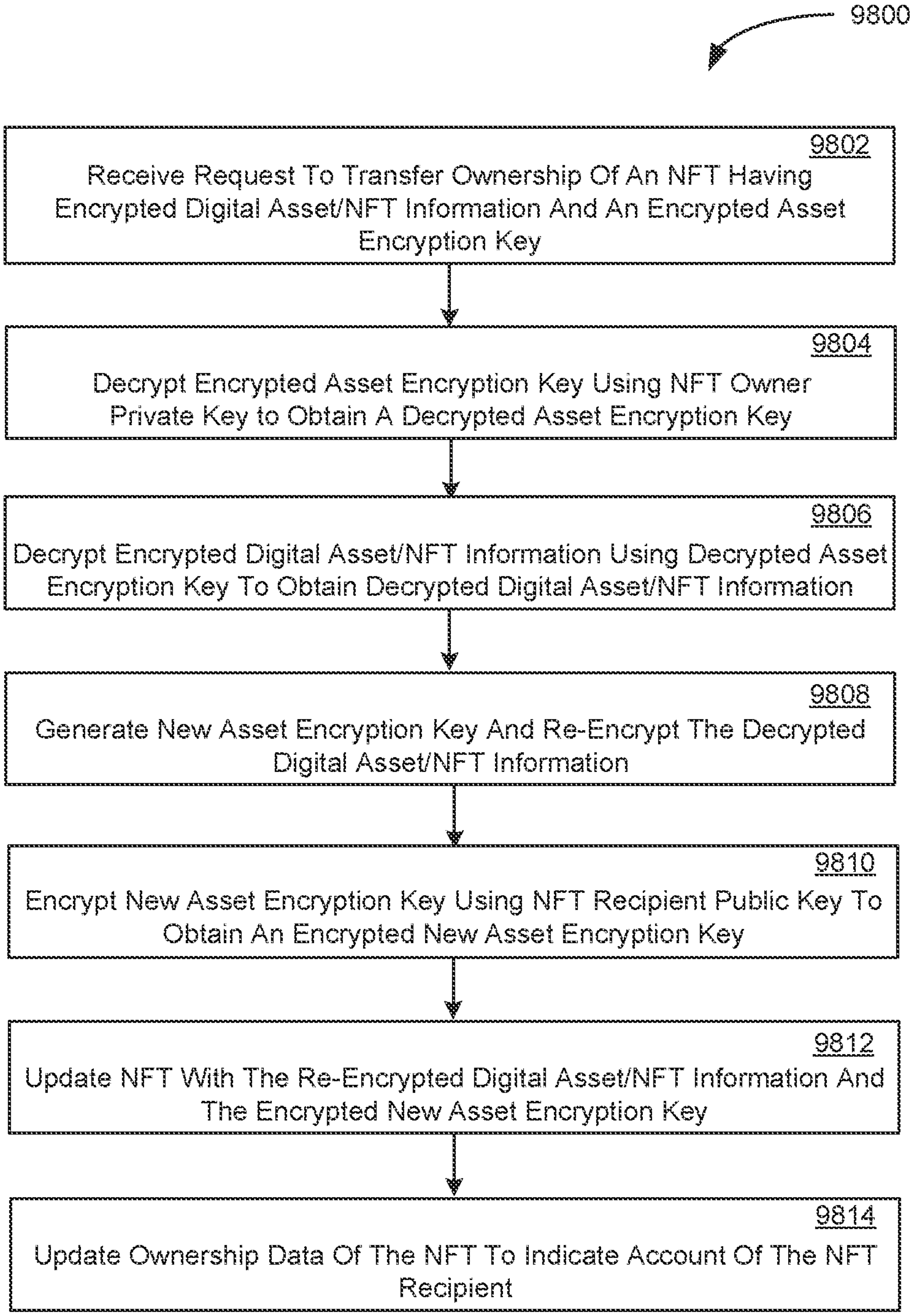
FIG. 69 is a flow chart illustrating an example set of operations of a method for transferring digital rights management tokens from one account to another according to some embodiments of the present disclosure.

FIG. 69 illustrates a method for transferring a DRM NFT from one account to another account (e.g., from a first user account to a second user account after the first user sells, gifts, trades, or otherwise provides the NFT to the second user account). Transferring a DRM NFT may involve generating a new asset encryption key, re-encrypting the NFT information and/or digital asset using the new asset encryption key, encrypting the new asset encryption key (e.g., using a private key of the recipient of the DRM NFT), and updating the DRM NFT with the encrypted new asset encryption key, the re-encrypted NFT information and/or digital asset, and the account information for the DRM NFT recipient. The method of FIG. 69 may be performed by the tokenization platform 100, by one or more smart contracts (e.g., a DRM smart contract 9432 and/or a transfer smart contract 9434), and/or another suitable computing system.

At 9802, the tokenization platform 100 and/or smart contract may receive a request to transfer a DRM NFT 9442 that includes encrypted NFT information and an encrypted asset encryption key. For example, the tokenization platform 100 and/or smart contract receive the request from a marketplace 102 (and/or some other marketplace system) as part of a sale or other transfer of the DRM NFT from an owner to an address associated with a recipient device 9408. In embodiments, the request may include a distributed ledger transaction that causes a smart contract (e.g., the transfer smart contract 9434) to receive the DRM NFT 9442. In embodiments, the request may include an identifier of the DRM NFT (e.g., an NFT identifier 9502), a public key of the recipient of the DRM NFT 9442, and/or information indicating an account of the current owner of the DRM NFT 9442.

At 9804, the tokenization platform 100 and/or smart contract may decrypt the encrypted asset encryption key (which may be stored as an attribute of the DRM NFT) using a key that was used to encrypt the encrypted asset encryption key. For example, if the asset encryption key was encrypted using the public key of the current owner and a private key of the DRM enforcing entity (e.g., a private key of the tokenization platform 100 and/or smart contract), the DRM enforcing entity (e.g., the tokenization platform 100 and/or smart contract) may decrypt the encrypted asset encryption key using the public key of the current owner and a private key of the DRM enforcing entity. Alternatively, if the asset encryption key was encrypted using only the public key of the NFT owner, a device associated with the DRM NFT owner may decrypt the encrypted asset encryption key using the DRM NFT owner's private key and may sign a transaction providing access to the decrypted asset encryption key to the tokenization platform 100 as part of the transfer process.

At 9806, the tokenization platform 100 and/or smart contract may use the decrypted asset encryption key to decrypt the encrypted digital asset and/or other NFT information. The decrypted asset encryption key may be a symmetrical key, such that it may be used for decryption as well as encryption. In some embodiments, the tokenization platform 100 and/or smart contract may obtain the encrypted NFT information from an attribute of the DRM NFT. In embodiments, the encrypted NFT information may include the encrypted digital asset. In these embodiments, the tokenization platform 100 and/or the smart contract may use the decrypted asset encryption key to decrypt the encrypted digital asset. Additionally or alternatively, if the digital asset is stored in a distributed file system (e.g., IPFS), the tokenization platform 100 and/or smart contract may decrypt encrypted NFT information using the decrypted asset encryption key to obtain decrypted NFT information that includes a decrypted link to a distributed file system (e.g., a decrypted IPFS hash) that links to the digital asset, which may be used to retrieve the digital asset from the distributed file system (e.g., from IPFS) using the decrypted link.

At 9808, the tokenization platform 100 and/or smart contract may generate a new asset encryption key for re-encrypting the decrypted digital asset and/or other decrypted NFT information and may re-encrypt the decrypted digital asset and/or other decrypted NFT information. For example, the tokenization platform 100 and/or smart contract may use a random number generator function to randomly generate a new asset encryption key of a specified length. If the new asset encryption key is generated by a smart contract (e.g., the transfer smart contract 9434 and/or DRM smart contract 9432), the smart contract may use a random number generator function and/or cause a blockchain transaction that requests a random number generated by another smart contract. The tokenization platform 100 and/or smart contract may then use the new asset encryption key to re-encrypt the decrypted NFT information and/or decrypted digital asset (e.g., using a symmetric encryption function), thereby obtaining re-encrypted NFT information and/or a re-encrypted digital asset.

At 9810, the tokenization platform 100 and/or smart contract may encrypt the new asset encryption key generated at 9806. In some embodiments, the tokenization platform 100 and/or smart contract may encrypt the new asset encryption key using a public key of the NFT recipient (e.g., using an asymmetric encryption function). In some of these embodiments, the tokenization platform 100 and/or smart contract may use the public key of the NFT recipient and a private key of the DRM enforcing entity to encrypt the new asset encryption key. In other embodiments, the tokenization platform 100 and/or smart contract may encrypt the new asset encryption key using only the public key of the NFT recipient (e.g., the public key received at 9802).

At 9812, the tokenization platform 100 and/or smart contract may update the DRM NFT 9442 with the new encrypted asset encryption key and the re-encrypted digital asset and/or the re-encrypted NFT information. In some embodiments, the tokenization platform 100 and/or smart contract may store the re-encrypted NFT information as an attribute of the DRM NFT (e.g., by modifying the encrypted NFT information 9510 attribute to replace the former value). In some embodiments, the tokenization platform 100 and/or smart contract may store the re-encrypted digital asset in a distributed filesystem (e.g., via IPFS) and store a link to the re-encrypted digital asset (e.g., an IPFS hash) as an attribute of the DRM NFT. In some embodiments, the tokenization platform 100 and/or smart contract may determine a new link (e.g., a new IPFS hash value) for the NFT link to the distributed file system may be encrypted in the encrypted NFT information, such that the digital asset may be stored encrypted or unencrypted but can only retrieved by a device that is able to The tokenization platform 100 and/or smart contract may further update an encrypted asset encryption key 9508 attribute to store the encrypted new asset encryption key.

At 9814, the tokenization platform 100 and/or smart contract may cause one or more distributed ledger transactions that transfer the updated DRM NFT 9442 to the account of the recipient of the DRM NFT 9442. In some embodiments, the tokenization platform 100 and/or the smart contract one or more distributed ledger transactions may update the owner account 9530 attribute and/or cause the DRM NFT 9442 to be transferred to a wallet of the recipient (e.g., the wallet associated with the public key received at 9802).

After the transfer completes, the recipient of the DRM NFT 9442 may use the updated DRM NFT 9442 to access the re-encrypted NFT information and/or re-encrypted digital asset. For example, the recipient may access the re-encrypted NFT information and/or re-encrypted digital asset using the method 9700 described at FIG. 68. Additionally or alternatively, the recipient may sell, trade, or otherwise transfer the DRM NFT 9442 to another recipient using the method 9800 described at FIG. 69. In embodiments, each iteration of the method 9800 may generate a new asset encryption key, such that every time a DRM NFT 9442 is transferred, a new asset encryption key may be generated.

In embodiments, the tokenization platform 100 may use a configurator subsystem (e.g., configurator subsystem 4020) to configure one or more of the minting smart contracts 9430, the DRM smart contracts 9432, the transfer smart contract 9434, and/or the asset storage smart contracts 9436. Additionally or alternatively, the tokenization platform 100 may use a configurator subsystem to cause pre-minting of one or more DRM NFTs 9442 and/or other tokens 9444 in order to configure a DRM ecosystem. In embodiments, the configurator subsystem may use configuration data that may comprise one or more of DRM NFT templates, DRM rules, DRM NFT pre-mint instructions, and/or the like. The configurator subsystem may use various configuration functions of the respective smart contracts to configure the smart contracts appropriately to carry out the functions described herein.

In embodiments, the analytics and reporting system 112 may gather data generated by the DRM NFT creation, viewing, and/or transfer processes described herein in order to generate various analytics and/or reports. The analytics and reporting system 112 may obtain the data for generating analytics by reading and storing minting data stored by the minting smart contract 9430, various DRM NFT logs stored by the DRM smart contracts 9432 and/or transfer smart contracts 9434 that may indicate access and/or transfer of the DRM NFTs 9442, and/or any other data generated by various other smart contracts described herein, data from sales or trades on marketplaces, and the like.

The analytics data may be generated for various scenarios and uses. For example, the analytics and reporting system 112 may provide analytics data about DRM NFTs related to particular digital assets, such as a total issued number of DRM NFTs for a given digital asset, an average price of secondary transactions for all DRM NFTs corresponding to a digital asset, an available supply of DRM NFTs remaining for purchase, and the like. The analytics and reporting system 112 may further generate one or more popularity factors that may measure the amount of activity for a particular digital asset, including accesses, transfers, resales, etc. The analytics and reporting system 112 may further generate comparative data for comparing various digital assets, such as data indicating which digital assets are most popular, had the most trading activity on a marketplace, and/or the like.

The analytics and reporting system 112 may further generate analytics data indicating the current usage of DRM NFTs of various types, such as percentages or totals of a particular type of DRM NFT that have been fully used, expired, etc. The analytics and reporting system 112 may further generate statistics indicating a current usage of DRM NFTs of a particular type, such as percentages or totals of DRM NFTs that are in user's wallets, that are in various smart contract accounts, that are listed for sale or trade on marketplaces, that are available for purchase, and the like. In some cases, rights holders or other DRM NFT creators may use data indicating that a DRM NFT is listed on a secondary marketplace 9012 for a particular average price to adjust the sales price for similar DRM NFTs (e.g., such that a high secondary sale value may lead to raising prices for pre-sales, whereas a low secondary sale value may lead to lowering pre-sale prices), mint additional DRM NFTs, and/or the like.

In embodiments, the analytics and reporting system 112 may leverage artificial intelligence (AI) techniques to provide various predictions, predictive analytics, etc. For example, the analytics and reporting system 112 may use one or more trained machine learning models to estimate the likelihood of increased sales based on price adjustments based on marketplace activity for DRM NFTs corresponding to a particular digital asset. As another example, the analytics and reporting system 112 may predict the future value of DRM NFTs corresponding to a given digital asset if additional DRM NFTs for accessing the digital asset are minted. Accordingly, using these and other techniques, rights holders may be able to more accurately predict a number of DRM NFTs that are likely to sell, how to maximize revenue, and/or the like. The analytics and reporting system 112 may collect data from the distributed ledger 3120 in other suitable manners without departing from the scope of the disclosure.

In embodiments, the DRM NFTs 9442 may be integrated with other NFT-related functionalities, such as pre-sale functionalities, PTE gaming functionalities, crafting functionalities, unboxing functionalities, ticket functionalities, lending functionalities, etc. as described herein. For example, unboxing recipes may be configured to provide DRM NFTs as rare tokens that may be received when unboxing a digital pack, as described elsewhere herein. Additionally or alternatively, crafting recipes may be used to level up DRM NFTs 9442 receive more accesses to a particular piece of content (e.g., to increase a maximum number of uses of a DRM NFT 9442), upgrade to better quality content (e.g., by exchanging a first DRM NFT 9442 for a second DRM NFT 9442 that accesses a higher quality digital asset), or otherwise increase the value of the DRM NFTs 9442. In embodiments, a token issued and/or managed by the pre-sale platform, such as one redeemable for an item that is offered during a pre-sale time period, may be used as a collateral in a token-based lending platform, such as the one described herein and/or in documents incorporated herein by reference. For example, a purchaser may buy a token that can be redeemed for an item that is not yet available for purchase (such as any type of item for which a VIRL or other token may be created as described herein and in the documents incorporated by reference) and then may borrow from a lender (such as by borrowing fiat currency, cryptocurrency, tokens, VIRLs for other items, or other consideration), whereby the terms of lending use the pre-sale item token as collateral for the lending transaction.

Carbon Offset Tokens

In embodiments, the platform 100 may create VIRLs, as described herein, with respect to carbon-offset-credits and these carbon-offset-credit VIRLs may be tokenized in NFTs, fungible tokens, or some other type of token, including tokenized tokens, as described herein. As used herein, the terms “carbon-offset-credit” and “CoC” generally refer to any and all programs, operations, methodologies, processes, systems and the like designed to enable an entity, such as a business or individual, to “offset” their carbon emissions and carbon impact on the environment (i.e., their “carbon footprint”) by purchasing credits for other entities to take a beneficial action as regards carbon production, emissions, recapture and the like, including but not limited to reducing, removing, and/or avoiding carbon emissions, including offsets for other environmental impacts such as pollution offsets. In embodiments of the present disclosure, “carbon-offset-credit” or “CoC” may be used interchangeably with alternate terms generally referring to carbon exchange programs, sustainability programs, reduced-consumption programs and the like, including but not limited to systems and methods for trading, exchanging, purchasing or otherwise transacting carbon credit, renewable energy credit, carbon certificates, carbon emission obligations, carbon permits, carbon recapture and/or emission units and/or credits, or some other alternate term for such systems and methods.

In embodiments, the platform 100, as described herein, may facilitate a carbon-offset-credit (CoC) marketplace and associated processes (also referred to as a “CoC process”), which may be performed via a “CoC platform” (or “CoC system”) that is part of, or associated with, the platform 100. In embodiments, a CoC process may refer to a process that is distributed among a series of participants (e.g., computing systems and devices) and a set of smart contracts optionally hosted on the set of distributed ledgers (such as blockchain-based ledgers), such that a producer of a CoC token or other user of the CoC platform can digitally tokenize a CoC purchase right, CoC redemption right, or some other right associated with the CoC token. In particular, the disclosed ecosystem and the systems and methods that support it provide mechanisms that allow a producer of a CoC token and/or a party affiliated with a CoC platform to digitally tokenize one or more carbon-related offset actions into a digital CoC token, CoC redemption token, or some other type of digital CoC token using, in part, a set of smart contracts. In embodiments, the set of smart contracts that are implicated by a CoC process may include, without limitation, a configuration smart contract (such as for configuring a set of parameters of the CoC token and/or the carbon-related offset action, among others), a minting smart contract (such as for configuring a set of parameters of the CoC token, among others), a CoC token management smart contract, a CoC redemption smart contract, and/or some other type of smart contract as described herein. It is appreciated that in some embodiments, the functionality of two or more smart contracts may be performed in a single smart contract. Collectively, in embodiments the set of one or more smart contracts enable configuration of the initial offering and management of subsequent exchanges of a CoC token that represents the right to cause a carbon-offset action to occur, such as a carbon emission reduction, a carbon recapture action, or some other type of carbon-offset action. In embodiments, CoC tokens may be fungible or non-fungible. In embodiments, CoC tokens, and redemption thereof, may relate to a specific single carbon production unit (e.g., one unit, native-plant-based carbon recapture in Amazon rainforest; one unit, basalt-based carbon-fixing in Iceland). It is noted that in embodiments, the CoC platform may be implemented using a distributed ledger that uses a proof-of-stake consensus mechanism, such that the environmental impact of such a distributed ledger is much less than counterpart proof-of-work consensus mechanisms.

In embodiments, the stages of a CoC marketplace process may include one or more of: a request stage where a would-be purchaser of a CoC token or a token relating to the CoC token requests the production of the CoC token, an announcement stage where a user of the CoC platform (such as a producer of a CoC token, a retailer of the CoC token, an advertiser of the CoC token, and/or a party affiliated with a CoC token or production thereof, including the platform 100) announces a CoC event during which would-be purchasers may obtain a right, represented by a CoC token, to cause a carbon-offset action to occur, such as a carbon emission reduction, a carbon recapture action, or some other type of carbon-offset action; a virtualization stage where a VIRL corresponding to the CoC token is generated; a contracting stage where the contractual terms governing the configuration, minting, management and redemption (or “composting”) of the CoC token(s) are manifested; a tokenization stage where the VIRL is tokenized into at least one CoC token and at least one CoC redemption token (in embodiments, a CoC token and a CoC redemption token may be inherent to a single token, rather than independent tokens); a placement stage where the CoC token is placed on the CoC marketplace for purchasers to purchase the right to purchase, obtain, earn and/or control one or more carbon-related offset actions; and a purchase stage in which a CoC token is bought.

In example embodiments, a marketplace system 102, a ledger management system 104, a token-based CoC system, and an analytics and reporting system 112 may be configured to interface with a set of user devices in facilitating the CoC processes using, in part, a set of distributed ledgers hosted by a set of node devices. The participants in the CoC marketplace may interact with one another and with the distributed ledger(s) via various computing devices, such as laptop computers, desktop computers, tablets, video game consoles, server computers, and/or the like.

In embodiments, a user may instruct the platform 100 and/or the CoC marketplace to generate virtual representations of one or more items within a CoC marketplace, such that each virtual representation represents one or more carbon-related offset actions that is available for a transaction, such as a CoC emission offset, carbon recapture, or some other type of action. In embodiments, the producer of a CoC token may provide item attributes and description relating to the CoC token. In response to the producer providing the information to the CoC marketplace, the platform 100 may generate a set of CoC tokens corresponding to the number of carbon-offset actions available for transaction. For example, if the producer indicates that there are 100,000 carbon offset units, each representing the planting of one tree in a specified state within the United States, the platform 100 may generate a virtual representation of the carbon-offset action and may generate 100,000 CoC tokens corresponding to the virtual representation. The virtual representation may include a description of the tree to be the subject of the planting, the region of the planting, history about the region, or some other type of information. The platform 100 may then store the virtual representation and the corresponding CoC tokens in a distributed ledger. For each CoC token, the distributed ledger may store the CoC token, ownership data relating to the CoC token, and/or other suitable data relating to the CoC token in the distributed ledger. In some embodiments, the ownership of the CoC token may be assigned initially to the producer of the CoC token. As such, the distributed ledger may indicate the existence of the CoC token, and that the producer owns the CoC token. Once tokenized, end users (e.g., registered buyers on the CoC marketplace) may participate in transactions using the corresponding CoC token. In response to a transaction, the platform 100 may update the distributed ledger to indicate an assignment of the CoC token to the user (e.g., to a wallet associated with an account of the user). In embodiments, a copy of the CoC token may be stored in a digital wallet corresponding to the new owner of the CoC token (e.g., the buyer). In embodiments, a transaction may be a form other than a purchase, including but not limited to an award, as in a consumer "rewards program," of a CoC token to a platform user. In an example, a user of the platform 100 may participate in a carbon-offset rewards program in which they may be awarded a CoC token(s) based upon the nature, volume or other parameter of their use of the CoC platform 100. In embodiments, CoC offsets, CoC points and/or CoC tokens may be award based at least in part on dynamically determining a CoC award amount based at least in part on estimating the computational demands of, for example, an applicable validation algorithm for processing a token, such as an NFT or other token type. Points may be awarded, for example, for buying or selling NFTs, or other types of tokens, on the platform 100. These earned points may be calculated based in part on the carbon-offset by trading tokens on the platform instead of alternate, energy-intensive trading means, such as Ethereum NFT-based trading systems and methods. For example, if a user's wallet that is associated with the platform 100 buys/sells 100 NFTs, this user may earn 500 CoC points. These 500 CoC points may, in turn, be redeemed for a specified value of carbon-offset token (e.g., $1 or $5 platform CoC NFT). The user may then trade the CoC NFT(s) or redeem the NFT(s) to offset some amount of the user's carbon footprint, for example that represented by the user's frequent airplane-based business travel, a shipping volume associated with the users online shopping behaviors, personal use of air conditioning at home, or some other carbon producing behavior associated with the user. Continuing the example, the platform 100 may provide gamification of the transacting, collecting and redemption of CoC tokens by users, such as indicating the amount of landfill savings a user's behaviors approximate or some other metric of beneficial carbon footprint reduction exemplified by the user's CoC token transaction history. In embodiments, the platform 100 may award users of the platform CoC tokens as an incentive for using the platform 100 instead of other, more energy-intensive or wasteful means of NFT and other token exchange. The platform 100 may publish an aggregate number of CoC tokens awarded to users of the platform 100 as one means of publicly communicating the pro-environmental outcoming of trading tokens on the platform 100 as opposed to other means of token exchange.

In embodiments, a set of operations may be executed in a CoC marketplace, or a facility associated with a CoC marketplace, by a minting smart contract to mint a new CoC token, such as a non-fungible token (NFT) or a fungible token, that is associated with the right to cause a carbon-offset action to occur, such as a carbon emission reduction, a carbon recapture action, or some other type of carbon-offset action. In embodiments, minting smart contracts may generate different types of tokens, such as NFTs or fungible tokens representing different types of CoC credits, varieties and/or combination of CoC credits, and the like.

In embodiments, the minting smart contract may receive a request to mint one or more new CoC tokens, such as NFTs or fungible tokens tied to a CoC action or credit. The request may indicate a template ID and/or a set of attributes and a user account to which the CoC token will be assigned. In embodiments, the template ID or set of attributes may be indicative of the type of CoC token that will be generated, as the template (or the set of attributes) may define the name of the CoC token (e.g., a descriptor of the CoC token), and/or any other features of interest. The minting smart contract may determine a set of attributes for the CoC token to be minted. In embodiments, the set of attributes may be defined in the template indicated by the template ID provided in the request. In these embodiments, the minting smart contract may retrieve the template based on the template ID. Alternatively, the request may explicitly include the set of attributes.

In embodiments, the minting smart contract may mint a new CoC token based on the set of attributes and generate a unique value (e.g., a hash value) that represents and uniquely identifies the CoC token. The minting smart contract may also determine a minting number, whereby the minting number is indicative of a relative order when the CoC token was generated in comparison to other CoC tokens of the same type. For example, a CoC token associated with reforestation activities of carbon offset in a particular geographic region may be "printed" such that the first CoC token among the group may have a minting number of 01, the second CoC token in the group a minting number of 02, and so forth. The minting number may confer a status on a user having, for example, an early minting number indicating that they were an "early adopter" of the particular carbon-offset initiative associated with the CoC token(s). In embodiments, CoC tokens of different types may have common minting numbers. In embodiments, the minting smart contract may assign a CoC token to an account of a user of the CoC marketplace. In embodiments, the minting smart contract may update a ledger (e.g., a blockchain) to reflect that the new CoC token is owned by a specified account.

In embodiments, a CoC marketplace process may be at least partially implemented using a set of distributed ledgers hosted by a network of node devices, where the node devices execute smart contract instances that are created in connection with a CoC marketplace process, including one or more smart contracts that manage the tokenization of one or more CoC tokens. In some embodiments, one or more stages in the CoC marketplace process are managed by a respective set of smart contracts. In general, a smart contract may include computer executable code that, when executed, executes conditional logic that triggers one or more actions. Smart contracts may receive data from one or more data sources, whereby the conditional logic analyzes the data to determine if certain conditions are met, and if so, triggers one or more respective actions. Examples of smart contracts are discussed throughout the disclosure, including examples of conditional logic and triggering actions. In embodiments, the smart contracts associated with a CoC marketplace may be defined in accordance with one or more protocols, such as the Ethereum protocol, the WAX protocol, and the like. Smart contracts may be embodied as computer-executable code and may be written in any suitable programming languages, such as Solidity, Golang, Java™, JavaScript™ C++, or the like. In example embodiments, a distributed ledger may store and the node devices may execute instances of: configuration smart contracts, minting smart contracts, token management smart contracts, redemption smart contracts, or some other type of smart contract associated with a CoC token as described herein. The different types of smart contracts are discussed throughout the disclosure.

In embodiments, each virtual representation of a CoC token may include or be associated with a smart contract that, for example, provides a set of verifiable conditions that must be satisfied in order to self-execute a transaction (e.g., transfer of ownership and/or redemption) relating to a CoC token represented by the virtual representation. In embodiments, each CoC token corresponding to a virtual representation may be associated with the smart contract that corresponds to the virtual representation. In embodiments, a smart contract corresponding to a virtual representation may define the conditions that must be verified to generate new tokens, conditions that must be verified in order to transfer ownership of tokens, conditions that must be verified to redeem a token, and/or conditions that must be met to destroy a token. A smart contract may also contain code that defines actions to be taken when certain conditions are met. When implicated, the smart contract may determine whether the conditions defined therein are satisfied, and if so, to self-execute the actions corresponding to the conditions. In embodiments, each smart contract may be stored on and accessed on a distributed ledger that is associated with the CoC marketplace. In embodiments, CoC tokens may be sold, traded, exchanged or otherwise transferred, in whole or in part, on a secondary marketplace platform, as described herein. In embodiments, purchasers of a CoC token on a secondary marketplace may redeem the token, trade it for another token, obtain the cash value equivalent, and/or some other type of permitted transaction, exchange or action.

In embodiments, once the platform 100 and/or CoC marketplace generates a CoC token, the distributed ledger may be updated to indicate the existence of a new CoC token. A distributed ledger associated with a CoC marketplace may be public or private. In embodiments where the distributed ledger is private, the platform 100 may maintain and store the entire distributed ledger on computing device nodes associated with the CoC marketplace. In embodiments where the distributed ledger is public, one or more third party computing node devices (or "computing nodes") that are not associated with the CoC marketplace may collectively store the distributed leger. In some of these embodiments, the CoC marketplace may also locally store the distributed leger and/or a portion thereof. In embodiments, the distributed ledger associated with a CoC marketplace may be a blockchain. Alternatively, the distributed ledger associated with a CoC marketplace may comport to other suitable protocols (e.g., hashgraph, Byteball, Nano-Block Lattice, IOTA, or some other protocol). By storing tokens on a distributed ledger, the status of that token can be verified at any time by querying the ledger and trust that it is correct. By using the token approach to implementation, CoC tokens, redemption tokens, and the like cannot be copied and redeemed without permission.

In embodiments, the distributed ledgers may store tokens that are used in connection with a CoC marketplace, including, but not limited to, CoC tokens, redemption tokens, and other suitable tokens as described herein, that are generated in connection with the CoC marketplace process and held to secure a right to cause a carbon-offset action to occur, such as a carbon emission reduction, a carbon recapture action, or some other type of carbon-offset action.

In embodiments, distributed ledgers may store additional data, such as CoC data and CoC event records, ownership data, and/or supporting data. CoC event records may include records that memorialize any events that occur in connection with a CoC process. In embodiments, an event record may be generated by any suitable computing device within the ecosystem 2000, such as the tokenization platform 100, user devices, or some other type of device associated with the CoC marketplace. In embodiments, a CoC event record may be hashed using a hashing function to obtain a hash value. The CoC event record may be written into a data block and stored in a distributed ledger, where the data block may include the hash value. In this way, the data within the CoC event record cannot be changed without changing the hash value of the event record 4152, thereby making the CoC event record immutable. Once a block containing a CoC event record is stored on a distributed ledger, the CoC event record may be referenced using an address of the block with respect to the distributed ledger. In embodiments, supporting data may be documentation and data that is provided in support of a task performed or other events that occur in connection with a CoC marketplace and/or the participants of the CoC marketplace.

In embodiments, ownership data may include data that associates a CoC token to an account, including but limited to a purchaser's account, a CoC token producer's account, or some other type of account associated with a CoC marketplace. In embodiments, ownership data may be stored in data blocks, where a data block may include a link between a token address and an account address. For example, if a purchaser, such as an individual registered on a CoC marketplace platform, owns cryptocurrency tokens (e.g., bitcoins), the ownership data of each token may be stored on a distributed ledger and may link the respective tokens to an account associated with the purchaser. If the purchaser uses one of those tokens to purchase an item from a CoC token producer that is registered on the CoC marketplace platform, the ownership data of the token can be updated to link the token used to purchase the carbon-offset right to an account of CoC token producer. When ownership changes to a new account, a new block may be amended to the distributed ledger that links the token with the new account. In embodiments, distributed ledgers, CoC event records, ownership data, and supporting data and other suitable data that supports the CoC marketplace may be stored in non-distributed datastores, filesystems, databases, and the like. For example, in embodiments, the tokenization platform 100 may maintain data stores that store CoC event records, ownership data, and supporting data and other suitable data that supports the CoC marketplace.

In embodiments, an owner of a CoC token may redeem the CoC token representing the right to cause a carbon-offset action to occur, such as a carbon emission reduction, a carbon recapture action, or some other type of carbon-offset action. In embodiments, a user may select a CoC token to redeem from a digital wallet of the user. In response to the selection, the digital wallet may transmit a redeem request to the CoC marketplace and/or the associated platform 100. The redeem request may include the CoC token (or an identifier thereof) and a public address of the user (or any other suitable identifier of the user). In an example, the CoC marketplace may receive the redeem request and verify the validity of the CoC token and/or the ownership of the CoC token. Once verified, the user may be granted permission to redeem the CoC token. As described herein, the user may be redeeming a CoC token corresponding to a carbon-offset action.

In embodiments, CoC tokens may be perishable, in that they lose all value at a predetermined time or upon the occurrence of a predetermined event. For example, a seller may provide an expiry in the virtual representation that indicates a date and time that the virtual representation is no longer valid, such that when the expiry is reached, the token may be deemed invalid. In another example, a seller may set a date by which redemption must occur. A user who does not redeem such a CoC token by the set redemption date may have the CoC automatically redeemed, causing the expiration of the CoC token and related ownership.

In embodiments, the redemption system 404, as described herein, may allow an owner of a CoC token, CoC redemption token, or other token, to redeem a token. The redemption system 404 may receive a request, such as a request from a user of a CoC marketplace, to redeem (or "redemption request") the CoC token. The redemption system 404 may be included in a CoC marketplace, associated with a CoC marketplace, or independent from and operably connected with a CoC marketplace. The redemption request may include the CoC token or an identifier of the CoC token (e.g., an alphanumeric string) and may include a public address of the account of the user attempting to redeem the CoC token. In response to receiving the redemption request, the redemption system 404 may provide the CoC token, the public address of the account of the user attempting to redeem the token, and the public key used to digitally sign the CoC token to the ledger management system 104. The ledger management system 104 may then either verify or deny the token/public address combination. The ledger management system 104 may deny the combination if the CoC token is not a valid CoC token and/or the user is not the listed owner of the CoC token. The ledger management system 104 may verify the token/public address combination if the CoC token is deemed valid and the requesting user is deemed to be the owner of the CoC token. In embodiments, the redemption system 404 may execute a workflow corresponding to the virtual representation to which the redeemed CoC token corresponds, as described herein.

In embodiments, the ledger update system may be further configured to "compost" CoC tokens. Composting CoC tokens (or redemption tokens) may refer to the mechanism by which a CoC token (or redemption token) is no longer redeemable. A CoC token may be composted when the CoC token expires or when the CoC token is redeemed. In embodiments, the ledger update system 304 may update the ownership of the CoC token to indicate that the token is not currently owned (e.g., owner=NULL) and/or may update the CoC token state to indicate that the token is no longer valid. In some of these embodiments, the ledger update system 304 may generate a block indicating that the CoC token is not currently owned or that the state of the CoC token is not valid. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In some embodiments, the distributed ledger 310 is sharded. In these embodiments, the ledger update system 304 may designate a side chain 314 (e.g., an item classification) to which the CoC token corresponds. In these embodiments, the generated blocks are amended to the designated side chain 314 to indicate the composted CoC token.

In embodiments, the tokenization platform 100 may be configured to performs analytics on various stages of the CoC marketplace processes. In some of these embodiments, the analytics and reporting system 112 may be configured to obtain CoC event records and/or supporting data from the set of distributed ledgers to determine outcomes related to a CoC marketplace process. The analytics and reporting system 112 may be configured to provide ratings to different participants in the CoC marketplace. The analytics and reporting system 112 may collect additional or alternative data relating to CoC marketplace participants, such as feedback of other participants. The analytics and reporting system 112 may then apply a scoring function to the outcome and other feedback data related to participants to assign scores to the participants. In embodiments, the analytics and reporting system 112 may obtain data from the distributed ledgers. In some of these embodiments, a node device may be configured as a "history node" that monitors all data blocks being written to the distributed ledgers. The history node device may process and index each block as it is being written to the ledger and may provide this information to the analytics and reporting system 112. The analytics and reporting system 112 may then perform its analytics on the data collected by the history node. The analytics and reporting system 112 may collect data from the distributed ledger in other suitable manners without departing from the scope of the disclosure.

Distributed Ledger Crawler System

In embodiments, the tokenization platform 100 may implement a distributed ledger crawler system, which may ingest distributed ledger data (e.g., blockchain data) from one or more distributed ledgers, process the data into a standardized format, generate various analyses of the data, and provide the data to systems and/or applications for various purposes. For example, the data may be used (e.g., by the tokenization platform 100 or third parties) to analyze transaction data involving different wallets for a variety of use cases, such as social graph generation, wallet characterization (e.g., discovering what type of user corresponds to each wallet), analyzing the use of NFTs or other tokens for various purposes (e.g., analyzing the performance of ticketing tokens, PTE game tokens, collectible tokens, VIRL tokens, etc.), analyzing the use of smart contracts for various purposes, generating social communities of users based on their interactions with a distributed legger, and/or any of the analyses or other use cases described elsewhere herein that depend on distributed ledger data.

The distributed ledger crawler system provides several technological advantages that previous systems are unable to provide and solves several technological problems that are unique to distributed ledgers, including blockchains. Because blockchains may comprise a large volume of transactions extending back for a long period of time, every transaction since a first block may be recorded and available for analysis, but obtaining current and past states (e.g., as may be needed for sophisticated data analyses and other use cases) may require starting from the first block and proceeding forward through the entire chain. Obtaining and processing an entire blockchain's worth of transactions is often a difficult and time-consuming process that may take months' worth of processing time using current technologies. At the same time, blockchains are constantly growing as new blocks are added. These problems only compound when analyzing transactions and other activity across multiple distributed ledgers (e.g., sidechains or other different blockchains). The distributed ledger crawler system described herein improves the state of the art by providing a standardized data pipeline that generalizes to multiple distributed ledgers and that batch processes past data while continually ingesting and processing new data. Data pipelines for various distributed ledgers as described herein are configurable and efficient, allow "crawling" historical data for multiple blockchains only once while reconciling the data into unified and standardized data pools, and thereby enable large scale ingestion and analysis of transaction and other data that can be achieved without using cost prohibitive amounts of computing resources.

Distributed ledgers provide an additional challenge in that they include a large volume of transaction data associated with anonymized wallets. Thus, the distributed ledger data may lack any personally identifiable information (PII), simultaneously reducing privacy concerns for the use of data while also making several use cases (e.g., ad targeting, user analysis) more difficult. To address these issues, the distributed ledger crawler system described herein includes various data processing techniques that enable use cases for this anonymized data, while also providing the ability to enrich the anonymized data with data from other sources. An example use case where data associated with various blockchain wallets is ingested, processed, stored in a graph database, supplemented with off-chain data, and clustered in order to characterize the wallets (e.g., for ad targeting using an "Airdrop" token advertising system, as described elsewhere herein) will be described to illustrate the functionality of the distributed ledger crawler system. Other use cases of the distributed ledger crawler system may also be apparent, and several such example use cases will be described.

Figure 70:
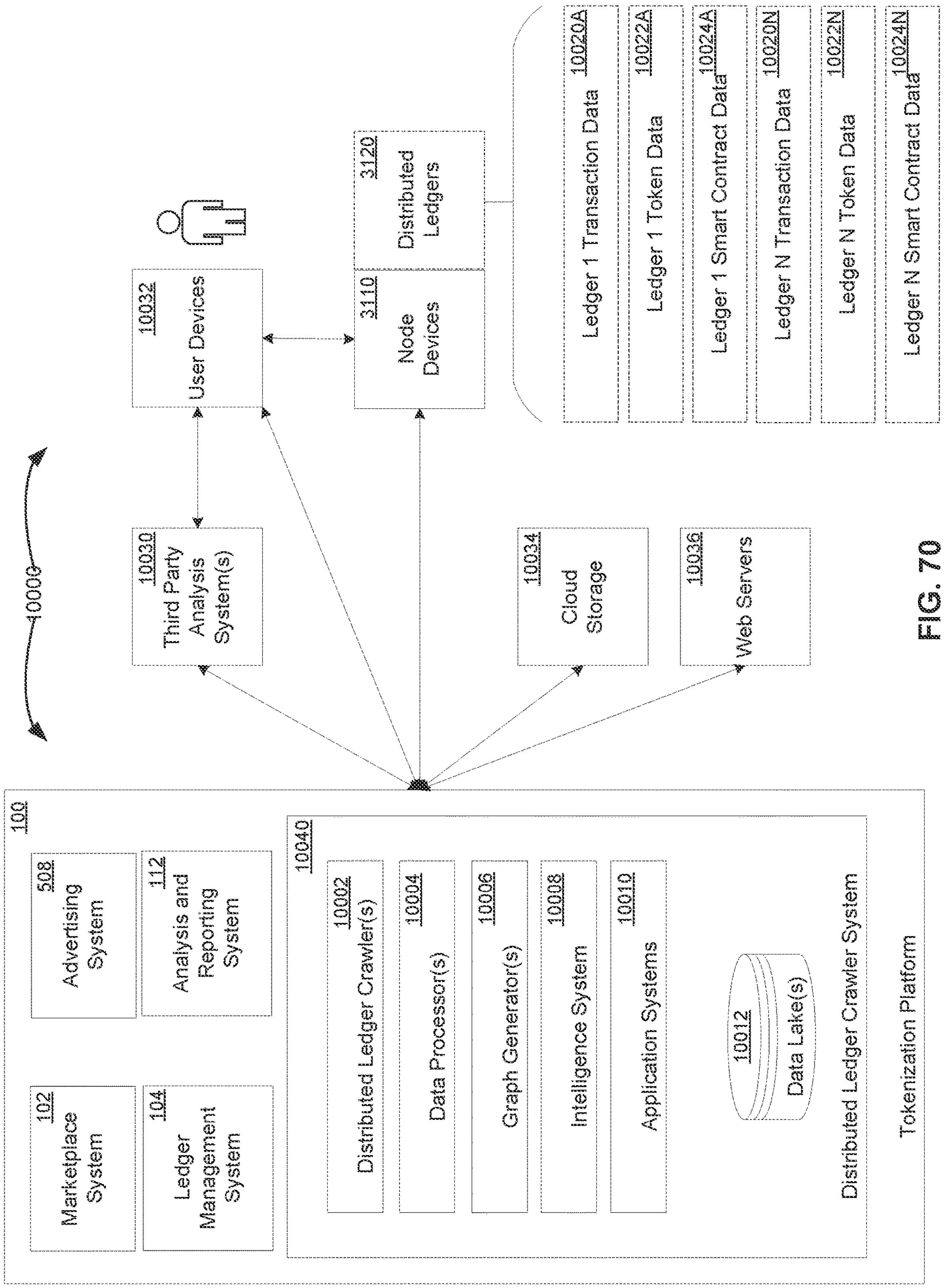
FIG. 70 is a schematic illustrating an example environment of a tokenization platform configured to implement a distributed ledger crawler system according to some embodiments of the present disclosure.

In embodiments, the distributed ledger crawler system may be implemented by the tokenization platform 100. As shown at FIG. 70, the distributed ledger crawler system 10040 may include one or more blockchain crawlers 10002 for ingesting data from one or more blockchains or other distributed ledgers, one or more data processors 10004 for providing specific data pipelines (e.g., validation, transformation, supplementation, etc.) for the data, a graph generator 10006 for generating social graphs from the data, an intelligence system 10008 for performing one or more artificial intelligence (AI) assisted techniques using the data (e.g., machine learning or the like), and one or more application systems 10010 for using the data for one or more applications providing various use cases (e.g., advertising, community generation, etc.). The distributed ledger crawler system 10040 may further include a data lake 10012, which may store raw data ingested by the blockchain crawlers 10002, transformed data at various stages of processing, social graphs that may be queried and/or otherwise used for analysis, and/or various data outputs of the intelligence system 10008 (e.g., machine learning outputs), the application systems 10010, and the like.

Figure 71A:
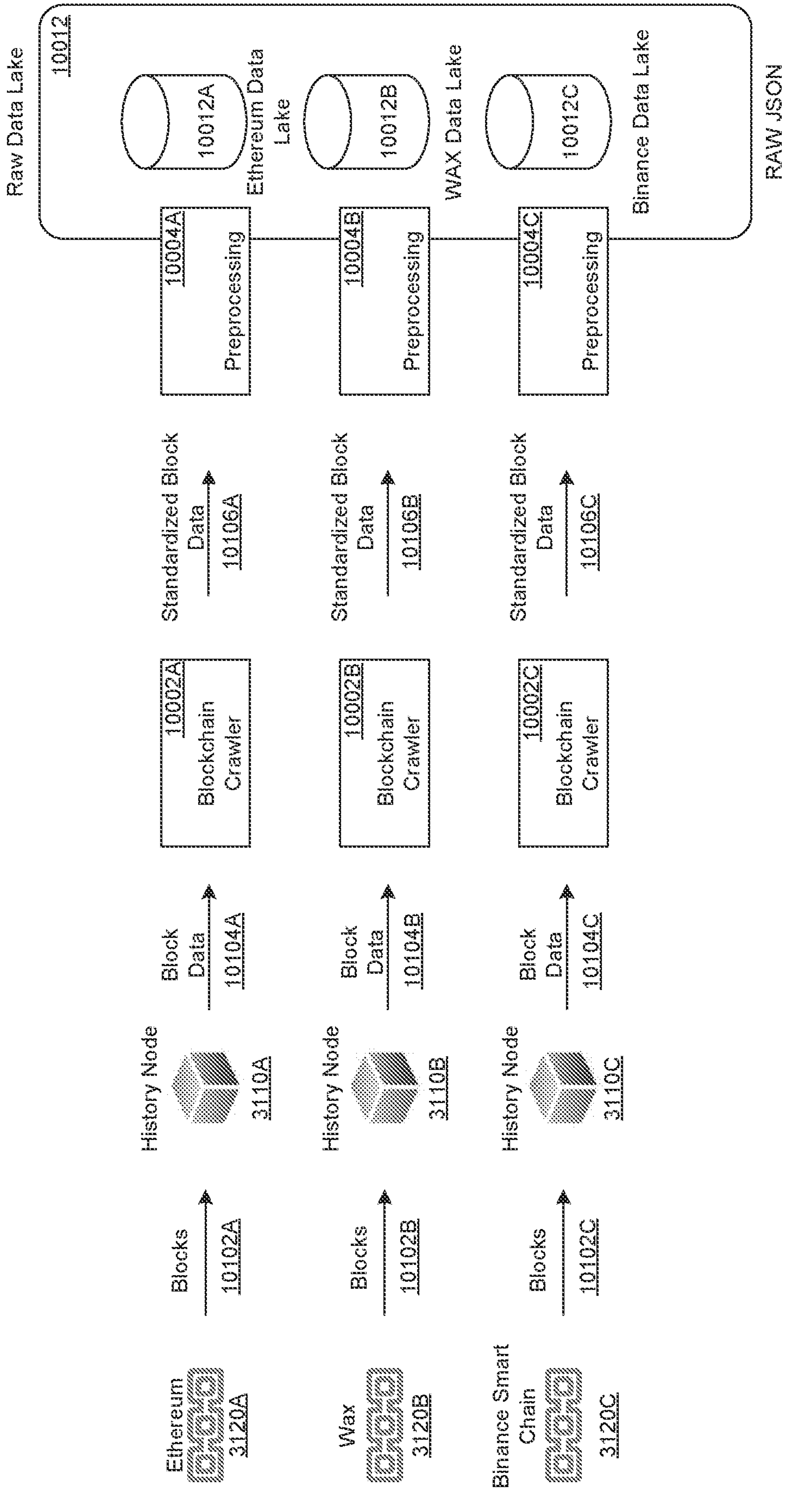
FIGS. 71A-C are data flow diagrams illustrating an example data processing pipeline of a distributed ledger crawler system according to some embodiments of the present disclosure.
Figure 71B:
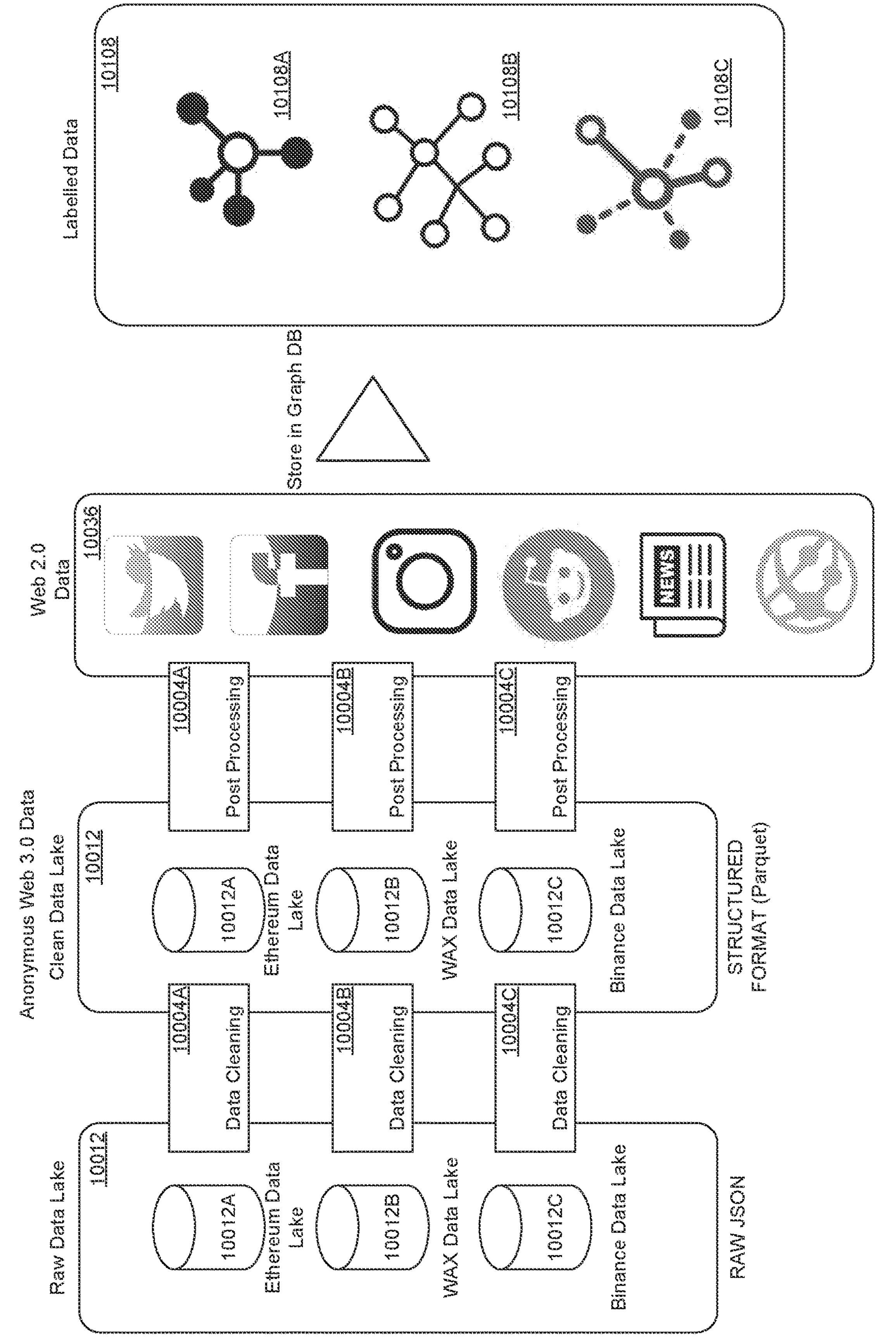
Figure 71C:
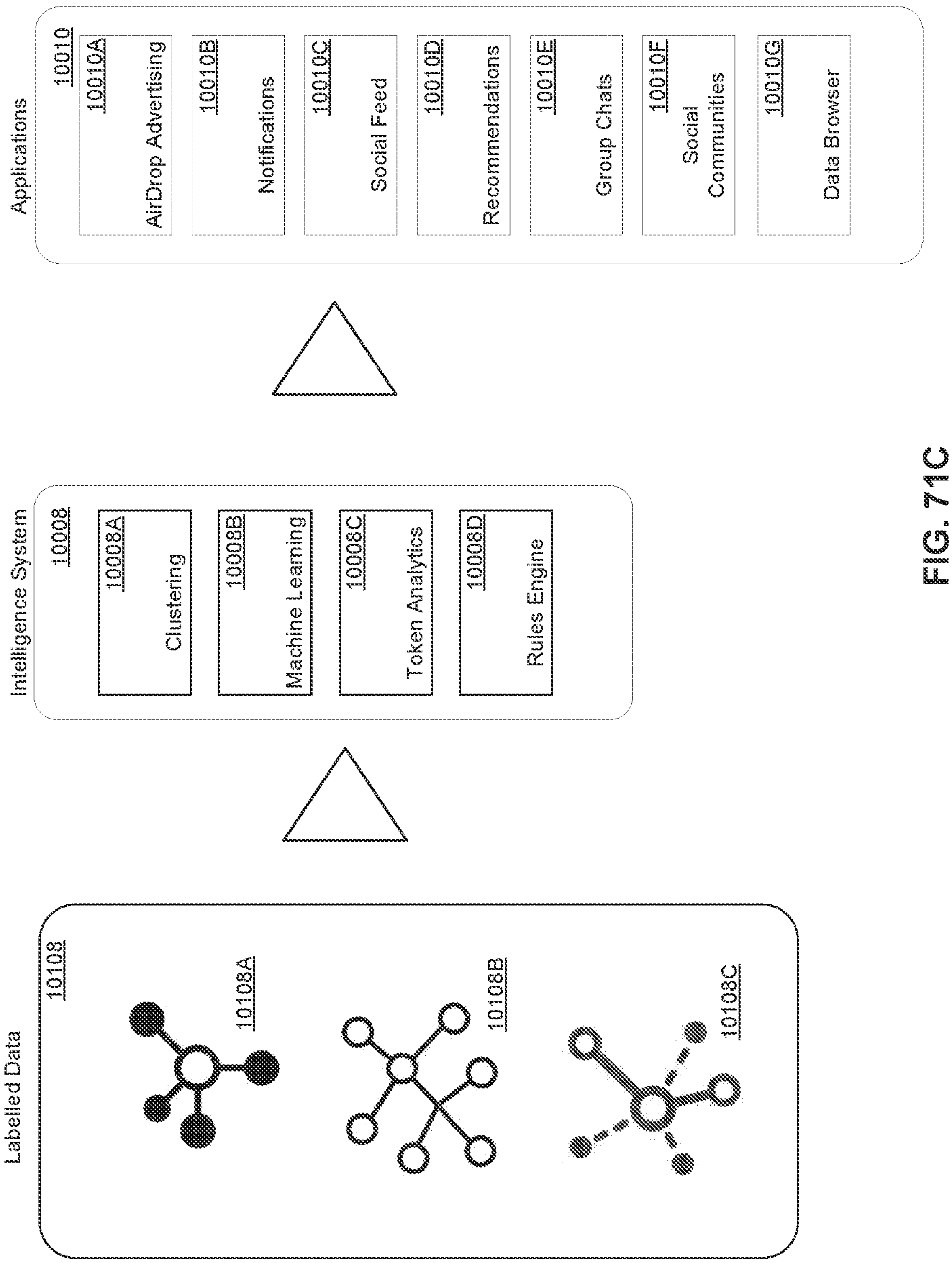

In embodiments, the blockchain crawlers 10002 may receive transaction data 10020, token data 10022, smart contract data 10024, and/or other data contained on distributed ledgers 3120 from various blockchains or other distributed ledgers and begin the process of transforming the data for use by other components of the distributed ledger crawler system 10040. In embodiments, the blockchain crawlers 10002 may each be the first component of a corresponding "data pipeline" that takes raw blockchain data (e.g., transaction data 10020A-N, token data 10022A-N, smart contract data 10024A-N, etc.) as inputs and outputs processed data in a standardized format that may be leveraged for various applications. An exemplary set of data pipelines is illustrated at FIGS. 71A-C and described in more detail below. In some embodiments, blockchain crawlers 10002 may receive data from various blockchains (e.g., a first blockchain crawler may receive ledger 1 data 10020A, 10022A, 10024A, a second blockchain crawler may receive ledger 2 data 10020B, 10022B, 10024B, etc.) and may each provide the data to corresponding data pipelines (e.g., "ingest" data) using batch and/or event-driven data processing techniques. It is appreciated in other embodiments, a single crawler 10002 may receive data from the various blockchains and may provide the data from a respective blockchain to a corresponding data pipeline. In embodiments, the blockchain crawlers 10002 may "batch" process blockchain data by first requesting, from a node device 3110, data from a first block (which may be called a "genesis" block) for a blockchain, then subsequently requesting and receiving each subsequent block until arriving at a most recent block, thus following the blockchain from the beginning to the end. The blockchain crawlers 10002 may then monitor for new blocks and ingest them as they are created. Additionally or alternatively, the blockchain crawler 10002 may monitor for specific events that may trigger processing. For example, some blockchain crawlers 10002 may ingest only a subset of transaction data that corresponds to transactions of a certain type (e.g., non-fungible token transactions, transactions involving a particular smart contract, etc.) for certain use cases. In embodiments, the blockchain crawlers 10002 may convert data into a standardized format, described in more detail below.

In embodiments, the data processors 10004 may perform several data pipeline operations in multiple stages to prepare the data ingested by the blockchain crawlers 10002 for further analysis and use by the graph generators 10006, intelligence system 10008, and/or application systems 10010. For example, raw data from the blockchain crawlers 10002 may be placed into a first bucket (e.g., a bronze bucket) in various formats, such as a comma-separated values (CSV) format, JSON format, XML format, and/or the like. In embodiments, the data processors may then validate and clean the first bucket data and store it into a second bucket (e.g., silver bucket). The second bucket data may be stored in a data file format, such as an APACHE PARQUET format. In embodiments, the data processors 10004 may then perform one or more transformations to process the second bucket data into a third bucket (e.g., gold bucket) containing a curated master table. In embodiments, the data processors 10004 may also supplement the blockchain data with other data retrieved from other data sources, such as web data retrieved from web servers 10036. For example, in some embodiments the web data may comprise social media account data that may be used to learn more about certain users for certain use cases (e.g., if the distributed ledger is able to associate a wallet to a social media account). Additionally or alternatively, the web data may be data obtained from other suitable web2.0 sources, including but not limited to news sites, web-based marketplaces, RSS feeds, company websites, and/or the like. Further details of the data sources and types of processing provided by the data processors 10004 are provided below.

In embodiments, the data pipeline processors 10004 may store any or all of the data in various stages of processing in the data lake 10012. For examples, the data lake 10012 may store the example first, second, and third (bronze, silver, gold) buckets. Additionally or alternatively, any or all of the data may be stored in cloud storage 10034. Various data consumers, such as graph generators 10006, the intelligence system 10008, and/or application systems 10010 may then access the data from the data lake 10012 and/or from cloud storage 10034. Other data consumers may include third party devices such as third-party analysis systems 10030. In general, although examples described herein may refer to data as being stored in the data lake 10012, it should be understood that the data may be stored in cloud storage 10034 and/or that the data lake 10012 may be implemented in cloud storage 10034.

In embodiments, graph generators 10006 may generate social graphs based on the transformed distributed ledger data and/or supplemental web data. In some embodiments, social graphs may be represented in graph databases that are configured in accordance with an ontology. In embodiments, the ontology may define various blockchain-related entities, such as wallets, tokens, token collections, smart contracts, token creators, and other suitable types of entities and may further define different types of relationships that may exist between one or more entities. Both the entities and the relationships between them may be tagged with various attributes that may be useful in understanding the entities themselves and the relationships between them. In embodiments, the entity data and relationship data may be stored in the graph database in relation to the entity or relationship to which the data corresponds. Exemplary social graphs and details thereof are described below with respect to FIGS. 73A-B.

In embodiments, the intelligence system 10008 may perform one or more AI-assisted techniques to generate data that may be used by various applications. In example embodiments, the intelligence system 10008 may perform clustering techniques using transaction data to cluster wallets, which may in turn be used for airdrop advertising (as described below) or other suitable applications. In some embodiments, the intelligence system 10008 may perform this clustering based on data associated with all cloud wallets of a particular distributed ledger using data stored in the data lake 10012. In embodiments, the data lake 10012 may store a record of every cloud wallet involved in a transaction (e.g., a wallet that has sent or received a transaction via the distributed ledger). In some embodiments, the intelligence system 10008 may select a subset of cloud wallets to cluster, such as all wallets with at least a threshold number of transactions, wallets that have sent or received at least a certain number, amount, and/or value of tokens, wallets that have sent or received a transaction within a recent period of time, and/or the like. Thus, various analyses and use cases may focus on wallets that meet certain criteria.

In example embodiments, the intelligence system 10008 may use various clustering algorithms to cluster the wallet data. For example, the intelligence system 10008 may retrieve data associated with each wallet from the data lake 10012 and use clustering algorithms to identify clusters of similar wallets based on their behavior as indicated by the transaction data. In embodiments, the data associated with each wallet may include tokens owned or interacted with by the wallet (e.g., fungible tokens, non-fungible tokens, etc.), the type of interaction (e.g., purchase, sale, transfer to a smart contract, receipt from a smart contract), any attributes associated with those tokens (e.g., a collection identifier for a collectible token, an event for a tokenized ticket, a PTE game for a game token, and/or any of the other token attributes described herein), and/or the like. In embodiments, the distributed ledger crawler system may, prior to clustering, process the distributed ledger data to generate one or more derived attributes for use by the clustering algorithm. For example, if the wallet previously interacted with a PTE game, the distributed ledger crawler system may generate a derived attribute indicating that the user is interested in PTE games. As another example, the distributed ledger crawler system may generate a derived attribute indicating a frequency of transactions (e.g., how often the user engages with the distributed ledger). Thus, the clustering may be based on attributes that are taken from transaction data 10020, token data 10022, smart contract data 10024, and/or other attributes that are derived therefrom.

In example embodiments, the intelligence system 10008 may be configured to cluster wallets based on sets of attributes that are selected for a particular use case. As a simple example, the intelligence system 10008 may cluster the various wallets into three clusters: a first cluster of "crypto novices" that own and trade fewer tokens and tend to stick to trading more popular tokens, a second cluster of "crypto investors" that trade relatively frequently, own or trade moderate amounts, sometimes engage with less popular tokens, etc., and a third cluster of "crypto whales" that trade large amounts, own or trade large sums, engage with a large variety of tokens, etc. In this example, the intelligence system 10008 may automatically identify these clusters based on a set of attributes indicating token ownership amounts, trading amounts, types of tokens traded, etc. In embodiments, example cluster labels such as "crypto novices," "crypto investors," or "crypto whales" may be generated manually and/or using various machine learning techniques (e.g., language models, labelling models) that take the various data attributes associated with the wallets as inputs.

FIGS. 71A-C illustrate an exemplary data flow that ingests and processes data from three exemplary blockchains and provides the data for several use cases. FIG. 71A illustrates ingestion and pre-processing into a raw data lake. In the illustrated example, data is being ingested from an Ethereum blockchain 3120A, a Wax blockchain 3120B, and a Binance Smart Chain 3120C. Data blocks from each block chain are stored and may be accessed using history nodes 3110 corresponding to each blockchain. The blocks may contain a list of transactions and transaction metadata, which may include transaction data 10020, token data 10022, smart contract data 10024, and/or any other data that may be stored on the various blockchains. The blockchain blocks 10102 may be varied formats that are specific to each blockchain.

In embodiments, a history node 3110 may store some or all of the historical blocks for each blockchain. An example history node for Ethereum is available at the URL "etherscan.io", an example history node for Wax is available at the URL "wax.bloks.io", and an example history node for Binance Smart Chain is available at the URL "bscscan.com". These history nodes allow a device to request and receive transaction data and other data from any of the blocks 10102.

The various blockchain crawlers 10002 may be configured to receive block data 10104 from the history nodes 3110. For example, each crawler may be configured to interface with an API provided by the corresponding history node for obtaining block data 10104 and/or may be configured to access a web site and scrape the block data 10104 from a web page provided by the web site. The blockchain crawlers 10002 may ingest and process data using push and/or pull techniques. In embodiments, a "pull-based" technique may include sequentially requesting historical blocks (e.g., as described in more detail below for step 10402 of FIG. 74) and a "push-based" technique may include automatically receiving blocks as they are generated (e.g., as described for step 10414 of FIG. 74).

Figure 72A:
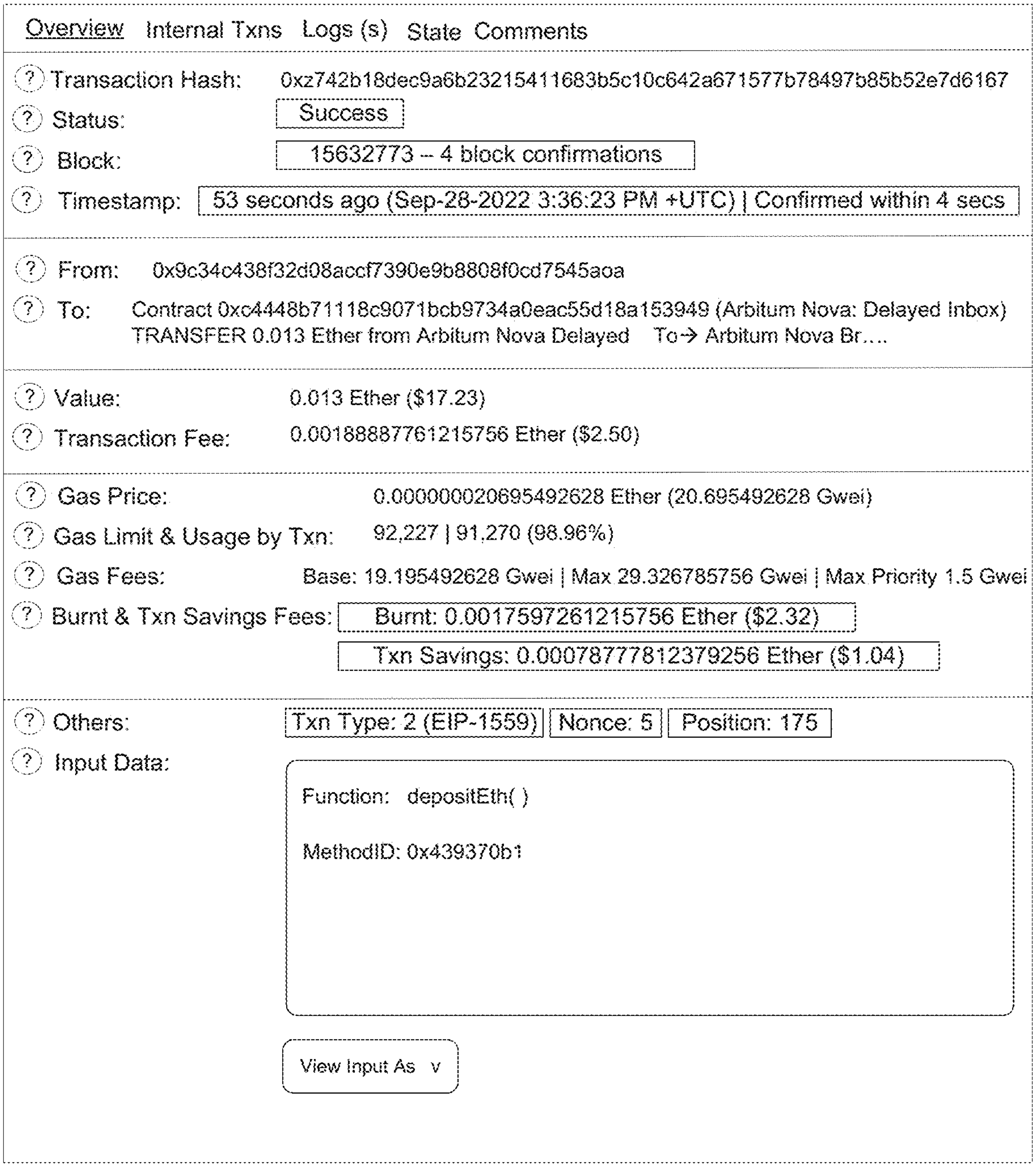
FIGS. 72A-B are schematics illustrating example transaction data that may be processed by a distributed ledger crawler system according to some embodiments of the present disclosure.
Figure 72B:
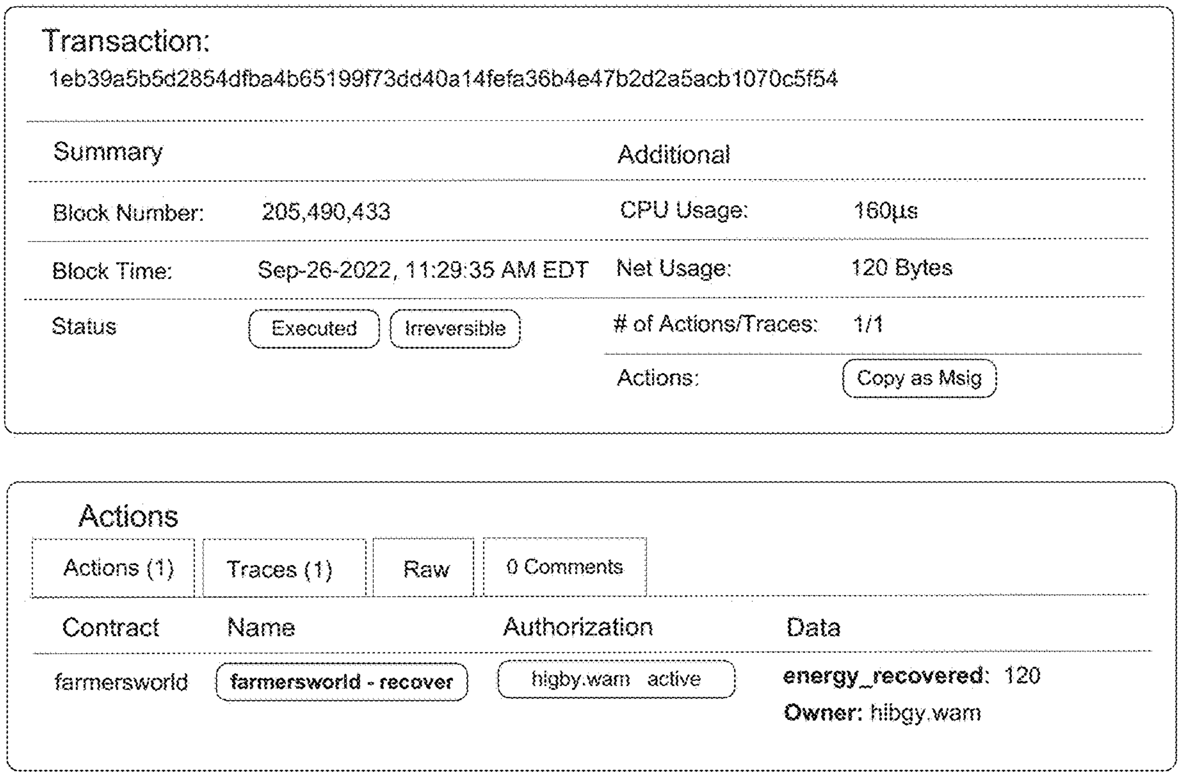

In some embodiments, each history node 3110 may maintain a local database of the block data 10104 that may be provided to the blockchain crawlers 10002 upon request. For example, each blockchain crawler 10002 may begin by requesting block data 10104 corresponding to a first block of the blockchain 3120, then continue by crawling/ingesting block data from each subsequent block in the blockchain using the history nodes. Example transaction data provided by the example history nodes is illustrated at FIGS. 72A-B. The block data may indicate, for example, a list of transactions associated with each block and block metadata. Each transaction may further include transaction data, including a type (e.g., token transfer, smart contract function call, etc.)

a specific token that was transferred, a specific smart contract function that was called, parameters of the function call, and/or the like.

FIG. 72A illustrates an example user interface 10200 provided by "etherscan.io" that shows transaction data 10020 for a single Ethereum transaction. In the illustrated example, the transaction data includes attributes such as a Transaction Hash (e.g., a hash that uniquely identifies the transaction), a Status (e.g., indicating whether the transaction was successful or not), a Block number, a Timestamp, a From wallet address, a To wallet address (in the illustrated example, the "To" wallet is a smart contract wallet), a Value of fungible tokens (Ethereum crypto currency in the illustrated example) transferred by the transaction, a Transaction Fee associated with the transaction, one or more Ethereum-specific attributes related to gas fees and other Ethereum features, Input Data specifying a smart contract function/method called by the transaction, etc. FIG. 72B illustrates an example user interface 10250 provided by "wax.bloks.io" that shows transaction data 10020 for a single Wax transaction. The transaction data includes attributes such as a hash, a Block Number, a Block Time, a Status, several Wax-specific attributes related to CPU and Net usage, an Action attribute comprising a plurality of sub-attributes including a smart contract, a function of the smart contract that was called, a wallet that authorized the smart contract function call, etc. The attributes displayed in the user interfaces 10200 and 10250 are only a subset of the transaction attributes that may be retrieved using an API provided by the corresponding history nodes and are merely shown for purposes of illustration. Comparing the two user interfaces for two different blockchains, several similarities and differences may be apparent. For example, both chains use a hash to uniquely identify the transaction, both provide a transaction status, both provide a timestamp and block number for the transaction, both provide similar data about smart contract function calls, etc. However, the attributes have different names and the values are in different formats. Moreover, several of the attributes are not directly comparable due to differences in how the blockchains work (e.g., Ethereum gas fees vs. Wax CPU/Net usage). Due to these similarities and differences, different data pipelines may be configured to ingest data from different blockchains and to standardize the data into a common format.

In embodiments, a blockchain crawlers 10002 may ingest and standardize block data 10104 from a respective blockchain to generate standardized block data 10106 for the respective blockchain. The standardized block data may use a unified schema, format, and/or naming conventions. For example, each Ethereum block may have an attribute called "timestamp" that specifies the time at which the block was created in a first format, whereas each Wax block may have an attribute called "block_time" that specifies the time at which the block was created in a second time format. To generate standardized block data 10106, a first blockchain crawler (e.g., the Ethereum crawler 10002A) may convert the attribute from the first format into a standardized format (e.g., a value called "time" containing a timestamp in a third format), and a second blockchain crawler (e.g., the Wax crawler 10002B) may convert the attribute from the second format into the standardized format. As another example, each Ethereum transaction may be associated with a hash value stored in an attribute named "messageDataHash", whereas each Wax transaction may be associated with a hash value in an attribute named "id". The corresponding crawlers may extract the corresponding hashes and store the hashes in a standardized attribute (e.g., an attributed named "hash"). Thus, the generation of standardized block data may involve renaming a plurality of attributes associated with blocks, transactions, tokens, smart contracts, etc. and/or converting a plurality of attribute data from one format into another. In other words, the blockchain crawlers may convert the blockchain-specific block data 10104 into standardized block data 10106 that follows a standard schema.

In embodiments, the standardized block data may be preprocessed using data processors 10004 before storing the data into corresponding raw data lakes. In the illustrated example, the raw data is stored in JSON format. In example embodiments, a first data processor 10004A preprocesses standardized block data 10106A for the first blockchain (e.g., standardized Ethereum transaction data), a second data processor 10004B preprocesses the standardized block data 10106B for the second blockchain (e.g., standardized Wax transaction data), and a third data processor 10004A preprocesses the standardized block data 10106C for the third blockchain (e.g., standardized Binance Smart Chain transaction data), and so on and so forth. For example, the preprocessor may convert the data into a JSON format before storing the data into the corresponding data lake 10012A-C. It is appreciated that in the illustrated example, each respective blockchain has a respective data processor 10004. It is appreciated that in some embodiments a single data processor 10004 may be configured to perform the data processing operations for some or all of the blockchains.

In embodiments, the data processors 10004 may perform additional preprocessing for near-real-time applications. For example, the entire data pipeline illustrated at FIGS. 71A-C may take a certain amount of time that may be unacceptably long for some use cases that are time dependent. In embodiments, if the data pipeline is configured to detect certain events and send notifications alerting users of the events, users may wish to receive the notifications as soon as possible. In these embodiments, the data processors 10004 may be configured to recognize the events and route around the pipeline by sending a message to a notifications system that may provide a notification of the event. In some embodiments, the tokenization platform 100 may provide a service that detects any transaction originating at a defined user wallet, and a user may subscribe to receive a notification that a transaction from their wallet was completed. In these embodiments, the transaction originating from the defined user wallet may be detected by the data processor 10004 during preprocessing, and the data processor 10004 may alert a notification system during preprocessing so that a notification may be provided to the subscribed user as soon as possible. It is appreciated that the data processors 10004 may perform additional or alternative preprocessing operations without departing from the scope of the disclosure.

Turning to FIG. 71B, the pipeline may continue with the data processors 10004 performing a data cleaning process on the raw data and then storing the cleaned data in the corresponding data lakes 10012. For example, a first data processor 10004A may clean raw Ethereum data in the Ethereum data lake 10012A and store the cleaned Ethereum data in the Ethereum data lake 10012A, a second data processor 10004B may clean raw Wax data in the Wax data lake 10012B and store the cleaned Wax data in the Wax data lake 10012B, a third data processor 10004C may clean raw Binance Smart Chain data in the Binance data lake 10012C and store the cleaned Binance Smart Chain data in the Binance data lake 10012C, and so on and so forth. The data cleaning may involve data validation, error correction, deduplication, and/or reformatting into a structured format (e.g., an Apache Parquet format in the illustrated example). The resulting data may be fully anonymized web3.0 data stored in a queryable format. For example, wallet data may be stored in the data lake along with associated data, such as tokens owned, etc. Some use cases may involve querying this web 3.0 data without further processing.

In some embodiments, the data processors 10004 may post process the web3.0 data to supplement it with web2.0 data. The web2.0 data sources may any suitable data that may be obtained from web-based resources, such as social media data (e.g., TWITTER data, FACEBOOK data, INSTAGRAM data, REDDIT data), as well as data from a variety of other sources such as news articles, websites, RSS feeds, web2.0 marketplaces, and/or the like. In some embodiments, the web 2.0 data may include non-anonymized or semi-anonymous (e.g., pseudonymous) data. For example, the data may be associated with various user accounts set up at different websites, such as the illustrated TWITTER, FACEBOOK, INSTAGRAM, and/or REDDIT websites, and/or other user account data at other sites. The post processing by the data processors 10004 may involve crawling such web 2.0 data (e.g., using conventional techniques such as web crawlers, APIs, etc.) and matching it to a particular user wallet data or other entities stored as structured data within the data lake 10012.

The data processors 10004 may map user wallets to social media accounts using various strategies. In some embodiments, the distributed ledger crawler system 10040 may be configured to detect social media posts that identify a blockchain wallet as belonging to an entity (e.g., the wallet of an owner of a particular token or a collection of tokens). For example, a user may post a request to send tokens to a blockchain address, may post a link or identifier of an NFT that exists in the user's wallet, may use an Ethereum Name Service (ENS) domain as their social media account name, and/or the like. For example, if a user post includes a link to the NFT and an indication that the user owns the NFT, the distributed ledger crawler system 10040 may access the token data 10022 for the NFT, obtain a wallet address associated with the NFT from the token data 10022, and associate the wallet address to the social media account.

In embodiments, the data processors 10004 may use a similar process based on web2.0 data to match different distributed ledger wallet addresses to each other. For example, a user may control several wallets on a single chain and/or a variety of wallets on different chains (e.g., one or more Ethereum wallets, one or more Wax wallets, etc.). The data processors 10004 may use social media or other data to detect that the wallets are owned by a single user (e.g., a social media post listing the user's various wallets, the user's NFTs stored in different wallets, etc.) and may then store data in the data lake 10012 that associates the various wallets with a common user.

In embodiments, the distributed ledger crawler system 10040 may match certain wallet accounts to businesses, websites, and/or other information sources. For example, a wallet associated with a PTE game smart contract deployed to a blockchain may be mapped to a website for the PTE game, a wallet related to an exchange may be mapped to the website for the exchange, and/or the like. Additionally or alternatively, tokens may be matched to off-chain sources of information about the tokens (e.g., news articles about the tokens or token collections, etc.).

When off-chain data is matched to wallet accounts, it may be stored in the data lake 10012. For example, if a wallet account is matched to a social media account, a link to the social media account and/or data associated with the social media account (e.g., username, profile picture, social media posts, etc.) may be stored in the data lake 10012 to enrich the anonymized web3.0 data. In some embodiments, the distributed ledger crawler system may intentionally avoid storing potential PII by avoiding obtaining data from accounts that use or may use real names or other identifying information. Additionally or alternatively, the distributed ledger crawler system may store potential PII in a separate area of the data lake so that various applications may leverage the anonymized data while avoiding accidentally obtaining PII, while other applications (e.g., applications that have legal frameworks set up to comply with data privacy laws) may take advantage of the supplemental web2.0 data that may include PII. In this way, the infused web3.0 may be exposed to sufficiently credentialed applications, such that privacy of users is maintained.

In embodiments, a graph generator 10006 may use the anonymized web3.0 data and/or the supplemental web2.0 data to generate one or more labelled graph data structures 10108. The graph data structures 10108 may comprise a plurality of nodes and edges representing connections between nodes. In embodiments, multiple graphs may be generated for different purposes. For example, the graph generator 10006 may generate a first graph of fungible token transactions and a second graph of non-fungible token transactions. Additionally or alternatively, a single graph may include edge data for various types of transactions. In embodiments, graphs may be single-chain graphs (e.g., a first Ethereum graph, a second Wax graph, a third Binance graph, etc.) and/or may include data from multiple chains (e.g., cross-chain graphs). In embodiments, cross-chain graphs may be particularly useful when blockchain bridging technologies (as described elsewhere herein) allow for tokens to be transferred between chains, when web2.0 sources allow for wallets on different chains to be associated with each other, and/or when other data sources that indicate cross-chain relationships or transactions are available.

Figure 73A:
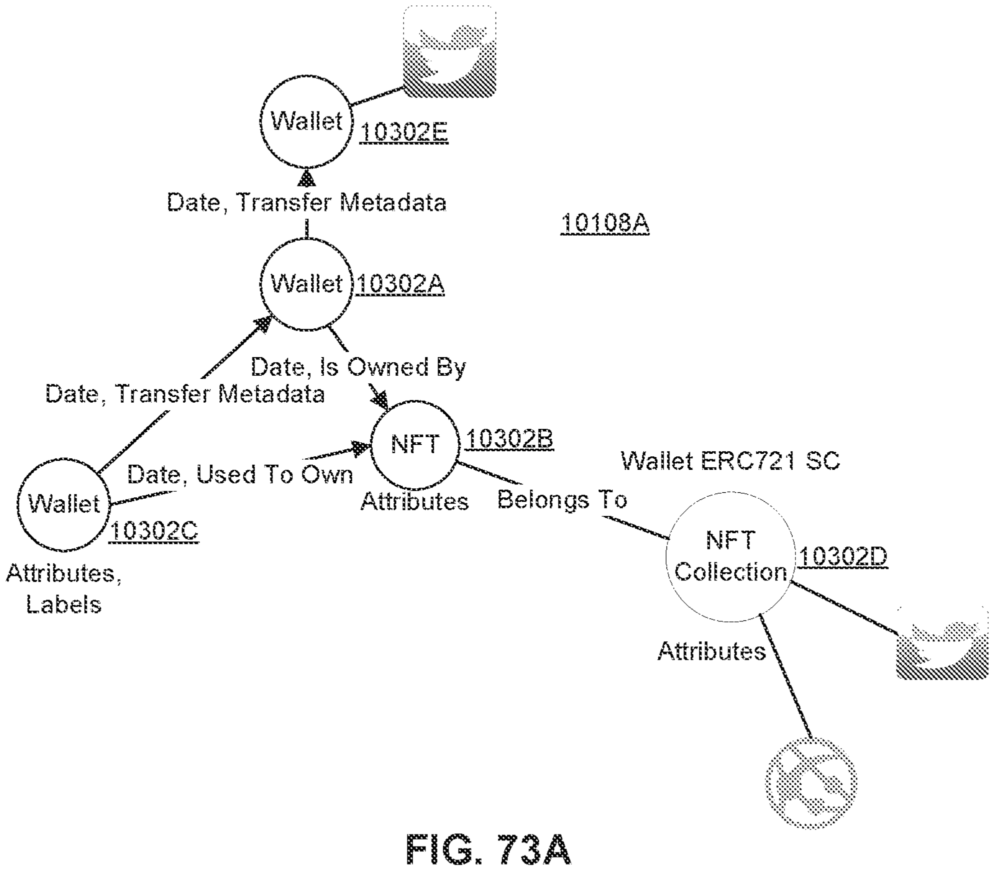
FIGS. 73A-B are schematics illustrating example graph data structures that may be generated by a distributed ledger crawler system according to some embodiments of the present disclosure.
Figure 73B:
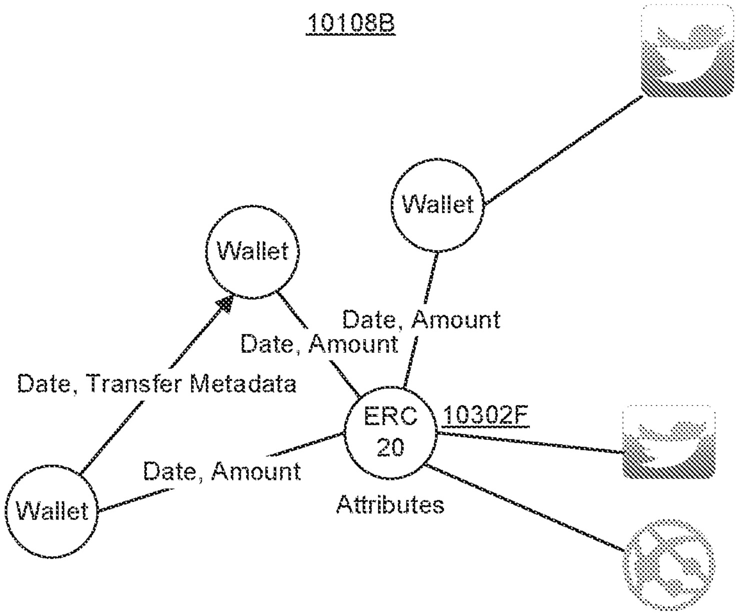

Two example graphs 10108 are shown at FIGS. 73A-B. It is appreciated that according to some embodiments of the present disclosure, a graph 10108 may be defined in accordance with an ontology and may be structured in a graph database. The ontology may define the types of entities that are expressed in the graph and different types of relationships that may exist in a graph. Furthermore, in some embodiments, relationships may be defined as the edges of the graph, such that the edges may be directed, bi-directional, or undirected. For example, an edge from a NFT entity node to a wallet entity node indicates that NFTs are owned by wallets. Similarly, an edge from a wallet entity node to an NFT entity node may indicate that wallets own NFTs. The foregoing relationships may alternatively be expressed by a bi-directional edge. In embodiments, each type of entity and relationship may have a corresponding set of attributes and/or metadata, examples of which are provided throughout the disclosure. The attributes may be used to identify and define instances of the entity or relationship. Examples of entity attributes are described elsewhere (e.g., NFT attributes, token attributes, wallet attributes, smart contract attributes, and/or the like). Examples of relationship attributes may depend on the type of relationship and may include time stamps to indicate when a relationship was created/revoked, flags to indicate (e.g., whether the relationship is still valid), and/or other suitable types of attributes or metadata.

Turning to FIG. 73A, a first example social graph 10108A for non-fungible tokens showing a plurality of nodes and edges is illustrated. The nodes 10302 may represent different entities, including various wallets, NFTs, and NFT collections, social media accounts (e.g., TWITTER accounts), and web sites. The edges may represent various types of relationships between the nodes, and the edges may be directional (e.g., as illustrated by arrows between nodes showing transfers from one to another) or non-directional (e.g., as illustrated by arrowless connecting lines). The example social graph 10108A illustrates some of the techniques that may be used by social graphs 10108, although it should be understood that practical social graphs may be much larger, with a large number of nodes, including nodes of different types (e.g., social media nodes corresponding to other social media services). In embodiments, the nodes may be connected by multiple edges, such as when two nodes have interacted with each other multiple times in a particular manner (e.g., the same wallet transferred to another wallet the same type of fungible token multiple times), although multiple edges between nodes are not illustrated in FIG. 73A.

As shown in the example social graph 10108A, the nodes and edges may each have different types. For example, a first node 10302A may correspond to a particular wallet and may be related to a second node 10302B that corresponds to a particular NFT and/or NFT template. Specifically, the node 10302B may correspond to a single NFT or multiple NFTs (e.g., NFTs minted using the same template), depending on implementation. For example, implementations in which each individual NFT corresponds to a different node may allow for more fine-grained analysis but may require more memory/storage and processing time for various use cases (e.g., clustering, machine learning). By contrast, implementations in which a node indicates a particular type or template of NFT may require less memory/storage and be faster to process for many use case. In either case, the node 10302B may be associated with attributes that may include any NFT attribute or NFT template attribute described herein. In embodiments in which the node 10302B corresponds to a single NFT, the unidirectional relationship between the wallet node 10302A with an "Is Owned By" value may indicate that the wallet corresponding to the node 10302A currently owns the NFT corresponding to the node 10302B. In embodiments in which the node 10302B corresponds to a type/template of NFT, the relationship between the nodes 10302A and 10302B may indicate that the wallet owns at least one NFT matching the corresponding type/template. In these examples, the "date" attribute may indicate a date/time at which the wallet acquired the NFT. The "date" attribute as described herein should be understood to indicate a date and/or a time (e.g., the date value may be a timestamp in any suitable format).

Other example relationship types are shown in the example social graph 10108A. For example, a wallet node 10302C is related to the NFT node 10302 with a "Used to Own" type relationship, indicating that the respective wallet formerly owned the respective NFT or type/template of NFT. In this case, the "date" attribute may indicate the timestamp at which the NFT was transferred. In embodiments, the "date" attribute may include multiple values indicating, for example, a first timestamp at which the respective wallet acquired the respective NFT and a second timestamp at which the respective wallet transferred away the respective NFT.

Another example relationship type is a transfer, as shown from the wallet node 10302C to the wallet node 10302A. The transfer relationship may include a "date" attribute containing a timestamp for the transfer and transfer metadata indicating the token transferred (e.g., a token corresponding to the node 10302B), one or more fungible tokens exchange in the transfer, and/or any other transfer attributes (e.g., gas fees, smart contracts used to accomplish the transfer, etc.).

Another example relationship type shows that a particular token indicated by a first node "Belongs To" an NFT collection, as shown by the relationship between the NFT node 10302B and the NFT collection node 10302D. In this example, the NFT collection may itself correspond to a wallet (e.g., a wallet including a smart contract wrapper for the NFTs according to the ERC721 standard). The NFT collection node 10302D may be associated with attributes specifying data about the collection (e.g., an owner of the collection, a type of the collection, etc.) and/or NFTs within the collection, such as one or more templates and/or schemas used by the collection as described elsewhere herein and/or any attributes associated with the templates and/or schemas. Additionally, some nodes may be related to other nodes corresponding to web sites, social media accounts, etc. For example, the NFT collection node 10302D may be related a social media account node for a corresponding official TWITTER account for the NFT collection and to a website node for a corresponding official website for the NFT collection. Each of these nodes may in turn be associated with one or more attributes, such as web links and the like. Similarly, wallet nodes such as wallet nodes 10302E may be related to social media account nodes, such as a social media account node corresponding to a TWITTER account that is associated with the wallet (e.g., the wallet owner's account).

Turning to FIG. 73B, a second example social graph 10108B for fungible tokens is illustrated. The example social graph 10108B may contain a plurality of wallet nodes (which may be the same or different wallets indicated by the wallet nodes of the non-fungible token social graph 10108A of FIG. 73A), one or more social media account and/or website nodes, and one or more fungible token nodes 10302F corresponding to a particular type of fungible token (e.g., a cryptocurrency token). Various wallets may be related to the fungible token node 10302F, where each relationship indicates that the corresponding wallet owns at least some of the indicated fungible token. For example, each relationship may indicate a "date" value specifying when the fungible token(s) were acquired and how many of the fungible tokens were acquired. In embodiments, multiple relationships between any given wallet and a fungible token node 10302F may indicate when different amounts of tokens were acquired and/or transferred away. For example, a first relationship between a wallet node and the fungible token 10302F may indicate that 100 of the fungible tokens were acquired at a first time, a second relationship between the same wallet node and the fungible token node 10302F may indicate that 20 of the fungible tokens were transferred away at a second time, and a third relationship between the same wallet node and fungible token node 10302F may indicate that another 60 of the tokens were transferred away at a third time. In embodiments, the relationship metadata may indicate a positive amount value when a wallet acquires fungible tokens and a negative amount value when a wallet transfers or spends the fungible tokens. Thus, by analyzing the three relationships in the above example, the distributed ledger crawler system 10040 may be able to determine that 20 of the fungible tokens are still owned by the example wallet.

Similar to the non-fungible token node, the fungible token node 10302F may be related to social media account nodes and/or website nodes for corresponding off-chain accounts/data sources about the corresponding fungible tokens. For example, the nodes may represent an official social media account and/or website for a cryptocurrency that corresponds to the fungible token node 10302F.

In embodiments, the social media graph 10108B may include nodes for entities on a single blockchain or may include entities for multiple blockchains (e.g., a cross-chain graph). The cross-chain graph may include cross-chain entity relationships that are provided by bridging infrastructure, common ownership of wallets, social media accounts that correspond to wallets on multiple chains, cross-chain token transfers, and/or the like. For example, bridging infrastructure may allow and Ethereum wallet to transfer tokens to a Wax wallet via a cross-chain bridge, and such a transfer may be represented by a relationship between the Ethereum wallet and the Wax wallet. As another example, a social media node may be related to a first Wax wallet that is associated with the social media account and a second Ethereum wallet that is associated with the same social media account. Thus, social media account node may, in some cases (e.g., when the distributed ledger crawler system detects that an association between the social media account and a plurality of wallets) provide a cross-chain link.

FIG. 71C illustrates a third stage of the data processing pipeline that uses an intelligence system 10008 to process the social graphs 10108 using various AI-assisted and/or other techniques, including clustering 10008A, machine learning 10008B, token analytics 10008C, a rules engine 10008D, and/or the like. In embodiments, the intelligence system 10008 may perform clustering 10008A on the social graph as described for the method 10500 of FIG. 75. In embodiments, the intelligence system 10008 may cluster the wallets using one or more of the social graphs 10108A-C. For example, if a first social graph 10108A includes a graph of Ethereum wallets, the intelligence system 10008 may perform clustering 10008A to identify clusters of Ethereum wallets that are similar to each other based on the various attributes associated with each wallet.

The intelligence system 10008 may target various clustering objectives based on the desired applications. In embodiments, the intelligence system 10008 may cluster nodes corresponding to wallets to find wallets that interact with the distributed ledger in similar ways. In embodiments, the clustering system 10008A may receive clustering parameters from user devices 10032 and may use the clustering parameters to find clusters based on certain attributes. For example, a user (e.g., an advertiser) may be targeting users of tokenized tickets, and therefore may supply clustering parameters that cause the clustering system 10008A to generate different clusters of tokenized ticket purchasers. In this example, a first cluster of wallets may include wallets that frequently purchase ticketized tokens of a first type (e.g., baseball tickets), a second cluster of wallets may include wallets that frequently purchase ticketized tokens of a second type (e.g., football tickets), and so on for different types of tokenized tickets (e.g., music events of different types, other types of events, etc.). It is appreciated that in the example above the foregoing clusters may be further mined for additional insights, such as a cluster of tokenized music events may be clustered into various types of music fans or a cluster of tokenized baseball tickets may be clustered to identify fans of different teams. In this example, insights may be derived across clusters, for example by cross referencing certain music event tickets and sporting event tickets, location insights may be further derived. Additional details regarding clustering methods are provided below with respect to FIG. 75.

The intelligence system 10008 may use machine learning 10008B for various applications. In embodiments, the intelligence system 10008 may use machine learning techniques to automatically label and/or otherwise characterize the clusters generated by the clustering 10008A. In embodiments, the intelligence system may use machine learning 10008B to derive attributes for the various nodes and/or edges of the social graphs that may be used by other techniques and/or systems as described herein. For example, the intelligence system 10008 may generate various labels and/or predictions about nodes corresponding to wallets (e.g., predicted demographic data based on transaction behavior, predicted income level based on owned values of tokens, predicted location based on interactions with certain wallets that are popular in certain areas, such as PTE smart contract games that are played primarily in a certain country or region, and/or the like) and store the labels and/or predictions as attributes of the wallets, such that the attributes may be used during clustering 10008A.

The intelligence system 10008 may include a token analytics system 10008C for various token analytics use cases, many of which are described elsewhere herein. For example, token analytics may include collection and/or analysis of data such as consumer data, item data, merchant, manufacturer, or provider data, user behavior (e.g., purchase behavior, telemetric, and the like), and/or transaction events in conjunction with the analysis provided by the token analytics and reporting system 112, described elsewhere herein. In embodiments, the token analytics 10008C may supply data to the token analytics and reporting system 112 that the token analytics and reporting system 112 may use as described elsewhere herein (e.g., to analyze various interactions with tokens and/or smart contracts, redemptions, point of sales systems, marketplaces, and/or the like). For example, upon detecting certain events (e.g., certain types of transactions), related data may be supplied to the token analytics and reporting system 112. Additionally or alternatively, the token analytics 10008C may include preprocessing of data for ingestion into the token analytics and reporting system 112.

In embodiments, the intelligence system 10008 may use a rules engine 10008D to execute various sets of rules for purposes such as governance, compliance, or other such exemplary use cases as described elsewhere herein.

The data generated by the intelligence system 10008 may be used by various applications 10010, some of which are illustrated at FIG. 71C. The applications may include airdrop advertising 10010A, notifications 10010B, a social feed 10010C, recommendations 10010D, group chats 10010E, social communities 10010F, and/or other applications that may leverage the data stored in the data lake 10012 (including databases and/or social graphs) and/or the data generated by the intelligence system 10008.

Airdrop advertising 10010A is described in detail elsewhere herein and may be implemented by the distributed ledger crawler system 10040 and/or by the advertising system 508.

In embodiments, the distributed ledger crawler system 10040 may implement a notifications application 10010B based on data events detected from ingested blockchain data. In embodiments, users may subscribe (e.g., via a user device 10032, which may access an interface provided by the notifications application 10010B) to receive user notifications (e.g., text messages, phone alerts, email messages, and/or the like) whenever certain blockchain events are detected. For example, users may subscribe to receive notifications whenever a transaction originating from a specified user wallet is detected. In embodiments, users may subscribe to receive notifications based on the outputs of the intelligence system 10008. For example, users may subscribe to receive notifications when a new token collection is trending (e.g., the token collection's popularity, as measured by a frequency of transactions involving tokens that match the token collection, increases above a certain level), as detected by the token analytics 008C. Additionally or alternatively, users may subscribe to receive notifications when new clusters of users are detected via clustering 10008A, when new users are added to selected clusters (e.g., when a new "crypto whale" wallet is identified), and/or when other changes to the outputs of clustering 10008A are detected. Additionally or alternatively, users may subscribe to receive notifications when changes to the outputs of machine learning 10008B and/or a rules engine 10008D are detected.

In embodiments, the distributed ledger crawler system 10040 may implement a social feed 10010C that automatically provides information to a user about one or more user friends and/or similar users. In embodiments, the social feed 10010C may provide data to users via a cloud wallet user interface. For example, a cloud wallet may be configured to, upon login by a user, receive (e.g., using push or pull methods) a social feed of data from the distributed ledger crawler system 10040 and display the social feed data in a dedicated area of the cloud wallet user interface. Additionally or alternatively, a social feed service may be provided by a smart contract deployed to a distributed ledger, such that a user may cause a distributed ledger transaction that calls a smart contract function configured to provide a social feed, the smart contract may then obtain social feed data for the corresponding user wallet (e.g., by interfacing with an oracle configured to retrieve social feed data for the user wallet), and a corresponding user device 10032 may retrieve the social feed data and display it.

In embodiments, the social feed 10010C may include indications of one or more user wallets who are similar to the user receiving the social feed (e.g., wallets that appear in the same clusters as the social feed user's wallet), indications of popular tokens (e.g., trending tokens) or other trending events related to a blockchain, indications of certain notable blockchain transfers (e.g., recent high-value blockchain transactions), and/or the like. In embodiments, the social feed 10010C may include advertising opportunities that token sellers, smart contract providers, or other entities may purchase.

In embodiments, the distributed ledger crawler system 10040 may implement a recommendations application 10010D that may provide recommendations for taking actions in relation to a distributed ledger, such as token purchases, token sales, token lending, smart contract interactions, and/or the like. In embodiments, the recommendations may be based on past wallet behavior and/or predictions generated by machine learning 10008B for a particular wallet. For example, if a user wallet owns a plurality of tokens of a specific types, and in the past has tended to sell some of the tokens when the tokens are sellable for above a certain price, then the machine learning 10008B may determine, based on the past history of transactions for the wallet and based on a current market price for the tokens, a prediction that a user is likely to sell one or more tokens at the current market price (e.g., the machine learning prediction may have a confidence level above a certain level), then the recommendations system 10010D may send a recommendation to the wallet (e.g., the system may send a recommendation to a cloud wallet user interface for display and/or may generate and send a social media message to a social media account that is known to be associated with the wallet, etc.).

In embodiments, the distributed ledger crawler system 10040 may support a group chats application 10010E that may automatically create chat communities associated with certain detected clusters of user wallets, blockchain events, trending token collections, and/or the like. In embodiments, the group chats application 10010E may set up group chat services (e.g., servers that use a DISCORD chat service) on off-chain devices, such as web servers 10036. In embodiments, when certain new clusters of users are detected by the clustering 10008A (e.g., a newly detected cluster that includes at least a threshold number of users, such as ten), then the group chats application 10010E may set up a chat service for the users and automatically invite the user wallets to the service (e.g., the application may send an invite to a cloud wallet user interface of each user for display and/or may generate and send a social media message to the corresponding social media accounts that are known to be associated with the wallets, etc.). Additionally or alternatively, the group chats application 10010E may automatically set up communities for discussing blockchain events (e.g., new token sales, new token collections, trending tokens or token collections, certain high-value events such as high-value token sales, etc.) and provide open access to the communities. In embodiments, new or existing group chats may be advertised in a social feed provided by the social feed application 10010C, may be recommended to users as described above by the recommendations system 10010D based on user interests as revealed by past transactions on the blockchain, and/or the like. In embodiments, a social communities application 10010F may implement other social communities, such as virtual reality/metaverse communities, forums, image and/or video-sharing communities, and/or the like. The social communities application 10010F may automatically set up social communities for the same or similar reasons as for setting up group chats using the group chats application 10010E.

In embodiments, the distributed ledger crawler system 10040 may implement a data browser 10010G for interacting with, browsing, and/or visualizing the various data stored in the data lake 10012A, including the social graphs 10108, the databases including raw data or clean data, and/or the data outputted by the intelligence system 10008, including the clustering data output by the clustering 10008A, the outputs of machine learning 10008B, the outputs of token analytics 10008C, the outputs of rules engine 10008D, and/or the like. Users may browse the various data by using a user device 10032 to connect to and communicate with the tokenization platform 100. For example, a user may view a particular wallet on a social graph, view the edges connecting the wallet node to other nodes, interact with the social graph to view the attributes of any of the nodes and/or edges, navigate through the social graph by selecting other nodes, view the transactions associated with nodes, view any labels associated with the nodes (e.g., clusters, cluster labels, and/or predictions about a wallet node generated by the clustering 10008A, machine learning 10008B, etc.), and/or the like. In embodiments, users may submit queries to the blockchain data pipeline system that specify certain criteria, and the blockchain data pipeline system may retrieve the corresponding data and provide it to the user. For example, a user may request to see a list of all wallets that own or have owned a certain type of token within the last 30 days, a list of all tokens that have been sold for more than a certain amount, a list of token collections that have increased in popularity in the last week, and/or the like. The user requests may specify one or more of type(s) of entity (e.g., fungible tokens, non-fungible tokens, smart contracts, exchanges, wallets, collections, types of tokens), time periods, numbers or frequencies of transactions, various transaction attributes such as purchase amounts, and/or other such criteria for finding any of the entities stored in the data lakes 10012 based on any attribute or other criteria associated with the entities.

In embodiments, the data browser 10010G may allow marketers or other users to use user devices 10032 to browse data about clusters of wallets, individual wallets, view links between wallets, view links between tokens and wallets, view activity for a given collection, and/or the like. For example, a marketer using an analytics user device 10032 may request a user interface showing all users that engaged with a particular collection, type of collection (e.g., trading card collection, fighting game collection), type of token (e.g., cryptocurrency, non-fungible token, etc.), exchange, smart contract, type of smart contract (e.g., PTE game smart contract, redemption smart contract, etc.), and/or the like. Thus, for example, a marketer that wishes to look up all wallets that bought a token for a PTE game may do so. In this example, the data browser 10010G may include a query interface that allows a user to input queries that are then processed by the data browser 10010G and used to query one or more graphs and/or to initiate one or more analytics processes to derive certain insights.

In embodiments, a user device 10032 may use the data browser 10010G to view a user interface showing all users that currently own a token having a specific attribute. For example, a potential buyer that wishes to look up all wallets that currently hold a tokenized ticket for a particular event may do so. In embodiments, the user interfaces provided by the data browser 10010G may include links that allow user devices 10032 to select additional information and retrieve it from the data lake 10012 and/or from node devices 3110. For example, the potential buyer may be viewing a user interface showing all wallets with tokenized tickets to a specified event. The potential buyer may then click on links that cause the data browser 10010G to retrieve more data about the tokenized tickets from the data lake 10012 and/or from the node devices 3110. The data browser 10010G may retrieve the data (e.g., from the data lake 10012 if it is stored therein and/or from a node device 3110 in order to retrieve a most current data value) and generate a display including, for example, attributes of the tokenized ticket. In this way, a user may use the user interface provided by the data browser 10010G to browse the various tokenized tickets and their attributes. Additionally or alternatively, the data browser 10010G may obtain information from other components of the tokenization platform 100 to provide a richer visual interface. For example, the data browser 10010G may determine whether a particular token is currently listed for sale or rent using data from a marketplace system 102, display links to the data and/or marketplace listings, and/or the like.

In embodiments, a user device 10032 may use the data browser 10010G to view a user interface showing all transactions involving a wallet address. For example, a marketer associated with an exchange may wish to view a list of all wallets that have transacted with the exchange address. In this example, the marketer may select the wallet address to retrieve the list of associated addresses. The data browser 10010G may sort the list by various criteria, such as a number of transactions, a frequency of transactions, most recent transactions, or any other criteria as requested by the user device 10032. The data browser 10010G may allow the user device 10032 to re-sort the list by different criteria in order to provide various views.

In embodiments, a user device 10032 may use the data browser 10010G to view a user interface showing various clusters of wallets that have been identified. The data browser 10010G may provide such a user interface and allow the device 10032 to select various clusters to view information about each of the wallets included in the cluster. The visualizer may display the wallets in a list or other format and may sort the wallets by various criteria, such as by amount or value of tokens currently owned by the wallet, transaction frequency, types of tokens owned, or any other information associated with each wallet. Moreover, the data browser 10010G may display an interface wherein each wallet is selectable by the user device 10032 to view the tokens currently or previously owned by the wallet, a transaction log of transactions sent or received by the wallet, a list of smart contracts with which the wallet interacted, and/or any other information.

Figure 74:
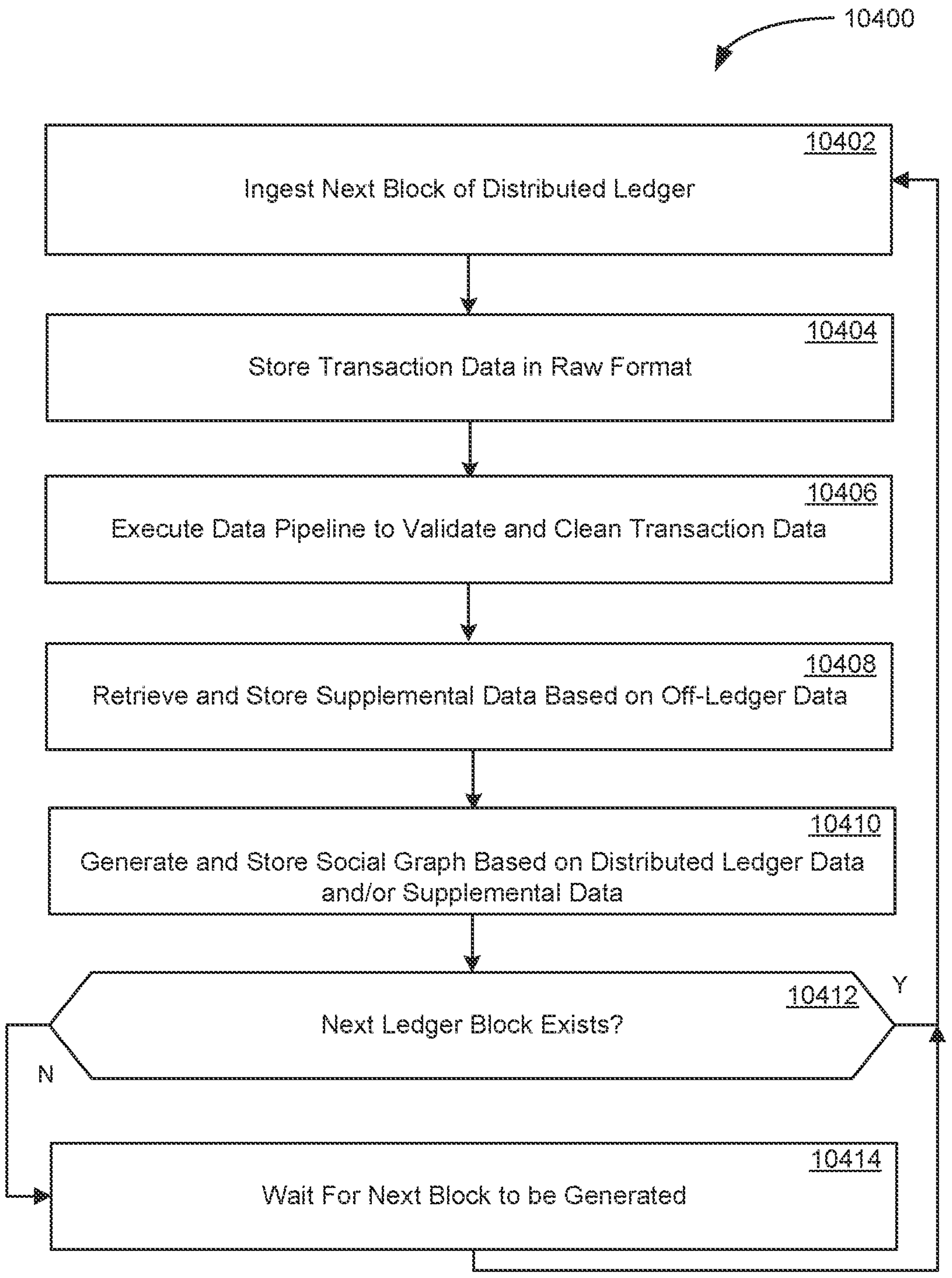
FIG. 74 is a flow chart illustrating an example set of operations of a method for ingesting and processing distributed ledger data by a distributed ledger crawler system according to some embodiments of the present disclosure.

FIG. 74 illustrates an example method 10400 for ingesting and processing distributed ledger data as described herein. The method 10400 may be executed by various sub-systems of the distributed ledger crawler system 10040, which may implement different steps of the method. At 10402, the distributed ledger crawler system 10040 (e.g., using a blockchain crawler 10002) may ingest a block of the distributed ledger. Each block may contain one or more transactions that transfer data or tokens between wallet addresses. In embodiments, such transaction data 10020 may include references to token data 10022 (e.g., when a transaction transfers a token) and/or smart contract data 10024 (e.g., when a transaction invokes a smart contract functions).

Upon beginning the method, the distributed ledger crawler system 10040 may start by requesting a first block (e.g., a "genesis" block) of a blockchain or other block-based distributed ledger from a node 3110. In embodiments, certain node devices 3110 may store past data blocks (e.g., a "history node"). Upon subsequent iterations through the looping method 10400, the blockchain crawler 10002 may request a block that is subsequent to the most recently processed block. The blockchain crawler 10002 may operate using "push" and/or "pull" methods. In pull methods, the blockchain crawler 10002 explicitly requests the desired block from the history node, then receives the requested block from the history node and proceeds with the method. In push methods, a history node or other source may send block data to the blockchain crawler 10002 for processing without having received a request. For example, a blockchain crawler 10002 may subscribe to a server that pushes new blocks to the blockchain crawler 10002 when they become available. Additionally or alternatively, a blockchain crawler 10002 may only be interested in receiving blocks or transactions within blocks that meet certain criteria (e.g., blocks/transactions of certain types), and may subscribe to a feed provided by the history node that pushes block data that matches the criteria to the blockchain crawler 10002.

At 10404, the blockchain crawler 10002 may extract transaction data 10020 for one or more transactions from the data block and store the transaction data in a raw format (e.g., CSV, XML, JSON, etc.). Additionally or alternatively, the blockchain crawler may retrieve token data 10022 and/or smart contract data 10024 when corresponding tokens and/or smart contracts are referred to in transaction data 10020. Each transaction of the transaction data 10020 may specify, for example, a source address, a destination address, and other transaction metadata. The addresses may be user wallets, wallets associated with smart contracts, wallets associated with exchanges, and/or the like. The transaction metadata may include attributes specifying a number or amount of fungible tokens that were transferred from the source to the destination, specific non-fungible token(s) identifiers for non-fungible tokens that were transferred from the source to the destination, one or more smart contract functions that were called and/or arguments provided to the function call, smart contract data (e.g., code and/or data values) that was stored at a specific address, and/or the like.

At 10406, a data pipeline may be selected and executed to validate and clean the transaction data stored at 10404. The distributed ledger crawler system 10040 may select a data pipeline based on the block that was ingested at 10402 and/or based on the transaction data that was stored at 10404. A data pipeline may be executed by a corresponding data processor 10004. For example, a first data processor 10004 may be configured to process transaction data from a first distributed ledger using a first data pipeline, a second data processor 10004 may be configured to process transaction data from a second distributed ledger using a second data pipeline, and/or the like. Additionally or alternatively, data processors 10004 may be configured to execute different pipelines for different types of data. For example, a transfer of fungible tokens on a particular chain may be processed by a first data pipeline, a transfer of non-fungible tokens on the same by a second data pipeline, a transaction that calls a smart contract function on the same chain by a third data pipeline, a transaction that stores smart contract data on the same chain (e.g., configuration data and/or executable code) by a fourth data pipeline, and/or the like. Additionally or alternatively, data pipelines may be specific to types of wallets, types of tokens, types of smart contracts, etc. For example, one data pipeline may be configured to process data involving a transfer of tokens to or from an exchange, another data pipeline may be configured to process a redemption smart contract function call, another data pipeline may be configured to process a transfer of a specific type of non-fungible token to smart contract, whereas a different data pipeline may be configured to process a transfer of a specific type of non-fungible token to a user wallet address, and/or the like. The data pipelines may be separated in order to allow for data to normalized, transformed, or otherwise processed into a standard format depending on the type of data, and/or for the generation of derivative data based on off-chain data as described in more detail below.

The data processor 10004 may validate and clean the data by storing it in a standardized format, performing one or more deduplication steps, performing sanity checking, converting the data into a different format, generating one or more database entries and populating the database entries with values for the entry, and/or the like. Moreover, the data processors may perform any of the preprocessing, data cleaning, and post processing operations described with respect to FIGS. 71A-B. The data pipelines may end with the data processors 10004 generating one or more new entries for one or more database(s) that may be indexed by a key for each a wallet, token, token collection, transaction, and/or other entity and values indicating information about each entity. The values for a wallet entity may include, for example, current tokens owned by a wallet (e.g., fungible tokens and/or non-fungible token), previous tokens owned by the wallet, trade frequency for the wallet, collections that the wallet has interacted with (e.g., a first trading card collection, a second collection of tokenized tickets, etc.), smart contracts the wallet has interacted with (e.g., redemption smart contract, PTE game smart contracts, etc.), frequency of such interactions, and/or other such data that may be obtained from distributed ledger transactions. The values for a token entity may include, for example, a number of the tokens minted, one or more identifier(s) of the token, past or current owners of the token, any fungible or non-fungible token attributes for the token, a template and/or schema that was used to mint the token, a redemption smart contract for the token, other smart contracts related to the token, links to off-chain data for the token (e.g., IPFS links), and/or the like. Other entities may include any attributes relevant to the entity that may be extracted and/or derived from the distributed ledger data.

In embodiments, a data processor 10004 may continually update some values of the database based on a most recent transaction pertaining to the value. Additionally or alternatively, the data processors may record data about past transactions pertaining to some values. For example, if an ingested transaction indicates that a first wallet sent a token to some other wallet, a data processor 10004 may modify database values pertaining to the token for the first wallet (e.g., a value that indicate how many tokens the user currently owns) to delete an indication that the user owns the token. As another example, the data processor 10004 may leave some database values pertaining to the token unmodified even after the token is no longer owned by the wallet (e.g., a database value indicating that a user has previously interacted with a collection matching the token). Thus, various values may be updated based on the transaction data in different ways that may be specific to the transaction data values and the database schema. In embodiments, each data processor 10004 may be configured to transform a set of transactions data 10020, token data 10022, and/or smart contract data 10024 to fit within a database schema. In this way, the data processor 10004 may iteratively build up a database of values pertaining to various wallets over time as each new block is processed.

At 10408, the distributed ledger crawler system 10040 may retrieve and store supplemental data values for each wallet, token, smart contract, or other database entity based on off-chain data. The off-chain data may be obtained, validated, and pre-processed using various web 2.0 methods and systems (e.g., web scrapers, web2 APIs, parsers, etc., which are not illustrated). The distributed ledger crawler system 10040 may use the off-chain data to generate and/or enrich one or more values for entries in the database. For example, when a user interacts with a tokenized ticket for an event, the distributed ledger crawler system 10040 may obtain and process off-chain data about the type of event (e.g., a music performance), a performer at the event (e.g., a genre of music or other metadata about the performer), what types of users are most likely to attend such an event (e.g., average demographic data for attendees of the event), and/or the like and may process and store related data values for the wallet. As another example, when a user interacts with a PTE game smart contract, off-chain data about the type of game (e.g., game genre), average age of players or other demographics, most common geographic location of players, and/or the like may be obtained, processed, and used to generate metadata value that may contain probabilistic information about the wallet. Thus, for example, likes, interests, probable demographic data, and/or other such metadata may be obtained and stored for the wallet in a way that maintains user privacy (e.g., the metadata may lack any PII even in combination with other data because, for example, the demographic data and other such user data may be probabilistic). Although the data may maintain user privacy, it may be arbitrarily rich depending on the number of transactions with various types of tokens of various kinds, such as tokenized tickets, PTE game tokens, collectible tokens, digital pack tokens, VR and/or metaverse-related tokens, token lending, etc., and on the amount of off-chain data that may be obtained and processed for each of these and other use cases.

In embodiments, the distributed ledger crawler system 10040 may retrieve and store supplemental data that may include semi-private or non-private data. For example, the distributed ledger crawler system 10040 may identify social media accounts or other associated data and store the social media accounts either as values associated with a database entity (e.g., as values for a wallet owned by the owner of the social media account) and/or as a separate database entity (e.g., a social media database entry having its own values, one of which may be a link to a wallet entity).

At 10410, a graph generator 10006 may generate a social graph 10108 of wallets and/or other database entities. The graph may include a node for each wallet and/or other entity and edges that indicate connections between the entities. In embodiments, the edges may be assigned types. For example, a first type of edge may indicate that a first wallet sent fungible tokens to a second type of wallet. A second type of edge may indicate that a first wallet sent non-fungible tokens to a second wallet. Additionally or alternatively, such edges may be weighted to indicate the number and/or amount of tokens, the frequency of such transactions between the two wallets/nodes, and/or the like. A third type of edge may indicate that a first wallet called a smart contract function of another wallet that is associated with a smart contract. Other types of edges may be used for other transactions. In these embodiments, the graph generator 10006 may continually update the social graph 10108 for each new ingested transaction by adding new nodes for new wallets, adding new edges to represent new connections between wallets, updating the edges to provide further data about the types of transactions, frequencies of transactions, and/or other transaction metadata, and the like.

At 10412, the distributed ledger crawler system 10040 may check whether a next ledger block exists. For example, after processing the first block of a blockchain, the distributed ledger crawler system 10040 may request a second block from the node device 3110. If the next block exists (e.g., is already part of the blockchain), the distributed ledger crawler system 10040 may loop back to 10402 by ingesting the block and then proceeding as described above. If the next block does not yet exist (e.g., because the distributed ledger crawler system 10040 has caught up to the most recent block), at 10414 the distributed ledger crawler system 10040 may wait for the next block to be generated and then, once the next block is generated, loop back to 10402 to ingest the new block.

In embodiments, the method 10400 may be executed for multiple distributed ledgers. The multiple distributed ledgers may be processed in parallel and/or in series. For example, the distributed ledger crawler system 10040 may first process the historical data (e.g., starting at a first block and continuing to a most recent block) of a first blockchain, then continue monitoring and ingesting blocks for the first blockchain while simultaneously processing the historical data for a second blockchain, then continue monitoring and ingesting blocks for the second blockchain. Additionally or alternatively, the distributed ledger crawler system 10040 may use the method 10400 to ingest and process a chain and one or more in sidechains in parallel (e.g., based on timestamps associated with each block, such that the data pipeline processes the blocks of multiple chains in temporal order).

In embodiments, data derived from multiple distributed ledgers may be compiled into the same data bucket, database, and/or social graph. For example, an entry in a database and/or a node in a social graph may correspond to a wallet on a first distributed ledger and another wallet owned by the same user on a second distributed ledger. Alternatively, the database entries and/or graph nodes may include values that indicate other entries and/or nodes that are owned by the same user.

Figure 75:
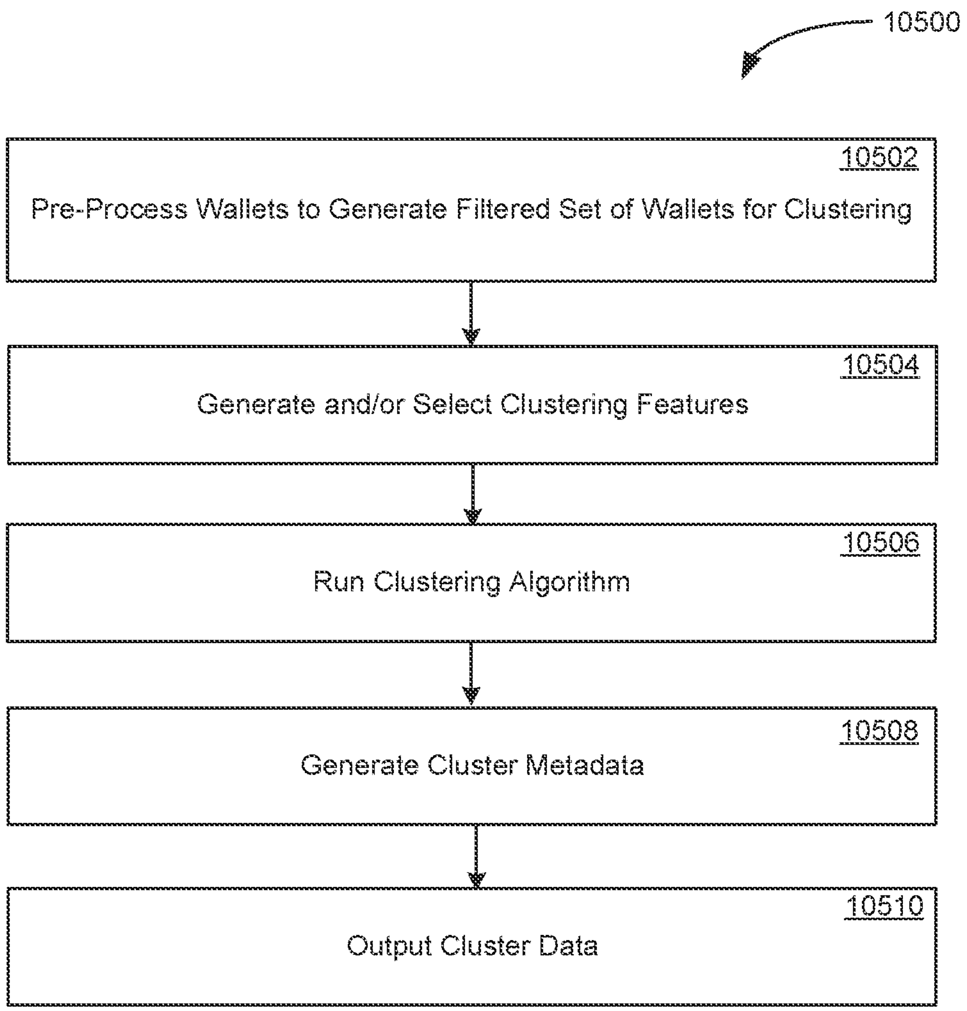
FIG. 75 is a flow chart illustrating an example set of operations of a method for clustering distributed ledger data by a distributed ledger crawler system according to some embodiments of the present disclosure.

FIG. 75 illustrates a method 10500 for clustering distributed ledger entities (e.g., wallets, NFTs, or the like) using the attributes thereof. For purposes of explanation, the method 10500 discusses clustering wallets from one or more distributed ledgers. It is appreciated that the techniques may be applied to cluster other types of distributed ledger wallet entities as well. One issue that arises with distributed ledger entities is that much of the data that is stored or referenced by a distributed ledgers is decentralized and typically anonymous, which limits the types of attributes that are available for clustering (e.g., demographic data, location data, social media data, and/or the like). For example, a wallet on a distributed ledger may be represented anonymously as an address on the distributed ledger and the available attributes of the wallet are minimal (e.g., a timestamp of when the address was created). As such, there is a challenge with deriving any meaningful analytic insights from a distributed ledger using standard data processing tools.

With respect to wallets, wallet clusters may be useful in several use cases, such as targeted airdrop advertising. Wallet clusters may include several wallets that are similar in one or more dimensions as indicated by a variety of features associated with each wallet. For example, as briefly described above, wallets may be clustered based on amounts of tokens owned and/or volume of trading, types of the tokens and/or other token attributes, trading frequency or other behavior attributes, wallet attributes such as wallet capabilities, user attributes for users associated with the wallets, attributes associated with social media accounts linked to the wallets, and/or the like, which may generate (as one example) three clusters corresponding to “crypto novices,” “crypto investors,” and “crypto whales.” The method 10500 of FIG. 75 may be used to generate these and other clusters and associated metadata as well as to visualize the clusters, wallets in each cluster, and data associated with each wallet. It is appreciated that the labels that are applied to the clusters may be human understandable labels (e.g., “crypto novices,” “crypto investors,” and “crypto whales”) or not human understandable. In the case of human understandable, the labels may be generated by a human user or may be machine-generated. In embodiments, different clustering parameters may be used by the clustering system 10008A based on the use case. For example, if an exchange wishes to advertise advanced features that may be desirable to crypto investors or crypto whales, the exchange may interface with the distributed ledger crawler system 10040 and provide it with clustering parameters that cause it to generate clusters of users that are likely to separate crypto novices from more experienced crypto traders.

In embodiments, the clustering method 10500 may be useful to generate other types of clusters based on the selected features (e.g., metadata values that are analyzed to generate one or more clusters). For example, if a set of clustering features associated with one or more wallets indicate that certain wallets frequently interact with PTE game smart contracts, the clustering process may generate a corresponding cluster of wallets corresponding to PTE game fans, a cluster of wallets corresponding to fans of certain types of PTE games, and/or the like. It is appreciated that the "fans" in the foregoing refer to wallets that are owned by respective users with an assumption that the wallets are owned by human users. In another example, if a set of clustering features indicate that certain wallets frequently own or interact with similar VIRL tokens, a clustering process may generate a cluster of wallets interested in VIRL tokens. In general, attributes of transactions that reveal certain types of activities or other attributes associated with distributed ledger entities may be used to generate clusters of those entities based on the entities frequently engaging in similar activities, sometimes engaging in similar activities, having other attributes in common, and/or the like. Non-limiting examples of clusters that may be revealed include clusters of wallets that engage with mystery boxes or certain types of mystery boxes, wallets that engage with VR experiences or certain types of VR experiences, wallets that engage with video games or certain types of video games, wallets that engage with NFT lending and/or lending certain types of NFTs, wallets that engage in VIRL-based commerce and/or certain types of VIRL-based commerce, wallets that engage with collectible tokens and/or certain types of collectible tokens, wallets that engage with tokenized tickets and/or certain types of tokenized tickets, wallets that engage with presales tokens and/or certain types of presales tokens, wallets that engage with marketplaces and/or perform certain types of transactions via marketplaces, wallets that engage with redemption smart contracts, sales smart contracts, crafting smart contracts, unboxing smart contracts, PTE gaming smart contracts, and/or other smart contracts disclosed herein, and/or any combination of the above, among other attributes and features. In embodiments, the clustering method 10500 described herein may also be used to detect groups of malicious accounts (e.g., botnets) based on the groups of accounts performing similar activity, engaging with the same types of tokens and/or transactions, transacting with a single master account, and/or the like.

In embodiments, the clustering method 10500 may cluster different types of entities. For example, the clustering method may be used to cluster wallets in order to find clusters of similar wallets based on their behavior. Additionally or alternatively, the clustering method 10500 may be used to cluster tokens to find clusters of similar tokens (e.g., cryptocurrencies that are used by similar groups of users, non-fungible token that are purchased, traded, redeemed, etc. by similar groups of users. Additionally or alternatively, the clustering method 10500 may be used to cluster token collections to find clusters of similar collections. In embodiments, a user may provide clustering parameters to the distributed ledger crawler system 10040 that indicate which type of distributed ledger entities should be clustered.

At 10502, the distributed ledger crawler system 10040 (e.g., using the clustering system 10008A) may pre-process the data about various wallets or other selected entities contained in the data lake 10012 and/or social graph 10108 to obtain a set of wallets and/or other entities for clustering. In embodiments, the clustering system 10008A may filter a set of wallets to identify wallets associated with a sufficient amount of data to obtain more reliable clustering results. For example, if a wallet is associated with only a single transaction, the clustering system 10008A may filter the wallet out of the set of wallets at step 10502. Additionally or alternatively, if the wallet has not been used within some time period (e.g., the most recent transaction was over six months ago), the clustering system 10008A may filter the wallet out of the set of wallets. Thus, the clustering system 10008A may use activity metrics such as transaction numbers or frequency, most recent transaction, and/or the like, which may be stored as values associated with each wallet in the data lake 10012, as filters to generate the set of wallets or other entities. In embodiments, certain filtering criteria may be selected by default. Additionally or alternatively, a user (e.g., via an user device 10032) may provide clustering parameters that remove or modify the default filtering criteria and/or provide additional filtering criteria that may select the set of entities for clustering, restrict the set of entities based on, for example, whether a wallet has ever and/or within a recent time period engaged with a certain type of smart contract, transacted with a certain type of token or token collection, and/or the like, in order to target particular subsets of wallets or other entities associated with various activities, interests, use cases, and the like.

At 10504, the clustering system 10008A may generate and/or select a set of clustering features. By default, the clustering system 10008A 112 may cluster using features for every value associated with a wallet or other entity (e.g., including derived and/or supplemental/enrichment data as discussed, for example, with respect to method 10400). In embodiments, the clustering system 10008A may pre-process the stored data values before clustering (e.g., in order to normalize or standardize the data values, remove outliers for some data values, etc.). Clustering parameters may also specify a subset of clustering features to use depending on the clustering use case. For example, if a particular user does not wish to cluster based on probabilistic demographic data, the user may provide clustering parameters that remove features pertaining to demographic data. The clustering system 10008A may select and/or generate the clustering features based on clustering parameters provided by a user device 10032.

At 10506, the clustering system 10008A may use one or more clustering algorithms to generate the clusters based on the clustering features. Various clustering algorithms/methods such as K-means, K-mode, DBSCAN, affinity propagation, agglomerative clustering, BIRCH, mean shift, OPTICS, spectral clustering, and/or other such methods may be used depending on the format of the data and/or desired results. The clustering parameters may be used to tune the clustering algorithm as desired. The clustering system 10008A may store default clustering parameters if no clustering parameters are received from an analytics user device 10032. The clustering algorithm may produce a plurality of clusters, with each cluster including one or more wallets or other entities. For example, some clustering algorithms (e.g., depending on the selected clustering parameters) may produce ten or more clusters, which may correspond to different user personas (e.g., a first cluster of wallets owned by users that frequently play PTE games, a second cluster of wallets owned by users that trade lots of cryptocurrency, etc.). Some clustering algorithms may assign each and every wallet to a cluster, while other clustering algorithms may only generate clusters if a sufficient number of wallets are sufficiently similar to each other in the dimensional space defined by the clustering features. In any case, the clustering system 10008A may generate a data structure indicating the plurality of clusters and wallets associated with each cluster.

At 10508, the clustering system 10008A and/or machine learning system 10008B may generate cluster metadata for the clusters generated at 10506. For example, a machine learning system 10008B may use natural language processing models or other machine learning models to automatically label the clusters with descriptive labels. In some embodiments, these techniques may generate the label in part based on the name and/or genre of a collection of tokens that is commonly engaged with by the cluster. For example, if one cluster of wallets contains wallets that frequently play PTE games, then the existing metadata for the wallets of the cluster may indicate that each wallet is likely associated with a user with an interest in specific PTE game or engages with the genre of PTE games, and therefore the automatic labelling algorithm may generate a label indicating that the wallets play PTE games (e.g., the label may be "PTE Game Fans"). Similarly, the automatic labelling models may detect other such shared metadata values and use it generate labels. In some embodiments, a human user may apply clusters or may assist in the labeling of clusters (e.g., by being presented a recommended cluster and opting to approve or replace the label).

In embodiments, the distributed ledger crawler system 10040 may generate other metadata characterizing the clusters, such as one or more most central wallets for the cluster (e.g., representative wallets that best typify the cluster), measures of cluster cohesiveness or spread, measures of cluster similarity to other clusters, measures of change in cluster activity over time, and/or the like.

At 10510, the distributed ledger crawler system may output the cluster data. In some implementations, the distributed ledger crawler system 10040 may output the cluster data to a downstream application, such as an airdrop advertising application 10010A, a notifications application 10010B, a social feed application 10010C, a recommendations application 10010D, a group chats application 10010E, a social communities application 10010F, and/or any other applications that may leverage the cluster data. Additionally or alternatively, the distributed ledger crawler system 10040 may output the clustering data to a data browser 10010G, which in turn may generate one or more interactive user interfaces for displaying, exploring, and/or analyzing the cluster data and/or wallet-related data. For example, the data browser 10010G may generate interactive displays that show the clusters in two or three-dimensional space and/or may generate interactive displays that show an interactive social graph 10108 with cluster labels applied to some or all of the nodes. For example, a user may user an interactive social graph display that may display nodes and relationships between them, where a user may select a node to view attributes associated with the node (e.g., transactions involving a wallet, tokens and token attributes that are owned or were previously owned by a wallet). In embodiments, such a user interface may include links that allow a user to traverse the graph by, for example, viewing node attributes for a wallet node, selecting a token from the wallet node attributes to view a token node, then viewing the token attributes and interactively navigating to other nodes. In embodiments, the user interface may allow exporting lists of entities (e.g., every wallet associated with a cluster of wallets) for use in other cases. For example, an advertiser may interact with the data browser 10010G to view a cluster of wallets that the advertiser wishes to target for an advertising campaign. The advertiser may further interact with the data browser 10010G to obtain a list of the wallets associated with the cluster and may use the list of wallets with an Airdrop advertising system to send airdrop tokens to each wallet.

NFT Push-Advertising

In some embodiments, the tokenization platform 100 may be configured to support a distributed digital ecosystem for minting, distributing, crafting, and trading tokenized digital assets that may be used, in part, by an advertising system (e.g., airdrop advertising system 10010A, which may be implemented by an advertising system 508) to distribute, for example, NFTs or other tokens to individual wallets and/or groups of wallets without requiring the controller of the wallet(s) to request delivery. In some embodiments, the tokenized digital assets used in an airdrop advertising system, as described herein, may include virtual representations of items, such as goods, services, and/or experiences. A digital asset used in the advertising system may include a gift card, digital music file, digital video file, software, digital photograph, and the like, a physical good, digital service (e.g., video streaming subscription), a physical service (e.g., chauffer service, maid service, dry cleaning service), and/or a purchased experience (e.g., hotel package, concert ticket, airlines ticket, etc.), or any combination thereof. Digital tokens may be linked (e.g., cryptographically linked) to virtual representations of real-world physical items and/or to digital assets (e.g., digital artwork, videos, and the like). In embodiments, a tokenized push-advertisement may include one or more tokenized digital trading cards and/or packs of digital trading cards that may be unboxed and/or transferred by the recipient. In some embodiments, the tokenized push-advertisement may include a digital token (e.g., an NFT or fungible token) that is cryptographically linked to a virtual representation of a real-world item, such that the digital token is redeemable for the item.

Advertising to blockchain and/or other distributed ledger wallets is difficult due at least in part to the anonymized nature of wallets used by the distributed ledgers. Techniques described herein improve the state of the art by providing an airdrop advertising system that leverages the unique capabilities provided by the distributed ledger crawler system 10040 to find relevant wallets despite their anonymized nature and by using airdrop techniques to provide sophisticated token-based advertisements to the relevant wallets, thus leveraging distributed ledger transactions and tokens for a novel and useful purpose. Additionally, techniques described herein may provide for sophisticated advertising analytics based on distributed ledger transactions that occur after a wallet receives a token-based advertisement. In particular, techniques described herein beneficially provide for a novel advertising medium that leverages the strengths of distributed ledgers (e.g., transaction transparency, built-in token transfer mechanisms) while compensating for the weaknesses of distributed ledgers (e.g., the difficulty of targeting ads at anonymized wallets).

In embodiments, the advertising system is configured to "air-drop" (or "push") token-based advertisements to selected digital wallets of users. In embodiments, the digital wallets may be selected using various targeting techniques that may use the distributed ledger crawler system described herein to query for user wallets meeting certain criteria and/or select relevant clusters of user wallets to receive airdropped token-based advertisements. For example, an ad purchaser may query the tokenization platform for wallets that meet certain criteria (e.g., wallets that engage with certain types of tokens and/or are associated with other evidence of an interest in a particular token, token type, topic, etc.), filter the list of wallets (e.g., to find the wallets that engage the most with a particular distributed ledger), mint relevant token-based advertisements (which may be customized to particular groups and/or individuals), and airdrop the relevant token-based advertisements to the selected wallets. Additionally or alternatively, an ad purchaser may generate clusters of user wallets using a clustering system, review the clusters to find groups of wallets to target for reception of token-based advertisements, filter the wallets, mint relevant token-based advertisements, and airdrop the relevant token-based advertisements to the selected wallets.

In embodiments, a token-based advertisement is a digital token that can be directly deposited into an account (e.g., a digital wallet) of a recipient as an advertisement to the user, optionally without the user's undertaking a request for the token-based advertisement. In embodiments, the digital token may be a fungible token or an NFT. While a token-based advertisement may be a fungible token, a token that represents other tokens, a token that represents a linkage to a specific item or a type of item (such as being redeemable for the item) or the like, the disclosure describes the various concepts in relation to token-based advertisements that are NFTs. Such concepts should be understood to encompass similar alternative embodiments involving non-NFT tokens except where context indicates otherwise. In some embodiments, an NFT may be cryptographically linked with a digital asset (e.g., digital artwork, video, audio recording, and/or the like) that is being distributed as an advertisement. For example, a company may wish to advertise an upcoming NFT digital trading card release using token-based advertisements. In this example, each instance of the token-based advertisement may be a respective NFT that is linked to a digital asset (e.g., a free trading card that also depicts information relating to the digital trading card release) that advertises the trading card release, whereby the NFT is pushed to a user account (e.g., a digital wallet of the user) via the advertising system. Assuming that there are N total NFTs (e.g., 1000 total NFTs) that were or will be minted for the release, the advertising system may be configured to identify N corresponding user accounts to which the NFT advertisements will be pushed.

Although embodiments described herein may target user wallets based on lists of wallets received from a distributed ledger crawler system 10040, the airdrop advertising system may implement any suitable technique for identifying the user accounts/wallets to award the NFT advertisements. For example, the airdrop advertising system may randomly select eligible user accounts, select the most active user accounts (e.g., the digital wallets that have the most NFTs assigned thereto and/or the most transactions for NFTs), apply a rules-based workflows to select user accounts (e.g., identify user accounts that currently own certain NFTs and/or analyze assets already owned by a user to determine compatibility and/or complementary of the advertisement NFT to an existing set), apply a set of algorithms for targeting users most likely to value the NFTs and/or to respond to the advertisements (such as ones based on user behavior tracking (including tracking user responses to advertisements over time to determine preferences), user profiling (including psychographic, demographic and similar profiling of user attributes), collaborative filtering, user similarity clustering (e.g., k-means clustering and the like) and the like), apply a set of location-based targeting algorithms (such as directing advertisements to users within a defined geofence), apply machine-learning techniques to identify relevant user accounts, or the like. In some of these embodiments, the advertising system may query a cryptographic ledger (e.g., blockchain) that contains the user accounts to identify the respective NFTs assigned to the respective user accounts that are maintained on the blockchain and then may select which accounts to which to air-drop the NFT advertisements (e.g., based on the respective activity of the user accounts, based on a set of rules applied to the accounts, based on relevancy scores corresponding to the user accounts, or the like). In these embodiments, the advertising system may identify all the accounts on the cryptographic ledger that contain NFTs, and for each account, the NFTs that are assigned to the account. In some embodiments, the advertising system may calculate a relevancy score of the NFT advertisement vis-à-vis a respective user account based on the digital attributes of the NFT advertisement and the digital attributes of the NFTs in the respective user account to determine which user accounts to select for an NFT-advertisement airdrop. For example, if the NFT advertisement is advertising a release of NFT-based baseball trading card packs and a first user account has baseball trading card NFTs and a second user account has anime trading card NFTs, the first account would have a higher relevancy score than the second account in relation to the NFT advertisement. In this example, the advertising system would select the first user account over the second user account. In some embodiments, the advertising system may leverage intelligence services (e.g., of the intelligence and automation system 110 and/or the intelligence system 10008) to determine the relevancy score of the NFT with respect to a respective user account. For example, the advertising system (in combination with the intelligence services) may leverage one or more machine-learned models to calculate the relevancy scores. In these embodiments, the machine learned model may be trained to determine a relevancy score for a given NFT given a set of other NFTs using the digital attributes of the given NFT and the digital attributes of the other NFTs. The example digital attributes may include the subject matter of the linked digital asset (e.g., sports, pop culture, retro art, music, etc.), the company that issued the NFTs, the scarcity of the NFTs, and/or the like. In embodiments the advertising system may determine a relevancy score based on historical user behavior, such as trading behavior of a user as determined by analysis of a user's blockchain-based acquisitions and dispositions of NFTs, analysis of redemption or crafting behavior of a user (such as redeeming an NFT for another NFT or for a physical item), or the like. For example, a user who has consistently traded baseball card NFTs for anime NFTs may be understood to prefer anime NFTs.

In embodiments, the advertising system may obtain a relevancy score for each identified user account/wallet and then may select a set of user accounts from the identified set of accounts based on the relevancy scores thereof (e.g., the N (unique) user accounts with the highest relevancy scores). In response to selecting the user accounts, the advertising system may instruct a ledger management system 104 to transfer each respective NFT advertisement to a respective user account.

In embodiments, the tokenization push-advertising ecosystem may be supported by a set of smart contracts that are collectively configured to perform certain ledger-based operations such as minting new tokenized digital tokens (e.g., NFTs or fungible tokens) that may be sent as push-advertisements and assigned to an account, such as a wallet, of a respective user. In embodiments, a pack of cards sent as a push-advertisement may be assigned as "unboxed" cards to an account of the respective owner of a wallet. The owner may then be able to craft a new card from two or more cards received in the push-advertisement according to a crafting recipe, as described herein, and assign the new crafted card to the user's account/wallet. Each pack or card distributed in a push-advertisement may be represented by a respective NFT (which may have a unique token ID and a mint number associated therewith) and may have an associated sticker that designates the type of card and the crafting rules and instructions that determine how various cards may be used in combination to craft new or different card types. In embodiments, the cards may be organized into levels according to a predetermined hierarchy (e.g., Build cards (lowest level), level 1 cards, level 2 cards, level 3 cards . . . , level N cards), whereby the users may craft higher level cards according to a set of rules defined in a respective crafting recipe that defines which cards may be combined to obtain the newer higher-level cards. In some embodiments, within a level of cards there may be different types of cards within that level, and each card may have a relative rarity/scarcity (e.g., some cards might be rarer than others). In some embodiments, the rarity of respective cards may be controlled by the logic with which a respective smart contract associated with the tokenization push-advertising system is configured. For example, there may be four different types of level-1 cards, whereby each type of level-1 card may have a respective probability assigned thereto. When the smart contract is generating a card for that level, the smart contract may be configured to generate a random number and may determine which type of card to generate based on the random number and the probabilities. In some of these embodiments, the smart contract may be configured with a set of rules that assigns each type of card to a different category and, for each respective category, assigns a non-overlapping range of numbers to the respective category. For example, the types of cards and their associated probabilities may be: Card A with a 1% probability of being generated, Card B with a 5% probability, Card C with a 10% probability, Card D with 15% probability, Card E with a 25% probability, and a Base Card F with a 44% probability. In this example, the range of the Card A categories may be 0-0; the range of the Card B may be 1-5; the range of the Card C may be 6-15; the range of the Card D may be 16-30; the range of the Card E may be 31-55; and the range of the Base Card F may be 56-99. In this example, the smart contract may be configured to generate a new card for the user (assuming other conditions are met to generate the card are met) by generating a random number, N, and calculating N modulo 100 to determine which type of card to generate. For example, if the random number is 10000, a smart contract may mint a Collectors card that is awarded to an account of the user (e.g., on a cryptographic ledger or other suitable data storage medium), whereas if the random number is 10099, a smart contract may mint a Collectors card that is awarded to an account of the user. As can be appreciated, cards having lower probabilities will be rarer than cards having higher probabilities. In embodiments, how certain cards of a collection are generated may be defined in a respective "crafting recipe," as described herein. In embodiments, in order to use a crafting recipe, a user may be required to have in their possession an NFT received as a push-advertisement. To obtain a wanted push-advertisement that a user has not received, the user may receive an offer to take an action, such as visiting a website, downloading a content item, making a purchase, placing a product review or some other action. Following the action, the NFT that is required to utilize the crafting recipe may be pushed to the user as a reward for taking the action. In another embodiment, a push-advertisement NFT may itself be part of a collection of push-advertisement NFTs. In this example, for a user to be able to utilize a crafting recipe the user may be required to have received more than one push-advertisement NFT. Push-advertisement NFTs may be associated across different advertisers, for example Entity A may send a user a push-advertisement NFT that is one part of the NFTs required for the user to be able to use a crafting recipe to create a new NFT. In order to obtain the other NFT, or plurality of NFTs that are needed to use the crating recipe, Entity A may require that the user obtain a push-advertisement from Entity B, such as a strategic partner of Entity A. In embodiments, a recipe may be embodied as computer readable instructions that are executed by the smart contract, whereby each recipe defines a set of conditions that must be satisfied before one or more new cards are generated and how the new cards are generated (e.g., the types of cards that can be generated and, in some cases, the probabilities associated with each type of card).

Figure 76:
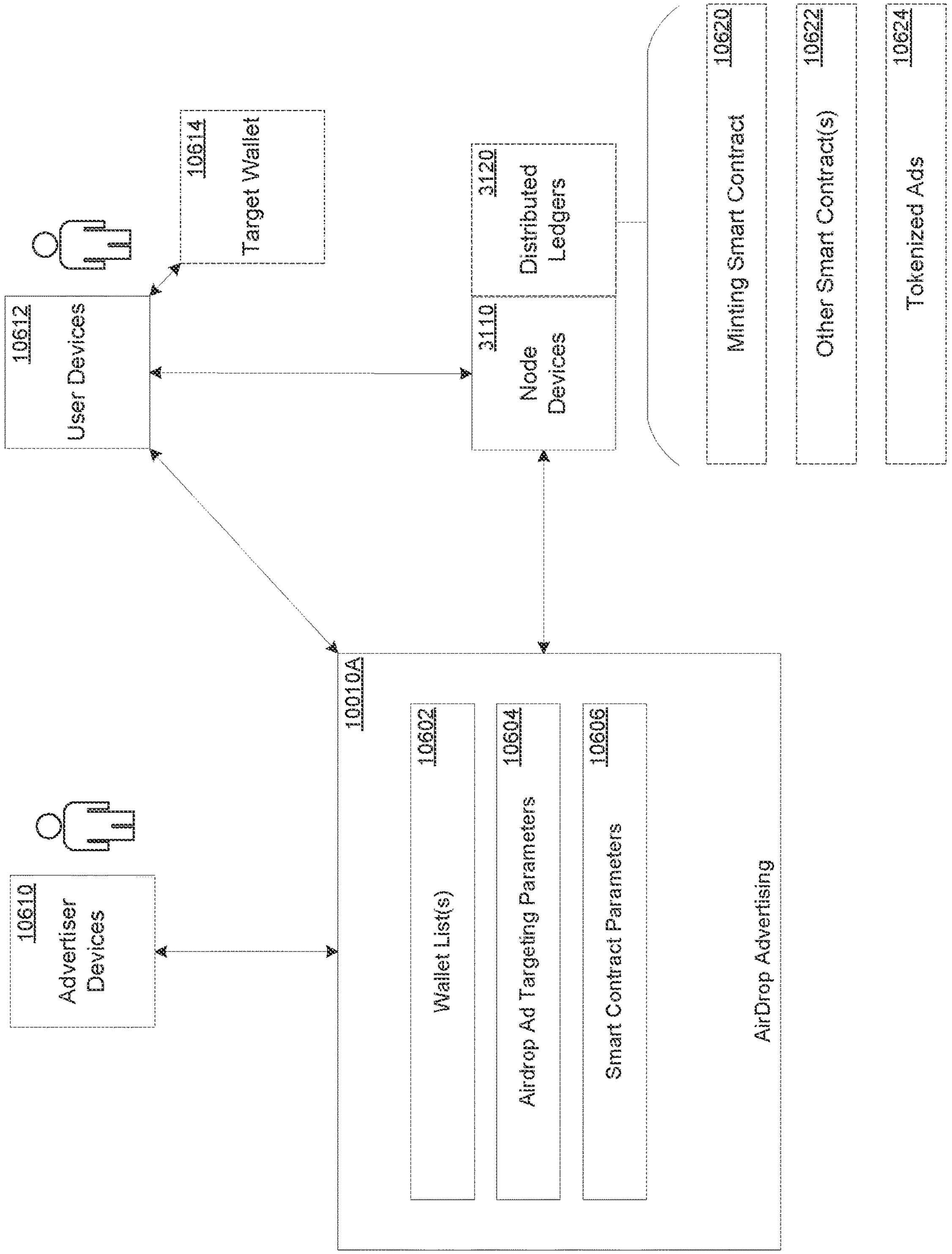
FIG. 76 is a schematic illustrating an example environment of an airdrop advertising system according to some embodiments of the present disclosure.

FIG. 76 illustrates an example environment 10600 including an airdrop advertising system 10010A and other related systems. In embodiments, the airdrop advertising system 10010A may be implemented by a tokenization platform 100 and/or a distributed ledger crawler system 10040 (not shown in FIG. 76). Additionally or alternatively, an airdrop advertising system 10010A may be implemented as a third-party service separate from the tokenization platform 100. The airdrop advertising system 10010A may be used by one or more advertiser devices 10610, which may be operated by ad purchasers or other entities that wish to target advertisements to one or more users. The advertiser devices 10610 may interact with the airdrop advertising system 10010A to create ad campaigns, select distributed ledger wallets to target as part of the ad campaigns, cause the minting of tokenized advertisements 10624 on the distributed ledgers 3120, and airdrop the tokenized advertisements 10624 to the wallets. The airdropped tokenized advertisements may then be viewed by users associated with the wallets via user devices 10612.

In embodiments, the airdrop advertising system 10010A may store one or more wallet lists 10602 that may be used to airdrop tokenized advertisements. In embodiments, the wallet lists 10602 may be generated by a clustering system 10008A of a distributed ledger crawler system 10040 (e.g., using a clustering method 10500 as described with respect to FIG. 75). For example, the various wallet lists 10602 may correspond to different demographic groups, interest groups, or other groups that are detected by clustering distributed ledger data and/or supplemental data (e.g., social media data) associated with the distributed ledger data that is generated by the distributed ledger crawler system 10040. In these embodiments, each of the wallet lists 10602 may correspond to a cluster of wallets generated using the clustering system 10008A. In embodiments, each of the wallet lists 10602 may be associated with a descriptive name, one or more labels/tags, other cluster metadata, and/or the like, which may be generated using automated machine learning methods and other methods as described above for FIG. 75.

In embodiments, the wallet lists 10602 may be generated using any other method. For example, advertiser devices 10610 may interact with a data browser 10010G to find and select wallets that meet certain criteria (e.g., the advertiser devices 10610 may submit queries to a distributed ledger crawler system to find wallets meeting certain criteria, such as engagement with certain types of tokens, certain amounts or frequencies of transactions, and/or the like) and select wallet lists 10602 containing the wallets that meet the criteria. Additionally or alternatively, the advertiser devices 10610 may generate wallet lists using other methods and upload the wallet lists 10602 to the airdrop advertising system 10010A. In other words, although the wallet lists 10602 may be obtained using clustering algorithms or by searching and filtering distributed ledger data using various criteria, the wallet lists 10602 may also be obtained using any other method.

In embodiments, the advertiser devices 10610 may interact with the airdrop advertising system 10010A and/or a data browser 10010G provided by a distributed ledger crawler system 10040 to view information about the various wallets in the wallet lists 10602, which may include viewing any of the data associated with each wallet that is stored in a social graph 10108 and/or a data lake 10012. In embodiments, the advertiser devices 10610 may select one or more wallet lists 10602 to target tokenized advertisements to the wallets in the selected list(s). In embodiments, the advertiser devices 10610 may apply further targeting criteria to filter the wallets of selected wallet lists 10602, for example by selecting subsets of the wallets based on any metadata value that is associated with the wallets in a social graph 10108 and/or a data lake 10012.

In embodiments, the airdrop advertising system 10010A may further include airdrop ad targeting parameters 10604, which may define criteria that indicate which wallets should receive airdrop advertisements, when the wallets should receive the airdrop advertisements, what type of airdrop advertisements should be received, and/or the like. The airdrop ad targeting parameters 10604 may be used in addition to or as an alternative to the wallet lists 10602. For example, the airdrop ad targeting parameters 10604 may indicate transactions that, if detected, cause a tokenized advertisement 10624 to be airdropped to an associated wallet. In embodiments, the events may include a wallet interacting with (e.g., buying, selling, renting, etc.) a certain token or type of token (e.g., a tokenized ad for an upcoming event ticket may be airdropped to a wallet that purchased a tokenized ticket to a similar event), a wallet interacting with a certain smart contract or type of smart contract (e.g., a tokenized ad for a game smart contract may be airdropped to any wallet that interacted with a smart contract for a similar game). In embodiments, the airdrop ad targeting parameters 10604 may allow targeting any transaction metadata or combination of transaction metadata. For example, tokenized ads 10624 for a low-transaction-fee exchange may be targeted to any user that was charged a transaction fee above a certain amount or percentage within a recent period (e.g., within the last week, month, etc.). In embodiments, the airdrop ad targeting parameters 10604 may allow targeting based on the contents of supplemental (e.g., off-chain) data, such as social media data. For example, the airdrop ad targeting parameters may allow targeting ads at any wallet associated with a social media account that posted certain content (e.g., certain keywords), is associated with certain social media metadata (e.g., numbers of followers, frequency of posting, etc.), and/or the like. Therefore, as will be appreciated from the foregoing description, the airdrop ad targeting parameters may allow advertiser devices 10610 to target tokenized ads at any wallet that meets any targeting criteria based on various data stored in a social graph 10108 and/or data lake 10012.

The airdrop advertising system 10010A may further store smart contract parameters 10606 that may be used to parameterize a minting smart contract 10620 and/or other smart contracts 10622 on distributed ledger(s) 3120. In embodiments, the smart contract parameters 10606 may include data for configuring the minting smart contract 10620 to mint tokenized advertisements 10624 and/or data for transferring (e.g., airdropping) the tokenized advertisements 10624 to various wallets. In these embodiments, the smart contract parameters 10606 may include one or more attributes of tokenized advertisements 10624 to be minted, one or more token templates specifying attributes of tokenized advertisements 10624 to be minted, minting instructions specifying how many tokenized advertisements 10624 to mint, lists of wallets to receive the tokenized advertisements 10624, rules for distributed the minted tokenized advertisements 10624 to wallets (e.g., by randomly selecting pre-minted tokenized advertisements), rules for custom minting tokenized advertisements 10624 (e.g., based on metadata associated with a wallet of the intended recipient of the tokenized advertisements, etc.), and/or the like. In other words, the smart contract parameters 10606 may parameterize the minting smart contract 10620 to carry out a particular minting strategy, which may involve minting certain amounts of tokenized advertisements 10624 (which may be various types, correspond to various templates, and/or be customized for an intended recipient) and distributing (e.g., by airdropping) the minted tokenized advertisements 10624 to various wallets.

In embodiments, the smart contract parameters 10606 may specify whether certain minted tokenized advertisements 10624 may be immediately airdropped to target wallets and/or whether certain tokenized advertisements 10624 may be airdropped only after detection of certain transactions or other events. For example, one advertising strategy may involve immediately (e.g., without delay) minting and airdropping a number of tokenized ads 10624 that advertise an upcoming event, where the tokenized ads 10624 are airdropped to a first cluster of wallets that redeemed tickets for a similar event and a second cluster of wallets that are associated with a set of interests selected by an advertiser. As another example, a different advertising strategy may involve pre-minting a specified number of tokenized ads 10624 advertising an exchange that provides NFT lending, and the smart contract parameters 10606 may indicate that the tokenized ads 10624 should be airdropped to any wallet after that wallet purchases a certain type of NFT or an NFT meeting certain criteria (e.g., the NFT may be in demand on a certain marketplace). In embodiments, these strategies may be combined. For example, the smart contract parameters 10606 may indicate that a new tokenized ad 10624 should be minted and airdropped to any wallet that has performed a certain type of transaction within the most recent two weeks (or any other specified time period) and/or any wallet that performs the same type of transaction for the next 2 weeks (or any other specified second time period). Thus, the airdrop advertising system 10010A may airdrop ads immediately based on past transactions and/or may monitor future transactions that may trigger future airdrops.

In embodiments, minted tokenized ads 10624 may be stored within a minting smart contract 10620 (e.g., "wrapped" by the minting smart contract 10620), within another default smart contract (e.g., a default wrapper smart contract), and/or as separate entities on the distributed ledgers 3120. In embodiments, the airdrop advertising system 10010A may monitor ongoing distributed ledger transactions for airdrop triggers (e.g., transactions that may trigger the airdrop of a tokenized ad 10624) and/or by a minting smart contract 10620 and/or other smart contract 10622 may be configured to monitor the distributed ledger transactions for airdrop triggers. In embodiments, distributed ledger transactions that trigger an airdrop may be monitored by a distributed ledger crawler system 10040 (e.g., during a preprocessing phase of a data processing pipeline), which may notify the airdrop advertising system 10010A (e.g., by transmitting a message to the airdrop advertising system 10010A) and/or may notify a configured smart contract (e.g., by calling a function of the smart contract, via an oracle, etc.). The notification (e.g., message, function call, oracle) may specify a wallet associated with the detected transaction (e.g., the wallet which will receive the airdropped tokenized ad 10624). The airdrop advertising system 10010A and/or configured smart contract may then cause the tokenized ad 10624 to be airdropped to the specified wallet.

Figure 77:
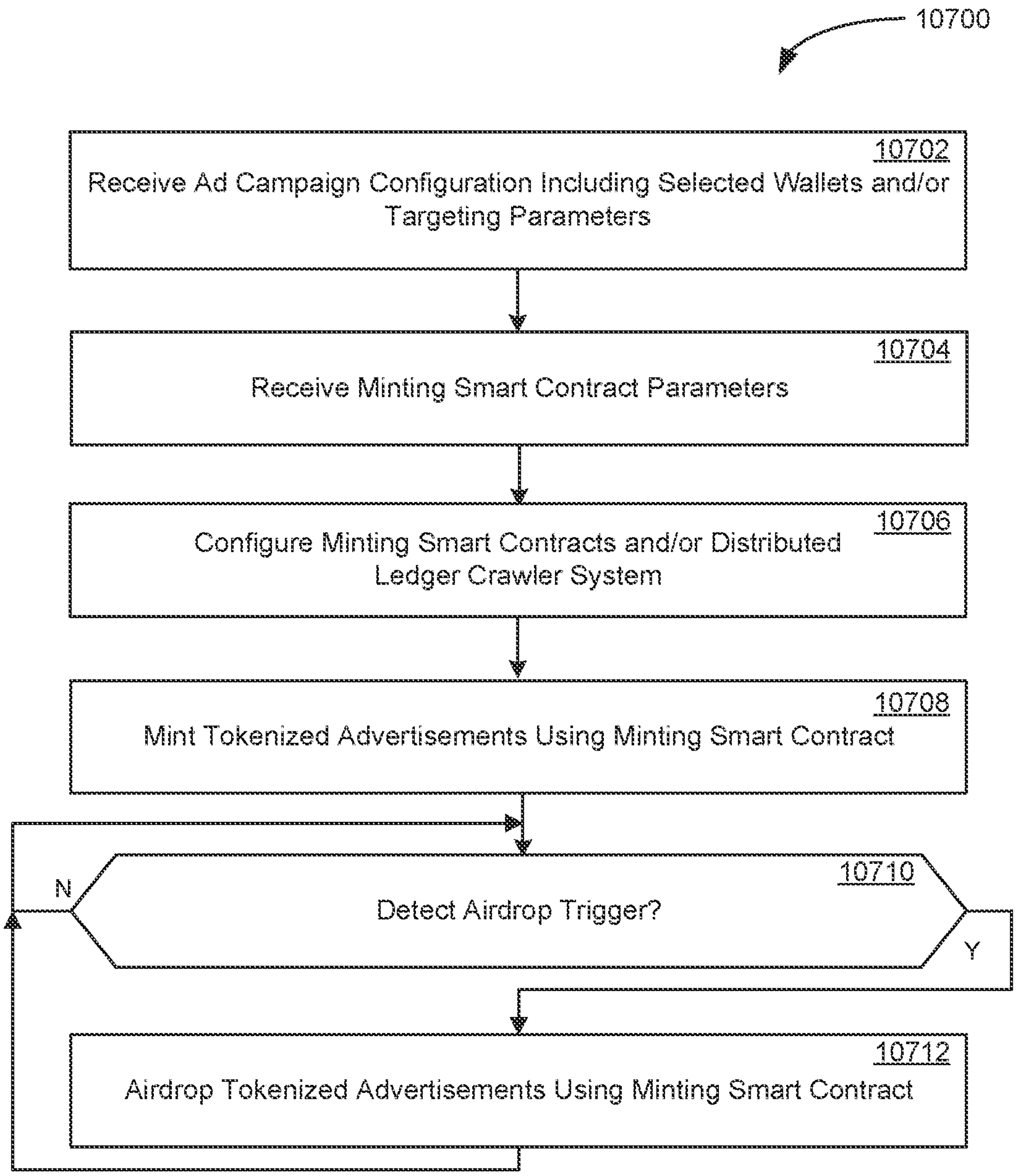
FIG. 77 is a flow chart illustrating an example set of operations of a method for airdropping tokenized ads by an airdrop advertising system according to some embodiments of the present disclosure.

FIG. 77 illustrates an example method 10700 for airdrop advertising using the airdrop advertising system 10010A and a minting smart contract 10620. At 10702, the airdrop advertising system 10010A may receive an ad campaign configuration from an advertiser device 10610. In embodiments, the advertiser device 10610 may interact with a user interface provided by the airdrop advertising system 10010A and/or a data browser 10010G to generate the ad campaign configuration. For example, a user of the advertiser device 10610 may browse through various wallet clusters provided by a distributed ledger crawler system 10040 and select one or more of the wallet clusters to store a corresponding wallet list 10602 on the airdrop advertising system, where the wallet list 10602 comprises a plurality of wallet addresses which may be used to target advertisements. In embodiments, the wallet lists 10602 may correspond to various user personas detecting by the clustering system or other groupings of wallets by user behavior or type. Additionally or alternatively, the wallet lists 10602 may correspond to certain communities of wallets that may be detected by any of the various intelligence systems 10008 and/or applications 10010 of the distributed ledger crawler system 10040. For example, the wallet lists 10602 may correspond to clusters detected by a clustering system 10008A. The clusters may include clusters of wallets that own NFTs of certain types, NFTs having specific sets of attributes, NFTs that are tradeable on particular exchanges, NFTs related to a particular project/collection and/or projects/collections having particular sets of attributes, NFTs associated with particular labels such as "gaming" or "art," NFTs associated with particular social sentiments, NFTs associated with sets of style criteria, wallets associated with specified personas (e.g., NFT trader, PTE gamer player, crypto whale, etc.), wallets having various attributes such as ranges of network addresses/locations, sets of features such as "smart" or advanced processing capabilities, wallets that are associated with other content such as social media accounts or groups, wallets associated with sets of user attributes such as demographic, psychographic, and/or geographic attributes, wallets associated with sets of behavior attributes such as trading frequencies, whether the wallet lends associated NFTs, time of day and/or time zones that the wallet tends to be active, whether the wallet responds to advertising or other offers, a price sensitivity of the wallet, etc. In other words, clusters generated based on any or all of these factors may be selected and wallets lists 10602 corresponding to the selected clusters may thereby be used for airdrop advertising. Additionally or alternatively, the advertiser device 10610 may submit queries including criteria for finding certain wallets (e.g., any combination of the above criteria or other criteria), and may select one or more wallets identified by the one or more queries to store a corresponding wallet list 10602 on the airdrop advertising system 10010A. By selecting and/or storing one or more wallet lists 10602, the advertiser device 10610 may create a targeting pool of wallets that may be used to target the tokenized ads 10624 via airdrop.

Instead of or in addition to wallet lists 10602, the ad campaign configuration may specify targeting parameters that may match wallets based on transaction metadata, wallet metadata (e.g., as stored in a data lake 10012 or social graph 10108), social media or other supplemental data that is associated with a wallet, outputs of a recommendation system 10010D, and/or any other criteria for targeting tokenized ads 10624 for airdrop. These criteria may be used to further filter wallets selected from one or more wallet lists 10602 and/or may be used to select wallets that meet the criteria without regard to any wallet lists 10602. The ad campaign configuration may specify that the targeting parameters should be applied to select wallets based on a current state of data (e.g., data currently in a data lake 10012 or social graph 10108) and/or based on future data (e.g., to target wallets that meet the targeting criteria in the future based on data that is not yet ingested into the data lake 10012 or social graph 10108).

In embodiments, the targeting parameters may specify any transaction metadata that may qualify a wallet for targeting. For example, the targeting parameters may match any transaction that involves a purchase of a certain type of token (e.g., a token minted using a particular template, having a certain collection identifier, belonging to a certain wrapper smart contract, etc.), sale of a certain type of token, listing for sale of a certain type of token, redemption of a certain type of token, any transaction involving any other smart contract, any transaction having a certain value, any transaction during a certain time period, and/or the like.

In embodiments, the targeting parameters may specify any wallet metadata stored in the data lake 10012 and/or social graph 10108, such as metadata indicating one or more detected interests associated with a wallet, clusters associated with a wallet, amounts of tokens owned by a wallet, numbers of token (and/or tokens of certain types) owned by a wallet, amounts of tokens purchased or sold by a wallet, type of wallet (e.g., user wallet, smart contract wallet), whether a wallet is associated with another wallet on another chain, whether a wallet is associated with a social media account, and/or any other metadata that may be associated with a wallet entity of a data lake 10012 and/or social graph 10108.

In embodiments, the targeting parameters may specify any token metadata corresponding to any token currently owned or previously owned by a wallet, one or more attributes of tokens currently owned or previously owned by a wallet (e.g., type of NFT, specific NFT attributes, where the NFT is/can be traded, such as a particular exchange, relationships to a project and/or its attributes, a category label of an NFT as generated by an automatic labelling system, such as "gaming", "art", etc., social sentiment attributes, NFT attributes that may be derived from social media commentary or otherwise based on social sentiment, style attributes, and/or any other metadata that may be associated with a token entity of a data lake 10012 and/or social graph 10108.

In embodiments, the targeting parameters may specify any social media or other supplemental data that is associated with a wallet. In other words, the targeting parameters may specify metadata that is associated with a social media entity or another supplemental entity that is connected to a wallet entity via an edge in a social graph 10108 and/or a similar link within a data lake 10012. Such targeting parameters may target, for example, wallets associated with social media accounts that follow certain other accounts, have posted content associated with certain other accounts, belong to certain social media groups, have liked, disliked, or otherwise interacted with various content posted on social media, and/or the like.

In embodiments, the targeting parameters may specify various outputs of a recommendation system 10010D, which may provide recommendations based on tokens interacted with and/or owned by a particular wallet. For example, an ad device 10610 associated with a token marketplace may specify that a recommendation system 10010D should analyze the holdings of a plurality of wallets (e.g., all wallets, wallets selected from a wallet cluster or other list of wallets, etc.) to detect wallets that own tokens that may be sold via the marketplace for a certain amount and/or for a certain amount or percentage more than the wallet purchased the token for (e.g., a profit margin), wallets that own tokens that may be rented via a lending function of the marketplace (e.g., PTE tokens that are lendable and not currently in use by the wallet), and/or the like, and may target airdrop ads to the corresponding wallets.

In embodiments, the advertiser device 10610 may specify (e.g., as part of the ad campaign configuration) multiple of the different targeting criteria as described above, or any other criteria for matching wallets based on various data. The advertiser device 10610 may specify whether all of the criteria must be matched, whether at least one of the criteria must be matched and/or provide any other logical rules for combining the criteria. In embodiments, the ad campaign configuration may specify other targeting parameters, such as one or more time periods during which the campaign will run (e.g., during which wallet data may be monitored and wallets selected for airdrop), various other rules for targeting wallets based on various data and/or based on the outputs of other systems, and/or the like.

In embodiments, the advertiser device 10610 may submit a query (not shown in the method 10700) to the airdrop advertising system 10010A and/or data browser 10010G to simulate how many wallets currently match the various targeting parameters. In embodiments, historical data associated with the wallets and other data described above may be used to train a machine learning model (e.g., using the machine learning system 10008B) to estimate how many wallets will meet the targeting criteria over a specified upcoming period (e.g., over the following two weeks). In embodiments, the training data may indicate, for example, trends in transaction amounts, frequencies, redemptions, sales, and/or the like, and accordingly the model may be trained to estimate the performance of the targeting parameters taking these and other factors into account.

At 10704, the airdrop advertising system 10010A may receive smart contract parameters 10606 to parameterize a minting smart contract 10620 and/or any other smart contracts 10622 that may be used to mint and/or manage the tokenized ads 10624. The smart contract parameters 10606 may specify one or more attributes of the tokenized ads 10624, minting instructions for pre-minting a specified number of the tokenized ads 10624, a minimum and/or maximum number of tokenized ads 10624 that may be minted for a given ad campaign, customization instructions for customizing the tokenized ads 10624, and/or the like. The advertiser device 10610 may provide the smart contract parameters 10606 to the airdrop advertiser system 10010A and/or may interact with a user interface provided by the airdrop advertising system 10010A to generate the smart contract parameters. In embodiments, the advertiser device 10610 may provide multiple sets of smart contract parameters 10606, where each set of smart contract parameters 10606 corresponds to a different type of tokenized ad 10624. For example, a first set of parameters may specify a first template and/or schema defining a first set of attributes for minting a first type of tokenized ad 10624, first pre-minting instructions for pre-minting a first defined number (e.g., 100) of the first type of tokenized ad, a first maximum supply (e.g., 200) of the first type of tokenized ad, and/or first customization instructions for customizing the first type of tokenized ad (e.g., a particular attribute of the tokenized ad may be assigned a different value depending on an amount or frequency of transactions associated with the targeted wallet). Similarly, a second set of parameters may specify a second template and/or schema defining a second set of attributes for minting a second type of tokenized ad 10624, second pre-minting instructions for pre-minting a second defined number (e.g., 1000) of the second type of tokenized ad, a second maximum supply (e.g., 2000) of the second type of tokenized ad, and/or second customization instructions for customizing the second type of tokenized ad (e.g., a particular IPFS image may be stored in an attribute of the tokenized ad 10624 depending on metadata associated with the targeted wallet). Based on the foregoing description, it will be appreciated that any number of different sets of smart contract parameters 10606 may be received in order to configure a minting smart contract 10620 and/or other smart contracts 10622 to mint and/or manage the airdropping of any number of different types of tokenized ads 10624. In embodiments, each set of smart contract parameters may correspond to a different set of airdrop ad targeting parameters 10604 received at step 10702, such that a first type of tokenized ad 10624 may be targeted using a first set of targeting parameters 10604, a second type of tokenized ad 10624 may be targeted using a second set of targeting parameters 10604, and so on. Additionally or alternatively, multiple sets of smart contract parameters 10606 may be associated with a single set of airdrop ad targeting parameters 10604 such that, for example, a targeted wallet may be randomly airdropped a first type of tokenized ad 10624 or a second type of tokenized ad 10624.

In embodiments, the airdrop advertising system 10010A may automatically generate one or more smart contract parameters 10606 based on one or more airdrop ad targeting parameters 10604. For example, if the airdrop ad targeting parameters 10604 indicate that tokenized ads 10624 should be airdropped upon the detection of a specified event, the airdrop advertising system 10010A may generate smart contract parameters 10606 for configuring a smart contract function (e.g., a function of the minting smart contract 10620, storage smart contract, or other smart contract 10622) to monitor an oracle that indicates that the specified event has occurred and/or receive a message from a system configured to send such a message indicating that the specified event has occurred.

At 10706, the airdrop advertising system 10010A may configure the minting smart contract 10620 and/or any other smart contracts 10622 using the smart contract parameters 10606 and/or airdrop ad targeting parameters 10604. In embodiments, the airdrop advertising system 10010A may also configure the distributed ledger crawler system 10040 to detect events that may trigger an airdrop ad as specified by one or more airdrop ad targeting parameters 10604.

In embodiments, the airdrop advertising system 10010A may configure the minting smart contract 10620 and/or other smart contracts 10622 by parameterizing a template smart contract and deploying the template smart contract to the distributed ledger 3120 (e.g., by interfacing with a node device 3110). Alternatively, the airdrop advertising system 10010A may configure an existing (e.g., already stored on the distributed ledger 3120) minting smart contract 10620 and/or other smart contracts 10622 by invoking a configuration function of the smart contract, passing the smart contract parameters as arguments of the configuration function, thereby configuring the smart contract by causing the smart contract to store the smart contract parameters for future use.

In embodiments that airdrop tokenized ads 10624 to a pre-selected list of wallets (e.g., the ad campaign does not use or does not exclusively use event-based triggers), the airdrop advertising system 10010A may use the pre-selected list of wallets to parameterize the minting smart contract 10620. In other words, the airdrop advertising system 10010A may cause the pre-selected list of targeted wallets to be stored at the minting smart contract 10620 so that the tokenized ads 10624 may be airdropped to the targeted wallets as soon as they are minted.

In embodiments that use event-based targeting, the airdrop advertising system 10010A may configure the distributed ledger crawler system 10040 to detect trigger events by providing criteria for matching an event to various components of the distributed ledger crawler system 10040. For example, to target wallets associated with certain types of transactions, the airdrop advertising system 10010A may configure one or more data processors 10004 to detect the relevant transactions during a preprocessing phase of a data pipeline, which may provide for the earliest possible detection of the matching transaction. For example, to target a tokenized ad 10624 at any wallet that purchases an NFT associated with a particular collection, the airdrop advertising system 10010A may configure a relevant data processor 10004 (e.g., a data processor 10004 responsible for processing transactions on a blockchain that stores the collection of NFTs) to detect transactions of the matching NFTs, flag the wallets that receive the matching NFTs, and send a message indicating the flagged wallet to the airdrop advertising system 10010A whenever such a transaction is detected. As another example, to target a tokenized ad 10624 at any wallet associated with a social media account that joins a particular social media group, the airdrop advertising system 10010A may configure a relevant data processor 10004 to detect newly added relationships of a social graph 10108 that connect a social media account node for a social media account that belongs to the group with a wallet node during a post processing phase of a data pipeline. When such a new relationship is detected, the data processor 10004 may send a message to the airdrop advertising system 10010A that indicates the relevant wallet. As will be appreciated from the foregoing examples, the airdrop advertising system 10010A may configure the distributed ledger crawler system 10040 to trigger a message that causes an airdrop of a tokenized ad 10624 based on any data attribute or relationship that may be added to a data lake 10012 and/or social graph 10108.

At 10708, the airdrop advertising system 10010A may cause the configured minting smart contract 10620 to mint a selected number of tokenized ads 10624. As mentioned above, the tokenized ads 10624 may be fungible or non-fungible tokens, and may have any number of attributes, such as a mint number (for non-fungible tokens), various attributes that may vary by use case (e.g., any of the attributes described in conjunction with any of the embodiments described herein, such that the tokenized ads 10624 may be used for crafting, unboxing, PTE gaming, may be redeemed to receive real-world items or to provide admission to events, or otherwise may function as any of the tokens described herein), various links (e.g., to media or other content available on IPFS or another off-chain storage system), various smart contract addresses (e.g., to a redemption smart contract, crafting smart contract, unboxing smart contract, game smart contract, and/or other any other smart contract described herein), etc. As described above, the token specification may be stored in the configured minting smart contract 10620 and used to mint the tokenized ads 10624.

In embodiments, the airdrop advertising system 10010A may cause the pre-minting of a specified number of tokenized ads 10624, which may be stored in a default account (e.g., a wrapper smart contract) and later airdropped to various addresses. Additionally or alternatively, the airdrop advertising system 10010A may mint a number of tokenized ads 10624 that are immediately necessary (e.g., a number sufficient to airdrop a tokenized ad 10624 to each wallet in a list of pre-selected wallets).

At 10710, the airdrop advertising system 10010A and/or the minting smart contract 10620 may wait to detect an event trigger (e.g., in embodiments that use event-based targeting). If one or more tokenized ads 10624 are configured to be airdropped immediately (e.g., not based on an event-based trigger), step 10710 may be skipped for an initial run through the loop of steps 10710-10712 so that the tokenized ads 10624 may be airdropped immediately to the pre-selected list of wallets. Otherwise, the airdrop advertising system 10010A and/or the minting smart contract 10620 may wait to detect an event trigger. For example, upon detecting a matching transaction or some other data attribute or relationship in a data lake 10012 or social graph 10108, the distributed ledger crawler system may send a message to the airdrop advertising system 10010A and/or the minting smart contract 10620 that may indicate a matching event has occurred, and may further comprise a target wallet 10614 or wallets that are associated with the event. In embodiments, the message may be sent to the airdrop advertising system 10010A, which in turn may send a corresponding message to the minting smart contract 10620 (e.g., via an oracle or function call).

At 10712, the minting smart contract may airdrop (e.g., transfer using a push method) the tokenized ad 10624 to the selected target wallet 10614 or wallets. In embodiments, the tokenized ad 10624 may be selected from a pre-minted pool of tokenized ads 10624 (e.g., randomly). In embodiments, one of several types of tokenized ads 10624 may be selected and airdropped based on a detected event and/or targeting parameters. After airdropping the tokenized ad 10624, a user of a target wallet 10614 may view and interact with the tokenized ad 10624 via a user device 10612. In embodiments, the target wallet 10614 may be a cloud wallet, hardware wallet, and/or any other type of wallet.

Risk Mitigation for VIRL Sales

Referring to FIGS. 1 and 8, the marketplace system 102 may be configured to mitigate risks associated with selling physical items using VIRL tokens that represent the items. Examples of these risks may be a risk that a seller is unable to deliver the items to a redeemer of a corresponding VIRL token (e.g., because the item is never produced, the seller was fraudulently selling items, the items were lost or damaged, or the like), a risk that the item is unsatisfactory (e.g., the seller is selling fake or damaged items, the items were misrepresented, or the like), or other applicable types of risks. In these embodiments, the marketplace system may employ different strategies to mitigate those risks. For example, in some embodiments, in order to list an item for sale on the marketplace without some sort of collateral strategy in place, the marketplace system 102 may require that a seller of an item (or multiple items) have a risk score that is greater than a threshold value and/or verify that the item exists and is being held in a secure location, such that the order for the item is reliably capable of being fulfilled when a VIRL token corresponding to the item is redeemed. If neither of these conditions can be met, the marketplace system 102 may require that the sale of the VIRL tokens include an escrowing strategy, whereby the redeeming user of a VIRL token has safeguards in place in case the risk becomes realized. For example, if the seller cannot establish the existence of the items and the safekeeping thereof, the marketplace system 102 may require that the seller escrow (or otherwise lock) an amount of currency (fiat, cryptocurrency, or other) equal to the collective sale prices of the items that the seller is selling. In these embodiments, if the item turns out to be fraudulent, not exist, etc., the escrowed amount may be distributed to a redeemer of the VIRL (e.g., a most recent purchaser), in order to at least partially make the redeemer whole. In embodiments, the redeemer may be made whole for an entire amount corresponding to the purchase price paid by the redeemer for the VIRL. However, in some embodiments, the escrowed funds may be insufficient to make the redeemer whole (e.g., if the VIRL was resold for a profit a large number of times and/or otherwise increased greatly in value).

To ensure that a redeemer may be made whole in case an item corresponding to a VIRL is not acceptable, in some embodiments the marketplace system 102 and/or a smart contract that governs the transfer of a respective VIRL may require that at least a portion of the proceeds of each sale involving a VIRL token/item be locked (e.g., held in an escrow account) until the occurrence of an "unlocking" event. In embodiments, an unlocking event may be confirmation of delivery of the item that is linked to a redeemed VIRL before unlocking the funds of the sale to the seller(s) of the item. In this example, the funds may be unlocked once the user has received the item and expressly indicates that the item is satisfactory or has had sufficient time to inspect the item without rejecting the item. In an alternative or additional example, an unlocking event may be detected after the passage of a predefined time period from when the VIRL token has been first made redeemable (e.g., five days, one week, ten days, a month, one year, or any other suitable time period after the token is first made redeemable). For example, if the VIRL token was sold before the linked item came into existence, once the item has been produced, the owner of the VIRL token may have a set time frame to redeem the item. If the owner of the item does not redeem the VIRL token in the predefined time period, then the owner may be deemed to have waived their right to receive and inspect the item and the escrowed amount may be distributed to the one or more sellers of the item. In some embodiments, the collateral strategy and the conditions for listing a VIRL token-linked item may be implemented in a smart contract that is generated by the marketplace system 102 and/or by a minter of the VIRL token. In these embodiments, a smart contract instance corresponding to a respective VIRL token may be instantiated upon the token being generated, such that the smart contract instance includes the conditions for requiring escrowing funds, the manner by which funds are escrowed (e.g., by the seller or in response to a sale), triggers for locking and/or unlocking funds, and/or actions that are performed in response to the unlocking event. In embodiments, the smart contract may be a "wrapper" smart contract that includes the VIRL token, such that the escrow functionality is built into the VIRL token itself. As discussed in this disclosure, escrowing an amount of funds may refer to an action whereby a defined amount of funds (e.g., fiat currency, tokenized fiat currency, and/or cryptocurrency) is locked in an account (e.g., a smart contract account) such that the escrowing party cannot withdraw or otherwise transfer the escrowed funds until the funds are unlocked. The account in which the funds are escrowed may be the account of the user (e.g., if a user's cloud wallet includes escrow functionality) or may be a separate account that is maintained by another party (e.g., the digital marketplace, the smart contract that wraps the VIRL, or the like). It is further noted that when referencing physical items, "escrowing" or "safe-keeping" a physical item may refer to a scenario where a physical item is deposited in a trusted location, whereby the seller/owner of the item no longer has control over the item, such that if an owner of a VIRL digital token corresponding to a respective item is redeemed by the owner, the item may be shipped or otherwise delivered to a location specified by the redeeming owner of the VIRL token. Examples of the token-based sale workflows are discussed in greater detail throughout the disclosure.

Although escrow strategies described herein may allow a redeemer to be made whole in the event a VIRL item is not acceptable, in some cases the use of profit escrow strategies may be less desirable because they may cause secondary sellers to receive profits from secondary sales on a delayed basis, thereby discouraging secondary sales. Accordingly, different marketplaces and/or VIRL creators may decide to use the profit escrow strategies described herein in some cases and not in others (e.g., very popular VIRLs may be very likely to resell regardless of temporary profit escrow). Additionally, potentially undesirable delays in receiving escrowed profits may be mitigated by the use of a shortened resales period, after which a VIRL may no longer be resold and/or may be automatically redeemed, thereby freeing up any potentially escrowed profits as soon as possible. Strategies for limiting resales periods and/or automatically redeeming VIRLs are described in more detail below.

In embodiments, the platform 100 may allow a seller of a physical item (or a set of items) to create a VIRL (or a set of VIRLs) corresponding to the item based on a set of item attributes of the item. In embodiments, the VIRL may include a set of digital attributes that correspond to the item and may include additional content and metadata relating to the item and/or seller. In these embodiments, the physical items may be items that the seller has possession of, has at a secure facility from which the items may be shipped (e.g., a fulfillment center), is not yet in possession of (e.g., being shipped), or not yet in existence (e.g., being produced or not yet in production, as in the case of a presales token, as described elsewhere in the disclosure). In embodiments, the platform 100 may mint a digital token (e.g., a NFT or a fungible token) and may cryptographically link the digital token to one or more virtual representations of items, thereby creating a VIRL token that has a one-to-at-least one link to one or more respective virtual representations. In some embodiments, the platform 100 may, in minting the digital token, instantiate a smart contract instance that governs the transactability and transferability of the digital token, the escrowing of some or all of the currency used to purchase the digital token, and/or the like. In these embodiments, the smart contract instance may be said to "wrap" the digital token and may define conditions that must be met to perform actions such as listing the item(s) that are linked to the digital token for sale, to transfer the digital token to another user, and/or redeem the digital token to take possession of the item. For example, if the seller does not have a track record of successfully fulfilling items after redemption or does not have possession of the items (e.g., the items are not yet in existence or not yet received by the seller), the smart contract may require that the seller agree to an escrow arrangement before the item may be sold on the marketplace, whereby the seller agrees to have an amount of funds corresponding to the purchase price of the item escrowed until an unlocking event occurs. For example, the seller may either escrow the designated amount of funds into an escrow account (e.g., an account where the seller cannot withdraw funds out of until the funds have been unlocked) or may agree that at least a portion of the proceeds of the sale are deposited into an escrow account until an unlocking event occurs.

Once a VIRL token is generated, the seller may list the item for sale on a digital marketplace (e.g., via the marketplace system 102), generate and price a VIRL token, list its attributes and other metadata related to the VIRL token, and place the VIRL token for sale. This process may occur using the platform in instances where the VIRL creator is in possession of the physical good associated with the VIRL token, or in instances where the VIRL token creator is not in possession of the physical good associated with the VIRL. In the latter case, the platform 100 may perform methods and systems for the handling of a VIRL token when the item is not in physical possession of the seller (or agent that has fulfilled the item once the VIRL is redeemable) that permit a VIRL creator to market and sell the VIRL in a marketplace to a first buyer, and allow the first buyer to further market and sell the VIRL in the marketplace and/or a secondary marketplace, for ultimate purchase by a final buyer that redeems the VIRL in order to obtain the physical good that is associated with the VIRL. In embodiments, the platform 100 may create VIRL tokens, as described elsewhere in the disclosure, with respect to a physical good that is not in the creator's possession and these VIRLs may be tokenized in NFTs, fungible tokens, or some other type of token, including tokenized tokens, as described herein.

In embodiments, the platform 100, as described herein, may facilitate a VIRL marketplace, escrow and associated processes (also referred to as a "VIRL escrow sale process"), which may be performed via the platform 100 (which may include one or more smart contracts that decentralize some or all of the functionality) to allow the marketing, sale, exchange and redemption of VIRL tokens associated with physical items held in escrow until ultimate redemption by a final buyer. In embodiments, a VIRL escrow sale process may refer to a process that is distributed among a series of participants (e.g., computing systems and devices), a plurality of marketplaces, and one or more smart contracts optionally hosted on the set of distributed ledgers (such as blockchain-based ledgers), such that a creator of a VIRL token or other user of the platform 100 can digitally tokenize a VIRL purchase right, VIRL redemption right, or some other right associated with the VIRL token that is associated with a physical good held in escrow and/or a physical good that is to be produced in the future. In particular, the disclosed ecosystem and the systems and methods that support it provide mechanisms that allow a creator of a VIRL token and/or a party affiliated with a platform 100 to digitally tokenize one or more physical goods and/or physical good(s) that are to be produced in the future a digital token that may be redeemed by the token holder using, in part, a set of smart contracts. In embodiments, the set of smart contracts that are implicated by a VIRL-based escrow sale process may include, without limitation, a configuration or minting smart contract (such as for configuring a set of parameters of the VIRL token, among others), a VIRL token management smart contract, a VIRL escrow smart contract, a VIRL redemption smart contract, and/or some other type of smart contract as described herein. It is appreciated that in some embodiments, the functionality of two or more smart contracts may be performed in a single smart contract. In embodiments, a set of smart contracts may be configured to operate in series, in parallel, or the like to accomplish an escrow workflow in which outputs of certain smart contracts serve as inputs to others, such as where completion of a redemption smart contract that results in the redeeming party taking possession of a physical item automatically triggers release from escrow of an amount that was used to secure the transaction. Collectively, in embodiments the set of one or more smart contracts may enable configuration of the initial offering and management of subsequent exchanges of a VIRL token, including exchanges taking place on a plurality of secondary markets, where the VIRL token conveys the right to redeem the VIRL token for the physical good. In embodiments, VIRL tokens may be fungible or non-fungible. In embodiments, VIRL tokens, and redemption thereof, may relate to a specific single physical good(s), a group of items, a type or category of physical good(s) and/or a physical good(s) that is to be produced in the future.

Figure 78:
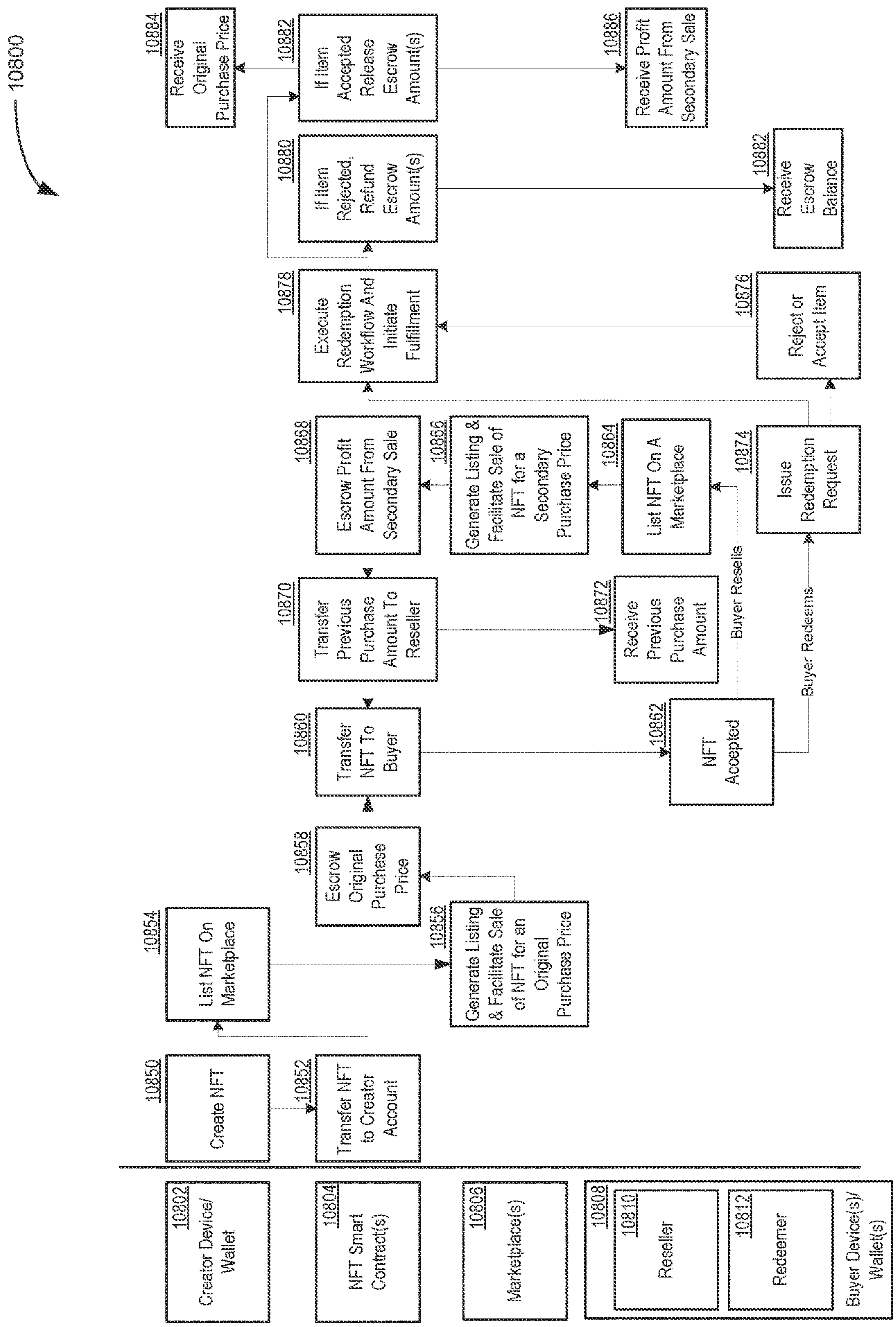
FIG. 78 is a flow chart illustrating an example set of operations of a method for mitigating risk for sales of distributed ledger tokens linked to physical goods according to some embodiments of the present disclosure.

FIG. 78 illustrates an example computer-implemented process for performing VIRL-based escrow sales process, according to some embodiments of the present disclosure. As illustrated, the example computer-implemented process may be executed by a creator device and/or wallet 10802, one or more smart contracts 10804 (e.g., NFT smart contracts if the VIRL token is an NFT) that assist in managing the escrow sales process, one or more marketplaces 10806 that may be used to transfer NFTs between wallets, and one or more buyer devices wallets 10808, which may include resellers 10810 and/or redeemers 10812 of a VIRL NFT.

The example computer-implemented VIRL escrow sale process may begin at step 10850, where a creator of a VIRL token (e.g., a VIRL NFT or a fungible VIRL token) relating to an item may initiate the creation of the VIRL token, which may include associating media content with the VIRL token, such as photos or a video, defining the attributes of the VIRL token and price of the VIRL token/item, and/or any other steps for creating the VIRL token. For purposes of explanation, the VIRL token is described as being a VIRL NFT. It is appreciated that the techniques contained herein may be applied to the sale of fungible VIRL tokens as well. In general, creation of NFTs may be accomplished in various ways (e.g., using minting smart contracts, cloning existing smart contracts and configuring the attributes thereof, and/or other such methods described elsewhere herein). For example, the creator device 10802 may interface with the tokenization platform 100 to create the VIRL NFT (e.g., using a configuration system as described elsewhere herein), may initiate deployment of one or more smart contracts that control the VIRL NFT, and/or the like. In some embodiments, creating the VIRL NFT may involve communication with an auditor system and/or verification of the physical good corresponding to the NFT (e.g., any physical item or other VIRL-related item that may be received by redeeming the VIRL NFT). In embodiments, the media associated with the VIRL NFT may be created or provided by the creator device 10802 and/or may be created or provided by the auditor and/or verifier of the physical good. In embodiments, the physical good itself may be physically escrowed and verified as such by an escrow system as part of the NFT creation process.

In some embodiments, a user may interact with the platform 100 to generate media content representations of the physical item(s), such that each media content representation represents a corresponding physical goods that is available for redemption using the VIRL NFT. In embodiments, the creator of a VIRL NFT may provide item attributes and descriptions relating to the physical item to the tokenization platform 100. In response to the creator providing the information to the tokenization platform 100, the platform 100 may generate one or more VIRL NFTs corresponding to the one or more physical goods.

At 10852, an NFT smart contract 10804 that controls the VIRL NFT (e.g., a wrapper smart contract that includes the VIRL NFT) may assign the created NFT to the creator account. For example, in some embodiments the creator device 10802 and/or the tokenization platform 100 may initiate a distributed ledger transaction that assigns an ownership attribute of the VIRL NFT to the wallet associated with the creator of the VIRL NFT. In some embodiments, although shown as a separate step 10852, the creator account may be assigned as part of creating the NFT during step 10850. Additional details regarding VIRL NFT creation are provided elsewhere herein, including below with respect to FIG. 79.

At 10854, the creator device 10802 (or some other user of the platform 100, such as a retailer of the VIRL token, an advertiser of the VIRL token, and/or a party affiliated with a VIRL token or production thereof, including the platform 100) may initiate an announcement stage where the VIRL NFT is listed as available on a designated marketplace for which would-be purchasers may obtain a right, represented by the VIRL NFT, to redeem the VIRL NFT for the physical good (which may be held in escrow). At step 10856, a designated marketplace 10806 may generate a listing for the VIRL NFT on the marketplace 10806. It is appreciated that while a marketplace may list a digital token as available, in some embodiments the digital token is never in possession of the marketplace. In these embodiments, the digital token (e.g., VIRL token) may be maintained in a distributed ledger account (e.g., a smart contract that wraps the token, a digital wallet of the current owner of the token, or the like) and the marketplace may facilitate the transaction for the digital token by interfacing with the smart contract wrapper of the digital token. As will be discussed, the foregoing implementations allow the risk mitigation policies to be governed by the smart contract wrapper of a respective VIRL rather than the marketplace 10806. In this way, the VIRL token may be sold via different digital marketplaces without impacting the risk mitigation protections.

In embodiments, the marketplace(s) 10806 may include a marketplace system 102 of the tokenization platform 100 and/or any third-party marketplaces. The marketplaces may use a ledger management system 104 to interface with a set of distributed ledgers hosted by a set of node devices. The participants in the VIRL marketplace 10806 may interact with one another and with the distributed ledger(s) via various computing devices, such as laptop computers, desktop computers, tablets, video game consoles, server computers, and/or the like.

In embodiments, once a creator has generated a VIRL listing within a marketplace 10806, (which may be a marketplace that is a part of, or associated with the platform 100), a plurality of potential first buyers of the VIRL NFT may search for the item/VIRL NFT within the marketplace, and one of the buyers may use a buyer user device 10808 to purchase the VIRL NFT. The marketplace 10806 may facilitate the transaction, including by providing search interfaces by which the buyer may search for attributes of the VIRL NFT and/or physical good, browse through various NFTs available for sale, select the VIRL NFT, and transfer an amount of funds corresponding to a purchase price of the NFT (herein, an "original purchase price" of the VIRL NFT).

In some embodiments, the original purchase price may be set by the creator of the VIRL NFT (e.g., the full amount or the amount minus fees), determined using a bidding process, or otherwise determined at the time of VIRL NFT creation or sale. At step 10858, the NFT smart contract controlling the escrow process (e.g., the wrapper smart contract including the VIRL NFT) may escrow an amount equal to the original purchase price (or the price minus marketplace fees and the like) in an escrow account that is locked so that the creator/seller cannot immediately access the funds once the VIRL NFT has been purchased by the buyer. For example, the original purchase price may be escrowed in the distributed ledger account of the VIRL token smart contract 10804. Additionally or alternatively, the original purchase price may be escrowed in the account of a separate escrow smart contract 10804, an account controlled by the tokenization platform 100 and/or marketplace 10806, and/or some other account that is not accessible by the creator or the buyers. In embodiments, the tokenization platform 100 and/or the marketplace 10806 may initiate the escrow of funds into the NFT smart contract 10804 (e.g., by calling an escrow function provided by the NFT smart contract 10804 that holds the escrowed amount).

Once the first buyer's purchase funds are placed in escrow, at 10860 the smart contract 10804 (e.g., wrapper smart contract) may transfer the VIRL NFT to a buyer wallet 10808 associated with the buyer, and the buyer wallet may receive the VIRL NFT at 10862. Once received, the VIRL token may be redeemed by the buyer to initiate delivery of the item(s) represented by the VIRL token or resold to another buyer (e.g., by listing the VIRL token for sale on one or more digital marketplaces). In the case that the owner of the token opts to resell the token, the smart contract 10804 may transfer the NFT using a transfer function implemented in the smart contract 10804 and/or by the underlying distributed ledger. The transfer function may be configured to re-assign the ownership attribute of the VIRL NFT from the seller wallet to the buyer wallet.

In some scenarios, the creator/seller of the VIRL token may not yet have possession of the underlying item and/or the item may not yet be in existence, which may prevent or delay redemption and release of funds from escrow (e.g., if the VIRL NFT is a presales token, as described elsewhere herein, and/or if the physical good is in transit to an auditor/verifier/escrow system). In any case, the escrowed proceeds of the sale may remain in escrow until the buyer redeems the VIRL NFT and receives the item (from the seller or another party in possession of the item) and/or until a redemption time period expires.

In some cases, a buyer of an item corresponding to a VIRL NFT may decide to resell the right to possession of an item by reselling the VIRL NFT. If the buyer decides to resell the VIRL NFT, the buyer may initiate the creation of a new VIRL NFT listing on a marketplace 10806 (e.g., the same marketplace used for the first purchase or a different marketplace). The creation of a second listing at 10864 may occur in the same way as the creation of the first listing 10854 and/or using a different listing process (e.g., depending on the marketplace 10806 used to create the listing). After requesting a second listing, this time by the first buyer as opposed to the creator of the VIRL token, the marketplace 10806 may generate the listing, and facilitate a sales process by additional would-be second buyers. For example, as above, the marketplace 10806 may allow the secondary buyers to search/browse for and find the VIRL NFT listing, purchase the VIRL NFT, and transfer funds to purchase a VIRL NFT. In embodiments, the second sale may be for a same amount as the first sale or a different amount, which may be determined either by the seller (e.g., the initial buyer of the NFT token) or at the time of sale (e.g., after a bidding process or a negotiation process).

Upon a purchase of the VIRL NFT by a second buyer from the first buyer, at 10868 a second amount corresponding to a secondary purchase price may also be locked by the NFT smart contract 10804 (e.g., in the same escrow account) until an unlocking event (e.g., the VIRL token is redeemed and the item is either accepted or rejected, a redemption time period expires, or the like). In some embodiments, the second amount that is locked may be the difference between the price paid by the first buyer and the price paid by the second buyer (e.g., a "profit amount" comprising the first buyer's full profit on the resale, the full profit minus fees, or the like) or may be a defined fraction of said difference. In these example embodiments, the amount paid by the first buyer to the initial seller would remain locked (e.g., in an escrow account), as would the difference between the first price paid by the first buyer and the second price paid by the second buyer (less any fees paid to the marketplace and/or tokenization platform). In this example, at 10870 the remainder of the secondary purchase price (which may be the same as the original purchase price or the original purchase price minus fees) may be distributed to the first buyer by the NFT smart contract 10804 upon the second buyer transacting for the VIRL token. In this way, the secondary seller (e.g., the initial buyer of the token) receives any funds they paid for the token from the sale (assuming the VIRL was sold for an amount greater than or equal to the price that was paid to purchase the VIRL from the primary seller), but does not receive any profits from the secondary sale. Later, the secondary seller may receive any profits from the secondary sale when an unlocking event occurs and the redeeming user does not reject the item. Once the VIRL token is sold, the NFT may be reassigned to the second buyer from the second seller (e.g., the first buyer) by repeating step 10860 to reassign the VIRL NFT from the first buyer to the second buyer. In embodiments in which profits from secondary sales are not escrowed (e.g., to maximize resalability), step 10868 may be skipped and the full secondary purchase amount may be transferred to the reseller at 10870. In such embodiments, the amount of "protection" for the ultimate redeemer of the VIRL NFT may be capped to an amount corresponding to the initial purchase price.

As illustrated by FIG. 78, steps 10860-10870 form a resale loop by which the VIRL NFT may be repeatedly resold any number of times. For each sale, the most recent profit (e.g., the secondary purchase price minus the previous purchase amount and optionally fees) may be escrowed by the smart contract 10804, and the remainder transferred to the most recent seller. In this way, the amount of funds that are locked may be equal to the most recent sale price (assuming the sale price keeps increasing), such that all the buyers of the VIRL token may recoup their respective purchase prices if the item is never delivered to the ultimate redeeming user (or if the item is fake or otherwise fraudulent). It is appreciated that the foregoing resale loop may continue for subsequent resales of the VIRL NFT until the VIRL NFT is redeemed or another "unlocking" event occurs (e.g., the owner of the VIRL token does not redeem the token during a predefined period after the underlying item is available for delivery).

In embodiments, any of the buyers (e.g., the first buyer or any subsequent buyers) may choose to redeem the VIRL NFT (e.g., instead of reselling it). In this scenario, the buyer may use a buyer device 10808 (also referred to as redeemer device 10812) to initiate a redemption request at 10874. The redemption request may be transmitted from the redeemer device 10812 to the smart contract 10804 via one or more smart contract function calls, which may be specified in distributed ledger transactions. In embodiments, the distributed ledger transactions may be initiated by the redeemer device 10812 and/or a tokenization platform 100. The redemption request may cause a smart contract 10804 associated with the VIRL NFT to initiate and execute a redemption workflow and initiate fulfilment at 10878, which may include locking the VIRL NFT (e.g., to prevent further transactions/resales) and performing one or more additional steps to facilitate fulfillment of the item to a redeeming user (or another party indicated by the redeeming user).

In embodiments, the redemption workflow may involve facilitating the shipping of the physical good to the redeeming user. For example, the smart contract 10804 may update a status associated with the VIRL NFT to indicate that it is redeemed, whereby the status may be monitored by one or more off-chain devices (e.g., the tokenization platform 100, an auditor/verifier/escrow system, the creator device 10802, etc.) so that the physical good may be shipped to the redeeming user. In embodiments, the redeeming user may correspond with a device associated with the shipper to provide address information. For example, the redeeming user may provide shipping information, and a device (e.g., tokenization platform 100, redeeming device 10812, marketplace 10806, etc.) may store the shipping information on the distributed ledger as part of a redemption request and/or may temporarily store the shipping information on a distributed storage medium (e.g., IPFS) and store a link to the distributed storage medium (e.g., a hash of the shipping information) on the distributed ledger. For example, one or more arguments including the shipping information and/or a link to the shipping information (e.g., an IPFS hash) may be provided as part of a redemption function call made to the smart contract 10804.

In embodiments, a redemption process may include monitoring constraints on the redemption, such as a time constraint indicating a period of time following the redemption request for the user to accept or reject the item and locking of the VIRL/token for the duration of time when the redeeming user can reject the item. In embodiments, the time period may be sufficient to allow the holder of the physical good to ship the physical good to the redeeming user and for the user to inspect the item to decide whether to reject the item. After the physical good is received, by the redeeming user may either accept to reject the item at 10876. In embodiments, the redeeming user may be required to provide an indication of whether the physical good has been received or not and/or whether the physical good is rejected within the designated time period. In embodiments, the redeeming user may use the redeeming device 10812 to indicate the acceptance or rejection of the physical good. In embodiments, the redeeming device 10812 may provide a digital notification to the smart contract 10804 that indicates whether the item was rejected by the redeeming user (e.g., by interfacing with the smart contract 10804 and/or interacting with the tokenization platform 100, which may interface with the smart contract 10804). In embodiments, if the redeeming user does not provide an indication of the acceptance or rejection of the physical good, the good may be treated as accepted by the smart contract 10804. Additionally or alternatively, if the physical good is not received, the redeeming user may reject the good and/or indicate that the physical good was not received. In embodiments, instead of being confirmed by the purchaser, the physical good may be shipped to and/or inspected by a third party to determine whether the physical good is a valid and authenticated physical good that conforms with the good's description(s) in the listing(s). In these embodiments, instead of a redeeming device 10812 accepting or rejecting the physical good, a third-party device (not shown) may accept or reject the physical good.

In embodiments, the smart contract 10804 may finish executing the redemption workflow and initiate fulfilment once the physical good is either accepted or rejected. If the physical good is rejected (e.g., or the item was never received), then at 10880 the smart contract 10804 may refund the escrow amount to the redeeming user's wallet 10812. In embodiments, the total escrow amount in the smart contract 10804 may be equal to the secondary purchase price paid by the redeeming user, which may make the redeeming user whole upon the physical good being unacceptable, fraudulent, undelivered, etc. In embodiments in which secondary sales profits are not escrowed, then an escrow amount equal to the original purchase price (or the original purchase amount minus any fees) may be transferred to an account associated with the redeeming device 10812 (e.g., a digital wallet account associated with the redeeming user on a distributed ledger).

If the item is accepted, then the escrow amount may be distributed by the smart contract 10804 to the various accounts, such that the creator wallet 10802 (e.g., a distributed ledger account associated with the creator on the distributed ledger) receives the original purchase price and the various profit amounts made by the resellers may be received by the reseller wallets 10810. For example, a first profit amount made by a first reseller may be transferred to a respective digital ledger account associated with the first reseller, a second profit amount made by a second reseller may be transferred to a respective digital ledger account associated with the second reseller, etc. Additionally or alternatively, a percentage or fixed amount of the profit from each resale may be sent to the creator wallet 10802. In some of these embodiments, the VIRL smart contract wrapper may be configured to allocate a certain amount of profit from secondary sales to the primary seller (e.g., the creator of the VIRL token). In embodiments, the smart contract 10804 may maintain an escrow ledger that maintains the accounts of resellers and an amount of profit that is escrowed from each account, such that the smart contract 10804 may utilize the escrow ledger to facilitate the various distributions to the correct accounts, as described in more detail below.

In embodiments, the smart contract 10804 may burn the VIRL NFT after completing the redemption workflow and/or distribution of the escrow funds. For example, the smart contract 10804 may assign the ownership attribute of the VIRL NFT to a burner wallet. Once the VIRL NFT is assigned to the burner wallet, the VIRL NFT cannot be transferred or redeemed.

The foregoing example of FIG. 78 discussed risk mitigation for VIRL NFTs. It is appreciated that the foregoing techniques may be adjusted and/or applied to provide risk mitigation in connection with the sale and resale of fungible VIRL tokens as well.

In some embodiments, a VIRL token may be minted by a minting smart contract that may mint VIRL token(s) after receiving a request to mint one or more new VIRL tokens, such as NFTs or fungible tokens tied to a physical good. The request may indicate a template ID and/or a set of attributes and a user account to which the VIRL tokens will be initially assigned. In embodiments, the template ID or set of attributes may be indicative of the type of VIRL token that will be generated, as the template (or the set of attributes) may define the name of the VIRL token (e.g., a descriptor of the VIRL token), and/or any other features of interest. The minting smart contract may determine a set of attributes for the VIRL token to be minted. In embodiments, the set of attributes may be defined in the template indicated by the template ID provided in the request. In these embodiments, the minting smart contract may retrieve the template based on the template ID. Alternatively, the request may explicitly include the set of attributes.

In embodiments, the minting smart contract may mint a new VIRL token based on the set of attributes and generate a unique value (e.g., a hash value) that represents and uniquely identifies the VIRL token. The minting smart contract may also determine a minting number, whereby the minting number is indicative of a relative order when the VIRL token was generated in comparison to other VIRL tokens of the same type. For example, a VIRL token associated with the first physical good created in a production series that creates a plurality of the physical goods may be "printed" such that the first VIRL token among the group may have a minting number of 01, the second VIRL token in the group a minting number of 02, and so forth. The minting number may confer a status on a user having, for example, an early minting number indicating that they were an "early adopter" of the physical good(s) associated with the VIRL token(s). In embodiments, VIRL tokens of different types may have common minting numbers. In embodiments, the minting smart contract may assign a VIRL token to an account of a user of the VIRL marketplace. In embodiments, the minting smart contract may update a ledger (e.g., a blockchain) to reflect that the new VIRL token is owned by a specified account.

In embodiments, a VIRL escrow sale process may be at least partially implemented using a set of distributed ledgers hosted by a network of node devices, where the node devices execute smart contract instances that are created in connection with a VIRL escrow sale process, including one or more smart contracts that manage the transfer of one or more VIRL tokens associated with a physical good held in escrow and/or a physical good that is to be produced in the future. In some embodiments, one or more stages in the VIRL escrow sale process may be managed by a respective set of smart contracts 10804. In general, a smart contract may include a computer executable code that, when executed, executes conditional logic that triggers one or more actions. Smart contracts may receive data from one or more data sources, whereby the conditional logic analyzes the data to determine if certain conditions are met, and if so, triggers one or more respective actions. Examples of smart contracts are discussed throughout the disclosure, including examples of conditional logic and triggering actions. In embodiments, the smart contracts associated with a VIRL marketplace may be defined in accordance with one or more protocols, such as the Ethereum protocol, the WAX protocol, and the like. Smart contracts may be embodied as computer-executable code and may be written in any suitable programming languages, such as Solidity, Golang, Java™, JavaScript™, C++, or the like. In example embodiments, a distributed ledger may store and the node devices may execute instances of: configuration smart contracts, minting smart contracts, token management smart contracts, redemption smart contracts, or some other type of smart contract associated with a VIRL token that is associated with a physical good held in escrow and/or a physical good that is to be produced in the future.

Figure 79:
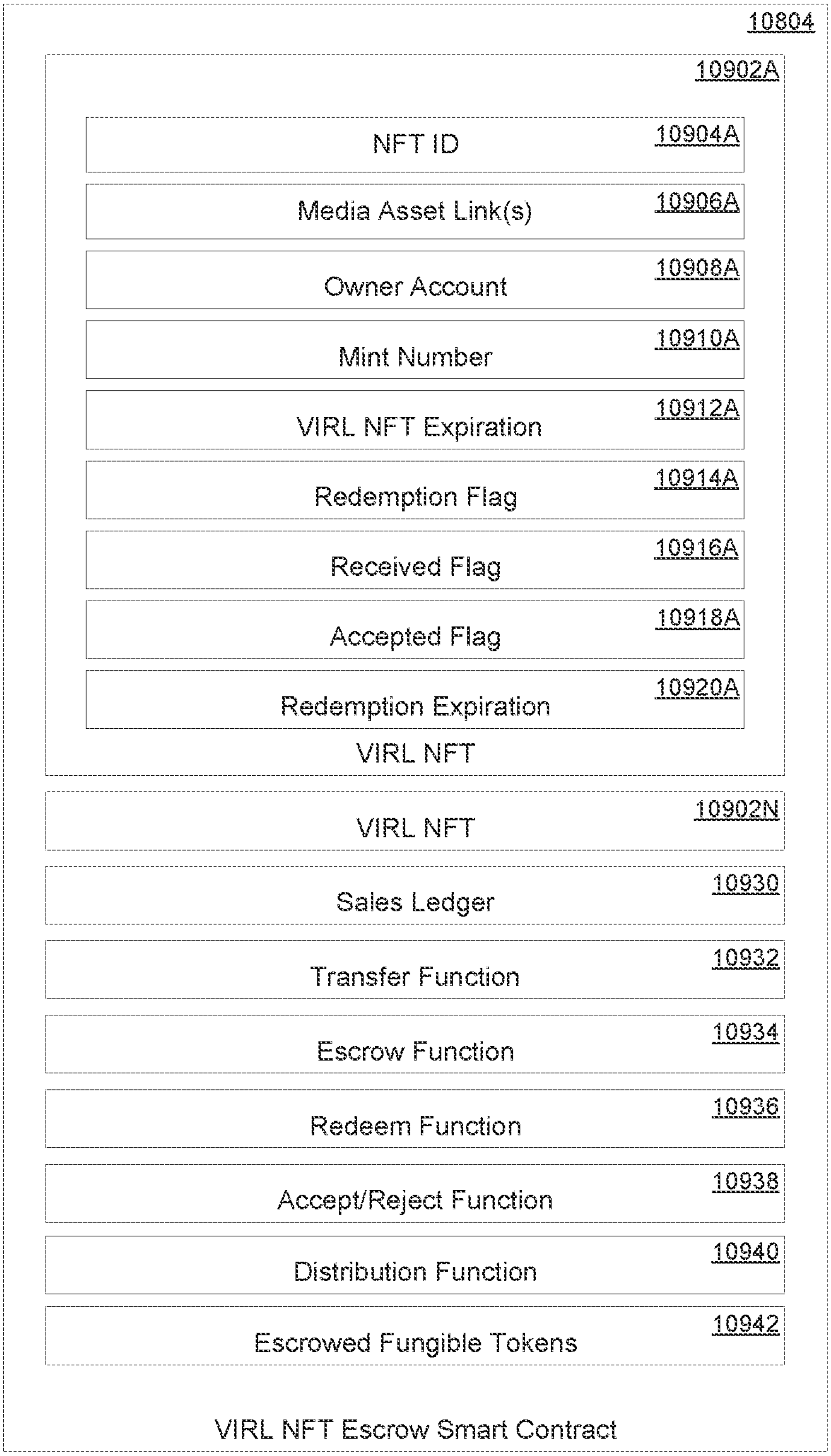
FIG. 79 is a schematic illustrating an example smart contract for escrowing tokens related to sales of distributed ledger tokens linked to physical goods in order to mitigate risks according to some embodiments of the present disclosure.

FIG. 79 illustrates an example smart contract 10804 that wraps a set of VIRL NFTs 10902A-N, escrows funds, and includes data and functions for managing the escrow sales process. The smart contract 10804 may wrap one or more VIRL NFTs 10902A-N. In some of these embodiments, the one or more VIRL NFTs, including their attributes and links to off-chain data, are stored or accessible by the smart contract 10804. In the illustrated embodiments, example attributes 10904A-10920A are shown for a first example VIRL NFT 10902A. Other VIRL NFTs may store similar or different attributes, and in alternate embodiments the smart contract 10804 may additionally or alternatively store fungible VIRL tokens.

In embodiments, the VIRL NFT attributes may include a unique NFT identifier 10904A, which may be used to uniquely identify the VIRL NFT on the distributed ledger. In embodiments, the VIRL NFT may include a media asset links attribute 10806A that may store one or more links, such as IPFS hashes that reference respective media contents in IPFS, references to off-chain data that may be include images, videos, descriptions, and/or other representations of the physical good corresponding to the VIRL item. In embodiments, the VIRL NFT may include an owner account attribute 10908A, which may be a mutable attribute used to store a current owner of the VIRL NFT 10902A. In some implementations, the owner account attribute 10908A may be initially initialized to indicate a creator wallet 10802 and may later be updated to indicate a buyer wallet 10808 when a purchaser buys the VIRL NFT 10902A. In embodiments, the VIRL NFT may include a mint number attribute 10910A, which may store a sequential mint number that identifies the order of minting for a series of VIRL NFTs 10902A. In embodiments, mint numbers may be used by a marketplace, redemption smart contract, or other systems/contracts as described elsewhere herein, to provide special benefits, distribute pre-minted VIRL NFTs randomly upon sale, and/or otherwise as described herein.

In embodiments, the VIRL NFT may include a VIRL NFT expiration attribute 10912A that may indicate an amount of time during which the VIRL NFT must be redeemed. For example, the VIRL NFT expiration attribute 10912A may store a timestamp after which the VIRL NFT may longer be redeemed and/or a timestamp that triggers automatic redemption by the current holder. In embodiments, creators of the VIRL NFTs may adjust a VIRL NFT expiration time in order to secure revenue more quickly, in order to maximize secondary sales, to ensure that items are not stored indefinitely in an escrow facility, or to further any other goal. For example, if the creator sets the VIRL NFT expiration in the near future, then the VIRL NFT may be redeemed sooner, leading to a faster release of funds from escrow, but reducing the potential secondary sales. In embodiments in which the creator receives a portion of the profit from resales, the creator may be incentivized to designate a more temporally distant expiration time in order to maximize resale profits.

In embodiments, the VIRL NFT may include a redemption flag attribute 10914A, which may be a mutable attribute storing an indication of whether the VIRL NFT has been redeemed or not. For example, when a redeemer redeems the VIRL NFT by calling a redeem function 10936, the redemption flag 10914A may be updated to indicate a redemption, and in response one or more off-chain devices involved in shipping the physical good may monitor and observe the updated redemption flag to begin the shipping process.

In some embodiments, the VIRL NFT may include a received flag attribute 10916A, which may be a mutable attribute storing an indication of whether the physical good has been received by the redeemer or not. In embodiments, the received flag 10916A may be updated by the accept/rejection function 10938 or by another function configured to receive an indication of whether the physical good was received or not. In embodiments, the received flag may be updated automatically based on a shipping delivery confirmation provided by a shipper, which may be received by a distributed ledger oracle that communicates with the smart contract 10804. In embodiments, the received flag 10916A may be used to control what happens by default when a redemption expiration occurs without the accept/reject function 10938 being called. For example, if the redemption time period expires but the received flag is set to nil/zero/false (e.g., indicating that the physical good has not been received) and/or an oracle indicates that the physical good has not been received, then the physical good may be deemed rejected by default. Conversely, if the redemption time period expires but the received flag is set to yes/one/true (e.g., indicating that the physical good has been received) and/or an oracle indicates that the physical good was received, then the physical good may be deemed accepted by default.

In some embodiments, the VIRL NFT may include an accepted flag attribute 10918, which may be a mutable attribute that is updatable by the accept/reject function 10938. The accepted flag 10918 may be used to control the distribution of escrowed fungible tokens 10942 by the distribution function 10940.

In some embodiments, the VIRL NFT may include a redemption expiration attribute 10920A, which may include a temporal value (e.g., date and/or time) indicating a time after which a default accept/reject decision may be made. The redemption expiration attribute 10920A may be set after the redeem function 10936 is called, with the redemption expiration occurring a fixed amount of time (e.g., 2 weeks, or some other sufficient time to allow for shipping, inspection, etc.) from the redeem function call.

In embodiments, the smart contract 10804 may store an escrow ledger 10930 that may record the amounts of the initial sale and each secondary sale. For example, to accomplish the first sale from the creator to the first buyer, the marketplace 10806 may be configured to call a custom transfer function 10932 provided by the smart contract 10804, including an argument indicating the sale price, and/or the provide the sale funds to the smart contract 10804 using an escrow function 10934. The amount of the first sale (e.g., as indicated by the transfer function argument or the amount of funds deposited via the escrow function) may then be recorded in the ledger 10930 along with an indication of an account of the seller (e.g., the creator wallet) and an account of the buyer (e.g., the first buyer wallet). Then, if the first buyer resells to a second buyer, another line in the escrow ledger may indicate the amount of the second sale, the account of the seller for the second sale, an account of the buyer for the second sale, and/or the profit from the second sale (which may be the amount being escrowed from the second sale). In this way, a record of each sale may be maintained in the escrow ledger 10930, which may be used to distributed escrowed funds to various accounts upon redemption.

As a concrete example, a creator may initially sell the VIRL NFT to a first buyer for 200 cryptocurrency tokens (e.g., WAX tokens in this example, but could be any other suitable cryptocurrency), the first buyer may then resell to a second buyer for 250 cryptocurrency tokens, and the second buyer may resell to a third buyer for 350 cryptocurrency tokens, whereupon the third buyer may redeem the VIRL NFT. In this example, for the initial sale, the escrow ledger may record the original purchase price of 200 cryptocurrency tokens and escrow the 200 cryptocurrency tokens. For the second sale, the escrow ledger may record the secondary purchase price of 250 cryptocurrency tokens, the seller (e.g., the first buyer) and buyer (e.g., the second buyer) accounts, and escrow the profit amount of 50 cryptocurrency tokens while distributing the remainder proceeds (200 cryptocurrency tokens) to the first buyer. For the third sale, the escrow ledger may record the secondary purchase price of 350 cryptocurrency tokens, the seller (e.g., the second buyer) and buyer (e.g., the third buyer), and escrow the profit amount of 100 cryptocurrency tokens while distributing the remainder (250 cryptocurrency tokens) to the second buyer. Then, during redemption by the third buyer, if the item is rejected due to being fraudulent, never received, etc., the smart contract 10804 may return the escrowed amount (350 tokens) to the third buyer/redeemer. However, if the item is accepted, the smart contract may release and distribute 200 cryptocurrency tokens to the respective account of the creator, 50 cryptocurrency tokens to the respective account of the first buyer, and 100 cryptocurrency tokens to the respective account of the second buyer.

In a second example, the chain of resales may include a sale at a loss. For example, a creator may initially sell the VIRL NFT to a first buyer for 200 cryptocurrency tokens, the first buyer may sell at a loss to a second buyer for 150 cryptocurrency tokens, the second buyer may sell at a profit to a third buyer for 250 cryptocurrency tokens, and the third buyer may redeem. In this example, the sales details may be recorded in the escrow ledger 10930 as described above. In embodiments, upon rejection of the physical good, the second buyer may be made whole for the loss. For example, 200 cryptocurrency tokens may be escrowed from the first sale, nothing may be escrowed from the second sale (due to the loss), and 100 tokens of profit may be escrowed from the third sale, for a total of 300 escrowed cryptocurrency tokens. Thus, upon rejection, the third buyer may be refunded 250 cryptocurrency tokens and the first buyer may be refunded 50 cryptocurrency tokens to make the first buyer whole. In this example, if the item is accepted, the first buyer would not recoup any of the losses and the smart contract releases the 100 cryptocurrency tokens to the respective account of the second buyer.

In embodiments, a transfer function 10932 may be used to transfer ownership of the VIRL NFT 10902 from a seller to a buyer. In other words, the transfer function may re-assign the value of the owner account 10908A of a specified VIRL NFT 10902 from a seller wallet to a specified buyer wallet. In embodiments, the transfer function 10932 may be restricted such that it may only be invoked by a transaction signed with the private key of the wallet indicated in the owner account. In embodiments, the transfer function may accept arguments indicating sales data that may be recorded in the escrow ledger 10930.

In embodiments, the smart contract 10804 may include an escrow function 10934 that may be used to receive fungible tokens that are used to purchase a VIRL NFT 10902. The escrow function 10934 may be called, for example, by a marketplace 10806, or by a buyer device or buyer wallet 10808, to escrow fungible tokens in conjunction with a sale, as described above for steps 10858 and 10868. In some embodiments, the escrowed fungible tokens 10942 may be assigned to a distributed ledger account associated with the smart contract 10804 that wraps the VIRL token.

In embodiments, the smart contract 10804 may include a redeem function 10936 that may be called by a current owner of the VIRL NFT 10902 in order to redeem the VIRL NFT and execute a redemption workflow, as described above for steps 10874-10878. In embodiments, the redeem function may accept, as one or more arguments, shipping information (e.g., as provided by the redeeming user via a graphical user interface) and/or a link to off-chain shipping information (e.g., an IPFS hash to shipping information of the redeeming user stored on IPFS), which may be used by an off-chain device to initiate a shipping process. In some embodiments, the redemption function 10936 may also update the redemption flag 10914A to indicate that redemption is initiated. In embodiments, the distributed ledger crawler system 10040 may be configured to monitor for transactions that update the redemption flag 10914A (e.g., during preprocessing), and notify one or more off-chain devices responsible for shipping the physical good (e.g., the creator device 10802, any third party with custody of the physical good, etc.). Additionally or alternatively, if the creator device is associated with a social media account or other account (e.g., in a social graph 10108), the distributed ledger crawler system 10040 may send a notification of the redemption to the creator device.

In embodiments, the smart contract 10804 may include an accept/reject function that may be called by a current owner of the VIRL NFT 10902 and/or an authorized third party, such as an auditor or validator, in order to indicate that the physical good is accepted or rejected, and/or that the physical good has been received or not received, which may impact the redemption workflow as described for steps 10876-10882. In embodiments, the accept/rejection function may update the received flag 10916A and/or the accepted flag 10918A to indicate that the physical good has been received or not received, rejected or accepted, etc., which may be used by the smart contract 10804 to control distribution of escrowed fungible tokens 10942.

In embodiments, the smart contract 10804 may include a distribution function 10940 that may be used to distribute escrowed fungible tokens 10942 to the various accounts as described above, based on the escrow ledger 10930, depending on whether the physical good was accepted or rejected, received or not received, etc. (e.g., as indicated by the flags 10916A-10918A). In embodiments, the distribution function 10940 may execute automatically after the current time reaches a date/time indicated by the redemption expiration attribute (e.g., the smart contract 10804 may call itself, or another device such as the tokenization platform 100 may monitor the redemption expiration attribute 10920A and call the distribution function 10940 after the timestamp is reached).

Figure 80:
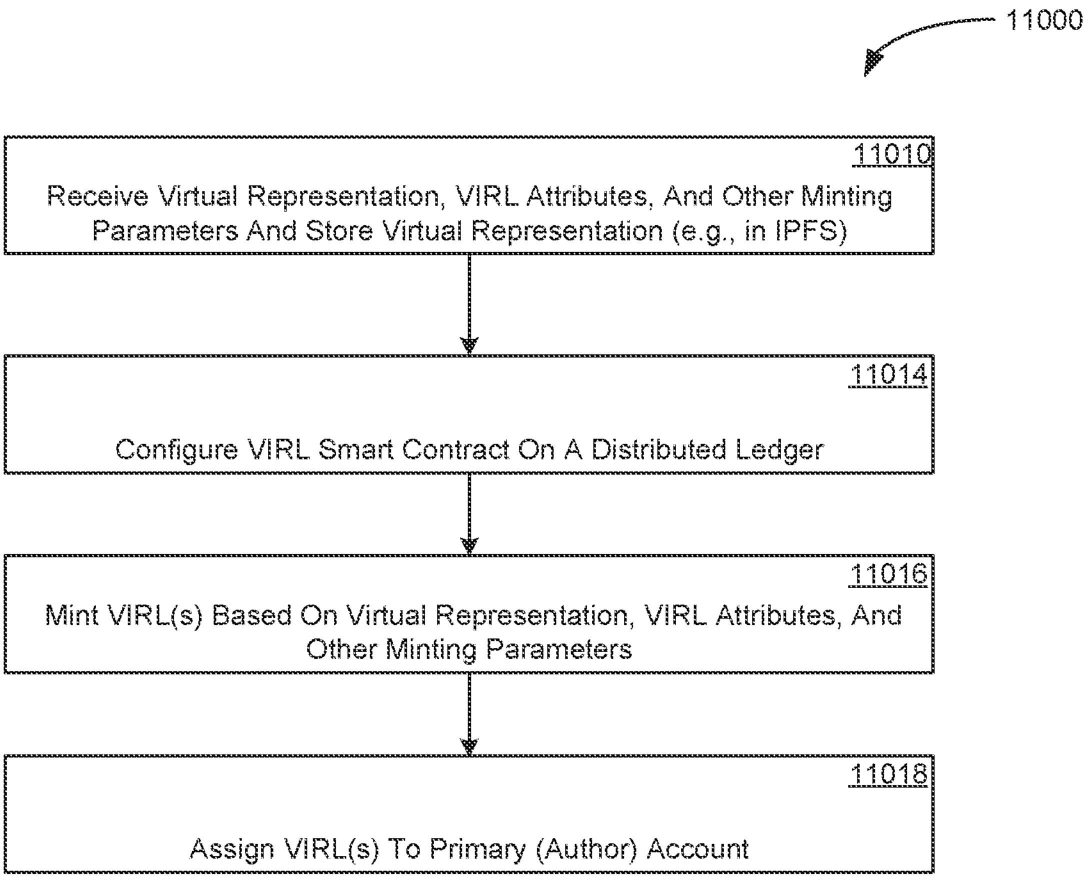
FIG. 80 is a flow chart illustrating an example set of operations of a method for minting a VIRL token and related smart contract(s) configured to mitigate risk for sales of the VIRL token according to some embodiments of the present disclosure.

FIG. 80 illustrates an example method 11000 for creating and initializing a VIRL token (e.g., a VIRL NFT or a VIRL fungible token) according to some embodiments of the present disclosure. In some embodiments, the method 11000 may be executed by a tokenization platform 100, which may provide an interface for receiving information from a VIRL creator, and may interface with one or more node devices to cause distributed ledger transactions. In some of these embodiments, the tokenization platform 100 may include or interface with a minting smart contract that mints the VIRL tokens.

At step 11010, the tokenization platform may receive one or more virtual representation(s) of a physical good (e.g., videos, images, descriptions, other media or data assets, and/or links thereto), one or more VIRL attributes, and/or other minting parameters. The tokenization platform 100 may then store the virtual representations in a suitable storage location (e.g., IPFS) if the virtual representations are not already stored there.

In embodiments, the tokenization platform 100 may provide a user interface that may allow a creator device 10802 to interface with the tokenization platform 100, upload various data/media assets such as virtual representations, select various attributes or other minting parameters (e.g., using interactive menus or the like), and/or otherwise configure the VIRL token(s) and/or smart contract(s) prior to generation and deployment of the VIRL token(s)/smart contract(s). For example, the creator device may specify any of the VIRL token attributes described above in conjunction with the example VIRL NFT 10902A, or other token attributes described elsewhere herein. In embodiments, some of the VIRL token attributes may be generated by the tokenization platform 100, such as IPFS hashes that may be received and stored when the tokenization platform 100 stores media representations via IPFS, default attribute values, etc. The creator device may further specify any other data for configuring a smart contract, such as any data described above for the smart contract 10804 of FIG. 79. Such data may include, for example, an indication of whether resale profits should be escrowed or not, whether to distribute a portion of escrowed secondary sales profits to the creator, and/or the like.

At 11012, the tokenization platform 100 may configure a VIRL smart contract 10804 on a distributed ledger. For example, the tokenization platform 100 may initiate one or more distributed ledger transactions that clone a standard wrapper smart contract to a new smart contract address, then configure the new smart contract with the appropriate smart contract functions (e.g., by uploading smart contract code, smart contract data, and/or the like). The data may include the virtual representation data, one or more VIRL attributes, and/or other minting parameters received at step 11010, and/or nay other data that may be used to configure the smart contract 10804. Additionally or alternatively (e.g., depending on the underlying distributed ledger), the tokenization platform 100 may upload one or more VIRL token templates that are parameterized with the various virtual representations and/or VIRL attributes to an existing mint smart contract, and deploy a separate token management smart contract 10804 with the various functions for managing the VIRL tokens.

At 11014, the tokenization platform 100 may initiate one or more distributed ledger transactions that mint one or more VIRL tokens based on the virtual representations, the VIRL attributes, and/or the other minting parameters received at 11010. For example, if the minting parameters specify that 100 VIRL tokens should be minted, the tokenization platform 100 may mint 100 VIRL tokens accordingly. The tokenization platform 100 may mint the VIRL tokens within a VIRL wrapper smart contract 10804 (e.g., as illustrated at FIG. 79), or may mint the VIRL tokens into a separate storage smart contract 10804 that may hold the VIRL tokens, where the storage smart contract may be managed by a token management smart contract that includes the various smart contract functions described with respect to FIG. 79. The VIRL tokens, once minted, may include all of the VIRL attributes described herein, such as a unique identifier 10904A, one or more media asset links 10906A, a mint number 10910A, etc. Some of the attributes may be initialized to default values, such as a redemption flag 10914A, a received flag 10916A, an accepted flag 10918A (which may be initialized to false), an owner account 10908A, a redemption expiration 10920A (which may be initialized to nil), etc. At 11018, the tokenization platform 100 may set the owner accounts for the VIRLs to the creator wallet 10802, and/or otherwise update any VIRL attributes, to complete the generation and configuration of the VIRL tokens and associated smart contracts.

Figure 81:
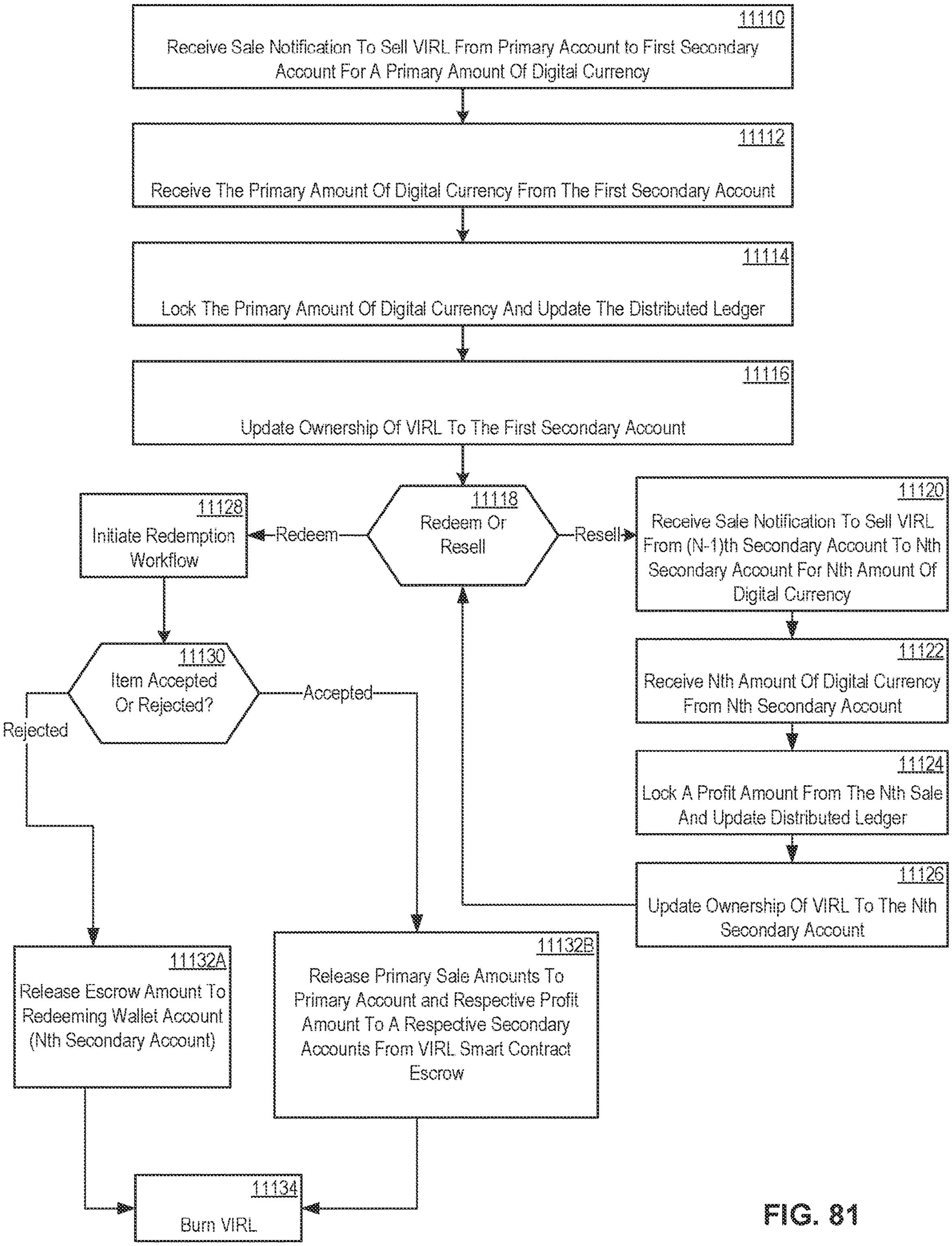
FIG. 81 is a flow chart illustrating an example set of operations of a method for escrowing tokens used to purchase a VIRL token according to some embodiments of the present disclosure.

FIG. 81 illustrates an example escrow sales process that may be executed, in some embodiments, by a tokenization platform 100 and/or components thereof. In some of these embodiments, the tokenization platform 100 may include or interface with a smart contract 10804 that wraps a VIRL token, wherein the smart contract 10804 is configured to manage an escrow sales process. For brevity, the steps below may be described as being performed by the platform 100 or smart contract 10804, but it should be understood that various steps may be performed by the marketplace 102, ledger management system 104, and/or other components of the tokenization platform 100. At 11110, the platform 100 or smart contract 10804 may receive a sale notification to sell the VIRL token from a primary account (e.g., a creator account) to a first secondary sale account for a primary amount of fungible tokens or other digital currency. In embodiments, the sale notification may be responsive to a marketplace listing for the VIRL token, which may have been created by a creator using a creator device 10802. For example, the creator may have used a creator device 10802 to interface with the platform 100 via a marketplace 102 to generate one or more sales listings after creating the VIRL token(s) using the method 11000. The sales listing(s) may each specify, for example, a listed price, a minimum bid, the unique identifiers of one or more VIRL tokens to sell via the marketplace, etc. In some embodiments, as part of creating the listing, the creator may be required to temporarily transfer the VIRL tokens to an account associated with the marketplace 102, and/or to provide permissions to the platform 100 and/or smart contract 10804 to access the creator's wallet and transfer the VIRL tokens being offered for sale.

At 11112, the smart contract 10804 may receive the primary amount of digital currency from the first secondary account. For example, the first secondary account may initiate a fungible token transaction that transfers the primary amount of fungible tokens to a distributed ledger account (e.g., an account of the platform 100 or an account associated with the smart contract 10804). At 11114, the smart contract 10804 may lock the primary amount of digital currency (e.g., in an escrow account controlled by the platform 100 or smart contract 10804) and update the distributed ledger to include a first entry indicating the primary amount, the primary account, and the first secondary account. In embodiments, the first entry may be stored in an escrow ledger maintained by the smart contract 10804. Additionally or alternatively, the first entry may be stored in a side chain or "shard" of the distributed ledger. For example, the protocol of the ledger may allow one or more side chains to respective blocks of the distributed ledger. In some of these embodiments, when a new VIRL token is minted and written to the distributed ledger, the data block that corresponds to the VIRL token may include a side chain that maintains the escrow ledger for any sales of the VIRL token.

At 11116, the smart contract 10804 may cause the ownership of the VIRL to be updated on the distributed ledger. In embodiments, the smart contract may update an owner attribute of the VIRL to indicate a distributed ledger account of the buyer of the token (which may be stored on the distributed ledger or elsewhere).

At 11118, the owner of the VIRL may decide to redeem or resell the VIRL. If the owner of the VIRL decides to resell it, then at 11120 the smart contract 10804 may eventually (e.g., after another buyer decides to purchase the VIRL, for example via another marketplace listing) receive a sale notification to sell the VIRL to the next purchaser for another amount of digital currency. Because steps 11120-11126 form a loop, such that step 11120 may executed for N number of sales, for any value of N, sale notifications may be received for a sale from the (N−1)th purchaser (e.g., the previous purchaser) to the Nth purchaser (e.g., the current purchaser), for an Nth amount of digital currency, which may represent a profit, loss, or no gain from the previous sale. For each sale, at 11122 the platform 100 and/or smart contract 10804 may receive the Nth amount of digital currency from the Nth secondary account (e.g., the current purchaser), and at 11124 lock a profit amount (if any) determined by comparing the Nth sale amount to the (N−1)th sale amount in an escrow account (e.g., an account maintained by the platform 100 or smart contract 10804) and update the distributed ledger to include an Nth entry indicating the Nth amount, the (N−1)th account (seller account), the Nth account (buyer account), and/or an Nth profit amount (if any). In embodiments, the smart contract 10804 may then cause the ownership of the VIRL to be updated on the distributed ledger (e.g., by updating an owner attribute of the VIRL, which may be stored within the smart contract 10804 or elsewhere), completing the Nth sale and allowing the new owner to again decide whether to resell or redeem.

At 11128, after an owner indicates a desire to redeem (e.g., by instructing the platform 100 to redeem the VIRL and/or calling a redeem function of a smart contract 10804), the smart contract 10804 may initiate a redemption workflow, which may include updating a distributed ledger to lock the VIRL, indicate that a redemption period has begun for the VIRL, retrieve shipping information from the redeemer, cause a current holder of the physical good corresponding to the VIRL ship the physical good to an auditor (e.g., for validation) and/or to the redeemer (e.g., after approval by the auditor, if any). At 11130, the smart contract 10804 may receive an indication that the physical good is accepted or rejected (e.g., the auditor or redeemer may interface with the platform 100 and/or call an accept/rejection function of the smart contract 10804).

If the physical good is rejected, at 11132A the smart contract 10804 may release the escrowed amount from the wallet controlled by the smart contract 10804 to an account associated with the redeeming wallet (e.g., the Nth purchaser). Additionally or alternatively (e.g., if the escrowed amount is greater than the Nth sale mount, e.g. due to one or more losses), the extra escrowed amount may be distributed to the accounts that sold for losses, or otherwise apportioned among the various parties (e.g., distributed equally to each reseller). Conversely, if the physical good is accepted, the platform 100 or smart contract 10804 may release the primary sale amount to the primary account (e.g., creator wallet 10802) and one or more respective profit amounts to each respective secondary accounts, as indicated by the one or more entries stored on the distributed ledger (e.g., in an escrow ledger corresponding to the token), as shown at step 11124. In either case, after redemption finishes, the platform 100 or smart contract 10804 may burn the VIRL at 11134.

The method of FIG. 81 is provided for example only. It is appreciated that the foregoing method may be implemented as programmatic logic that may be executed by one or more smart contracts that manage a VIRL token. The method may include additional or alternative steps without departing from the scope of the disclosure. Additionally, some of the steps provided above may be performed (at least in part) by a centralized computing system (e.g., centralized components of the tokenization platform 100).

In embodiments, when a tokenization platform 100 and/or smart contract 10804 generates a VIRL token, the distributed ledger may be updated to indicate the existence of a new VIRL token. A distributed ledger associated with a VIRL marketplace may be public or private. In embodiments where the distributed ledger is private, the platform 100 may maintain and store the entire distributed ledger on computing device nodes associated with the VIRL marketplace. In embodiments where the distributed ledger is public, one or more third party computing node devices (or "computing nodes") that are not associated with the VIRL marketplace may collectively store the distributed leger. In some of these embodiments, the VIRL marketplace may also locally store the distributed leger and/or a portion thereof. In embodiments, the distributed ledger associated with a VIRL marketplace may be a blockchain. Alternatively, the distributed ledger associated with a VIRL marketplace may comport to other suitable protocols (e.g., hashgraph, Byteball, Nano-Block Lattice, IOTA, or some other protocol). By storing tokens on a distributed ledger, the status of that token can be verified at any time by querying the ledger and the status may be trusted. By using the token approach to implementation, VIRL tokens, redemption tokens, and the like cannot be copied and redeemed without permission.

In embodiments, the distributed ledgers may store tokens that are used in connection with a VIRL marketplace, including, but not limited to, VIRL tokens, redemption tokens, and other suitable tokens as described herein, that are generated in connection with the VIRL escrow sale process and held to secure a right to redeem a physical good held in escrow and/or a physical good that is to be produced in the future.

In embodiments, distributed ledgers may store additional data, such as VIRL data and VIRL event records, ownership data, and/or supporting data. VIRL event records may include records that memorialize any events that occur in connection with a VIRL escrow sale process. In embodiments, an event record may be generated by any suitable computing device within the ecosystem 2000, such as the tokenization platform 100, user devices, or some other type of device associated with the VIRL marketplace. In embodiments, a VIRL event record may be hashed using a hashing function to obtain a hash value. The VIRL event record may be written into a data block and stored in a distributed ledger, where the data block may include the hash value. In this way, the data within the VIRL event record cannot be changed without changing the hash value of the event record 4152, thereby making the VIRL event record immutable. Once a block containing a VIRL event record is stored on a distributed ledger, the VIRL event record may be referenced using an address of the block with respect to the distributed ledger. In embodiments, supporting data may be documentation and data that is provided in support of a task performed or other events that occur in connection with a VIRL marketplace and/or the participants of the VIRL marketplace.

In embodiments, ownership data may include data that associates a VIRL token to an account, including but limited to a purchaser's account, a VIRL token creator's account, or some other type of account associated with a VIRL marketplace, including secondary marketplaces external to the platform 100. In embodiments, ownership data may be stored in data blocks, where a data block may include a link between a token address and an account address. For example, if a purchaser, such as an individual registered on a VIRL marketplace platform, owns cryptocurrency tokens (e.g., bitcoins), the ownership data of each token may be stored on a distributed ledger and may link the respective tokens to an account associated with the purchaser. If the purchaser uses one of those tokens to purchase an item from a VIRL token creator that is registered on the VIRL marketplace platform, the ownership data of the token can be updated to link the token used to purchase the redemption right to an account of VIRL token creator. When ownership changes to a new account, a new block may be amended to the distributed ledger that links the token with the new account. In embodiments, distributed ledgers, VIRL event records, ownership data, and supporting data and other suitable data that supports the VIRL marketplace may be stored in non-distributed datastores, filesystems, databases, and the like. For example, in embodiments, the tokenization platform 100 may maintain data stores that store VIRL event records, ownership data, and supporting data and other suitable data that supports the VIRL marketplace.

In embodiments, an owner of a VIRL token may redeem the VIRL token representing the right to a physical good held in escrow and/or a physical good that is to be produced in the future. In embodiments, a user may select a VIRL token to redeem from a digital wallet of the user. In response to the selection, the digital wallet may transmit a redeem request to the VIRL marketplace and/or the associated platform 100. The redemption request may include the VIRL token (or an identifier thereof) and a public address of the user (or any other suitable identifier of the user). In an example, the VIRL marketplace may receive the redemption request and verify the validity of the VIRL token and/or the ownership of the VIRL token. Once verified, the user may be granted permission to redeem the VIRL token and ultimately obtain the physical good held in escrow and/or a physical good that is to be produced in the future.

In embodiments, the redemption system 404, as described herein, may allow an owner of a VIRL token, VIRL redemption token, or other token, to redeem a token for a physical good held in escrow and/or a physical good that is to be produced in the future. The redemption system 404 may receive a request, such as a request from a user of a VIRL marketplace, including a secondary marketplace, as described herein, to redeem (or "redemption request") the VIRL token. The redemption system 404 may be included in a VIRL marketplace, associated with a VIRL marketplace, or independent from and operably connected with a VIRL marketplace. The redemption request may include the VIRL token or an identifier of the VIRL token (e.g., an alphanumeric string) and may include a public address of the account of the user attempting to redeem the VIRL token. In response to receiving the redemption request, the redemption system 404 may provide the VIRL token, the public address of the account of the user attempting to redeem the token, and the public key used to digitally sign the VIRL token to the ledger management system 104. The ledger management system 104 may then either verify or deny the token/public address combination. The ledger management system 104 may deny the combination if the VIRL token is not a valid VIRL token and/or the user is not the listed owner of the VIRL token. The ledger management system 104 may verify the token/public address combination if the VIRL token is deemed valid and the requesting user is deemed to be the owner of the VIRL token. In embodiments, the redemption system 404 may execute a workflow corresponding to the virtual representation to which the redeemed VIRL token corresponds, as described herein.

In embodiments, the ledger update system 304 may be further configured to destroy, or "burn," VIRL tokens. Destroying VIRL tokens (or redemption tokens) may refer to the mechanism by which a VIRL token (or redemption token) is no longer redeemable. A VIRL token may be destroyed when the VIRL token expires, when the VIRL token is redeemed, or upon some other event defined by the VIRL creator. In embodiments, the ledger update system 304 may update the ownership of the VIRL token to indicate that the token is not currently owned (e.g., owner=NULL) and/or may update the VIRL token state to indicate that the token is no longer valid. In some embodiments, the ledger update system 304 may generate a block indicating that the VIRL token is not currently owned or that the state of the VIRL token is not valid. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In some embodiments, the distributed ledger 310 is sharded. In these embodiments, the ledger update system 304 may designate a side chain 314 (e.g., an item classification) to which the VIRL token corresponds. In these embodiments, the generated blocks are amended to the designated side chain 314 to indicate the destroyed VIRL token. It is noted that in some embodiments, burning a VIRL token may result in the digital token no longer appearing in the user's account. Alternatively, burning a VIRL token may result in the token being no longer redeemable, but still appearing in the user's digital wallet, such that user may still derive some value from the VIRL token (e.g., in-game benefits, proof of authenticity, tradability, or the like).

In embodiments, the tokenization platform 100 may be configured to perform analytics on various stages of the VIRL escrow sale processes. In some of these embodiments, the analytics and reporting system 112 may be configured to obtain VIRL event records and/or supporting data from the set of distributed ledgers to determine outcomes related to a VIRL escrow sale process. The analytics and reporting system 112 may be configured to provide ratings to different participants in the VIRL marketplace. The analytics and reporting system 112 may collect additional or alternative data relating to VIRL marketplace participants, such as feedback of other participants. The analytics and reporting system 112 may then apply a scoring function to the outcome and other feedback data related to participants to assign scores to the participants. In embodiments, the analytics and reporting system 112 may obtain data from the distributed ledgers. In some of these embodiments, a node device may be configured as a "history node" that monitors all data blocks being written to the distributed ledgers. The history node device may process and index each block as it is being written to the ledger and may provide this information to the analytics and reporting system 112. The analytics and reporting system 112 may then perform its analytics on the data collected by the history node. In an example, the analytics may generate a risk score associated with a user based at least in part on historical data relating to the user. The analytics and reporting system 112 may collect data from the distributed ledger in other suitable manners without departing from the scope of the disclosure.

Persistent, Non-Transferable Tokens

In some embodiments of the present disclosure, the tokenization platform 100 may be configured to provide non-transferable digital tokens, which are configured to persist in a user account, such as in the wallet of an initial recipient. In embodiments, a non-transferable digital token may help identify, for example, the original owner of an NFT, a VIRL, or other token, such that inspection of the wallet and discovery of the token by an outside system enables the outside provider to provide benefits to the owner. The persistent presence of the token in the wallets of original owners allows parties who originate tokens to maintain a persistent relationship with customers who acquire them, rather than having the relationship disappear as the tokens are transferred to others. In embodiments, a token offering may pair a transferable token with a non-transferable token, such that the original owner retains the non-transferable token as an indicator, while the transferable token can be passed on to others. In various alternative embodiments, a pair (or other n-tuple) of tokens may include various combinations of a non-transferable token with transferable tokens, tokenized tokens, NFTs, fungible tokens, VIRLs, tokens with limited period redemption rights, and the like.

In various alternative embodiments, other digital experiences can be provided that follow the mechanics described above involving mystery boxes and digital trading cards, including mechanics of minting, crafting, and transfers of ownership to and from a wallet, among others. For example, rather than digital trading cards, such digital objects may include digital avatars, video game characters, video game objects (such as artifacts, tools, weapons, skins, and many others), digital advertising elements, and many others. References to digital trading cards should be understood to encompass these alternatives except where context indicates otherwise.

Acquisition Codes for Facilitating Token Sales

In some embodiments, transfers and other transactions (e.g., promotional giveaways, gifts, or the like), or components thereof, of individual digital tokens (e.g., NFTs and/or fungible tokens, including VIRLs) and/or mystery boxes or similar entities that can be "unpacked" or unlocked for digital tokens may be facilitated via third party marketplaces (e.g., e-commerce and auction websites) or other digital or physical mediums (e.g., television shows, video streams, print media, advertising media and/or the like), and/or otherwise based on media that may be stored outside of a distributed ledger. One issue is that many of these "off-chain" media may not have infrastructure to conveniently integrate their respective platforms with blockchain- or ledger-based digital environments. Additionally, such "off-chain" media may be more accessible to users that do not yet have a blockchain or other distributed ledger wallet/account set up, or that are not familiar with the systems for accessing their blockchain or other distributed ledger wallet/account. Thus, such "off-chain" media may provide a convenient entry point to users that wish to begin acquiring distributed ledger tokens and/or to acquire distributed ledger tokens without using potentially cumbersome or unfamiliar tools or tools that may not be accessible via certain devices, etc.

In embodiments, certain types of transfers or other transactional steps may be executed using "off-chain" acquisition codes, such as promotional codes. In embodiments, an off-chain acquisition code may take many suitable forms (e.g., a numerical value, a character string, an alphanumeric string, an image, a QR-code, a bar code, an audio element, and/or the like) and may be embodied in various locations, such as in website content, in advertising, in audio and video media and other content files, on print media, on in-store and point-of-sale displays, on print and digital signage, on broadcasts (radio and TV) and the like. In an example embodiment, such off-chain advertisements may be delivered using airdrop advertising methods, described elsewhere herein (e.g., the acquisition code may be stored as part of an ad via IPFS and the ad may be delivered via an airdropped NFT advertisement). In embodiments, users may obtain an off-chain acquisition code from an "off-chain" medium and then may access an on-chain medium (e.g., a decentralized digital ecosystem that is accessed using a digital wallet, an "on-chain" digital marketplace, any suitable platform that maintains or interfaces with the distributed ledger) to acquire the digital token and/or mystery box using the acquisition code. An acquisition code may be a one-to-one code, a one-to-N code, or a one-to-infinite code. A one-to-one code may be used when the code is used to acquire a specific NFT, VIRL, or other token and/or can only be used by one user one time. One-to-one codes may be used when a user purchases the NFT (or mystery box) from an off-chain medium or when the providers of the code want to be able to have more control as to the party that is submitting the acquisition code. One-to-N or one-to-at-least-one codes may be used when the tokens are being given away (e.g., "first 2000 users to submit this acquisition code" will win a free NFT) or other similar scenarios. The one-to-N codes or one-to-at-least-one codes may be used, for example, on television or other live streams, print media, social media posts, or the like.

For purposes of explanation, when reference is made to selling NFTs, gifting NFTs, running promotions using NFTs, or the like using an acquisition code, it is intended that the description may be applied to fungible tokens as well as digital mystery boxes (e.g., digital token-based trading card packs or the like). In some embodiments, a party may offer the NFTs via its eCommerce website or another suitable digital or physical medium (e.g., on a 3rd party website or other digital marketplace, on a physical pack of cards, on a scratch off label printed on the packaging of a consumer product, on a ticket (such as to a film, sporting event, play, concert, exhibition, or other venue or event), on a music album, and/or the like), whereby a user may purchase the NFT via the traditional eCommerce medium and in return or in parallel is provided with an acquisition code. The user may be provided the acquisition code in any suitable manner. For example, a seller of an NFT may provide the acquisition code to acquire the NFT by sending the acquisition code in an email or in a text or SMS message, displaying the acquisition code via a GUI and/or on-screen display, conveying the code by advertising, phone, or the like, or any other suitable means of conveying the acquisition code to the user. In some embodiments, the acquisition code may be sent with an accompanying link (e.g., a URL including or otherwise indicating the acquisition code, where the URL accesses a web site hosted by the tokenization platform or some other device configured to interface with the distributed ledger), whereby the user can access the link via a user device to be directed to an "on-chain" medium (e.g., the tokenization platform, an on-chain digital marketplace, or any other on-chain platform) that can facilitate the transfer of the NFT or other action with respect to the NFT, such as placing the NFT in a wallet of a user. In embodiments, the on-chain medium may receive the acquisition code (e.g., from the user directly via a GUI or automatically when the link is selected, scanned by a camera of the user device as in the case of QR code, and/or the like). In response to the acquisition code, the on-chain medium may verify that it is a valid code (e.g., valid acquisition codes may be stored on the distributed ledger and/or in a database). In embodiments, the acquisition codes may be verified using a smart contract deployed on the distributed ledger. For example, the smart contract may use cryptographic techniques to verify that the acquisition code is valid (e.g., the acquisition code may need to be decrypted using a private key associated with the smart contract and verified after decryption). In embodiments, the smart contract may use stored data to verify that the acquisition code is valid. For example, the smart contract may store a first data value indicating a number of digital tokens that have already been minted and/or transferred to users, and a second data value indicating a maximum number of digital tokens that are permitted to be minted and/or transferred to users, and may only verify the acquisition code if the first value is less than the second value. Additionally or alternatively, the smart contract may check the stored data for a value indicating that the acquisition code has already been used, and may only verify the acquisition code if such a value does not exist in the smart contract storage.

If the acquisition code is valid, the on-chain medium (e.g., tokenization platform, smart contract, etc.) may facilitate the transfer of the corresponding NFT to an account of the user. If the user does not yet have an account/wallet on the distributed ledger, the on-chain medium may enlist the user and help the user create a new account, which may include setting up a digital wallet (e.g., cloud-based wallet) for the user as well. If the user does have an account/wallet on the distributed ledger, the on-chain medium may determine the account (e.g., by requesting the account from the user, by receiving the account as part of the initial request that includes the acquisition code, etc.). The on-chain medium may then perform any required operations with respect to the acquisition code. For example, if the digital token is not yet minted, the on-chain medium may initiate the minting of the acquired token and the assignment of the digital token to the user account of the user after it is minted. For example, the smart contract used to verify the digital token may also be used to mint the digital token once the digital token is verified. In these embodiments. If the digital token was pre-minted, the on-chain medium may assign the digital token to the user account of the user. The digital medium may employ any suitable means of selecting the type of NFT that is redeemed (e.g., random selection using a crafting recipe, pre-assigned association between the code and a specific NFT, selecting one of many of the same type of NFTs using a certain recipe, and/or the like). If the acquisition code is a one-to-one code, then the on-chain medium may "burn" the acquisition code, such that it can no longer be used to acquire another NFT. For example, a smart contract used to validate the code may store an indication that the acquisition code has been used, and/or may update a counter to indicate that a maximum number of digital tokens have been minted and/or assigned to users. If it is a one-to-N code, then the on-chain medium may update the number of available codes that are still available for acquisition after the NFT in question had been acquired. If it is a one-to-at-least-one code, the on-chain medium may maintain a log of which user accounts have exchanged an acquisition code. These logs may be used for a number of analytical purposes and/or to prevent users from using an acquisition code multiple time.

The foregoing may be applied in a number of different types of token-based transactions. For instance, acquisition codes may be used to purchase NFTs (or fungible tokens and/or digital mystery boxes), whereby the acquiror buys the NFT on an off-chain medium and is provided a corresponding acquisition code (which may be accompanied with a corresponding link to an on-chain medium) to acquire the NFT from an on-chain medium. In another example, the acquisition codes may be used for promotions. For example, an acquisition code (e.g., a QR-code) may be printed on a movie ticket to a particular movie, such that the moviegoer may scan the acquisition code to receive a promotional NFT. In another example, the acquisition code may be printed on a gift card.

Interoperability: Oracles and Bridges

In some embodiments, the tokenization platform 100 may include, deploy, and/or interface with one or more digital oracles "(or "oracles") and/or digital bridges (or "bridges"). In embodiments, an oracle may be an "off-chain" executable that is executed by a set of processing devices that performs one or more specific tasks with respect to a blockchain. In this way, an oracle may be a bridge between the blockchain and other computing entities (e.g., centralized computing systems, different blockchains, user devices, and/or other suitable data sources). An oracle may be configured to receive data from one or more data sources and to provide the data (or derivatives thereof) to a smart contract. In some of these embodiments, an oracle may be subscribed to a data source (e.g., an RSS feed, an API, or the like), such that the oracle receives data from the subscribed to the data source. For example, the data source may push data to the oracle or the oracle may pull data from the data source via an API of the data source.

In embodiments, an oracle may be configured to provide data obtained from the data sources to one or more smart contracts and/or NFTs that are maintained on a blockchain. For example, in embodiments, an oracle may be configured to provide data to a specified smart contract (or set of smart contracts) that manages one or more NFTs. In some embodiments, an oracle may be configured to process/fuse data received from one or more data sources to obtain derived data. In these embodiments, the oracle may provide the derived data to the one or more smart contracts. Examples of oracles may include statistics oracles, video game oracles, exchange oracles, or the like. For example, a statistics oracle may connect to one or more data sources that provide statistics (e.g., sports statistics, artist statistics, or the like).

In a specific example, a stats oracle may be configured to collect sports statistics (e.g., baseball statistics, basketball statistics, football statistics, hockey statistics, soccer statistics, racing statistics, golf statistics, and/or the like) from a data source that provides real-time sports statistics (e.g., an MLB® data feed, an NBA® data feed, an NFL® data feed, an NHL® data feed, an EPL® data feed, a NASCAR® data feed, a PGA® data feed, and/or the like). In this example, the oracle may obtain stats for different players and/or teams and may report the statistics to a smart contract that governs a set of NFT trading cards. In this example, the smart contract may receive the statistics and may update the mutable digital attributes of one or more NFTs (e.g., NFT baseball cards) based on the received statistics. Additionally or alternatively, the oracle may process the statistics and may determine a score (e.g., a "power score") for each player based on that player's aggregated statistics and may provide the smart contract with the power score of each player, whereby the smart contract updates the mutable attributes of respective NFTs to reflect the latest power score of the player.

In embodiments, a bridge may refer to a system of components that facilitate data exchange between one digital ecosystem and another digital ecosystem. For example, a bridge may facilitate data exchange between a first distributed ledger system that is maintained in accordance with a first protocol (e.g., Ethereum protocol) and a second distributed ledger system that is maintained in accordance with a second protocol (e.g., WAX protocol). In this example, the bridge may be configured to facilitate the transfer of fiat currency or cryptocurrency to a distributed ledger from an incompatible digital ecosystem to a distributed ledger. In embodiments, the bridge may include an oracle that orchestrates the transfer.

CONCLUSION

The background description is presented simply for context, and is not necessarily well-understood, routine, or conventional. Further, the background description is not an admission of what does or does not qualify as prior art. In fact, some or all of the background description may be work attributable to the named inventors that is otherwise unknown in the art.

Physical (such as spatial and/or electrical) and functional relationships between elements (for example, between modules, circuit elements, semiconductor layers, etc.) are described using various terms. Unless explicitly described as being "direct," when a relationship between first and second elements is described, that relationship encompasses both (i) a direct relationship where no other intervening elements are present between the first and second elements and (ii) an indirect relationship where one or more intervening elements are present between the first and second elements. Example relationship terms include "adjoining," "transmitting," "receiving," "connected," "engaged," "coupled," "adjacent," "next to," "on top of," "above," "below," "abutting," and "disposed."

The detailed description includes specific examples for illustration only, and not to limit the disclosure or its applicability. The examples are not intended to be an exhaustive list, but instead simply demonstrate possession by the inventors of the full scope of the currently presented and envisioned future claims. Variations, combinations, and equivalents of the examples are within the scope of the disclosure. No language in the specification should be construed as indicating that any non-claimed element is essential or critical to the practice of the disclosure.

The term "exemplary" simply means "example" and does not indicate a best or preferred example. The term "set" does not necessarily exclude the empty set in other words, in some circumstances a "set" may have zero elements. The term "non-empty set" may be used to indicate exclusion of the empty set that is, a non-empty set must have one or more elements. The term "subset" does not necessarily require a proper subset. In other words, a "subset" of a first set may be coextensive with (equal to) the first set. Further, the term "subset" does not necessarily exclude the empty set in some circumstances a "subset" may have zero elements.

The phrase "at least one of A, B, and C" should be construed to mean a logical (A OR B OR C), using a non-exclusive logical OR, and should not be construed to mean "at least one of A, at least one of B, and at least one of C." The use of the terms "a," "an," "the," and similar referents in the context of describing the disclosure and claims encompasses both the singular and the plural, unless contradicted explicitly or by context. Unless otherwise specified, the terms "comprising," "having," "with," "including," and "containing," and their variants, are open-ended terms, meaning "including, but not limited to."

Each publication referenced in this disclosure, including foreign and domestic patent applications and patents, is hereby incorporated by reference in its entirety.

Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of multiple embodiments remain within the scope of this disclosure.

One or more elements (for example, steps within a method, instructions, actions, or operations) may be executed in a different order (and/or concurrently) without altering the principles of the present disclosure. Unless technically infeasible, elements described as being in series may be implemented partially or fully in parallel. Similarly, unless technically infeasible, elements described as being in parallel may be implemented partially or fully in series.

While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited.

While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks. Unless explicitly stated as mutually exclusive, features depicted in different drawings can be combined consistent with the principles of the present disclosure.

In the drawings, reference numbers may be reused to identify identical elements or may simply identify elements that implement similar functionality. Numbering or other labeling of instructions or method steps is done for convenient reference, not to indicate a fixed order. In the drawings, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. As just one example, for information sent from element A to element B, element B may send requests and/or acknowledgements to element A.

A special-purpose system includes hardware and/or software and may be described in terms of an apparatus, a method, or a computer-readable medium. In various embodiments, functionality may be apportioned differently between software and hardware. For example, some functionality may be implemented by hardware in one embodiment and by software in another embodiment. Further, software may be encoded by hardware structures, and hardware may be defined by software, such as in software-defined networking or software-defined radio.

In this application, including the claims, the term module refers to a special-purpose system. The module may be implemented by one or more special-purpose systems. The one or more special-purpose systems may also implement some or all of the other modules. In this application, including the claims, the term module may be replaced with the terms "controller" or "circuit". In this application, including the claims, the term platform refers to one or more modules that offer a set of functions. In this application, including the claims, the term system may be used interchangeably with module or with the term special-purpose system.

The special-purpose system may be directed or controlled by an operator. The special-purpose system may be hosted by one or more of assets owned by the operator, assets leased by the operator, and third-party assets. The assets may be referred to as a private, community, or hybrid cloud computing network or cloud computing environment. For example, the special-purpose system may be partially or fully hosted by a third party offering software as a service (SaaS), platform as a service (PaaS), and/or infrastructure as a service (IaaS). The special-purpose system may be implemented using agile development and operations (DevOps) principles. In embodiments, some or all of the special-purpose system may be implemented in a multiple-environment architecture. For example, the multiple environments may include one or more production environments, one or more integration environments, one or more development environments, etc.

A special-purpose system may be partially or fully implemented using or by a mobile device. Examples of mobile devices include navigation devices, cell phones, smart phones, mobile phones, mobile personal digital assistants, palmtops, netbooks, pagers, electronic book readers, tablets, music players, etc. A special-purpose system may be partially or fully implemented using or by a network device. Examples of network devices include switches, routers, firewalls, gateways, hubs, base stations, access points, repeaters, head-ends, user equipment, cell sites, antennas, towers, etc.

A special-purpose system may be partially or fully implemented using a computer having a variety of form factors and other characteristics. For example, the computer may be characterized as a personal computer, as a server, etc. The computer may be portable, as in the case of a laptop, netbook, etc. The computer may or may not have any output device, such as a monitor, line printer, liquid crystal display (LCD), light emitting diodes (LEDs), etc. The computer may or may not have any input device, such as a keyboard, mouse, touchpad, trackpad, computer vision system, barcode scanner, button array, etc. The computer may run a general-purpose operating system, such as the WINDOWS operating system from Microsoft Corporation, the MACOS operating system from Apple, Inc., or a variant of the LINUX operating system. Examples of servers include a file server, print server, domain server, internet server, intranet server, cloud server, infrastructure-as-a-service server, platform-as-a-service server, web server, secondary server, host server, distributed server, failover server, and backup server.

The term hardware encompasses components such as processing hardware, storage hardware, networking hardware, and other general-purpose and special-purpose components. Note that these are not mutually-exclusive categories. For example, processing hardware may integrate storage hardware and vice versa.

Examples of a component are integrated circuits (ICs), application specific integrated circuit (ASICs), digital circuit elements, analog circuit elements, combinational logic circuits, gate arrays such as field programmable gate arrays (FPGAs), digital signal processors (DSPs), complex programmable logic devices (CPLDs), etc.

Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack. Examples of a system-on-chip include a radio frequency (RF) system-on-chip, an artificial intelligence (AI) system-on-chip, a video processing system-on-chip, an organ-on-chip, a quantum algorithm system-on-chip, etc.

The hardware may integrate and/or receive signals from sensors. The sensors may allow observation and measurement of conditions including temperature, pressure, wear, light, humidity, deformation, expansion, contraction, deflection, bending, stress, strain, load-bearing, shrinkage, power, energy, mass, location, temperature, humidity, pressure, viscosity, liquid flow, chemical/gas presence, sound, and air quality. A sensor may include image and/or video capture in visible and/or non-visible (such as thermal) wavelengths, such as a charge-coupled device (CCD) or complementary metal-oxide semiconductor (CMOS) sensor.

Examples of processing hardware include a central processing unit (CPU), a graphics processing unit (GPU), an approximate computing processor, a quantum computing processor, a parallel computing processor, a neural network processor, a signal processor, a digital processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an artificial intelligence (AI) co-processor.

The processor may enable execution of multiple threads. These multiple threads may correspond to different programs. In various embodiments, a single program may be implemented as multiple threads by the programmer or may be decomposed into multiple threads by the processing hardware. The threads may be executed simultaneously to enhance the performance of the processor and to facilitate simultaneous operations of the application. A processor may be implemented as a packaged semiconductor die. The die includes one or more processing cores and may include additional functional blocks, such as cache. In various embodiments, the processor may be implemented by multiple dies, which may be combined in a single package or packaged separately.

The networking hardware may include one or more interface circuits. In some examples, the interface circuit(s) may implement wired or wireless interfaces that connect, directly or indirectly, to one or more networks. Examples of networks include a cellular network, a local area network (LAN), a wireless personal area network (WPAN), a metropolitan area network (MAN), and/or a wide area network (WAN). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs).

Examples of cellular networks include GSM, GPRS, 3G, 4G, 5G, LTE, and EVDO. The cellular network may be implemented using frequency division multiple access (FDMA) network or code division multiple access (CDMA) network. Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN include IEEE Standard 802.15.4, including the ZIGBEE standard from the ZigBee Alliance. Further examples of a WPAN include the BLUETOOTH wireless networking standard, including Core Specification versions 3.0, 4.0, 4.1, 4.2, 5.0, and 5.1 from the Bluetooth Special Interest Group (SIG). A WAN may also be referred to as a distributed communications system (DCS). One example of a WAN is the internet.

Storage hardware is or includes a computer-readable medium. The term computer-readable medium, as used in this disclosure, encompasses both nonvolatile storage and volatile storage, such as dynamic random access memory (DRAM). The term computer-readable medium only excludes transitory electrical or electromagnetic signals propagating through a medium (such as on a carrier wave). A computer-readable medium in this disclosure is therefore non-transitory, and may also be considered to be tangible.

Examples of storage implemented by the storage hardware include a database (such as a relational database or a NoSQL database), a data store, a data lake, a column store, a data warehouse. Examples of storage hardware include nonvolatile memory devices, volatile memory devices, magnetic storage media, a storage area network (SAN), network-attached storage (NAS), optical storage media, printed media (such as bar codes and magnetic ink), and paper media (such as punch cards and paper tape). The storage hardware may include cache memory, which may be collocated with or integrated with processing hardware. Storage hardware may have read-only, write-once, or read/write properties. Storage hardware may be random access or sequential access. Storage hardware may be location-addressable, file-addressable, and/or content-addressable.

Examples of nonvolatile memory devices include flash memory (including NAND and NOR technologies), solid state drives (SSDs), an erasable programmable read-only memory device such as an electrically erasable programmable read-only memory (EEPROM) device, and a mask read-only memory device (ROM). Examples of volatile memory devices include processor registers and random access memory (RAM), such as static RAM (SRAM), dynamic RAM (DRAM), synchronous DRAM (SDRAM), synchronous graphics RAM (SGRAM), and video RAM (VRAM). Examples of magnetic storage media include analog magnetic tape, digital magnetic tape, and rotating hard disk drive (HDDs). Examples of optical storage media include a CD (such as a CD-R, CD-RW, or CD-ROM), a DVD, a Blu-ray disc, and an Ultra HD Blu-ray disc.

Examples of storage implemented by the storage hardware include a distributed ledger, such as a permissioned or permissionless blockchain. Entities recording transactions, such as in a blockchain, may reach consensus using an algorithm such as proof-of-stake, proof-of-work, and proof-of-storage. Elements of the present disclosure may be represented by or encoded as non-fungible tokens (NFTs). Ownership rights related to the non-fungible tokens may be recorded in or referenced by a distributed ledger. Transactions initiated by or relevant to the present disclosure may use one or both of fiat currency and cryptocurrencies, examples of which include bitcoin and ether. Some or all features of hardware may be defined using a language for hardware description, such as IEEE Standard 1364-2005 (commonly called "Verilog") and IEEE Standard 1076-2008 (commonly called "VHDL"). The hardware description language may be used to manufacture and/or program hardware.

A special-purpose system may be distributed across multiple different software and hardware entities. Communication within a special-purpose system and between special-purpose systems may be performed using networking hardware. The distribution may vary across embodiments and may vary over time. For example, the distribution may vary based on demand, with additional hardware and/or software entities invoked to handle higher demand. In various embodiments, a load balancer may direct requests to one of multiple instantiations of the special purpose system. The hardware and/or software entities may be physically distinct and/or may share some hardware and/or software, such as in a virtualized environment. Multiple hardware entities may be referred to as a server rack, server farm, data center, etc.

Software includes instructions that are machine-readable and/or executable. Instructions may be logically grouped into programs, codes, methods, steps, actions, routines, functions, libraries, objects, classes, etc. Software may be stored by storage hardware or encoded in other hardware. Software encompasses (i) descriptive text to be parsed, such as HTML (hypertext markup language), XML (extensible markup language), and JSON (JavaScript Object Notation), (ii) assembly code, (iii) object code generated from source code by a compiler, (iv) source code for execution by an interpreter, (v) bytecode, (vi) source code for compilation and execution by a just-in-time compiler, etc. As examples only, source code may be written using syntax from languages including C, C++, JavaScript, Java, Python, R, etc.

Software also includes data. However, data and instructions are not mutually-exclusive categories. In various embodiments, the instructions may be used as data in one or more operations. As another example, instructions may be derived from data. The functional blocks and flowchart elements in this disclosure serve as software specifications, which can be translated into software by the routine work of a skilled technician or programmer. Software may include and/or rely on firmware, processor microcode, an operating system (OS), a basic input/output system (BIOS), application programming interfaces (APIs), libraries such as dynamic-link libraries (DLLs), device drivers, hypervisors, user applications, background services, background applications, etc. Software includes native applications and web applications. For example, a web application may be served to a device through a browser using hypertext markup language 5th revision (HTML5).

Software may include artificial intelligence systems, which may include machine learning or other computational intelligence. For example, artificial intelligence may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), computer vision (CV), classification, image recognition, etc.

Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc.

In a client-server model, some of the software executes on first hardware identified functionally as a server, while other of the software executes on second hardware identified functionally as a client. The identity of the client and server is not fixed: for some functionality, the first hardware may act as the server while for other functionality, the first hardware may act as the client. In different embodiments and in different scenarios, functionality may be shifted between the client and the server. In one dynamic example, some functionality normally performed by the second hardware is shifted to the first hardware when the second hardware has less capability. In various embodiments, the term "local" may be used in place of "client," and the term "remote" may be used in place of "server."

Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

Some or all of the software may be arranged logically into layers. In a layered architecture, a second layer may be logically placed between a first layer and a third layer. The first layer and the third layer would then generally interact with the second layer and not with each other. In various embodiments, this is not strictly enforced—that is, some direct communication may occur between the first and third layers.

What is claimed is:

1. A method for processing distributed ledger data from different distributed ledger networks, the method comprising:

receiving, by a tokenization platform, first transaction data for a first plurality of distributed transactions on a first distributed ledger, wherein each distributed ledger transaction of the first plurality of distributed ledger transactions indicates a respective distributed ledger account associated with an initiator of the distributed ledger transaction and a respective distributed ledger account associated with a receiver of the distributed ledger transaction, wherein the first transaction data is received from a first distributed ledger node of a first distributed ledger network that maintains the first distributed ledger;

receiving, by the tokenization platform, second transaction data for a second plurality of distributed ledger transactions on a second distributed ledger, wherein each distributed ledger transaction of the second plurality of distributed ledger transactions indicates a respective distributed ledger account associated with an initiator of the distributed ledger transaction and a respective distributed ledger account associated with a receiver of the second distributed ledger transaction, wherein the second transaction data is received from a second distributed ledger node of a second distributed ledger network that maintains the second distributed ledger;

processing, by the tokenization platform, the first transaction data and the second transaction data by converting respective attributes indicated in the first and second transaction data into a standardized format, wherein the processing comprises converting the first transaction data using a first data pipeline that is specific to the first distributed ledger and converting the second transaction data using a second data pipeline that is specific to the second distributed ledger;

storing, by the tokenization platform, the standardized format transaction data in a data lake;

supplementing, by the tokenization platform, the data lake with social media data by identifying one or more social media accounts that correspond to one or more distributed ledger accounts and storing data linking the social media accounts to their corresponding distributed ledger accounts in the data lake;

generating, by the tokenization platform, a multi-ledger social graph including a plurality of entities linked by relationships, wherein the relationships include cross-ledger relationships that relate an entity corresponding to the first distributed ledger to an entity corresponding to the second distributed ledger, wherein each of the plurality of entities corresponds to a record in the data lake, wherein the plurality of entities include:

a first entity corresponding to a distributed ledger token;

a second entity corresponding to a distributed ledger account; and a third entity corresponding to a social media account; and providing, to a device, data obtained from the social graph.

2. The method of claim 1, wherein providing the data obtained from the social graph comprises providing the data to a clustering system configured to cluster the data to identify clusters of distributed ledger accounts associated with similar distributed ledger transactions.

3. The method of claim 2, wherein the clusters include a first cluster identifying a first plurality of wallets operated by a first set of users that frequently interact with a first type of token on the distributed ledger and a second cluster identifying a second plurality of wallets operated by a second set of users that frequently interact with a second type of token.

4. The method of claim 2, further comprising:

generating, by the tokenization platform, a social feed for a first cluster of distributed ledger accounts; and transmitting the social feed to a plurality of devices associated with the first cluster.

5. The method of claim 4, wherein transmitting the social feed comprises:

using the social graph to identify a social media account corresponding to a first distributed ledger account in the first cluster; and transmitting the social media feed to the social media account.

6. The method of claim 4, wherein transmitting the social feed comprises transmitting the social media feed to a cloud wallet service that provides a first distributed account in the first cluster.

7. The method of claim 2, further comprising:

generating a recommendation for a first cluster of distributed ledger accounts; and transmitting the recommendation to a plurality of devices associated with the first cluster.

8. The method of claim 2, further comprising:

generating, by the tokenization platform, a recommendation for a first cluster of distributed ledger accounts; and transmitting the recommendation to a plurality of devices associated with the first cluster.

9. The method of claim 2, further comprising:

generating, by the tokenization platform, a social community for a first cluster of distributed ledger accounts; and transmitting a notification indicating the social community to a plurality of devices associated with the first cluster.

10. The method of claim 1, wherein providing the data obtained from the social graph comprises providing the data to a clustering system configured to cluster the data to identify clusters of tokens associated with similar distributed ledger transactions.

11. The method of claim 10, wherein the tokens are non-fungible tokens.

12. The method of claim 1, wherein providing the data obtained from the social graph comprises providing the data to a clustering system configured to cluster the data to identify clusters of token collections associated with similar distributed ledger transactions.

13. The method of claim 12, wherein the clusters include a first cluster identifying a first plurality of token collections associated with a first type of distributed application on the distributed ledger and a second cluster identifying a second plurality of token collections associated with a second type of distributed application on the distributed ledger.

14. The method of claim 1, wherein providing the data obtained from the social graph comprises providing the data to a data browser configured to allow a user to interactively browse the social graph.

15. The method of claim 1, further comprising, prior to generating the social graph, performing a data cleaning process on the data lake maintained by the tokenization platform, wherein the data cleaning process comprises converting raw data into data in a structured format.

16. The method of claim 1, wherein receiving the transaction data comprises receiving a plurality of blockchain blocks responsive to one or more requests from the tokenization platform to the distributed ledger node, wherein the distributed ledger node is a blockchain node.

17. The method of claim 16, wherein the one or more requests comprise a first request for an origin block of the blockchain, a second request for a second block that includes a cryptographic link to the origin block, and a third request for a third block that includes a cryptographic link to the second block.

18. The method of claim 1, wherein the social graph includes a relationship between the first entity and the second entity, wherein the relationship indicates that the distributed ledger account owns the distributed ledger token.

19. The method of claim 1, wherein the social graph includes a relationship between the first entity and the second entity, wherein the relationship indicates that the distributed ledger account formerly owned the distributed ledger token.

20. The method of claim 1, wherein the social graph includes a relationship between the second entity and the third entity, wherein the relationship indicates that the social media account is owned by a user that owns that distributed ledger account.

* * * * *